US007243945B2

(12) United States Patent
Breed et al.

(10) Patent No.: US 7,243,945 B2
(45) Date of Patent: Jul. 17, 2007

(54) WEIGHT MEASURING SYSTEMS AND METHODS FOR VEHICLES

(75) Inventors: David S. Breed, Boonton Township, Morris County, NJ (US); Wilbur E. DuVall, Kimberling City, MO (US); Jeffrey L. Morin, Lincoln Park, MI (US)

(73) Assignee: Automotive Technologies International, Inc., Denville, NJ (US)

(*) Notice: Subject to any disclaimer, the term of this patent is extended or adjusted under 35 U.S.C. 154(b) by 597 days.

(21) Appl. No.: 10/733,957

(22) Filed: Dec. 11, 2003

(65) Prior Publication Data

US 2004/0129478 A1 Jul. 8, 2004

Related U.S. Application Data

(63) Continuation-in-part of application No. 09/437,535, filed on Nov. 10, 1999, now Pat. No. 6,712,387, which is a continuation-in-part of application No. 09/047,703, filed on Mar. 25, 1998, now Pat. No. 6,039,139, which is a continuation-in-part of application No. 08/640,068, filed on Apr. 30, 1996, now Pat. No. 5,829,782, which is a continuation of application No. 08/239,978, filed on May 9, 1994, now abandoned, which is a continuation-in-part of application No. 08/040,978, filed on Mar. 31, 1993, now abandoned, which is a continuation-in-part of application No. 07/878,571, filed on May 5, 1992, now abandoned, said application No. 09/047,703 is a continuation-in-part of application No. 08/905,876, filed on Aug. 4, 1997, now Pat. No. 5,848,802, which is a continuation of application No. 08/505,036, filed on Jul. 21, 1995, now Pat. No. 5,653,462, which is a continuation of application No. 08/040,978, which is a continuation-in-part of application No. 07/878,571, said application No. 08/905,876 is a continuation of application No. 08/505,036, which is a continuation of application No. 08/040,978, application No.

(Continued)

(60) Provisional application No. 60/136,163, filed on May 27, 1999, provisional application No. 60/114,507, filed on Dec. 31, 1998.

(51) Int. Cl.
*B60R 21/16* (2006.01)

(52) U.S. Cl. ........................ 280/735; 180/274; 701/45

(58) Field of Classification Search ................ 280/735; 180/273, 274; 701/173, 174, 45, 47, 49
See application file for complete search history.

(56) References Cited

U.S. PATENT DOCUMENTS 3,275,975 A 9/1966 King ......................... 180/272

(Continued)

FOREIGN PATENT DOCUMENTS

EP 0152092 8/1985

(Continued)

*Primary Examiner*—Paul N. Dickson
*Assistant Examiner*—Toan C. To
(74) *Attorney, Agent, or Firm*—Brian Roffe

(57) ABSTRACT

Weight sensor for determining the weight of an occupant of a seat including a bladder arranged in a seat portion of the seat and including material or structure in an interior thereof which constrains fluid flow therein and one or more transducers for measuring the pressure of the fluid in the bladder. The material or structure might be open cell foam. The bladder may include one or more chambers, and if more than one chamber is formed, each chamber can be arranged at a different location in the seat portion of the seat.

7 Claims, 153 Drawing Sheets

Related U.S. Application Data

10/733,957, which is a continuation-in-part of application No. 10/116,808, filed on Apr. 5, 2002, now Pat. No. 6,856,873, which is a continuation-in-part of application No. 09/925,043, filed on Aug. 8, 2001, now Pat. No. 6,507,779, which is a continuation-in-part of application No. 09/765,559, filed on Jan. 19, 2001, now Pat. No. 6,553,296, which is a continuation-in-part of application No. 09/476,255, filed on Dec. 30, 1999, now Pat. No. 6,324,453, said application No. 09/765,559 is a continuation-in-part of application No. 09/389,947, filed on Sep. 3, 1999, now Pat. No. 6,393,133, which is a continuation-in-part of application No. 09/200,614, filed on Nov. 30, 1998, now Pat. No. 6,141,432, which is a continuation of application No. 08/474,786, filed on Jun. 7, 1995, now Pat. No. 5,845,000, said application No. 10/116,808 is a continuation-in-part of application No. 09/838,919, filed on Apr. 20, 2001, now Pat. No. 6,442,465, which is a continuation-in-part of application No. 09/765,559, filed on Jan. 19, 2001, now Pat. No. 6,553,296, which is a continuation-in-part of application No. 09/476,255, filed on Dec. 30, 1999, now Pat. No. 6,324,453, said application No. 09/765,559 is a continuation-in-part of application No. 09/389,947, which is a continuation-in-part of application No. 09/200,614, which is a continuation of application No. 08/474,786, application No. 10/733,957, which is a continuation-in-part of application No. 09/838,920, filed on Apr. 20, 2001, now Pat. No. 6,778,672, which is a continuation-in-part of application No. 09/563,556, filed on May 3, 2000, now Pat. No. 6,474,683, which is a continuation-in-part of application No. 09/437,535, application No. 10/733,957, which is a continuation-in-part of application No. 09/849,559, filed on May 4, 2001, now Pat. No. 6,689,962, which is a continuation-in-part of application No. 09/193,209, filed on Nov. 17, 1998, now Pat. No. 6,242,701, which is a continuation-in-part of application No. 09/128,490, filed on Aug. 4, 1998, now Pat. No. 6,078,854, which is a continuation-in-part of application No. 08/474,783, filed on Jun. 7, 1995, now Pat. No. 5,822,707, and a continuation-in-part of application No. 08/970,822, filed on Nov. 14, 1997, now Pat. No. 6,081,757, application No. 10/733,957, which is a continuation-in-part of application No. 10/058,706, filed on Jan. 28, 2002, which is a continuation-in-part of application No. 09/891,432, filed on Jun. 26, 2001, now Pat. No. 6,513,833, which is a continuation-in-part of application No. 09/838,920, said application No. 10/058,706 is a continuation-in-part of application No. 09/543,678, filed on Apr. 7, 2000, now Pat. No. 6,412,813, which is a continuation-in-part of application No. 09/047,704, filed on Mar. 25, 1998, now Pat. No. 6,116,639, which is a continuation-in-part of application No. 08/640,068, filed on Apr. 30, 1996, now Pat. No. 5,829,782, which is a continuation of application No. 08/239,978, which is a continuation-in-part of application No. 08/040,978, which is a continuation-in-part of application No. 07/878,571, said application No. 09/047,704 is a continuation-in-part of application No. 08/905,876, which is a continuation of application No. 08/505,036, which is a continuation of application No. 08/040,978, which is a continuation-in-part of application No. 07/878,571, said application No. 10/058,706 is a continuation-in-part of application No. 09/639,299, filed on Aug. 15, 2000, now Pat. No. 6,422,595, which is a continuation-in-part of application No. 09/409,625, said application No. 09/409,625 is a continuation-in-part of application No. 08/905,877, which is a continuation of application No. 08/505,036, which is a continuation of application No. 08/040,978, which is a continuation-in-part of application No. 07/878,571, said application No. 09/639,299 is a continuation-in-part of application No. 09/448,337, filed on Nov. 23, 1999, now Pat. No. 6,283,503, which is a continuation-in-part of application No. 08/905,877, said application No. 09/639,299 is a continuation-in-part of application No. 09/448,338, which is a continuation-in-part of application No. 08/905,877, said application No. 09/639,299 is a continuation-in-part of application No. 08/905,877, application No. 10/733,957, which is a continuation-in-part of application No. 10/061,016, filed on Jan. 30, 2002, now Pat. No. 6,833,516, which is a continuation-in-part of application No. 09/901,879, filed on Jul. 9, 2001, now Pat. No. 6,555,766, which is a continuation of application No. 09/849,559, filed on May 4, 2001, now Pat. No. 6,689,962, application No. 10/733,957, which is a continuation-in-part of application No. 10/114,533, filed on Apr. 2, 2002, now Pat. No. 6,942,248, which is a continuation-in-part of application No. 10/058,706, filed on Jan. 28, 2002, application No. 10/733,957, which is a continuation-in-part of application No. 10/151,615, filed on May 20, 2002, now Pat. No. 6,820,897, which is a continuation-in-part of application No. 09/891,432, filed on Jun. 26, 2001, now Pat. No. 6,513,833, which is a continuation-in-part of application No. 09/543,678, and a continuation-in-part of application No. 09/639,299, application No. 10/733,957, which is a continuation-in-part of application No. 10/227,781, filed on Aug. 26, 2002, now Pat. No. 6,792,342, which is a continuation-in-part of application No. 10/061,016, and a continuation-in-part of application No. 09/500,346, filed on Feb. 8, 2000, now Pat. No. 6,442,504, which is a continuation-in-part of application No. 09/128,490, which is a continuation-in-part of application No. 08/474,783, and a continuation-in-part of application No. 08/970,822, application No. 10/733,957, which is a continuation-in-part of application No. 10/234,436, filed on Sep. 3, 2002, now Pat. No. 6,757,602, which is a continuation-in-part of application No. 09/853,118, filed on May 10, 2001, now Pat. No. 6,445,988, which is a continuation-in-part of application No. 09/474,147, filed on Dec. 29, 1999, now Pat. No. 6,397,136, which is a continuation-in-part of application No. 09/382,406, filed on Aug. 24, 1999, now Pat. No. 6,529,809, and a continuation-in-part of application No. 08/919,823, filed on Aug. 28, 1997, now Pat. No. 5,943,295, which is a continuation-in-part of application No. 08/798,029, filed on Feb. 6, 1997, now abandoned, application No. 10/733,957, which is a continuation-in-part of application No. 10/302,105, filed on Nov. 22, 2002, now Pat. No. 6,772,057, which is a continuation-in-part of application No. 10/116,808, application No. 10/733,957, which is a continuation-in-part of application No. 10/365,129, filed on Feb. 12, 2003, now Pat. No. 7,134,687, which is a continuation-in-part of application No. 10/114, 533, and a continuation-in-part of application No. 10/151,615, application No. 10/733,957, which is a continuation-in-part of application No. 09/613,925, filed on Jul. 11, 2000, now Pat. No. 6,805,404, which is a continuation-in-part of application No. 08/992, 525, filed on Dec. 17, 1997, now Pat. No. 6,088,640, application No. 10/733,957, which is a continuation-in-part of application No. 10/234,063, filed on Sep. 3, 2002, now Pat. No. 6,746,078, which is a continuation-in-part of application No. 09/613,925.

(56) References Cited

U.S. PATENT DOCUMENTS

| | | | | |
|---|---|---|---|---|
| 4,519,652 | A | 5/1985 | Kamijo | 180/268 |
| 4,625,329 | A | 11/1986 | Ishikawa et al. | 382/104 |
| 4,639,872 | A | 1/1987 | McHale et al. | 364/463 |
| 4,645,233 | A | 2/1987 | Bruse et al. | 280/753 |
| 4,698,571 | A | 10/1987 | Mizuta et al. | 318/466 |
| 4,811,226 | A | 3/1989 | Shinohara | 318/466 |
| 4,907,153 | A | 3/1990 | Brodsky | 364/424.05 |
| 4,957,286 | A | 9/1990 | Persons, II et al. | 272/73 |
| 5,008,946 | A | 4/1991 | Ando | 180/167 |
| 5,071,160 | A | 12/1991 | White et al. | 280/735 |
| 5,074,583 | A | 12/1991 | Fujita | 280/735 |
| 5,086,652 | A | 2/1992 | Kropp | 73/767 |
| 5,090,493 | A | 2/1992 | Bergan et al. | 177/211 |
| 5,118,134 | A | 6/1992 | Mattes | 280/735 |
| 5,125,686 | A | 6/1992 | Yano | 280/801.2 |
| 5,155,685 | A | 10/1992 | Kishi et al. | 364/424.05 |
| 5,161,820 | A | 11/1992 | Vollmer | 280/730 |
| 5,222,399 | A | 6/1993 | Kropp | 73/862.68 |
| 5,232,243 | A | 8/1993 | Blackburn et al. | 280/735 |
| 5,254,924 | A | 10/1993 | Ogasawara | 364/424.05 |
| 5,330,226 | A | 7/1994 | Gentry et al. | 280/735 |
| 5,377,108 | A | 12/1994 | Nishio | 701/45 |
| 5,413,378 | A | 5/1995 | Steffens, Jr. et al. | 280/735 |
| 5,439,249 | A | 8/1995 | Steffens, Jr. et al. | 280/735 |
| 5,454,591 | A | 10/1995 | Mazur et al. | 280/735 |
| 5,474,327 | A | 12/1995 | Schousek | 280/735 |
| 5,531,472 | A | 7/1996 | Semchena et al. | 280/735 |
| 5,573,269 | A | 11/1996 | Gentry et al. | 280/735 |
| 5,583,771 | A | 12/1996 | Lynch et al. | 701/45 |
| 5,653,462 | A | 8/1997 | Breed et al. | 280/735 |
| 5,670,853 | A | 9/1997 | Bauer | 318/286 |
| 5,691,693 | A | 11/1997 | Kithil | 340/439 |
| 5,694,320 | A | 12/1997 | Breed | 364/424.055 |
| 5,702,123 | A | 12/1997 | Takahashi et al. | 280/735 |
| 5,714,695 | A | 2/1998 | Bruns | 177/211 |
| 5,748,473 | A | 5/1998 | Breed et al. | 364/424.055 |
| 5,785,347 | A | 7/1998 | Adolph et al. | 280/735 |
| 5,802,479 | A | 9/1998 | Kithil et al. | 701/45 |
| 5,822,707 | A | 10/1998 | Breed et al. | 701/49 |
| 5,829,782 | A | 11/1998 | Breed et al. | 280/735 |
| 5,844,486 | A | 12/1998 | Kithil et al. | 340/573 |
| 5,848,802 | A | 12/1998 | Breed et al. | 280/735 |
| 5,877,677 | A | 3/1999 | Fleming et al. | 340/436 |
| 5,918,696 | A | 7/1999 | Van Voorhies | 180/273 |
| 5,942,695 | A | 8/1999 | Verma et al. | 73/768 |
| 5,943,295 | A | 8/1999 | Varga et al. | 180/273 |
| 5,957,491 | A * | 9/1999 | Cech et al. | 280/735 |
| 5,984,349 | A | 11/1999 | Van Voorhies | 280/735 |
| 5,991,676 | A | 11/1999 | Podoloff et al. | 701/45 |
| 6,015,163 | A | 1/2000 | Langford et al. | 280/735 |
| 6,039,344 | A | 3/2000 | Mehney et al. | 280/735 |
| 6,056,079 | A | 5/2000 | Cech et al. | 180/273 |
| 6,069,325 | A | 5/2000 | Aoki | 177/136 |
| 6,078,854 | A | 6/2000 | Breed et al. | 701/49 |
| 6,081,757 | A | 6/2000 | Breed et al. | 701/45 |
| 6,087,598 | A | 7/2000 | Munch | 177/144 |
| 6,101,436 | A | 8/2000 | Fortune | |
| 6,104,100 | A | 8/2000 | Neuman | 307/10.1 |
| 6,161,891 | A | 12/2000 | Blakesley | 296/65.01 |
| 6,218,632 | B1 | 4/2001 | McCarthy et al. | 177/144 |
| 6,231,076 | B1 | 5/2001 | Blakesley et al. | 280/735 |
| 6,240,352 | B1 | 5/2001 | McCurdy | 701/45 |
| 6,253,134 | B1 | 6/2001 | Breed et al. | 701/49 |
| 6,260,879 | B1 * | 7/2001 | Stanley | 280/735 |
| 6,345,839 | B1 | 2/2002 | Kuboki et al. | 280/735 |
| 6,442,504 | B1 * | 8/2002 | Breed et al. | 702/173 |
| 6,555,766 | B2 | 4/2003 | Breed et al. | 177/144 |
| 6,578,871 | B2 | 6/2003 | Gray et al. | 280/735 |
| 6,653,577 | B2 | 11/2003 | Breed et al. | 177/244 |

FOREIGN PATENT DOCUMENTS

| | | | |
|---|---|---|---|
| EP | 0345806 | 12/1989 | |
| EP | 0 728 636 A1 | 8/1996 | |
| EP | 950560 | 10/1999 | 177/144 |
| EP | 0990565 | 4/2000 | |
| EP | 0 721 863 B1 | 5/2000 | |
| GB | 2289332 | 11/1995 | 280/735 |
| GB | 2333070 | 7/1999 | |
| GB | 2340252 | 2/2000 | |
| JP | 3032943 | 2/1991 | |
| JP | 3062699 | 3/1991 | |
| JP | 04-138996 | 5/1992 | |
| WO | 9825112 | 6/1998 | |
| WO | 9830411 | 7/1998 | |
| WO | 0112473 | 2/2001 | |
| WO | 0113076 | 2/2001 | |

* cited by examiner

Subject Classification

| Class | Instances | Weight Category | State |
|---|---|---|---|
| ES | Empty Seat | <10 lb | Empty |
| FFA | Normally Seated Adult | > 05 lb | Enable |
| FFC | Normally Seated Child | <10,105> lb | Enable |
| FFC | Normally Positioned Forward Facing Child Seat | <10,45> lb | Enable |
| OOP | Out-of-position Adult | >105 lb | Disable |
| OOP | Out-of-position Child | <105 lb | Disable |
| OOP | Out-of-position Forward Facing Child Seat | <10,45> lb | Disable |
| RFS | Rearward Facing Child Seat | <10,45> lb | Disable |
| RFS | Rearward Facing Infant Seat | <10,45> lb | Disable |

FIG. 76

Categorization of Human Subjects

| | Weight Range kg (lb) | | Height Range m (in | |
|---|---|---|---|---|
| **Child** | | <0.95,1 .1 5> (<3'1",3'9">) | <1.10,1.30> (<3'7",4'3">) | <1.25,1.45> (<4'1",4'9">) |
| | <11,25>(<24,55>) | C11 | C12 | C13 |
| | <22,36> (<48,79>) | C21 | C22 | C23 |
| | <33,47> (<73,103>) | C31 | C32 | C33 |
| **Adult** | | <1 .45, 1 .65> (<49,555') | <1 .60,1 .80> (<53,51 1 '5') | <1 .75, 1 .95> (<59,655') |
| | <45,70>('<99,154>) | A11 | A12 | A13 |
| | <65,90> (<143,198>) | A21 | A22 | A23 |
| | <85,110>(<187,242>) | A31 | A32 | A33 |

All Human Subjects are to wear light clothes (typically slacks and T-shirt) on entry.
Other types of clothing to be provided by ATI

Child Surrogates

| | | | | |
|---|---|---|---|---|
| **Doll** | | Baby=0.50m (approx. 20") | Infant=0.75m (approx. 30") | Child=1.20m (approx. 48") |

FIG. 77

Rearward Facing Infant Seats

| Designation | Child Seat | Attributes |
|---|---|---|
| Training | Arriva | base, hood |
| Independent | Assura565 | hood |
| Training | Baby-Safe | - |
| Training | Century 590 | base, hood |
| Training | Evenflo Discovery | base, Tbar |
| Training | Evenflo Joyride (new) | hood |
| Independent | Evenflo Joyride (old) | - |
| Training | GerryGuard | base |
| Validation | Kolcraft Travelabout | base, Tbar |
| Training | Rock-n-Ride | - |
| Training | TLC | - |

FIG. 78

Rearward Facing Child Seat

| Designation | Child Seat | Attributes |
|---|---|---|
| Training | Centuryl000 | - |
| Validation | Century 2000 STE | - |
| Training | CenturyOvation | - |
| Training | Century Smartmove 5T | table |
| Training | Champion | table |
| Training | Fisher Price Child Seat | table |
| Training | Touriva | - |
| Training | Ultara | table |
| Training | Vario Exclusive | table |

FIG. 79

Forward Facing Child and Booster Seats

| Designation | Child Seat | Attributes |
|---|---|---|
| Training | Centuryl000 | - |
| Validation | Century 2000 STE | - |
| Training | CenturyOvation | - |
| Validation | Century Smartmove 5T | table |
| Training | Champion | table |
| Validation | Fisher Price Booster | - |
| Training | Fisher Price Child Seat | table |
| Training | Gerry Booster | table |
| Training | Touriva | - |
| Training | Ultara | table |
| Training | Vario Exclusiv | table |

FIG. 80

Vehicle Configuration Series

| Con fig | Seat Track (+/1 .05") | | | | | | | | | | Seatback Recline (+/- 2°) | | | | | | | | | | Windows | | | | | | | | | |
|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 | 7 | 8 | 9 | 10 | 1 | 2 | 3 | 4 | 5 | 6 | 7 | 8 | 9 | 10 |
| A | 0 | 0 | 2 | 2 | 2 | 4 | 4 | 6 | 6 | 6 | 0 | 18 | 4 | 12 | 20 | 2 | 20 | 0 | 8 | 16 | D | D | U | U | D | D | U | U | D | D |
| B | 1 | 1 | 3 | 3 | 3 | 5 | 5 | 7 | 7 | 7 | 2 | 20 | 0 | 8 | 16 | 0 | 18 | 4 | 12 | 20 | U | U | D | D | U | U | D | D | U | U |
| C | 0 | 0 | 2 | 2 | 4 | 4 | 4 | 6 | 6 | 6 | 5 | 15 | 4 | 16 | 0 | 15 | 20 | 2 | 10 | 18 | U | U | D | D | U | U | D | D | U | U |
| D | 1 | 1 | 3 | 3 | 5 | 5 | 5 | 7 | 7 | 7 | 4 | 16 | 5 | 15 | 2 | 10 | 18 | 0 | 15 | 20 | D | D | U | U | D | D | U | U | D | D |
| E | 0 | 0 | 0 | 2 | 2 | 2 | 4 | 4 | 6 | 6 | 0 | 8 | 16 | 4 | 12 | 20 | 2 | 20 | 0 | 18 | D | D | U | U | D | D | U | U | D | D |
| F | 1 | 1 | 1 | 3 | 3 | 3 | 5 | 5 | 7 | 7 | 4 | 12 | 20 | 0 | 8 | 16 | 0 | 18 | 2 | 20 | U | U | D | D | U | U | D | D | U | U |
| G | 0 | 0 | 2 | 2 | 2 | 4 | 4 | 4 | 6 | 6 | 4 | 16 | 2 | 20 | 2 | 10 | 18 | 0 | 15 | 20 | U | U | D | D | U | U | D | D | U | U |
| H | 1 | 1 | 3 | 3 | 3 | 5 | 5 | 5 | 7 | 7 | 2 | 20 | 4 | 16 | 0 | 15 | 20 | 2 | 10 | 18 | D | D | U | U | D | D | U | U | D | D |

FIG. 81A

Vehicle Configuration Series

| Config | Visor 1 | 2 | 3 | 4 | 5 | 6 | 7 | 8 | 9 | 10 | Convertible Top 1 | 2 | 3 | 4 | 5 | 6 | 7 | 8 | 9 | 10 |
|---|---|---|---|---|---|---|---|---|---|---|---|---|---|---|---|---|---|---|---|---|
| A | U | D | U | D | S | U | D | U | D | S | U | U | U | U | U | D | D | D | D | D |
| B | D | U | D | U | S | D | U | D | U | S | D | D | D | D | D | U | U | U | U | U |
| C | U | D | S | U | D | U | D | S | U | D | D | D | D | D | D | U | U | U | U | U |
| D | D | U | S | D | U | D | U | S | D | U | U | U | U | U | U | D | D | D | D | D |
| E | D | U | D | S | D | U | D | S | U | D | U | U | U | U | U | D | D | D | D | D |
| F | U | D | U | S | D | U | D | S | U | D | D | D | D | D | D | U | U | U | U | U |
| G | U | S | D | U | D | U | D | U | S | D | D | D | D | D | D | U | U | U | U | U |
| H | D | S | U | D | U | D | U | D | S | U | U | U | U | U | U | D | D | D | D | D |

FIG. 81B

Sequence for Child Seat Training Data Collection:

Start object in center of the seat. Trainer has both hands on the steering wheel;

With a smooth motion, push the object fully outboard, then pull it fully inboard, then push it to center position, then put hands back on the steering wheel;

With a smooth motion, rotate the object 45 degrees outboard, the rotate 45 degrees inboard, then rotate back to center, then put hands back on the steering wheel;

Sequence for Out-of-Position Forward Facing Child Seat Training Data Collection

Start with object in the center line, leaning onto the Instrument Panel;

With a smooth motion, push the object fully outboard, then pull it fully inboard, then push it to the center;

Repeat this sequence with a 1 50 mm (6") gap between the object and the Instrument Panel; Apply small (+/- 10°) rotations.

Repeat this sequence with a 300 mm (12") gap between the object and the Instrument Panel; Apply small (+/- 10°) rotations.

FIG. 81C

Sequence for Human Subject Training Data Collection:

Lean forward and outboard such that head and/or shoulders touch the Fire line;
Gently traverse inboard while carefully following the Fire line until the center of the vehicle is reached;
Lean halfway back towards the seatback and traverse outboard up against the side window. Rotate torso while doing so;
Lean back into the seat and traverse inboard towards the center. Rotate torso while doing so;
Sit back in the seat; “operate” radio controls, glove box, window, or seat controls; assume a brace posture;
Do *not* cross the Fire line with head and/or shoulders at any time.

Sequence for Out-of-Position Human Subject Training Data Collection:

Lean forward and outboard such that head and/or shoulders touch the Instrument Panel;
Gently traverse inboard towards the center console;
Move back 150 mm (6”) and gently traverse back to the most outboard position;
Move back 300 mm (12”) and gently traverse back to the center console;
“Operate” radio controls and glovebox while head and/or shoulders remain in front of the Fire line.

FIG. 81D

Network Training Set Collection Matrix (Vehicle E)
Rev 1.1

| # | Class | Subject/Object | Attributes | Actions | Config. | Belt | Conditions |
|---|---|---|---|---|---|---|---|
| 1 | ES | None | None | Motions of track and recline | (A) | N.A. | Ambient |
| 2 | FFA | A22 | Medium Clothes, Magazine | Motions in safe seating area | B | Yes | Ambient |
| 3 | OOP | A22 | Medium Clothes | Motions in NFZ | C | No | Ambient |
| 4 | FFC | Century 1000 | Infant Doll | Motions in safe seating area | D | No | Ambient |
| 5 | RFS | Century 1000 | Baby Doll | Motions in entire seating area | E | No | Ambient |
| 6 | ES | None | Beaded Cover | Motions of track and recline | (F) | N.A. | Ambient |
| 7 | FFA | A11 | Medium Clothes | Motions in safe seating area | G | Yes | Ambient |
| 8 | OOP | Touriva | Infant Doll, Blanket | Motions in NFZ | H | No | Ambient |
| 9 | FFC | Touriva | Infant Doll, Blanket | Motions in safe seating area | A | No | Ambient |
| 10 | RFS | Century 590 | Baby Doll, Hood | Motions in entire seating area | B | No | Ambient |
| 11 | ES | None | Fabric Cover | Motions of track and recline | (C) | N.A. | Ambient |
| 12 | FFA | A33 | Medium Clothes, Newspaper | Motions in safe seating area | D | No | Ambient |
| 13 | OOP | A33 | Medium Clothes | Motions in NFZ | E | Yes | Ambient |
| 14 | FFC | C22 | Medium Clothes | Motions in safe seating area | F | No | Ambient |
| 15 | RFS | Touriva | Baby Doll, Blanket | Motions in entire seating area | G | No | Ambient |
| 16 | ES | None | Blanket | Motions of track and recline | (H) | N.A. | Ambient |
| 17 | FFA | A21 | Heavy Clothes | Motions in safe seating area | A | No | Ambient |
| 18 | OOP | C11 | Heavy Clothes | Motions in NFZ (standing) | B | No | Ambient |
| 19 | FFC | C11 | Heavy Clothes | Motions in safe seating area | C | No | Ambient |

FIG. 82A

| | | | | | | | |
|---|---|---|---|---|---|---|---|
| 20 | RFS | TLC | Baby Doll | Motions in entire seating area | D | No | Ambient |
| 21 | ES | None | None | Motions of track and recline | (E) | N.A. | Solar Heat |
| 22 | FFA | A12 | Light Clothes, Magazine | Motions in safe seating area | F | Yes | Solar Heat |
| 23 | OOP | A12 | Light Clothes | Motions in NFZ | G | No | Solar Heat |
| 24 | FFC | Champion | Infant Doll | Motions in safe seating area | H | No | Solar Heat |
| 25 | RFS | Champion | Baby Doll | Motions in entire seating area | A | No | Solar Heat |
| 26 | ES | None | Beaded Cover | Motions of track and recline | (B) | N.A. | Solar Heat |
| 27 | FFA | A23 | Light Clothes | Motions in safe seating area | C | Yes | Solar Heat |
| 28 | OOP | Vario Exclusive | Child Doll | Motions in NFZ | D | No | Solar Heat |
| 29 | FFC | Vario Exclusive | Child Doll, Blanket | Motions in safe seating area | E | No | Solar Heat |
| 30 | RFS | Joyride (new) | Baby Doll | Motions in entire seating area | F | No | Solar Heat |
| 31 | ES | None | Fabric Cover | Motions of track and recline | (G) | N.A. | Solar Heat |
| 32 | FFA | A32 | Light Clothes, Newspaper | Motions in safe seating area | H | No | Solar Heat |
| 33 | OOP | A32 | Light Clothes | Motions in NFZ | A | Yes | Solar Heat |
| 34 | FFC | C33 | Light Clothes | Motions in safe seating area | B | No | Solar Heat |
| 35 | RFS | Ultara | Baby Doll, Blanket | Motions in entire seating area | C | No | Solar Heat |
| 36 | ES | None | Blanket | Motions of track and recline | (D) | N.A. | Solar Heat |
| 37 | FFA | A22 | Medium Clothes | Motions in safe seating area | E | No | Solar Heat |
| 38 | OOP | C21 | Medium Clothes | Motions in NFZ | F | No | Solar Heat |
| 39 | FFC | C21 | Medium Clothes | Motions in safe seating area | G | No | Solar Heat |
| 40 | RFS | Arriva | Baby Doll, Hood | Motions in entire seating area | H | No | Solar Heat |
| 41 | ES | None | Handbag | Motions of track and recline | (H) | N.A. | Ambient |
| 42 | FFA | A11 | Heavy Clothes, Magazine | Motions in safe seating area | G | Yes | Ambient |

FIG. 82B

| | | | | | | | |
|---|---|---|---|---|---|---|---|
| 43 | OOP | A11 | Heavy Clothes | Motions in NFZ | F | No | Ambient |
| 44 | FFC | Gerry Booster | Infant Doll | Motions in safe seating area | E | No | Ambient |
| 45 | RFS | Fisher Price CS | Baby Doll | Motions in entire seating area | D | No | Ambient |
| 46 | ES | None | Beaded Cover, Handbag | Motions of track and recline | (C) | N.A. | Ambient |
| 47 | FFA | A33 | Heavy Clothes | Motions in safe seating area | B | Yes | Ambient |
| 48 | OOP | Ultara | Inflant Doll, Blanket | Motions in NFZ | A | No | Ambient |
| 49 | FFC | Ultara | Inflant Doll, Blanket | Motions in safe seating area | H | No | Ambient |
| 50 | RFS | Baby Safe | Baby Doll, Handle up | Motions in entire seating area | G | No | Ambient |
| 51 | ES | None | Fabric Cover, Handbag | Motions of track and recline | (F) | N.A. | Ambient |
| 52 | FFA | A21 | Heavy Clothes, Newspaper | Motions in safe seating area | E | No | Ambient |
| 53 | OOP | A21 | Heavy Clothes | Motions in NFZ | D | Yes | Ambient |
| 54 | FFC | C12 | Heavy Clothes | Motions in safe seating area | C | No | Ambient |
| 55 | RFS | Vario Exclusive | Baby Doll, Blanket | Motions in entire seating area | B | No | Ambient |
| 56 | ES | None | Blanket, Handbag | Motions of track and recline | (A) | N.A. | Ambient |
| 57 | FFA | A12 | Rain Clothes | Motions in safe seating area | H | No | Ambient |
| 58 | OOP | C23 | Rain Clothes | Motions in NFZ | G | No | Ambient |
| 59 | FFC | C23 | Rain Clothes | Motions in safe seating area | F | No | Ambient |
| 60 | RFS | Rock'n'Ride | Baby Doll | Motions in entire seating area | E | No | Ambient |
| 61 | ES | None | None | Motions of track and recline | (D) | N.A. | Air Conditioner |
| 62 | FFA | A23 | Light Clothes, Magazine | Motions in safe seating area | C | Yes | Air Conditioner |

FIG. 82C

| | | | | | | | |
|---|---|---|---|---|---|---|---|
| 63 | OOP | A23 | Light Clothes | Motions in NFZ | B | No | Air Conditioner |
| 64 | FFC | Century Ovation | Inflant Doll | Motions in safe seating area | A | No | Air Conditioner |
| 65 | RFS | Century Ovation | Baby Doll | Motions in entire seating area | H | No | Air Conditioner |
| 66 | ES | None | Beaded Cover | Motions of track and recline | (G) | N.A. | Air Conditioner |
| 67 | FFA | A32 | Light Clothes | Motions in safe seating area | F | Yes | Air Conditioner |
| 68 | OOP | Fisher Price CS | Child Doll | Motions in NFZ | E | No | Air Conditioner |
| 69 | FFC | Fisher Price CS | Child Doll, Blanket | Motions in safe seating area | D | No | Air Conditioner |
| 70 | RFS | Gerry Guard | Baby Doll | Motions in entire seating area | C | No | Air Conditioner |
| 71 | ES | None | Fabric Cover | Motions of track and recline | (B) | N.A. | Air Conditioner |
| 72 | FFA | A22 | Light Clothes, Newspaper | Motions in safe seating area | A | No | Air Conditioner |
| 73 | OOP | A22 | Light Clothes | Motions in NFZ | H | Yes | Air Conditioner |
| 74 | FFC | C32 | Light Clothes | Motions in safe seating area | G | No | Air Conditioner |
| 75 | RFS | Smartmove 5T | Baby Doll, Blanket | Motions in entire seating area | F | No | Air Conditioner |
| 76 | ES | None | Blanket | Motions of track and recline | (E) | N.A. | Air Conditioner |
| 77 | FFA | A11 | Medium Clothes | Motions in safe seating area | D | No | Air Conditioner |
| 78 | OOP | C22 | Medium Clothes | Motions in NFZ | C | No | Air Conditioner |
| 79 | FFC | C22 | Medium Clothes | Motions in safe seating area | B | No | Air Conditioner |
| 80 | RFS | Discovery | Baby Doll, Handle up | Motions in entire seating area | A | No | Air Conditioner |
| 81 | ES | None | Pizza Box | Motions of track and recline | (B) | N.A. | Ambient |
| 82 | FFA | A33 | Rain Clothes, Magazine | Motions in safe seating area | A | Yes | Ambient |
| 83 | OOP | A33 | Rain Clothes | Motions in NFZ | D | Yes | Ambient |
| 84 | FFC | Champion | Infant Doll | Motions in safe seating area | C | No | Ambient |

FIG. 82D

| | | | | | | | |
|---|---|---|---|---|---|---|---|
| 85 | RFS | Champion | Baby Doll | Motions in entire seating area | F | No | Ambient |
| 86 | ES | None | Beaded Cover, Pizza Box | Motions of track and recline | (E) | N.A. | Ambient |
| 87 | FFA | A21 | Rain Clothes | Motions in safe seating area | H | Yes | Ambient |
| 88 | OOP | Vario Exclusive | Child Doll, Blanket | Motions in NFZ | G | No | Ambient |
| 89 | FFC | Vario Exclusive | Child Doll, Blanket | Motions in safe seating area | B | No | Ambient |
| 90 | RFS | Joyride (new) | Baby Doll, Hood | Motions in entire seating area | A | No | Ambient |
| 91 | ES | None | Fabric Cover, Pizza Box | Motions of track and recline | (D) | N.A. | Ambient |
| 92 | FFA | A12 | Rain Clothes, Newspaper | Motions in safe seating area | C | No | Ambient |
| 93 | OOP | A12 | Rain Clothes | Motions in NFZ | F | No | Ambient |
| 94 | FFC | C23 | Rain Clothes | Motions in safe seating area | E | No | Ambient |
| 95 | RFS | Ultara | Baby Doll, Blanket | Motions in entire seating area | H | No | Ambient |
| 96 | ES | None | Blanket, Pizza Box | Motions of track and recline | (G) | N.A. | Ambient |
| 97 | FFA | A23 | Light Clothes | Motions in safe seating area | B | No | Ambient |
| 98 | OOP | C32 | Light Clothes | Motions in NFZ | A | No | Ambient |
| 99 | FFC | C32 | Light Clothes | Motions in safe seating area | D | No | Ambient |
| 100 | RFS | Arriva | Baby Doll, Hood | Motions in entire seating area | C | No | Ambient |
| 101 | ES | None | None | Motions of track and recline | (F) | N.A. | Car Heat |
| 102 | FFA | A32 | Light Clothes, Magazine | Motions in safe seating area | E | Yes | Car Heat |
| 103 | OOP | A32 | Light Clothes | Motions in NFZ | H | Yes | Car Heat |
| 104 | FFC | Century 1000 | Infant Doll | Motions in safe seating area | G | No | Car Heat |
| 105 | RFS | Century 1000 | Baby Doll | Motions in entire seating area | B | No | Car Heat |
| 106 | ES | None | Beaded Cover | Motions of track and recline | (A) | N.A. | Car Heat |

FIG. 82E

| | | | | | | | |
|---|---|---|---|---|---|---|---|
| 107 | FFA | A22 | Rain Clothes | Motions in safe seating area | D | Yes | Car Heat |
| 108 | OOP | Vario Exclusive | Inflant Doll | Motions in NFZ | C | No | Car Heat |
| 109 | FFC | Touriva | Inflant Doll, Blanket | Motions in safe seating area | F | No | Car Heat |
| 110 | RFS | Century 590 | Baby Doll | Motions in entire seating area | E | No | Car Heat |
| 111 | ES | None | Fabric Cover | Motions of track and recline | (H) | N.A. | Car Heat |
| 112 | FFA | A11 | Light Clothes, Newspaper | Motions in safe seating area | G | No | Car Heat |
| 113 | OOP | A11 | Light Clothes | Motions in NFZ | B | No | Car Heat |
| 114 | FFC | C32 | Light Clothes | Motions in safe seating area | A | No | Car Heat |
| 115 | RFS | Touriva | Baby Doll, Blanket | Motions in entire seating area | D | No | Car Heat |
| 116 | ES | None | Blanket | Motions of track and recline | (C) | N.A. | Car Heat |
| 117 | FFA | A33 | Heavy Clothes | Motions in safe seating area | F | No | Car Heat |
| 118 | OOP | C22 | Heaby Clothes | Motions in NFZ | E | No | Car Heat |
| 119 | FFC | C22 | Heavy Clothes | Motions in safe seating area | H | No | Car Heat |
| 120 | RFS | TLC | Baby Doll | Motions in entire seating area | G | No | Car Heat |
| 121 | ES | None | Attaché Case (flat) | Motions of track and recline | (G) | N.A. | Ambient |
| 122 | FFA | A21 | Heavy Clothes, Magazine | Motions in safe seating area | H | Yes | Ambient |
| 123 | OOP | A21 | Heavy Clothes | Motions in NFZ | E | Yes | Ambient |
| 124 | FFC | Century Ovation | Infant Doll | Motions in safe seating area | F | No | Ambient |
| 125 | RFS | Century Ovation | Baby Doll | Motions in entire seating area | C | No | Ambient |
| 126 | ES | None | Beaded Cover, Attaché Case | Motions of track and recline | (D) | N.A. | Ambient |
| 127 | FFA | A12 | Rain Clothes | Motions in safe seating area | A | Yes | Ambient |
| 128 | OOP | Fisher Price CS | Inflant Doll, Blanket | Motions in NFZ | B | No | Ambient |

FIG. 82F

| | | | | | | | |
|---|---|---|---|---|---|---|---|
| 129 | FFC | Fisher Price CS | Inflant Doll | Motions in safe seating area | G | No | Ambient |
| 130 | RFS | Gerry Guard | Baby Doll, Handle up | Motions in entire seating area | H | No | Ambient |
| 131 | ES | None | Fabric Cover, Attaché Case | Motions of track and recline | (E) | N.A. | Ambient |
| 132 | FFA | A23 | Heavy Clothes, Newspaper | Motions in safe seating area | F | No | Ambient |
| 133 | OOP | A23 | Heavy Clothes | Motions in NFZ | C | No | Ambient |
| 134 | FFC | C11 | Heavy Clothes | Motions in safe seating area | D | No | Ambient |
| 135 | RFS | Smartmove 5T | Baby Doll, Blanket | Motions in entire seating area | A | No | Ambient |
| 136 | ES | None | Blanket, Attaché Case | Motions of track and recline | (B) | N.A. | Ambient |
| 137 | FFA | A32 | Rain Clothes | Motions in safe seating area | G | No | Ambient |
| 138 | OOP | C33 | Rain Clothes | Motions in NFZ | H | No | Ambient |
| 139 | FFC | C33 | Rain Clothes | Motions in safe seating area | E | No | Ambient |
| 140 | RFS | Discovery | Baby Doll, Handle up | Motions in entire seating area | F | No | Ambient |
| 141 | ES | None | Hand Bag | Motions of track and recline | (C) | N.A. | Solar Heat |
| 142 | FFA | A22 | Medium Clothes, Magazine | Motions in safe seating area | D | Yes | Solar Heat |
| 143 | OOP | A22 | Heavy Clothes | Motions in NFZ | A | Yes | Solar Heat |
| 144 | FFC | Gerry Booster | Child Doll | Motions in safe seating area | B | No | Solar Heat |
| 145 | RFS | Fisher Price CS | Baby Doll | Motions in entire seating area | G | No | Solar Heat |
| 146 | ES | None | Beaded Cover, Hand Bag | Motions of track and recline | (H) | N.A. | Solar Heat |

FIG. 82G

| | | | | | | | |
|---|---|---|---|---|---|---|---|
| 147 | FFA | A11 | Medium Clothes | Motions in safe seating area | E | Yes | Solar Heat |
| 148 | OOP | Vario Exclusive | Inflant Doll | Motions in NFZ | F | No | Solar Heat |
| 149 | FFC | Ultara | Inflant Doll, Blanket | Motions in safe seating area | C | No | Solar Heat |
| 150 | RFS | Baby Safe | Baby Doll | Motions in entire seating area | D | No | Solar Heat |
| 151 | ES | None | Fabric Cover, Hand Bag | Motions of track and recline | (A) | N.A. | Solar Heat |
| 152 | FFA | A33 | Medium Clothes, Newspaper | Motions in safe seating area | B | No | Solar Heat |
| 153 | OOP | A33 | Medium Clothes | Motions in NFZ | G | No | Solar Heat |
| 154 | FFC | C33 | Medium Clothes | Motions in safe seating area | H | No | Solar Heat |
| 155 | RFS | Vario Exclusive | Baby Doll, Blanket | Motions in entire seating area | E | No | Solar Heat |
| 156 | ES | None | Blanket, Hand Bag | Motions of track and recline | (F) | N.A. | Solar Heat |
| 157 | FFA | A21 | Light Clothes | Motions in safe seating area | C | No | Solar Heat |
| 158 | OOP | C21 | Light Clothes | Motions in NFZ | D | No | Solar Heat |
| 159 | FFC | C21 | Light Clothes | Motions in safe seating area | A | No | Solar Heat |
| 160 | RFS | Rock'n'Ride | Baby Doll | Motions in entire seating area | B | No | Solar Heat |

FIG. 82H

Network Independent Test Set Collection Matrix (Vehicle E)
Rev 1.1 ( Under Construction )

| # | Class | Subject/ Object | Attributes | Actions | Config. | Belt | Conditions |
|---|---|---|---|---|---|---|---|
| 1 | ES | | | Motions of track and recline | (A) | N.A. | Ambient |
| 2 | FFA | | | Motions in safe seating area | B | Yes | Ambient |
| 3 | OOP | | | Motions in NFZ | C | No | Ambient |
| 4 | FFC | | | Motions in safe seating area | D | No | Ambient |
| 5 | RFS | | | Motions in entire seating area | E | No | Ambient |
| 6 | ES | | | Motions of track and recline | (F) | N.A. | Ambient |
| 7 | FFA | | | Motions in safe seating area | G | Yes | Ambient |
| 8 | OOP | | | Motions in NFZ | H | No | Ambient |
| 9 | FFC | | | Motions in safe seating area | A | No | Ambient |
| 10 | RFS | | | Motions in entire seating area | B | No | Ambient |
| 11 | ES | | | Motions of track and recline | (C) | N.A. | Ambient |
| 12 | FFA | | | Motions in safe seating area | D | No | Ambient |
| 13 | OOP | | | Motions in NFZ | E | Yes | Ambient |
| 14 | FFC | | | Motions in safe seating area | F | No | Ambient |
| 15 | RFS | | | Motions in entire seating area | G | No | Ambient |
| 16 | ES | | | Motions of track and recline | (H) | N.A. | Ambient |
| 17 | FFA | | | Motions in safe seating area | A | No | Ambient |
| 18 | OOP | | | Motions in NFZ (standing) | B | No | Ambient |
| 19 | FFC | | | Motions in safe seating area | C | No | Ambient |
| 20 | RFS | | | Motions in entire seating area | D | No | Ambient |

FIG. 83

CHARACTERISTICS OF THE DATA SETS

| DATA SET | CONFIGURATIONS | SETUPS | VECTORS |
|---|---|---|---|
| TRAINING | 130 | 1300 | 650,000 |
| INDEPENDENT TEST | 130 | 1300 | 195,000 |
| VALIDATION | 100 | 100 | 15,000 |

FIG. 84

DISTRIBUTION OF MAIN TRAINING SUBJECTS

| OCCUPANCY | REPRESENTATION |
|---|---|
| EMPTY SEAT | 10 % |
| HUMAN OCCUPANT | 32 % |
| CHILD SEAT | 58 % |

FIG. 85

CHILD SEAT DISTRIBUTION

| CHILD SEAT CONFIGURATION | REPRESENTATION |
|---|---|
| FORWARD FACING CHILD SEAT | 40 % |
| FORWARD FACING CHILD SEAT OUT - OF-POSITION | 4 % |
| REARWARD FACING CHILD SEAT | 27 % |
| REARWARD FACING INFANT SEAT | 29 % |

FIG. 86

DISTRIBUTION OF ENVIRONMENTAL CONDITIONS

| ENVIRONMENTAL CONDITION | REPRESENTATION |
|---|---|
| AMBIENT | 56 % |
| STATIC HEAT (SOLAR LAMP) | 25 % |
| DYNAMIC HEAT (CAR HEAT) | 13 % |
| DYNAMIC COOLING (CAR A C) | 6 % |

FIG. 87

VALIDATION DATA DISTRIBUTION

| OCCUPANCY | REPRESENTATION |
|---|---|
| EMPTY SEAT | 8 % |
| HUMAN OCCUPANT | 39 % |
| CHILD SEAT | 53 % |

FIG. 88

HUMAN SUBJECT DISTRIBUTION

| HUMAN OCCUPANT | REPRESENTATION | NORMALLY SEATED | OUT-OF-POSITION |
|---|---|---|---|
| CHILD AGE 3 | 15 % | 50 % | 50 % |
| CHILD AGE 6 | 15 % | 50 % | 50 % |
| ADULT 5TH PERCENTILE FEMALE | 23 % | 67 % | 33 % |
| ADULT 50TH PERCENTILE MALE | 23 % | 67 % | 33 % |
| ADULT 95TH PERCENTILE MALE | 23 % | 67 % | 33 % |

FIG. 89

CHILD SEAT DISTRIBUTION

| CHILD SEAT CONFIGURATION | REPRESENTATION |
|---|---|
| FORWARD FACING CHILD SEAT | 11 % |
| FORWARD FACING BOOSTER SEAT | 11 % |
| REARWARD FACING CHILD SEAT | 38 % |
| REARWARD FACING INFANT SEAT | 40 % |

FIG. 90

DISTRIBUTION OF ENVIRONMENTAL CONDITIONS

| ENVIRONMENTAL CONDITION | REPRESENTATION |
|---|---|
| AMBIENT | 63 % |
| STATIC HEAT (SOLAR LAMP) | 13 % |
| DYNAMIC HEAT (CAR HEAT) | 12 % |
| DYNAMIC COOLING (CAR AIR CONDITIONER) | 12 % |

FIG. 91

TRANSDUCER VOLUME

| TRANS-DUCER | STARTING POINT | | | END POINT | | |
|---|---|---|---|---|---|---|
| | SAMPLE | TIME (MS) | DISTANCE (MM) | SAMPLE | TIME (MS) | DISTANCE (MM) |
| A | 5 | 0.83 | 142 | 29 | 4.84 | 822 |
| B | 3 | 0.50 | 85 | 35 | 5.84 | 992 |
| C | 7 | 1.17 | 198 | 34 | 5.67 | 964 |
| H | 2 | 0.33 | 57 | 32 | 5.34 | 907 |

FIG. 92

BASELINE NETWORK PERFORMANCE

| | |
|---|---|
| SELF TEST SUCCESS RATE | 95.3 % |
| INDEPENDENT TEST SUCCESS RATE | 94.5 % |
| VALIDATION TEST SUCCESS RATE | 92.7 % |

FIG. 93

PERFORMANCE PER OCCUPANCY SUBSET

| OCCUPANCY | INDEPENDENT TEST |
|---|---|
| EMPTY SEAT | 96.1 % |
| NORMALLY SEATED ADULT | 92.1 % |
| REARWARD FACING CHILD/INFANT SEAT | 94.1 % |
| FORWARD FACING CHILD SEAT | 96.9 % |
| OUT-OF-POSITION HUMAN/FFCS | 93.0 % |

FIG. 94

PERFORMANCE PER ENVIRONMENTAL CONDITIONS SUBSET

| ENVIRONMENTAL CONDITION | INDEPENDENT TEST |
|---|---|
| AMBIENT | 95.4 % |
| LONG TERM HEAT (LAMP HEAT) | 95.2 % |
| SORT TERM HEATING/COOLING (HVAC) | 93.5 % |

FIG. 95

NORMALIZATION STUDY RESULTS

| NORMALIZATION METHOD | SELF TEST | INDEPENDENT TEST | VALIDATION TEST |
|---|---|---|---|
| A. WHOLE VECTOR (BASE) | 95.3 % | 94.5 % | 92.7 % |
| B. PER CHANNEL | 94.9 % | 93.8 % | 90.3 % |
| C. FIXED RANGE [0,4095] | 95.6 % | 90.3 % | 88.3 % |

FIG. 97

LOW THRESHOLD FILTER STUDY RESULTS

| THRESHOLD LEVEL | SELF TEST | INDEPENDENT TEST | VALIDATION TEST |
|---|---|---|---|
| NONE (BASE) | 95.3 % | 94.5 % | 92.7 % |
| 5% OF 4095 | 95.3 % | 94.4 % | 91.9 % |
| 10% OF 4095 | 95.3 % | 94.3 % | 92.5 % |
| 20% OF 4095 | 95.1 % | 94.2 % | 86.4 % |

FIG. 98

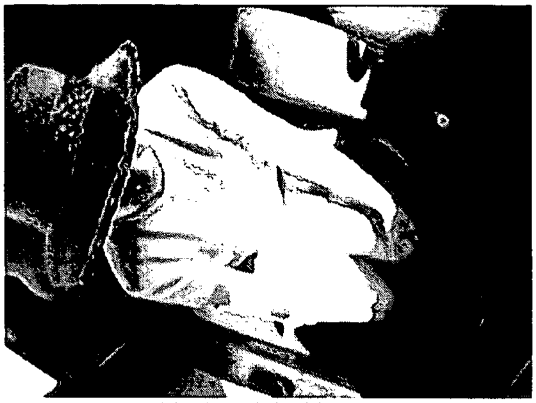
(1) The original image.
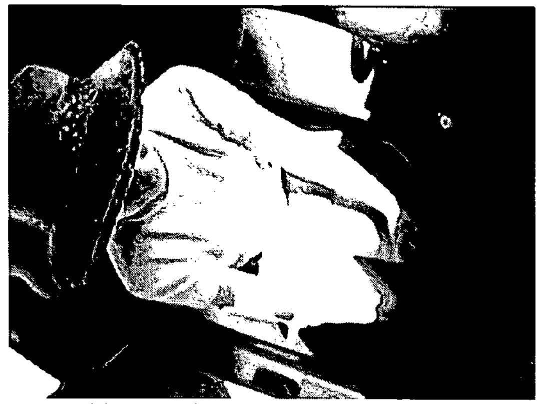
(2) Result from contrast enhancement.
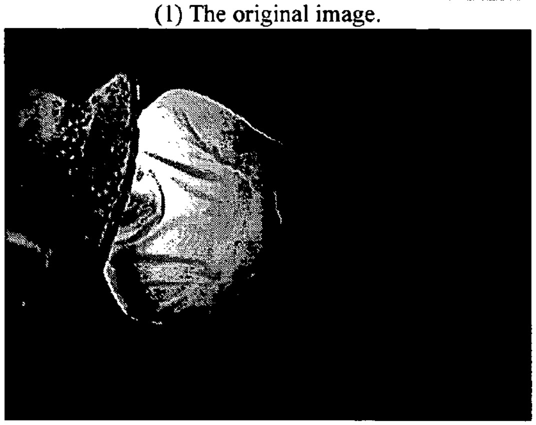
(3) Result from pixel transfer filter.
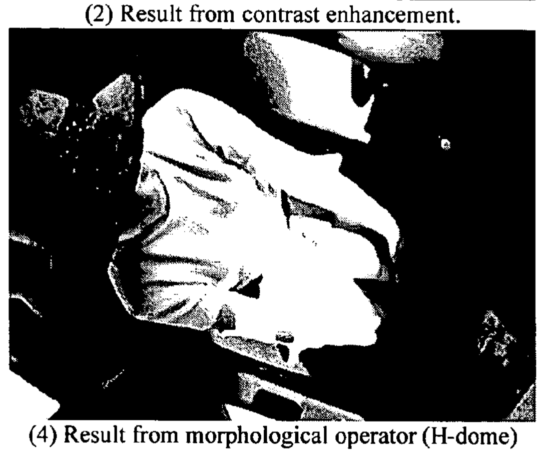
(4) Result from morphological operator (H-dome) followed by contrast enhancement.
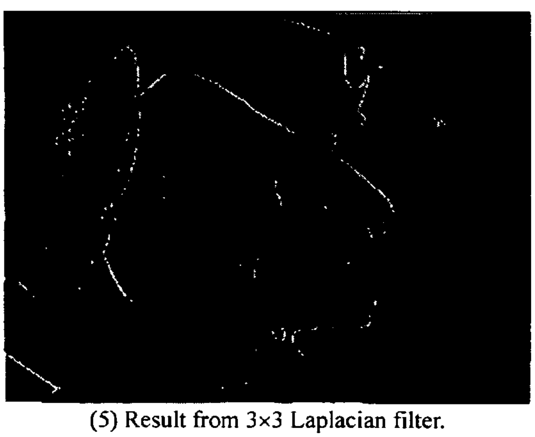
(5) Result from 3×3 Laplacian filter.
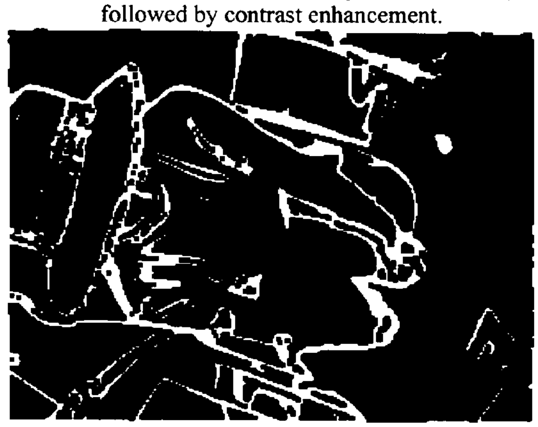
(6) Result from 3×3 Gaussian filter followed by max Kirsch filter, binarization, and morphological erosion.
FIG. 99

(1) 0°-edges.
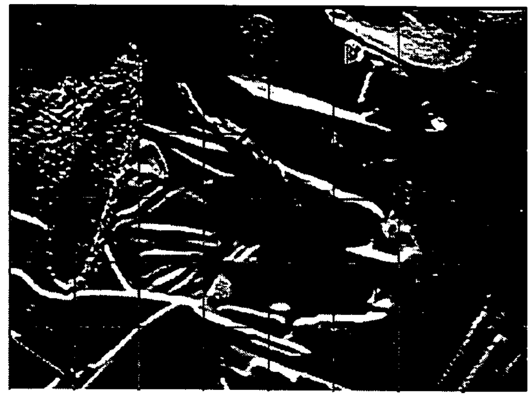
(2) 180°-edges.
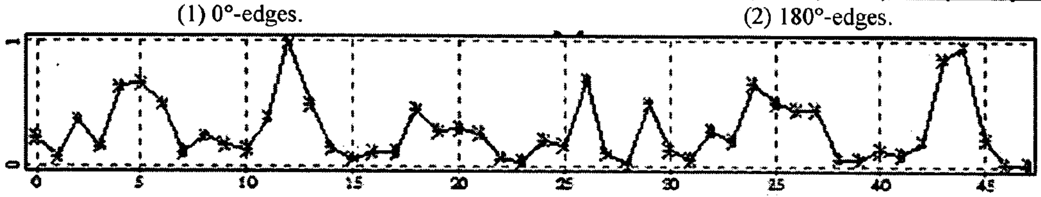
(3) Normalized distribution of horizontal edges in blocks (from top-left to bottom-right).
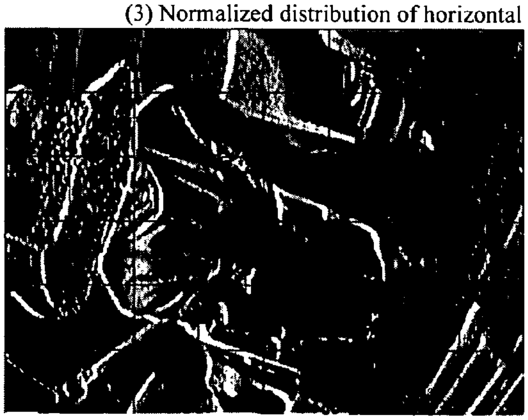
(4) 90°-edges.
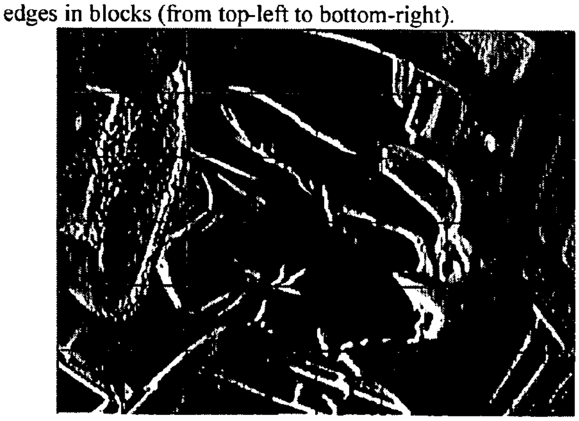
(5) 270°-edges.
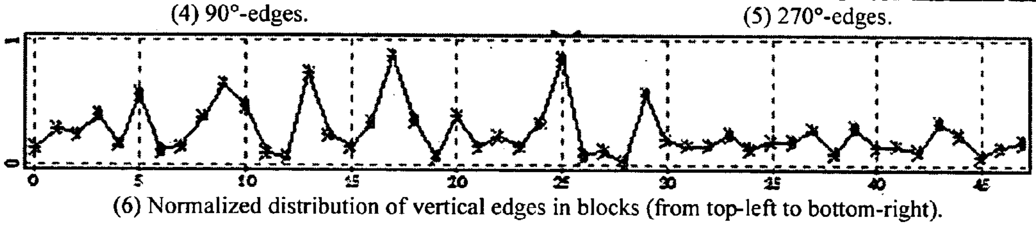
(6) Normalized distribution of vertical edges in blocks (from top-left to bottom-right).
FIG. 101

(1) 45°-edges.
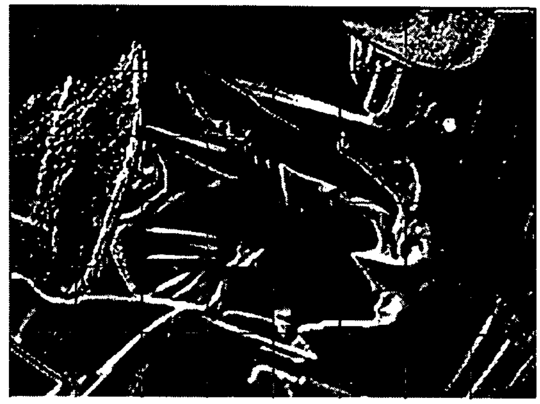
(2) 225°-edges.
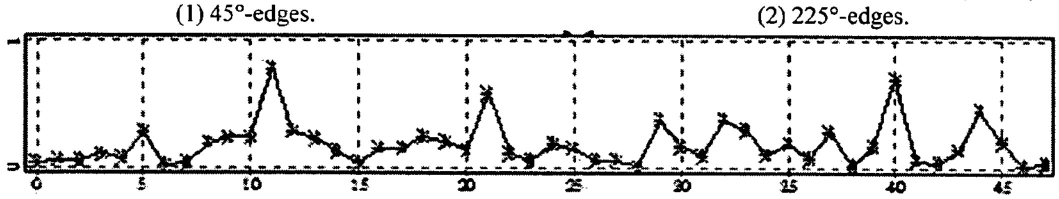
(3) Normalized distribution of 45°/225°-edges in blocks (from top-left to bottom-right).
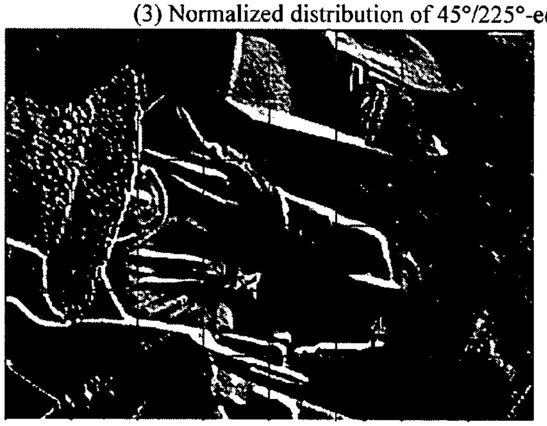
(4) 135°-edges.
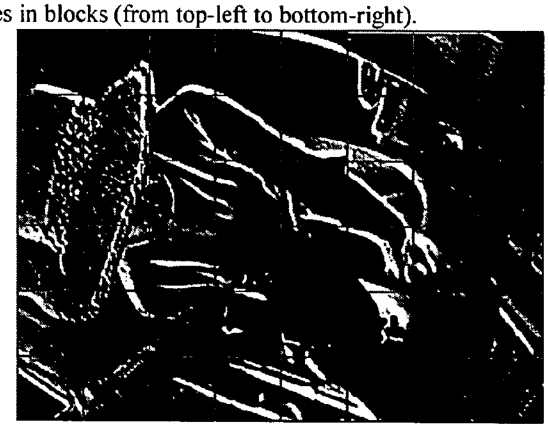
(5) 315°-edges.
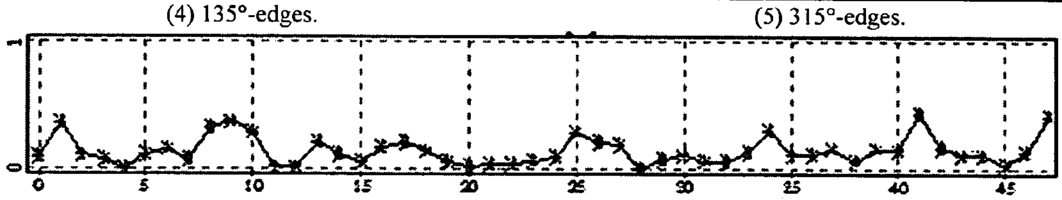
(6) Normalized distribution of 135°/315°-edges in blocks (from top-left to bottom-right).
FIG. 102

(1) Intensities.
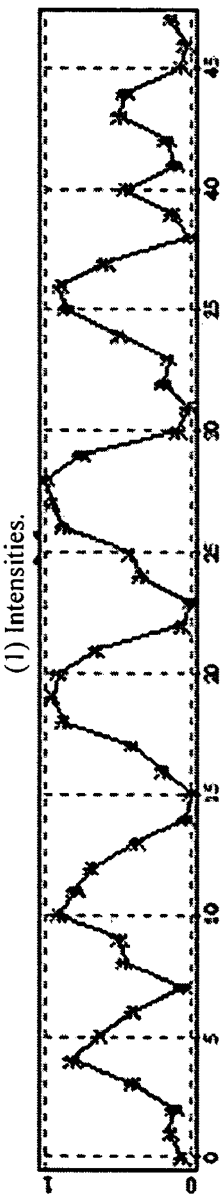
(2) Normalized distribution of intensities in blocks (from top-left to bottom-right).
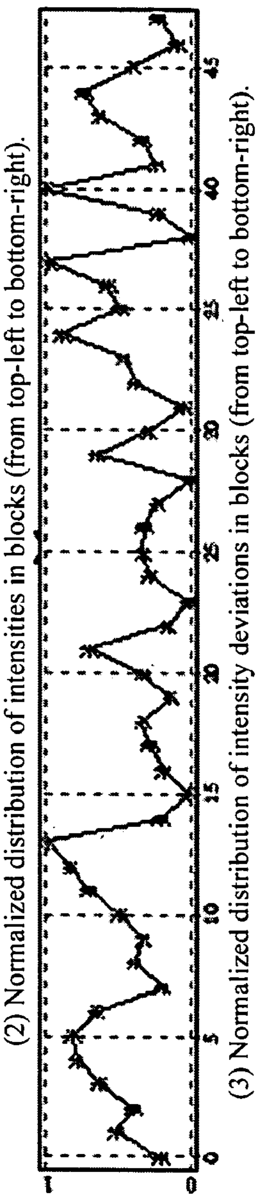
(3) Normalized distribution of intensity deviations in blocks (from top-left to bottom-right).
FIG. 103

| Vehicle Configuration | Occupant | Child Restraint | Lighting Condition |
|---|---|---|---|
| ▪Seat track position<br>▪Seatback recline position<br>▪Other interior fixture configurations (such console, glove box, seatbelt, etc.) | ▪Height<br>▪Weight<br>▪Clothing<br>▪Hair and facial hair<br>▪Skin tone<br>▪Seating position<br>▪Personal objects | ▪NHTSA FMVSS208 approved 11 rear-facing child restraints, 7 forward-facing child restraints, and 4 booster seats. | ▪Nighttime condition<br>▪Sunlight at different time of the day and/or different vehicle orientation<br>▪Dome light<br>▪Door light<br>▪Headlight from other vehicle |

*FIG. 104*

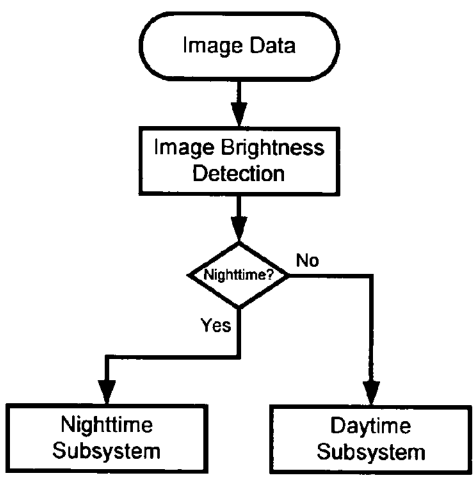

*FIG. 105*

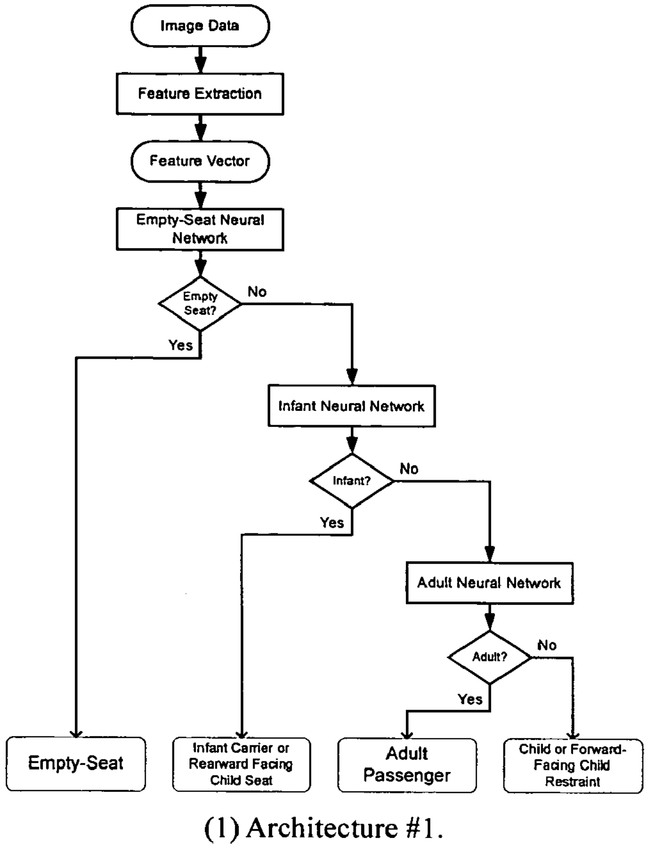
(1) Architecture #1.
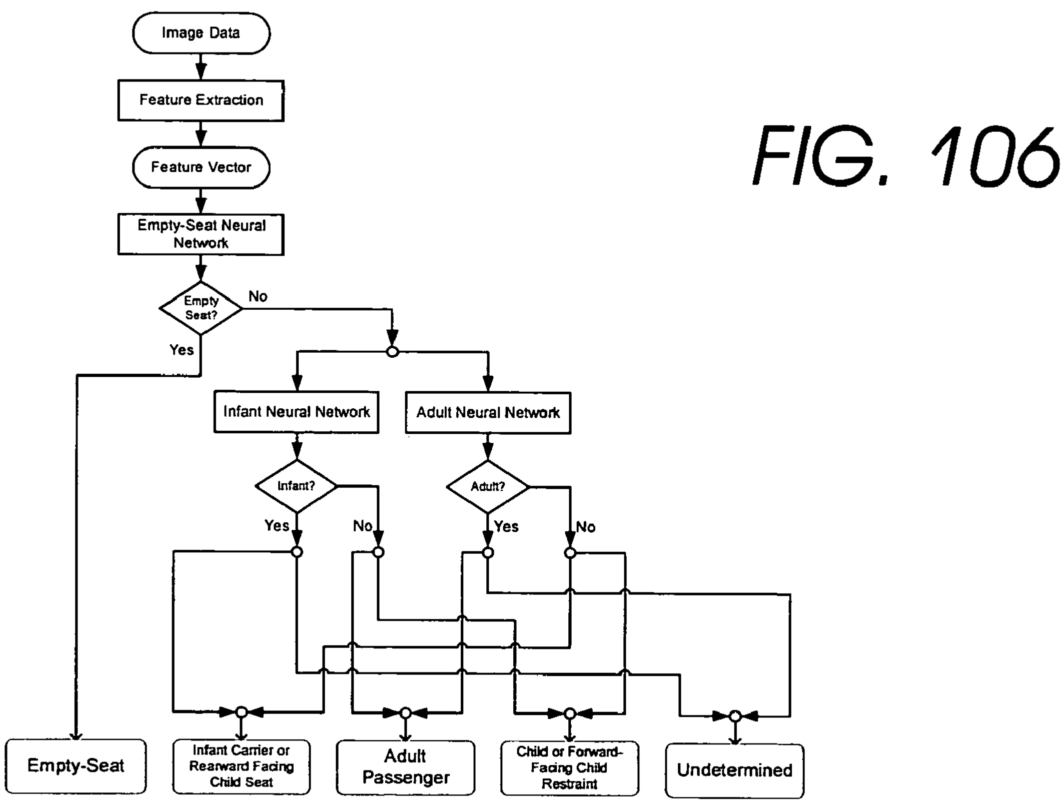
(2) Architecture #2.
FIG. 106

- Generic digital filter
- Kalman filter
- Median filter
- ATI's post-decision filter

| | |
|---|---|
| **Empty-Seat State** | The system starts from Empty-Seat State, and returns to Empty-Seat State every time when the incoming classification becomes empty-seat. |
| **Transition State** | The system is allowed to change classification freely in Transition State. |
| **Revoking State** | Classification change is more restricted in Revoking State. The system is allowed to change classification only if the new classification lasts longer than the old one. |
| **Classified State** | In classified State, classification change is either prohibited, or allowed only after the new classification has lasted for a very very long time. |

FIG. 110

| | |
|---|---|
| **Path #1** | The system moves from Empty-Seat State to Transition State if the incoming classification is not empty-seat. The system moves from Transition State to Empty-Seat State if the incoming classification becomes empty-seat. |
| **Path #2** | The system moves from Transition State to Revoking State if the incoming classification lasts more than certain amount of time ($T_1$) without toggling. |
| **Path #3** | The system moves from Revoking State to Empty-Seat State if the incoming classification becomes empty-seat. |
| **Path #4** | The system moves from Revoking State to Classified State if the incoming classification lasts more than certain amount of time ($T_2$) without toggling. Usually $T_2 >> T_1$. |
| **Path #5** | The system moves from Classified State to Empty-Seat State if the incoming classification becomes empty-seat. |

FIG. 111

| Adult | Child and Forward-Facing Child Restraint | Infant Carrier and Rearward-Facing Child Seat | Empty Seat |
|---|---|---|---|
| 37.24% | 21.60% | 35.43% | 5.73% |

FIG. 112

| | | Empty-Seat Network | Infant Network | Adult Network |
|---|---|---|---|---|
| Network Name | | R174ES05 | R174RS01 | R174AD02 |
| Network Structure | | 300x3x1 | 300x10x7x1 | 300x15x10x1 |
| Success Rate | Adult | 99.97% | 98.85% | 97.80% |
| | Child & FFCS | 98.50% | 99.47% | 98.57% |
| | Infant Carrier & RFCS | 100% | 99.43% | 98.93% |
| | Empty Seat | 99.98% | 100% † | 99.60% |

FIG. 113

| | | Classified As | | | | |
|---|---|---|---|---|---|---|
| | | Adult | Child & FFCS | Infant Carrier & RFCS | Empty Seat | Undetermined |
| Target Class | Adult | **96.97%** | 1.86% | 0.33% | 0.03% | 0.81% |
| | Child & FFCS | 1.43% | **96.55%** | 0.52% | 1.50% | 0% |
| | Infant Carrier & RFCS | 0.17% | 0.40% | **98.53%** | 0% | 0.90% |
| | Empty Seat | 0.02% | 0% | 0% | **99.98%** | 0% |

FIG. 114

| Adult | Child and Forward-Facing Child Restraint | Infant Carrier and Rearward-Facing Child Seat | Empty Seat |
|---|---|---|---|
| 33.33% | 13.33% | 33.33% | 20.00% |

FIG. 115

| | | Empty-Seat Network | Adult Network |
|---|---|---|---|
| Network Name | | R172ES01 | R172CS03 |
| Network Structure | | 340×7×5×1 | 340×20×15×1 |
| Success Rate | Empty Seat | 99.32% | — |
| | Adult | 99.09% | 98.20% |
| | Child & Child Restraint | 99.44% | 99.27% |

FIG. 116

| | | Classified As | | |
|---|---|---|---|---|
| | | Empty Seat | Adult | Child & Child Restraint |
| Target Class | Empty Seat | **99.32%** | 0.67% | 0.01% |
| | Adult | 0.91% | **97.74%** | 1.35% |
| | Child & Child Restraint | 0.56% | 0.69% | **98.75%** |

FIG. 117

WEIGHT MEASURING SYSTEMS AND METHODS FOR VEHICLES

CROSS REFERENCE TO RELATED APPLICATIONS

This application is:

1. a continuation-in-part of U.S. patent application Ser. No. 09/437,535 filed Nov. 10, 1999 now U.S. Pat. No. 6,712,387 which is a continuation-in-part of U.S. patent application Ser. No. 09/047,703 filed Mar. 25, 1998, now U.S. Pat. No. 6,039,139, which is:
   A) a continuation-in-part of U.S. patent application Ser. No. 08/640,068 filed Apr. 30, 1996, now U.S. Pat. No. 5,829,782, which is a continuation application of U.S. patent application Ser. No. 08/239,978 filed May 9, 1994, now abandoned, which is a continuation of U.S. patent application Ser. No. 08/040,978 filed Mar. 31, 1993, now abandoned, which is a continuation-in-part of U.S. patent application Ser. No. 07/878,571 filed May 5, 1992, now abandoned; and
   B) a continuation-in-part of U.S. patent application Ser. No. 08/905,876 filed Aug. 4, 1997, now U.S. Pat. No. 5,848,802, which is a continuation of U.S. patent application Ser. No. 08/505,036 filed Jul. 21, 1995, now U.S. Pat. No. 5,653,462, which is a continuation of U.S. patent application Ser. No. 08/040,978 filed Mar. 31, 1993, now abandoned, which is a continuation-in-part of U.S. patent application Ser. No. 07/878,571 filed May 5, 1992, now abandoned; and
2. a continuation-in-part of U.S. patent application Ser. No. 10/116,808 filed Apr. 5, 2002 now U.S. Pat. No. 6,856,873 which is:
   A) a continuation-in-part of U.S. patent application Ser. No. 09/925,043 filed Aug. 8, 2001, now U.S. Pat. No. 6,507,779, which is a continuation-in-part of U.S. patent application Ser. No. 09/765,559 filed Jan. 19, 2001, now U.S. Pat. No. 6,553,296, which is:
      1) a continuation-in-part of U.S. patent application Ser. No. 09/476,255 filed Dec. 30, 1999, now U.S. Pat. No. 6,324,453, which claims priority under 35 U.S.C. §119(e) of U.S. provisional patent application Ser. No. 60/114,507 filed Dec. 31, 1998, and
      2) a continuation-in-part of U.S. patent application Ser. No. 09/389,947 filed Sep. 3, 1999, now U.S. Pat. No. 6,393,133, which is a continuation-in-part of U.S. patent application Ser. No. 09/200,614, filed Nov. 30, 1998, now U.S. Pat. No. 6,141,432, which is a continuation of U.S. patent application Ser. No. 08/474,786 filed Jun. 7, 1995, now U.S. Pat No. 5,845,000; and
   B) a continuation-in-part of U.S. patent application Ser. No. 09/838,919 filed Apr. 20, 2001, now U.S. Pat. No. 6,442,465, which is a continuation-in-part of U.S. patent application Ser. No. 09/765,559 filed Jan. 19, 2001, now U.S. Pat. No. 6,553,296, which is:
      1) a continuation-in-part of U.S. patent application Ser. No. 09/476,255 filed Dec. 30, 1999, now U.S. Pat. No. 6,324,453, which claims priority under 35 U.S.C. §119(e) of U.S. provisional patent application Ser. No. 60/114,507 filed Dec. 31, 1998, and
      2) a continuation-in-part of U.S. patent application Ser. No. 09/389,947 filed Sep. 3, 1999, now U.S. Pat. No. 6,393,133, which is a continuation-in-part of U.S. patent application Ser. No. 09/200,614, filed Nov. 30, 1998, now U.S. Pat. No. 6,141,432, which is a continuation of U.S. patent application Ser. No. 08/474,786 filed Jun. 7, 1995, now U.S. Pat. No. 5,845,000; and
3. a continuation-in-part of U.S. patent application Ser. No. 09/838,920 filed Apr. 20, 2001, now U.S. Pat. No. 6,778,672 which is a continuation-in-part of U.S. patent application Ser. No. 09/563,556 filed May 3, 2000, now U.S. Pat. No. 6,474,683, which is a continuation-in-part of U.S. patent application Ser. No. 09/437,535 filed Nov. 10, 1999 now U.S. Pat. No. 6,712,387 (the history of which is set forth above); and
4. a continuation-in-part of U.S. patent application Ser. No. 09/849,559 filed May 4, 2001, now U.S. Pat. No. 6,689,962, which is a continuation-in-part of U.S. patent application Ser. No. 09/193,209 filed Nov. 17, 1998, now U.S. Pat. No, 6,242,701, which is a continuation-in-part of U.S. patent application Ser. No. 09/128,490 filed Aug. 4, 1998, now U.S. Pat. No. 6,078,854, which is:
   A) a continuation-in-part of U.S. patent application Ser. No. 08/474,783 filed Jun. 7, 1995, now U.S. Pat. No. 5,822,707; and
   B) a continuation-in-part of U.S. patent application Ser. No. 08/970,822 filed Nov. 14, 1997, now U.S. Pat. No. 6,081,757; and
5. a continuation-in-part of U.S. patent application Ser. No. 10/058,706 filed Jan. 28, 2002 which is:
   A) a continuation-in-part of U.S. patent application Ser. No. 09/891,432, filed Jun. 26, 2001, now U.S. Pat. No. 6,513,833, which is a continuation-in-part of U.S. patent application Ser. No. 09/838,920 filed Apr. 20,2001 now U.S. Pat. No. 6,778,672 (the history of which is set forth above);
   B) a continuation-in-part of U.S. patent application Ser. No. 09/543,678 filed Apr. 7, 2000 now U.S. Pat. No. 6,412,813 which is a continuation-in-part of U.S. patent application Ser. No. 09/047,704 filed Mar. 25, 1998, now U.S. Pat No. 6,116,638 which is:
      1) a continuation-in-part of U.S. patent application Ser. No. 08/640,068 filed Apr. 30, 1996, now U.S. Pat. No. 5,829,782, which is a continuation application of U.S. patent application Ser. No. 08/239,978 filed May 9, 1994, now abandoned, which is a continuation of U.S. patent application Ser. No. 08/040,978 filed Mar. 31, 1993, now abandoned, which is a continuation-in-part of U.S. patent application Ser. No. 07/878,571 filed May 5, 1992, now abandoned; and
      2) a continuation-in-part of U.S. patent application Ser. No. 08/905,876 filed Aug. 4, 1997, now U.S. Pat No. 5,848,802, which is a continuation of U.S. patent application Ser. No. 08/505,036 filed Jul. 21, 1995, now U.S. Pat. No. 5,653,462, which is a continuation of U.S. patent application Ser. No. 08/040,978 filed Mar. 31, 1993, now abandoned, which is a continuation-in-part of U.S. patent application Ser. No. 07/878,571 filed May 5,1992, now abandoned; and
   C) a continuation-in-part of U.S. patent application Ser. No. 09/639,299 filed Aug. 15, 2000, now U.S. Pat. No. 6,422,595, which is:
      1) a continuation-in-part of U.S. patent application Ser. No. 09/409,625 filed Oct. 1, 1999 now U.S. Pat. No. 6,270,116 which is a continuation-in-part of U.S. patent application Ser. No. 08/905,877 filed Aug. 4, 1997, now U.S. Pat. No. 6,186,537, which is a continuation of U.S. patent application Ser. No. 08/505,036 filed Jul. 21, 1995, now U.S. Pat, No. 5,653,462, which is a continuation of U.S. patent application Ser. No. 08/040,978 filed Mar. 31, 1993, now abandoned, which is a continuation-in-part of U.S. patent application Ser. No. 07/878,571 filed May 5, 1992, now abandoned;

2) a continuation-in-part of U.S. patent application Ser. No. 09/448,337 filed Nov. 23, 1999 now U.S. Pat, No. 6,283,503 which is a continuation-in-part of U.S. patent application Ser. No. 08/905,877 filed Aug. 4, 1997, now U.S. Pat. No. 6,186,537 (the history of which is set forth above);

3) a continuation-in-part of U.S. patent application Ser. No. 09/448,338 filed Nov. 23, 1999 now U.S. Pat, No. 6,168,198 which is a continuation-in-part of U.S. patent application Ser. No. 08/905,877 filed Aug. 4, 1997, now U.S. Pat. No. 6,186,537 (the history of which is set forth above); and 4) a continuation-in-part of U.S. patent application Ser. No. 08/905,877 filed Aug. 4, 1997, now U.S. Pat. No. 6,186,537 (the history of which is set forth above); and 6. a continuation-in-part of U.S. patent application Ser. No. 10/061,016 filed Jan. 30, 2002 now U.S. Pat, No. 6,833,516 which is a continuation-in-part of U.S. patent application Ser. No. 09/901,879 filed Jul. 9, 2001, now U.S. Pat. No. 6,555,766, which is a continuation-in-part of U.S. patent application Ser. No. 09/849,559 filed May 4, 2001, now U.S. Pat. No. 6,689,962 (the history of which is set forth above); and 7. a continuation-in-part of U.S. patent application Ser. No. 10/114,533 filed Apr. 2, 2002 now U.S. Pat, No. 6,942,248 which is a continuation-in-part of U.S. patent application Ser. No. 10/058,706 filed Jan. 28, 2002 (the history of which is set forth above);

8. a continuation-in-part of U.S. patent application Ser. No. 10/151,615 filed May 20, 2002 now U.S. Pat. No. 6,820,897 which is:

A) a continuation-in-part of U.S. patent application Ser. No. 09/891,432, filed Jun. 26, 2001, now U.S. Pat. No. 6,513,833 (the history of which is set forth above);

B) a continuation-in-part of U.S. patent application Ser. No. 09/543,678 filed Apr. 7, 2000 now U.S. Pat. No. 6,412,813 (the history of which is set forth above); and C) a continuation-in-part of U.S. patent application Ser. No. 09/639,299 filed Aug. 15, 2000, now U.S. Pat. No. 6,422,595 (the history of which is set forth above); and 9. a continuation-in-part of U.S. patent application Ser. No. 10/227,781 filed Aug. 26, 2002 now U.S. Pat. No. 6,792,342 which is:

A) a continuation-in-part of U.S. patent application Ser. No. 10/061,016 filed Jan. 30, 2002 now U.S. Pat. No. 6,833,516 (the history of which is set forth above); and B) a continuation-in-part of U.S. patent application Ser. No. 09/500,346 filed Feb. 8, 2000, now U.S. Pat. No. 6,442,504, which is a continuation-in-part of U.S. patent application Ser. No. 09/128,490 tiled Aug. 4, 1998, now U.S. Pat No. 6,078,854, which is:

1) a continuation-in-part of U.S. patent application Ser. No. 08/474,783 filed Jun. 7, 1995, now U.S. Pat No. 5,822,707; and 2) a continuation-in-part of U.S. patent application Ser. No. 08/970,822 filed Nov. 14, 1997, now U.S. Pat. No. 6,081,757; and 10. a continuation-in-part of U.S. patent application Ser. No. 10/234,436 filed Sep. 3, 2002, now U.S. Pat. No. 6,757,602 which is a continuation-in-part of U.S. patent application Ser. No. 09/853,118 filed May 10, 2001, flow U.S. Pat. No. 6,445,988, which is a continuation-in-part of U.S. patent application Ser. No. 09/474,147 filed Dec. 29, 1999, now U.S. Pat. No. 6,397,136 which is a continuation-in-part of U.S. patent application Ser. No. 09/382,406 filed Aug. 24, 1999, now U.S. Pat. No. 6,529,809, which claims priority under 35 U.S.C. §119(e) of U.S. provisional patent application Ser. No. 60/136,163 filed May 27, 1999 and is a continuation-in-part of U.S. patent application Ser. No. 08/919,823, now U.S. Pat. No. 5,943,295, which is a continuation-in-part of U.S. patent application Ser. No. 08/798,029 filed Feb. 6, 1997, now abandoned;

11. a continuation-in-part of U.S. patent application Ser. No. 10/302,105 filed Nov. 22, 2002 now U.S. Pat. No. 6,772,057 which is a continuation-in-part of U.S. patent application Ser. No. 10/116,808 filed Apr. 5, 2002 now U.S. Pat. No. 6,856,873 (the history of which is set forth above);

12. a continuation-in-part of U.S. patent application Ser. No. 10/365,129 filed Feb. 12, 2003 now U.S. Pat. No. 7,134,687 which is:

A) a continuation-in-part of U.S. patent application Ser. No. 10/114,533 filed Apr. 2, 2002 now U.S. Pat. No. 6,942,248 (the history of which is set forth above); and B) a continuation-in-part of U.S. patent application Ser. No 10/151,615 filed May 20, 2002 now U.S. Pat. No. 6,820,897 (the history of which is set forth above);

13. a continuation-in-part application of U.S. patent application Ser. No 09/613,925 filed Jul. 11, 2000, now U.S. Pat. No. 6,805,404 which is a continuation-in-part of U.S. patent application Ser. No. 08/992,525, filed Dec. 17, 1997, now U.S. Pat No. 6,088,640; and 14. a continuation-in-part application of U.S. patent application Ser. No. 10/234,063, filed Sep. 3, 2002, now U.S. Pat. No. 6,746,078 which is a continuation-in-part of U.S. patent application Ser. No. 09/613,925, filed Jul. 11, 2000, now U.S. Pat. No. 6,805,404 (the history of which is set forth above).

FIELD OF THE INVENTION

The present invention relates to occupant sensing in general and more particular to sensing characteristics or the classification of an occupant of a vehicle for the purpose of controlling a vehicular system, subsystem or component based on the sensed characteristics or classification.

The present invention also relates to an apparatus and method for measuring the seat weight including the weight of an occupying item of the vehicle seat and, more specifically, to a seat weight measuring apparatus having advantages including that the production cost and the assembling cost of such apparatus may be reduced.

BACKGROUND OF THE INVENTION

Note, all of the patents, patent applications, technical papers and other references referenced below are incorporated herein by reference in their entirety unless stated otherwise.

Automobiles equipped with airbags are well known in the prior art. In such airbag systems, the car crash is sensed and the airbags rapidly inflated thereby insuring the safety of an occupation in a car crash. Many lives have now been saved by such airbag systems. However, depending on the seated state of an occupant, there are cases where his or her life cannot be saved even by present airbag systems. For example, when a passenger is seated on the front passenger seat in a position other than a forward facing, normal state, e.g., when the passenger is out of position and near the deployment door of the airbag, there will be cases when the occupant will be seriously injured or even killed by the deployment of the airbag.

Also, sometimes a child seat is placed on the passenger seat in a rear facing position and there are cases where a child sitting in such a seat has been seriously injured or killed by the deployment of the airbag.

Furthermore, in the case of a vacant seat, there is no need to deploy an airbag, and in such a case, deploying the airbag is undesirable due to a high replacement cost and possible release of toxic gases into the passenger compartment. Nevertheless, most airbag systems will deploy the airbag in a vehicle crash even if the seat is unoccupied.

Thus, whereas thousands of lives have been saved by airbags, a large number of people have also been injured, some seriously, by the deploying airbag, and over 100 people have now been killed. Thus, significant improvements need to be made to airbag systems. As discussed in detail in U.S. Pat. No. 05,653,462, for a variety of reasons vehicle occupants may be too close to the airbag before it deploys and can be seriously injured or killed as a result of the deployment thereof. Also, a child in a rear facing child seat that is placed on the right front passenger seat is in danger of being seriously injured if the passenger airbag deploys. For these reasons and, as first publicly disclosed in Breed, D. S. "How Airbags Work" presented at the International Conference on Seatbelts and Airbags in 1993 in Canada, occupant position sensing and rear facing child seat detection systems are required in order to minimize the damages caused by deploying front and side airbags. It also may be required in order to minimize the damage caused by the deployment of other types of occupant protection and/or restraint devices that might be installed in the vehicle.

For these reasons, there has been proposed an occupant sensor system also known as a seated-state detecting unit such as disclosed in the following U.S. patents assigned to the current assignee of the present application: Breed et al. (U.S. Pat. No. 05,563,462); Breed et al. (U.S. Pat. No. 05,829,782); Breed et al. (U.S. Pat. No. 05,822,707): Breed et al. (U.S. Pat. No. 05,694,320); Breed et al. (U.S. Pat. No. 05,748,473); Varga et al. (U.S. Pat. No. 05,943,295); Breed et al. (U.S. Pat. No. 06,078,854); Breed et al. (U.S. Pat. No. 06,081,757); and Breed et al. (U.S. Pat. No. 06,242,701). Typically, in some of these designs three or four sensors or sets of sensors are installed at three or four points in a vehicle for transmitting ultrasonic or electromagnetic waves toward the passenger or driver's seat and receiving the reflected waves. Using appropriate hardware and software, the approximate configuration of the occupancy of either the passenger or driver seat can be determined thereby identifying and categorizing the occupancy of the relevant seat.

These systems will solve the out-of-position occupant and the rear facing child seat problems related to current airbag systems and prevent unneeded and unwanted airbag deployments when a front seat is unoccupied. Some of the airbag systems will also protect rear seat occupants in vehicle crashes and all occupants in side impacts.

However, there is a continual need to improve the systems which detect the presence of occupants, determine if they are out-of-position and to identify the presence of a rear facing child seat in the rear seat as well as the front seat. Future automobiles are expected to have eight or more airbags as protection is sought for rear seat occupants and from side impacts. In addition to eliminating the disturbance and possible harm of unnecessary airbag deployments, the cost of replacing these airbags will be excessive if they all deploy in an accident needlessly. The improvements described below minimize this cost by not deploying an airbag for a seat, which is not occupied by a human being. An occupying item of a seat may be a living occupant such as a human being or dog, another living organism such as a plant, or an inanimate object such as a box or bag of groceries.

A child in a rear facing child seat, which is placed on the right front passenger seat, is in danger of being seriously injured if the passenger airbag deploys. This has now become an industry-wide concern and the U.S. automobile industry is continually searching for an economical solution that will prevent the deployment of the passenger side airbag if a rear facing child seat is present. The inventions disclosed herein include sophisticated apparatus to identify objects within the passenger compartment and address this concern.

The need for an occupant out-of-position sensor has also been observed by others and several methods have been described in certain U.S. patents for determining the position of an occupant of a motor vehicle. However, none of these prior art systems are capable of solving the many problems associated with occupant sensors and no prior art has been found that describe the methods of adapting such sensors to a particular vehicle model to obtain high system accuracy. Also, none of these systems employ pattern recognition technologies that are believed to be essential to accurate occupant sensing. Each of these prior are systems will be discussed below.

In 1984, the National Highway Traffic Safety Administration (NHTSA) of the U.S. Department of Transportation issued a requirement for frontal crash protection of automobile occupants known as FMVSS-208. This regulation mandated "passive occupant restraints" for all passenger cars by 1992. A further modification to FMVSS-208 required both driver and passenger side airbags on all passenger cars and light trucks by 1998. FMVSS-208 was later modified to require all vehicles to have occupant sensors. The demand for airbags is constantly accelerating in both Europe and Japan and all vehicles produced in these areas and eventually worldwide will likely be, if not already, equipped with airbags as standard equipment and eventually with occupant sensors.

A device to monitor the vehicle interior and identify its contents is needed to solve these and many other problems. For example, once a Vehicle Interior Identification and Monitoring System (VIMS) for identifying and monitoring the contents of a vehicle is in place, many other products become possible as discussed below.

Inflators now exist which will adjust the amount of gas flowing to the airbag to account for the size and position of the occupant and for the severity of the accident. The VIMS discussed in U.S. Pat. No. 05,829,782 will control such inflators based on the presence and position of vehicle occupants or of a rear facing child seat. The inventions here are improvements on that VIMS system and some use an advanced optical system comprising one or more CCD or CMOS arrays plus a source of illumination preferably combined with a trained neural network pattern recognition system.

In the early 1990's, the current assignee (ATI) developed a scanning laser radar optical occupant sensor that had the capability of creating a three dimensional image of the contents of the passenger compartment. After proving feasibility, this effort was temporarily put aside due to the high cost of the system components and the current assignee then developed an ultrasonic based occupant sensor that was commercialized and is now in production on some Jaguar models. The current assignee has long believed that optical systems would eventually become the technology of choice when the cost of optical components came down. This has now occurred and for the past several years, ATI has been developing a variety of optical occupant sensors.

The current assignee's first camera optical occupant sensing system was an adult zone-classification system that detected the position of the adult passenger. Based on the distance from the airbag, the passenger compartment was divided into three zones, namely safe-seating zone, at-risk zone, and keep-out zone. This system was implemented in a vehicle under a cooperative development program with NHTSA. This proof-of-concept was developed to handle low-light conditions only. It used three analog CMOS cameras and three near-infrared LED clusters. It also required a desktop computer with three image acquisition boards. The locations of the camera/LED modules were: the A-pillar, the IP, and near the overhead console. The system was trained to handle camera blockage situations, so that the system still functioned well even when two cameras were blocked. The processing speed of the system was close to 50 fps giving it the capability of tracking an occupant during pre-crash braking situations—that is a dynamic system.

The second camera optical system was an occupant classification system that separated adult occupants from all other situations (i.e., child, child restraint and empty seat). This system was implemented using the same hardware as the first camera optical system. It was also developed to handle low-light conditions only. The results of this proof-of-concept were also very promising.

Since the above systems functioned well even when two cameras were blocked, it was decided to develop a stand alone system that is FMVSS208-compliant, and price competitive with weight-based systems but with superior performance. Thus, a third camera optical system (for occupant classification) was developed. Unlike the earlier systems, this system used one digital CMOS camera and two high-power near-infrared LEDs. The camera/LED module was installed near the overhead console and the image data was processed using a laptop computer. This system was developed to divide the occupancy state into four classes: 1) adult; 2) child, booster seat and forward facing child seat; 3) infant carrier and rearward facing child seat; and 4) empty seat. This system included two subsystems: a nighttime subsystem for handling low-light conditions, and a daytime subsystem for handling ambient-light conditions. Although the performance of this system proved to be superior to the earlier systems, it exhibited some weakness mainly due to a non-ideal aiming direction of the camera.

Finally, a fourth camera optical system was implemented using near production intent hardware using, for example, an ECU (Electronic Control Unit) to replace the laptop computer. In this system, the remaining problems of earlier systems were overcome. The hardware in this system is not unique so the focus below will be on algorithms and software which represent the innovative heart of the system.

1. Prior Art Occupant Sensors

In White et al., (U.S. Pat. No. 05,071,160) a single acoustic sensor is described and, as illustrated, is disadvantageously mounted lower than the steering wheel. White et al. correctly perceive that such a sensor could be defeated, and the airbag falsely deployed (indicating that the system of White et al. deploys the airbag on occupant motion rather then suppressing it), by an occupant adjusting the control knobs on the radio and thus they suggest the use of a plurality of such sensors. White et al. does not disclose where such sensors would be mounted, other than on the instrument panel below the steering wheel, or how they would be combined to uniquely monitor particular locations in the passenger compartment and to identify the object(s) occupying those locations. The adaptation process to vehicles is not described nor is a combination of pattern recognition algorithms, nor any pattern recognition algorithm.

White et al. also describe the use of error correction circuitry, without defining or illustrating the circuitry, to differentiate between the velocity of one of the occupant's hands, as in the case where he/she is adjusting the knob on the radio, and the remainder of the occupant. Three ultrasonic sensors of the type disclosed by White et al. might, in some cases, accomplish this differentiation if two of them indicated that the occupant was not moving while the third was indicating that he or she was moving. Such a combination, however, would not differentiate between an occupant with both hands and arms in the path of the ultrasonic transmitter at such a location that they were blocking a substantial view of the occupant's head or chest. Since the sizes and driving positions of occupants are extremely varied, trained pattern recognition systems, such as neural networks and combinations thereof, are required when a clear view of the occupant, unimpeded by his/her extremities, cannot be guaranteed. White et al. do not suggest the use of such neural networks.

Mattes et al. (U.S. Pat. No. 05,118,134) describe a variety of methods of measuring the change in position of an occupant including ultrasonic, active or passive infrared and microwave radar sensors, and an electric eye. The sensors measure the change in position of an occupant during a crash and use that information to access the severity of the crash and thereby decide whether or not to deploy the airbag. They are thus using the occupant motion as a crash sensor. No mention is made of determining the out-of-position status of the occupant or of any of the other features of occupant monitoring as disclosed in one or more of the above-referenced patents and patent applications. Nowhere does Mattes et al. discuss how to use active or passive infrared to determine the position of the occupant. As pointed out in one or more of the above-referenced patents and patent applications, direct occupant position measurement based on passive infrared is probably not possible with a single detector and, until very recently, was very difficult and expensive with active infrared requiring the modulation of an expensive GaAs infrared laser. Since there is no mention of these problems, the method of use contemplated by Mattes et al. must be similar to the electric eye concept where position is measured indirectly as the occupant passes by a plurality of longitudinally spaced-apart sensors.

The object of an occupant out-of-position sensor is to determine the location of the head and/or chest of the vehicle occupant in the passenger compartment relative to the occupant protection apparatus, such as an airbag, since it is the impact of either the head or chest with the deploying airbag that can result in serious injuries. Both White et al. and Mattes et al. disclose only lower mounting locations of their sensors that are mounted in front of the occupant such as on the dashboard or below the steering wheel. Both such mounting locations are particularly prone to detection errors due to positioning of the occupant's hands, arms and legs. This would require at least three, and preferably more, such sensors and detectors and an appropriate logic circuitry, or pattern recognition system, which ignores readings from some sensors if such readings are inconsistent with others, for the case, for example, where the driver's arms are the closest objects to two of the sensors. The determination of the proper transducer mounting locations, aiming and field angles and pattern recognition system architectures for a particular vehicle model are not disclosed in either White et al. or Mattes et al. and are part of the vehicle model adaptation process described herein.

Fujita et al., in U.S. Pat. No. 05,074,583, describe another method of determining the position of the occupant but do not use this information to control and suppress deployment of an airbag if the occupant is out-of-position, or if a rear facing child seat is present. In fact, the closer that the occupant gets to the airbag, the faster the inflation rate of the airbag is according to the Fujita et al. patent, which thereby increases the possibility of injuring the occupant. Fujita et al. do not measure the occupant directly but instead determine his or her position indirectly from measurements of the seat position and the vertical size of the occupant relative to the seat. This occupant height is determined using an ultrasonic displacement sensor mounted directly above the occupant's head.

It is important to note that in all cases in the above-cited prior art, except those assigned to the current assignee of the instant invention, no mention is made of the method of determining transducer location, deriving the algorithms or other system parameters that allow the system to accurately identify and locate an object in the vehicle. In contrast, in one implementation of the instant invention, the return wave echo pattern corresponding to the entire portion of the passenger compartment volume of interest is analyzed from one or more transducers and sometimes combined with the output from other transducers, providing distance information to many points on the items occupying the passenger compartment.

Other patents describing occupant sensor systems include U.S. Pat. No. 05,482,314 (Corrado et al.) and U.S. Pat. No. 05,890,085 (Corrado et al.). These patents, which were filed after the initial filings of the inventions herein and thus not necessarily prior art, describe a system for sensing the presence, position and type of an occupant in a seat of a vehicle for use in enabling or disabling a related airbag activator. A preferred implementation of the system includes two or more different but collocated sensors which provide information about the occupant and this information is fused or combined in a microprocessor circuit to produce an output signal to the airbag controller. According to Corrado et al., the fusion process produces a decision as to whether to enable or disable the airbag with a higher reliability than a single phenomena sensor or non-fused multiple sensors. By fusing the information from the sensors to make a determination as to the deployment of the airbag, each sensor has only a partial effect on the ultimate deployment determination. The sensor fusion process is a crude pattern recognition process based on deriving the fusion "rules" by a trial and error process rather than by training.

The sensor fusion method of Corrado et al. requires that information from the sensors be combined prior to processing by an algorithm in the microprocessor. This combination can unnecessarily complicate the processing of the data from the sensors and other data processing methods can provide better results. For example, as discussed more fully below, it has been found to be advantageous to use a more efficient pattern recognition algorithm such as a combination of neural networks or fuzzy logic algorithms that are arranged to receive a separate stream of data from each sensor, without that data being combined with data from the other sensors (as in done in Corrado et al.) prior to analysis by the pattern recognition algorithms. In this regard, it is important to appreciate that sensor fusion is a form of pattern recognition but is not a neural network and that significant and fundamental differences exist between sensor fusion and neural networks. Thus, some embodiments of the invention described below differ from that of Corrado et al. because they include a microprocessor which is arranged to accept only a separate stream of data from each sensor such that the stream of data from the sensors are not combined with one another. Further, the microprocessor processes each separate stream of data independent of the processing of the other streams of data, that is, without the use of any fusion matrix as in Corrado et al.

1.1 Ultrasonics

The use of ultrasound for occupant sensing has many advantages and some drawbacks. It is economical in that ultrasonic transducers cost less than $1 in large quantities and the electronic circuits are relatively simple and inexpensive to manufacture. However, the speed of sound limits the rate at which the position of the occupant can be updated to approximately 7 milliseconds, which though sufficient for most cases, is marginal if the position of the occupant is to be tracked during a vehicle crash. Secondly, ultrasound waves are diffracted by changes in air density that can occur when the heater or air conditioner is operated or when there is a high-speed flow of air past the transducer. Thirdly, the resolution of ultrasound is limited by its wavelength and by the transducers, which are high Q tuned devices. Typically, this resolution is on the order of about 2 to 3 inches. Finally, the fields from ultrasonic transducers are difficult to control so that reflections from unwanted objects or surfaces add noise to the data.

Ultrasonics can be used in several configurations for monitoring the interior of a passenger compartment of an automobile as described in the above-referenced patents and patent applications and in particular in U.S. Pat. No. 05,943,295. Using the teachings here, the optimum number and location of the ultrasonic and/or optical transducers can be determined as part of the adaptation process for a particular vehicle model.

In the cases of the inventions disclosed here, as discussed in more detail below, regardless of the number of transducers used, a trained pattern recognition system is preferably used to identify and classify, and in some cases to locate, the illuminated object and its constituent parts.

The ultrasonic system is the least expensive and potentially provides less information than the optical or radar systems due to the delays resulting from the speed of sound and due to the wave length which is considerably longer than the optical (including infrared) systems. The wavelength limits the detail that can be seen by the system. In spite of these limitations, ultrasonics can provide sufficient timely information to permit the position and velocity of an occupant to be accurately known and, when used with an appropriate pattern recognition system, it is capable of positively determining the presence of a rear facing child seat. One pattern recognition system that has been successfully used to identify a rear facing child seat employs neural networks and is similar to that described in papers by Gorman et al.

However, in the aforementioned literature using ultrasonics, the pattern of reflected ultrasonic waves from an adult occupant who may be out of position is sometimes similar to the pattern of reflected waves from a rear facing child seat. Also, it is sometimes difficult to discriminate the wave pattern of a normally seated child with the seat in a rear facing position from an empty seat with the seat in a more forward position. In other cases, the reflected wave pattern from a thin slouching adult with raised knees can be similar to that from a rear facing child seat. In still other cases, the reflected pattern from a passenger seat that is in a forward position can be similar to the reflected wave pattern from a seat containing a forward facing child seat or a child sitting on the passenger seat. In each of these cases, the prior art ultrasonic systems can suppress the deployment of an airbag when deployment is desired or, alternately, can enable deployment when deployment is not desired.

If the discrimination between these cases can be improved, then the reliability of the seated-state detecting unit can be improved and more people saved from death or serious injury. In addition, the unnecessary deployment of an airbag can be prevented.

Recently filed U.S. Pat. No. 06,411,202 (Gal et al.) describes a safety system for a vehicle including at least one sensor that receives waves from a region in an interior portion of the vehicle, which thereby defines a protected volume at least partially in front of the vehicle airbag. A processor is responsive to signals from the sensor for determining geometric data of objects in the protected volume. The teachings of this patent, which is based on ultrasonics, are fully disclosed in the prior patents of the current assignee referenced above.

1.2 Optics

Optics can be used in several configurations for monitoring the interior of a passenger compartment or exterior environment of an automobile. In one known method, a laser optical system uses a GaAs infrared laser beam to momentarily illuminate an object, occupant or child seat, in the manner as described and illustrated in FIG. 8 of U.S. Pat. No. 05,829,782 referenced above. The receiver can be a charge-coupled device or CCD or a CMOS imager to receive the reflected light. The laser can either be used in a scanning mode, or, through the use of a lens, a cone of light can be created which covers a large portion of the object. In these configurations, the light can be accurately controlled to only illuminate particular positions of interest within or around the vehicle. In the scanning mode, the receiver need only comprise a single or a few active elements while in the case of the cone of light, an array of active elements is needed. The laser system has one additional significant advantage in that the distance to the illuminated object can be determined as disclosed in the commonly owned '462 patent as also described below. When a single receiving element is used, a PIN or avalanche diode is preferred.

In a simpler case, light generated by a non-coherent light emitting diode (LED) device is used to illuminate the desired area. In this case, the area covered is not as accurately controlled and a larger CCD or CMOS array is required. Recently the cost of CCD and CMOS arrays has dropped substantially with the result that this configuration may now be the most cost-effective system for monitoring the passenger compartment as long as the distance from the transmitter to the objects is not needed. If this distance is required, then the laser system, a stereographic system, a focusing system, a combined ultrasonic and optic system, or a multiple CCD or CMOS array system as described herein is required. Alternately, a modulation system such as used with the laser distance system can be used with a CCD or CMOS camera and distance determined on a pixel by pixel basis.

As discussed above, the optical systems described herein are also applicable for many other sensing applications both inside and outside of the vehicle compartment such as for sensing crashes before they occur as described in U.S. Pat. No. 05,829,782, for a smart headlight adjustment system and for a blind spot monitor (also disclosed in U.S. patent application Ser. No. 09/851,362).

1.3 Ultrasonics and Optics

The laser systems described above are expensive due to the requirement that they be modulated at a high frequency if the distance from the airbag to the occupant, for example, needs to be measured. Alternately, modulation of another light source such as an LED can be done and the distance measurement accomplished using a CCD or CMOS array on a pixel by pixel basis, as discussed below.

Both laser and non-laser optical systems in general are good at determining the location of objects within the two dimensional plane of the image and a pulsed laser radar system in the scanning mode can determine the distance of each part of the image from the receiver by measuring the time of flight such as through range gating techniques. Distance can also be determined by using modulated electromagnetic radiation and measuring the phase difference between the transmitted and received waves. It is also possible to determine distance with a non-laser system by focusing, or stereographically if two spaced apart receivers are used and, in some cases, the mere location in the field of view can be used to estimate the position relative to the airbag, for example. Finally, a recently developed pulsed quantum well diode laser also provides inexpensive distance measurements as discussed in U.S. Pat. No. 06,324,453.

Acoustic systems are additionally quite effective at distance measurements since the relatively low speed of sound permits simple electronic circuits to be designed and minimal microprocessor capability is required. If a coordinate system is used where the z-axis is from the transducer to the occupant, acoustics are good at measuring z dimensions while simple optical systems using a single CCD or CMOS arrays are good at measuring x and y dimensions. The combination of acoustics and optics, therefore, permits all three measurements to be made from one location with low cost components as discussed in commonly assigned U.S. Pat. No. 05,845,000 and U.S. Pat. No. 05,835,613, incorporated by reference herein.

One example of a system using these ideas is an optical system which floods the passenger seat with infrared light coupled with a lens and a receiver array, e.g., CCD or CMOS array, which receives and displays the reflected light and an analog to digital converter (ADC) which digitizes the output of the CCD or CMOS and feeds it to an Artificial Neural Network (ANN) or other pattern recognition system for analysis. This system uses an ultrasonic transmitter and receiver for measuring the distances to the objects located in the passenger seat. The receiving transducer feeds its data into an ADC and from there, the converted data is directed into the ANN. The same ANN can be used for both systems thereby providing full three-dimensional data for the ANN to analyze. This system, using low cost components, will permit accurate identification and distance measurements not possible by either system acting alone. If a phased array system is added to the acoustic part of the system, the optical part can determine the location of the driver's ears, for example, and the phased array can direct a narrow beam to the location and determine the distance to the occupant's ears.

2. Adaptation

The adaptation of an occupant sensor system to a vehicle is the subject of a great deal of research and its own extensive body of knowledge as will be disclosed below. There is no significant prior art in the field with the possible exception of the descriptions of sensor fusion methods in the Corrado patents discussed above.

3. Mounting Locations for and Quantity of Transducers

There is little in the literature discussed herein concerning the mounting of cameras or other imagers or transducers in the vehicle other than in the current assignee's patents referenced above. Where camera mounting is mentioned the general locations chosen are the instrument panel, roof or headliner, A-Pillar or rear view mirror. Virtually no discussion is provided as to the methodology for choosing a particular location except in the current assignee's patents.

3.1 Single Camera, Dual Camera with Single Light Source

Farmer et al. (U.S. Pat. No. 06,005,958) describes a method and system for detecting the type and position of a vehicle occupant utilizing a single camera unit. The single camera unit is positioned at the driver or passenger side A-pillar in order to generate data of the front seating area of the vehicle. The type and position of the occupant is used to optimize the efficiency and safety in controlling deployment of an occupant protection device such as an air bag.

A single camera is, naturally, the least expensive solution but suffers from the problem that there is no easy method of obtaining three-dimensional information about people or objects that are occupying the passenger compartment. A second camera can be added but to locate the same objects or features in the two images by conventional methods is computationally intensive unless the two cameras are close together. If they are close together, however, then the accuracy of the three dimensional information is compromised. Also if they are not close together, then the tendency is to add separate illumination for each camera. An alternate solution, for which there is no known prior art, is to use two cameras located at different positions in the passenger compartment but to use a single lighting source. This source can be located adjacent to one camera to minimize the installation sites. Since the LED illumination is now more expensive than the imager, the cost of the second camera does not add significantly to the system cost. The correlation of features can then be done using pattern recognition systems such as neural networks.

Two cameras also provide a significant protection from blockage and one or more additional cameras, with additional illumination, can be added to provide almost complete blockage protection.

3.2 Camera Location—Mirror, IP, Roof

The only prior art for occupant sensor location for airbag control is White et al. and Mattes et al. discussed above. Both place their sensors below or on the instrument panel. The first disclosure of the use of cameras for occupant sensing is believed to appear in the above referenced patents of the current assignee. The first disclosure of the location of a camera anywhere and especially above the instrument panel such as on the A-pillar, roof or rear view mirror also is believed to appear in the current assignee's above-referenced patents.

Corrado U.S. Pat. No. 06,318,697 discloses the placement of a camera onto a special type of rear view mirror. DeLine U.S. Pat. No. 06,124,886 also discloses the placement of a video camera on a rear view mirror for sending pictures using visible light over a cell phone. The general concept of placement of such a transducer on a mirror, among other places, is believed to have been first disclosed in commonly owned patent U.S. Pat. No. RE037736 which also first discloses the use of an IR camera and IR illumination that is either co-located or located separately from the camera.

3.3 Color Cameras—Multispectral Imaging

The accurate detection, categorization and eventually recognition of an object in the passenger compartment are aided by using all available information. Initial camera based systems are monochromic and use active and, in some cases, passive infrared. As microprocessors become more powerful and sensor systems improve there will be a movement to broaden the observed spectrum to the visual spectrum and then further into the mid and far infrared parts of the spectrum. There is no known literature on this at this time except that provided by the current assignee below and in proper patents.

3.4 High Dynamic Range Cameras

The prior art of high dynamic range cameras centers around the work of the Fraunhofer-Inst. of Microelectronic Circuits & Systems in Duisburg, Germany. and the Jet Propulsion Laboratory, Licensed to Photobit, and is reflected in several patents including U.S. Pat. No. 05,471,515, U.S. Pat. No. 05,608,204, U.S. Pat. No. 05,635,753, U.S. Pat. No. 05,892,541, U.S. Pat. No. 06,175,383, U.S. Pat. No. 06,215,428, U.S. Pat. No. 06,388,242, and U.S. Pat. No. 06,388,243. The current assignee is believed to be the first to recognize and apply this technology for occupant sensing as well as monitoring the environment surrounding the vehicle and thus there is not believed to be any prior art for this application of the technology.

Related to this is the work done at Columbia University by Professor Nayar as disclosed in PCT patent application WO0079784 assigned to Columbia University, which is also applicable to monitoring the interior and exterior of the vehicle. An excellent technical paper also describes this technique: Nayar, S. K. and Mitsunaga, T. "High Dynamic Range Imaging: Spatially Varying Pixel Exposures" Proceedings of IEEE Conference on Computer Vision and Pattern Recognition, South Carolina, June 2000. Again there does not appear to be any prior art that predates the disclosure of this application of the technology by the current assignee.

A paper entitled "A 256×256 CMOS Brightness Adaptive Imaging Array with Column-Parallel Digital Output" by C. Sodini et al., 1988 IEEE International Conference on Intelligent Vehicles, describes a CMOS image sensor for intelligent transportation system applications such as adaptive cruise control and traffic monitoring. Among the purported novelties is the use of a technique for increasing the dynamic range in a CMOS imager by a factor of approximately 20, which technique is based on a previously described technique for CCD imagers.

Waxman et al. U.S. Pat. No. 05,909,244 discloses a novel high dynamic range camera that can be used in low light situations with a frame rate>25 frames per second for monitoring either the interior or exterior of a vehicle. It is suggested that this camera can be used for automotive navigation but no mention is made of its use for safety monitoring. Similarly, Savoye et al. U.S. Pat. No. 05,880,777 disclose a high dynamic range imaging system similar to that described in the '244 patent that could be employed in the inventions disclosed herein.

There are numerous technical papers of high dynamic range cameras and some recent ones discuss automotive applications, after the concept was first discussed in the current assignee's patents and patent applications. One recent example is T. Lulé1, H. Keller1, M. Wagner1, M. Böhm, C. D. Hamann, L. Humm, U. Efron, "100.000 Pixel 120 dB Imager for Automotive Vision", presented in the Proceedings of the Conference on Advanced Microsystems for Automotive Applications (AMAA), Berlin, 18./19. Mar.

1999. This paper discusses the desirability of a high dynamic range camera and points out that an integration based method is preferable to a logarithmic system in that greater contrast is potentially obtained. This brings up the question as to what dynamic range is really needed. The current assignee has considered desiring a high dynamic range camera but after more careful consideration, it is really the dynamic range within a given image that is important and that is usually substantially below 120 db, and in fact, a standard 70+ db camera is fine for most purposes.

As long as the shutter or an iris can be controlled to chose where the dynamic range starts, then, for night imaging a source of illumination is generally used and for imaging in daylight the shutter time or iris can be substantially controlled to provide an adequate image. For those few cases where there is a very bright sunlight entering the vehicle's window but the interior is otherwise in shade, multiple exposures can provide the desired contrast as taught by Nayar and discussed above. This is not to say that a high dynamic range camera is inherently bad, just to illustrate that there are many technologies that can be used to accomplish the same goal.

3.5 Fisheye Lens, Pan and Zoom

There is significant prior art on the use of a fisheye or similar high viewing angle lens and a non-moving pan, tilt, rotation and zoom cameras however there appears to be no prior art on the application of these technologies to sensing inside or outside of the vehicle prior to the disclosure by the current assignee. One significant patent is U.S. Pat. No. 05,185,667 to Zimmermann. For some applications, the use of a fisheye type lens can significantly reduce the number of imaging devices that are required to monitor the interior or exterior of a vehicle. An important point is that whereas for human viewing, the images are usually mathematically corrected to provide a recognizable view, when a pattern recognition system such as a neural network is used, it is frequently not necessary to perform this correction, thus simplifying the analysis.

Recently, a paper has been published that describes the fisheye camera system disclosed years ago by the current assignee: V. Ramesh, M. Greiffenhagen, S. Boverie, A. Giratt, "Real-Time Surveillance and Monitoring for Automotive Applications", SAE 2000-01-0347.

4. 3D Cameras 4.1 Stereo

European Patent Application No. EP0885782A1 describes a purportedly novel motor vehicle control system including a pair of cameras which operatively produce first and second images of a passenger area. A distance processor determines the distances that a plurality of features in the first and second images are from the cameras based on the amount that each feature is shifted between the first and second images. An analyzer processes the determined distances and determines the size of an object on the seat. Additional analysis of the distance also may determine movement of the object and the rate of movement. The distance information also can be used to recognize predefined patterns in the images and thus identify objects. An air bag controller utilizes the determined object characteristics in controlling deployment of the air bag.

Simoncelli in U.S. Pat. No. 05,703,677 discloses an apparatus and method using a single lens and single camera with a pair of masks to obtain three dimensional information about a scene.

A paper entitled "Sensing Automobile Occupant Position with Optical Triangulation" by W. Chappelle, Sensors, December 1995, describes the use of optical triangulation techniques for determining the presence and position of people or rear-facing infant seats in the passenger compartment of a vehicle in order to guarantee the safe deployment of an air bag. The paper describes a system called the "Takata Safety Shield" which purportedly makes high-speed distance measurements from the point of air bag deployment using a modulated infrared beam projected from an LED source. Two detectors are provided, each consisting of an imaging lens and a position-sensing detector.

A paper entitled "An Interior Compartment Protection System based on Motion Detection Using CMOS Imagers" by S. B. Park et al., 1998 IEEE International Conference on Intelligent Vehicles, describes a purportedly novel image processing system based on a CMOS image sensor installed at the car roof for interior compartment monitoring including theft prevention and object recognition. One disclosed camera system is based on a CMOS image sensor and a near infrared (NIR) light emitting diode (LED) array.

Krumm (U.S. Pat. No. 05,983,147) describes a system for determining the occupancy of a passenger compartment including a pair of cameras mounted so as to obtain binocular stereo images of the same location in the passenger compartment. A representation of the output from the cameras is compared to stored representations of known occupants and occupancy situations to determine which stored representation the output from the cameras most closely approximates. The stored representations include that of the presence or absence of a person or an infant seat in the front passenger seat.

4.2 Distance by Focusing

A focusing system, such as used on some camera systems, can be used to determine the initial position of an occupant but, in most cases, it is too slow to monitor his position during a crash. This is a result of the mechanical motions required to operate the lens focusing system, however, methods do exist that do not require mechanical motions. By itself, it cannot determine the presence of a rear facing child seat or of an occupant but when used with a charge-coupled or CMOS device plus some infrared illumination for vision at night, and an appropriate pattern recognition system, this becomes possible. Similarly, the use of three dimensional cameras based on modulated waves or range-gated pulsed light methods combined with pattern recognition systems are now possible based on the teachings of the inventions disclosed herein and the commonly assigned patents and patent applications referenced above.

U.S. Pat. No. 06,198,998 to Farmer discloses a single IR camera mounted on the A-Pillar where a side view of the contents of the passenger compartment can be obtained. A sort of three dimensional view is obtained by using a narrow depth of focus lens and a de-blurring filter. IR is used to illuminate the volume and the use of a pattern on the LED to create a sort of structured light is also disclosed. Pattern recognition by correlation is also discussed.

U.S. Pat. No. 06,229,134 to Nayar et al. is an excellent example of the determination of the three-dimensional shape of a object using active blurring and focusing methods. The use of structured light is also disclosed in this patent. The method uses illumination of the scene with a pattern and two images of the scene are sensed with different imaging parameters.

A mechanical focusing system, such as used on some camera systems, can determine the initial position of an occupant but is currently too slow to monitor his/her position during a crash or even during pre-crash braking. Although the example of an occupant is used here as an example, the same or similar principles apply to objects exterior to the vehicle. A distance measuring system based on focusing is described in U.S. Pat. No. 05,193,124 and U.S. Pat. No. 05,231,443 (Subbarao) that can either be used with a mechanical focusing system or with two cameras, the latter of which would be fast enough to allow tracking of an occupant during pre-crash braking and perhaps even during a crash depending on the field of view that is analyzed. Although the Subbarao patents provide a good discussion of the camera focusing art, it is a more complicated system than is needed for practicing the instant inventions. In fact, a neural network can also be trained to perform the distance determination based on the two images taken with different camera settings or from two adjacent CCD's and lens having different properties as the cameras disclosed in Subbarao making this technique practical for the purposes herein. Distance can also be determined by the system disclosed in U.S. Pat. No. 05,003,166 (Girod) by spreading or defocusing a pattern of structured light projected onto the object of interest. Distance can also be measured by using time of flight measurements of the electromagnetic waves or by multiple CCD or CMOS arrays as is a principle teaching of this invention.

Dowski, Jr. in U.S. Pat. No. 05,227,890 provides an automatic focusing system for video cameras which can be used to determine distance and thus enable the creation of a three dimensional image.

A good description of a camera focusing system is found in G. Zorpette, "Focusing in a flash", Scientific American August 2000.

In each of these cases, regardless of the distance measurement system used, a trained pattern recognition system, as defined above, can be used to identify and classify, and in some cases to locate, the illuminated object and its constituent parts.

4.3 Ranging

Cameras can be used for obtaining three dimensional images by modulation of the illumination as described in U.S. Pat. No. 05,162,861. The use of a ranging device for occupant sensing is believed to have been first disclosed by the current assignee in the patents mentioned herein. More recent attempts include the PMD camera as disclosed in PCT application WO09810255 and similar concepts disclosed in U.S. Pat. No. 06,057,909 and U.S. Pat. No. 06,100,517.

A paper by Rudolf Schwarte, et al. entitled "New Powerful Sensory Tool in Automotive Safety Systems Based on PMD-Technology", Eds. S. Krueger, W. Gessner, Proceedings of the AMAA 2000 Advanced Microsystems for Automotive Applications 2000, Springer Verlag; Berlin, Heidelberg, New York, ISBN 3-540-67087-4, describes an implementation of the teachings of the instant invention wherein a modulated light source is used in conjunction with phase determination circuitry to locate the distance to objects in the image on a pixel by pixel basis. This camera is an active pixel camera the use of which for internal and external vehicle monitoring is also a teaching of this invention. The novel feature of the PMD camera is that the pixels are designed to provide a distance measuring capability within each pixel itself. This then is a novel application of the active pixel and distance measuring teachings of the instant invention.

The paper "Camera Records color and Depth", Laser Focus World, Vol. 36 No. 7 Jul. 2000, describes another method of using modulated light to measure distance.

"Seeing distances—a fast time-of-flight 3D camera", Sensor Review Vol. 20 No. 3 2000, presents a time-of-flight camera that also can be used for internal and external monitoring. Similarly, see "Electro-optical correlation arrangement for fast 3D cameras: properties and facilities of the electro-optical mixer device", SPIE Vol. 3100, 1997 pp. 254-60. A significant improvement to the PMD technology and to all distance by modulation technologies is to modulate with a code, which can be random or pseudo random, that permits accurate distance measurements over a long range using correlation or other technology. There is a question as to whether there is a need to individually modulate each pixel with the sent signal since the same effect can be achieved using a known Pockel or Kerr cell that covers the entire imager, which should be simpler.

The instant invention as described in the above-referenced commonly assigned patents and patent applications, teaches the use of modulating the light used to illuminate an object and to determine the distance to that object based on the phase difference between the reflected radiation and the transmitted radiation. The illumination can be modulated at a single frequency when short distances such as within the passenger compartment are to be measured. Typically, the modulation wavelength would be selected such that one wave would have a length of approximately one meter or less. This would provide resolution of 1 cm or less.

For larger vehicles, a longer wavelength would be desirable. For measuring longer distances, the illumination can be modulated at more than one frequency to eliminate cycle ambiguity if there is more than one cycle between the source of illumination and the illuminated object. This technique is particularly desirable when monitoring objects exterior to the vehicle to permit accurate measurements of devices that are hundreds of meters from the vehicle as well as those that are a few meters away. Naturally, there are other modulation methods that eliminate the cycle ambiguity such as modulation with a code that is used with a correlation function to determine the phase shift or time delay. This code can be a pseudo random number in order to permit the unambiguous monitoring of the vehicle exterior in the presence of other vehicles with the same system. This is sometimes known as noise radar, noise modulation (either of optical or radar signals), ultra wideband (UWB) or the techniques used in Micropower impulse radar (MIR). Another key advantage is to permit the separation of signals from multiple vehicles.

Although a simple frequency modulation scheme has been disclosed so far, it is also possible to use other coding techniques including the coding of the illumination with one of a variety of correlation patterns including a pseudo-random code. Similarly, although frequency and code domain systems have been described, time domain systems are also applicable wherein a pulse of light is emitted and the time of flight measured. Additionally, in the frequency domain case, a chirp can be emitted and the reflected light compared in frequency with the chirp to determine the distance to the object by frequency difference. Although each of these techniques is known to those skilled in the art, they have previously not been believed to have applied for monitoring objects within or outside of a vehicle.

4.4 Pockel or Kerr Cells for Determining Range

The technology for modulating a light valve or electronic shutter has been known for many years and is sometimes referred to as a Kerr cell or a Pockel cell. These devices are capable of being modulated at up to 10 billion cycles per second. For determining the distance to an occupant or his or her features, modulations between 100 and 500 MHz are needed. The higher the modulation frequency, the more accurate the distance to the object can be determined. However, if more than one wavelength, or better one-quarter wavelength, exists between the camera and the object, then ambiguities result. On the other hand, once a longer wavelength has ascertained the approximate location of the feature, then more accurate determinations can be made by increasing the modulation frequency since the ambiguity will now have been removed. In practice, only a single frequency is used of about 300 MHz. This gives a wavelength of 1 meter, which can allow cm level distance determinations.

In one preferred embodiment of this invention therefore, an infrared LED is modulated at a frequency between 100 and 500 MHz and the returning light passes through a light valve such that amount of light that impinges on the CMOS array pixels is determined by a phase difference between the light valve and the reflected light. By modulating a light valve for one frame and leaving the light valve transparent for a subsequent frame, the range to every point in the camera field of view can be determined based on the relative brightness of the corresponding pixels.

Once the range to all of the pixels in the camera view has been determined, range-gating becomes a simple mathematical exercise and permits objects in the image to be easily separated for feature extraction processing. In this manner, many objects in the passenger compartment can be separated and identified independently.

Noise, pseudo noise or code modulation techniques can be used in place of the frequency modulation discussed above. This can be in the form of frequency, amplitude or pulse modulation.

No prior art is believed to exist on this concept.

4.5 Thin Film on ASIC (TFA)

Thin film on ASIC technology, as described in Lake, D. W. "TFA Technology: The Coming Revolution in Photography", Advanced Imaging Magazine, April, 2002 (WWW.ADVANCEDIMAGINGMAG.COM) shows promise of being the next generation of imager for automotive applications. The anticipated specifications for this technology, as reported in the Lake article, are:

| | |
|---|---|
| Dynamic Range | 120 db |
| Sensitivity | 0.01 lux |
| Anti-blooming | 1,000,000:1 |
| Pixel Density | 3,200,000 |
| Pixel Size | 3.5 um |
| Frame Rate | 30 fps |
| DC Voltage | 1.8 v |
| Compression | 500 to 1 |

All of these specifications, except for the frame rate, are attractive for occupant sensing. It is believed that the frame rate can be improved with subsequent generations of the technology. Some advantages of this technology for occupant sensing include the possibility of obtaining a three dimensional image by varying the pixel in time in relation to a modulated illumination in a simpler manner than proposed with the PMD imager or with a Pockel or Kerr cell. The ability to build the entire package on one chip will reduce the cost of this imager compared with two or more chips required by current technology.

Other technical papers on TFA include: (1) M. Böhm "Imagers Using Amorphous Silicon Thin Film on ASIC (TFA) Technology", Journal of Non-Crystalline Solids, 266-269, pp. 1145-1151, 2000; (2) A. Eckhardt, F. Blecher, B. Schneider, J. Sterzel, S. Benthien, H. Keller, T. Lulé, P. Rieve, M. Sommer, K. Seibel, F. Mütze, M. Böhm, "Image Sensors in TFA (Thin Film on ASIC) Technology with Analog Image Pre-Processing", H. Reichl, E. Obermeier (eds.), Proc. Micro System Technologies 98, Potsdam, Germany, pp. 165-170, 1998.; (3) T. Lulé, B. Schneider, M. Böhm, "Design and Fabrication of a High Dynamic Range Image Sensor in TFA Technology", invited paper for IEEE Journal of Solid-State Circuits, Special Issue on 1998 Symposium on VLSI Circuits, 1999. (4) M. Böhm, F. Blecher, A. Eckhardt, B. Schneider, S. Benthien, H. Keller, T. Lulé, P. Rieve, M. Sommer, R. C. Lind, L. Humm, M. Daniels, N. Wu, H. Yen, "High Dynamic Range Image Sensors in Thin Film on ASIC—Technology for Automotive Applications", D. E. Ricken, W. Gessner (eds.), Advanced Microsystems for Automotive Applications, Springer-Verlag, Berlin, pp. 157-172, 1998. (5) M. Böhm, F. Blecher, A. Eckhardt, K. Seibel, B. Schneider, J. Sterzel, S. Benthien, H. Keller, T. Lulé, P. Rieve, M. Sommer, B. Van Uffel, F Librecht, R. C. Lind, L. Humm, U. Efron, E. Rtoh, "Image Sensors in TFA Technology—Status and Future Trends", Mat. Res. Soc. Symp. Proc., vol. 507, pp. 327-338, 1998.

5. Glare Control

U.S. Pat. No. 05,298,732 and U.S. Pat. No. 05,714,751 to Chen concentrate on locating the eyes of the driver so as to position a light filter between a light source such as the sun or the lights of an oncoming vehicle, and the driver's eyes. This patent will be discussed in more detail below. U.S. Pat. No. 05,305,012 to Faris also describes a system for reducing the glare from the headlights of an oncoming vehicle and it is discussed in more detail below.

5.1 Windshield

Using an advanced occupant sensor, as explained below, the position of the driver's eyes can be accurately determined and portions of the windshield, or of a special visor, can be selectively darkened to eliminate the glare from the sun or oncoming vehicle headlights. This system can use electro-chromic glass, a liquid crystal device, Xerox Gyricon, Research Frontiers SPD, semiconducting and metallic (organic) polymer displays, spatial light monitors, electronic "Venetian blinds", electronic polarizers or other appropriate technology, and, in some cases, detectors to detect the direction of the offending light source. In addition to eliminating the glare, the standard sun visor can now also be eliminated. Alternately, the glare filter can be placed in another device such as a transparent sun visor that is placed between the driver's eyes and the windshield.

There is no known prior art that places a filter in the windshield. All known designs use an auxiliary system such as a liquid crystal panel that acts like a light valve on a pixel by pixel basis.

A description of SPD can be found at SmartGlass.com and in "New 'Smart' glass darkens, lightens in a flash", Automotive News Aug. 21, 1998.

5.2 Rear View Mirrors

There is no known prior art that places a pixel addressable filter in a rear view mirror to selectively block glare or for any other purpose.

5.3 Visor for Glare Control and HUD

The prior art of this application includes U.S. Pat. No. 04,874,938, U.S. Pat. No. 05,298,732, U.S. Pat. No. 05,305,012 and U.S. Pat. No. 05,714,715.

6. Weight Measurement and Biometrics

Prior art systems are now being used to identify the vehicle occupant based on a coded key or other object carried by the occupant. This requires special sensors within the vehicle to recognize the coded object. Also, the system only works if the particular person for whom the vehicle was programmed uses the coded object. If a son or daughter, for example, who is using their mother's key, uses the vehicle then the wrong seat, mirror, radio station etc. adjustments are made. Also, these systems preserve the choice of seat position without any regard for the correctness of the seat position. With the problems associated with the 4-way seats, it is unlikely that the occupant ever properly adjusts the seat. Therefore, the error will be repeated every time the occupant uses the vehicle.

These coded systems are a crude attempt to identify the occupant. An improvement can be made if the morphological (or biological) characteristics of the occupant can be measured as described herein. Such measurements can be made of the height and weight, for example, and used not only to adjust a vehicular component to a proper position but also to remember that position, as fine tuned by the occupant, for re-positioning the component the next time the occupant occupies the seat. No prior art is believed to exist on this aspect of the invention. Additional biometrics includes physical and behavioral responses of the eyes, hands, face and voice. Iris and retinal scans are discussed in the literature but the shape of the eyes or hands, structure of the face or hands, how a person blinks or squints, the shape of the hands, how he or she grasps the steering wheel, the electrical conductivity or dielectric constant, blood vessel pattern in the hands, fingers, face or elsewhere, the temperature and temperature differences of different areas of the body are among the many biometric variables that can be measures to identify an authorized user of a vehicle, for example.

As discussed more fully below, in a preferred implementation, once at least one and preferably two of the morphological characteristics of a driver are determined, for example by measuring his or her height and weight, the component such as the seat can be adjusted and other features or components can be incorporated into the system including, for example, the automatic adjustment of the rear view and/or side mirrors based on seat position and occupant height. In addition, a determination of an out-of-position occupant can be made and based thereon, airbag deployment suppressed if the occupant is more likely to be injured by the airbag than by the accident without the protection of the airbag. Furthermore, the characteristics of the airbag including the amount of gas produced by the inflator and the size of the airbag exit orifices can be adjusted to provide better protection for small lightweight occupants as well as large, heavy people. Even the direction of the airbag deployment can, in some cases, be controlled. The prior art is limited to airbag suppression as disclosed in Mattes (U.S. Pat. No. 05,118,134) and White (U.S. Pat. No. 05,071,160) discussed above.

Still other features or components can now be adjusted based on the measured occupant morphology as well as the fact that the occupant can now be identified. Some of these features or components include the adjustment of seat armrest, cup holder, steering wheel (angle and telescoping), pedals, phone location and for that matter the adjustment of all things in the vehicle which a person must reach or interact with. Some items that depend on personal preferences can also be automatically adjusted including the radio station, temperature, ride and others.

6.1 Strain Gage Weight Sensors

Previously, various methods have been proposed for measuring the weight of an occupying item of a vehicular seat. The methods include pads, sheets or films that have placed in the seat cushion which attempt to measure the pressure distribution of the occupying item. Prior to its first disclosure in Breed et al. (U.S. Pat. No. 05,822,707) referenced above by the current assignee, systems for measuring occupant weight based on the strain in the seat structure had not been considered. Prior art weight measurement systems have been notoriously inaccurate. Thus, a more accurate weight measuring system is desirable. The strain measurement systems described herein, substantially eliminate the inaccuracy problems of prior art systems and permit an accurate determination of the weight of the occupying item of the vehicle seat. Additionally, as disclosed herein, in many cases, sufficient information can be obtained for the control of a vehicle component without the necessity of determining the entire weight of the occupant. For example, the force that the occupant exerts on one of the three support members may be sufficient.

A recent U.S. patent application, Publication No. 2003/0168895, is interesting in that it is the first example of the use of time and the opening and closing of a vehicle door to help in the post-processing decision making for distinguishing a child restraint system (CRS) from an adult. This system is based on a load cell (strain gage) weight measuring system.

Automotive vehicles are equipped with seat belts and air bags as equipment for ensuring the safety of the passenger. In recent years, an effort has been underway to enhance the performance of the seat belt and/or the air bag by controlling these devices in accordance with the weight or the posture of the passenger. For example, the quantity of gas used to deploy the air bag or the speed of deployment could be controlled. Further, the amount of pretension of the seat belt could be adjusted in accordance with the weight and posture of the passenger. To this end, it is necessary to know the weight of the passenger sitting on the seat by some technique. The position of the center of gravity of the passenger sitting on the seat could also be referenced in order to estimate the posture of the passenger.

As an example of a technique to determine the weight or the center of gravity of the passenger of this type, a method of measuring the seat weight including the passenger's weight by disposing the load sensors (load cells) at the front, rear, left and right corners under the seat and summing vertical loads applied to the load cells has been disclosed in the assignee's numerous patents and patent applications on occupant sensing.

Since a seat weight measuring apparatus of this type is intended for use in general automotive vehicles, the cost of the apparatus must be as low as possible. In addition, the wiring and assembly also must be easy. Keeping such considerations in mind, the object of the present invention is to provide a seat weight measuring apparatus having such advantages that the production cost and the assembling cost may be reduced.

6.2 Bladder Weight Sensors

Similarly to strain gage weight sensors, the first disclosure of weight sensors based of the pressure in a bladder in or under the seat cushion is believed to have been made in Breed et al. (U.S. Pat. No. 05,822,707) filed Jun. 7, 1995 by the current assignee.

A bladder is disclosed in WO09830411, which claims the benefit of a U.S. provisional application filed on Jan. 7, 1998 showing two bladders. This patent application is assigned to Automotive Systems Laboratory and is part of a series of bladder based weight sensor patents and applications all of which were filed significantly after the current assignee's bladder weight sensor patent applications.

Also U.S. Pat. No. 04,957,286 illustrates a single chamber bladder sensor for an exercise bicycle and EP0345806 illustrates a bladder in an automobile seat for the purpose of adjusting the shape of the seat. Although a pressure switch is provided, no attempt is made to measure the weight of the occupant and there is no mention of using the weight to control a vehicle component. IEE of Luxemburg and others have marketed seat sensors that measure the pattern on the object contacting the seat surface but none of these sensors purport to measure the weight of an occupying item of the seat.

6.3 Combined Spatial and Weight Sensors

The combination of a weight sensor with a spatial sensor, such as the wave or electric field sensors discussed herein, permits the most accurate determination of the airbag requirements when the crash sensor output is also considered. There is not believed to be any prior art of such a combination. A recent patent, which is not considered prior art, that discloses a similar concept is U.S. Pat. No. 06,609, 055.

6.4 Face Recognition (Face and Iris IR Scans)

Ishikawa et al. (U.S. Pat. No. 04,625,329) describes an image analyzer (M5 in FIG. 1) for analyzing the position of driver including an infrared light source which illuminates the driver's face and an image detector which receives light from the driver's face, determines the position of facial feature, e.g., the eyes in three dimensions, and thus determines the position of the driver in three dimensions. A pattern recognition process is used to determine the position of the facial features and entails converting the pixels forming the image to either black or white based on intensity and conducting an analysis based on the white area in order to find the largest contiguous white area and the center point thereof. Based on the location of the center point of the largest contiguous white area, the driver's height is derived and a heads-up display is adjusted so information is within driver's field of view. The pattern recognition process can be applied to detect the eyes, mouth, or nose of the driver based on the differentiation between the white and black areas. Ishikawa does not attempt to recognize the driver.

Ando (U.S. Pat. No. 05,008,946) describes a system which recognizes an image and specifically ascertains the position of the pupils and mouth of the occupant to enable movement of the pupils and mouth to control electrical devices installed in the automobile. The system includes a camera which takes a picture of the occupant and applies algorithms based on pattern recognition techniques to analyze the picture, converted into an electrical signal, to determine the position of certain portions of the image, namely the pupils and mouth. Ando also does not attempt to recognize the driver.

Puma (U.S. Pat. No. 05,729,619) describes apparatus and methods for determining the identity of a vehicle operator and whether he or she is intoxicated or falling asleep. Puma uses an iris scan as the identification method and thus requires the driver to place his eyes in a particular position relative to the camera. Intoxication is determined by monitoring the spectral emission from the driver's eyes and drowsiness is determined by monitoring a variety of behaviors of the driver. The identification of the driver by any means is believed to have been first disclosed in the current assignee's patents referenced above as was identifying the impairment of the driver whether by alcohol, drugs or drowsiness through monitoring driver behavior and using pattern recognition. Puma uses pattern recognition but not neural networks although correlation analysis is implied as also taught in the current assignee's prior patents.

Other patents on eye tracking include Moran et al. (U.S. Pat. No. 04,847,486) and Hutchinson (U.S. Pat. No. 04,950, 069). In Moran, a scanner is used to project a beam onto the eyes of the person and the reflection from the retina through the cornea is monitored to measure the time that the person's eyes are closed. In Hutchinson, the eye of a computer operator is illuminated with light from an infrared LED and the reflected light causes bright eye effect which outlines the pupil as brighter then the rest of the eye and also causes an even brighter reflection from the cornea. By observing this reflection in the camera's field of view, the direction that the eye is pointing can be determined. In this manner, the motion of the eye can control operation of the computer. Similarly, such apparatus can be used to control various functions within the vehicle such as the telephone, radio, and heating and air conditioning.

U.S. Pat. No. 05,867,587 to Aboutalib et al. also describes a drowsy driver detection unit based on the frequency of eyeblinks where an eye blink is determined by correlation analysis with averaged previous states of the eye. U.S. Pat. No. 06,082,858 to Grace describes the use of two frequencies of light to monitor the eyes, one that is totally absorbed by the eye (950 nm) and another that is not and where both are equally reflected by the rest of the face. Thus, subtraction leaves only the eyes. An alternative, not disclosed by Aboutalib et al. or Grace, is to use natural light or a broad frequency spectrum and a filter to filter out all frequencies except 950 nm and then to proportion the intensities. U.S. Pat. No. 06,097,295 to Griesinger also attempts to determine the alertness of the driver by monitoring the pupil size and the eye shutting frequency. U.S. Pat. No. 06,091,334 uses measurements of saccade frequency, saccade speed, and blinking measurements to determine drowsiness. No attempt is made in any of these patents to locate the driver in the vehicle.

There are numerous technical papers on eye location and tracking developed for uses other than automotive including: (1) "Eye Tracking in Advanced Interface Design", Robert J. K. Jacob, Human-Computer Interaction Lab, Naval Research Laboratory, Washington, D.C.; (2) F. Smeraldi, O. Carmona, J. Bigün, "Saccadic search with Gabor features applied to eye detection and real-time head tracking", Image and Vision Computing 18 (2000) 323-329, Elsevier; (2) Y. Wang, B. Yuan, "Human Eyes Location Using Wavelet and Neural Networks", Proceedings of ICSP2000, IEEE. (3) S. A. Sirohey, A. Rosenfeld, "Eye detection in a face image using linear and nonlinear filters", Pattern Recognition 34 (2001) 1367-1391, Pergamon.

There are also numerous technical papers on human face recognition including: (1) "Pattern Recognition with Fast Feature Extractions", M. G. Nakhodkin, Y. S. Musatenko, and V. N. Kurashov, Optical Memory and Neural Networks, Vol. 6, No. 3, 1997; (2) C. Beumier, M. Acheroy "Automatic 3D Face Recognition", Image and Vision Computing, 18 (2000) 315-321, Elsevier.

Since the direction of gaze of the eyes is quite precise and relatively easily measured, it can be used to control many functions in the vehicle such as the telephone, lights, windows, HVAC, navigation and route guidance system, and telematics among others. Many of these functions can be combined with a heads-up display and the eye gaze can replace the mouse in selecting many functions and among many choices. It can also be combined with an accurate mapping system to display on a convenient display the writing on a sign that might be hard to read such as a street sign. It can even display the street name when a sign is not present. A gaze at a building can elicit a response providing the address of the building or some information about the building which can be provided either orally or visually. Looking at the speedometer can elicit a response as the local speed limit and looking at the fuel gage can elicit the location of the nearest gas station. None of these functions appear in the prior art discussed above.

6.5 Heartbeat and Health State

Although the concept of measuring the heartbeat of a vehicle occupant originated with the patents of the current assignee, Bader in U.S. Pat. No. 06,195,008 uses a comparison of the heartbeat with stored data to determine the age of the occupant. Other uses of heartbeat measurement include determining the presence of an occupant on a particular seat, the determination of the total number of vehicle occupants, the presence of an occupant in a vehicle for security purposes, for example, and the presence of an occupant in the trunk etc.

7. Illumination 7.1 Infrared Light

In a passive infrared system, as described in Corrado referenced above, for example, a detector receives infrared radiation from an object in its field of view, in this case the vehicle occupant, and determines the presence and temperature of the occupant based on the infrared radiation. The occupant sensor system can then respond to the temperature of the occupant, which can either be a child in a rear facing child seat or a normally seated occupant, to control some other system. This technology could provide input data to a pattern recognition system but it has limitations related to temperature.

The sensing of the child could pose a problem if the child is covered with blankets, depending on the IR frequency used. It also might not be possible to differentiate between a rear facing child seat and a forward facing child seat. In all cases, the technology can fail to detect the occupant if the ambient temperature reaches body temperature as it does in hot climates. Nevertheless, for use in the control of the vehicle climate, for example, a passive infrared system that permits an accurate measurement of each occupant's temperature is useful. Prior art systems are limited to single pixel devices. Use of an IR imager removes many of the problems listed above and is novel to the inventions disclosed herein.

In a laser optical system, an infrared laser beam is used to momentarily illuminate an object, occupant or child seat in the manner as described, and illustrated in FIG. 8, of Breed et al. (U.S. Pat. No. 05,653,462) cross-referenced above. In some cases, a CCD or a CMOS device is used to receive the reflected light. In other cases when a scanning laser is used, a pin or avalanche diode or other photo detector can be used. The laser can either be used in a scanning mode, or, through the use of a lens, a cone of light, swept line of light, or a pattern or structured light can be created which covers a large portion of the object. Additionally, one or more LEDs can be used as a light source. Also triangulation can be used in conjunction with an offset scanning laser to determine the range of the illuminated spot from the light detector. Various focusing systems also can have applicability in some implementations to measure the distance to an occupant. In most cases, a pattern recognition system, as defined herein, is used to identify, ascertain the identity of and classify, and can be used to locate and determine the position of, the illuminated object and/or its constituent parts.

The optical systems generally provide the most information about the object and at a rapid data rate. Its main drawback is cost which is usually above that of ultrasonic or passive infrared systems. As the cost of lasers and imagers comes down in the future, this system will become more competitive. Depending on the implementation of the system, there may be some concern for the safety of the occupant if a laser light can enter the occupant's eyes. This is minimized if the laser operates in the infrared spectrum particularly at the "eye-safe" frequencies.

Another important feature is that the brightness of the point of light from the laser, if it is in the infrared part of the spectrum and if a filter is used on the receiving detector, can overpower the sun with the result that the same classification algorithms can be made to work both at night and under bright sunlight in a convertible. An alternative approach is to use different algorithms for different lighting conditions.

Although active and passive infrared light has been disclosed in the prior art, the use of a scanning laser, modulated light, filters, trainable pattern recognition etc. is believed to have been first disclosed by the current assignee in the above-referenced patents.

7.2 Structured Light

U.S. Pat. No. 05,003,166 provides an excellent treatise on the use of structured light for range mapping of objects in general. It does not apply this technique for automotive applications and in particular for occupant sensing or monitoring inside or outside of a vehicle. The use of structured light in the automotive environment and particularly for sensing occupants is believed to have been first disclosed by the current assignee in the above-referenced patents.

U.S. Pat. No. 06,049,757 to Nakajima et al. describes structured light in the form of bright spots that illuminate the face of the driver to determine the inclination of the face and to issue a warning if the inclination is indicative of a dangerous situation. In the patents to the current assignee, structured light is disclosed to obtain a determination of the location of an occupant and/or his or her parts. This includes the position of any part of the occupant including the occupant's face and thus the invention of this patent is believed to be anticipated by the current assignee's patents referenced above.

U.S. Pat. No. 06,298,311 to Griffin et al. repeats much of the teachings of the early patents of the current assignee. A plurality of IR beams are modulated and directed in the vicinity of the passenger seat and used through a photosensitive receiver to detect the presence and location of an object in the passenger seat, although the particular pattern recognition system is not disclosed. The pattern of IR beams used in this patent is a form of structured light.

Structured light is also discussed in numerous technical papers for other purposes than vehicle interior or exterior monitoring including: (I) "3D Shape Recovery and Registration Based on the Projection of Non-Coherent Structured Light" by Roberto Rodella and Giovanna Sansoni, INFM and Dept. of Electronics for the Automation, University of Brescia, Via Branze 38, 1-25123 Brescia—Italy; and (2) "A Low-Cost Range Finder using a Visually Located, Structured Light Source", R. B. Fisher, A. P. Ashbrook, C. Robertson, N. Werghi, Division of Informatics, Edinburgh University, 5 Forrest Hill, Edinburgh EH1 2QL. (3) F. Lerasle, J. Lequellec, M Devy, "Relaxation vs Maximal Cliques Search for Projected Beams Labeling in a Structured Light Sensor", Proceedings of the International Conference on Pattern Recognition, 2000 IEEE. (4) D. Caspi, N. Kiryati, and J. Shamir, "Range Imaging With Adaptive Color Structured Light", IEEE Transactions on Pattern Analysis and Machine Intelligence, Vol. 20, No. 5, May 1998.

Recently, a paper has been published that describes a structured light camera system disclosed years ago by the current assignee: V. Ramesh, M. Greiffenhagen, S. Boverie, A. Giratt, "Real-Time Surveillance and Monitoring for Automotive Applications", SAE 2000-01-0347.

7.3 Color and Natural Light

A number of systems have been disclosed that use illumination as the basis for occupant detection. The problem with artificial illumination is that it will not always overpower the sun and thus in a convertible on a bright sunny day, for example, the artificial light can be undetectable unless it is a point. If one or more points of light are not the illumination of choice, then the system must also be able to operate under natural light. The inventions herein accomplish the feat of accurate identification and tracking of an occupant under all lighting conditions by using artificial illumination at night and natural light when it is available. This requires that the pattern recognition system be modular with different modules used for different situations as discussed in more detail below. There is no known prior art for using natural radiation for occupant sensing systems.

When natural illumination is used, a great deal of useful information can be obtained if various parts of the electromagnetic spectrum are used. The ability to locate the face and facial features is enhanced if color is used, for example. Once again, there is no known prior art for the use of color, for example. All known systems that use electromagnetic radiation are monochromatic.

7.4 Radar

The radar portion of the electromagnetic spectrum can also be used for occupant detection as first disclosed by the current assignee in the above-referenced patents. Radar systems have similar properties to the laser system discussed above except the ability to focus the beam, which is limited in radar by the frequency chosen and the antenna size. It is also much more difficult to achieve a scanning system for the same reasons. The wavelength of a particular radar system can limit the ability of the pattern recognition system to detect object features smaller than a certain size. Once again, however, there is some concern about the health effects of radar on children and other occupants. This concern is expressed in various reports available from the United States Food and Drug Administration, Division of Devices.

When the occupying item is human, in some instances the information about the occupying item can be the occupant's position, size and/or weight. Each of these properties can have an effect on the control criteria of the component. One system for determining a deployment force of an air bag system in described in U.S. Pat. No. 06,199,904 (Dosdall). This system provides a reflective surface in the vehicle seat that reflects microwaves transmitted from a microwave emitter. The position, size and weight of a human occupant are said to be determined by calibrating the microwaves detected by a detector after the microwaves have been reflected from the reflective surface and pass through the occupant. Although some features disclosed in the '904 patent are not disclosed in the current assignee's above-referenced patents, the use of radar in general for occupant sensing is disclosed in those patents.

7.5 Frequency or Spectrum Considerations

As discussed above, it is desirable to obtain information about an occupying item in a vehicle in order to control a component in the vehicle based on the characteristics of the occupying item. For example, if it were known that the occupying item is inanimate, an airbag deployment system would generally be controlled to suppress deployment of any airbags designed to protect passengers seated at the location of the inanimate object.

Particular parts of the electromagnetic spectrum interact with animal bodies in a manner differently from inanimate objects and allow the positive identification that there is an animal in the passenger compartment, or in the vicinity of the vehicle. The choice of frequencies for both active and passive observation of people is discussed in detail in Richards, A. *Alien Vision. Exploring the Electromagnetic Spectrum with Imaging Technology*, 2001, SPIE Press Bellingham, Wash. In particular, in the near IR range (~850 nm), the eyes of a person at night are easily seen when illuminated. In the near UV range (~360 nm), distinctive skin patterns are observable that can be used for identification. In the SWIR range (1100-2500 nm), the person can be easily separated from the background.

The MWIR range (2.5-7 Microns) in the passive case clearly shows people against a cooler background except when the ambient temperature is high and then everything radiates or reflects energy in that range. However, windows are not transparent to MWIR and thus energy emitted from outside the vehicle does not interfere with the energy emitted from the occupants. This range is particularly useful at night when it is unlikely that the vehicle interior will be emitting significant amounts of energy in this range.

In the LWIR range (7-15 Microns), people are even more clearly seen against a dark background that is cooler then the person. Finally, millimeter wave radar can be used for occupant sensing as discussed elsewhere. It is important to note that an occupant sensing system can use radiation in more than one of these ranges depending on what is appropriate for the situation. For example, when the sun is bright, then visual imaging can be very effective and when the sun has set, various ranges of infrared become useful. Thus, an occupant sensing system can be a combination of these subsystems. Once again, there is not believed to be any prior art on the use of these imaging techniques for occupant sensing other than that of the current assignee.

8. Field Sensors

Electric and magnetic phenomena can be employed in other ways to sense the presence of an occupant and in particular the fields themselves can be used to determine the dielectric properties, such as the loss tangent or dielectric constant, of occupying items in the passenger compartment. However, it is difficult if not possible to measure these properties using static fields and thus a varying field is used which once again causes electromagnetic waves. Thus, the use of quasi-static low-frequency fields is really a limiting case of the use of waves as described in detail above. Electromagnetic waves are significantly affected at low frequencies, for example, by the dielectric properties of the material. Such capacitive or electric field sensors, for example are described in U.S. patents by Kithil et al. U.S. Pat. No. 05,366,241, U.S. Pat. No. 05,602,734, U.S. Pat. No. 05,691,693, U.S. Pat. No. 05,802,479, U.S. Pat. No. 05,844,486 and U.S. Pat. No. 06,014,602; by Jinno et al. U.S. Pat. No. 05,948,031; by Saito U.S. Pat. No. 06,325,413; by Kleinberg et al. U.S. Pat. No. 09,770,997; and SAE technical papers 982292 and 971051.

Additionally, as discussed in more detail below, the sensing of the change in the characteristics of the near field that surrounds an antenna is an effective and economical method of determining the presence of water or a water-containing life form in the vicinity of the antenna and thus a measure of occupant presence. Measurement of the near field parameters can also yield a specific pattern of an occupant and thus provide a possibility to discriminate a human being from other objects. The use of electric field and capacitance sensors and their equivalence to the occupant sensors described herein requires a special discussion.

Electric and magnetic field sensors and wave sensors are essentially the same from the point of view of sensing the presence of an occupant in a vehicle. In both cases, a time varying electric and/or magnetic field is disturbed or modified by the presence of the occupant. At high frequencies in the visual, infrared and high frequency radio wave region, the sensor is usually based on the reflection of electromagnetic energy. As the frequency drops and more of the energy passes through the occupant, the absorption of the wave energy is measured and at still lower frequencies, the occupant's dielectric properties modify the time varying field produced in the occupied space by the plates of a capacitor. In this latter case, the sensor senses the change in charge distribution on the capacitor plates by measuring, for example, the current wave magnitude or phase in the electric circuit that drives the capacitor.

In all cases, the presence of the occupant reflects, absorbs or modifies the waves or variations in the electric or magnetic fields in the space occupied by the occupant. Thus, for the purposes of this invention, capacitance and inductance, electric field and magnetic field sensors are equivalent and will be considered as wave sensors. What follows is a discussion comparing the similarities and differences between two types of wave sensors, electromagnetic beam sensors and capacitive sensors as exemplified by Kithil in U.S. Pat. No. 05,602,734.

An electromagnetic field disturbed or emitted by a passenger in the case of an electromagnetic beam sensor, for example, and the electric field sensor of Kithil, for example, are in many ways similar and equivalent for the purposes of this invention. The electromagnetic beam sensor is an actual electromagnetic wave sensor by definition, which exploits for sensing a coupled pair of continuously changing electric and magnetic fields, an electromagnetic wave affected or generated by a passenger. The electric field here is not a static, potential one. It is essentially a dynamic, vortex electric field coupled with a changing magnetic field, that is, an electromagnetic wave. It cannot be produced by a steady distribution of electric charges. It is initially produced by moving electric charges in a transmitter, even if this transmitter is a passenger body for the case of a passive infrared sensor.

In the Kithil sensor, a static electric field is declared as an initial material agent coupling a passenger and a sensor (see column 5, lines 5-7): "The proximity sensors 12 each function by creating an electrostatic field between oscillator input loop 54 and detector output loop 56, which is affected by presence of a person near by, as a result of capacitive coupling, . . . ". It is a potential, non-vortex electric field. It is not necessarily coupled with any magnetic field. It is the electric field of a capacitor. It can be produced with a steady distribution of electric charges. Thus, it is not an electromagnetic wave by definition but if the sensor is driven by a varying current then it produces a varying electric field in the space between the plates of the capacitor which necessarily and simultaneously originates an electromagnetic wave.

Kithil declares that he uses a static electric field in his capacitance sensor. Thus, from the consideration above, one can conclude that Kithil's sensor cannot be treated as a wave sensor because there are no actual electromagnetic waves but only a static electric field of the capacitor in the sensor system. However, this is not the case. The Kithil system could not operate with a true static electric field because a steady system does not carry any information. Therefore, Kithil is forced to use an oscillator, causing an alternating current in the capacitor and a time varying electric field wave in the space between the capacitor plates, and a detector to reveal an informative change of the sensor capacitance caused by the presence of an occupant (see FIG. 7 and its description). In this case, his system becomes a wave sensor in the sense that it starts generating actual electromagnetic waves according to the definition above. That is, Kithil's sensor can be treated as a wave sensor regardless of the degree to which the electromagnetic field that it creates has developed, a beam or a spread shape.

As described in the Kithil patents, the capacitor sensor is a parametric system where the capacitance of the sensor is controlled by influence of the passenger body. This influence is transferred by means of the varying electromagnetic field (i.e., the material agent necessarily originating the wave process) coupling the capacitor electrodes and the body. It is important to note that the same influence takes also place with a true static electric field caused by an unmovable charge distribution, that is in the absence of any wave phenomenon. This would be a situation if there were no oscillator in Kithil's system. However, such a system is not workable and thus Kithil reverts to a dynamic system using electromagnetic waves.

Thus, although Kithil declares the coupling is due to a static electric field, such a situation is not realized in his system because an alternating electromagnetic field ("wave") exists in the system due to the oscillator. Thus, his sensor is actually a wave sensor, that is, it is sensitive to a change of a wave field in the vehicle compartment. This change is measured by measuring the change of its capacitance. The capacitance of the sensor system is determined by the configuration of its electrodes, one of which is a human body, that is, the passenger inside of and the part which controls the electrode configuration and hence a sensor parameter, the capacitance.

The physics definition of "wave" from Webster's Encyclopedic Unabridged Dictionary is: "11. Physics. A progressive disturbance propagated from point to point in a medium or space without progress or advance of the points themselves, . . . ". In a capacitor, the time that it takes for the disturbance (a change in voltage) to propagate through space, the dielectric and to the opposite plate is generally small and neglected but it is not zero. In space, this velocity of propagation is the speed of light. As the frequency driving the capacitor increases and the distance separating the plates increases, this transmission time as a percentage of the period of oscillation can become significant. Nevertheless, an observer between the plates will see the rise and fall of the electric field much like a person standing in the water of an ocean. The presence of a dielectric body between the plates causes the waves to get bigger as more electrons flow to and from the plates of the capacitor. Thus, an occupant affects the magnitude of these waves which is sensed by the capacitor circuit. Thus, the electromagnetic field is a material agent that carries information about a passenger's position in both Kithil's and a beam type electromagnetic wave sensor.

The following definitions are from the Encyclopedia Britannica:

"electromagnetic field"

"A property of space caused by the motion of an electric charge. A stationary charge will produce only an electric field in the surrounding space. If the charge is moving, a magnetic field is also produced. An electric field can be produced also by a changing magnetic field. The mutual interaction of electric and magnetic fields produces an electromagnetic field, which is considered as having its own existence in space apart from the charges or currents (a stream of moving charges) with which it may be related . . . . " (Copyright 1994-1998 Encyclopedia Britannica).

"displacement current"

" . . . in electromagnetism, a phenomenon analogous to an ordinary electric current, posited to explain magnetic fields that are produced by changing electric fields. Ordinary electric currents, called conduction currents, whether steady or varying, produce an accompanying magnetic field in the vicinity of the current. [ . . . ]

"As electric charges do not flow through the insulation from one plate of a capacitor to the other, there is no conduction current; instead, a displacement current is said to be present to account for the continuity of the magnetic effects. In fact, the calculated size of the displacement current between the plates of a capacitor being charged and discharged in an alternating-current circuit is equal to the size of the conduction current in the wires leading to and from the capacitor. Displacement currents play a central role in the propagation of electromagnetic radiation, such as light and radio waves, through empty space. A traveling, varying magnetic field is everywhere associated with a periodically changing electric field that may be conceived in terms of a displacement current. Maxwell's insight on displacement current, therefore, made it possible to understand electromagnetic waves as being propagated through space completely detached from electric currents in conductors." Copyright 1994-1998 Encyclopedia Britannica.

"electromagnetic radiation"

" . . . energy that is propagated through free space or through a material medium in the form of electromagnetic waves, such as radio waves, visible light, and gamma rays. The term also refers to the emission and transmission of such radiant energy. [ . . . ]

"It has been established that time-varying electric fields can induce magnetic fields and that time-varying magnetic fields can in like manner induce electric fields. Because such electric and magnetic fields generate each other, they occur jointly, and together they propagate as electromagnetic waves. An electromagnetic wave is a transverse wave in that the electric field and the magnetic field at any point and time in the wave are perpendicular to each other as well as to the direction of propagation. [ . . . ]

"Electromagnetic radiation has properties in common with other forms of waves such as reflection, refraction, diffraction, and interference. [ . . . ]" Copyright 1994-1998 Encyclopedia Britannica The main part of the Kithil "circuit means" is an oscillator, which is as necessary in the system as the capacitor itself to make the capacitive coupling effect be detectable. An oscillator by nature creates waves. The system can operate as a sensor only if an alternating current flows through the sensor capacitor, which, in fact, is a detector from which an informative signal is acquired. Then this current (or, more exactly, integral of the current over time-charge) is measured and the result is a measure of the sensor capacitance value. The latter in turn depends on the passenger presence that affects the magnitude of the waves that travel between the plates of the capacitor making the Kithil sensor a wave sensor by the definition herein.

An additional relevant definition is:

(Telecom Glossary, atis.org/tg2k/_capacitive_coupling-.html)

"capacitive coupling: The transfer of energy from one circuit to another by means of the mutual capacitance between the circuits. (188) Note 1: The coupling may be deliberate or inadvertent. Note 2: Capacitive coupling favors transfer of the higher frequency components of a signal, whereas inductive coupling favors lower frequency components, and conductive coupling favors neither higher nor lower frequency components."

Another similarity between one embodiment of the sensor of this invention and the Kithil sensor is the use of a voltage-controlled oscillator (VCO).

9. Telematics

One key invention disclosed here and in the current assignee's above-referenced patents is that once an occupancy has been categorized one of the many ways that the information can be used is to transmit all or some of it to a remote location via a telematics link. This link can be a cell phone, WiFi Internet connection or a satellite (LEO or geo-stationary). The recipient of the information can be a governmental authority, a company or an EMS organization.

For example, vehicles can be provided with a standard cellular phone as well as the Global Positioning System (GPS), an automobile navigation or location system with an optional connection to a manned assistance facility, which is now available on a number of vehicle models. In the event of an accident, the phone may automatically call 911 for emergency assistance and report the exact position of the vehicle. If the vehicle also has a system as described herein for monitoring each seat location, the number and perhaps the condition of the occupants could also be reported. In that way, the emergency service (EMS) would know what equipment and how many ambulances to send to the accident site. Moreover, a communication channel can be opened between the vehicle and a monitoring facility/emergency response facility or personnel to enable directions to be provided to the occupant(s) of the vehicle to assist in any necessary first aid prior to arrival of the emergency assistance personnel.

One existing service is OnStar® provided by General Motors that automatically notifies an OnStar® operator in the event that the airbags deploy. By adding the teachings of the inventions herein, the service can also provide a description on the number and category of occupants, their condition and the output of other relevant information including a picture of a particular seat before and after the accident if desired. There is not believed to be any prior art for these added services.

10. Display

Heads-up displays are normally projected onto the windshield. In a few cases, they can appear on a visor that is placed in front of the driver or vehicle passenger. Here, the use of the term heads-up display or HUD will be meant to encompass both systems.

10.1 Heads-up Display (HUD)

Various manufacturers have attempted to provide information to a driver through the use of a heads-up display. In some cases, the display is limited to information that would otherwise appear on the instrument panel. In more sophisticated cases, there is an attempt to display information about the environment that would be useful to the driver. Night vision cameras can record that there is a person or an object ahead on the road that the vehicle might run into if the driver is not aware of its presence. Present day systems of this type provide a display at the bottom of the windshield of the scene sensed by the night vision camera. No attempt is made to superimpose this onto the windshield such that the driver would see it at the location that he would normally see it if the object were illuminated. This confuses the driver and in one study the driver actually performed worse than he would have in the absence of the night vision information.

The ability to find the eyes of the driver, as taught here, permits the placement of the night vision image exactly where the driver expects to see it. An enhancement is to categorize and identify the objects that should be brought to the attention of the driver and then place an icon at the proper place in the driver's field of view. There is no known prior art of these inventions. There is of course much prior art on night vision. See for example, M. Aguilar, D. A. Fay, W. D. Ross, A. M. Waxman, D. B. Ireland, J. P. Racamato, "Real-time fusion of low-light CCD and uncooled IR imagery for color night vision", SPIE Vol. 3364 (1998).

The University of Minnesota attempts to show the driver of a snow plow where the snow covered road edges are on a LCD display that is placed in front of the windshield. Needless to say this also can confuse the driver and a preferable approach, as disclosed herein, is to place the edge markings on the windshield as they would appear if the driver could see the road. This again requires knowledge of the location of the eyes of the driver.

Many other applications of display technology come to mind including aids to a lost driver from the route guidance system. An arrow, lane markings or even a pseudo-colored lane can be properly placed in his field of view when he should make a turn, for example or direct the driver to the closest McDonalds or gas station. For the passenger, objects of interest along with short descriptions (written or oral) can be highlighted on the HUD if the locations of the eyes of the passenger are known. In fact, all of the windows of the vehicle can become semi-transparent computer screens and be used as a virtual reality or augmented reality system guiding the driver and providing information about the environment that is generated by accurate maps, sensors and inter-vehicle communication and vehicle to infrastructure communication. This becomes easier with the development of organic displays that comprise a thin film that can be manufactured as part of the window or appear as part of a transparent visor. Again there is not believed to be any prior art on these features.

10.2 Adjust HUD Based on Driver Seating Position

A simpler system that can be implemented without an occupant sensor is to base the location of the HUD display on the expected location of the eyes of the driver that can be calculated from other sensor information such as the position of the rear view mirror, seat and weight of the occupant. Once an approximate location for the display is determined, a knob of another system can be provided to permit the driver to fine tune that location. Again there is not believed to be any prior art for this concept. Some relevant patents are U.S. Pat. No. 05,668,907 and WO0235276.

10.3 HUD on Rear Window

In some cases, it might be desirable to project the HUD onto the rear window or in some cases even the side windows. For the rear window, the position of the mirror and the occupant's eyes would be useful in determining where to place the image. The position of the eyes of the driver or passenger again would be useful for a HUD display on the side windows. Finally, for an entertainment system, the positions of the eyes of a passenger can allow the display of three-dimensional images onto any in-vehicle display. See for example U.S. Pat. No. 06,291,906.

10.4 Plastic Electronics

Heads-up displays previously have been based on projection systems. With the development of plastic electronics, the possibility now exists for elimination of the projection system and to create the image directly on the windshield. Relevant patents for this technology include U.S. Pat. No. 05,661,553, U.S. Pat. No. 05,796,454, U.S. Pat. No. 05,889,566, and U.S. Pat. No. 05,933,203. A relevant paper is "Polymer Material Promises an Inexpensive and Thin Full-Color Light-Emitting Plastic Display", Electronic Design Magazine, Jan. 9, 1996. This display material can be used in conjunction with SPD, for example, to turn the vehicle windows into a multicolored display. Also see "Bright Future for Displays", MIT Technology Review, pp 82-3, April, 2001.

11. Pattern Recognition

Many of the teachings of the inventions herein are based on pattern recognition technologies as taught in numerous textbooks and technical papers. For example, an important part of the diagnostic teachings of this invention are the manner in which the diagnostic module determines a normal pattern from an abnormal pattern and the manner in which it decides what data to use from the vast amount of data available. This is accomplished using pattern recognition technologies, such as artificial neural networks, combination neural networks, support vector machines, cellular neural networks etc.

The present invention relating to occupant sensing uses sophisticated pattern recognition capabilities such as fuzzy logic systems, neural networks, neural-fuzzy systems or other pattern recognition computer-based algorithms to the occupant position measurement system disclosed in the above referenced patents and/or patent applications and greatly extends the areas of application of this technology.

The pattern recognition techniques used can be applied to the preprocessed data acquired by various transducers or to the raw data itself depending on the application. For example, as reported in the current assignee's patent applications above-referenced, there is frequently information in the frequencies present in the data and thus a Fourier transform of the data can be inputted into the pattern recognition algorithm. In optical correlation methods, for example, a very fast identification of an object can be obtained using the frequency domain rather than the time domain. Similarly, when analyzing the output of weight sensors the transient response is usually more accurate that the static response, as taught in the current assignee's patents and applications, and this transient response can be analyzed in the frequency domain or in the time domain. An example of the use of a simple frequency analysis is presented in U.S. Pat. No. 06,005,485 to Kursawe.

11.1 Neural Nets

The theory of neural networks including many examples can be found in several books on the subject including: (1) Techniques and Application of Neural Networks, edited by Taylor, M. and Lisboa, P., Ellis Horwood, West Sussex, England, 1993; (2) Naturally Intelligent Systems, by Caudill, M. and Butler, C., MIT Press, Cambridge Mass., 1990; (3) J. M. Zaruda, Introduction to Artificial Neural Systems, West publishing Co., N.Y., 1992, (4) Digital Neural Networks, by Kung, S. Y., PTR Prentice Hall, Englewood Cliffs, N.J., 1993, Eberhart, R., Simpson, P., (5) Dobbins, R., Computational Intelligence PC Tools, Academic Press, Inc., 1996, Orlando, Fla., (6) Cristianini, N. and Shawe-Taylor, J. An Introduction to Support Vector Machines and Other Kernel-Based Learning Methods, Cambridge University Press, Cambridge England, 2000; (7) Proceedings of the 2000 $6^{th}$ IEEE International Workshop on Cellular Neural Networks and their Applications (CNNA 2000), IEEE, Piscataway N.J.; and (8) Sinha, N. K. and Gupta, M. M. Soft Computing & Intelligent Systems, Academic Press 2000 San Diego, Calif. The neural network pattern recognition technology is one of the most developed of pattern recognition technologies. The invention described herein uses combinations of neural networks to improve the pattern recognition process.

An example of such a pattern recognition system using neural networks using sonar is discussed in two papers by Gorman, R. P. and Sejnowski, T. J. "Analysis of Hidden Units in a Layered Network Trained to Classify Sonar Targets", Neural Networks, Vol. 1. pp. 75-89, 1988, and "Learned Classification of Sonar Targets Using a Massively Parallel Network", IEEE Transactions on Acoustics, Speech, and Signal Processing, Vol. 36, No. 7, July 1988. A more recent example using cellular neural networks is: M. Milanove, U. Büker, "Object recognition in image sequences with cellular neural networks", Neurocomputing 31 (2000) 124-141, Elsevier. Another recent example using support vector machines, a form of neural network, is: E. Destéfanis, E. Kienzle, L. Canali, "Occupant Detection Using Support Vector Machines With a Polynomial Kernel Function", SPIE Vol. 4192 (2000).

Japanese Patent No. 3-42337 (A) to Ueno describes a device for detecting the driving condition of a vehicle driver comprising a light emitter for irradiating the face of the driver and a means for picking up the image of the driver and storing it for later analysis. Means are provided for locating the eyes of the driver and then the irises of the eyes and then determining if the driver is looking to the side or sleeping. Ueno determines the state of the eyes of the occupant rather than determining the location of the eyes relative to the other parts of the vehicle passenger compartment. Such a system can be defeated if the driver is wearing glasses, particularly sunglasses, or another optical device which obstructs a clear view of his/her eyes. Pattern recognition technologies such as neural networks are not used. The method of finding the eyes is described but not a method of adapting the system to a particular vehicle model.

U.S. Pat. No. 05,008,946 to Ando uses a complicated set of rules to isolate the eyes and mouth of a driver and uses this information to permit the driver to control the radio, for example, or other systems within the vehicle by moving his eyes and/or mouth. Ando uses visible light and illuminates only the head of the driver. He also makes no use of trainable pattern recognition systems such as neural networks, nor is there any attempt to identify the contents neither of the vehicle nor of their location relative to the vehicle passenger compartment. Rather, Ando is limited to control of vehicle devices by responding to motion of the driver's mouth and eyes. As with Ueno, a method of finding the eyes is described but not a method of adapting the system to a particular vehicle model.

U.S. Pat. No. 05,298,732 and U.S. Pat. No. 05,714,751 to Chen also concentrate on locating the eyes of the driver so as to position a light filter in the form of a continuously repositioning small sun visor or liquid crystal shade between a light source such as the sun or the lights of an oncoming vehicle, and the driver's eyes. Chen does not explain in detail how the eyes are located but does supply a calibration system whereby the driver can adjust the filter so that it is at the proper position relative to his or her eyes. Chen references the use of automatic equipment for determining the location of the eyes but does not describe how this equipment works. In any event, in Chen, there is no mention of illumination of the occupant, monitoring the position of the occupant, other than the eyes, determining the position of the eyes relative to the passenger compartment, or identifying any other object in the vehicle other than the driver's eyes. Also, there is no mention of the use of a trainable pattern recognition system. A method for finding the eyes is described but not a method of adapting the system to a particular vehicle model.

U.S. Pat. No. 05,305,012 to Faris also describes a system for reducing the glare from the headlights of an oncoming vehicle. Faris locates the eyes of the occupant by using two spaced apart infrared cameras using passive infrared radiation from the eyes of the driver. Again, Faris is only interested in locating the driver's eyes relative to the sun or oncoming headlights and does not identify or monitor the occupant or locate the occupant, a rear facing child seat or any other object for that matter, relative to the passenger compartment or the airbag. Also, Faris does not use trainable pattern recognition techniques such as neural networks. Faris, in fact, does not even say how the eyes of the occupant are located but refers the reader to a book entitled Robot Vision (1991) by Berthold Horn, published by MIT Press, Cambridge, Mass. A review of this book did not appear to provide the answer to this question. Also, Faris uses the passive infrared radiation rather than illuminating the occupant with ultrasonic or electromagnetic radiation as in some implementations of the instant invention. A method for finding the eyes of the occupant is described but not a method of adapting the system to a particular vehicle model.

The use of neural networks, or neural fuzzy systems, and in particular combination neural networks, as the pattern recognition technology and the methods of adapting this to a particular vehicle, such as the training methods, is important to some of the inventions herein since it makes the monitoring system robust, reliable and accurate. The resulting algorithm created by the neural network program is usually short with a limited number of lines of code written in the C or C++ computer language as opposed to typically a very large algorithm when the techniques of the above patents to Ando, Chen and Faris are implemented. As a result, the resulting systems are easy to implement at a low cost, making them practical for automotive applications. The cost of the ultrasonic transducers, for example, is expected to be less than about $1 in quantities of one million per year and of the CCD and CMOS arrays, which have been prohibitively expensive until recently, currently are estimated to cost less than $5 each in similar quantities also rendering their use practical. Similarly, the implementation of the techniques of the above referenced patents requires expensive microprocessors while the implementation with neural networks and similar trainable pattern recognition technologies permits the use of low cost microprocessors typically costing less than $10 in large quantities.

The present invention is best implemented using sophisticated software that develops trainable pattern recognition algorithms such as neural networks and combination neural networks. Usually, the data is preprocessed, as discussed below, using various feature extraction techniques and the results post-processed to improve system accuracy. Examples of feature extraction techniques can be found in U.S. Pat. No. 04,906,940 entitled "Process and Apparatus for the Automatic Detection and Extraction of Features in Images and Displays" to Green et al. Examples of other more advanced and efficient pattern recognition techniques can be found in U.S. Pat. No. 05,390,136 entitled "Artificial Neuron and Method of Using Same" and U.S. Pat. No. 05,517,667 entitled "Neural Network That Does Not Require Repetitive Training" to S. T. Wang. Other examples include U.S. Pat. No. 05,235,339 (Morrison et al.), U.S. Pat. No. 05,214,744 (Schweizer et al), U.S. Pat. No. 05,181,254 (Schweizer et al), and U.S. Pat. No. 04,881,270 (Knecht et al). Neural networks as used herein include all types of neural networks including modular neural networks, cellular neural networks and support vector machines and all combinations as described in detail in U.S. Pat. No. 06,445,988 and referred to therein as "combination neural networks"

11.2 Combination Neural Nets

A "combination neural network" as used herein will generally apply to any combination of two or more neural networks that are either connected together or that analyze all or a portion of the input data. A combination neural network can be used to divide up tasks in solving a particular occupant problem. For example, one neural network can be used to identify an object occupying a passenger compartment of an automobile and a second neural network can be used to determine the position of the object or its location with respect to the airbag, for example, within the passenger compartment. In another case, one neural network can be used merely to determine whether the data is similar to data upon which a main neural network has been trained or whether there is something radically different about this data and therefore that the data should not be analyzed. Combination neural networks can sometimes be implemented as cellular neural networks.

Consider a comparative analysis performed by neural networks to that performed by the human mind. Once the human mind has identified that the object observed is a tree, the mind does not try to determine whether it is a black bear or a grizzly. Further observation on the tree might center on whether it is a pine tree, an oak tree etc. Thus, the human mind appears to operate in some manner like a hierarchy of neural networks. Similarly, neural networks for analyzing the occupancy of the vehicle can be structured such that higher order networks are used to determine, for example, whether there is an occupying item of any kind present. Another neural network could follow, knowing that there is information on the item, with attempts to categorize the item into child seats and human adults etc., i.e., determine the type of item.

Once it has decided that a child seat is present, then another neural network can be used to determine whether the child seat is rear facing or forward facing. Once the decision has been made that the child seat is facing rearward, the position of the child seat relative to the airbag, for example, can be handled by still another neural network. The overall accuracy of the system can be substantially improved by breaking the pattern recognition process down into a larger number of smaller pattern recognition problems. Naturally, combination neural networks can now be applied to solving many other pattern recognition problems in and outside of a vehicle including vehicle diagnostics, collision avoidance, anticipatory sensing etc.

In some cases, the accuracy of the pattern recognition process can be improved if the system uses data from its own recent decisions. Thus, for example, if the neural network system had determined that a forward facing adult was present, then that information can be used as input into another neural network, biasing any results toward the forward facing human compared to a rear facing child seat, for example. Similarly, for the case when an occupant is being tracked in his or her forward motion during a crash, for example, the location of the occupant at the previous calculation time step can be valuable information to determining the location of the occupant from the current data. There is a limited distance an occupant can move in 10 milliseconds, for example. In this latter example, feedback of the decision of the neural network tracking algorithm becomes important input into the same algorithm for the calculation of the position of the occupant at the next time step.

What has been described above is generally referred to as modular neural networks with and without feedback. Actually, the feedback does not have to be from the output to the input of the same neural network. The feedback from a downstream neural network could be input to an upstream neural network, for example.

The neural networks can be combined in other ways, for example in a voting situation. Sometimes the data upon which the system is trained is sufficiently complex or imprecise that different views of the data will give different results. For example, a subset of transducers may be used to train one neural network and another subset to train a second neural network etc. The decision can then be based on a voting of the parallel neural networks, sometimes known as an ensemble neural network. In the past, neural networks have usually only been used in the form of a single neural network algorithm for identifying the occupancy state of an automobile. This invention is primarily advancing the state of the art and using combination neural networks wherein two or more neural networks are combined to arrive at a decision.

The applications for this technology are numerous as described in the patents and patent applications listed above. However, the main focus of some of the instant inventions is the process and resulting apparatus of adapting the system in the patents and patent applications referenced above and using combination neural networks for the detection of the presence of an occupied child seat in the rear facing position or an out-of-position occupant and the detection of an occupant in a normal seating position. The system is designed so that in the former two cases, deployment of the occupant protection apparatus (airbag) may be controlled and possibly suppressed, and in the latter case, it will be controlled and enabled.

One preferred implementation of a first generation occupant sensing system, which is adapted to various vehicle models using the teachings presented herein, is an ultrasonic occupant position sensor, as described below and in the current assignee's above-referenced patents. This system uses a Combination Artificial Neural Network (CANN) to recognize patterns that it has been trained to identify as either airbag enable or airbag disable conditions. The pattern can be obtained from four ultrasonic transducers that cover the front passenger seating area. This pattern consists of the ultrasonic echoes bouncing off of the objects in the passenger seat area. The signal from each of the four transducers includes the electrical representation of the return echoes, which is processed by the electronics. The electronic processing can comprise amplification, logarithmic compression, rectification, and demodulation (band pass filtering), followed by discretization (sampling) and digitization of the signal. The only software processing required, before this signal can be fed into the combination artificial neural network, is normalization (i.e., mapping the input to a fixed range such as numbers between 0 and 1). Although this is a fair amount of processing, the resulting signal is still considered "raw", because all information is treated equally.

A further important application of CANN is where optical sensors such as cameras are used to monitor the inside or outside of a vehicle in the presence of varying illumination conditions. At night, artificial illumination usually in the form of infrared radiation is frequently added to the scene. For example, when monitoring the interior of a vehicle one or more infrared LEDs are frequently used to illuminate the occupant and a pattern recognition system is trained under such lighting conditions. In bright daylight, however, unless the infrared illumination is either very bright or in the form of a scanning laser with a narrow beam, the sun can overwhelm the infrared. However, in daylight there is no need for artificial illumination but the patterns of reflected radiation differ significantly from the infrared case. Thus, a separate pattern recognition algorithm is frequently trained to handle this case. Furthermore, depending on the lighting conditions, more than two algorithms can be trained to handle different cases. If CANN is used for this case, the initial algorithm can determine the category of illumination that is present and direct further processing to a particular neural network that has been trained under similar conditions. Another example would be the monitoring of objects in the vicinity of the vehicle. There is no known prior art on the use on neural networks, pattern recognition algorithms or, in particular, CANN for systems that monitor either the interior or the exterior of a vehicle.

11.3 Interpretation of Other Occupant States—Inattention, Sleep

Another example of an invention herein involves the monitoring of the driver's behavior over time that can be used to warn a driver if he or she is falling asleep, or to stop the vehicle if the driver loses the capacity to control it.

A paper entitled "Intelligent System for Video Monitoring of Vehicle Cockpit" by S. Boverie et al., SAE Technical Paper Series No. 980613, Feb. 23-26, 1998, describes the installation of an optical/retina sensor in the vehicle and several uses of this sensor. Possible uses are said to include observation of the driver's face (eyelid movement) and the driver's attitude to allow analysis of the driver's vigilance level and warn him/her about critical situations and observation of the front passenger seat to allow the determination of the presence of somebody or something located on the seat and to value the volumetric occupancy of the passenger for the purpose of optimizing the operating conditions for airbags.

11.4 Combining Occupant Monitoring and Car Monitoring

As discussed above and in the assignee's above-referenced patents and in particular in U.S. Pat. No. 06,532,408, the vehicle and the occupant can be simultaneously monitored in order to optimize the deployment of the restraint system, for example, using pattern recognition techniques such as CANN. Similarly, the position of the head of an occupant can be monitored while at the same time the likelihood of a side impact or a rollover can be monitored by a variety of other sensor systems such as an IMU, gyroscopes, radar, laser radar, ultrasound, cameras etc. and deployment of the side curtain airbag initiated if the occupant's head is getting too close to the side window. There are of course many other examples where the simultaneous monitoring of two environments can be combined, preferably using pattern recognition, to cause an action that would not be warranted by an analysis of only one environment. There is no known prior art except the current assignee's of monitoring more than one environment to render a decision that would not have been made based on the monitoring of a single environment and particularly through the use of pattern recognition, trained pattern recognition, neural networks or combination neural networks in the automotive field.

CANN, as well as the other pattern recognition systems discussed herein, can be implemented in either software or in hardware through the use of cellular neural networks, support vector machines, ASIC, systems on a chip, or FPGAs depending on the particular application and the quantity of units to be made. In particular, for many applications where the volume is large but not huge, a rapid and relatively low cost implementation could be to use a field programmable gate array (FPGA). This technology lends itself well to the implementation of multiple connected networks such as some implementations of CANN.

11.5 Continuous Tracking

During the process of adapting an occupant monitoring system to a vehicle, for example, the actual position of the occupant can be an important input during the training phase of a trainable pattern recognition system. Thus, for example, it might be desirable to associate a particular pattern of data from one or more cameras to the measured location of the occupant relative to the airbag. Thus, it is frequently desirable to positively measure the location of the occupant with another system while data collection is taking place. Systems for performing this measurement function include string potentiometers attached to the head or chest of the occupant, for example, inertial sensors such as an IMU attached to the occupant, laser optical systems using any part of the spectrum such as the far, mid or near infrared, visible and ultraviolet, radar, laser radar, stereo or focusing cameras, RF emitters attached to the occupant, or any other such measurement system. There is no known prior art for continuous tracking systems to be used in data collection when adapting a system for monitoring the interior or exterior of a vehicle.

11.6 Preprocessing

There are many preprocessing techniques that are and can be used to prepare the data for input into a pattern recognition or other analysis system in an interior or exterior monitoring system. The simplest systems involve subtracting one image from another to determine motion of the object of interest and to subtract out the unchanging background, removing some data that is known not to contain any useful information such as the early and late portions of an ultrasonic reflected signal, scaling, smoothing of filtering the data etc. More sophisticated preprocessing algorithms involve applying a Fourier transform, combining data from several sources using "sensor fusion" techniques, finding edges of objects and their orientation and elimination of non-edge data, finding areas having the same color or pattern and identifying such areas, image segmentation and many others. Very little preprocessing prior art exists other than that of the current assignee. The prior art is limited to the preprocessing techniques of Ando, Chen and Faris for eye detection and the sensor fusion techniques of Corrado all discussed above.

11.7 Post Processing

In some cases, after the system has made a decision that there is an out-of-position adult occupying the passenger seat, for example, it is useful for compare that decision with another recent decision to see it they are consistent. If the previous decision 10 milliseconds ago indicates that the adult was safely in position then thermal gradients or some other anomaly perhaps corrupted the data and thus the decision and the new decision should be ignored unless subsequently confirmed. Post processing can involve a number of techniques including averaging the decisions with a 5 decision moving average, applying other more sophisticated filters, applying limits to the decision or to the change from the previous decision, comparing data point by data point the input data that lead to the changed decision and correcting data points that appear to be in error etc. A goal of post processing is to apply a reasonableness test to the decision and thus to improve the accuracy of the decision or eliminate erroneous decisions. There appears to be no known prior art for post processing in the automotive monitoring field other than that of the current assignee.

12. Optical Correlators

Optical methods for data correlation analysis are utilized in systems for military purpose such as target tracking, missile self-guidance, aerospace reconnaissance data processing etc. Advantages of these methods are the possibility of parallel processing of the elements of images being recognized providing high speed recognition and the ability to use advanced optical processors created by means of integrated optics technologies.

Some prior art includes the following technical papers:

1. I. Mirkin, L. Singher "Adaptive Scale Invariant Filters", SPIE Vol. 3159, 1997
2. B. Javidi "Non-linear Joint Transform Correlators", University of Conn.
3. A. Awwal, H. Michel "Single Step Joint Fourier Transform Correlator", SPIE Vol. 3073, 1997
4. M. O'Callaghan, D. Ward, S. Perlmuter, L. Ji, C. Walker "A highly integrated single-chip optical correlator" SPIE Vol. 3466, 1998

These papers describe the use of optical methods and tools (optical correlators and spectral analyzers) for image recognition. Paper [1] discusses the use of an optical correlation technique for transforming an initial image to a form invariant to displacements of the respective object in the view. The very recognition of the object is done using a sectoring mask that is built by training with a genetic algorithm similar to methods of neural network training. The system discussed in the paper [2] includes an optical correlator that performs projection of the spectra of the target and the sample images onto a CCD matrix which functions as a detector. The consistent spectrum image at its output is used to detect the maximum of the correlation function by the median filtration method. Papers [3], [4] discuss some designs of optical correlators.

The following should be noted in connection with the discussion on the use of optical correlators for a vehicle compartment occupant position sensing task:

1) Making use of optical correlators to detect and classify objects in presence of noise is efficient when the amount of possible alternatives of the object's shape and position is comparatively small with respect to the number of elements in the scene. This is apparent from the character of demonstration samples in papers [1], [2] where there were only a few sample scenes and their respective scale factors involved.
2) The effectiveness of making use of optical correlation methods in systems of military purpose can be explained by a comparatively small number of classes of military objects to be recognized and a low probability of catching several objects of this kind with a single view.
3) In their principles of operation and capabilities, optical correlators are similar to neural associative memory.

In the task of occupant's position sensing in a car compartment, for example, the description of the sample object is represented by a training set that can include hundreds of thousands of various images. This situation is fundamentally different from those discussed in the mentioned papers. Therefore, the direct use of the optical correlation methods appears to be difficult and expensive.

Nevertheless, making use of the correlation centering technique in order to reduce the image description's redundancy can be a valuable technique. This task could involve a contour extraction technique that does not require excessive computational effort but may have limited capabilities as to the reduction of redundancy. The correlation centering can demand significantly more computational resources, but the spectra obtained in this way will be invariant to objects' displacements and, possibly, will maintain the classification features needed by the neural network for the purpose of recognition.

Once again, no prior art is believed to exist on the application of optical correlation techniques to the monitoring of either the interior or the exterior of the vehicle other than that of the current assignee.

13. Other Inputs

Many other inputs can be applied to the interior or exterior monitoring systems of the inventions disclosed herein. For interior monitoring these can include, among others, the position of the seat and seatback, vehicle velocity, brake pressure, steering wheel position and motion, exterior temperature and humidity, seat weight sensors, accelerometers and gyroscopes, engine behavior sensors, tire monitors and chemical (oxygen carbon dioxide, alcohol, etc.) sensors. For external monitoring these can include, among others, temperature and humidity, weather forecasting information, traffic information, hazard warnings, speed limit information, time of day, lighting and visibility conditions and road condition information.

14. Other Products, Outputs, Features

Pattern recognition technology is important to the development of smart airbags that the occupant identification and position determination systems described in the above-referenced patents and patent applications and to the methods described herein for adapting those systems to a particular vehicle model and for solving particular subsystem problems discussed in this section. To complete the development of smart airbags, an anticipatory crash detecting system such as disclosed in U.S. Pat. No. 06,343,810 is also desirable. Prior to the implementation of anticipatory crash sensing, the use of a neural network smart crash sensor, which identifies the type of crash and thus its severity based on the early part of the crash acceleration signature, should be developed and thereafter implemented.

U.S. Pat. No. 05,684,701 describes a crash sensor based on neural networks. This crash sensor, as with all other crash sensors, determines whether or not the crash is of sufficient severity to require deployment of the airbag and, if so, initiates the deployment. A smart airbag crash sensor based on neural networks can also be designed to identify the crash and categorize it with regard to severity thus permitting the airbag deployment to be matched not only to the characteristics and position of the occupant but also the severity and timing of the crash itself as described in more detail in U.S. Pat. No. 05,943,295.

The applications for this technology are numerous as described in the current assignee's patents and patent applications listed herein. They include, among others: (i) the monitoring of the occupant for safety purposes to prevent airbag deployment induced injuries, (ii) the locating of the eyes of the occupant (driver) to permit automatic adjustment of the rear view mirror(s), (iii) the location of the seat to place the occupant's eyes at the proper position to eliminate the parallax in a heads-up display in night vision systems, (iv) the location of the ears of the occupant for optimum adjustment of the entertainment system, (v) the identification of the occupant for security or other reasons, (vi) the determination of obstructions in the path of a closing door or window, (vii) the determination of the position of the occupant's shoulder so that the seat belt anchorage point can be adjusted for the best protection of the occupant, (viii) the determination of the position of the rear of the occupants head so that the headrest or other system can be adjusted to minimize whiplash injuries in rear impacts, (ix) anticipatory crash sensing, (x) blind spot detection, (xi) smart headlight dimmers, (xii) sunlight and headlight glare reduction and many others. In fact, over forty products alone have been identified based on the ability to identify and monitor objects and parts thereof in the passenger compartment of an automobile or truck. In addition, there are many other applications of the apparatus and methods described herein for monitoring the environment exterior to the vehicle.

Unless specifically stated otherwise below, there is no known prior art for any of the applications listed in this section.

14.1 Inflator Control

Inflators now exist which will adjust the amount of gas flowing to or from the airbag to account for the size and position of the occupant and for the severity of the accident. The vehicle identification and monitoring system (VIMS) discussed in U.S. Pat. No. 05,829,782, and U.S. Pat. No. 05,943,295 among others, can control such inflators based on the presence and position of vehicle occupants or of a rear facing child seat. Some of the inventions herein are concerned with the process of adapting the vehicle interior monitoring systems to a particular vehicle model and achieving a high system accuracy and reliability as discussed in greater detail below. The automatic adjustment of the deployment rate of the airbag based on occupant identification and position and on crash severity has been termed "smart airbags" and is discussed in great detail in U.S. Pat. No. 06,532,408.

14.2 Seat Adjustment

The adjustment of an automobile seat occupied by a driver of the vehicle is now accomplished by the use of either electrical switches and motors or by mechanical levers. As a result, the driver's seat is rarely placed at the proper driving position which is defined as the seat location which places the eyes of the driver in the so-called "eye ellipse" and permits him or her to comfortably reach the pedals and steering wheel. The "eye ellipse" is the optimum eye position relative to the windshield and rear view mirror of the vehicle.

There are a variety of reasons why the eye ellipse, which is actually an ellipsoid, is rarely achieved by the actions of the driver. One reason is the poor design of most seat adjustment systems particularly the so-called "4-way-seat". It is known that there are three degrees of freedom of a seat bottom, namely vertical, longitudinal, and rotation about the lateral or pitch axis. The 4-way-seat provides four motions to control the seat: (1) raising or lowering the front of the seat, (2) raising or lowering the back of the seat, (3) raising or lowering the entire seat, (4) moving the seat fore and aft. Such a seat adjustment system causes confusion since there are four control motions for three degrees of freedom. As a result, vehicle occupants are easily frustrated by such events as when the control to raise the seat is exercised, the seat not only is raised but is also rotated. Occupants thus find it difficult to place the seat in the optimum location using this system and frequently give up trying leaving the seat in an improper driving position. This problem could be solved by the addition of a microprocessor and the elimination of one switch.

Many vehicles today are equipped with a lumbar support system that is never used by most occupants. One reason is that the lumbar support cannot be preset since the shape of the lumbar for different occupants differs significantly, for example a tall person has significantly different lumbar support requirements than a short person. Without knowledge of the size of the occupant, the lumbar support cannot be automatically adjusted.

As discussed in the above referenced '320 patent, in approximately 95% of the cases where an occupant suffers a whiplash injury, the headrest is not properly located to protect him or her in a rear impact collision. Thus, many people are needlessly injured. Also, the stiffness and damping characteristics of a seat are fixed and no attempt is made in any production vehicle to adjust the stiffness and damping of the seat in relation to either the size or weight of an occupant or to the environmental conditions such as road roughness. All of these adjustments, if they are to be done automatically, require knowledge of the morphology of the seat occupant. The inventions disclosed herein provide that knowledge. Other than that of the current assignee, there is no known prior art for the automatic adjustment of the seat based on the driver's morphology. U.S. Pat. No. 04,797,824 to Sugiyama uses visible colored light to locate the eyes of the driver with the assistance of the driver. Once the eye position is determined, the headrest and the seat are adjusted for optimum protection.

14.3 Side Impacts

Side impact airbag systems began appearing on 1995 vehicles. The danger of deployment-induced injuries will exist for side impact airbags as they now do for frontal impact airbags. A child with his head against the airbag is such an example. The system of this invention will minimize such injuries. This fact has been also realized subsequent to its disclosure by the current assignee by NEC and such a system now appears on Honda vehicles. There is no other known prior art.

14.4 Children and Animals Left Alone

It is a problem in vehicles that children, infants and pets are sometimes left alone, either intentionally or inadvertently, and the temperature in the vehicle rises or falls. The child, infant or pet is then suffocated by the lack of oxygen in the vehicle or frozen. This problem can be solved by the inventions disclosed herein since the existence of the occupant can be determined as well as the temperature and even oxygen content is desired and preventative measures automatically taken. Similarly, children and pets die every year from suffocation after being locked in a vehicle trunk. The sensing of a life form in the trunk is discussed below.

14.5 Vehicle Theft

Another problem relates to the theft of vehicles. With an interior monitoring system, or a variety of other sensors as disclosed herein, connected with a telematics device, the vehicle owner could be notified if someone attempted to steal the vehicle while the owner was away.

14.6 Security, Intruder Protection

There have been incidents when a thief waits in a vehicle until the driver of the vehicle enters the vehicle and then forces the driver to provide the keys and exit the vehicle. Using the inventions herein, a driver can be made aware that the vehicle is occupied before he or she enters and thus he or she can leave and summon help. Motion of an occupant in the vehicle who does not enter the key into the ignition can also be sensed and the vehicle ignition, for example, can be disabled. In more sophisticated cases, the driver can be identified and operation of the vehicle enabled. This would eliminate the need even for a key.

14.7 Entertainment System Control

Once an occupant sensor is operational, the vehicle entertainment system can be improved if the number, size and location of occupants and other objects are known. However, prior to the inventions disclosed herein engineers have not thought to determine the number, size and/or location of the occupants and use such determination in combination with the entertainment system. Indeed, this information can be provided by the vehicle interior monitoring system disclosed herein to thereby improve a vehicle's entertainment system. Once one considers monitoring the space in the passenger compartment, an alternate method of characterizing the sonic environment comes to mind which is to send and receive a test sound to see what frequencies are reflected, absorbed or excite resonances and then adjust the spectral output of the entertainment system accordingly.

As the internal monitoring system improves to where such things as the exact location of the occupants' ears and eyes can be determined, even more significant improvements to the entertainment system become possible through the use of noise canceling sound. It is even possible to beam sound directly to the ears of an occupant using hypersonic-sound if the ear location is known. This permits different occupants to enjoy different programming at the same time. 14.8 HVAC Similarly to the entertainment system, the heating, ventilation and air conditioning system (HVAC) could be improved if the number, attributes and location of vehicle occupants were known. This can be used to provide a climate control system tailored to each occupant, for example, or the system can be turned off for certain seat locations if there are no occupants present at those locations.

U.S. Pat. No. 05,878,809 to Heinle, describes an air-conditioning system for a vehicle interior comprising a processor, seat occupation sensor devices, and solar intensity sensor devices. Based on seat occupation and solar intensity data, the processor provides the air-conditioning control of individual air-conditioning outlets and window-darkening devices which are placed near each seat in the vehicle. The additional means suggested include a residual air-conditioning function device for maintaining air conditioning operation after vehicle ignition switch-off, which allows maintaining specific climate conditions after vehicle ignition switch-off for a certain period of time provided at least one seat is occupied. The advantage of this design is the allowance for occupation of certain seats in the vehicle. The drawbacks include the lack of some important sensors of vehicle interior and environment condition (such as temperature or air humidity). It is not possible to set climate conditions individually at locations of each passenger seat.

U.S. Pat. No. 06,454,178 to Fusco, et al. describes an adaptive controller for an automotive HVAC system which controls air temperature and flow at each of locations that conform to passenger seats based on individual settings manually set by passengers at their seats. If the passenger corrects manual settings for his location, this information will be remembered, allowing for climate conditions taking place at other locations and further, will be used to automatically tune the air temperature and flow at the locations allowing for climate conditions at other locations. The device does not use any sensors of the interior vehicle conditions or the exterior environment, nor any seat occupation sensing.

14.9 Obstruction

In some cases, the position of a particular part of the occupant is of interest such as his or her hand or arm and whether it is in the path of a closing window or sliding door so that the motion of the window or door needs to be stopped. Most anti-trap systems, as they are called, are based on the current flow in a motor. When the window, for example, is obstructed, the current flow in the window motor increases. Such systems are prone to errors caused by dirt or ice in the window track, for example. Prior art on window obstruction sensing is limited to the Prospect Corporation anti-trap system described in U.S. Pat. No. 50,546,86 and U.S. Pat. No. 61,570,24. Anti trap systems are discussed in detain in current assignee's pending U.S. patent application Ser. No. 10/152,160 filed May 21, 2002.

14.10 Rear Impacts

The largest use of hospital beds in the United States is by automobile accident victims. The largest use of these hospital beds is for victims of rear impacts. The rear impact is the most expensive accident in America. The inventions herein teach a method of determining the position of the rear of the occupants head so that the headrest can be adjusted to minimize whiplash injuries in rear impacts.

Approximately 100,000 rear impacts per year result in whiplash injuries to the vehicle occupants. Most of these injuries could be prevented if the headrest were properly positioned behind the head of the occupant and if it had the correct contour to properly support the head and neck of the occupant. Whiplash injuries are the most expensive automobile accident injury even though these injuries are usually are not life threatening and are usually classified as minor.

A good discussion of the causes of whiplash injuries in motor vehicle accidents can be found in Dellanno et al, U.S. Pat. No. 05,181,763 and U.S. Pat. No. 05,290,091, and Dellanno patents U.S. Pat. No. 05,580,124, U.S. Pat. No. 05,769,489 and U.S. Pat. No. 05,961,182, as well as many other technical papers. These patents discuss a novel automatic adjustable headrest to minimize such injuries. However, these patents assume that the headrest is properly positioned relative to the head of the occupant. A survey has shown that as many as 95% of automobiles do not have the headrest properly positioned. These patents also assume that all occupants have approximately the same contour of the neck and head. Observations of humans, on the other hand, show that significant differences occur where the back of some people's heads is almost in the same plane as the that of their neck and shoulders, while other people have substantially the opposite case, that is, their neck extends significantly forward of their head back and shoulders.

One proposed attempt at solving the problem where the headrest is not properly positioned uses a conventional crash sensor which senses the crash after impact and a headrest composed of two portions, a fixed portion and a movable portion. During a rear impact, a sensor senses the crash and pyrotechnically deploys a portion of the headrest toward the occupant. This system has the following potential problems:

1) An occupant can get a whiplash injury in fairly low velocity rear impacts; thus, either the system will not protect occupants in such accidents or there will be a large number of low velocity deployments with the resulting significant repair expense.

2) If the portion of the headrest which is propelled toward the occupant has significant mass, that is if it is other than an airbag type device, there is a risk that it will injure the occupant. This is especially true if the system has no method of sensing and adjusting for the position of the occupant.

3) If the system does not also have a system which pre-positions the headrest to the proximity of the occupant's head, it will also not be affective when the occupant's head is forward due to pre-crash braking, for example, or for different sized occupants.

A variation of this approach uses an airbag positioned in the headrest which is activated by a rear impact crash sensor. This system suffers the same problems as the pyrotechnically deployed headrest portion. Unless the headrest is pre-positioned, there is a risk for the out-of-position occupant.

U.S. Pat. No. 05,833,312 to Lenz describes several methods for protecting an occupant from whiplash injuries using the motion of the occupant loading the seat back to stretch a canvas or deploy an airbag using fluid contained within a bag inside the seat back. In the latter case, the airbag deploys out of the top of the seat back and between the occupant's head and the headrest. The system is based on the proposed fact that: "[F]irstly the lower part of the body reacts and is pressed, by a heavy force, against the lower part of the seat back, thereafter the upper part of the body trunk is pressed back, and finally the back of the head and the head is thrown back against the upper part of the seat back . . . . "(Col. 2 lines 47-53). Actually this does not appear to be what occurs. Instead, the vehicle, and thus the seat that is attached to it, begins to decelerate while the occupant continues at its pre-crash velocity. Those parts of the occupant that are in contact with the seat experience a force from the seat and begin to slow down while other parts, the head for example continue moving at the pre crash velocity. In other words, all parts of the body are "thrown back" at the same time. That is, they all have the same relative velocity relative to the seat until acted on by the seat itself. Although there will be some mechanical advantage due to the fact that the area in contact with the occupant's back will generally be greater than the area needed to support his or her head, there generally will not be sufficient motion of the back to pump sufficient gas into the airbag to cause it to be projected in between the head that is not rapidly moving toward the headrest. In some cases, the occupant's head is very close to the headrest and in others it is far away. For all cases except when the occupant's head is very far away, there is insufficient time for motion of the occupant's back to pump air and inflate the airbag and position it between the head and the headrest. Thus, not only will the occupant impact the headrest and receive whiplash injuries, but it will also receive an additional impact from the deploying airbag.

Lenz also suggests that for those cases where additional deployment speed is required, that the output from a crash sensor could be used in conjunction with a pyrotechnic element. Since he does not mention anticipatory crash sensor, which were not believed to be available at the time of the filing of the Lenz patent application, it must be assumed that a conventional crash sensor is contemplated. As discussed herein, this is either too slow or unreliable since if it is set so sensitive that it will work for low speed impacts where many whiplash injuries occur, there will be many deployments and the resulting high repair costs. For higher speed crashes, the deployment time will be too slow based on the close position of the occupant to the airbag. Thus, if a crash sensor is used, it must be an anticipatory crash sensor as disclosed herein.

14.11 Combined with SDM and Other Systems

The above applications illustrate the wide range of opportunities, which become available if the identity and location of various objects and occupants, and some of their parts, within the vehicle are known. Once the system is operational, it would be logical for the system to also incorporate the airbag electronic sensor and diagnostics system (SDM) since it needs to interface with SDM anyway and since they could share computer capabilities, which will result in a significant cost saving to the auto manufacturer. For the same reasons, it would be logical for a monitoring system to include the side impact sensor and diagnostic system. As the monitoring system improves to where such things as the exact location of the occupants' ears and eyes can be determined, even more significant improvements to the entertainment system become possible through the use of noise canceling sound, and the rear view mirror can be automatically adjusted for the driver's eye location. Another example involves the monitoring of the driver's behavior over time, which can be used to warn a driver if he or she is falling asleep, or to stop the vehicle if the driver loses the capacity to control it.

15. Definitions

Preferred embodiments of the invention are described below and unless specifically noted, it is the applicants' intention that the words and phrases in the specification and claims be given the ordinary and accustomed meaning to those of ordinary skill in the applicable art(s). If the applicants intend any other meaning, they will specifically state they are applying a special meaning to a word or phrase.

Likewise, applicants' use of the word "function" here is not intended to indicate that the applicants seek to invoke the special provisions of 35 U.S.C. §112, sixth paragraph, to define their invention. To the contrary, if applicants wish to invoke the provisions of 35 U.S.C. §112, sixth paragraph, to define their invention, they will specifically set forth in the claims the phrases "means for" or "step for" and a function, without also reciting in that phrase any structure, material or act in support of the function. Moreover, even if applicants invoke the provisions of 35 U.S.C. §112, sixth paragraph, to define their invention, it is the applicants' intention that their inventions not be limited to the specific structure, material or acts that are described in the preferred embodiments herein. Rather, if applicants claim their inventions by specifically invoking the provisions of 35 U.S.C. §112, sixth paragraph, it is nonetheless their intention to cover and include any and all structure, materials or acts that perform the claimed function, along with any and all known or later developed equivalent structures, materials or acts for performing the claimed function.

"Pattern recognition" as used herein will generally mean any system which processes a signal that is generated by an object (e.g., representative of a pattern of returned or received impulses, waves or other physical property specific to and/or characteristic of and/or representative of that object) or is modified by interacting with an object, in order to determine to which one of a set of classes that the object belongs. Such a system might determine only that the object is or is not a member of one specified class, or it might attempt to assign the object to one of a larger set of specified classes, or find that it is not a member of any of the classes in the set. The signals processed are generally a series of electrical signals coming from transducers that are sensitive to acoustic (ultrasonic) or electromagnetic radiation (e.g., visible light, infrared radiation, capacitance or electric and/or magnetic fields), although other sources of information are frequently included. Pattern recognition systems generally involve the creation of a set of rules that permit the pattern to be recognized. These rules can be created by fuzzy logic systems, statistical correlations, or through sensor fusion methodologies as well as by trained pattern recognition systems such as neural networks, combination neural networks, cellular neural networks or support vector machines.

A trainable or a trained pattern recognition system as used herein generally means a pattern recognition system that is taught to recognize various patterns constituted within the signals by subjecting the system to a variety of examples. The most successful such system is the neural network used either singly or as a combination of neural networks. Thus, to generate the pattern recognition algorithm, test data is first obtained which constitutes a plurality of sets of returned waves, or wave patterns, or other information radiated or obtained from an object (or from the space in which the object will be situated in the passenger compartment, i.e., the space above the seat) and an indication of the identify of that object. A number of different objects are tested to obtain the unique patterns from each object. As such, the algorithm is generated, and stored in a computer processor, and which can later be applied to provide the identity of an object based on the wave pattern being received during use by a receiver connected to the processor and other information. For the purposes here, the identity of an object sometimes applies to not only the object itself but also to its location and/or orientation in the passenger compartment. For example, a rear facing child seat is a different object than a forward facing child seat and an out-of-position adult can be a different object than a normally seated adult. Not all pattern recognition systems are trained systems and not all trained systems are neural networks. Other pattern recognition systems are based on fuzzy logic, sensor fusion, Kalman filters, correlation as well as linear and non-linear regression. Still other pattern recognition systems are hybrids of more than one system such as neural-fuzzy systems.

The use of pattern recognition, or more particularly how it is used, is important to the instant invention. In the above-cited prior art, except in that assigned to the current assignee, pattern recognition which is based on training, as exemplified through the use of neural networks, is not mentioned for use in monitoring the interior passenger compartment or exterior environments of the vehicle in all of the aspects of the invention disclosed herein. Thus, the methods used to adapt such systems to a vehicle are also not mentioned.

A pattern recognition algorithm will thus generally mean an algorithm applying or obtained using any type of pattern recognition system, e.g., a neural network, sensor fusion, fuzzy logic, etc.

To “identify” as used herein will generally mean to determine that the object belongs to a particular set or class. The class may be one containing, for example, all rear facing child seats, one containing all human occupants, or all human occupants not sitting in a rear facing child seat, or all humans in a certain height or weight range depending on the purpose of the system. In the case where a particular person is to be recognized, the set or class will contain only a single element, i.e., the person to be recognized.

To “ascertain the identity of” as used herein with reference to an object will generally mean to determine the type or nature of the object (obtain information as to what the object is), i.e., that the object is an adult, an occupied rear facing child seat, an occupied front facing child seat, an unoccupied rear facing child seat, an unoccupied front facing child seat, a child, a dog, a bag of groceries, a car, a truck, a tree, a pedestrian, a deer etc.

An “object” in a vehicle or an “occupying item” of a seat may be a living occupant such as a human or a dog, another living organism such as a plant, or an inanimate object such as a box or bag of groceries or an empty child seat.

A “rear seat” of a vehicle as used herein will generally mean any seat behind the front seat on which a driver sits. Thus, in minivans or other large vehicles where there are more than two rows of seats, each row of seats behind the driver is considered a rear seat and thus there may be more than one “rear seat” in such vehicles. The space behind the front seat includes any number of such rear seats as well as any trunk spaces or other rear areas such as are present in station wagons.

An “optical image” will generally mean any type of image obtained using electromagnetic radiation including visual, infrared and radar radiation.

In the description herein on anticipatory sensing, the term “approaching” when used in connection with the mention of an object or vehicle approaching another will usually mean the relative motion of the object toward the vehicle having the anticipatory sensor system. Thus, in a side impact with a tree, the tree will be considered as approaching the side of the vehicle and impacting the vehicle. In other words, the coordinate system used in general will be a coordinate system residing in the target vehicle. The “target” vehicle is the vehicle that is being impacted. This convention permits a general description to cover all of the cases such as where (i) a moving vehicle impacts into the side of a stationary vehicle, (ii) where both vehicles are moving when they impact, or (iii) where a vehicle is moving sideways into a stationary vehicle, tree or wall.

“Out-of-position” as used for an occupant will generally mean that the occupant, either the driver or a passenger, is sufficiently close to an occupant protection apparatus (airbag) prior to deployment that he or she is likely to be more seriously injured by the deployment event itself than by the accident. It may also mean that the occupant is not positioned appropriately in order to attain the beneficial, restraining effects of the deployment of the airbag. As for the occupant being too close to the airbag, this typically occurs when the occupant’s head or chest is closer than some distance such as about 5 inches from the deployment door of the airbag module. The actual distance where airbag deployment should be suppressed depends on the design of the airbag module and is typically farther for the passenger airbag than for the driver airbag.

“Transducer” or “transceiver” as used herein will generally mean the combination of a transmitter and a receiver. In come cases, the same device will serve both as the transmitter and receiver while in others two separate devices adjacent to each other will be used. In some cases, a transmitter is not used and in such cases transducer will mean only a receiver. Transducers include, for example, capacitive, inductive, ultrasonic, electromagnetic (antenna, CCD, CMOS arrays), electric field, weight measuring or sensing devices. In some cases, a transducer will be a single pixel either acting alone, in a linear or an array of some other appropriate shape. In some cases, a transducer may comprise two parts such as the plates of a capacitor or the antennas of an electric field sensor. Sometimes, one antenna or plate will communicate with several other antennas or plates and thus for the purposes herein, a transducer will be broadly defined to refer, in most cases, to any one of the plates of a capacitor or antennas of a field sensor and in some other cases a pair of such plates or antennas will comprise a transducer as determined by the context in which the term is used.

“Adaptation” as used here will generally represent the method by which a particular occupant sensing system is designed and arranged for a particular vehicle model. It includes such things as the process by which the number, kind and location of various transducers is determined. For pattern recognition systems, it includes the process by which the pattern recognition system is designed and then taught or made to recognize the desired patterns. In this connection, it will usually include (1) the method of training when training is used, (2) the makeup of the databases used, testing and validating the particular system, or, in the case of a neural network, the particular network architecture chosen, (3) the process by which environmental influences are incorporated into the system, and (4) any process for determining the pre-processing of the data or the post processing of the results of the pattern recognition system. The above list is illustrative and not exhaustive. Basically, adaptation includes all of the steps that are undertaken to adapt transducers and other sources of information to a particular vehicle to create the system that accurately identifies and/or determines the location of an occupant or other object in a vehicle.

For the purposes herein, a "neural network" is defined to include all such learning systems including cellular neural networks, support vector machines and other kernel-based learning systems and methods, cellular automata and all other pattern recognition methods and systems that learn. A "combination neural network" as used herein will generally apply to any combination of two or more neural networks as most broadly defined that are either connected together or that analyze all or a portion of the input data.

A "morphological characteristic" will generally mean any measurable property of a human such as height, weight, leg or arm length, head diameter, skin color or pattern, blood vessel pattern, voice pattern, finger prints, iris patterns, etc.

A "wave sensor" or "wave transducer" is generally any device which senses either ultrasonic or electromagnetic waves. An electromagnetic wave sensor, for example, includes devices that sense any portion of the electromagnetic spectrum from ultraviolet down to a few hertz. The most commonly used kinds of electromagnetic wave sensors include CCD and CMOS arrays for sensing visible and/or infrared waves, millimeter wave and microwave radar, and capacitive or electric and/or magnetic field monitoring sensors that rely on the dielectric constant of the object occupying a space but also rely on the time variation of the field, expressed by waves as defined below, to determine a change in state.

A "CCD" will be defined to include all devices, including CMOS arrays, APS arrays, QWIP arrays or equivalent, artificial retinas and particularly HDRC arrays, which are capable of converting light frequencies, including infrared, visible and ultraviolet, into electrical signals. The particular CCD array used for many of the applications disclosed herein is implemented on a single chip that is less than two centimeters on a side. Data from the CCD array is digitized and sent serially to an electronic circuit (at times designated 120 herein) containing a microprocessor for analysis of the digitized data. In order to minimize the amount of data that needs to be stored, initial processing of the image data takes place as it is being received from the CCD array, as discussed in more detail above. In some cases, some image processing can take place on the chip such as described in the Kage et al. artificial retina article referenced above.

The "windshield header" as used herein includes the space above the front windshield including the first few inches of the roof.

A "sensor" as used herein is the combination of two transducers (a transmitter and a receiver) or one transducer which can both transmit and receive. The headliner is the trim which provides the interior surface to the roof of the vehicle and the A-pillar is the roof-supporting member which is on either side of the windshield and on which the front doors are hinged.

An "occupant protection apparatus" is any device, apparatus, system or component which is actuatable or deployable or includes a component which is actuatable or deployable for the purpose of attempting to reduce injury to the occupant in the event of a crash, rollover or other potential injurious event involving a vehicle

REFERENCES

1. Jacob, R. J. K. (1995). Eye tracking in advanced interface design. In Barøeld, W., & Furness, T. (Eds.), Advanced Interface Design and Virtual Environments, pp. 258288. Oxford University Press, Oxford. http://citeseer.nj.nec-.com/jacob95eye.html
2. Mirkin. Irina; Singher. Liviu "Adaptive scale-invariant filters"; Proceedings of SPIE Volume: 3159 Algorithms, Devices, and Systems for Optical Information Processing Editor(s): Javidi, Bahram; Psaltis, Demetri Published: October 1997
3. O'Callaghan, Michael J.; Ward, David J.; Perlmutter. Stephen H.; Ji, Lianhua; Walker, Christopher M.; "Highly integrated single-chip optical correlator", Proceedings of SPIE Volume: 3466 Algorithms, Devices, and Systems for Optical Information Processing IIEditor(s): Javidi, Bahram; Psaltis, Demetri, Published: October 1998
4. Awwal, Abdul Ahad S.; Michel, Howard E., "Single-step joint Fourier transform correlator", Proceedings of SPIE Volume: 3073 Optical Pattern Recognition VIII Editor(s): Casasent, David P.; Chao, Tien-Hsin, Published: March 1997
5. Javidi, Bahram, "Nonlinear joint transform correlators", *Real-Time Optical Information Processing*, B. Javidi, and J. L. Homer, eds, Academic, NY, (1994)
6. M. Böhm, "Imagers Using Amorphous Silicon Thin Film on ASIC (TFA) Technology", Journal of Non-Crystalline Solids, 266-269, pp. 1145-1151, 2000.
7. A. Eckhardt, F. Blecher, B. Schneider, J. Sterzel, S. Benthien, H. Keller, T. Lulé, P. Rieve, M. Sommer, K. Seibel, F. Mütze, M. Böhm, "Image Sensors in TFA (Thin Film on ASIC) Technology with Analog Image Pre-Processing", H. Reichl, E. Obenmeier (eds.), Proc. Micro System Technologies 98, Potsdam, Germany, pp. 165-170, 1998.
8. T. Lulé, B. Schneider, M. Böhm, "Design and Fabrication of a High Dynamic Range Image Sensor in TFA Technology", invited paper for IEEE Journal of Solid-State Circuits, Special Issue on 1998 Symposium on VLSI Circuits, 1999.
9. M. Böhm, F. Blecher, A. Eckhardt, B. Schneider, S. Benthien, H. Keller, T. Lulé, P. Rieve, M. Sommer, R. C. Lind, L. Humm, M. Daniels, N. Wu, H. Yen, "High Dynamic Range Image Sensors in Thin Film on ASIC—Technology for Automotive Applications", D. E. Ricken, W. Gessner (eds.), Advanced Microsystems for Automotive Applications, Springer-Verlag, Berlin, pp. 157-172, 1998.
10. Lake, D. W. "TFA Technology: The Coming Revolution in Photography", pp 34-49, Advanced Imagining Magazine, Apr. 2, 2002.
11. M. Böhm, F. Blecher, A. Eckhardt, K. Seibel, B. Schneider, J. Sterzel, S. Benthien, H. Keller, T. Lulé, P. Rieve, M. Sommer, B. van Uffel, F. Librecht, R. C. Lind, L. Humm, U. Efron, E. Roth, "Image Sensors in Thin Film on ASIC Technology—Status & Future Trends", Mat. Res. Soc. Symp. Proc., vol. 507, pp. 327-338, 1998.
12. Schwarte, R. "A New Powerful Sensory Tool in Automotive Safety Systems Based on PMD-Technology, S-TEC GmbHProceedings of the AMAA 2000 can be ordered at your local bookseller: "Advanced Microsystems for Automotive Applications 2000" Eds. S. Krueger, W. Gessner, Springer Verlag; Berlin, Heidelberg, New York, ISBN 3-540-67087-4
13. Nayar, S. K. and Mitsunaga, T., "High Dynamic Range Imaging: Spatially Varying Pixel Exposures" Proceedings of IEEE Conference on Computer Vision and Pattern Recognition, Hilton Head Island, S.C., June 2000.

14. Zorpette, G, "Working Knowledge: Focusing in a Flash", Scientific American Magazine, August, 2000.
15. Smeraldi, F., Carmona, J. B., "Saccadic search with Garbor features applied to eye detection and real-time head tracking", Image and Vision Computing 18 (2000) 323-329, Elsevier Science B.V.
16. Wang, Y., Yuan, B., "Human Eye Location Using Wavelet and Neural Network", Proceedings of the IEEE Internal Conference on Signal Processing 2000, p 1233-1236.
17. Sirohey, S. A., Rosenfeld, A., "Eye detection in a face using linear and nonlinear filters", Pattern Recognition 34 (2001) p 1367-1391, Elsevier Science Ltd.
18. Richards, A., *Alien Vision*, p. 6-9, 2001, SPIE Press, Bellingham, Wash.
19. Aguilar, M., Fay, D. A., Ross, W. D., Waxman, M., Ireland, D. B., and Racamato, J. P., "Real-time fusion of low-light CCD and uncooled IR imagery for color night vision" SPIE Conference on Enhanced and Synthetic Vision 1998, Orlando, Fla. SPIE Vol. 3364 p. 124-133.
20. Fletcher, P., "Polymer material promises as inexpensive and thin full-color light-emitting plastic display", Electronic Design Magazine, Jan. 8, 1996
21. . . . "Organic light-emitting diodes represent the only display technology poised to meet third-generation mobile phone standards", p. 82-85 MIT Technology Review, April 2001.
22. Robinson, A. "New 'smart' glass darkens, lightens in a flash", p. 22F, Automotive news, Aug. 31, 1998.
23. "Markets for SPD technology", .refr-spd.com/markets.html
24. Feiner, S. "Augmented Reality: a new way of seeing", Scientific American Magazine, April 2002.
25. "Sigma SD9 Digital Camera Preview and Foveon Discussion", http://www.photo.net/sigma/sd9 (May 8, 2002)

OBJECTS AND SUMMARY OF THE INVENTION

1. General Occupant Sensors

Briefly, the claimed inventions are methods and arrangements for obtaining information about an object in a vehicle. This determination is used in various methods and arrangements for, for example, controlling occupant protection devices in the event of a vehicle crash or adjusting various vehicle components.

This invention includes a system to sense the presence, position and type of an occupying item such as a child seat in a passenger compartment of a motor vehicle and more particularly, to identify and monitor the occupying items and their parts and other objects in the passenger compartment of a motor vehicle, such as an automobile or truck, by processing one or more signals received from the occupying items and their parts and other objects using one or more of a variety of pattern recognition techniques and illumination technologies. The received signal(s) may be a reflection of a transmitted signal, the reflection of some natural signal within the vehicle, or may be some signal emitted naturally by the object. Information obtained by the identification and monitoring system is then used to affect the operation of some other system in the vehicle.

This invention is also a system designed to identify, locate and monitor occupants, including their parts, and other objects in the passenger compartment and in particular an occupied child seat in the rear facing position or an out-of-position occupant, by illuminating the contents of the vehicle with ultrasonic or electromagnetic radiation, for example, by transmitting radiation waves, as broadly defined above to include capacitors and electric or magnetic fields, from a wave generating apparatus into a space above the seat, and receiving radiation modified by passing through the space above the seat using two or more transducers properly located in the vehicle passenger compartment, in specific predetermined optimum locations.

More particularly, this invention relates to a system including a plurality of transducers appropriately located and mounted and which analyze the received radiation from any object which modifies the waves or fields, or which analyze a change in the received radiation caused by the presence of the object (e.g., a change in the dielectric constant), in order to achieve an accuracy of recognition not possible to achieve in the past. Outputs from the receivers are analyzed by appropriate computational means employing trained pattern recognition technologies, and in particular combination neural networks, to classify, identify and/or locate the contents, and/or determine the orientation of, for example, a rear facing child seat.

In general, the information obtained by the identification and monitoring system is used to affect the operation of some other system, component or device in the vehicle and particularly the passenger and/or driver airbag systems, which may include a front airbag, a side airbag, a knee bolster, or combinations of the same. However, the information obtained can be used for controlling or affecting the operation of a multitude of other vehicle systems.

When the vehicle interior monitoring system in accordance with the invention is installed in the passenger compartment of an automotive vehicle equipped with an occupant protection apparatus, such as an inflatable airbag, and the vehicle is subjected to a crash of sufficient severity that the crash sensor has determined that the protection apparatus is to be deployed, the system has determined (usually prior to the deployment) whether a child placed in the child seat in the rear facing position is present and if so, a signal has been sent to the control circuitry that the airbag should be controlled and most likely disabled and not deployed in the crash.

It must be understood though that instead of suppressing deployment, it is possible that the deployment may be controlled so that it might provide some meaningful protection for the occupied rear-facing child seat. The system developed using the teachings of this invention also determines the position of the vehicle occupant relative to the airbag and controls and possibly disables deployment of the airbag if the occupant is positioned so that he or she is likely to be injured by the deployment of the airbag. As before, the deployment is not necessarily disabled but may be controlled to provide protection for the out-of-position occupant.

The invention also includes methods and arrangements for obtaining information about an object in a vehicle. This determination is used in various methods and arrangements for, e.g., controlling occupant protection devices in the event of a vehicle crash. The determination can also used in various methods and arrangements for, e.g., controlling heating and air-conditioning systems to optimize the comfort for any occupants, controlling an entertainment system as desired by the occupants, controlling a glare prevention device for the occupants, preventing accidents by a driver who is unable to safely drive the vehicle and enabling an effective and optimal response in the event of a crash (either oral directions to be communicated to the occupants or the dispatch of personnel to aid the occupants). Thus, one objective of the invention is to obtain information about occupancy of a vehicle and convey this information to remotely situated assistance personnel to optimize their response to a crash involving the vehicle and/or enable proper assistance to be rendered to the occupants after the crash.

Some other objects related to general occupant sensors are:

To provide a new and improved system for identifying the presence, position and/or orientation of an object in a vehicle.

To provide a system for accurately detecting the presence of an occupied rear-facing child seat in order to prevent an occupant protection apparatus, such as an airbag, from deploying, when the airbag would impact against the rear-facing child seat if deployed.

To provide a system for accurately detecting the presence of an out-of-position occupant in order to prevent one or more deployable occupant protection apparatus such as airbags from deploying when the airbag(s) would impact against the head or chest of the occupant during its initial deployment phase causing injury or possible death to the occupant.

To provide an interior monitoring system that utilizes reflection, scattering, absorption or transmission of waves including capacitive or other field based sensors.

To determine the presence of a child in a child seat based on motion of the child.

To recognize the presence of a human on a particular seat of a motor vehicle and then to determine his or her velocity relative to the passenger compartment and to use this velocity information to affect the operation of another vehicle system.

To determine the presence of a life form anywhere in a vehicle based on motion of the life form.

To provide an occupant sensing system which detects the presence of a life form in a vehicle and under certain conditions, activates a vehicular warning system or a vehicular system to prevent injury to the life form.

To recognize the presence of a human on a particular seat of a motor vehicle and then to determine his or her position and to use this position information to affect the operation of another vehicle system.

To provide a reliable system for recognizing the presence of a rear-facing child seat on a particular seat of a motor vehicle.

To provide a reliable system for recognizing the presence of a human being on a particular seat of a motor vehicle.

To provide a reliable system for determining the position, velocity or size of an occupant in a motor vehicle.

To provide a reliable system for determining in a timely manner that an occupant is out-of-position, or will become out-of-position, and likely to be injured by a deploying airbag.

To provide an occupant vehicle interior monitoring system which has high resolution to improve system accuracy and permits the location of body parts of the occupant to be determined.

1.1 Ultrasonics

Some objects mainly related to ultrasonic sensors are:

To provide adjustment apparatus and methods that evaluate the occupancy of the seat by a combination of ultrasonic sensors and additional sensors and adjust the location and/or orientation relative to the occupant and/or operation of a part of the component or the component in its entirety based on the evaluated occupancy of the seat.

To provide an occupant vehicle interior monitoring system this is not affected by temperature or thermal gradients.

1.2 Optics

It is an object of this invention to provide for the use of naturally occurring and artificial electromagnetic radiation in the visual, IR and ultraviolet portions of the electromagnetic spectrum. Such systems can employ, among others, cameras, CCD and CMOS arrays, Quantum Well Infrared Photodetector arrays, focal plane arrays and other imaging and radiation detecting devices and systems.

1.3 Ultrasonics and Optics

It is an object of this invention to employ a combination of optical systems and ultrasonic systems to exploit the advantages of each system.

1.4 Other Transducers

It is an object of this invention to also employ other transducers such as seat position, temperature, acceleration, pressure and other sensors and antennas.

2. Adaptation

It is an object of this invention to provide for the adaptation of a system comprising a variety of transducers such as seatbelt payout sensors, seatbelt buckle sensors, seat position sensors, seatback position sensors, and weight sensors and which is adapted so as to constitute a highly reliable occupant presence and position system when used in combination with electromagnetic, ultrasonic or other radiation or field sensors.

3. Mounting Locations for and Quantity of Transducers

It is an object of this invention to provide for one or a variety of transducer mounting locations in and on the vehicle including the headliner, A-Pillar, B-Pillar, C-Pillar, instrument panel, rear view mirror, windshield, doors, windows and other appropriate locations for the particular application.

3.1 Single Camera, Dual Camera with Single Light Source

It is an object of this invention to provide a single camera system that passes the requirements of FMVSS-208.

3.2 Location of the Transducers

It is an object of this invention to provide for a driver monitoring system using an imaging transducer mounted on the rear view mirror.

It is an object of this invention to provide a system in which transducers are located within the passenger compartment at specific locations such that a high reliability of classification of objects and their position is obtained from the signals generated by the transducers.

3.3 Color Cameras—Multispectral Imaging

It is an object of this invention to, where appropriate, use all frequencies or selected frequencies of the IR, visual and ultraviolet portions of the electromagnetic spectrum.

3.4 High Dynamic Range Cameras

It is an object of this invention to provide an imaging system that has sufficient dynamic range for the application. This may include the use of a high dynamic range camera (such as 120 db) or the use a lower dynamic range (such as 70 db or less) along with a method of adjusting the exposure either through iris or shutter control.

3.5 Fisheye Lens, Pan and Zoom

It is an object of this invention, where appropriate, to provide for the use of a fisheye or similar very wide angle lens and to thereby achieve wide coverage and in some cases a pan and zoom capability.

It is a further object of this invention to provide for a low cost single element lens that can mount directly on the imaging chip.

4. 3D Cameras

It is a further object of this invention to provide an interior monitoring system which provides three-dimensional information about an occupying item from a single transducer mounting location.

4.1 Stereo Vision

It is a further object of this invention for some applications, where appropriate, to achieve a three dimensional representation of objects in the passenger compartment through the use of at least two cameras. When two cameras are used, they may or may not be located near each other.

4.2 Distance by Focusing

It is a further object of this invention to provide a method of measuring the distance from a sensor to an occupant or part thereof using calculations based of the degree of focus of an image.

4.3 Ranging

Further objects of this invention are:

To provide a vehicle monitoring system using modulated radiation to aid in the determining of the distance from a transducer (either ultrasonic or electromagnetic) to an occupying item of a vehicle.

To provide a system of frequency domain modulation of the illumination of an object interior or exterior of a vehicle.

To utilize code modulation such as with a pseudo random code to permit the unambiguous monitoring of the vehicle exterior in the presence of other vehicles with the same system.

To use a chirp frequency modulation technique to aid in determining the distance to an object interior or exterior of a vehicle.

To utilize a correlation pattern modulation in a form of code division modulation for determining the distance of an object interior or exterior of a vehicle.

4.4 Pockel or Kerr Cell for Determining Range

It is a further object of this invention to utilize a Pockel cell, Kerr cell or equivalent to aid in determining the distance to an object in the interior or exterior of a vehicle.

4.5 Thin Film on ASIC (TFA)

It is a further object of this invention to incorporate TFA technology in such a manner as to provide a three dimensional image of the interior or exterior of a vehicle.

5. Glare Control

Further objects of this invention are:

To determine the location of the eyes of a vehicle occupant and the direction of a light source such as the headlights of an oncoming vehicle or the sun and to cause a filter to be placed in such a manner as to reduce the intensity of the light striking the eyes of the occupant.

To determine the location of the eyes of a vehicle occupant and the direction of a light source such as the headlights of a rear approaching vehicle or the sun and to cause a filter to be placed to reduce the intensity of the light reflected from the rear view mirrors and striking the eyes of the occupant.

To provide a glare filter for a glare reduction system that uses semiconducting or metallic (organic) polymers to provide a low cost system, which may reside in the windshield, visor, mirror or special device.

To provide a glare filter based on electronic Venetian blinds, polarizers or spatial light monitors.

5.1 Windshield

It is a further object of this invention to determine the location of the eyes of a vehicle occupant and the direction of a light source such as the headlights of an oncoming vehicle or the sun and to cause a filter to be placed to reduce the intensity of the light striking the eyes of the occupant.

It is a further object of this invention to provide a windshield where a substantial part of the area is covered by a plastic electronics film for a display and/or glare control.

5.2 Glare in Rear View Mirrors

It is an additional object of this invention to determine the location of the eyes of a vehicle occupant and the direction of a light source such as the headlights of a rear approaching vehicle or the sun and to cause a filter to be placed in a rear view mirror such a manner as to reduce the intensity of the light striking the eyes of the occupant. 5.3 Visor for Glare Control and HUD It is a further object of this invention to provide an occupant vehicle interior monitoring system which reduces the glare from sunlight and headlights by imposing a filter between the eyes of an occupant and the light source wherein the filter is placed in a visor.

6. Weight Measurement and Biometrics

Further objects of this invention are:

To provide a system and method wherein the weight of an occupant is determined utilizing sensors located on the seat structure.

To provide apparatus and methods for measuring the weight of an occupying item on a vehicle seat which may be integrated into vehicular component adjustment apparatus and methods which evaluate the occupancy of the seat and adjust the location and/or orientation relative to the occupant and/or operation of a part of the component or the component in its entirety based on the evaluated occupancy of the seat.

To provide vehicular seats including a weight measuring feature and weight measuring methods for implementation in connection with vehicular seats.

To provide vehicular seats in which the weight applied by an occupying item to the seat is measured based on capacitance between conductive and/or metallic members underlying the seat cushion.

To provide adjustment apparatus and methods that evaluate the occupancy of the seat and adjust the location and/or orientation relative to the occupant and/or operation of a part of the component or the component in its entirety based on the evaluated occupancy of the seat and on a measurement of the occupant's weight or a measurement of a force exerted by the occupant on the seat.

To provide weight measurement systems in order to improve the accuracy of another apparatus or system that utilizes measured weight as input, e.g., a component adjustment apparatus.

To provide a system where the morphological characteristics of an occupant are measured by sensors located within the seat.

To provide a system for recognizing the identity of a particular individual in the vehicle.

6.1 Strain Gage Weight Sensors

It is a further object of this invention to provide a weight measuring system based on the use of one or more strain gages.

Accordingly, one embodiment of the present invention is a seat weight measuring apparatus for measuring the weight of an occupying item of the seat wherein a load sensor is installed at at least one location where the seat is attached to the vehicle body, for measuring a part of the load applied to the seat including the seat back and the sitting surface of the seat.

According to this embodiment of the invention, because a load sensor can be installed only at a single location of the seat, the production cost and the assembling/wiring cost may be reduced in comparison with the related art.

An object of the seat weight measuring apparatus stated herein is basically to measure the weight of the occupying item of the seat. Therefore, the apparatus for measuring only the weight of the passenger by canceling the net weight of the seat is included as an optional feature in the seat weight measuring apparatus in accordance with the invention.

The seat weight measuring apparatus according to another embodiment of the present invention is a seat weight measuring apparatus for measuring the weight of an occupying item of the seat comprising a load sensor installed at at least one of the left and right seat frames at a portion of the seat at which the seat is fixed to the vehicle body.

The seat weight measuring apparatus of the present invention may further comprise a position sensor for detecting the position of occupying item of the seat. Considering the result detected by the position sensor makes the result detected by the load sensor more accurate.

6.2 Bladder Weight Sensors

It is a further object of this invention to provide a weight measuring system based on the use of one or more fluid-filled bladders.

To achieve this object and others, a weight sensor for determining the weight of an occupant of a seat, in accordance with the invention includes a bladder arranged in a seat portion of the seat and including material or structure arranged in an interior for constraining fluid flow therein, and one or more transducers for measuring the pressure of the fluid in the interior of the bladder. The material or structure could be open cell foam. The bladder may include one or more chambers and if more than one chamber is provided, each chamber may be arranged at a different location in the seat portion of the seat.

An apparatus for determining the weight distribution of the occupant in accordance with the invention includes the weight sensor described above, in any of the various embodiments, with the bladder including several chamber and multiple transducers with each transducer being associated with a respective chamber so that weight distribution of the occupant is obtained from the pressure measurements of said transducers.

A method for determining the weight of an occupant of an automotive seat in accordance with the invention involves arranging a bladder having at least one chamber in a seat portion of the seat, measuring the pressure in each chamber and deriving the weight of the occupant based on the measured pressure. The pressure in each chamber may be measured by a respective transducer associated therewith. The weight distribution of the occupant, the center of gravity of the occupant and/or the position of the occupant can be determined based on the pressure measured by the transducer(s). In one specific embodiment, the bladder is arranged in a container and fluid flow between the bladder and the container is permitted and optionally regulated, for example, via an adjustable orifice between the bladder and the container.

A vehicle seat in accordance with the invention includes a seat portion including a container having an interior containing fluid and a mechanism, material or structure therein to restrict flow of the fluid from one portion of the interior to another portion of the interior, a back portion arranged at an angle to the seat portion, and a measurement system arranged to obtain an indication of the weight of the occupant when present on the seat portion based at least in part on the pressure of the fluid in the container.

In another vehicle seat in accordance with the invention, a container in the seat portion has an interior containing fluid and partitioned into multiple sections between which the fluid flows as a function of pressure applied to the seat portion. A measurement system obtains an indication of the weight of the occupant when present on the seat portion based at least in part on the pressure of the fluid in the container. The container may be partitioned into an inner bladder and an outer container. In this case, the inner bladder may include an orifice leading to the outer container which has an adjustable size, and a control circuit controls the amount of opening of the orifice to thereby regulate fluid flow and pressure in and between the inner bladder and the outer container.

In another embodiment of a seat for a vehicle, the seat portion includes a bladder having a fluid-containing interior and is mounted by a mounting structure to a floor pan of the vehicle. A measurement system is associated with the bladder and arranged to obtain an indication of the weight of the occupant when present on the seat portion based at least in part on the pressure of the fluid in the bladder.

A control system for controlling vehicle components based on occupancy of a seat as reflected by analysis of the weight of the seat is also disclosed which and includes a bladder having at least one chamber and arranged in a seat portion of the seat; a measurement system for measuring the pressure in the chamber(s), one or more adjustment systems arranged to adjust one or more components in the vehicle and a processor coupled to the measurement system and to the adjustment system for determining an adjustment for the component(s) by the adjustment system based at least in part on the pressure measured by the measurement system. The adjustment system may be a system for adjusting deployment of an occupant restraint device, such as an airbag. In this case, the deployment adjustment system is arranged to control flow of gas into an airbag, flow of gas out of an airbag, rate of generation of gas and/or amount of generated gas. The adjustment system could also be a system for adjusting the seat, e.g., one or more motors for moving the seat, a system for adjusting the steering wheel, e.g., a motor coupled to the steering wheel, a system for adjusting a pedal., e.g., a motor coupled to the pedal.

6.3 Combined Spatial and Weight

It is a further object of this invention to provide an occupant sensing system that comprises both a weight measuring system and a special sensing system.

6.4 Face Recognition (Face and Iris IR Scans)

It is a further object of this invention to recognize a particular driver based on such factors as facial characteristics, physical appearance or other attributes and to use this information to control another vehicle system such as the vehicle ignition, a security system, seat adjustment, or maximum permitted vehicle velocity, among others.

6.5 Heartbeat and Health State

Further objects of this invention are:

To provide a system using radar which detects a heartbeat of life forms in a vehicle.

To provide an occupant sensor which determines the presence and health state of any occupants in a vehicle. The presence of the occupants may be determined using an animal life or heart beat sensor.

To provide an occupant sensor that determines whether any occupants of the vehicle are breathing by analyzing the occupant's motion. It can also be determined whether an occupant is breathing with difficulty.

To provide an occupant sensor which determines whether any occupants of the vehicle are breathing by analyzing the chemical composition of the air/gas in the vehicle, e.g., in proximity of the occupant's mouth.

To provide an occupant sensor that determines whether any occupants of the vehicle are conscious by analyzing movement of their eyes.

To provide an occupant sensor which determines whether any occupants of the vehicle are wounded to the extent that they are bleeding by analyzing air/gas in the vehicle, e.g., directly around each occupant.

To provide an occupant sensor which determines the presence and health state of any occupants in the vehicle by analyzing sounds emanating from the passenger compartment. Such sounds can be directed to a remote, manned site for consideration in dispatching response personnel.

To provide a system using radar that detects a heartbeat of life forms in a vehicle.

7. Illumination 7.1 Infrared Light

It is a further object of this invention provide for infrared illumination in one or more of the near IR, SWIR, MWIR or LWIR regions of the infrared portion of the electromagnetic spectrum for illuminating the environment inside or outside of a vehicle.

7.2 Structured Light

It is a further object of this invention to use structured light to help determine the distance to an object from a transducer.

7.3 Color and Natural Light

It is a further object of this invention to provide a system that uses colored light and natural light in monitoring the interior or exterior of a vehicle.

7.4 Radar

Further objects of this invention are:

To provide an occupant sensor which determines whether any occupants of the vehicle are moving using radar systems, e.g., micropower impulse radar (MIR), which can also detect the heartbeats of any occupants.

To provide an occupant sensor which determines whether any occupants of the vehicle are moving using radar systems, such as micropower impulse radar (MIR), which can also detect the heartbeats of any occupants and, optionally, to send this information by telematics to one or more remote sites.

8. Field Sensors and Antennas

It is a further object of this invention to provide a very low cost monitoring and presence detection system that uses the property that water in the near field of an antenna changes the antenna's loading or impedance matching or resonant properties.

9. Telematics

The occupancy determination can also be used in various methods and arrangements for, controlling heating and air-conditioning systems to optimize the comfort for any occupants, controlling an entertainment system as desired by the occupants, controlling a glare prevention device for the occupants, preventing accidents by a driver who is unable to safely drive the vehicle and enabling an effective and optimal response in the event of a crash (either oral directions to be communicated to the occupants or the dispatch of personnel to aid the occupants) as well as many others. Thus, one objective of the invention is to obtain information about occupancy of a vehicle before, during and/or after a crash and convey this information to remotely situated assistance personnel to optimize their response to a crash involving the vehicle and/or enable proper assistance to be rendered to the occupants after the crash.

Further objects of this invention are:

To determine the total number of occupants of a vehicle and in the event of an accident to transmit that information, as well as other information such as the condition of the occupants, to a receiver remote from the vehicle.

To determine the total number of occupants of a vehicle and in the event of an accident to transmit that information, as well as other information such as the condition of the occupants before, during and/or after a crash, to a receiver remote from the vehicle, such information may include images.

To provide an occupant sensor which determines the presence and health state of any occupants in a vehicle and, optionally, to send this information by telematics to one or more remote sites. The presence of the occupants may be determined using an animal life or heartbeat sensors To provide an occupant sensor which determines whether any occupants of the vehicle are breathing or breathing with difficulty by analyzing the occupant's motion and, optionally, to send this information by telematics to one or more remote sites.

To provide an occupant sensor which determines whether any occupants of the vehicle are breathing by analyzing the chemical composition of in the vehicle and, optionally, to send this information by telematics to one or more remote sites.

To provide an occupant sensor which determines whether any occupants of the vehicle are conscious by analyzing movement of their eyes, eyelids or other parts and, optionally, to send this information by telematics to one or more remote sites.

To provide an occupant sensor which determines whether any occupants of the vehicle are wounded to the extent that they are bleeding by analyzing the gas/air in the vehicle and, optionally, to send this information by telematics to one or more remote sites.

To provide an occupant sensor which determines the presence and health state of any occupants in the vehicle by analyzing sounds emanating from the passenger compartment and, optionally, to send this information by telematics to one or more remote sites. Such sounds can be directed to a remote, manned site for consideration in dispatching response personnel.

To provide a vehicle monitoring system which provides a communications channel between the vehicle (possibly through microphones distributed throughout the vehicle) and a manned assistance facility to enable communications with the occupants after a crash or whenever the occupants are in need of assistance (e.g., if the occupants are lost, then data forming maps as a navigational aid would be transmitted to the vehicle).

10. Display 10.1 Heads-up Display

It is a further object of this invention to provide a heads-up display that positions the display on the windshield based of the location of the eyes of the driver so as to place objects at the appropriate location in the field of view.

10.2 Adjust HUD Based on Driver Seating Position

It is a further object of this invention to provide a heads-up display that positions the display on the windshield based of the seating position of the driver so as to place objects at the appropriate location in the field of view.

10.3 HUD on Rear Window

It is a further object of this invention to provide a heads-up display that positions the display on a rear window.

10.4 Plastic Electronics

It is a further object of this invention to provide a heads-up display that uses plastic electronics rather than a projection system.

11. Pattern Recognition

It is a further object of this invention to use pattern recognition techniques for determining the identity or location of an occupant or object in a vehicle.

It is a further object of this invention to use pattern recognition techniques for analyzing three-dimensional image data of occupants of a vehicle and objects exterior to the vehicle.

11.1 Neural Nets

It is a further object of this invention to use pattern recognition techniques comprising neural networks.

11.2 Combination Neural Nets

It is a further object of this invention to use combination neural networks.

11.3 Interpretation of Other Occupant States—Inattention, Sleep

Further objects of this invention are:

To monitor the position of the head of the vehicle driver and determine whether the driver is falling asleep or otherwise impaired and likely to lose control of the vehicle and to use that information to affect another vehicle system.

To monitor the position of the eyes or eyelids of the vehicle driver and determine whether the driver is falling asleep or otherwise impaired and likely to lose control of the vehicle, or is unconscious after an accident, and to use that information to affect another vehicle system.

To monitor the position of the head and/or other parts of the vehicle driver and determine whether the driver is falling asleep or otherwise impaired and likely to lose control of the vehicle and to use that information to affect another vehicle system.

11.4 Combining Occupant Monitoring and Car Monitoring

It is a further object of this invention to use a combination of occupant monitoring and vehicle monitoring to aid in determining if the driver is about to lose control of the vehicle.

11.5 Continuous Tracking

It is a further object of this invention to provide an occupant position determination in a sufficiently short time that the position of an occupant can be tracked during a vehicle crash.

It is a further object of this invention that the pattern recognition system is trained on the position of the occupant relative to the airbag rather than what zone the occupant occupies.

11.6 Preprocessing

Further objects of this invention are:

To determine the presence of a child in a child seat based on motion of the child.

To determine the presence of a life form anywhere in a vehicle based on motion of the life form.

To provide a system using electromagnetics or ultrasonics to detect motion of objects in a vehicle and enable the use of the detection of the motion for control of vehicular components and systems.

11.7 Post Processing

It is another object of this invention to apply a filter to the output of the pattern recognition system that is based on previous decisions as a test of reasonableness.

12. Other products, Outputs, Features

It is an object of the present invention to provide new and improved arrangements and methods for adjusting or controlling a component in a vehicle. Control of a component does not require an adjustment of the component if the operation of the component is appropriate for the situation.

It is another object of the present invention to provide new and improved methods and apparatus for adjusting a component in a vehicle based on occupancy of the vehicle. For example, an airbag system may be controlled based on the location of a seat and the occupant of the seat to be protected by the deployment of the airbag.

Further objects of this invention related to additional capabilities are:

To recognize the presence of an object on a particular seat of a motor vehicle and to use this information to affect the operation of another vehicle system such as the entertainment system, airbag system, heating and air conditioning system, pedal adjustment system, mirror adjustment system, wireless data link system or cellular phone, among others.

To recognize the presence of an object on a particular seat of a motor vehicle and then to determine his/her position and to use this position information to affect the operation of another vehicle system.

To determine the approximate location of the eyes of a driver and to use that information to control the position of the rear view mirrors of the vehicle.

To recognize a particular driver based on such factors as physical appearance or other attributes and to use this information to control another vehicle system such as a security system, seat adjustment, or maximum permitted vehicle velocity, among others.

To recognize the presence of a human on a particular seat of a motor vehicle and then to determine his/her velocity relative to the passenger compartment and to use this velocity information to affect the operation of another vehicle system.

To provide a system using electromagnetics or ultrasonics to detect motion of objects in a vehicle and enable the use of the detection of the motion for control of vehicular components and systems.

To provide a system for passively and automatically adjusting the position of a vehicle component to a near optimum location based on the size of an occupant.

To provide adjustment apparatus and methods that reliably discriminate between a normally seated passenger and a forward facing child seat, between an abnormally seated passenger and a rear facing child seat, and whether or not the seat is empty and adjust the location and/or orientation relative to the occupant and/or operation of a part of the component or the component in its entirety based thereon.

To provide a system for recognizing a particular occupant of a vehicle and thereafter adjusting various components of the vehicle in accordance with the preferences of the recognized occupant.

To provide a pattern recognition system to permit more accurate location of an occupant's head and the parts thereof and to use this information to adjust a vehicle component.

To provide a system for automatically adjusting the position of various components of the vehicle to permit safer and more effective operation of the vehicle including the location of the pedals and steering wheel.

To recognize the presence of a human on a particular seat of a motor vehicle and then to determine his or her position and to use this position information to affect the operation of another vehicle system.

12.1 Control of Passive Restraints

It is another object of the present invention to provide new and improved arrangements and methods for controlling an occupant protection device based on the morphology of an occupant to be protected by the actuation of the device and optionally, the location of a seat on which the occupant is sitting. Control of the occupant protection device can entail suppression of actuation of the device, or adjusting of the actuation parameters of the device if such adjustment is deemed necessary.

Further objects of this invention related to control of passive restraints are:

To determine the position, velocity or size of an occupant in a motor vehicle and to utilize this information to control the rate of gas generation, or the amount of gas generated, by an airbag inflator system or otherwise control the flow of gas into or out of an airbag.

To determine the fact that an occupant is not restrained by a seatbelt and therefore to modify the characteristics of the airbag system. This determination can be done either by monitoring the position of the occupant or through the use of a resonating device placed on the shoulder belt portion of the seatbelt.

To determine the presence and/or position of rear seated occupants in the vehicle and to use this information to affect the operation of a rear seat protection airbag for frontal, rear or side impacts, or rollovers.

To recognize the presence of a rear facing child seat on a particular seat of a motor vehicle and to use this information to affect the operation of another vehicle system such as the airbag system.

To provide a vehicle interior monitoring system for determining the location of occupants within the vehicle and to include within the same system various electronics for controlling an airbag system.

To provide an occupant sensing system which detects the presence of a life form in a vehicle and under certain conditions, activates a vehicular warning system or a vehicular system to prevent injury to the life form.

To determine whether an occupant is out-of-position relative to the airbag and if so, to suppress deployment of the airbag in a situation in which the airbag would otherwise be deployed.

To adjust the flow of gas into or out of the airbag based on the morphology and position of the occupant to improve the performance of the airbag in reducing occupant injury.

To provide an occupant position sensor which reliably permits, and in a timely manner, a determination to be made that the occupant is out-of-position, or will become out-of-position, and likely to be injured by a deploying airbag and to then output a signal to suppress the deployment of the airbag.

To determine the position, velocity or size of an occupant in a motor vehicle and to utilize this information to control the rate of gas generation, or the amount of gas generated by an airbag inflator system.

12.2 Seat, Seatbelt Adjustment and Resonators

Further objects of this invention related to control of passive restraints are:

To determine the position of a seat in the vehicle using sensors remote from the seat and to use that information in conjunction with a memory system and appropriate actuators to position the seat to a predetermined location.

To remotely determine the fact that a vehicle door is not tightly closed using an illumination transmitting and receiving system such as one employing electromagnetic or acoustic waves.

To determine the position of the shoulder of a vehicle occupant and to use that information to control the seatbelt anchorage point.

To obtain information about an object in a vehicle using resonators or reflectors arranged in association with the object, such as the position of the object and the orientation of the object.

To provide a system designed to determine the orientation of a child seat using resonators or reflectors arranged in connection with the child seat.

To provide a system designed to determine whether a seatbelt is in use using resonators and reflectors, for possible use in the control of a safety device such as an airbag.

To provide a system designed to determine the position of an occupying item of a vehicle using resonators or reflectors, for possible use in the control of a safety device such as an airbag.

To provide a system designed to determine the position of a seat using resonators or reflectors, for possible use in the control of a vehicular component or system which would be affected by different seat positions.

To obtain information about an object in a vehicle using resonators or reflectors arranged in association with the object, such as the position of the object and the orientation of the object.

To determine the approximate location of the eyes of a driver and to use that information to control the position of the rear view mirrors of the vehicle and/or adjust the seat.

To control a vehicle component using eye tracking techniques.

To provide systems for approximately locating the eyes of a vehicle driver to thereby permit the placement of the driver's eyes at a particular location in the vehicle.

To provide a method of determining whether a seat is occupied and, if not, leaving the seat at a neutral position.

12.3 Side Impacts

It is a further object of this invention to determine the presence and/or position of occupants relative to the side impact airbag systems and to use this information to affect the operation of a side impact protection airbag system. 12.4 Children and Animals Left Alone It is a further object of this invention to detect whether children or animals are left alone in a vehicle or vehicle trunk and the environment is placing such children or animals in danger.

12.5 Vehicle Theft

It is a further object of this invention to prevent hijackings by warning the driver that a life form is in the vehicle as the driver approaches the vehicle.

12.6 Security, Intruder Protection

It is a further object of this invention to provide a security system for a vehicle which determines the presence of an unexpected life form in a vehicle and conveys the determination prior to entry of a driver into the vehicle.

It is a further object of this invention to recognize a particular driver based on such factors as physical appearance or other attributes and to use this information to control another vehicle system such as a security system, seat adjustment, or maximum permitted vehicle velocity, among others.

12.7 Entertainment System Control

Further objects of this invention related to control of the entertainment system are:

To affect the vehicle entertainment system, e.g., the speakers, based on a determination of the number, size and/or location of various occupants or other objects within the vehicle passenger compartment.

To determine the location of the ears of one or more vehicle occupants and to use that information to control the entertainment system, e.g., the speakers, so as to improve the quality of the sound reaching the occupants' ears through such methods as noise canceling sound.

12.8 HVAC

Further objects of this invention related to control of the HVAC system are:

To affect the vehicle heating, ventilation and air conditioning system based on a determination of the number, size and location of various occupants or other objects within the vehicle passenger compartment.

To determine the temperature of an occupant based on infrared radiation coming from that occupant and to use that information to control the heating, ventilation and air conditioning system.

To recognize the presence of a human on a particular seat of a motor vehicle and to use this information to affect the operation of another vehicle system such as the airbag, heating and air conditioning, or entertainment systems, among others.

12.9 Obstruction

Further objects of this invention related to sensing of window and door obstructions are:

To determine the openness of a vehicle window and to use that information to affect another vehicle system.

To determine the presence of an occupant's hand or other object in the path of a closing window and to affect the window closing system.

To determine the presence of an occupant's hand or other object in the path of a closing door and to affect the door closing system.

12.10 Rear Impacts

It is a further object of this invention to determine the position of the rear of an occupant's head and to use that information to control the position of the headrest.

It is an object of the present invention to provide new and improved headrests for seats in a vehicle which offer protection for an occupant in the event of a crash involving the vehicle.

It is another object of the present invention to provide new and improved seats for vehicles which offer protection for an occupant in the event of a crash involving the vehicle.

It is still another object of the present invention to provide new and improved cushioning arrangements for vehicles and protection systems including cushioning arrangements which provide protection for occupants in the event of a crash involving the vehicle.

It is yet another object of the present invention to provide new and improved cushioning arrangements for vehicles and protection systems including cushioning arrangements which provide protection for occupants in the event of a collision into the rear of the vehicle, i.e., a rear impact.

It is yet another object of the present invention to provide new and improved vehicular systems which reduce whiplash injuries from rear impacts of a vehicle by causing the headrest to be automatically positioned proximate to the occupant's head.

It is yet another object of the present invention to provide new and improved vehicular systems to position a headrest proximate to the head of a vehicle occupant prior to a pending impact into the rear of a vehicle.

It is yet another object of the present invention to provide a simple anticipatory sensor system for use with an adjustable headrest to predict a rear impact.

It is yet another object of the present invention to provide a method and arrangement for protecting an occupant in a vehicle during a crash involving the vehicle using an anticipatory sensor system and a cushioning arrangement including a fluid-containing bag which is brought closer toward the occupant or ideally in contact with the occupant prior to or coincident with the crash. The bag would then conform to the portion of the occupant with which it is in contact.

It is yet another object of the present invention to provide an automatically adjusting system which conforms to the head and neck geometry of an occupant regardless of the occupant's particular morphology to properly support both the head and neck.

In order to achieve at least one of the immediately foregoing objects, a vehicle in accordance with the invention comprises a seat including a movable headrest against which an occupant can rest his or her head, an anticipatory crash sensor arranged to detect an impending crash involving the vehicle based on data obtained prior to the crash, and a movement mechanism coupled to the crash sensor and the headrest and arranged to move the headrest upon detection of an impending crash involving the vehicle by the crash sensor.

The crash sensor may be arranged to produce an output signal when an object external from the vehicle is approaching the vehicle at a velocity above a design threshold velocity. The crash sensor may be any type of sensor designed to provide an assessment or determination of an impending impact prior to the impact, i.e., from data obtained prior to the impact. Thus, the crash sensor can be an ultrasonic sensor, an electromagnetic wave sensor, a radar sensor, a noise radar sensor and a camera, a scanning laser radar and a passive infrared sensor.

To optimize the assessment of an impending crash, the crash sensor can be designed to determine the distance from the vehicle to an external object whereby the velocity of the external object is calculatable from successive distance measurements. To this end, the crash sensor can employ means for measuring time of flight of a pulse, means for measuring a phase change, means for measuring a Doppler radar pulse and means for performing range gating of an ultrasonic pulse, an optical pulse or a radar pulse.

To further optimize the assessment, the crash sensor may comprise pattern recognition means for recognizing, identifying or ascertaining the identity of external objects. The pattern recognition means may comprise a neural network, fuzzy logic, fuzzy system, neural-fuzzy system, sensor fusion and other types of pattern recognition systems.

The movement mechanism may be arranged to move the headrest from an initial position to a position more proximate to the head of the occupant.

Optionally, a determining system determines the location of the head of the occupant in which case, the movement mechanism may move the headrest from an initial position to a position more proximate to the determined location of the head of the occupant. The determining system can include a wave-receiving sensor arranged to receive waves from a direction of the head of the occupant. More particularly, the determining system can comprise a transmitter for transmitting radiation to illuminate different portions of the head of the occupant, a receiver for receiving a first set of signals representative of radiation reflected from the different portions of the head of the occupant and providing a second set of signals representative of the distances from the headrest to the nearest illuminated portion the head of the occupant, and a processor comprising computational means to determine the headrest vertical location corresponding to the nearest part of the head to the headrest from the second set of signals from the receiver. The transmitter and receiver may be arranged in the headrest.

The head position determining system can be designed to use waves, energy, radiation or other properties or phenomena. Thus, the determining system may include an electric field sensor, a capacitance sensor, a radar sensor, an optical sensor, a camera, a three-dimensional camera, a passive infrared sensor, an ultrasound sensor, a stereo sensor, a focusing sensor and a scanning system.

A processor may be coupled to the crash sensor and the movement mechanism and determines the motion required of the headrest to place the headrest proximate to the head. The processor then provides the motion determination to the movement mechanism upon detection of an impending crash involving the vehicle by the crash sensor. This is particularly helpful when a system for determining the location of the head of the occupant relative to the headrest is provided in which case, the determining system is coupled to the processor to provide the determined head location.

A method for protecting an occupant of a vehicle during a crash in accordance with the invention comprises the steps of detecting an impending crash involving the vehicle based on data obtained prior to the crash and moving a headrest upon detection of an impending crash involving the vehicle to a position more proximate to the occupant. Detection of the crash may entail determining the velocity of an external object approaching the vehicle and producing a crash signal when the object is approaching the vehicle at a velocity above a design threshold velocity.

Optionally, the location of the head of the occupant is determined in which case, the headrest is moved from an initial position to the position more proximate to the determined location of the head of the occupant.

12.11 Combined with SDM and Other Systems

It is a further object of this invention to provide for the combining of the electronics of the occupant sensor and the airbag control module into a single package.

12.12 Exterior Monitoring

Further objects of this invention related to monitoring the exterior environment of the vehicle are:

To provide a system for monitoring the environment exterior of a vehicle in order to determine the presence and classification, identification and/or location of objects in the exterior environment.

To provide an anticipatory sensor that permits accurate identification of the about-to-impact object in the presence of snow and/or fog whereby the sensor is located within the vehicle.

To provide a smart headlight dimmer system which senses the headlights from an oncoming vehicle or the tail lights of a vehicle in front of the subject vehicle and identifies these lights differentiating them from reflections from signs or the road surface and then sends a signal to dim the headlights.

To provide a blind spot detector which detects and categorizes an object in the driver's blind spot or other location in the vicinity of the vehicle, and warns the driver in the event the driver begins to change lanes, for example, or continuously informs the driver of the state of occupancy of the blind spot.

To use the principles of time of flight to measure the distance to an occupant or object exterior to the vehicle.

To provide a camera system for interior and exterior monitoring, which can adjust on a pixel by pixel basis for the intensity of the received light.

To provide for the use of an active pixel camera for interior and exterior vehicle monitoring.

SUMMARY OF THE INVENTION

In order to achieve some of the above objects, an optical classification method for classifying an occupant in a vehicle in accordance with the invention comprises the steps of acquiring images of the occupant from a single camera and analyzing the images acquired from the single camera to determine a classification of the occupant. The single camera may be a digital CMOS camera, a high-power near-infrared LED, and the LED control circuit. It is possible to detect brightness of the images and control illumination of an LED in conjunction with the acquisition of images by the single camera. The illumination of the LED may be periodic to enable a comparison of resulting images with the LED on and the LED off so as to determine whether a daytime condition or a nighttime condition is present. The position of the occupant can be monitored when the occupant is classified as a child, an adult or a forward-facing child restraint.

In one embodiment, analysis of the images entails preprocessing the images, compressing the data from the preprocessed images, determining from the compressed data or the acquired images a particular condition of the occupant and/or condition of the environment in which the images have been acquired, providing a plurality of trained neural networks, each designed to determine the classification of the occupant for a respective one of the conditions, inputting the compressed data into one of the neural networks designed to determine the classification of the occupant for the determined condition to thereby obtain a classification of the occupant and subjecting the obtained classification of the occupant to post-processing to improve the probability of the classification of the occupant corresponding to the actual occupant. The pre-processing step may involve removing random noise and enhancing contrast whereby the presence of unwanted objects other than the occupant are reduced. The presence of unwanted contents in the images other than the occupant may be detected and the camera adjusted to minimize the presence of the unwanted contents in the images.

The post-processing may involve filtering the classification of the occupant from the neural network to remove random noise and/or comparing the classification of the occupant from the neural network to a previously obtained classification of the occupant and determining whether any difference in the classification is possible.

The classification of the occupant from the neural network may be displayed in a position visible to the occupant and enabling the occupant to change or confirm the classification.

The position of the occupant may be monitored when the occupant is classified as a child, an adult or a forward-facing child restraint. One way to do this is to input the compressed data or acquired images into an additional neural network designed to determine a recommendation for control of a system in the vehicle based on the monitoring of the position of the occupant. Also, a plurality of additional neural networks may be used, each designed to determine a recommendation for control of a system in the vehicle for a particular classification of occupant. In this case, the compressed data or acquired images is input into one of the neural networks designed to determine the recommendation for control of the system for the obtained classification of the occupant to thereby obtain a recommendation for the control of the system for the particular occupant.

If the system in the vehicle is an occupant restraint device, the additional neural networks can be designed to determine a recommendation of a suppression of deployment of the occupant restraint device, a depowered deployment of the occupant restraint device or a full power deployment of the occupant restraint device.

In another embodiment, the method also involves acquiring images of the occupant from an additional camera, pre-processing the images acquired from the additional camera, compressing the data from the pre-processed images acquired from the additional camera, determining from the compressed data or the acquired images from the additional camera a particular condition of the occupant or condition of the environment in which the images have been acquired, inputting the compressed data from the pre-processed images acquired by the additional camera into one of the neural networks designed to determine the classification of the occupant for the determined condition to thereby obtain a classification of the occupant, subjecting the obtained classification of the occupant to post-processing to improve the probability of the classification of the occupant corresponding to the actual occupant and comparing the obtained classification using the images acquired form the additional camera to the images acquired from the initial camera to ascertain any variations in classification.

BRIEF DESCRIPTION OF THE DRAWINGS

The following drawings are illustrative of embodiments of the system developed or adapted using the teachings of this invention and are not meant to limit the scope of the invention as encompassed by the claims. In particular, the illustrations below are frequently limited to the monitoring of the front passenger seat for the purpose of describing the system. Naturally, the invention applies as well to adapting the system to the other seating positions in the vehicle and particularly to the driver and rear passenger positions.

FIG. 19(*b*) is a diagram similar to FIG. 19(*a*) showing a step of extracting data based on the normalized reflected waves and a step of weighting the extracted data by employing the data of the seat track position detecting sensor, the data of the reclining angle detecting sensor, and the data of the weight sensor.

FIG. 76 is a database of data sets for use in training of a neural network in accordance with the invention.

FIG. 77 is a categorization chart for use in a training set collection matrix in accordance with the invention.

FIGS. 78, 79, 80 are charts of infant seats, child seats and booster seats showing attributes of the seats and a designation of their use in the training database, validation database or independent database in an exemplifying embodiment of the invention.

FIGS. 81A-81D show a chart showing different vehicle configurations for use in training of combination neural network in accordance with the invention.

FIGS. 82A-82H show a training set collection matrix for training a neural network in accordance with the invention.

FIG. 83 shows an independent test set collection matrix for testing a neural network in accordance with the invention.

FIG. 84 is a table of characteristics of the data sets used in the invention.

FIG. 85 is a table of the distribution of the main training subjects of the training data set.

FIG. 86 is a table of the distribution of the types of child seats in the training data set.

FIG. 87 is a table of the distribution of environmental conditions in the training data set.

FIG. 88 is a table of the distribution of the validation data set.

FIG. 89 is a table of the distribution of human subjects in the validation data set.

FIG. 90 is a table of the distribution of child seats in the validation data set.

FIG. 91 is a table of the distribution of environmental conditions in the validation data set.

FIG. 92 is a table of the inputs from ultrasonic transducers.

FIG. 93 is a table of the baseline network performance.

FIG. 94 is a table of the performance per occupancy subset.

FIG. 95 is a tale of the performance per environmental conditions subset.

FIG. 97 is a table of the results of the normalization study.

FIG. 98 is a table of the results of the low threshold filter study.

FIG. 99 shows single camera optical examples using preprocessing filters.

FIG. 100 shows single camera optical examples explaining the use of edge strength and edge orientation.

FIG. 101 shows single camera optical examples explaining the use of feature vector generated from distribution of horizontal/vertical edges.

FIG. 102 shows single camera optical example explaining the use of feature vector generated from distribution of tilted edges.

FIG. 103 shows single camera optical example explaining the use of feature vector generated from distribution of average intensities and deviations.

FIG. 104 is a table of issues that may affect the image data.

FIG. 105 is a flow chart of the use of two subsystems for handling different lighting conditions.

FIG. 106 shows two flow charts of the use of two modular subsystems consisting of 3 neural networks.

FIG. 107 is a flow chart of a modular subsystem consisting of 6 neural networks.

FIG. 108 is a table of post-processing filters implemented in the invention.

FIG. 109 is a flow chart of a decision-locking mechanism implemented using four internal states.

FIG. 110 is a table of definitions of the four internal states.

FIG. 111 is a table of the paths between the four internal states.

FIG. 112 is a table of the distribution of the nighttime database.

FIG. 113 is a tale of the success rates of the nighttime neural networks.

FIG. 114 is a table of the performance of the nighttime subsystem.

FIG. 115 is a table of the distribution of the daytime database.

FIG. 116 is a table of the success rates of the daytime neural networks.

FIG. 117 is a table of the performance of the daytime subsystem.

Figure 118:
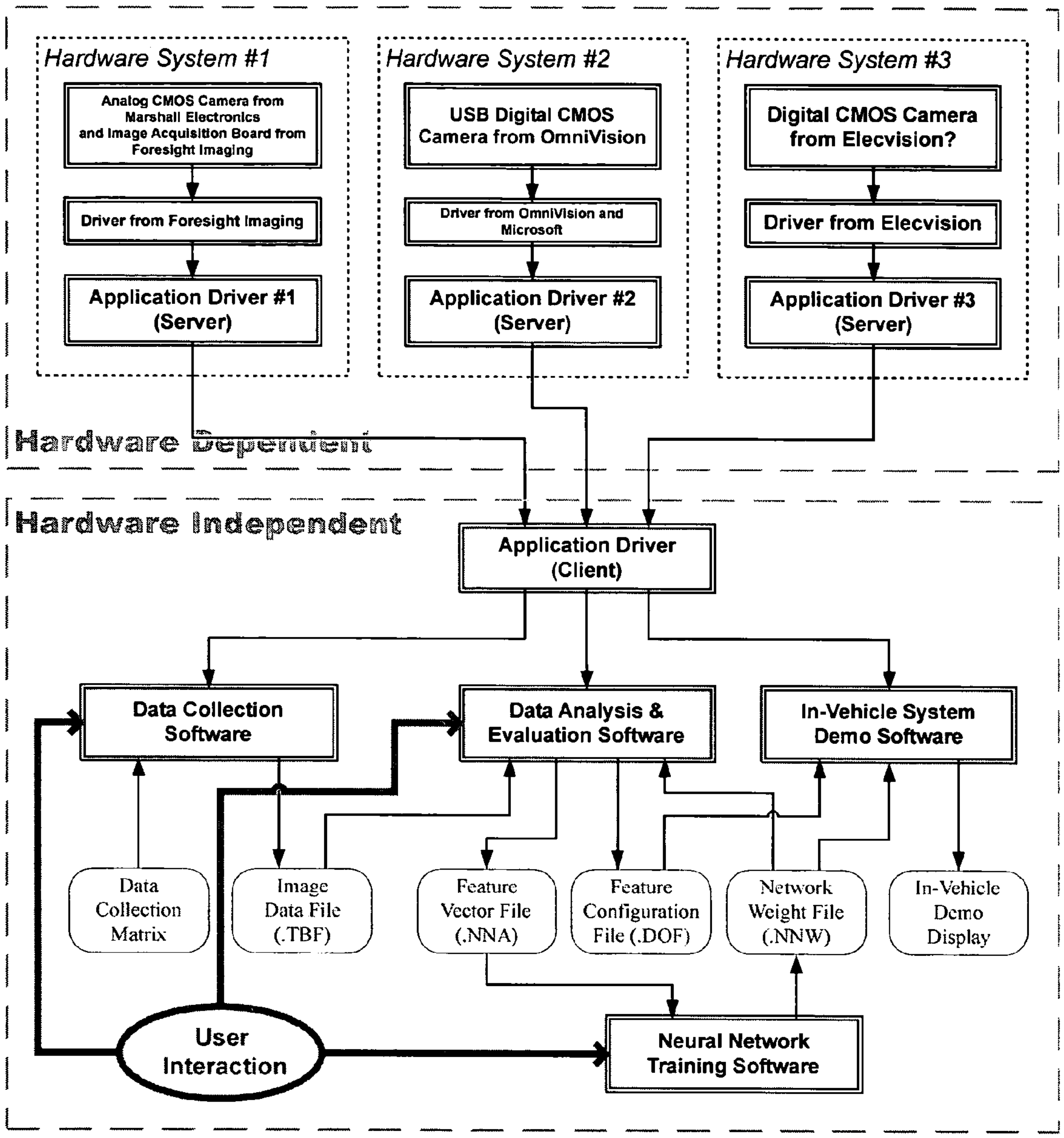

FIG. 118 is a flow chart of the software components for system development.

Figure 119:
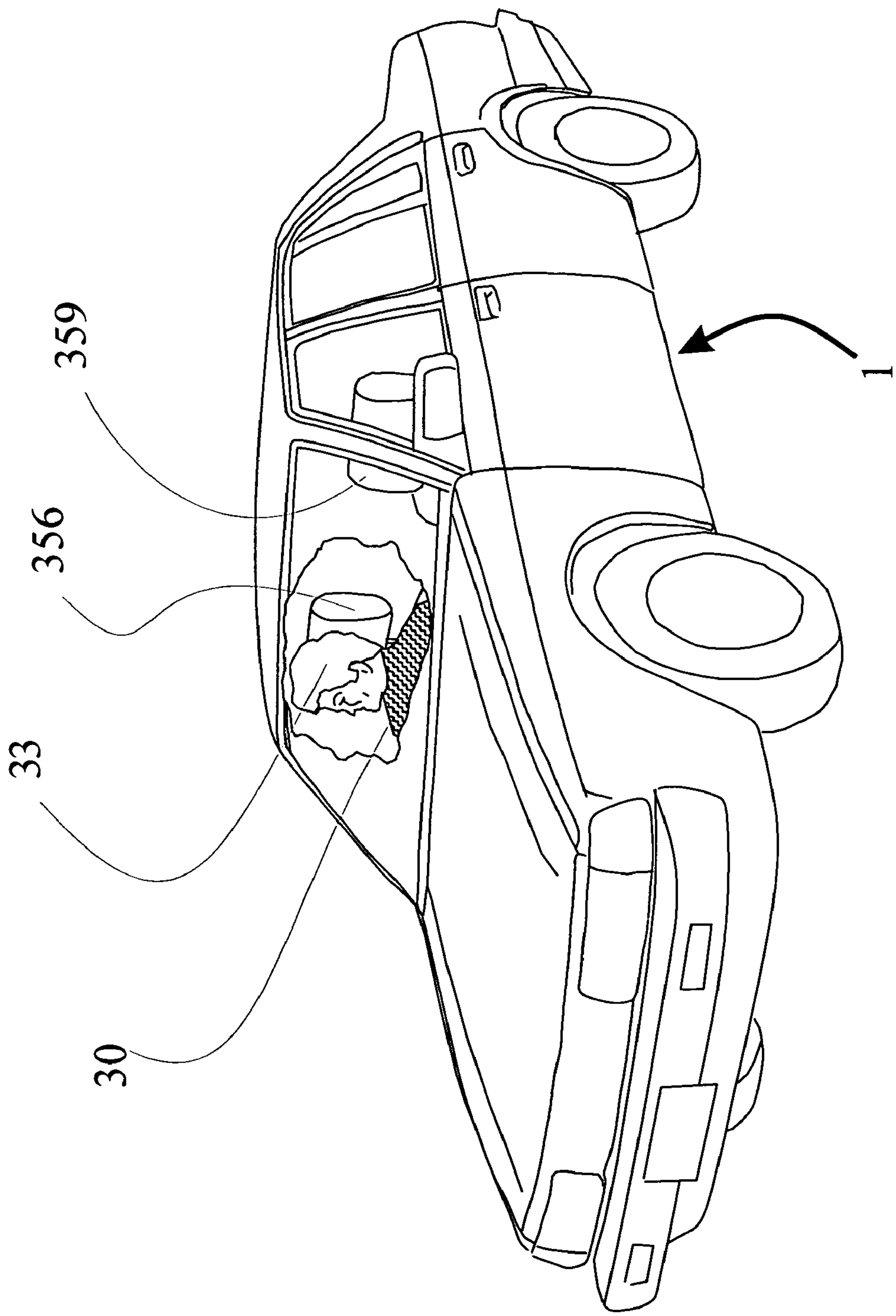

FIG. 119 is perspective view with portions cut away of a motor vehicle having a movable headrest and an occupant sitting on the seat with the headrest adjacent the head of the occupant to provide protection in rear impacts.

Figure 1:
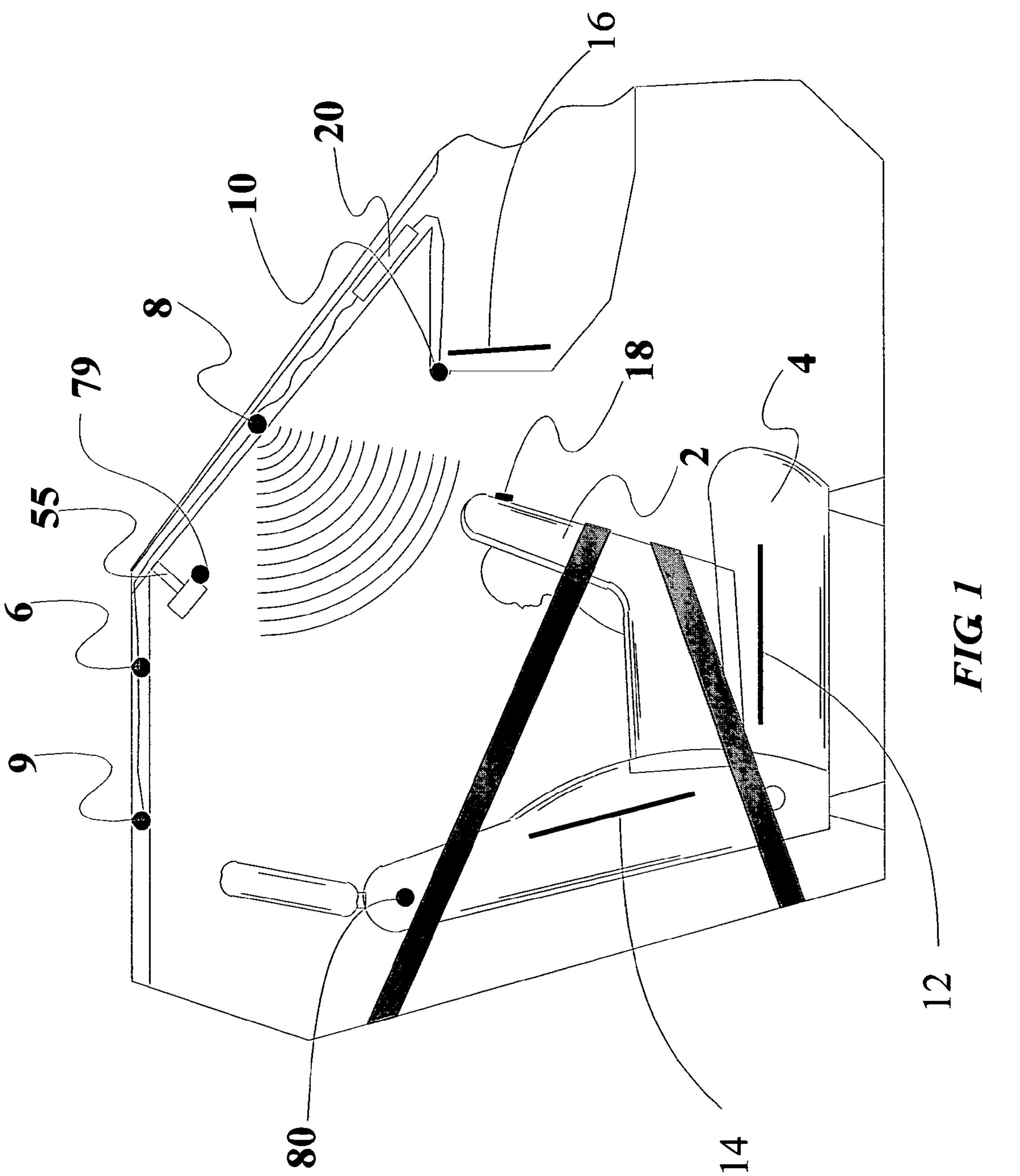
FIG. 1 is a side view with parts cutaway and removed of a vehicle showing the passenger compartment containing a rear facing child seat on the front passenger seat and a preferred mounting location for an occupant and rear facing child seat presence detector including an antenna field sensor and a resonator or reflector placed onto the forward most portion of the child seat.
Figure 120:
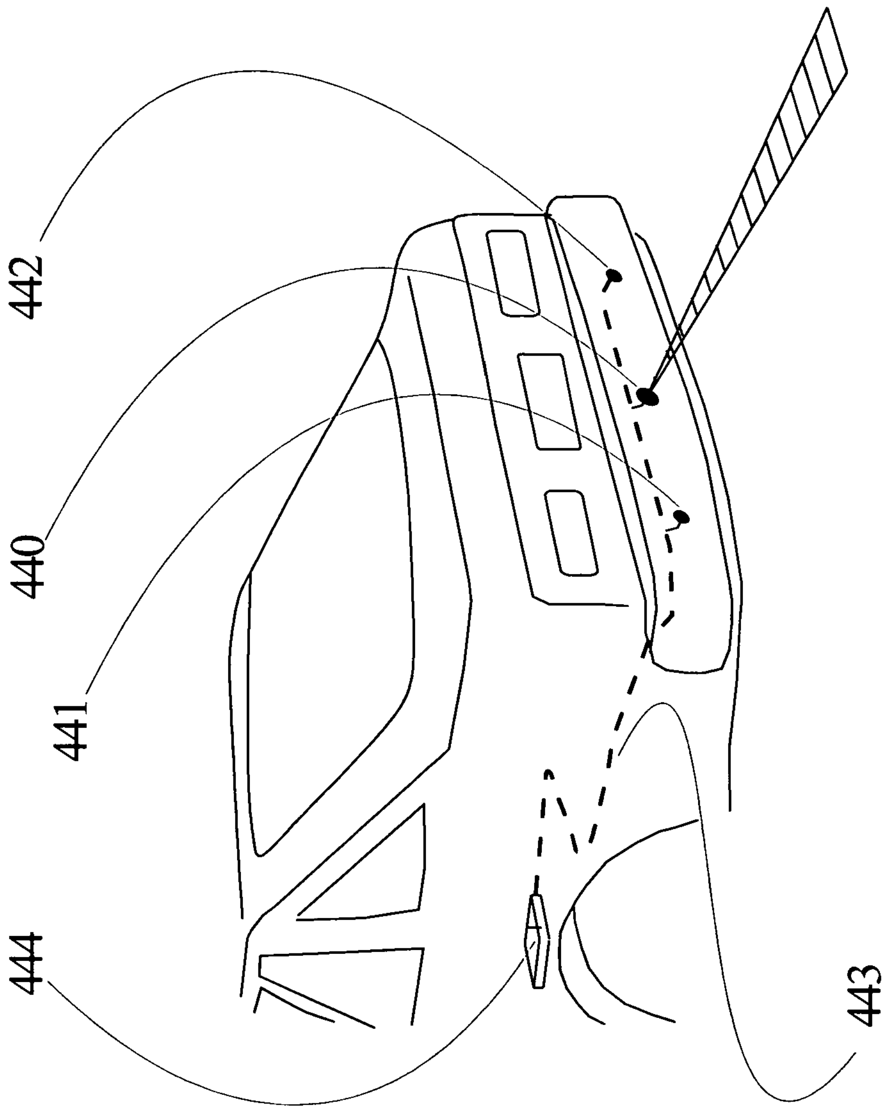

FIG. 120 is a perspective view of the rear portion of the vehicle shown in FIG. 1 showing a rear crash anticipatory sensor connected to an electronic circuit for controlling the position of the headrest in the event of a crash.

Figure 121:
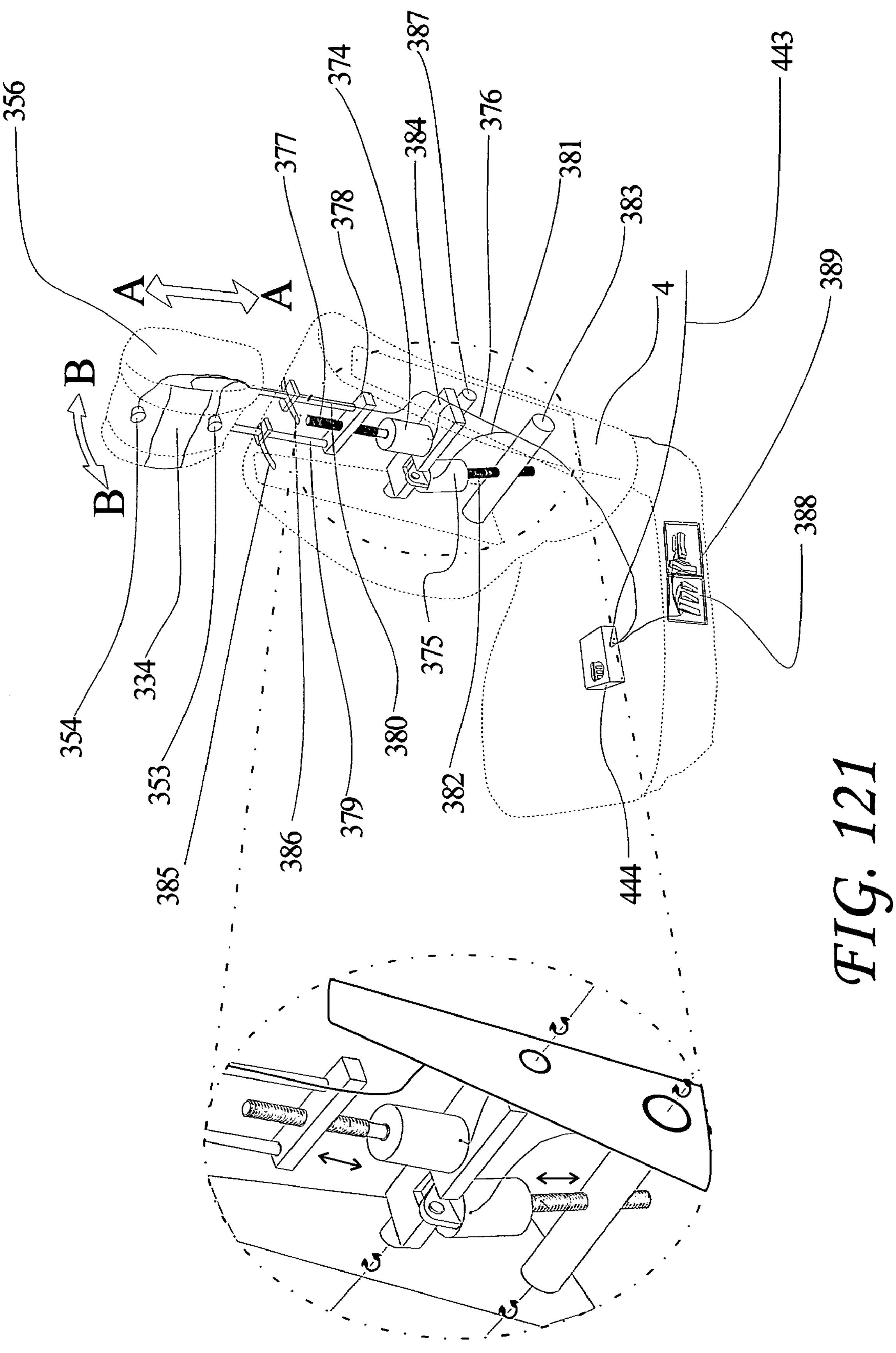

FIG. 121 is a perspective view of a headrest control mechanism mounted in a vehicle seat and ultrasonic head location sensors consisting of one transmitter and one receiver plus a head contact sensor, with the seat and headrest shown in phantom.

Figure 122:
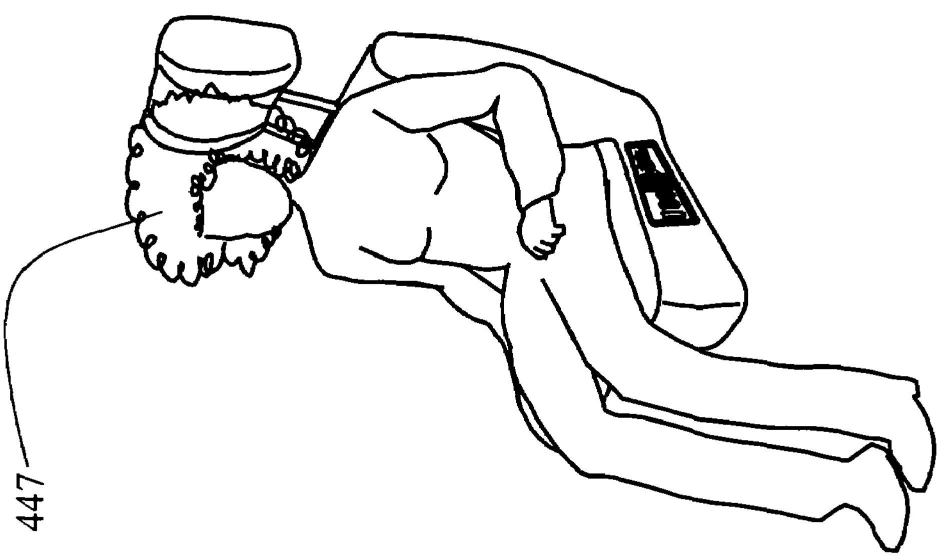

FIG. 122 is a perspective view of a female vehicle occupant having a large hairdo and also showing switches for manually adjusting the position of the headrest.

Figure 123:
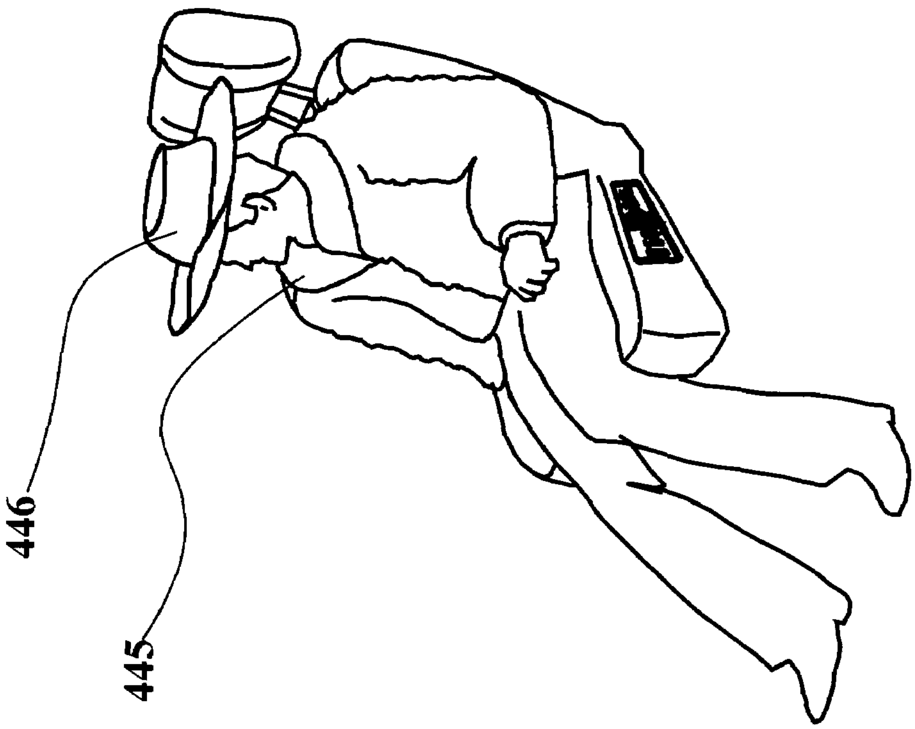

FIG. 123 is a perspective view of a male vehicle occupant wearing a winter coat and a large hat.

Figure 3:
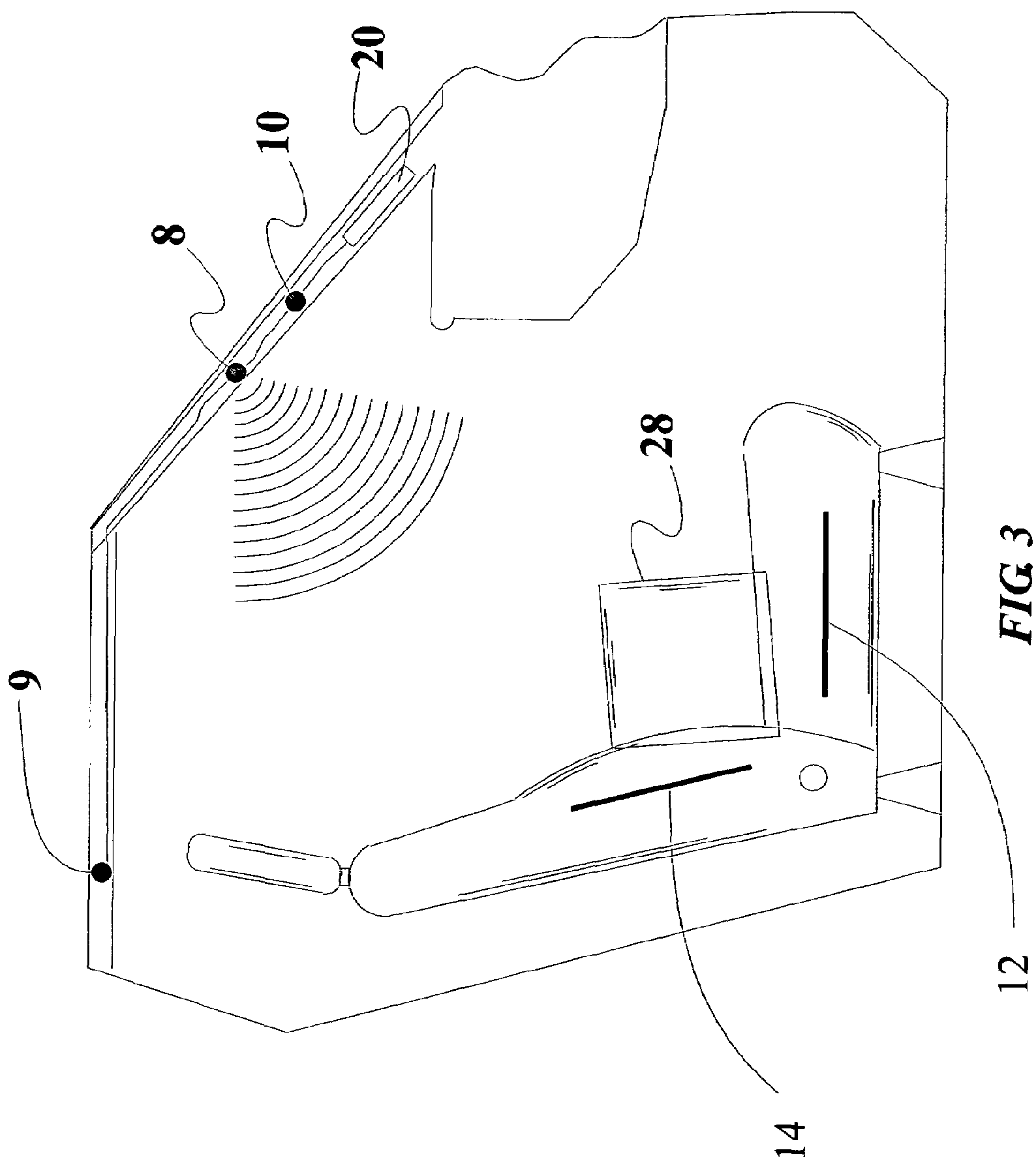
FIG. 3 is a side view with parts cutaway and removed of a vehicle showing the passenger compartment containing a box on the front passenger seat and a preferred mounting location for an occupant and rear facing child seat presence detector and including an antenna field sensor.
Figure 124:
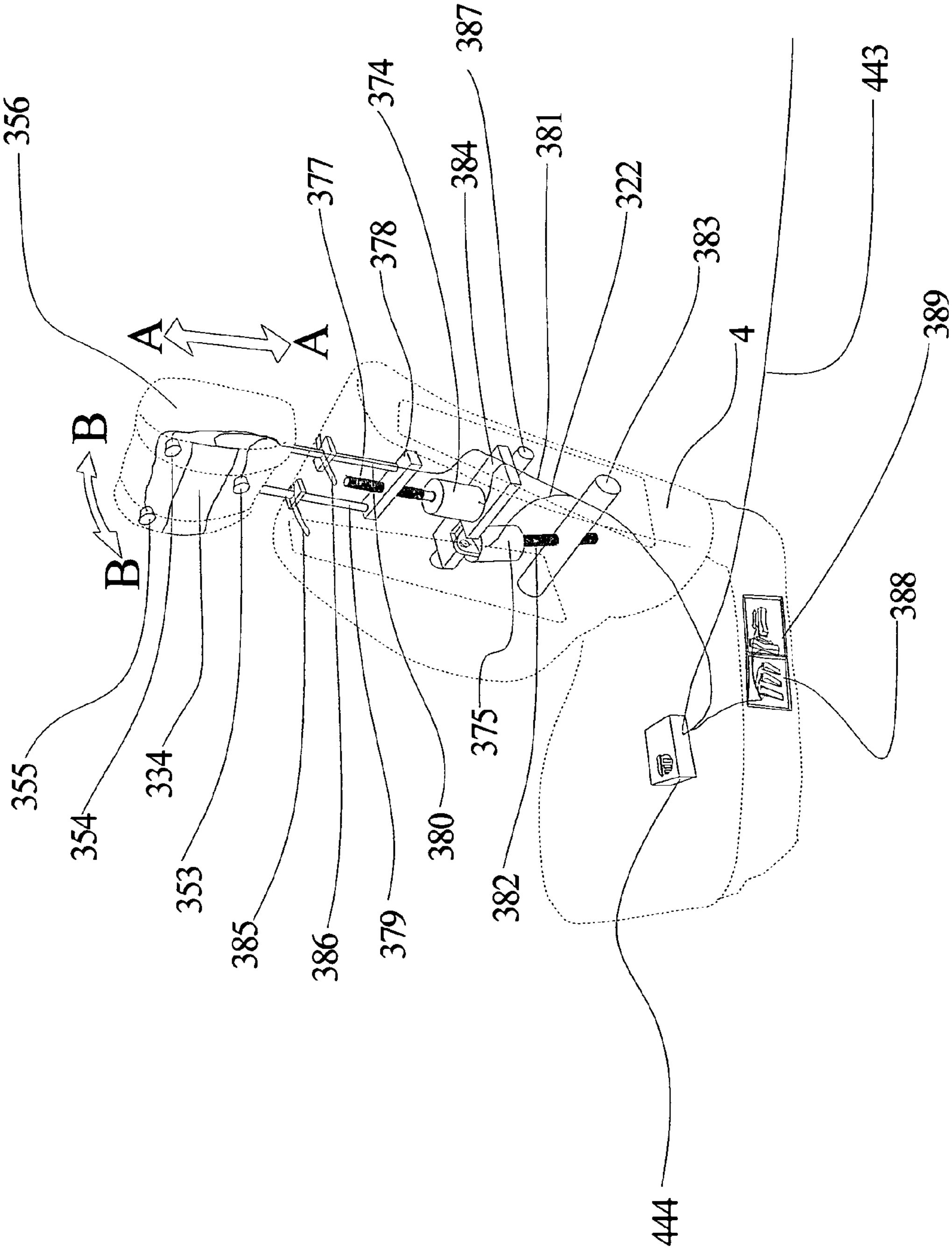

FIG. 124 is view similar to FIG. 3 showing an alternate design of a head sensor using one transmitter and three receivers for use with a pattern recognition system.

Figure 125:
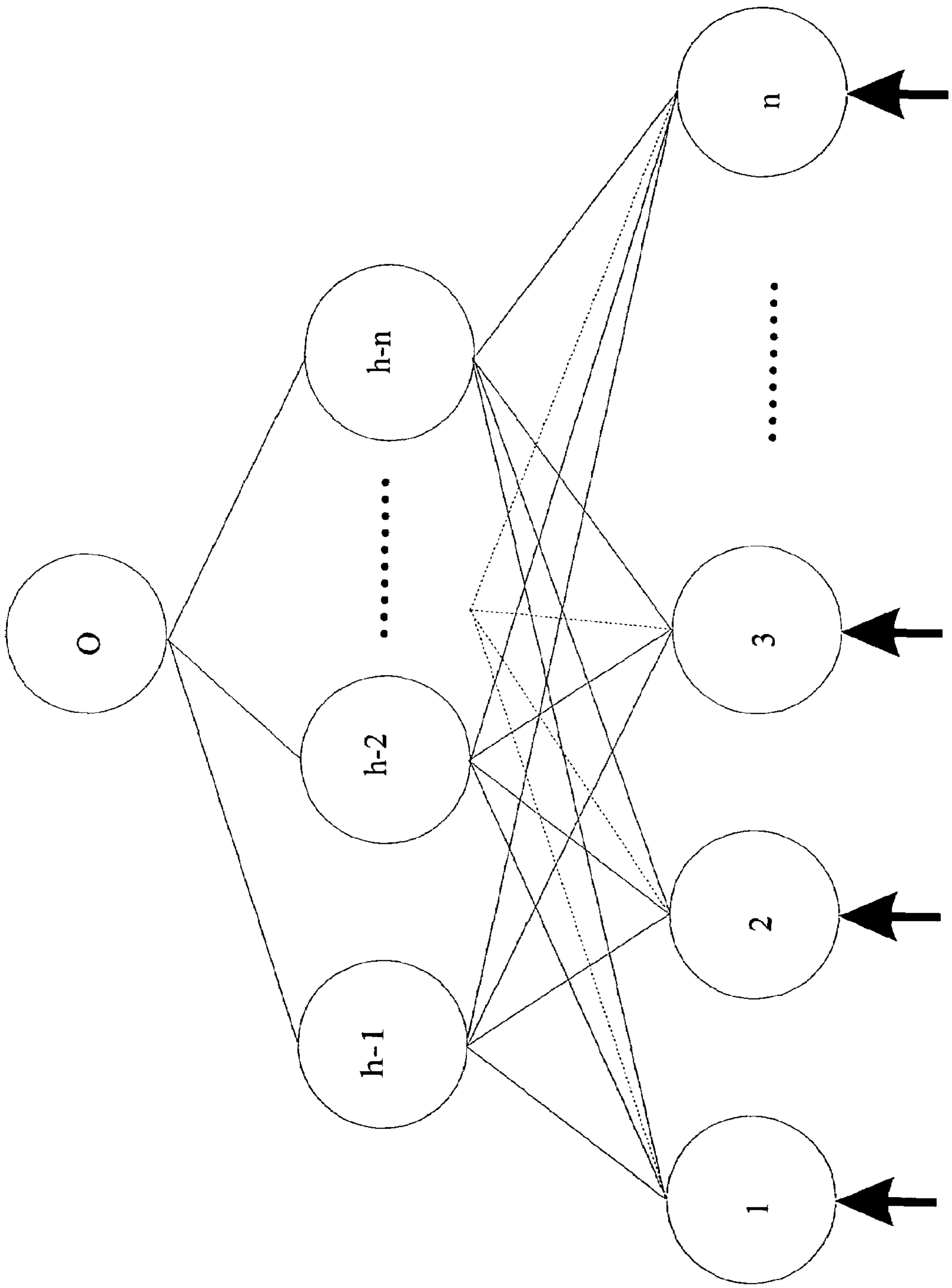

FIG. 125 is a schematic view of an artificial neural network pattern recognition system of the type used to recognize an occupant's head.

Figure 126:
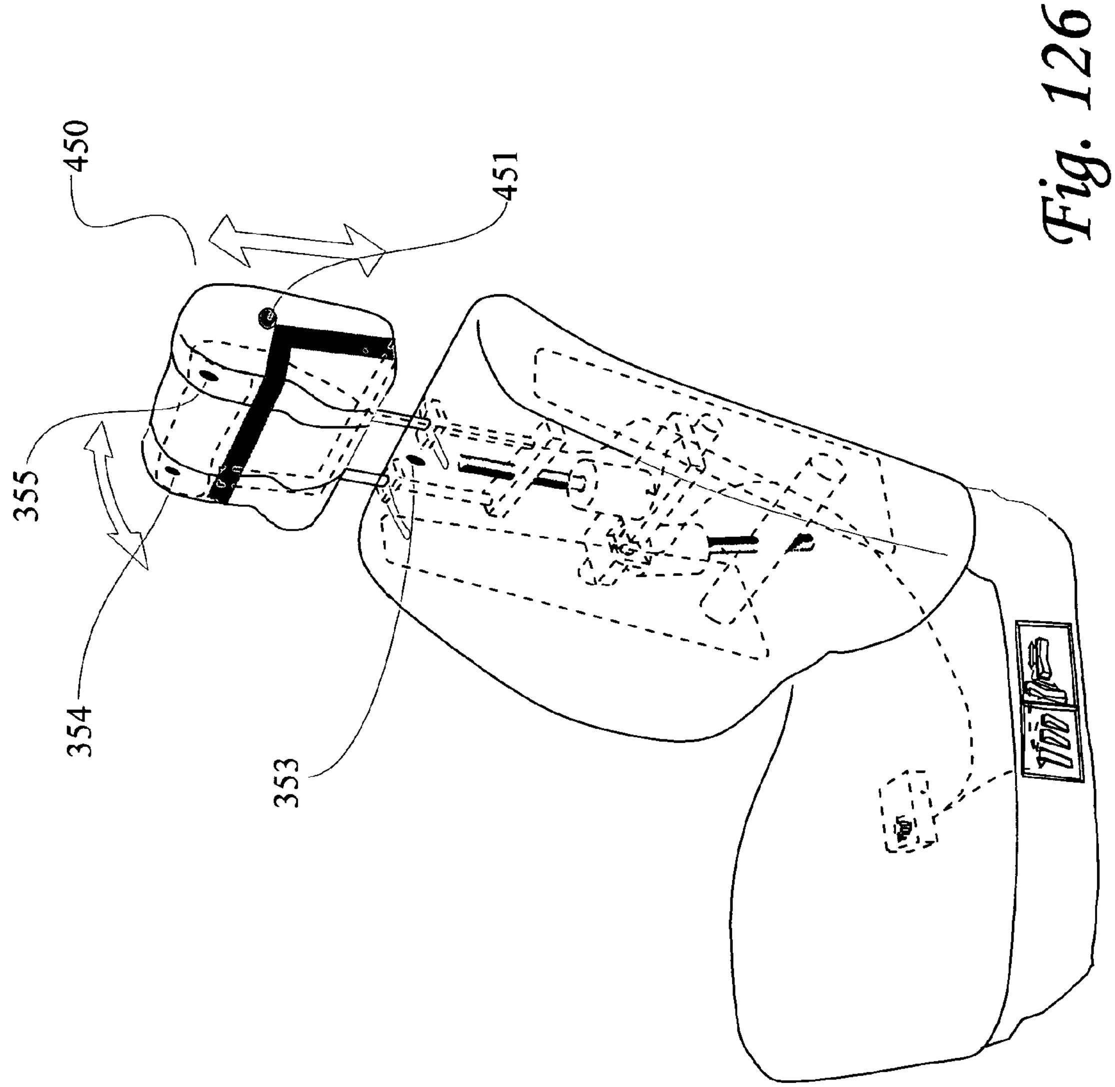

FIG. 126 is a perspective view of an of automatically adjusting head and neck supporting headrest.

Figure 126A:
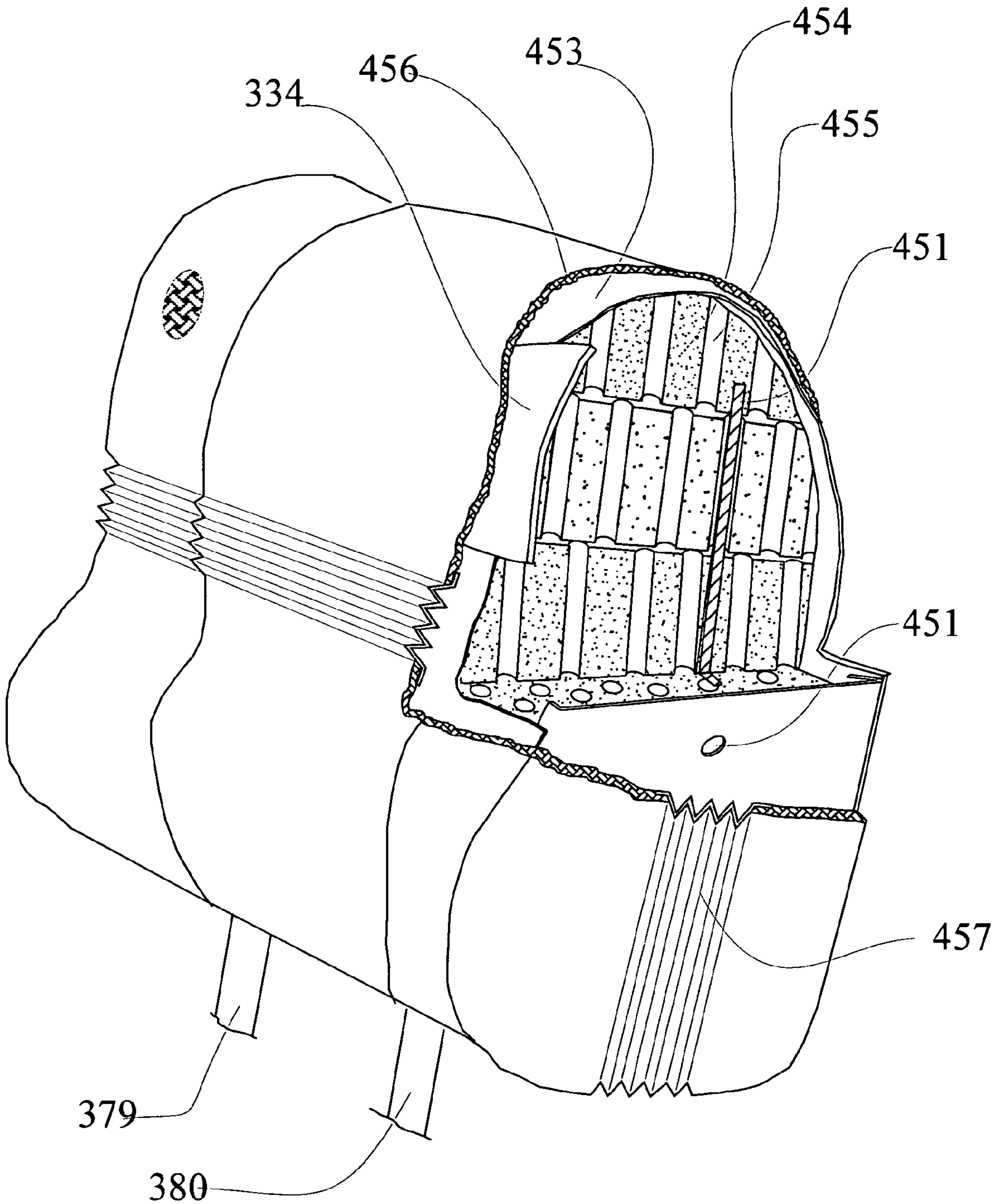

FIG. 126A is a perspective view with portions cut away and removed of the headrest of FIG. 125.

Figure 127A:
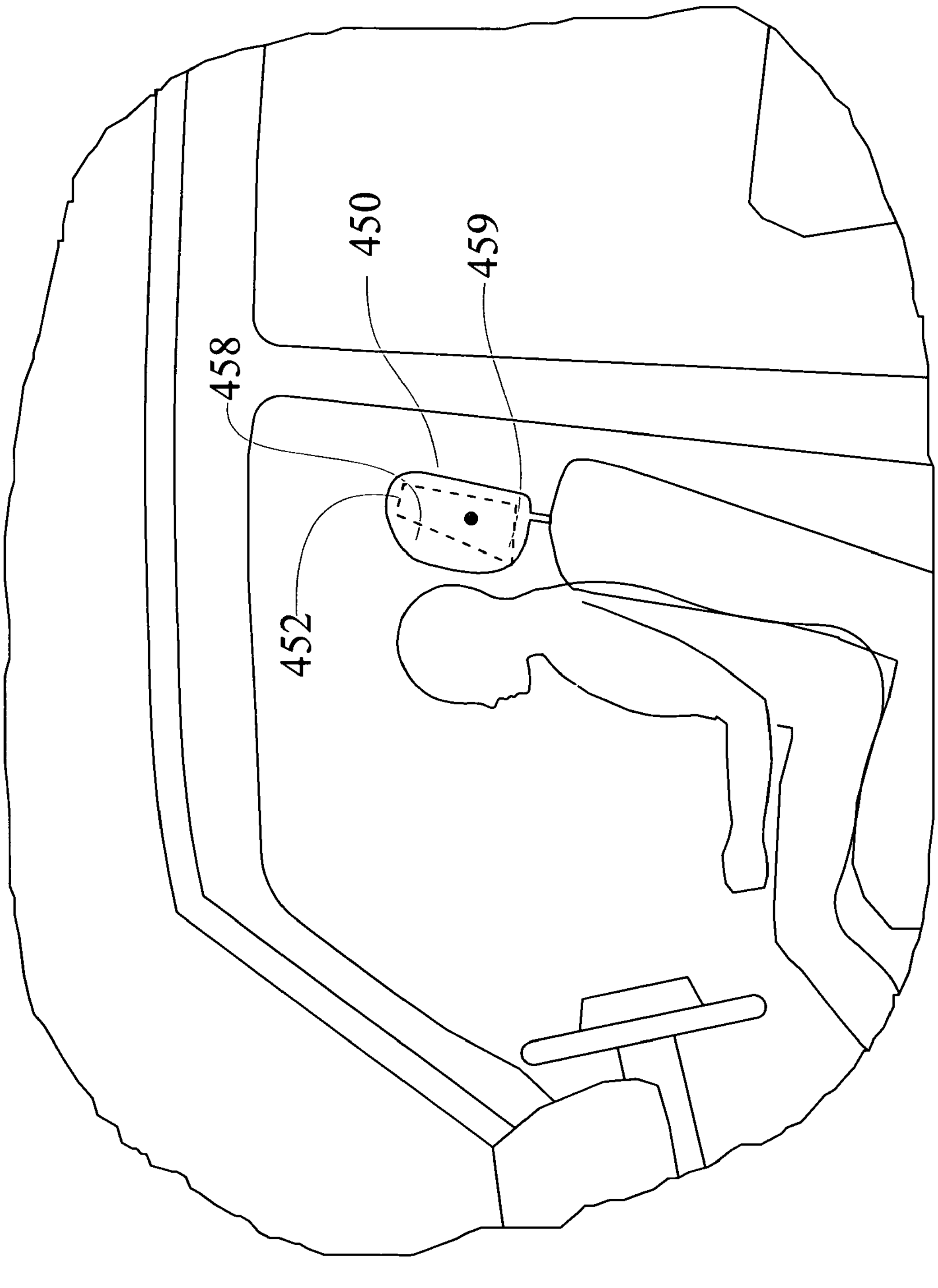

FIG. 127A is a side view of an occupant seated in the driver seat of an automobile with the headrest in the normal position.

Figure 127B:
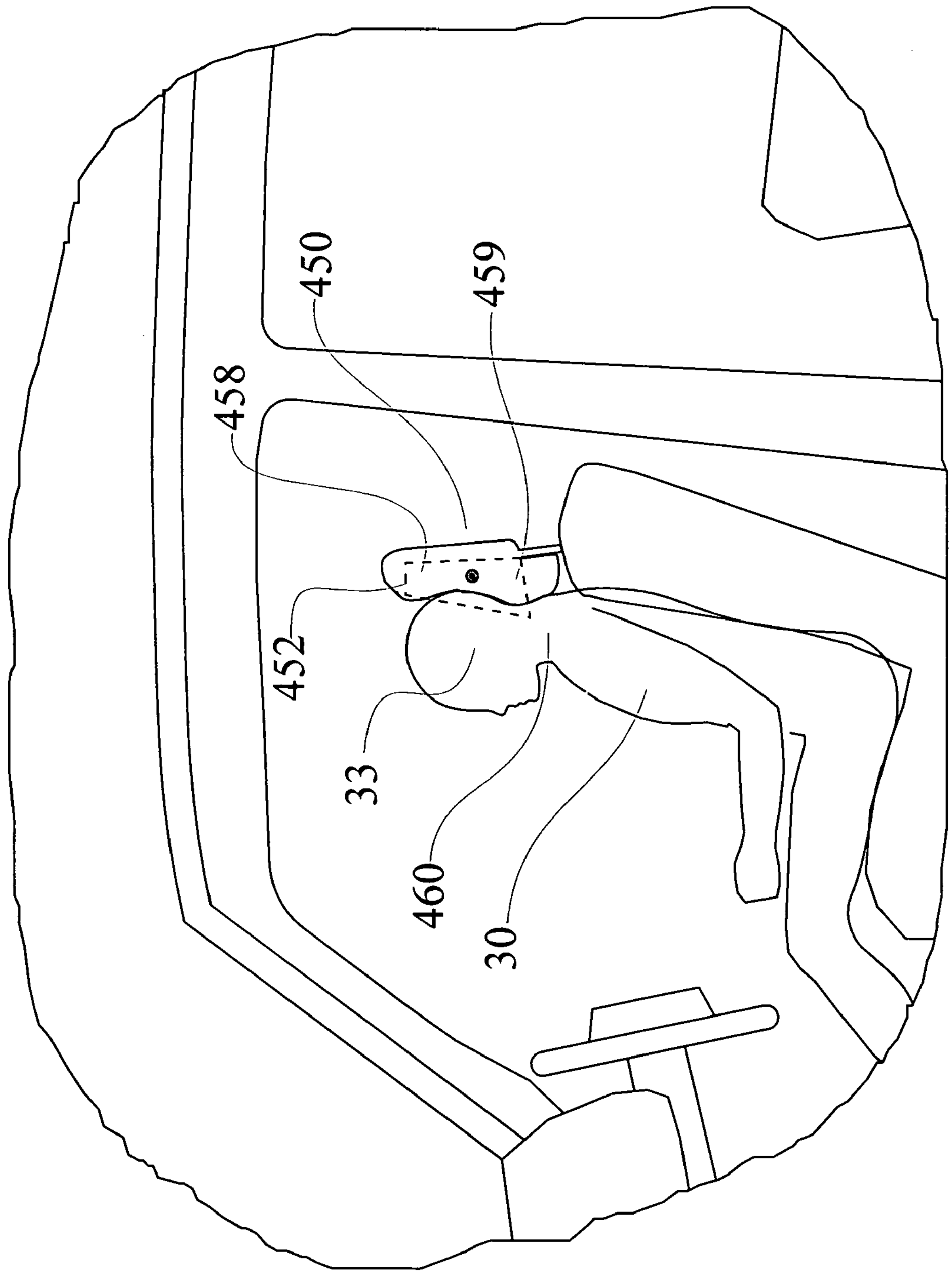

FIG. 127B is a view as in FIG. 126A with the headrest in the head contact position as would happen in anticipation of a rear crash.

Figure 128A:
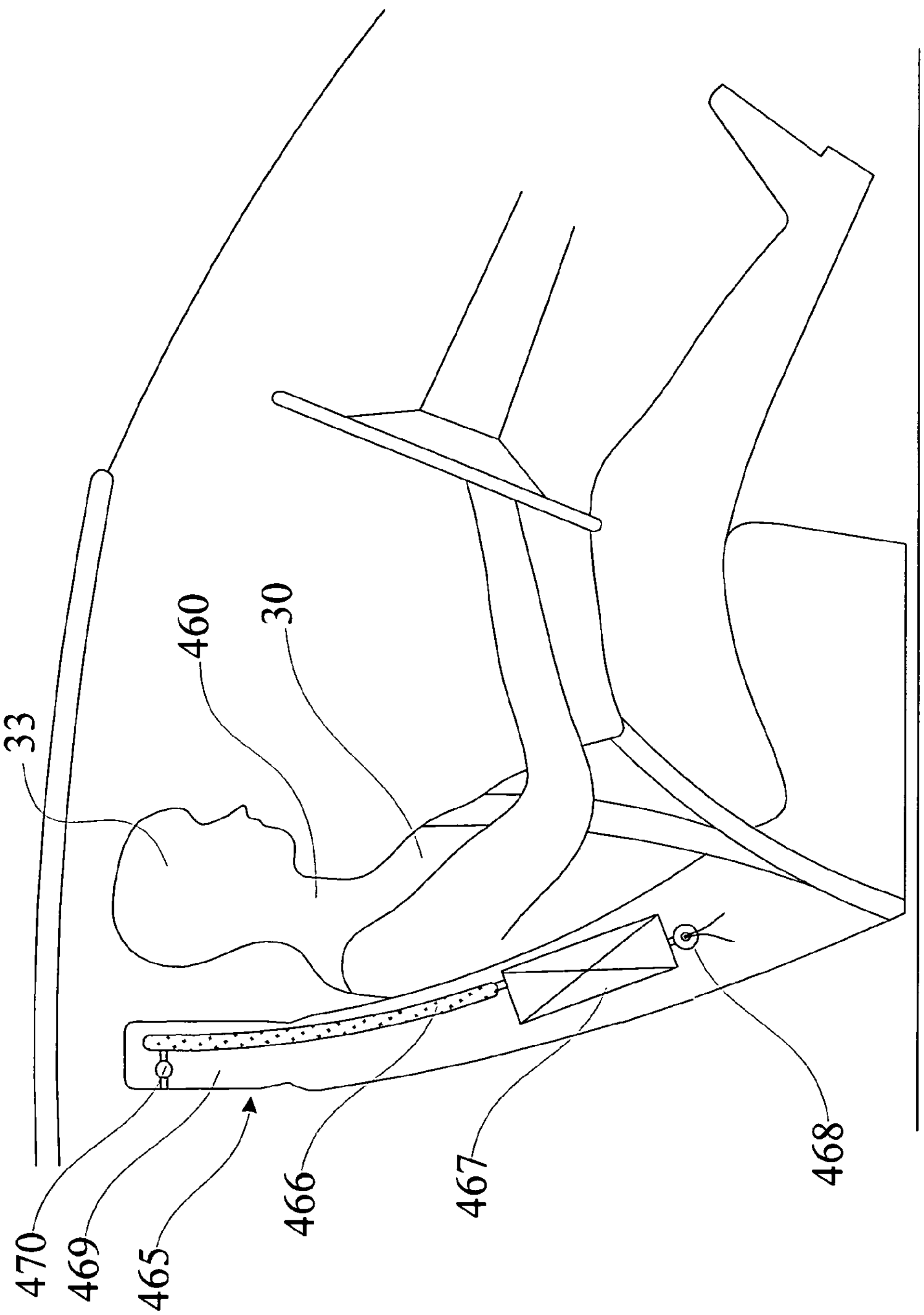

FIG. 128A is a side view of an occupant seated in the driver seat of an automobile having an integral seat and headrest and an inflatable pressure controlled bladder with the bladder in the normal position.

Figure 128B:
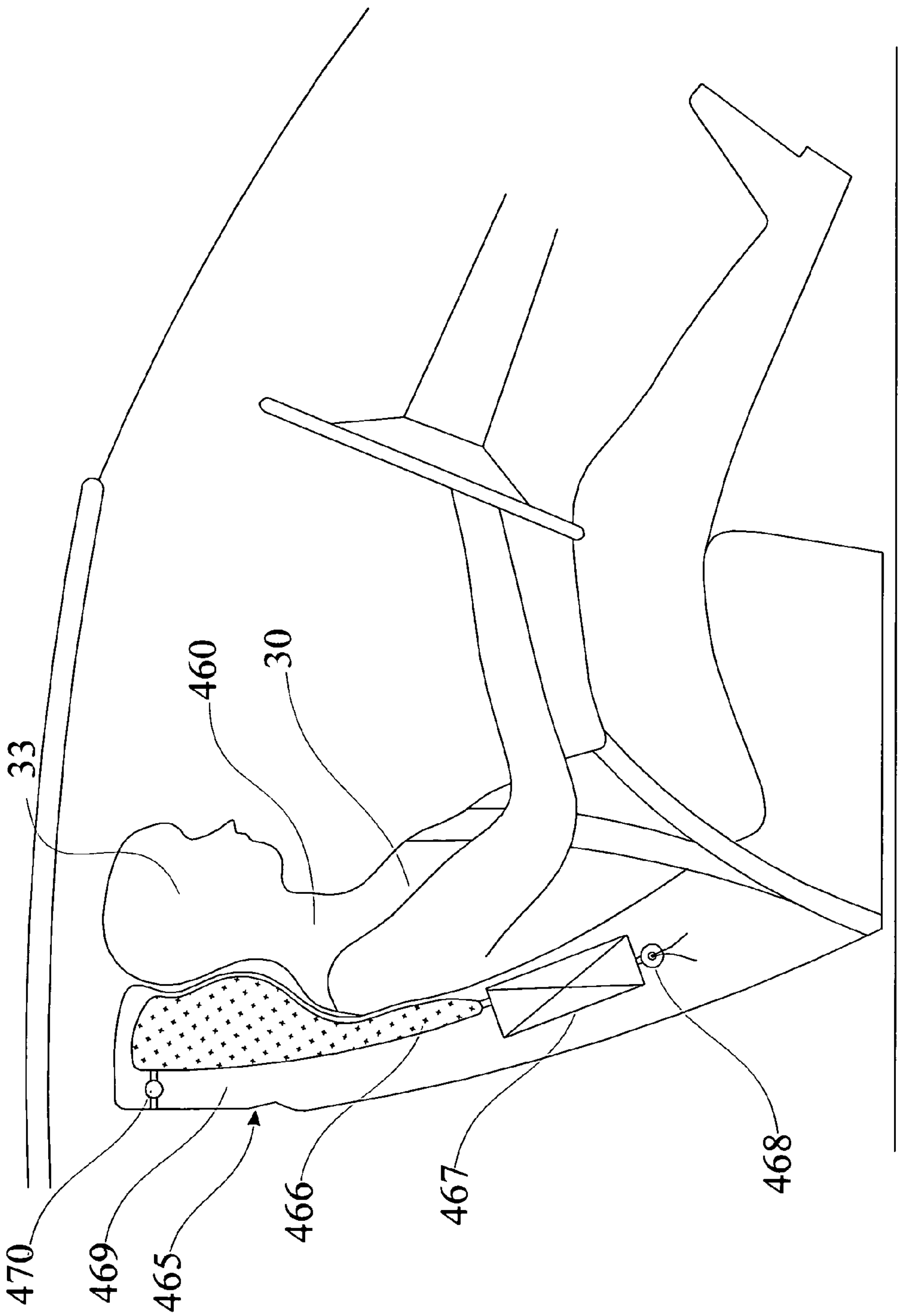

FIG. 128B is a view as in FIG. 127A with the bladder expanded in the head contact position as would happen in anticipation of, e.g., a rear crash.

Figure 129A:
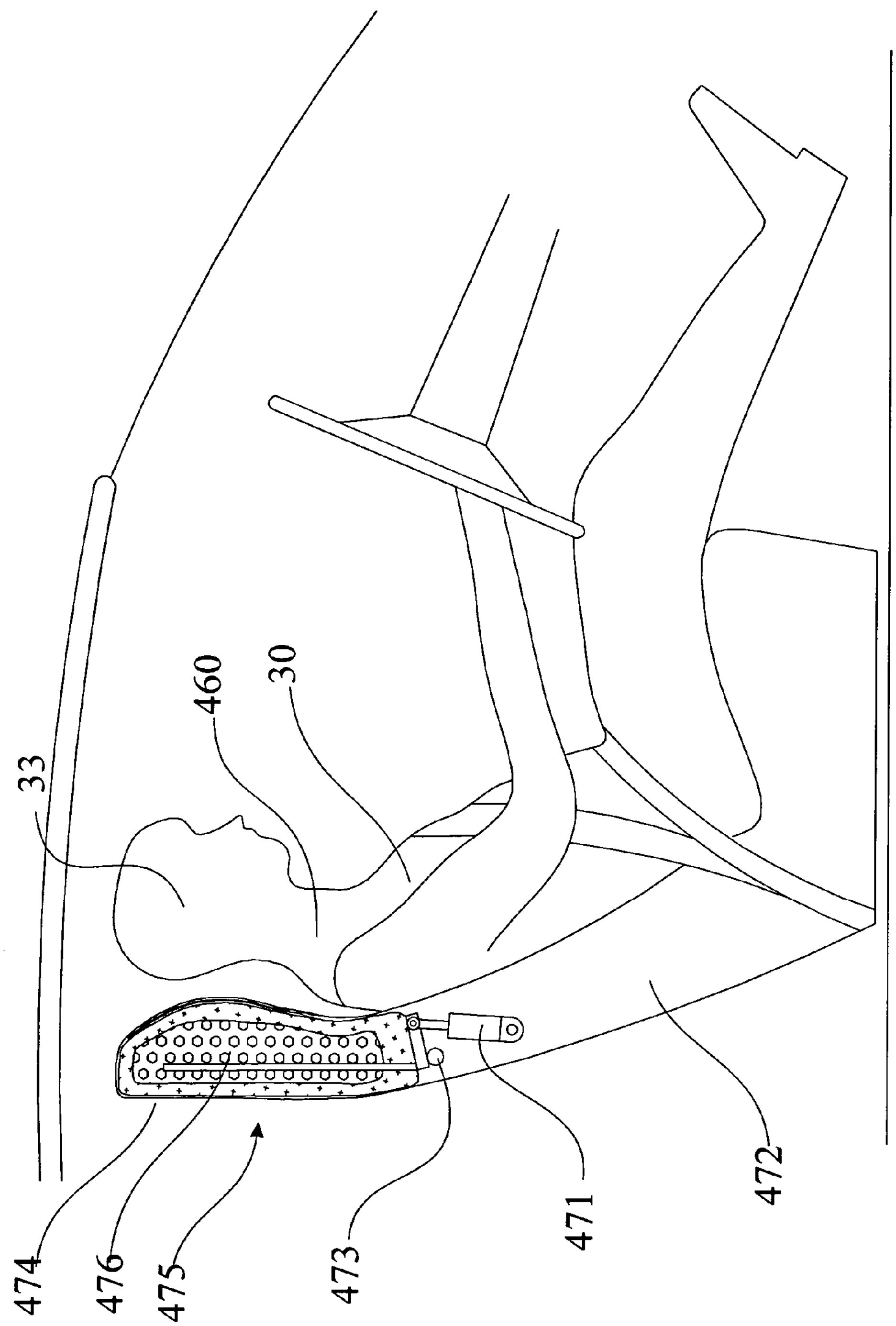

FIG. 129A is a side view of an occupant seated in the driver seat of an automobile having an integral seat and a pivotable headrest and bladder with the headrest in the normal position.

Figure 129B:
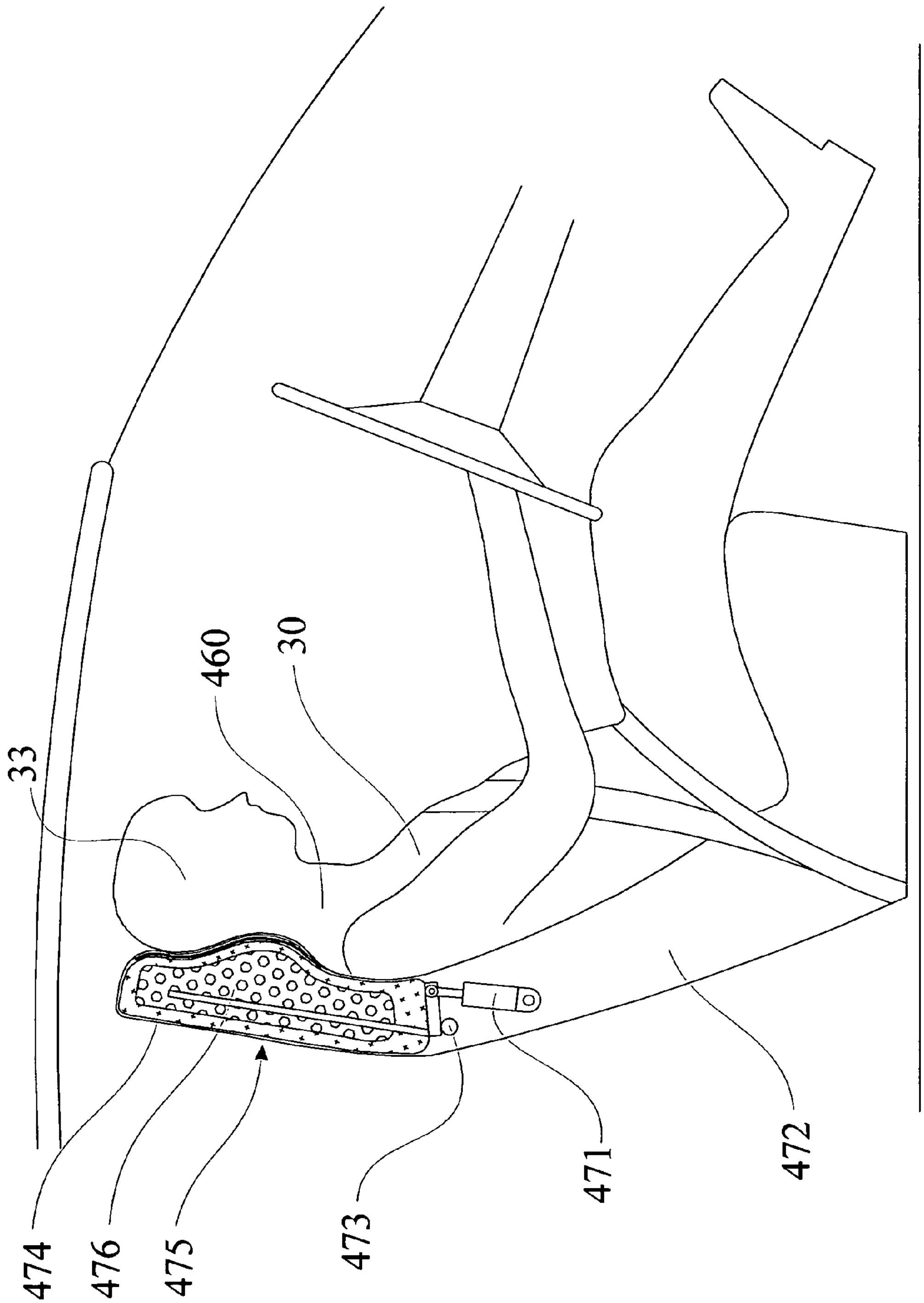

FIG. 129B is a view as in FIG. 128A with the headrest pivoted in the head contact position as would happen in anticipation of, e.g., a rear crash.

DETAILED DESCRIPTION OF THE PREFERRED EMBODIMENTS

Note whenever a patent or literature is referred to below it is to be assumed that all of that patent or literature is to be incorporated by reference in its entirety to the extent the disclosure of these reference is necessary 1. General Occupant Sensors Referring to the accompanying drawings, FIG. 1 is a side view, with parts cutaway and removed of a vehicle showing the passenger compartment containing a rear facing child seat 2 on a front passenger seat 4 and a preferred mounting location for a first embodiment of a vehicle interior monitoring system in accordance with the invention. The interior monitoring system is capable of detecting the presence of occupying objects such as an occupant or a rear facing child seat 2. In this embodiment, three transducers 6, 8 and 10 are used alone, or, alternately in combination with one or two antenna near field monitoring sensors or transducers, 12 and 14, although any number of wave-transmitting transducers or radiation-receiving receivers may be used. Such transducers or receivers may be of the type that emit or receive a continuous signal, a time varying signal or a spatial varying signal such as in a scanning system. One particular type of radiation-receiving receiver for use in the invention receives electromagnetic waves and another received ultrasonic waves.

In an ultrasonic embodiment, transducer 8 transmits ultrasonic energy toward the front passenger seat, which is modified, in this case by the occupying item of the passenger seat, for example a rear facing child seat 2, and the modified waves are received by the transducers 6 and 10. Modification of the ultrasonic energy may constitute reflection of the ultrasonic energy back by the occupying item of the seat. The waves received by transducers 6 and 10 vary with time depending on the shape, location and size of the object occupying the passenger seat, in this case a rear facing child seat 2. Each different occupying item will reflect back waves having a different pattern. Also, the pattern of waves received by transducer 6 will differ from the pattern received by transducer 10 in view of its different mounting location. In some systems, this difference permits the determination of location of the reflecting surface (for example the rear facing child seat 110) through triangulation. Through the use of two transducers 6, 10, a sort of stereographic image is received by the two transducers and recorded for analysis by processor 20, which is coupled to the transducers 6, 8, 10 by wires or a wireless connection.

Transducer 8 can also be a source of electromagnetic radiation, such as an LED, and transducers 6 and 10 can be CMOS, CCD imagers or other devices sensitive to electromagnetic radiation or fields. This “image” or return signal will differ for each object that is placed on the vehicle seat and it will also change for each position of a particular object and for each position of the vehicle seat. Elements 6, 8, 10, although described as transducers, are representative of any type of component used in a wave-based or electric field analysis technique, including, e.g., a transmitter, receiver, antenna or a capacitor plate.

Transducers 12, 14 and 16 can be antennas placed in the seat and instrument panel such that the presence of an object, particularly a water-containing object such as a human, disturbs the near field of the antenna. This disturbance can be detected by various means such as with Micrel parts MICREF102 and MICREF104, which have a built in antenna auto-tune circuit. Note, these parts cannot be used as is and it is necessary to redesign the chips to allow the auto-tune information to be retrieved from the chip.

The “image” recorded from each ultrasonic transducer/receiver (transceiver), for ultrasonic systems, is actually a time series of digitized data of the amplitude of the received signal versus time. Since there are two receivers in this example, two time series are obtained which are processed by processor 20. Processor 20 may include electronic circuitry and associated embedded software. Processor 20 constitutes one form of generating mechanism in accordance with the invention that generates information about the occupancy of the passenger compartment based on the waves received by the transducers 6, 8, 10. This three-transducer system is for illustration purposes only and the preferred system will usually have at least three transceivers that may operate at the same or at different frequencies and each may receive reflected waves from itself or any one or more of the other transceivers or sources of radiation.

When different objects are placed on the front passenger seat, the two images from transducers 6, 10 are different but there are also similarities between all images of rear facing child seats, for example, regardless of where on the vehicle seat it is placed and regardless of what company manufactured the child seat. Alternately, there will be similarities between all images of people sitting on the seat regardless of what they are wearing, their age or size. The problem is to find the “rules” which differentiate the images of one type of object from the images of other types of objects, e.g., which differentiate the occupant images from the rear facing child seat images. The similarities of these images for various child seats are frequently not obvious to a person looking at plots of the time series, for the ultrasonic case example, and thus computer algorithms are developed to sort out the various patterns. For a more detailed discussion of pattern recognition see U.S. Pat. No. RE 37260 to Varga et. al.

Other types of transducers can be used along with the transducers 6, 8, 10 or separately and all are contemplated by this invention. Such transducers include other wave devices such as radar or electronic field sensing such as described in U.S. Pat. No. 05,366,241, U.S. Pat. No. 05,602,734, U.S. Pat. No. 05,691,693, U.S. Pat. No. 05,802,479, U.S. Pat. No. 05,844,486, U.S. Pat. No. 06,014,602, and U.S. Pat. No. 06,275,146 to Kithil, and U.S. Pat. No. 05,948,031 to Rittmueller. Another technology, for example, uses the fact that the content of the near field of an antenna affects the resonant tuning of the antenna. Examples of such a device are shown as antennas 12, 14 and 16 in FIG. 1. By going to lower frequencies, the near field range is increased and also at such lower frequencies, a ferrite-type antenna could be used to minimize the size of the antenna. Other antennas that may be applicable for a particular implementation include dipole, microstrip, patch, yagi etc. The frequency transmitted by the antenna can be swept and the (VSWR) voltage and current in the antenna feed circuit can be measured. Classification by frequency domain is then possible. That is, if the circuit is tuned by the antenna, the frequency can be measured to determine the object in the field.

Figure 2:
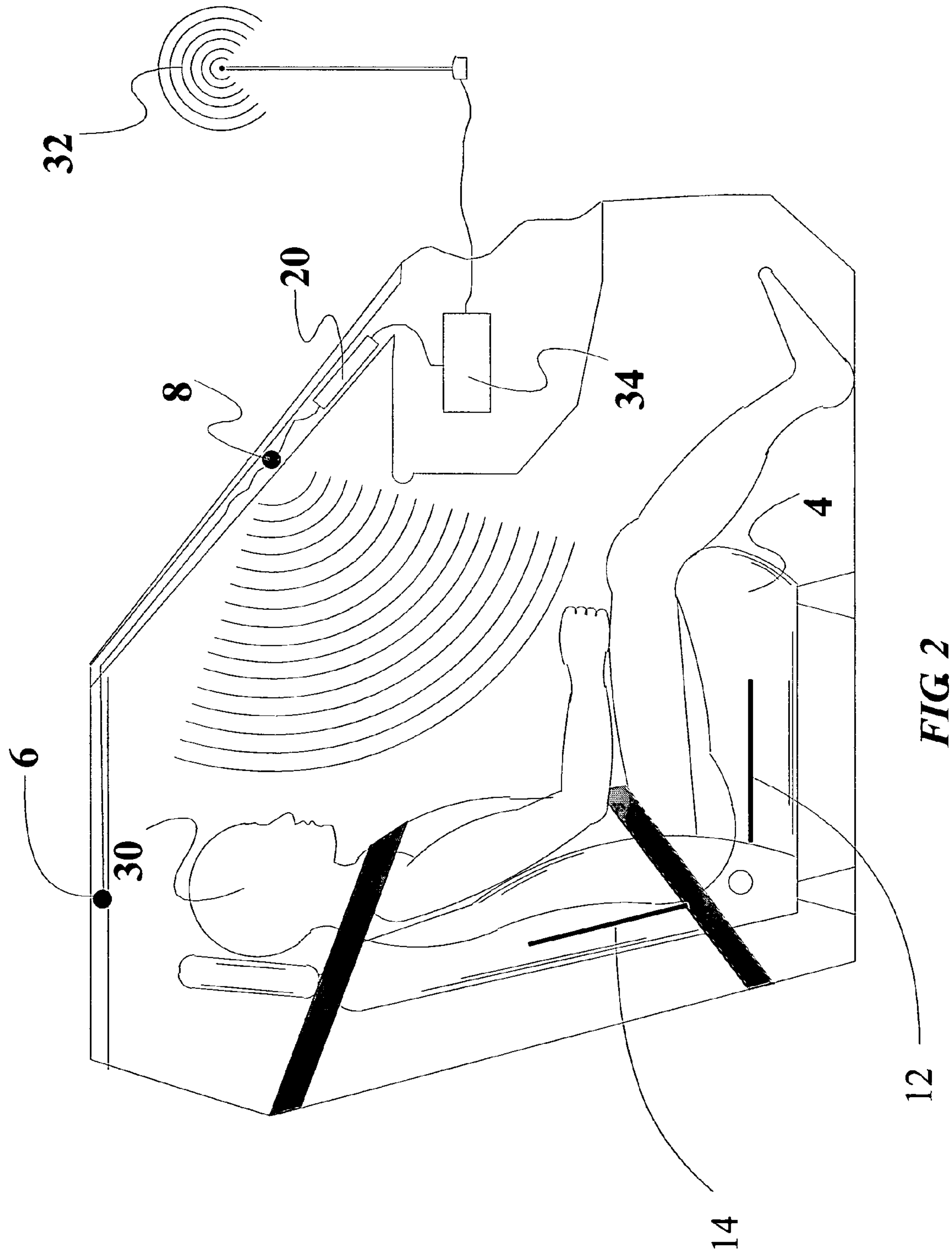
FIG. 2 is a side view with parts cutaway and removed showing schematically the interface between the vehicle interior monitoring system of this invention and the vehicle cellular or other telematics communication system including an antenna field sensor.

An alternate system is shown in FIG. 2, which is a side view showing schematically the interface between the vehicle interior monitoring system of this invention and the vehicle cellular or other communication system 32 having an associated antenna 34. In this view, an adult occupant 30 is shown sitting on the front passenger seat 4 and two transducers 6 and 8 are used to determine the presence (or absence) of the occupant on that seat 4. One of the transducers 8 in this case acts as both a transmitter and receiver while transducer 6 acts only as a receiver. Alternately, transducer 6 could serve as both a transmitter and receiver or the transmitting function could be alternated between the two devices. Also, in many cases more that two transmitters and receivers are used and in still other cases, other types of sensors, such as weight, seatbelt tension sensor or switch, heartbeat, self tuning antennas (12, 14), motion and seat and seatback position sensors, are also used alone or in combination with the radiation sensors 6 and 8. As is also the case in FIG. 1, the transducers 6 and 8 are attached to the vehicle embedded in the A-pillar and headliner trim, where their presence is disguised, and are connected to processor 20 that may also be hidden in the trim as shown or elsewhere. Naturally, other mounting locations can also be used and, in most cases, preferred as disclosed in Varga et. al. (U.S. Pat. No. RE 37260).

The transducers 6 and 8 in conjunction with the pattern recognition hardware and software described below enable the determination of the presence of an occupant within a short time after the vehicle is started. The software is implemented in processor 20 and is packaged on a printed circuit board or flex circuit along with the transducers 6 and 8. Similar systems can be located to monitor the remaining seats in the vehicle, also determine the presence of occupants at the other seating locations and this result is stored in the computer memory, which is part of each monitoring system processor 20. Processor 20 thus enables a count of the number of occupants in the vehicle to be obtained by addition of the determined presences of occupants by the transducers associated with each seating location, and in fact can be designed to perform such an addition.

In FIG. 3, a view of the system of FIG. 1 is illustrated with a box 28 shown on the front passenger seat in place of a rear facing child seat. The vehicle interior monitoring system is trained to recognize that this box 28 is neither a rear facing child seat nor an occupant and therefore it is treated as an empty seat and the deployment of the airbag is suppressed. The auto-tune antenna-based system 12, 14 is particularly adept at making this distinction particularly if the box does not contain substantial amounts of water. Although a simple implementation of the auto-tune antenna system is illustrated, it is of course possible to use multiple antennas located in the seat and elsewhere in the passenger compartment and these antenna systems can either operate at one or a multiple of different frequencies to discriminate type, location and/or relative size of the object being investigated. This training can be accomplished using a neural network or modular neural network with the commercially available software. The system assesses the probability that the box is a person, however, and if there is even the remotest chance that it is a person, the airbag deployment is not suppressed. The system is thus typically biased toward enabling airbag deployment.

The determination of the rules that differentiate one image from another is central to the pattern recognition techniques used in this invention. In general, three approaches have been useful, artificial intelligence, fuzzy logic and artificial neural networks (although additional types of pattern recognition techniques may also be used, such as sensor fusion). In some implementations of this invention, such as the determination that there is an object in the path of a closing window, the rules are sufficiently obvious that a trained researcher can look at the returned acoustic or electromagnetic signals and devise a simple algorithm to make the required determinations. In others, such as the determination of the presence of a rear facing child seat or of an occupant, artificial neural networks are used to determine the rules. One such set of neural network software for determining the pattern recognition rules is available from International Scientific Research of Boonton, N.J.

Thus, in basic embodiments of the invention, wave or energy-receiving transducers are arranged in the vehicle at appropriate locations, trained if necessary depending on the particular embodiment, and function to determine whether a life form is present in the vehicle and if so, how many life forms are present. A determination can also be made using the transducers as to whether the life forms are humans, or more specifically, adults, child in child seats, etc. As noted herein, this is possible using pattern recognition techniques. Moreover, the processor or processors associated with the transducers can be trained to determine the location of the life forms, either periodically or continuously or possibly only immediately before, during and after a crash. The location of the life forms can be as general or as specific as necessary depending on the system requirements, i.e., a determination can be made that a human is situated on the driver's seat in a normal position (general) or a determination can be made that a human is situated on the driver's seat and is leaning forward and/or to the side at a specific angle as well as the position of his or her extremities and head and chest (specific). The degree of detail is limited by several factors, including, e.g., the number and position of transducers and training of the pattern recognition algorithm.

The maximum acoustic frequency that is practical to use for acoustic imaging in the systems is about 40 to 160 kilohertz (kHz). The wavelength of a 50 kHz acoustic wave is about 0.6 cm which is too coarse to determine the fine features of a person's face, for example. It is well understood by those skilled in the art that features which are smaller than the wavelength of the irradiating radiation cannot be distinguished. Similarly the wavelength of common radar systems varies from about 0.9 cm (for 33 GHz K band) to 133 cm (for 225 MHz P band) which are also too coarse for person identification systems.

Figure 4:
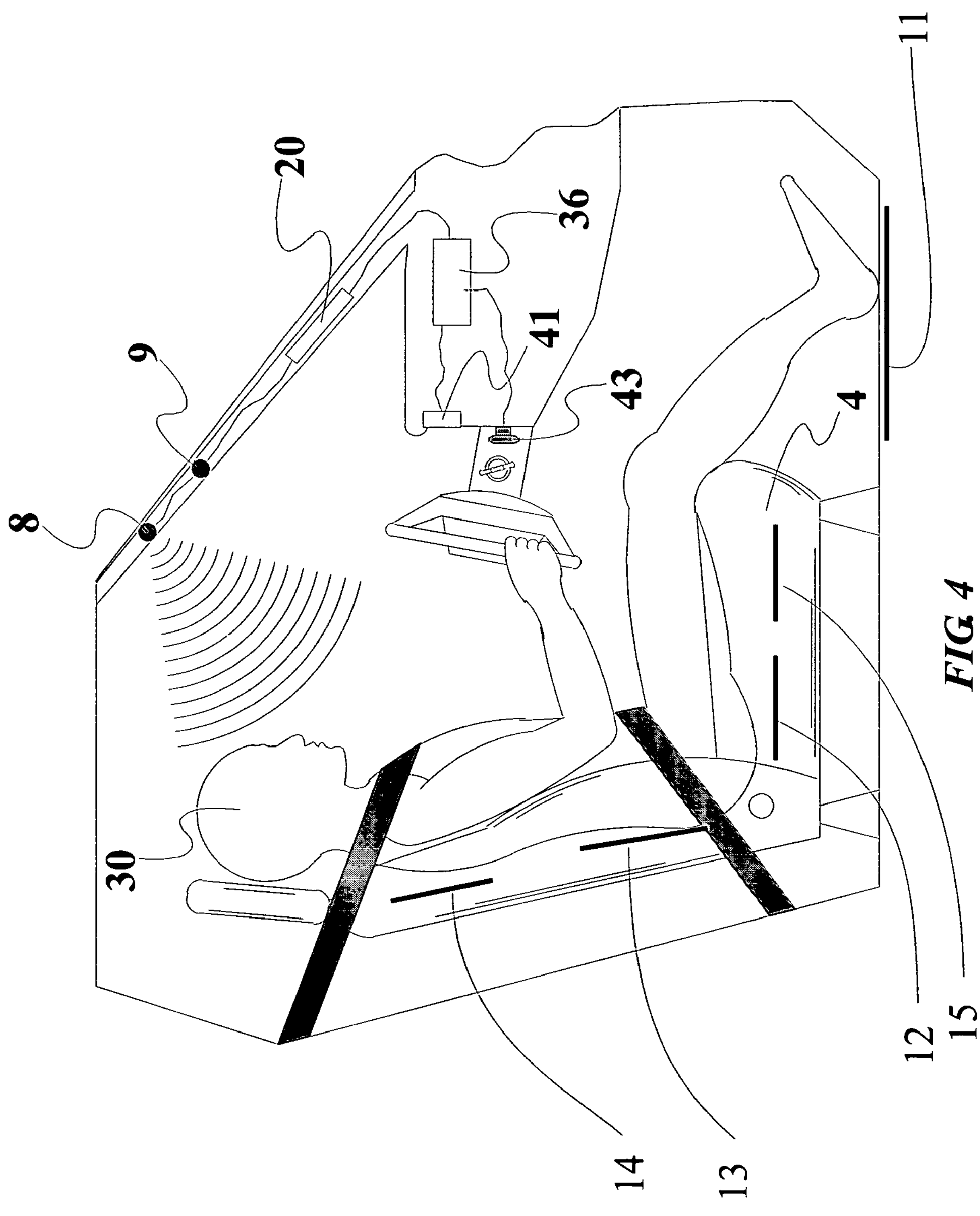
FIG. 4 is a side view with parts cutaway and removed of a vehicle showing the passenger compartment containing a driver and a preferred mounting location for an occupant identification system and including an antenna field sensor and an inattentiveness response button.

In FIG. 4, therefore, the ultrasonic transducers of the previous designs are replaced by laser transducers 8 and 9 which are connected to a microprocessor 20. In all other manners, the system operates the same. The design of the electronic circuits for this laser system is described in some detail in U.S. Pat. No. 05,653,462 referenced above and in particular FIG. 8 thereof and the corresponding description. In this case, a pattern recognition system such as a neural network system is employed and uses the demodulated signals from the laser transducers 8 and 9.

The output of microprocessor 20 of the monitoring system is shown connected schematically to a general interface 36 which can be the vehicle ignition enabling system; the entertainment system; the seat, mirror, suspension or other adjustment systems; or any other appropriate vehicle system.

Electromagnetic or ultrasonic energy can be transmitted in three modes in determining the position of an occupant. In most of the cases disclosed above, it is assumed that the energy will be transmitted in a broad diverging beam which interacts with a substantial portion of the occupant. This method has the disadvantage that it will reflect first off the nearest object and, especially if that object is close to the transmitter, it may mask the true position of the occupant. This can be partially overcome through the use of the second mode which uses a narrow beam. In this case, several narrow beams are used. These beams are aimed in different directions toward the occupant from a position sufficiently away from the occupant that interference is unlikely.

A single receptor could be used providing the beams are either cycled on at different times or are of different frequencies. Another approach is to use a single beam emanating from a location which has an unimpeded view of the occupant such as the windshield header. If two spaced apart CCD array receivers are used, the angle of the reflected beam can be determined and the location of the occupant can be calculated. The third mode is to use a single beam in a manner so that it scans back and forth and/or up and down, or in some other pattern, across the occupant. In this manner, an image of the occupant can be obtained using a single receptor and pattern recognition software can be used to locate the head or chest of the occupant. The beam approach is most applicable to electromagnetic energy but high frequency ultrasound can also be formed into a narrow beam.

A similar effect to modifying the wave transmission mode can also be obtained by varying the characteristics of the receptors. Through appropriate lenses or reflectors, receptors can be made to be most sensitive to radiation emitted from a particular direction. In this manner, a single broad beam transmitter can be used coupled with an array of focused receivers to obtain a rough image of the occupant.

Figure 5:
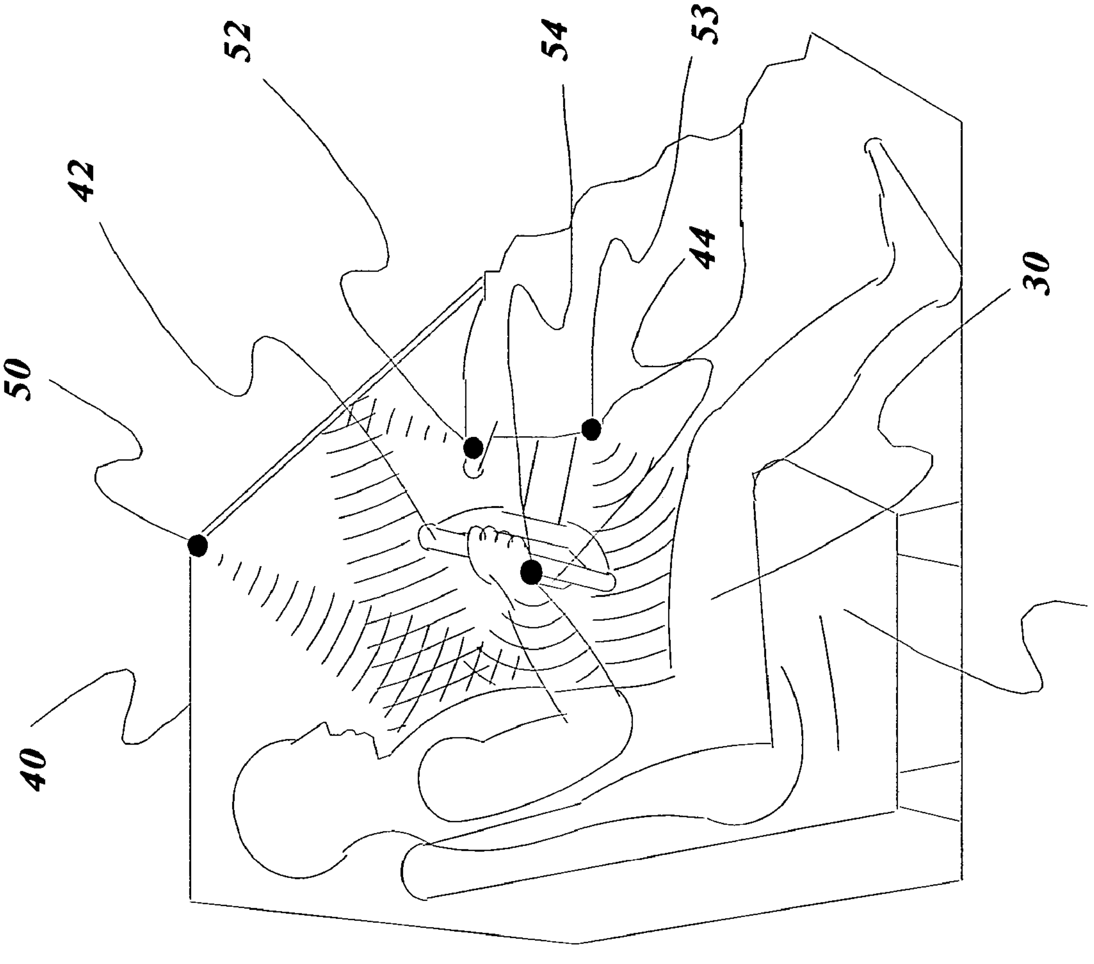
FIG. 5 is a side view, with certain portions removed or cut away, of a portion of the passenger compartment of a vehicle showing several preferred mounting locations of occupant position sensors for sensing the position of the vehicle driver.

Each of these methods of transmission or reception could be used, for example, at any of the preferred mounting locations shown in FIG. 5.

Figure 7:
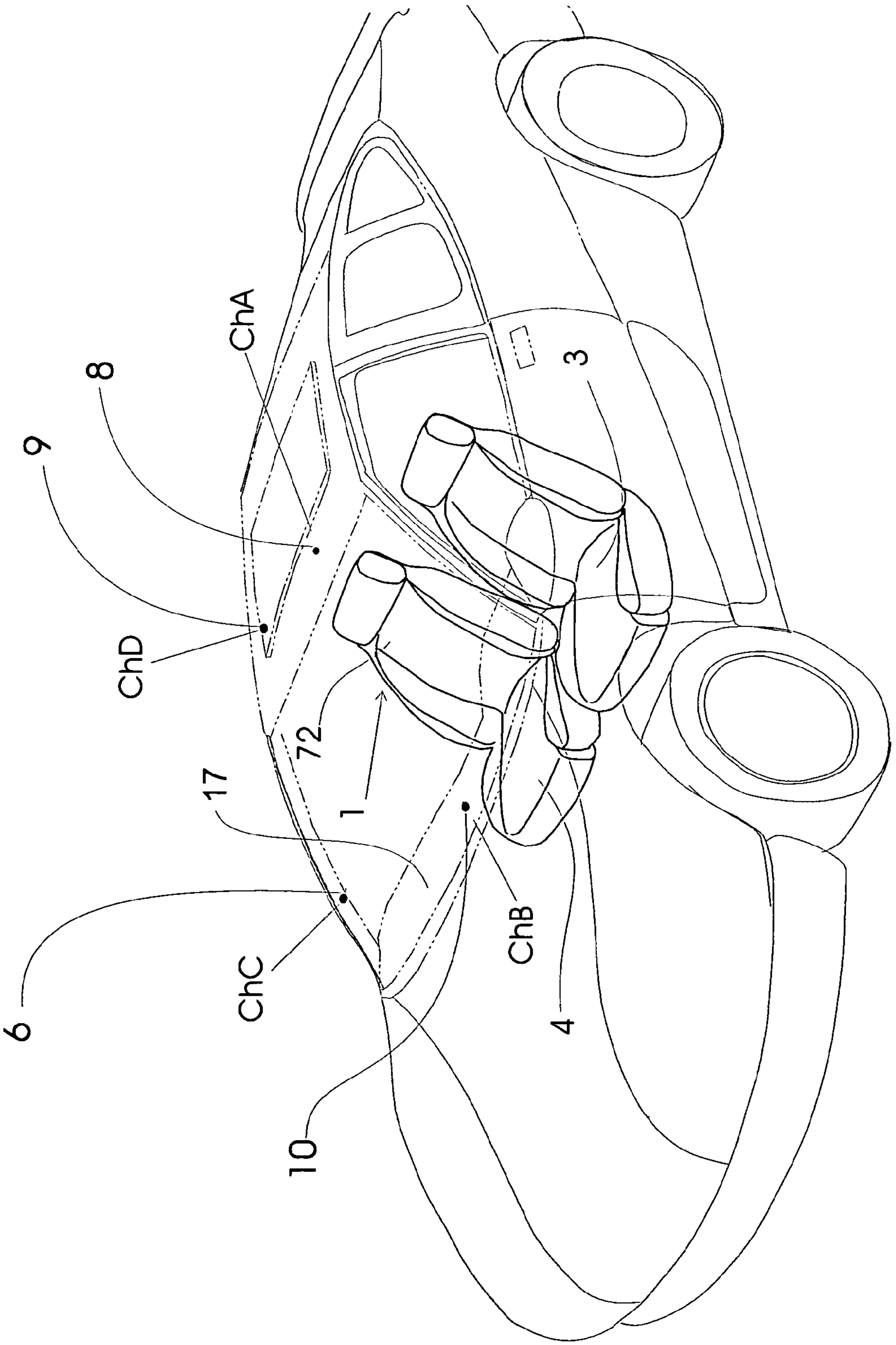
FIG. 7 is a perspective view of a vehicle showing the position of the ultrasonic or electromagnetic sensors relative to the driver and front passenger seats.

As shown in FIG. 7, there are provided four sets of wave-receiving sensor systems 6, 8, 9, 10 mounted within the passenger compartment. Each set of sensor systems 6, 8, 9, 10 comprises a transmitter and a receiver (or just a receiver in some cases), which may be integrated into a single unit or individual components separated from one another. In this embodiment, the sensor system 8 is mounted on the A-Pillar of the vehicle. The sensor system 9 is mounted on the upper portion of the B-Pillar. The sensor system 6 is mounted on the roof ceiling portion or the headliner. The sensor system 10 is mounted near the middle of an instrument panel 17 in front of the driver's seat 3.

The sensor systems 6, 8, 9, 10 are preferably ultrasonic or electromagnetic, although sensor systems 6, 8, 9, 10 can be other types of sensors which will detect the presence of an occupant from a distance including capacitive or electric field sensors. Also, if the sensor systems 6, 8, 9, 10 are passive infrared sensors, for example, then they may only comprise a wave-receiver. Recent advances in Quantum Well Infrared Photodetectors by NASA show great promise for this application. See "Many Applications Possible For Largest Quantum Infrared Detector", Goddard Space Center News Release Feb. 27, 2002.

The Quantum Well Infrared Photodetector is a new detector which promises to be a low-cost alternative to conventional infrared detector technology for a wide range of scientific and commercial applications, and particularly for sensing inside and outside of a vehicle. The main problem that needs to be solved is that it operates at 76 degrees Kelvin (−323 degrees F.).

A section of the passenger compartment of an automobile is shown generally as 40 in FIGS. 8A-8D. A driver 30 of a vehicle sits on a seat 3 behind a steering wheel 42, which contains an airbag assembly 44. Airbag assembly 44 may be integrated into the steering wheel assembly or coupled to the steering wheel 42. Five transmitter and/or receiver assemblies 49, 50, 51, 52 and 54 are positioned at various places in the passenger compartment to determine the location of various parts of the driver, e.g., the head, chest and torso, relative to the airbag and to otherwise monitor the interior of the passenger compartment. Monitoring of the interior of the passenger compartment can entail detecting the presence or absence of the driver and passengers, differentiating between animate and inanimate objects, detecting the presence of occupied or unoccupied child seats, rear-facing or forward-facing, and identifying and ascertaining the identity of the occupying items in the passenger compartment.

A processor such as control circuitry 20 is connected to the transmitter/receiver assemblies 49, 50, 51, 52, 54 and controls the transmission from the transmitters, if a transmission component is present in the assemblies, and captures the return signals from the receivers, if a receiver component is present in the assemblies. Control circuitry 20 usually contains analog to digital converters (ADCs) or a frame grabber or equivalent, a microprocessor containing sufficient memory and appropriate software including pattern recognition algorithms, and other appropriate drivers, signal conditioners, signal generators, etc. Usually, in any given implementation, only three or four of the transmitter/receiver assemblies would be used depending on their mounting locations as described below. In some special cases such as for a simple classification system, only a single or sometimes two transmitter/receiver assemblies are used.

A portion of the connection between the transmitter/receiver assemblies 49, 50, 51, 52, 54 and the control circuitry 20, is shown as wires. These connections can be wires, either individual wires leading from the control circuitry 20 to each of the transmitter/receiver assemblies 49, 50, 51, 52, 54 or one or more wire buses or in some cases, wireless data transmission can be used.

The location of the control circuitry 20 in the dashboard of the vehicle is for illustration purposes only and does not limit the location of the control circuitry 20. Rather, the control circuitry 20 may be located anywhere convenient or desired in the vehicle.

It is contemplated that a system and method in accordance with the invention can include a single transmitter and multiple receivers, each at a different location. Thus, each receiver would not be associated with a transmitter forming transmitter/receiver assemblies. Rather, for example, with reference to FIG. 8A, only element 51 could constitute a transmitter/receiver assembly and elements 49, 50, 52 and 54 could be receivers only.

On the other hand, it is conceivable that in some implementations, a system and method in accordance with the invention include a single receiver and multiple transmitters. Thus, each transmitter would not be associated with a receiver forming transmitter/receiver assemblies. Rather, for example, with reference to FIG. 8A, only element 51 would constitute a transmitter/receiver assembly and elements 49, 50, 52, 54 would be transmitters only.

An ultrasonic transmitter/receiver as used herein is similar to that used on modern auto-focus cameras such as manufactured by the Polaroid Corporation. Other camera autofocusing systems use different technologies, which are also applicable here, to achieve the same distance to object determination. One camera system manufactured by Fuji of Japan, for example, uses a stereoscopic system which could also be used to determine the position of a vehicle occupant providing there is sufficient light available. In the case of insufficient light, a source of infrared light can be added to illuminate the driver. In a related implementation, a source of infrared light is reflected off of the windshield and illuminates the vehicle occupant. An infrared receiver 56 is located attached to the rear view mirror 55, as shown in FIG. 8E. Alternately, the infrared can be sent by the device 50 and received by a receiver elsewhere. Since any of the devices shown in these figures could be either transmitters or receivers or both, for simplicity, only the transmitted and not the reflected wave fronts are frequently illustrated.

When using the surface of the windshield as a reflector of infrared radiation (for transmitter/receiver assembly and element 52), care must be taken to assure that the desired reflectivity at the frequency of interest is achieved. Mirror materials, such as metals and other special materials manufactured by Eastman Kodak, have a reflectivity for infrared frequencies that is substantially higher than at visible frequencies. They are thus candidates for coatings to be placed on the windshield surfaces for this purpose.

Figure 9:
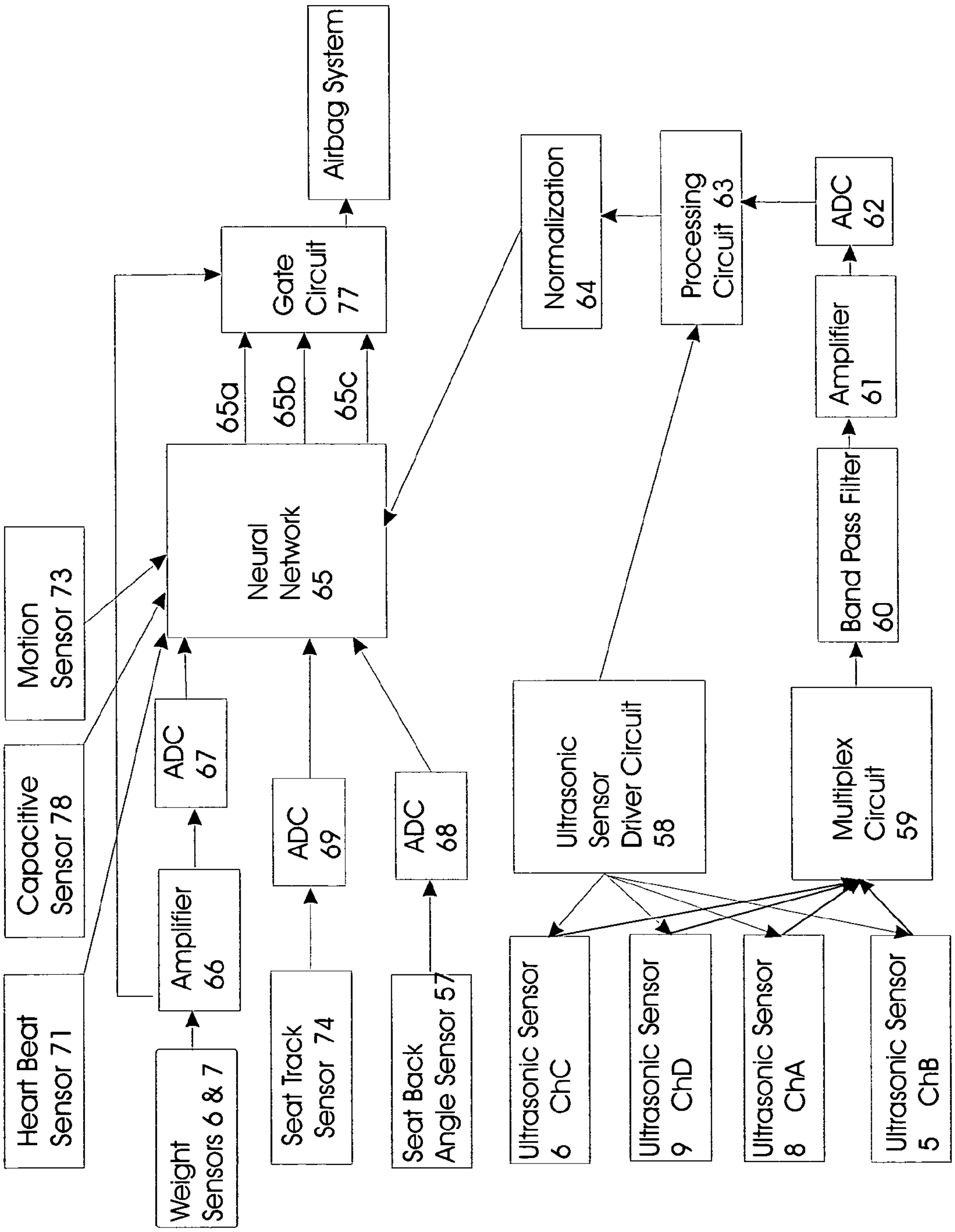
FIG. 9 is a circuit diagram of the seated-state detecting unit of the present invention.

The ultrasonic or electromagnetic sensor systems 5, 6, 8 and 9 can be controlled or driven, one at a time or simultaneously, by an appropriate driver circuit such as ultrasonic or electromagnetic sensor driver circuit 58 shown in FIG. 9. The transmitters of the ultrasonic or electromagnetic sensor systems 5, 6, 8, 9 transmit respective ultrasonic or electromagnetic waves toward the seat 4 and transmit pulses (see FIG. 10(*c*)) in sequence at times t1, t2, t3 and t4 (t4>t3>t2>t1) or simultaneously (t1=t2=t3=t4). The reflected waves of the ultrasonic or electromagnetic waves are received by the receivers ChA-ChD of the ultrasonic or electromagnetic sensors 5, 6, 8, 9. The receiver ChA is associated with the ultrasonic or electromagnetic sensor system 8, the receiver ChB is associated with the ultrasonic or electromagnetic sensor system 5, the receiver ChD is associated with the ultrasonic or electromagnetic sensor system 6, and the receiver ChD is associated with the ultrasonic or electromagnetic sensor system 9.

Figure 12A:
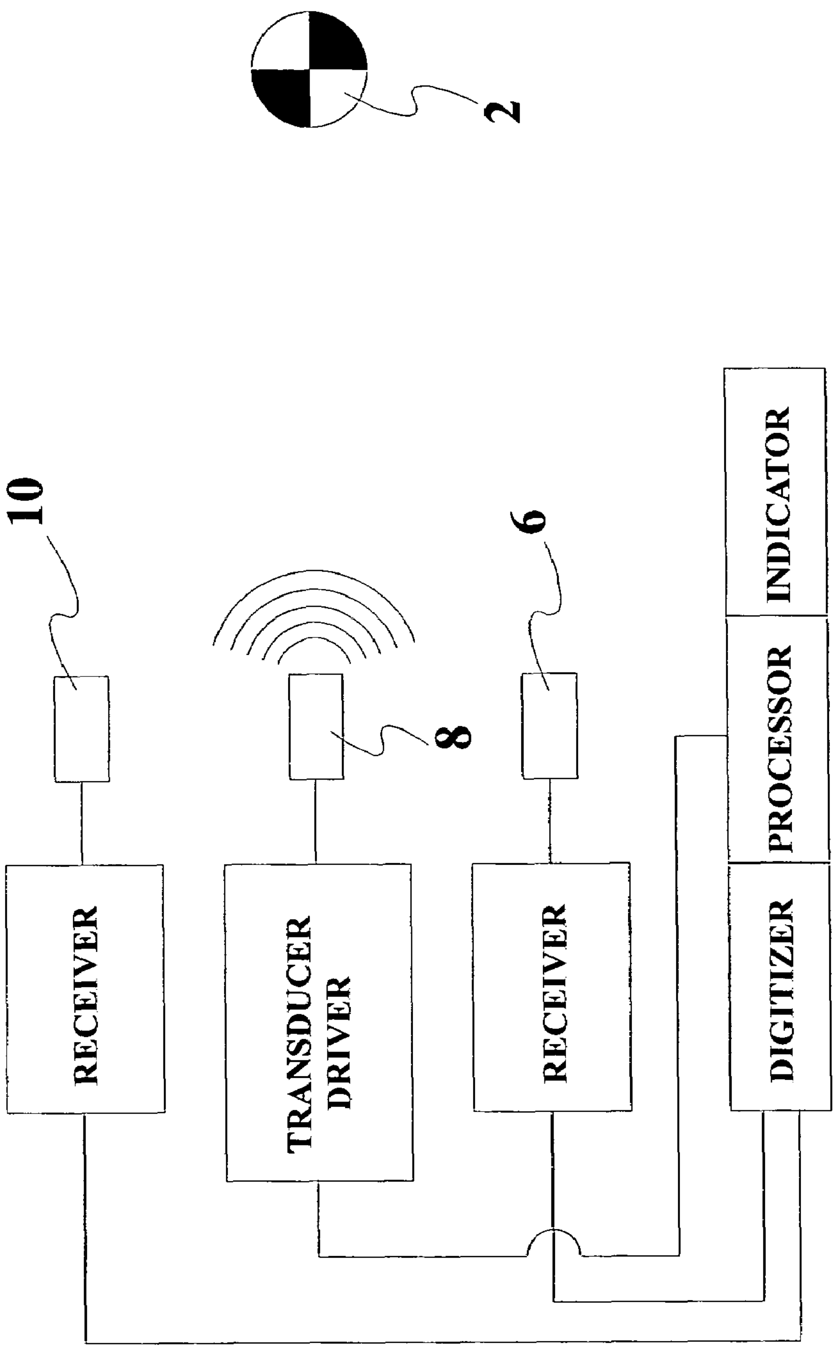
FIG. 12A is a functional block diagram of the ultrasonic imaging system illustrated in FIG. 1 using a microprocessor, DSP or field programmable gate array (FGPA). 12B is a functional block diagram of the ultrasonic imaging system illustrated in FIG. 1 using an application specific integrated circuit (ASIC).
Figure 12B:
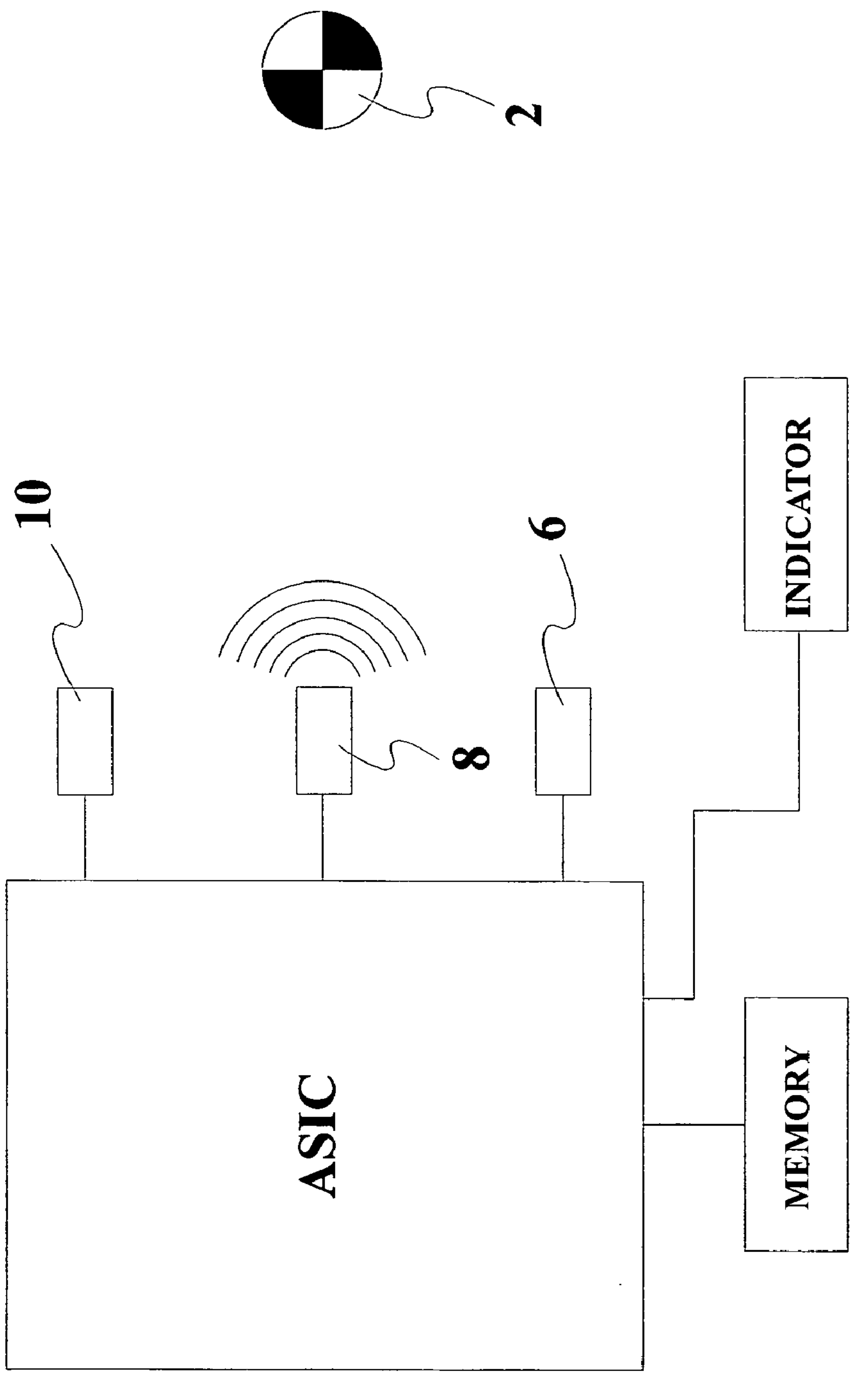

There are two preferred methods of implementing the vehicle interior monitoring system of this invention, a microprocessor system and an application specific integrated circuit system (ASIC). Both of these systems are represented schematically as 20 herein. In some systems, both a microprocessor and an ASIC are used. In other systems, most if not all of the circuitry is combined onto a single chip (system on a chip). The particular implementation depends on the quantity to be made and economic considerations. A block diagram illustrating the microprocessor system is shown in FIG. 12A which shows the implementation of the system of FIG. 1. An alternate implementation of the FIG. 1 system using an ASIC is shown in FIG. 12B. In both cases the target, which may be a rear facing child seat, is shown schematically as 2 and the three transducers as 6, 8, and 10. In the embodiment of FIG. 12A, there is a digitizer coupled to the receivers 6, 10 and the processor, and an indicator coupled to the processor. In the embodiment of FIG. 12B, there is a memory unit associated with the ASIC and also an indicator coupled to the ASIC.

1.1 Ultrasonics

Referring now to FIGS. 5 and 13 through 17, a section of the passenger compartment of an automobile is shown generally as 40 in FIG. 5. A driver of a vehicle 30 sits on a seat 3 behind a steering wheel 42 which contains an airbag assembly 44. Four transmitter and/or receiver assemblies 50, 52, 53 and 54 are positioned at various places in the passenger compartment to determine the location of the head, chest and torso of the driver relative to the airbag. Usually, in any given implementation, only one or two of the transmitters and receivers would be used depending on their mounting locations as described below.

FIG. 5 illustrates several of the possible locations of such devices. For example, transmitter and receiver 50 emits ultrasonic acoustical waves which bounce off the chest of the driver and return. Periodically, a burst of ultrasonic waves at about 50 kilohertz is emitted by the transmitter/receiver and then the echo, or reflected signal, is detected by the same or different device. An associated electronic circuit measures the time between the transmission and the reception of the ultrasonic waves and determines the distance from the transmitter/receiver to the driver based on the velocity of sound. This information can then be sent to a microprocessor that can be located in the crash sensor and diagnostic circuitry which determines if the driver is close enough to the airbag that a deployment might, by itself, cause injury to the driver. In such a case, the circuit disables the airbag system and thereby prevents its deployment. In an alternate case, the sensor algorithm assesses the probability that a crash requiring an airbag is in process and waits until that probability exceeds an amount that is dependent on the position of the occupant. Thus, for example, the sensor might decide to deploy the airbag based on a need probability assessment of 50%, if the decision must be made immediately for an occupant approaching the airbag, but might wait until the probability rises to 95% for a more distant occupant. Although a driver system has been illustrated, the passenger system would be similar.

Alternate mountings for the transmitter/receiver include various locations on the instrument panel on either side of the steering column such as 53 in FIG. 5. Also, although some of the devices herein illustrated assume that for the ultrasonic system the same device is used for both transmitting and receiving waves, there are advantages in separating these functions at least for standard transducer systems. Since there is a time lag required for the system to stabilize after transmitting a pulse before it can receive a pulse, close measurements are enhanced, for example, by using separate transmitters and receivers. In addition, if the ultrasonic transmitter and receiver are separated, the transmitter can transmit continuously providing the transmitted signal is modulated such that the received signal can be compared with the transmitted signal to determine the time it took for the waves to reach and reflect off of the occupant.

Many methods exist for this modulation including varying the frequency or amplitude of the waves or by pulse modulation or coding. In all cases, the logic circuit which controls the sensor and receiver must be able to determine when the signal which was most recently received was transmitted. In this manner, even though the time that it takes for the signal to travel from the transmitter to the receiver, via reflection off of the occupant, may be several milliseconds, information as to the position of the occupant is received continuously which permits an accurate, although delayed, determination of the occupant's velocity from successive position measurements.

Conventional ultrasonic distance measuring devices must wait for the signal to travel to the occupant and return before a new signal is sent. This greatly limits the frequency at which position data can be obtained to the formula where the frequency is equal to the velocity of sound divided by two times the distance to the occupant. For example, if the velocity of sound is taken at about 1000 feet per second, occupant position data for an occupant located one foot from the transmitter can only be obtained every 2 milliseconds which corresponds to a frequency of 500 Hz. At a three foot displacement and allowing for some processing time, the frequency is closer to 100 Hz.

This slow frequency that data can be collected seriously degrades the accuracy of the velocity calculation. The reflection of ultrasonic waves from the clothes of an occupant or the existence of thermal gradients, for example, can cause noise or scatter in the position measurement and lead to significant inaccuracies in a given measurement. When many measurements are taken more rapidly, as in the technique described here, these inaccuracies can be averaged and a significant improvement in the accuracy of the velocity calculation results.

The determination of the velocity of the occupant need not be derived from successive distance measurements. A potentially more accurate method is to make use of the Doppler Effect where the frequency of the reflected waves differs from the transmitted waves by an amount which is proportional to the occupant's velocity. In a preferred embodiment, a single ultrasonic transmitter and a separate receiver are used to measure the position of the occupant, by the travel time of a known signal, and the velocity, by the frequency shift of that signal. Although the Doppler Effect has been used to determine whether an occupant has fallen asleep, it has not previously been used in conjunction with a position measuring device to determine whether an occupant is likely to become out of position, i.e., an extrapolated position in the future based on the occupant's current position and velocity as determined from successive position measurements) and thus in danger of being injured by a deploying airbag. This combination is particularly advantageous since both measurements can be accurately and efficiently determined using a single transmitter and receiver pair resulting in a low cost system.

Figures 10A, 10B, 10C:
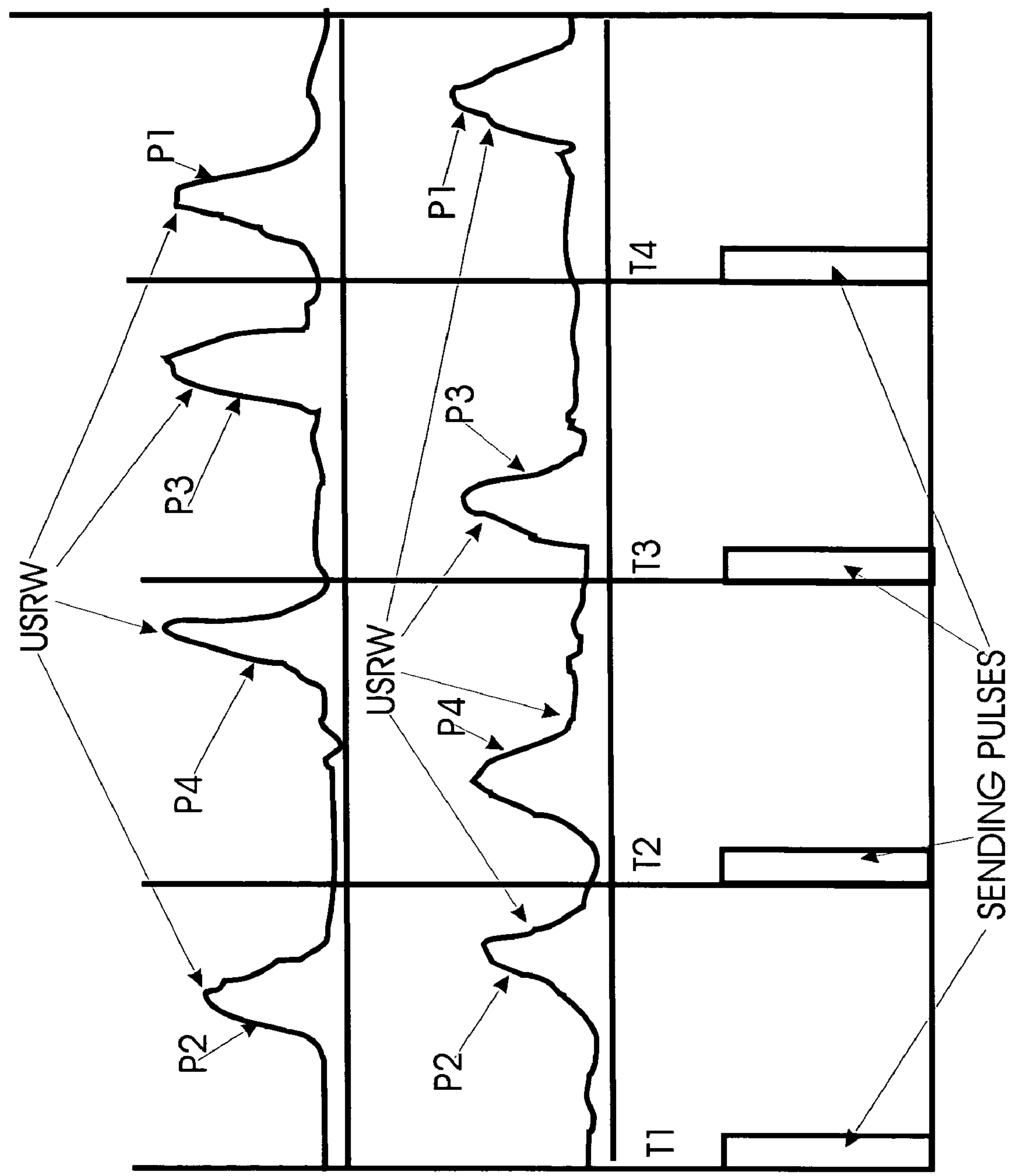
FIGS. 10(*a*), 10(*b*) and 10(*c*) are each a diagram showing the configuration of the reflected waves of an ultrasonic wave transmitted from each transmitter of the ultrasonic sensors toward the passenger seat, obtained within the time that the reflected wave arrives at a receiver, FIG. 10(*a*) showing an example of the reflected waves obtained when a passenger is in a normal seated-state, FIG. 10(*b*) showing an example of the reflected waves obtained when a passenger is in an abnormal seated-state (where the passenger is seated too close to the instrument panel), and FIG. 10(*c*) showing a transmit pulse.

The following discussion will apply to the case where ultrasonic sensors are used although a similar discussion can be presented relative to the use of electromagnetic sensors such as active infrared sensors, taking into account the differences in the technologies. Also, the following discussion will relate to an embodiment wherein the seat 1 is the front passenger seat. FIGS. 10(*a*) and 10(*b*) show examples of the reflected ultrasonic waves USRW that are received by receivers ChA-ChD. FIG. 10(*a*) shows an example of the reflected wave USRW that is obtained when an adult sits in a normally seated space on the passenger seat 4, while FIG. 10(*b*) shows an example of the reflected wave USRW that are obtained when an adult sits in a slouching state (one of the abnormal seated-states) in the passenger seat 4.

Figure 6:
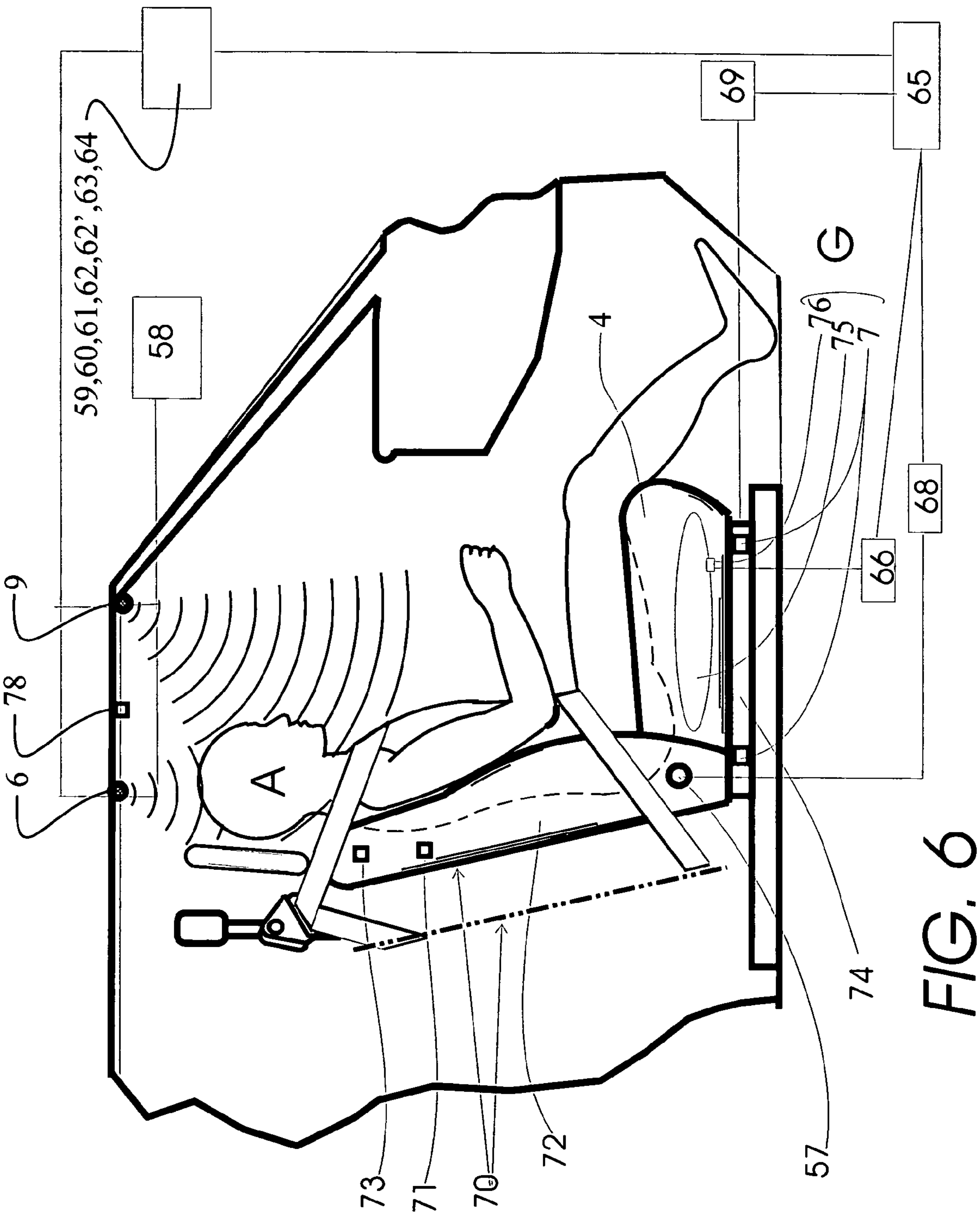
FIG. 6 shows a seated-state detecting unit in accordance with the present invention and the connections between ultrasonic or electromagnetic sensors, a weight sensor, a reclining angle detecting sensor, a seat track position detecting sensor, a heartbeat sensor, a motion sensor, a neural network, and an airbag system installed within a vehicle compartment.

In the case of a normally seated passenger, as shown in FIGS. 6 and 7, the location of the ultrasonic sensor system 6 is closest to the passenger A. Therefore, the reflected wave pulse P1 is received earliest after transmission by the receiver ChD as shown in FIG. 10(*a*), and the width of the reflected wave pulse P1 is larger. Next, the distance from the ultrasonic sensor 8 is closer to the passenger A, so a reflected wave pulse P2 is received earlier by the receiver ChA compared with the remaining reflected wave pulses P3 and P4. Since the reflected wave pauses P3 and P4 take more time than the reflected wave pulses P1 and P2 to arrive at the receivers ChC and ChB, the reflected wave pulses P3 and P4 are received as the timings shown in FIG. 10(*a*). More specifically, since it is believed that the distance from the ultrasonic sensor system 6 to the passenger A is slightly shorter than the distance from the ultrasonic sensor system 5 to the passenger A, the reflected wave pulse P3 is received slightly earlier by the receiver ChC than the reflected wave pulse P4 is received by the receiver ChB.

In the case where the passenger A is sitting in a slouching state in the passenger seat 4, the distance between the ultrasonic sensor system 6 and the passenger A is shortest. Therefore, the time from transmission at time t3 to reception is shortest, and the reflected wave pulse P3 is received by the receiver ChC, as shown in FIG. 10(*b*). Next, the distances between the ultrasonic sensor system 5 and the passenger A becomes shorter, so the reflected wave pulse P4 is received earlier by the receiver ChB than the remaining reflected wave pulses P2 and P1. When the distance from the ultrasonic sensor system 8 to the passenger A is compared with that from the ultrasonic sensor system 9 to the passenger A, the distance from the ultrasonic sensor system 8 to the passenger A becomes shorter, so the reflected wave pulse P2 is received by the receiver ChA first and the reflected wave pulse P1 is thus received last by the receiver ChD.

The configurations of the reflected wave pulses P1-P4, the times that the reflected wave pulses P1-P4 are received, the sizes of the reflected wave pulses P1-P4 are varied depending upon the configuration and position of an object such as a passenger situated on the front passenger seat 1. FIGS. 10(*a*) and (*b*) merely show examples for the purpose of description and therefore the present invention is not limited to these examples.

The outputs of the receivers ChA-ChD, as shown in FIG. 9, are input to a band pass filter 60 through a multiplex circuit 59 which is switched in synchronization with a timing signal from the ultrasonic sensor drive circuit 58. The band pass filter 60 removes a low frequency wave component from the output signal based on each of the reflected wave USRW and also removes some of the noise. The output signal based on each of the reflected wave USRW is passed through the band pass filter 60, then is amplified by an amplifier 61. The amplifier 61 also removes the high frequency carrier wave component in each of the reflected USRW and generates an envelope wave signal. This envelope wave signal is input to an analog/digital converter (ADC) 62 and digitized as measured data. The measured data is input to a processing circuit 63, which is controlled by the timing signal which is in turn output from the ultrasonic sensor drive circuit 58.

The processing circuit 63 collects measured data at intervals of 7 ms (or at another time interval with the time interval also being referred to as a time window or time period), and 47 data points are generated for each of the ultrasonic sensor systems 5, 6, 8, 9. For each of these reflected waves USRW, the initial reflected wave portion T1 and the last reflected wave portion T2 are cut off or removed in each time window. The reason for this will be described when the training procedure of a neural network is described later, and the description is omitted for now. With this, 38 32 31 and 37 data points will be sampled by the ultrasonic sensor systems 5, 6, 8 and 9, respectively. The reason why the number of data points differs for each of the ultrasonic sensor systems 5, 6, 8, 9 is that the distance from the passenger seat 4 to the ultrasonic sensor systems 5, 6, 8, 9 differ from one another.

Each of the measured data is input to a normalization circuit 64 and normalized. The normalized measured data is input to the neural network 65 as wave data.

A comprehensive occupant sensing system will now be discussed which involves a variety of different sensors.

Many of these sensors will be discussed in more detail under the appropriate sections below. FIG. 6 shows a passenger seat 70 to which an adjustment apparatus including a seated-state detecting unit according to the present invention may be applied. The seat 70 includes a horizontally situated bottom seat portion 4 and a vertically oriented back portion 72. The seat portion 4 is provided with one or more weight sensors 7,76 that determine the weight of the object occupying the seat. The coupled portion between the seated portion 4 and the back portion 72 is provided with a reclining angle detecting sensor 57, which detects the tilted angle of the back portion 72 relative to the seat portion 4. The seat portion 4 is provided with a seat track position-detecting sensor 74. The seat track position detecting sensor 74 fulfills a role of detecting the quantity of movement of the seat portion 4 which is moved from a back reference position, indicated by the dotted chain line. Embedded within the back portion 72 is a heartbeat sensor 71 and a motion sensor 73. Attached to the headliner is a capacitance sensor 78. The seat 70 may be the driver seat, the front passenger seat or any other seat in a motor vehicle as well as other seats in transportation vehicles or seats in non-transportation applications.

Weight measuring means such as the sensors 7 and 76 are associated with the seat, e.g., mounted into or below the seat portion 4 or on the seat structure, for measuring the weight applied onto the seat. The weight may be zero if no occupying item is present and the sensors are calibrated to only measure incremental weight. Sensors 7 and 76 may represent a plurality of different sensors which measure the weight applied onto the seat at different portions thereof or for redundancy purposes, e.g., such as by means of an airbag or fluid filled bladder 75 in the seat portion 4. Airbag or bladder 75 may contain a single or a plurality of chambers, each of which is associated with a sensor (transducer) 76 for measuring the pressure in the chamber. Such sensors may be in the form of strain, force or pressure sensors which measure the force or pressure on the seat portion 4 or seat back 72, a part of the seat portion 4 or seat back 72, displacement measuring sensors which measure the displacement of the seat surface or the entire seat 70 such as through the use of strain gages mounted on the seat structural members, such as 7, or other appropriate locations, or systems which convert displacement into a pressure wherein one or more pressure sensors can be used as a measure of weight and/or weight distribution. Sensors 7,76 may be of the types disclosed in U.S. Pat. No. 06,242,701.

As illustrated in FIG. 9, the output of the weight sensor(s) 7 and 76 is amplified by an amplifier 66 coupled to the weight sensor(s) 7,76 and the amplified output is input to the analog/digital converter 67.

A heartbeat sensor 71 is arranged to detect a heart beat, and the magnitude thereof, of a human occupant of the seat, if such a human occupant is present. The output of the heart beat sensor 71 is input to the neural network 65. The heartbeat sensor 71 may be of the type as disclosed in McEwan (U.S. Pat. No. 05,573,012 and U.S. Pat. No. 05,766,208). The heartbeat sensor 71 can be positioned at any convenient position relative to the seat 4 where occupancy is being monitored. A preferred location is within the vehicle seatback.

The reclining angle detecting sensor 57 and the seat track position-detecting sensor 74, which each may comprise a variable resistor, can be connected to constant-current circuits, respectively. A constant-current is supplied from the constant-current circuit to the reclining angle detecting sensor 57, and the reclining angle detecting sensor 57 converts a change in the resistance value on the tilt of the back portion 72 to a specific voltage. This output voltage is input to an analog/digital converter 68 as angle data, i.e., representative of the angle between the back portion 72 and the seat portion 4. Similarly, a constant current can be supplied from the constant-current circuit to the seat track position-detecting sensor 74 and the seat track position detecting sensor 72 converts a change in the resistance value based on the track position of the seat portion 4 to a specific voltage. This output voltage is input to an analog/digital converter 69 as seat track data. Thus, the outputs of the reclining angle-detecting sensor 57 and the seat track position-detecting sensor 74 are input to the analog/digital converters 68 and 69, respectively. Each digital data value from the ADCs 68,69 is input to the neural network 65. Although the digitized data of the weight sensor(s) 7,76 is input to the neural network 65, the output of the amplifier 66 is also input to a comparison circuit. The comparison circuit, which is incorporated in the gate circuit algorithm, determines whether or not the weight of an object on the passenger seat 70 is more than a predetermined weight, such as 60 lbs., for example. When the weight is more than 60 lbs., the comparison circuit outputs a logic 1 to the gate circuit to be described later. When the weight of the object is less than 60 lbs., a logic 0 is output to the gate circuit. A more detailed description of this and similar systems can be found in the above-referenced patents and patent applications assigned to the current assignee. The system described above is one example of many systems that can be designed using the teachings of this invention for detecting the occupancy state of the seat of a vehicle.

Figure 18:
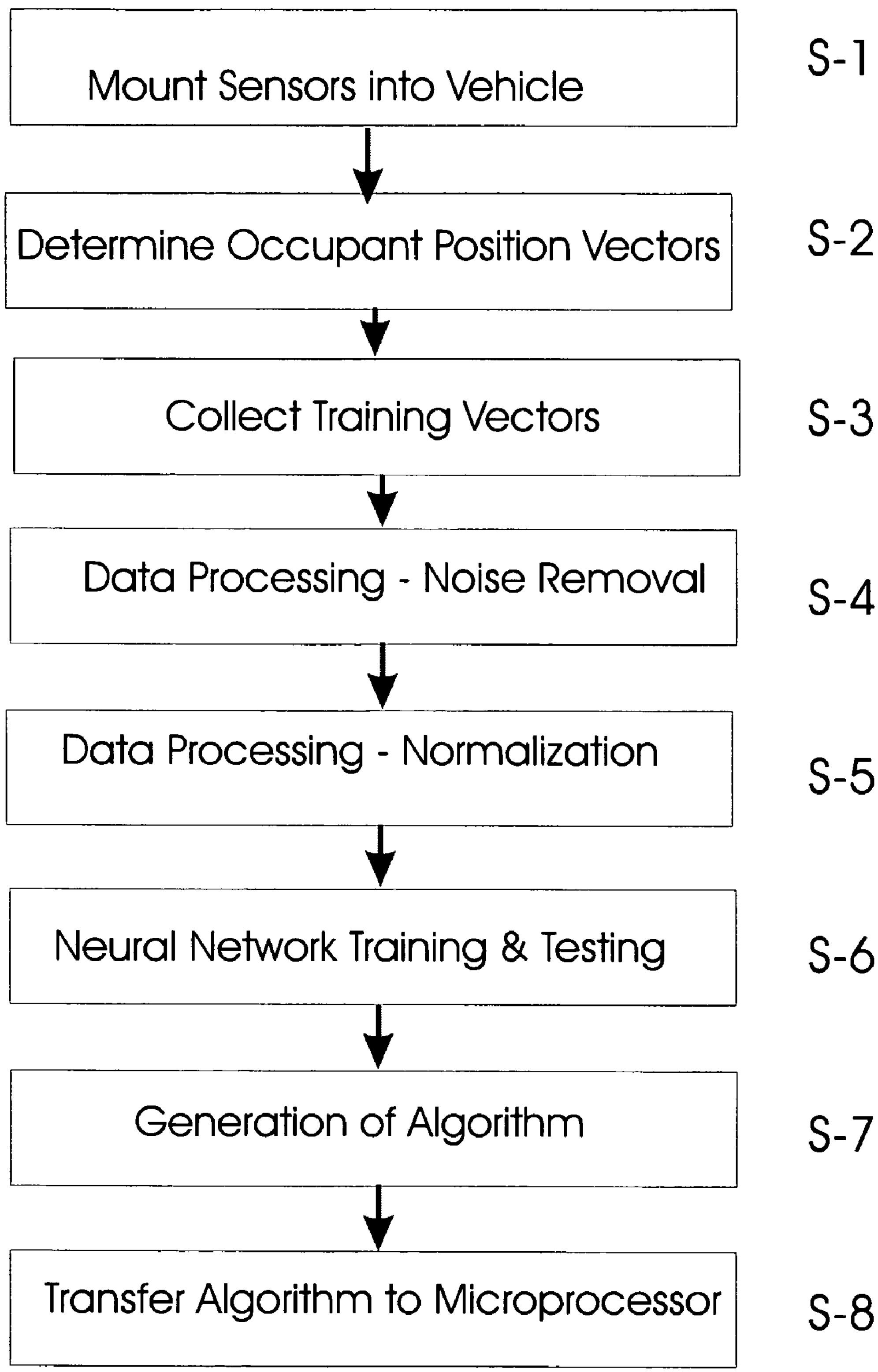
FIG. 18 a flowchart showing the training steps of a neural network.

As diagrammed in FIG. 18, the first step is to mount the four sets of ultrasonic sensor systems 11-14, the weight sensors 7,76, the reclining angle detecting sensor 57, and the seat track position detecting sensor 74 into a vehicle (step S1). Next, in order to provide data for the neural network 65 to learn the patterns of seated states, data is recorded for patterns of all possible seated states and a list is maintained recording the seated states for which data was acquired. The data from the sensors/transducers 76, 5-9, 57, 74, 9-14 and 71, 73, 78 for a particular occupancy of the passenger seat is called a vector (step S2). It should be pointed out that the use of the reclining angle detecting sensor 57, seat track position detecting sensor 74, heart beat sensor 71, capacitive sensor 78 and motion sensor 73 is not essential to the detecting apparatus and method in accordance with the invention. However, each of these sensors, in combination with any one or more of the other sensors enhances the evaluation of the seated-state of the seat.

Figure 11:
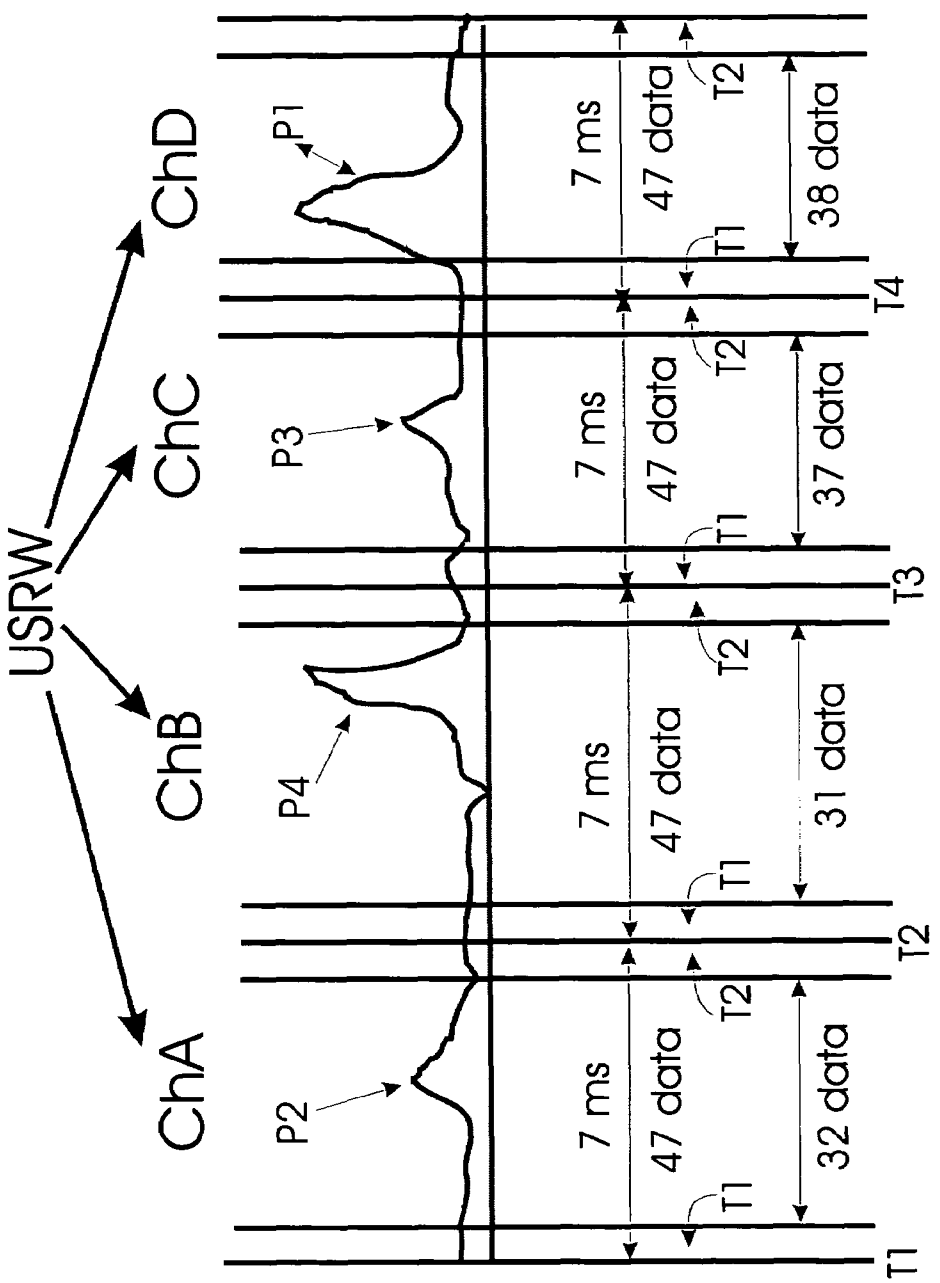
FIG. 11 is a diagram of the data processing of the reflected waves from the ultrasonic or electromagnetic sensors.

Next, based on the training data from the reflected waves of the ultrasonic sensor systems 5,6,8,9 and the other sensors 7,76, 71,73,78 the vector data is collected (step S3). Next, the reflected waves P1-P4 are modified by removing the initial reflected waves from each time window with a short reflection time from an object (range gating) (period T1 in FIG. 11) and the last portion of the reflected waves from each time window with a long reflection time from an object (period P2 in FIG. 11) (step S4). It is believed that the reflected waves with a short reflection time from an object is due to cross-talk, that is, waves from the transmitters which leaks into each of their associated receivers ChA-ChD. It is also believed that the reflected waves with a long reflection time are reflected waves from an object far away from the passenger seat or from multipath reflections. If these two reflected wave portions are used as data, they will add noise to the training process. Therefore, these reflected wave portions are eliminated from the data.

Recent advances in ultrasonic transducer design have now permitted the use of a single transducer acting as both a sender (transmitter) and receiver. These same advances have substantially reduced the ringing of the transducer after the excitation pulse has been caused to die out to where targets as close as about 2 inches from the transducer can be sensed. Thus, the magnitude of the T1 time period has been substantially reduced.

Figure 19A:
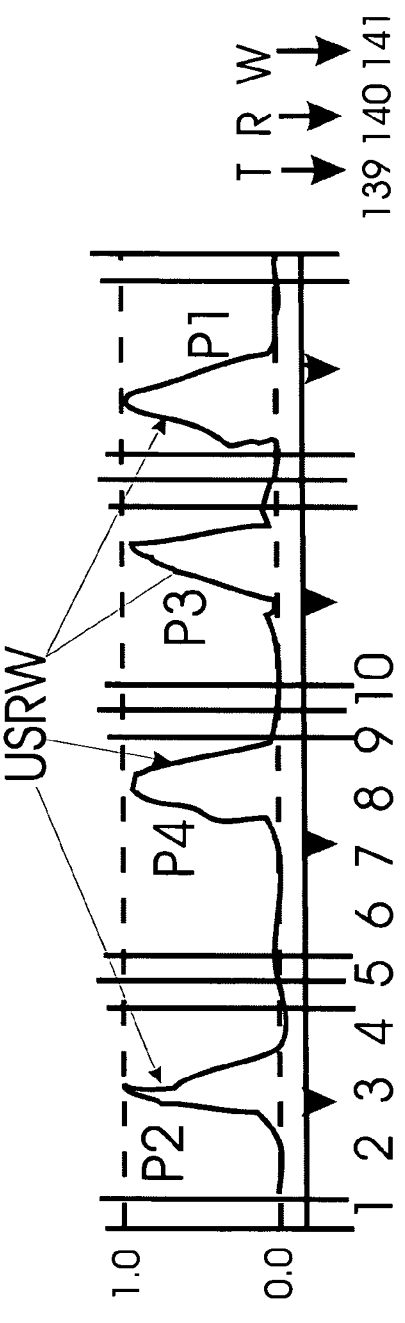
FIG. 19(*a*) is an explanatory diagram of a process for normalizing the reflected wave and shows normalized reflected waves.

As shown in FIG. 19(*a*), the measured data is normalized by making the peaks of the reflected wave pulses P1-P4 equal (step S5). This eliminates the effects of different reflectivities of different objects and people depending on the characteristics of their surfaces such as their clothing. Data from the weight sensor, seat track position sensor and seat reclining angle sensor are also frequently normalized based typically on fixed normalization parameters.

The data from the transducers are now also preferably fed through a logarithmic compression circuit that substantially reduces the magnitude of reflected signals from high reflectivity targets compared to those of low reflectivity. Additionally, a time gain circuit is used to compensate for the difference in sonic strength received by the transducer based on the distance of the reflecting object from the transducer.

Figure 20:
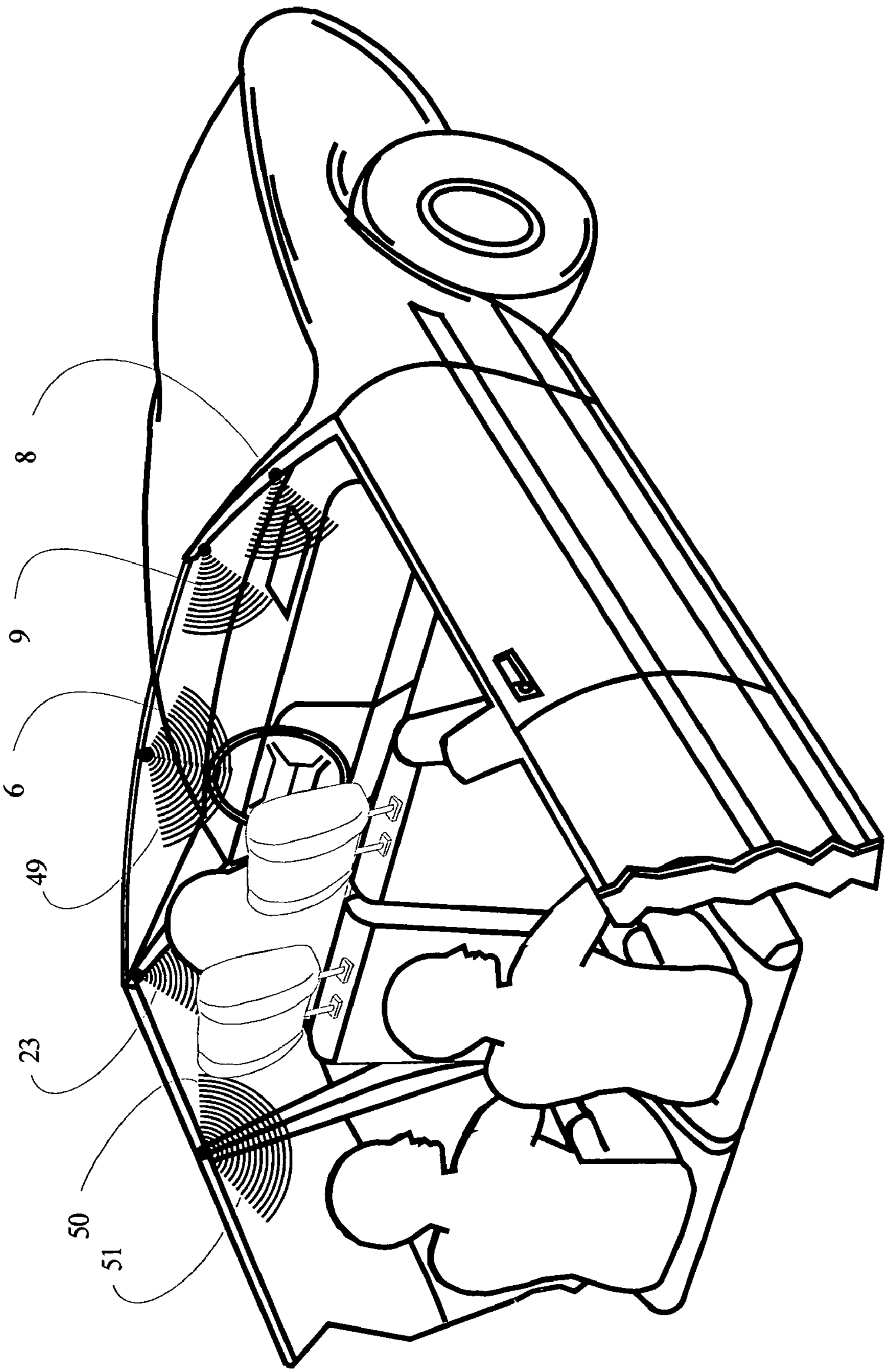
FIG. 20 is a perspective view of the interior of the passenger compartment of an automobile, with parts cut away and removed, showing a variety of transmitters that can be used in a phased array system.

As various parts of the vehicle interior identification and monitoring system described in the above reference patent applications are implemented, a variety of transmitting and receiving transducers will be present in the vehicle passenger compartment. If several of these transducers are ultrasonic transmitters and receivers, they can be operated in a phased array manner, as described elsewhere for the headrest, to permit precise distance measurements and mapping of the components of the passenger compartment. This is illustrated in FIG. 20 which is a perspective view of the interior of the passenger compartment showing a variety of transmitters and receivers, 6, 8, 9, 23, 49-51 which can be used in a sort of phased array system. In addition, information can be transmitted between the transducers using coded signals in an ultrasonic network through the vehicle compartment airspace. If one of these sensors is an optical CCD or CMOS array, the location of the driver's eyes can be accurately determined and the results sent to the seat ultrasonically. Obviously, many other possibilities exist.

The speed of sound varies with temperature, humidity, and pressure. This can be compensated for by using the fact that the geometry between the transducers is known and the speed of sound can therefore be measured. Thus, on vehicle startup and as often as desired thereafter, the speed of sound can be measured by one transducer, such as transducer 18 in FIG. 21, sending a signal which is directly received by another transducer 5. Since the distance separating them is known, the speed of sound can be calculated and the system automatically adjusted to remove the variation due to the changes in the speed of sound. Therefore, the system operates with same accuracy regardless of the temperature, humidity or atmospheric pressure. It may even be possible to use this technique to also automatically compensate for any effects due to wind velocity through an open window. An additional benefit of this system is that it can be used to determine the vehicle interior temperature for use by other control systems within the vehicle since the variation in the velocity of sound is a strong function of temperature and a weak function of pressure and humidity.

The problem with the speed of sound measurement described above is that some object in the vehicle may block the path from one transducer to another. This of course could be checked and a correction not be made if the signal from one transducer does not reach the other transducer. The problem, however, is that the path might not be completely blocked but only slightly blocked. This would cause the ultrasonic path length to increase, which would give a false indication of a temperature change. This can be solved by using more than one transducer. All of the transducers can broadcast signals to all of the other transducers. The problem here, of course, is which transducer pair does one believe if they all give different answers. The answer is the one that gives the shortest distance or the greatest calculated speed of sound. By this method, there are a total of 6 separate paths for four ultrasonic transducers.

An alternative method of determining the temperature is to use the transducer circuit to measure some parameter of the transducer that changes with temperature. For example, the natural frequency of ultrasonic transducers changes in a known manner with temperature and therefore by measuring the natural frequency of the transducer, the temperature can be determined. Since this method does not require communication between transducers, it would also work in situations where each transducer has a different resonant frequency.

The process, by which all of the distances are carefully measured from each transducer to the other transducers, and the algorithm developed to determine the speed of sound, is a novel part of the teachings of the instant invention for use with ultrasonic transducers. Prior to this, the speed of sound calculation was based on a single transmission from one transducer to a known second transducer. This resulted in an inaccurate system design and degraded the accuracy of systems in the field.

If the electronic control module that is part of the system is located in generally the same environment as the transducers, another method of determining the temperature is available. This method utilizes a device and whose temperature sensitivity is known and which is located in the same box as the electronic circuit. In fact, in many cases, an existing component on the printed circuit board can be monitored to give an indication of the temperature. For example, the diodes in a log comparison circuit have characteristics that their resistance changes in a known manner with temperature. It can be expected that the electronic module will generally be at a higher temperature than the surrounding environment, however, the temperature difference is a known and predictable amount. Thus, a reasonably good estimation of the temperature in the passenger compartment can also be obtained in this manner. Naturally, thermisters or other temperature transducers can be used.

Another important feature of a system, developed in accordance with the teachings of this invention, is the realization that motion of the vehicle can be used in a novel manner to substantially increase the accuracy of the system. Ultrasonic waves reflect on most objects as light off a mirror. This is due to the relatively long wavelength of ultrasound as compared with light. As a result, certain reflections can overwhelm the receiver and reduce the available information. When readings are taken while the occupant and/or the vehicle is in motion, and these readings averaged over several transmission/reception cycles, the motion of the occupant and vehicle causes various surfaces to change their angular orientation slightly but enough to change the reflective pattern and reduce this mirror effect. The net effect is that the average of several cycles gives a much clearer image of the reflecting object than is obtainable from a single cycle. This then provides a better image to the neural network and significantly improves the identification accuracy of the system. The choice of the number of cycles to be averaged depends on the system requirements. For example, if dynamic out-of-position is required, then each vector must be used alone and averaging in the simple sense cannot be used. This will be discussed more detail below. Similar techniques can be used for other transducer technologies. Averaging, for example, can be used to minimize the effects of flickering light in camera-based systems.

When an occupant is sitting in the vehicle during normal vehicle operation, the determination of the occupancy state can be substantially improved by using successive observations over a period of time. This can either be accomplished by averaging the data prior to insertion into a neural network, or alternately the decision of the neural network can be averaged. This is known as the categorization phase of the process. During categorization, the occupancy state of the vehicle is determined. Is the vehicle occupied by the forward facing human, an empty seat, a rear facing child seat, or an out-of-position human? Typically many seconds of data can be accumulated to make the categorization decision.

When a driver senses an impending crash, on the other hand, he or she will typically slam on the brakes to try to slow vehicle prior to impact. If an occupant is unbelted, he or she will begin moving toward the airbag during this panic braking. For the purposes of determining the position of the occupant, there is not sufficient time to average data as in the case of categorization. Nevertheless, there is information in data from previous vectors that can be used to partially correct errors in current vectors, which may be caused by thermal effects, for example. One method is to determine the location of the occupant using the neural network based on previous training. The motion of the occupant can then be compared to a maximum likelihood position based on the position estimate of the occupant at previous vectors. Thus, for example, perhaps the existence of thermal gradients in the vehicle caused an error in the current vector leading to a calculation that the occupant has moved 12 inches since the previous vector. Since this could be a physically impossible move during ten milliseconds, the measured position of the occupant can be corrected based on his previous positions and known velocity. Naturally, if an accelerometer is present in the vehicle and if the acceleration data is available for this calculation, a much higher accuracy prediction can be made. Thus, there is information in the data in previous vectors as well as in the positions of the occupant determined from the latest data that can be used to correct erroneous data in the current vector and, therefore, in a manner not too dissimilar from the averaging method for categorization, the position accuracy of the occupant can be known with higher accuracy.

The placement of ultrasonic transducers for the example of ultrasonic occupant position sensor system of this invention include the following novel disclosures: (1) the application of two sensors to single-axis monitoring of target volumes; (2) the method of locating two sensors spanning a target volume to sense object positions, that is, transducers are mounted along the sensing axis beyond the objects to be sensed; (3) the method of orientation of the sensor axis for optimal target discrimination parallel to the axis of separation of distinguishing target features; and (4) the method of defining the head and shoulders and supporting surfaces as defining humans for rear facing child seat detection and forward facing human detection.

A similar set of observations is available for the use of electromagnetic, capacitive, electric field or other sensors. Such rules however must take into account that some of such sensors typically are more accurate in measuring lateral and vertical dimensions relative to the sensor than distances perpendicular to the sensor. This is particularly the case for CMOS and CCD based transducers.

Considerable work is ongoing to improve the resolution of the ultrasonic transducers. To take advantage of higher resolution transducers, data points should be obtained that are closer together in time. This means that after the envelope has been extracted from the returned signal, the sampling rate should be increased from approximately 1000 samples per second to perhaps 2000 samples per second or even higher. By doubling or tripling the amount data required to be analyzed, the system which is mounted on the vehicle will require greater computational power. This results in a more expensive electronic system. Not all of the data is of equal importance, however. The position of the occupant in the normal seating position does not need to be known with great accuracy whereas, as that occupant is moving toward the keep out zone boundary during pre-crash braking, the spatial accuracy requirements become more important. Fortunately, the neural network algorithm generating system has the capability of indicating to the system designer the relative value of each of the data points used by the neural network. Thus, as many as, for example, 500 data points per vector may be collected and fed to the neural network during the training stage and, after careful pruning, the final number of data points to be used by the vehicle mounted system may be reduced to 150, for example. This technique of using the neural network algorithm-generating program to prune the input data is an important teaching of the present invention.

By this method, the advantages of higher resolution transducers can be optimally used without increasing the cost of the electronic vehicle-mounted circuits. Also, once the neural network has determined the spacing of the data points, this can be fine-tuned, for example, by acquiring more data points at the edge of the keep out zone as compared to positions well into the safe zone. The initial technique is done by collecting the full 500 data points, for example, while in the system installed in the vehicle the data digitization spacing can be determined by hardware or software so that only the required data is acquired.

1.2 Optics

Figure 8A:
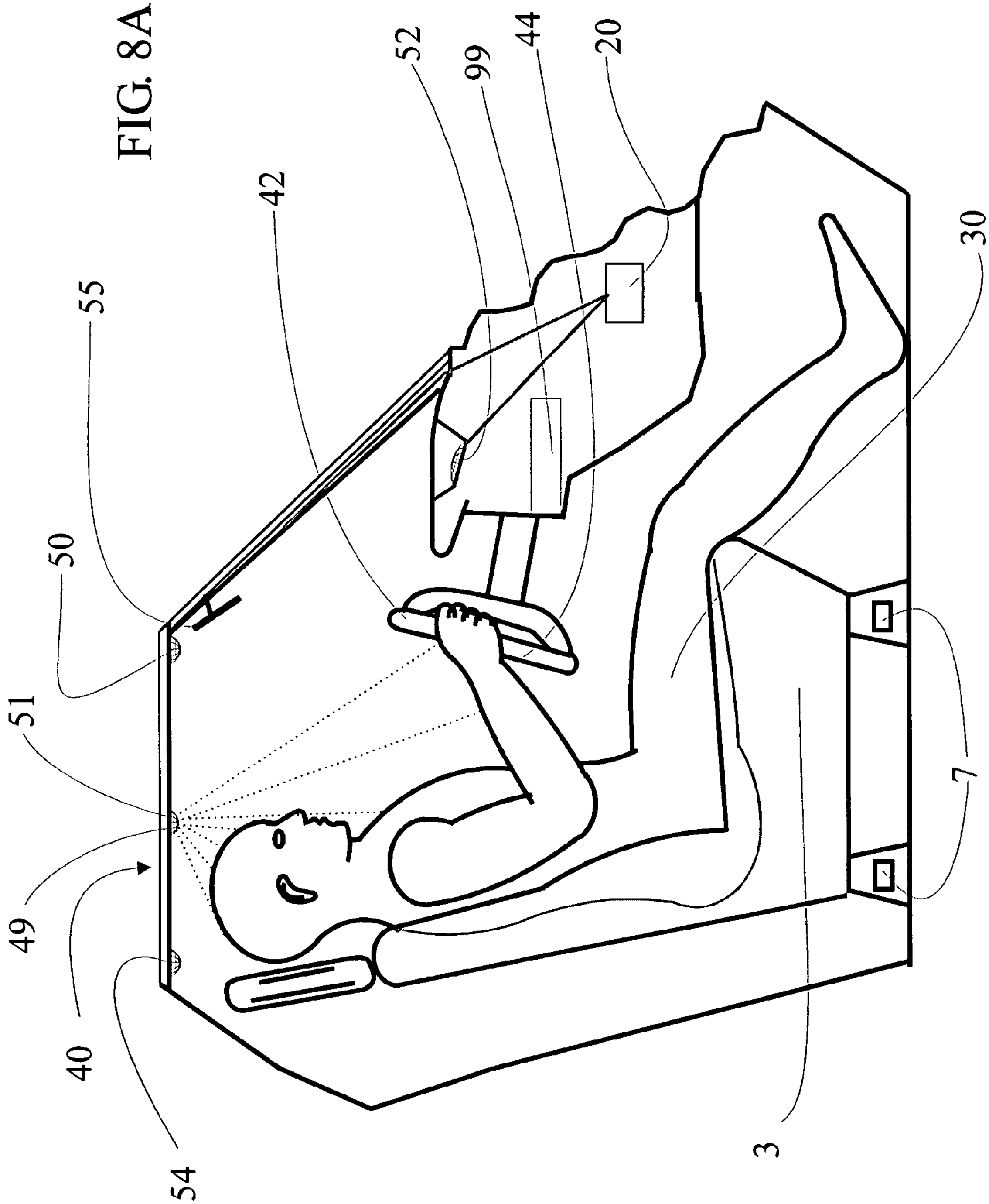
FIG. 8A is a side planar view, with certain portions removed or cut away, of a portion of the passenger compartment of a vehicle showing several preferred mounting locations of interior vehicle monitoring sensors shown particularly for sensing the vehicle driver illustrating the wave pattern from a CCD or CMOS optical position sensor mounted along the side of the driver or centered above his or her head.

FIG. 8A illustrates a typical wave pattern of transmitted infrared waves from transmitter/receiver assembly 49, which is mounted on the side of the vehicle passenger compartment above the front, driver's side door. Transmitter/receiver assembly 51, shown overlaid onto transmitter/receiver 49, is actually mounted in the center headliner of the passenger compartment (and thus between the driver's seat and the front passenger seat), near the dome light, and is aimed toward the driver. Typically, there will be a symmetrical installation for the passenger side of the vehicle. That is, a transmitter/receiver assembly would be arranged above the front, passenger side door and another transmitter/receiver assembly would be arranged in the center headliner, near the dome light, and aimed toward the front, passenger side door.

In a preferred embodiment, each transmitter/receiver assembly 49,51 comprises an optical transducer, which may be a camera and an LED, that will frequently be used in conjunction with other optical transmitter/receiver assemblies such as shown at 50, 52 and 54, which act in a similar manner. In some cases especially when a low cost system is used primarily to categorize the seat occupancy, a single or dual camera installation is used. In many cases, the source of illumination is not co-located with the camera. For example, in one preferred implementation two cameras such as 49 and 51 are used with a single illumination source located at 49.

These optical transmitter/receiver assemblies are frequently comprised of an optical transmitter, which may be an infrared LED (or possibly a near infrared (NIR) LED), a laser with a diverging lens or a scanning laser assembly, and a receiver such as a CCD or CMOS array and particularly an active pixel CMOS camera or array or a HDRL or HDRC camera or array as discussed below. The transducer assemblies map the location of the occupant(s), objects and features thereof, in a two or three-dimensional image as will now be described in more detail.

Optical transducers using CCD arrays are now becoming price competitive and, as mentioned above, will soon be the technology of choice for interior vehicle monitoring. A single CCD array of 160 by 160 pixels, for example, coupled with the appropriate trained pattern recognition software, can be used to form an image of the head of an occupant and accurately locate the head for some of the purposes of this invention.

Figure 22:
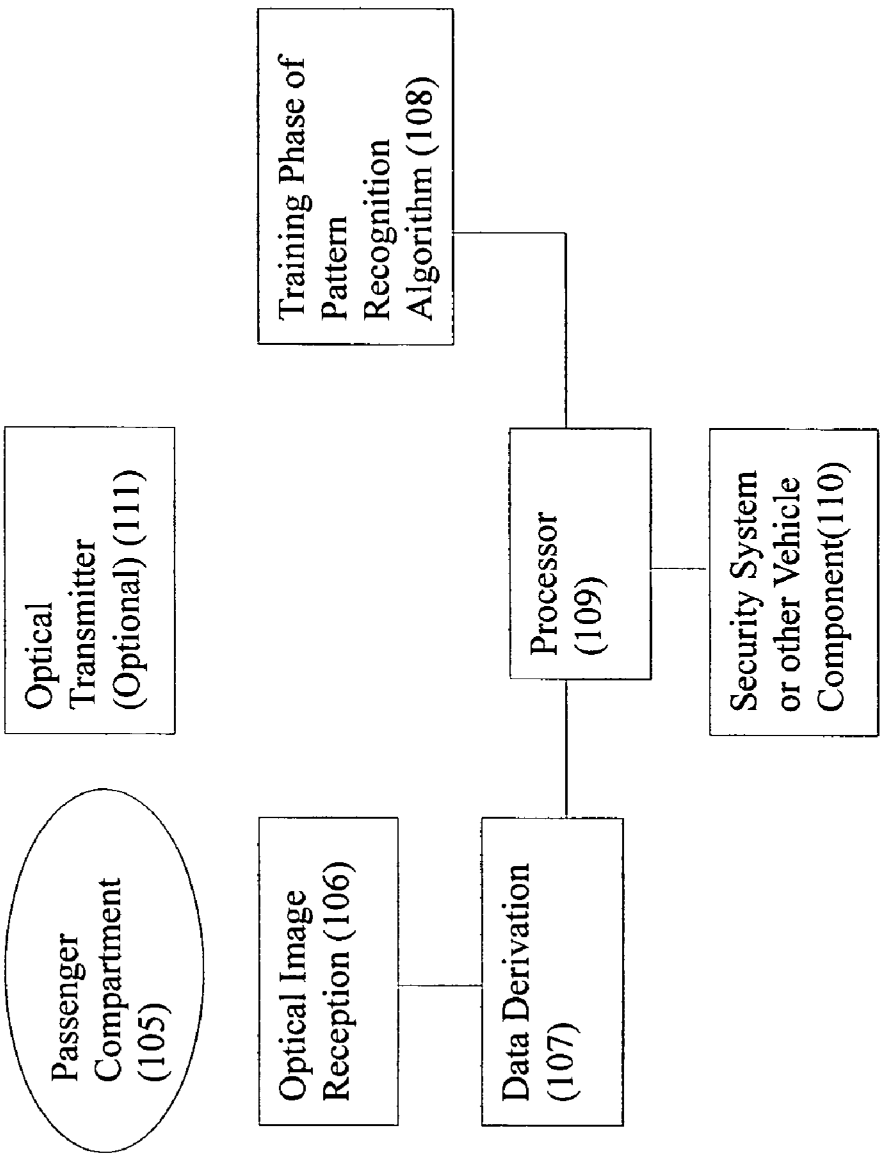
FIG. 22 is a schematic illustration of a system for controlling operation of a vehicle or a component thereof based on recognition of an authorized individual.

Looking now at FIG. 22, a schematic illustration of a system for controlling operation of a vehicle based on recognition of an authorized individual in accordance with the invention is shown. One or more images of the passenger compartment 105 are received at 106 and data derived therefrom at 107. Multiple image receivers may be provided at different locations. The data derivation may entail any one or more of numerous types of image processing techniques such as those described in U.S. Pat. No. 6,397,136 incorporated by reference herein, including those designed to improve the clarity of the image. A pattern recognition algorithm, e.g., a neural network, is trained in a training phase 108 to recognize authorized individuals. The training phase can be conducted upon purchase of the vehicle by the dealer or by the owner after performing certain procedures provided to the owner, e.g., entry of a security code or key. In the training phase for a theft prevention system, the authorized driver(s) would sit themselves in the passenger seat and optical images would be taken and processed to obtain the pattern recognition algorithm. A processor 109 is embodied with the pattern recognition algorithm thus trained to identify whether a person is the individual by analysis of subsequently obtained data derived from optical images. The pattern recognition algorithm in processor 109 outputs an indication of whether the person in the image is an authorized individual for which the system is trained to identify. A security system 110 enable operations of the vehicle when the pattern recognition algorithm provides an indication that the person is an individual authorized to operate the vehicle and prevents operation of the vehicle when the pattern recognition algorithm does not provide an indication that the person is an individual authorized to operate the vehicle.

Optionally, an optical transmitting unit 111 is provided to transmit electromagnetic energy into the passenger compartment such that electromagnetic energy transmitted by the optical transmitting unit is reflected by the person and received by the optical image reception device 106.

As noted above, several different types of optical reception devices can be used including a CCD array, a CMOS array, focal plane array (FPA), Quantum Well Infrared Photodetector (QWIP), any type of two-dimensional image receiver, any type of three-dimensional image receiver, an active pixel camera and an HDRC camera.

The processor 109 can be trained to determine the position of the individuals included in the images obtained by the optical image reception device, as well as the distance between the optical image reception devices and the individuals.

Instead of a security system, another component in the vehicle can be affected or controlled based on the recognition of a particular individual. For example, the rear view mirror, seat, seat belt anchorage point, headrest, pedals, steering wheel, entertainment system, air-conditioning/ventilation system can be adjusted.

Figure 24:
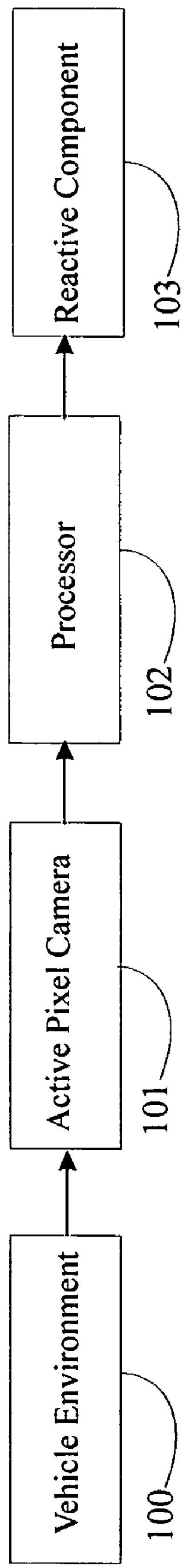
FIG. 24 is a schematic illustration of the environment monitoring in accordance with the invention.

FIG. 24 shows the components of the manner in which an environment of the vehicle, designated 100, is monitored. The environment may either be an interior environment, the entire passenger compartment or only a part thereof, or an exterior environment. An active pixel camera 101 obtains images of the environment and provides the images or a representation thereof, or data derived from, to a processor 102. The processor 102 determines at least one characteristic of an object in the environment based on the images obtained by the active pixel camera 101, e.g., the presence of an object in the environment, the type of object in the environment, the position of an object in the environment and the velocity of an object in the environment. Several active pixel cameras can be provided, each focusing on a different area of the environment, although some overlap is desired. Instead of an active pixel camera or array, a single light-receiving pixel can be used.

Systems based on ultrasonics and neural networks have been very successful in analyzing the seated state of both the passenger and driver seats of automobiles. Such systems are now going into production for preventing airbag deployment when a rear facing child seat or and out-of-position occupant is present. The ultrasonic systems, however, suffer from certain natural limitations that prevent system accuracy from getting better than about 99 percent. These limitations relate to the fact that the wavelength of ultrasound is typically between 3 and 8 mm. As a result, unexpected results occur which are due partially to the interference of reflections from different surfaces. Additionally, commercially available ultrasonic transducers are tuned devices that require several cycles before they transmit significant energy and similarly require several cycles before they effectively receive the reflected signals. This requirement has the effect of smearing the resolution of the ultrasound to the point that, for example, using a conventional 40 kHz transducer, the resolution of the system is approximately three inches.

In contrast, the wavelength of near infrared is less than one micron and no significant interferences occur. Similarly, the system is not tuned and therefore is theoretically sensitive to a very few cycles. As a result, resolution of the optical system is determined by the pixel spacing in the CCD or CMOS arrays. For this application, typical arrays have been chosen to be 100 pixels by 100 pixels and therefore the space being imaged can be broken up into pieces that are significantly less than 1 cm in size. Naturally, if greater resolution is required arrays having larger numbers of pixels are readily available. Another advantage of optical systems is that special lenses can be used to magnify those areas where the information is most critical and operate at reduced resolution where this is not the case. For example, the area closest to the at-risk zone in front of the airbag can be magnified. This is not possible with ultrasonic systems.

To summarize, although ultrasonic neural network systems are operating with high accuracy, they do not totally eliminate the problem of deaths and injuries caused by airbag deployments. Optical systems, on the other hand, at little increase in cost, have the capability of virtually 100 percent accuracy. Additional problems of ultrasonic systems arise from the slow speed of sound and diffraction caused by variations is air density. The slow sound speed limits the rate at which data can be collected and thus eliminates the possibility of tracking the motion of an occupant during a high speed crash.

In the embodiment wherein electromagnetic energy is used, it is to be appreciated that any portion of the electromagnetic signals that impinges upon a body portion of the occupant is at least partially absorbed by the body portion. Sometimes, this is due to the fact that the human body is composed primarily of water, and that electromagnetic energy can be readily absorbed by water. The amount of electromagnetic signal absorption is related to the frequency of the signal, and size or bulk of the body portion that the signal impinges upon. For example, a torso of a human body tends to absorb a greater percentage of electromagnetic energy as compared to a hand of a human body for some frequencies.

Thus, when electromagnetic waves or energy signals are transmitted by a transmitter, the returning waves received by a receiver provide an indication of the absorption of the electromagnetic energy. That is, absorption of electromagnetic energy will vary depending on the presence or absence of a human occupant, the occupant's size, bulk, etc., so that different signals will be received relating to the degree or extent of absorption by the occupying item on the seat. The receiver will produce a signal representative of the returned waves or energy signals which will thus constitute an absorption signal as it corresponds to the absorption of electromagnetic energy by the occupying item in the seat.

Another optical infrared transmitter and receiver assembly is shown generally at 52 in FIG. 5 and is mounted onto the instrument panel facing the windshield. Although not shown in this view, reference 52 consists of three devices, one transmitter and two receivers, one on each side of the transmitter. In this case the windshield is used to reflect the illumination light, and also the light reflected back by the driver, in a manner similar to the "heads-up" display which is now being offered on several automobile models. The "heads-up" display, of course, is currently used only to display information to the driver and is not used to reflect light from the driver to a receiver. In this case, the distance to the driver is determined stereoscopically through the use of the two receivers. In its most elementary sense, this system can be used to measure the distance of the driver to the airbag module. In more sophisticated applications, the position of the driver, and particularly of the drivers head, can be monitored over time and any behavior, such as a drooping head, indicative of the driver falling asleep or of being incapacitated by drugs, alcohol or illness can be detected and appropriate action taken. Other forms of radiation including visual light, radar and microwaves as well as high frequency ultrasound could also be used by those skilled in the art.

A passive infrared system could be used to determine the position of an occupant relative to an airbag. Passive infrared measures the infrared radiation emitted by the occupant and compares it to the background. As such, unless it is coupled with a pattern recognition system, it can best be used to determine that an occupant is moving toward the airbag since the amount of infrared radiation would then be increasing. Therefore, it could be used to estimate the velocity of the occupant but not his/her position relative to the airbag, since the absolute amount of such radiation will depend on the occupant's size, temperature and clothes as well as on his position. When passive infrared is used in conjunction with another distance measuring system, such as the ultrasonic system described above, the combination would be capable of determining both the position and velocity of the occupant relative to the airbag. Such a combination would be economical since only the simplest circuits would be required. In one implementation, for example, a group of waves from an ultrasonic transmitter could be sent to an occupant and the reflected group received by a receiver. The distance to the occupant would be proportional to the time between the transmitted and received groups of waves and the velocity determined from the passive infrared system. This system could be used in any of the locations illustrated in FIG. 5 as well as others not illustrated.

Recent advances in Quantum Well Infrared Photodetectors (QWIP) are particularly applicable here due to the range of frequencies that they can be designed to sense (3-18 microns) which encompasses the radiation naturally emitted by the human body. Currently QWIPs need to be cooled and thus are not quite ready for automotive applications. There are, however, longer wave IR detectors based of focal plane arrays (FPA) that are available in low resolution now. As the advantages of SWIR, MWIR and LWIR become more evident, devices that image in this part of the electromagnetic spectrum will become more available.

Passive infrared could also be used effectively in conjunction with a pattern recognition system. In this case, the passive infrared radiation emitted from an occupant can be focused onto a QWIP or FPA or even a CCD array, in some cases, and analyzed with appropriate pattern recognition circuitry, or software, to determine the position of the occupant. Such a system could be mounted at any of the preferred mounting locations shown in FIG. 5 as well as others not illustrated.

Lastly, it is possible to use a modulated scanning beam of radiation and a single pixel receiver, PIN or avalanche diode, in the inventions described above. Any form of energy or radiation used above may be in the infrared or radar spectrums, to the extent possible, and may be polarized and filters may be used in the receiver to block out sunlight etc. These filters may be notch filters as described above and may be made integral with the lens as one or more coatings on the lens surface as is well known in the art. Note, in many applications, this may not be necessary as window glass blocks all IR except the near IR.

For some cases, such as a laser transceiver that may contain a CMOS array, CCD, PIN or avalanche diode or other light sensitive devices, a scanner is also required that can be either solid state as in the case of some radar systems based on a phased array, an acoustical optical system as is used by some laser systems, or a mirror or MEMS based reflecting scanner, or other appropriate technology.

Figure 25:
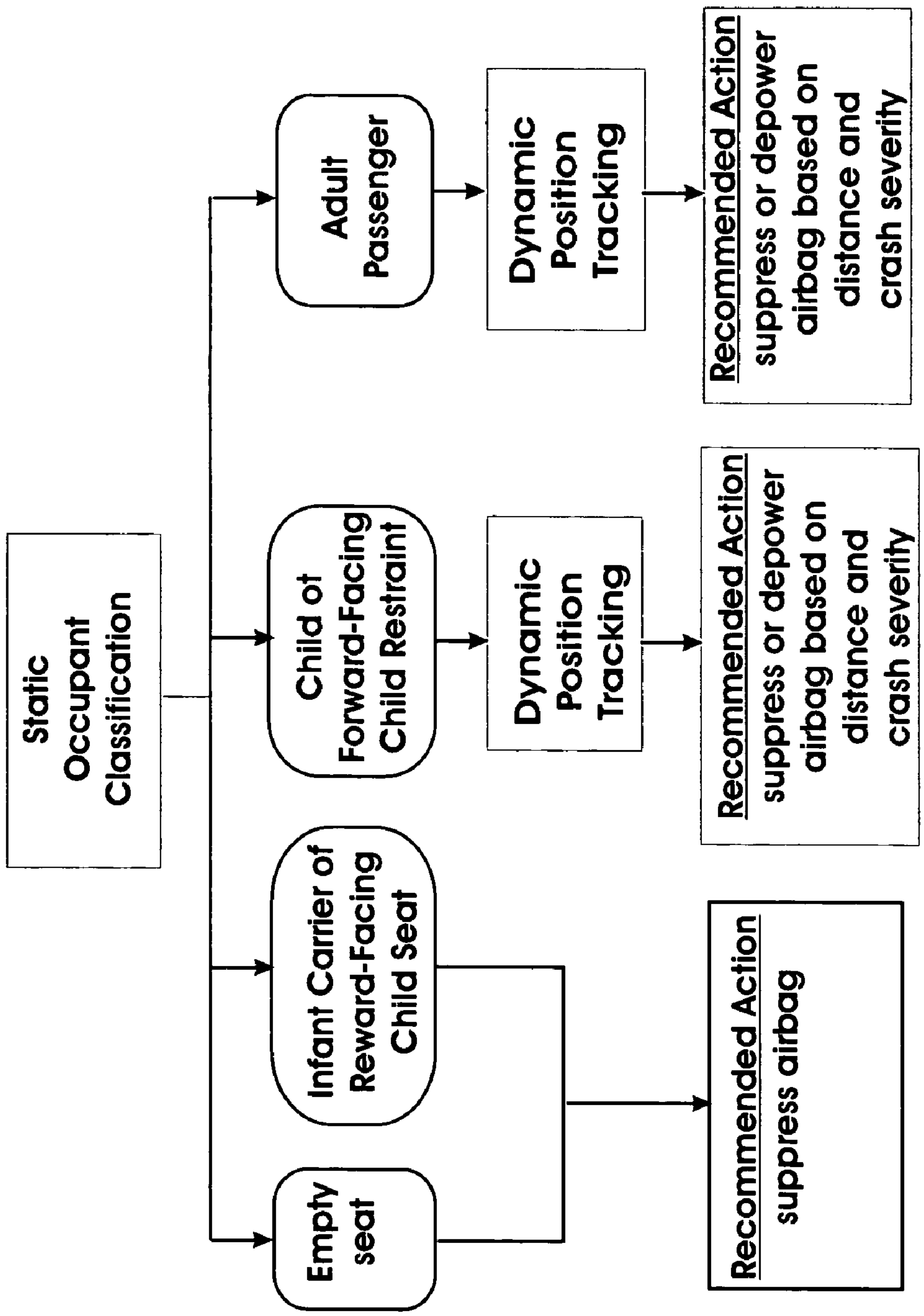
FIG. 25 is a diagram showing an example of an occupant sensing strategy for a single camera optical system.

An optical classification system using a single or dual camera design will now be discussed, although more than two cameras can also be used in the system described below. The occupant sensing system should perform occupant classification as well as position tracking since both are critical information for making decision of airbag deployment in an auto accident. FIG. 25 shows a preferred occupant sensing strategy. Occupant classification may be done statically since the type of occupant does not change frequently. Position tracking, however, has to be done dynamically so that the occupant can be tracked reliably during pre-crash braking situations. Position tracking should provide continuous position information so that the speed and the acceleration of the occupant can be estimated and prediction can be made even before the next actual measurement takes place.

Figure 26:
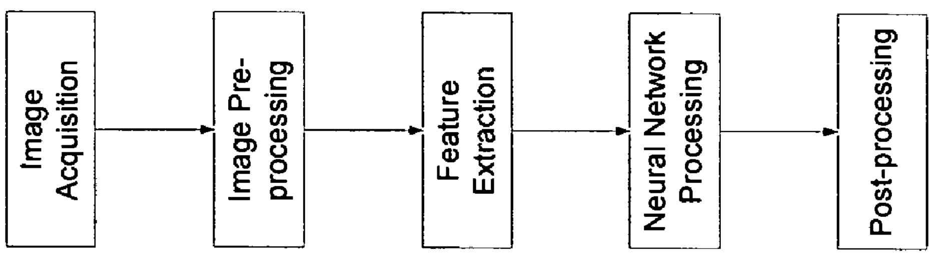
FIG. 26 is a processing block diagram of the example of FIG. 25.

The current assignee has demonstrated that occupant classification and dynamic position tracking can be done with a stand-alone optical system that uses a single camera. The same image information is processed in a similar fashion for both classification and dynamic position tracking. As shown in FIG. 26, the whole process involves five steps: image acquisition, image preprocessing, feature extraction, neural network processing, and post-processing.

Step-1 image acquisition is to obtain the image from the imaging hardware. The imaging hardware main components may include one or more of the following image acquisition devices, a digital CMOS camera, a high-power near-infrared LED, and the LED control circuit. A plurality of such image acquisition devices can be used.

This step also includes image brightness detection and LED control for illumination. Note that the image brightness detection and LED control do not have to be performed for every frame. For example, during a specific interval, the ECU can turn the LED ON and OFF and compare the resulting images. If the image with LED ON is significantly brighter, then it is identified as nighttime condition and the LED will remain ON; otherwise, it is identified as daytime condition and the LED will remain OFF.

Step-2 image preprocessing performs such activities as removing random noise and enhancing contrast. Under daylight condition, the image contains unwanted contents because the background is illuminated by sunlight.

For example, the movement of the driver, other passengers in the backseat, and the scenes outside the passenger window can interfere if they are visible in the image. Usually, these unwanted contents cannot be completely eliminated by adjusting the camera position, but they can be removed by image preprocessing.

Step-3 feature extraction compresses the data from the 76,800 image pixels in the prototype camera to only a few hundred floating-point numbers while retaining most of the important information. In this step, the amount of the data is significantly reduced so that it becomes possible to process the data using neural networks in Step-4.

Step-4, to increase the system learning capability and performance stability, modular neural networks are used with each module handling a different subtask (for example, to handle either daytime or nighttime condition, or to classify a specific occupant group).

Step-5 post-processing removes random noise in the neural network outputs via filtering. Besides filtering, additional knowledge can be used to remove some of the undesired changes in the neural network output. For example, it is impossible to change from an adult passenger to a child restraint without going through an empty-seat state or key-off. After post-processing, the final decision of classification is outputted to the airbag control module and it is up to the automakers to decide how to utilize the information. A set of display LED's on the instrument panel provides the same information to the vehicle occupants.

If multiple images are acquired substantially simultaneously, each by a different image acquisition device, then each image can be processed in the manner above. A comparison of the classification of the occupant obtained from the processing of the image obtained by each image acquisition device can be performed to ascertain any variations. If there are no variations, then the classification of the occupant is likely to be very accurate. However, in the presence of variations, then the images can be discarded and new images acquired until variations are eliminated.

A majority approach might also be used. For example, if three or more images are acquired by three different cameras, then if two provide the same classification, this classification will be considered the correct classification.

Referring again to FIG. 25, after the occupant is classified from the acquired image or images, i.e., as an empty seat (classification 1), an infant carrier or an occupied rearward-facing child seat (classification 2), a child or occupied forward-facing child seat (classification 3) or an adult passenger (classification 4), additional classification may be performed for the purpose of determining a recommendation for control of a vehicular component such as an occupant restraint device.

For classifications 1 and 2, the recommendation is always to suppress deployment of the occupant restraint device. For classifications 3 and 4, dynamic position tracking is performed. This involves the training of neural networks or other pattern recognition techniques, one for each classification, so that once the occupant is classified, the particular neural network trained to analyze the dynamic position of that occupant will be used. That is, the compressed data or acquired images will be input to the neural network to determine a recommendation for control of the occupant restraint device, into the neural network for dynamic position tracking of an adult passenger when the occupant is classified as an adult passenger. The recommendation may be either a suppression of deployment, a depowered deployment or a full power deployment.

To additionally summarize, the system described can be a single or multiple camera system where the cameras are typically mounted on the roof or headliner of the vehicle either on the roof rails or center or other appropriate location. The source of illumination is typically one or more infrared LEDs and if infrared, the images are typically monochromic, although color can effectively be used when natural illumination is available. Images can be obtained as fast as 100 frames per second; however, slower rates are frequently adequate. A pattern recognition algorithmic system can be used to classify the occupancy of a seat into a variety of classes such as: (1) an empty seat; (2) an infant seat which can be further classified as rear or forward facing; (3) a child which can be further classified as in or out-of-position and (4) an adult which can also be further classified as in or out-of-position. Such a system can be used to suppress the deployment of an occupant restraint. If the occupant is further tracked so that his or her position relative to the airbag, for example, is known more accurately, then the airbag deployment can be tailored to the position of the occupant. Such tracking can be accomplished since the location of the head of the occupant is either known from the analysis or can be inferred due to the position of other body parts.

As will be discussed in more detail below, data and images from the occupant sensing system, which can include an assessment of the type and magnitude of injuries, along with location information if available, can be sent to an appropriate off vehicle location such as an emergence medical system (EMS) receiver either directly by cell phone, for example, via a telematics system such as OnStar®, or over the internet in order to aid the service in providing medical assistance and to access the urgency of the situation. The system can additionally be used to identify that there are occupants in the vehicle that has been parked, for example, and to start the vehicle engine and heater if the temperature drops below a safe threshold or to open a window or operate the air conditioning in the event that the temperature raises to a temperature above a safe threshold. In both cases, a message can be sent to the EMS or other services by any appropriate method such as those listed above. A message can also be sent to the owner's beeper or PDA.

The system can also be used alone or to augment the vehicle security system to alert the owner or other person or remote site that the vehicle security has been breeched so as to prevent danger to a returning owner or to prevent a theft or other criminal act.

As discussed above and below, other occupant sensing systems can also be provided that monitor the breathing or other motion of the driver, for example, including the driver's heartbeat, eye blink rate, gestures, direction or gaze and provide appropriate responses including the control of a vehicle component including any such components listed herein. If the driver is falling asleep, for example, a warning can be issued and eventually the vehicle directed off the road if necessary.

The combination of a camera system with a microphone and speaker allows for a wide variety of options for the control of vehicle components. A sophisticated algorithm can interpret a gesture, for example, that may be in response to a question from the computer system. The driver may indicate by a gesture that he or she wants the temperature to change and the system can then interpret a "thumbs up" gesture for higher temperature and a "thumbs down" gesture for a lower temperature. When it is correct, the driver can signal by gesture that it is fine. Naturally, a very large number of component control options exist that can be entirely executed by the combination of voice, speakers and a camera that can see gestures. When the system does not understand, it can ask to have the gesture repeated, for example, or it can ask for a confirmation. Note, the presence of an occupant in a seat can even be confirmed by a word spoken by the occupant, for example.

Note, it has been assumed that the camera would be permanently mounted in the vehicle in the above discussion. This need not be the case and especially for some after-market products, the camera function can be supplied by a cell phone or other device and a holder appropriately (and removably) mounted in the vehicle.

1.3 Ultrasonics and Optics

In some cases, a combination of an optical system such as a camera and an ultrasonic system can be used. In this case, the optical system can be used to acquire an image providing information as to the vertical and lateral dimensions of the scene and the ultrasound can be used to provide longitudinal information.

A more accurate acoustic system for determining the distance to a particular object, or a part thereof, in the passenger compartment is exemplified by transducers 24 in FIG. 8E. In this case, three ultrasonic transmitter/receivers are shown spaced apart mounted onto the A-pillar of the vehicle. Due to the wavelength, it is difficult to get a narrow beam using ultrasonics without either using high frequencies that have limited range or a large transducer. A commonly available 40 kHz transducer, for example, is about 1 cm. in diameter and emits a sonic wave that spreads at about a sixty-degree angle. To reduce this angle requires making the transducer larger in diameter. An alternate solution is to use several transducers and to phase the transmissions so that they arrive at the intended part of the target in phase. Reflections from the selected part of the target are then reinforced whereas reflections from adjacent parts encounter interference with the result that the distance to the brightest portion within the vicinity of interest can be determined.

By varying the phase of transmission from the three transducers 24, the location of a reflection source on a curved line can be determined. In order to locate the reflection source in space, at least one additional transmitter/receiver is required which is not co-linear with the others. The waves shown in FIG. 8E coming from the three transducers 24 are actually only the portions of the waves which arrive at the desired point in space together in phase. The effective direction of these wave streams can be varied by changing the transmission phase between the three transmitters 24.

A determination of the approximate location of a point of interest on the occupant can be accomplished by a CCD or CMOS array and appropriate analysis and the phasing of the ultrasonic transmitters is determined so that the distance to the desired point can be determined.

Although the combination of ultrasonics and optics has been described, it will now be obvious to others skilled in the art that other sensor types can be combined with either optical or ultrasonic transducers including weight sensors of all types as discussed below, as well as electric field, chemical, temperature, humidity, radiation, vibration, acceleration, velocity, position, proximity, capacitance, angular rate, heartbeat, radar, other electromagnetic, and other sensors.

1.4 Other Transducers

In FIG. 4, the ultrasonic transducers of the previous designs can be replaced by laser or other electromagnetic wave transducers or transceivers 8 and 9, which are connected to a microprocessor 20. As discussed above, these are only illustrative mounting locations and any of the locations described herein are suitable for particular technologies. Also, such electromagnetic transceivers are meant to include the entire electromagnetic spectrum including low frequencies where sensors such as capacitive or electric field sensors including so called "displacement current sensors" as discussed in detail above, and the auto-tune antenna sensor also discussed above operate.

Figure 27:
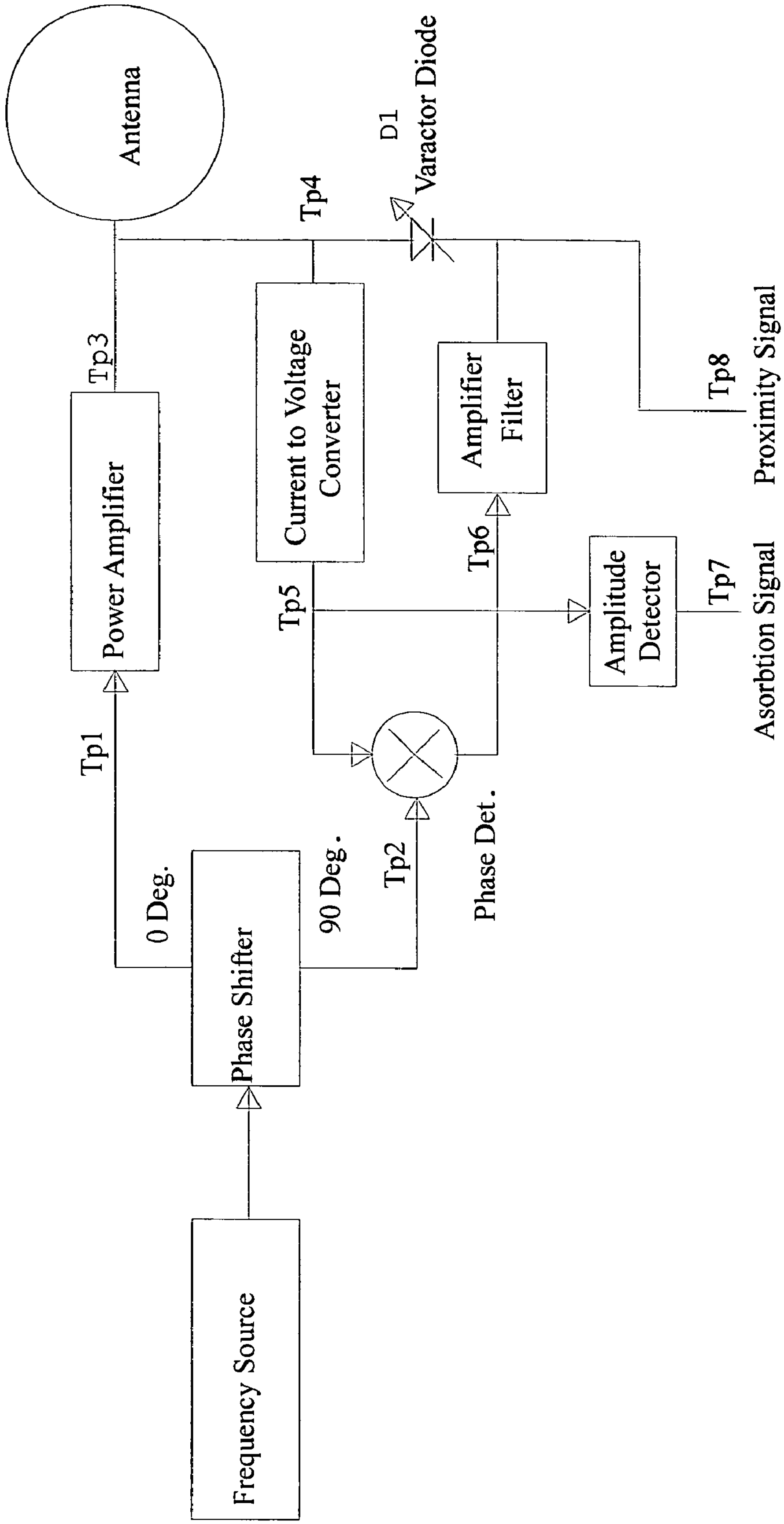
FIG. 27 is a block diagram of an antenna-based near field object discriminator.

A block diagram of an antenna based near field object detector is illustrated in FIG. 27. The circuit variables are defined as follows:

F=Frequency of operation Hz.

ω=2*π*F radians/second

α=Phase angle between antenna voltage and antenna current.

A, k1,k2,k3,k4 are scale factors, determined by system design.

Tp1-8 are points on FIG. 20.

Tp1=k1*Sin(ωt)

Tp2=k1*Cos(ωt)Reference voltage to phase detector

Tp3=k2*Sin(ωt) drive voltage to Antenna

Tp4=k3*Cos(ωt+δ) Antenna current

Tp5=k4*Cos(ω+δ) Voltage representing Antenna current

Tp6=0.5□t)Sin(δ Output of phase detector

Tp7=Absorption signal output

Tp8=Proximity signal output

In a tuned circuit, the voltage and the current are 90 degrees out of phase with each other at the resonant frequency. The frequency source supplies a signal to the phase shifter. The phase shifter outputs two signals that are out of phase by 90 degrees at frequency F. The drive to the antenna is the signal Tp3. The antenna can be of any suitable type such as dipole, patch, yagi etc. In cases where the signal Tp1 from the phase shifter has sufficient power, the power amplifier may be eliminated. The antenna current is at Tp4, which is converted into a voltage since the phase detector requires a voltage drive. The output of the phase detector is Tp6, which is filtered and used to drive the varactor tuning diode D1. Multiple diodes may be used in place of D1. The phase detector, amplifier filter, varactor diode D1 and current to voltage converter form a closed loop servo that keeps the antenna voltage and current in a 90-degree relationship at frequency F. The tuning loop maintains a 90-degree phase relationship between the antenna voltage and the antenna current. When an object such as a human comes near the antenna and attempts to detune it, the phase detector senses the phase change and adds or subtracts capacity by changing voltage to the varactor diode D1 thereby maintaining resonance at frequency F.

The voltage Tp8 is an indication of the capacity of a nearby object. An object that is near the loop and absorbs energy from it will change the amplitude of the signal at Tp5, which is detected and outputted to Tp7. The two signals Tp7 and Tp8 are used to determine the nature of the object near the antenna.

An object such as a human or animal with a fairly high electrical permittivity or dielectric constant and a relatively high loss dielectric property (high loss tangent) absorbs significant energy. This effect varies with the frequency used for the detection. If a human, who has a high loss tangent is present in the detection field, then the dielectric absorption causes the value of the capacitance of the object to change with frequency. For a human with high dielectric losses (high loss tangent), the decay with frequency will be more pronounced than for objects that do not present this high loss tangency. Exploiting this phenomenon makes it possible to detect the presence of an adult, child, baby, pet or other animal in the detection field.

An older method of antenna tuning used the antenna current and the voltage across the antenna to supply the inputs to a phase detector. In a 25 to 50 mw transmitter with a 50 ohm impedance, the current is small, it is therefore preferable to use the method described herein.

Note that the auto-tuned antenna sensor is preferably placed in the vehicle seat, headrest, floor, dashboard, headliner, or airbag module cover. Seat mounted examples are shown at 12, 13, 14 and 15 in FIG. 4 and a floor mounted example at 11. In most other manners, the system operates the same.

1.5 Circuits

There are several preferred methods of implementing the vehicle interior monitoring system of this invention including a microprocessor, an application specific integrated circuit system (ASIC), and/or an FPGA or DSP. These systems are represented schematically as 20 herein. In some systems, both a microprocessor and an ASIC are used. In other systems, most if not all of the circuitry is combined onto a single chip (system on a chip). The particular implementation depends on the quantity to be made and economic considerations. It also depends on time-to-market considerations where FPGA is frequently the technology of choice.

The design of the electronic circuits for a laser system is described in some detail in U.S. Pat. No. 05,653,462 referenced above and in particular FIG. 8 thereof and the corresponding description.

2. Adaptation

Let us now consider the process of adapting a system of occupant sensing transducers to a vehicle. For example, if a candidate system consisting of eight transducers is considered, four ultrasonic transducers and four weight transducers, and if cost considerations require the choice of a smaller total number of transducers, it is a question of which of the eight transducers should be eliminated. Fortunately, the neural network technology discussed below provides a technique for determining which of the eight transducers is most important, which is next most important, etc. If the six most critical transducers are chosen, that is the six transducers which contain or provide the most useful information as determined by the neural network, a neural network can be trained using data from those six transducers and the overall accuracy of the system can be determined. Experience has determined, for example, that typically there is almost no loss in accuracy by eliminating two of the eight transducers, for example, two of the strain gage weight sensors. A slight loss of accuracy occurs when one of the ultrasonic transducers is then eliminated. In this manner, by the process of adaptation, the most cost effective system can be determined from a proposed set of sensors.

This same technique can be used with the additional transducers described throughout this disclosure. A transducer space can be determined with perhaps twenty different transducers comprised of ultrasonic, optical, electromagnetic, motion, heartbeat, weight, seat track, seatbelt payout, seatback angle and other types of transducers. The neural network can then be used in conjunction with a cost function to determine the cost of system accuracy. In this manner, the optimum combination of any system cost and accuracy level can be determined.

System Adaptation involves the process by which the hardware configuration and the software algorithms are determined for a particular vehicle. Each vehicle model or platform will most likely have a different hardware configuration and different algorithms. Some of the various aspects that make up this process are as follows:

- The determination of the mounting location and aiming or orientation of the transducers.
- The determination of the transducer field angles or area or volume monitored
- The use of a combination neural network algorithm generating program such as available from International Scientific Research, Inc. to help generate the algorithms or other pattern recognition algorithm generation program. (as described below)
- The process of the collection of data in the vehicle, for example, for neural network training purposes.
- The method of automatic movement of the vehicle seats etc. while data is collected
- The determination of the quantity of data to acquire and the setups needed to achieve a high system accuracy, typically several hundred thousand vectors or data sets.
- The collection of data in the presence of varying environmental conditions such as with thermal gradients.
- The photographing of each data setup.
- The makeup of the different databases and the use of typically three different databases.
- The method by which the data is biased to give higher probabilities for, e.g., forward facing humans.
- The automatic recording of the vehicle setup including seat, seat back, headrest, window, visor, armrest etc. positions to help insure data integrity.
- The use of a daily setup to validate that the transducer configuration and calibration has not changed.
- The method by which bad data is culled from the database.
- The inclusion of the Fourier transforms and other preprocessors of the data in the algorithm generation process.
- The use of multiple algorithm levels, for example, for categorization and position.
- The use of multiple algorithms in parallel.
- The use of post processing filters and the particularities of these filters.

The addition of fuzzy logic or other human intelligence based rules.
The method by which data errors are corrected using, for example, a neural network.
The use of a neural network generation program as the pattern recognition algorithm generating system.
The use of back propagation neural networks for training.
The use of vector or data normalization.
The use of feature extraction techniques, for ultrasonic systems for example, including:
  The number of data points prior to a peak.
  The normalization factor.
  The total number of peaks.
  The vector or data set mean or variance.
The use of feature extraction techniques, for optics systems for example, including:
  Motion.
  Edge detection.
  Feature detection such as the eyes, head etc.
  Texture detection.
  Recognizing specific features of the vehicle.
  Line subtraction—i.e., subtracting one line of pixels from the adjacent line with every other line illuminated. This works primarily only with rolling shutter cameras. The equivalent for a snapshot camera is to subtract an artificially illuminated image from one that is illuminated only with natural light.
The use of other computational intelligence systems such as genetic algorithms
The use the data screening techniques.
The techniques used to develop stable networks including the concepts of old and new networks.
The time spent or the number of iterations spent in, and method of, arriving at stable networks.
The technique where a small amount of data is collected first such as 16 sheets followed by a complete data collection sequence.
The use of a cellular neural network for high speed data collection and analysis when electromagnetic transducers are used.
The use of a support vector machine.

The process of adapting the system to the vehicle begins with a survey of the vehicle model. Any existing sensors, such as seat position sensors, seat back sensors, etc., are immediate candidates for inclusion into the system. Input from the customer will determine what types of sensors would be acceptable for the final system. These sensors can include: seat structure mounted weight sensors, pad type weight sensors, pressure type weight sensors (e.g. bladders), seat fore and aft position sensors, seat-mounted capacitance, electric field or antenna sensors, seat vertical position sensors, seat angular position sensors, seat back position sensors, headrest position sensors, ultrasonic occupant sensors, optical occupant sensors, capacitive sensors, electric field sensors, inductive sensors, radar sensors, vehicle velocity and acceleration sensors, brake pressure, seatbelt force, payout and buckle sensors, accelerometers, gyroscopes, chemical etc. A candidate array of sensors is then chosen and mounted onto the vehicle.

The vehicle is also instrumented so that data input by humans is minimized. Thus, the positions of the various components in the vehicle such as the seats, windows, sun visor, armrest, etc. are automatically recorded where possible. Also, the position of the occupant while data is being taken is also recorded through a variety of techniques such as direct ultrasonic ranging sensors, optical ranging sensors, radar ranging sensors, optical tracking sensors etc. Special cameras are also installed to take one or more pictures of the setup to correspond to each vector of data collected or at some other appropriate frequency. Herein, a vector is used to represent a set of data collected at a particular epoch or representative of the occupant or environment of vehicle at a particular point in time.

A standard set of vehicle setups is chosen for initial trial data collection purposes. Typically, the initial trial will consist of between 20,000 and 100,000 setups, although this range is not intended to limit the invention.

Initial digital data collection now proceeds for the trial setup matrix. The data is collected from the transducers, digitized and combined to form to a vector of input data for analysis by a pattern recognition system such as a neural network program or combination neural network program. This analysis should yield a training accuracy of nearly 100%. If this is not achieved, then additional sensors are added to the system or the configuration changed and the data collection and analysis repeated.

In addition to a variety of seating states for objects in the passenger compartment, the trial database will also include environmental effects such as thermal gradients caused by heat lamps and the operation of the air conditioner and heater, or where appropriate lighting variations or other environmental variations that might affect particular transducer types. A sample of such a matrix is presented in FIGS. 82A-82H, with some of the variables and objects used in the matrix being designated or described in FIGS. 76-81D. After the neural network has been trained on the trial database, the trial database will be scanned for vectors that yield erroneous results (which would likely be considered bad data). A study of those vectors along with vectors from associated in time cases are compared with the photographs to determine whether there is erroneous data present. If so, an attempt is made to determine the cause of the erroneous data. If the cause can be found, for example if a voltage spike on the power line corrupted the data, then the vector will be removed from the database and an attempt is made to correct the data collection process so as to remove such disturbances.

At this time, some of the sensors may be eliminated from the sensor matrix. This can be determined during the neural network analysis, for example, by selectively eliminating sensor data from the analysis to see what the effect if any results. Caution should be exercised here, however, since once the sensors have been initially installed in the vehicle, it requires little additional expense to use all of the installed sensors in future data collection and analysis.

The neural network that has been developed in this first phase can be used during the data collection in the next phases as an instantaneous check on the integrity of the new vectors being collected. Occasionally, a voltage spike or other environmental disturbance will momentarily affect the data from some transducers. It is important to capture this event to first eliminate that data from the database and second to isolate the cause of the erroneous data.

The next set of data to be collected when neural networks are used, for example, is the training database. This will usually be the largest database initially collected and will cover such setups as listed, for example, in FIGS. 24A-24H. The training database, which may contain 500,000 or more vectors, will be used to begin training of the neural network or other pattern recognition system. In the foregoing description, a neural network will be used for exemplary purposes with the understanding that the invention is not limited to neural networks and that a similar process exists for other pattern recognition systems. This invention is largely concerned with the use of pattern recognition systems for vehicle internal monitoring. The best mode is to use trained pattern recognition systems such as neural networks. While this is taking place additional data will be collected according to FIGS. 78-80 and 83 of the independent and validation databases.

The training database is usually selected so that it uniformly covers all seated states that are known to be likely to occur in the vehicle. The independent database may be similar in makeup to the training database or it may evolve to more closely conform to the occupancy state distribution of the validation database. During the neural network training, the independent database is used to check the accuracy of the neural network and to reject a candidate neural network design if its accuracy, measured against the independent database, is less than that of a previous network architecture.

Although the independent database is not actually used in the training of the neural network, nevertheless, it has been found that it significantly influences the network structure or architecture. Therefore, a third database, the validation or real world database, is used as a final accuracy check of the chosen system. It is the accuracy against this validation database that is considered to be the system accuracy. The validation database is usually composed of vectors taken from setups which closely correlate with vehicle occupancy in real cars on the roadway. Initially, the training database is usually the largest of the three databases. As time and resources permit, the independent database, which perhaps starts out with 100,000 vectors, will continue to grow until it becomes approximately the same size or even larger than the training database. The validation database, on the other hand, will typically start out with as few as 50,000 vectors. However, as the hardware configuration is frozen, the validation database will continuously grow until, in some cases, it actually becomes larger than the training database. This is because near the end of the program, vehicles will be operating on highways and data will be collected in real world situations. If in the real world tests, system failures are discovered, this can lead to additional data being taken for both the training and independent databases as well as the validation database.

Once a neural network has been trained using all of the available data from all of the transducers, it is expected that the accuracy of the network will be very close to 100%. It is usually not practical to use all of the transducers that have been used in the training of the system for final installation in real production vehicle models. This is primarily due to cost and complexity considerations. Usually, the automobile manufacturer will have an idea of how many transducers would be acceptable for installation in a production vehicle. For example, the data may have been collected using 20 different transducers but the automobile manufacturer may restrict the final selection to 6 transducers. The next process, therefore, is to gradually eliminate transducers to determine what is the best combination of six transducers, for example, to achieve the highest system accuracy. Ideally, a series of neural networks would be trained using all combinations of six transducers from the 20 available. The activity would require a prohibitively long time. Certain constraints can be factored into the system from the beginning to start the pruning process. For example, it would probably not make sense to have both optical and ultrasonic transducers present in the same system since it would complicate the electronics. In fact, the automobile manufacturer may have decided initially that an optical system would be too expensive and therefore would not be considered. The inclusion of optical transducers, therefore, serves as a way of determining the loss in accuracy as a function of cost. Various constraints, therefore, usually allow the immediate elimination of a significant number of the initial group of transducers. This elimination and the training on the remaining transducers provides the resulting accuracy loss that results.

The next step is to remove each of the transducers one at a time and determine which sensor has the least effect on the system accuracy. This process is then repeated until the total number of transducers has been pruned down to the number desired by the customer. At this point, the process is reversed to add in one at a time those transducers that were removed at previous stages. It has been found, for example, that a sensor that appears to be unimportant during the early pruning process can become very important later on. Such a sensor may add a small amount of information due to the presence of various other transducers. Whereas the various other transducers, however, may yield less information than still other transducers and, therefore may have been removed during the pruning process. Reintroducing the sensor that was eliminated early in the cycle therefore can have a significant effect and can change the final choice of transducers to make up the system.

The above method of reducing the number of transducers that make up the system is but one of a variety approaches which have applicability in different situations. In some cases, a Monte Carlo or other statistical approach is warranted, whereas in other cases, a design of experiments approach has proven to be the most successful. In many cases, an operator conducting this activity becomes skilled and after a while knows intuitively what set of transducers is most likely to yield the best results. During the process it is not uncommon to run multiple cases on different computers simultaneously. Also, during this process, a database of the cost of accuracy is generated. The automobile manufacturer, for example, may desire to have the total of 6 transducers in the final system, however, when shown the fact that the addition of one or two additional transducers substantially increases the accuracy of the system, the manufacturer may change his mind. Similarly, the initial number of transducers selected may be 6 but the analysis could show that 4 transducers give substantially the same accuracy as 6 and therefore the other 2 can be eliminated at a cost saving.

While the pruning process is occurring, the vehicle is subjected to a variety of road tests and would be subjected to presentations to the customer. The road tests are tests that are run at different locations than where the fundamental training took place. It has been found that unexpected environmental factors can influence the performance of the system and therefore these tests can provide critical information. The system, therefore, which is installed in the test vehicle should have the capability of recording system failures. This recording includes the output of all of the transducers on the vehicle as well as a photograph of the vehicle setup that caused the error. This data is later analyzed to determine whether the training, independent or validation setups need to be modified and/or whether the transducers or positions of the transducers require modification.

Once the final set of transducers has been chosen, the vehicle is again subjected to real world testing on highways and at customer demonstrations. Once again, any failures are recorded. In this case, however, since the total number of transducers in the system is probably substantially less than the initial set of transducers, certain failures are to be expected. All such failures, if expected, are reviewed carefully with the customer to be sure that the customer recognizes the system failure modes and is prepared to accept the system with those failure modes.

The system described so far has been based on the use of a single neural network. It is frequently necessary and desirable to use combination neural networks, multiple neural networks, cellular neural networks or support vector machines or other pattern recognition systems. For example, for determining the occupancy state of a vehicle seat, there may be at least two different requirements. The first requirement is to establish what is occupying the seat and the second requirement is to establish where that object is located. Another requirement might be to simply determine whether an occupying item warranting analysis by the neural networks is present. Generally, a great deal of time, typically many seconds, is available for determining whether a forward facing human or an occupied or unoccupied rear facing child seat, for example, occupies the vehicle seat. On the other hand, if the driver of the car is trying to avoid an accident and is engaged in panic braking, the position of an unbelted occupant can be changing rapidly as he or she is moving toward the airbag. Thus, the problem of determining the location of an occupant is time critical. Typically, the position of the occupant in such situations must be determined in less than 20 milliseconds. There is no reason for the system to have to determine that a forward facing human being is in the seat while simultaneously determining where that forward facing human being is. The system already knows that the forward facing human being is present and therefore all of the resources can be used to determine the occupant's position. Thus, in this situation a dual level or modular neural network can be advantageously used. The first level determines the occupancy of the vehicle seat and the second level determines the position of that occupant. In some situations, it has been demonstrated that multiple neural networks used in parallel can provide some benefit. This will be discussed in more detail below. Both modular and multiple parallel neural networks are examples of combination neural networks.

The data that is fed to the pattern recognition system typically will usually not be the raw vectors of data as captured and digitized from the various transducers. Typically, a substantial amount of preprocessing of the data is undertaken to extract the important information from the data that is fed to the neural network. This is especially true in optical systems and where the quantity of data obtained, if all were used by the neural network, would require very expensive processors. The techniques of preprocessing data will not be described in detail here. However, the preprocessing techniques influence the neural network structure in many ways. For example, the preprocessing used to determine what is occupying a vehicle seat is typically quite different from the preprocessing used to determine the location of that occupant. Some particular preprocessing concepts will be discussed in more detail below.

Once the pattern recognition system has been applied to the preprocessed data, one or more decisions are available as output. The output from the pattern recognition system is usually based on a snapshot of the output of the various transducers. Thus, it represents one epoch or time period. The accuracy of such a decision can usually be substantially improved if previous decisions from the pattern recognition system are also considered. In the simplest form, which is typically used for the occupancy identification stage, the results of many decisions are averaged together and the resulting averaged decision is chosen as the correct decision. Once again, however, the situation is quite different for dynamic out-of-position occupants. The position of the occupant must be known at that particular epoch and cannot be averaged with his previous position. On the other hand, there is information in the previous positions that can be used to improve the accuracy of the current decision. For example, if the new decision says that the occupant has moved six inches since the previous decision, and, from physics, it is known that this could not possibly take place, then a better estimate of the current occupant position can be made by extrapolating from earlier positions. Alternately, an occupancy position versus time curve can be fitted using a variety of techniques such as the least squares regression method, to the data from previous 10 epochs, for example. This same type of analysis could also be applied to the vector itself rather than to the final decision thereby correcting the data prior to entry into the pattern recognition system. An alternate method is to train a module of a modular neural network to predict the position of the occupant based on feedback from previous results of the module.

A pattern recognition system, such as a neural network, can sometimes make totally irrational decisions. This typically happens when the pattern recognition system is presented with a data set or vector that is unlike any vector that has been in its training set. The variety of seating states of a vehicle is unlimited. Every attempt is made to select from that unlimited universe a set of representative cases. Nevertheless, there will always be cases that are significantly different from any that have been previously presented to the neural network. The final step, therefore, to adapting a system to a vehicle, is to add a measure of human intelligence or common sense. Sometimes this goes under the heading of fuzzy logic and the resulting system has been termed in some cases a neural fuzzy system. In some cases, this takes the form of an observer studying failures of the system and coming up with rules and that say, for example, that if transducer A perhaps in combination with another transducer produces values in this range, then the system should be programmed to override the pattern recognition decision and substitute therefor a human decision.

An example of this appears in R. Scorcioni, K. Ng, M. M. Trivedi, N. Lassiter; "MoNiF: A Modular Neuro-Fuzzy Controller for Race Car Navigation"; In Proceedings of the 1997 *IEEE Symposium on Computational Intelligence and Robotics Applications*, Monterey, Calif., USA July 1997, which describes the case of where an automobile was designed for autonomous operation and trained with a neural network, in one case, and a neural fuzzy system in another case. As long as both vehicles operated on familiar roads both vehicles performed satisfactorily. However, when placed on an unfamiliar road, the neural network vehicle failed while the neural fuzzy vehicle continue to operate successfully. Naturally, if the neural network vehicle had been trained on the unfamiliar road, it might very well have operated successful. Nevertheless, the critical failure mode of neural networks that most concerns people is this uncertainty as to what a neural network will do when confronted with an unknown state.

One aspect, therefore, of adding human intelligence to the system, is to ferret out those situations where the system is likely to fail. Unfortunately, in the current state-of-the-art, this is largely a trial and error activity. One example is that if the range of certain parts of vector falls outside of the range experienced during training, the system defaults to a particular state. In the case of suppressing deployment of one or more airbags, or other occupant protection apparatus, this case would be to enable airbag deployment even if the pattern recognition system calls for its being disabled. An alternate method is to train a particular module of a modular neural network to recognize good from bad data and reject the bad data before it is fed to the main neural networks.

The foregoing description is applicable to the systems described in the following drawings and the connection between the foregoing description and the systems described below will be explained below. However, it should be appreciated that the systems shown in the drawings do not limit the applicability of the methods or apparatus described above.

Figure 6A:
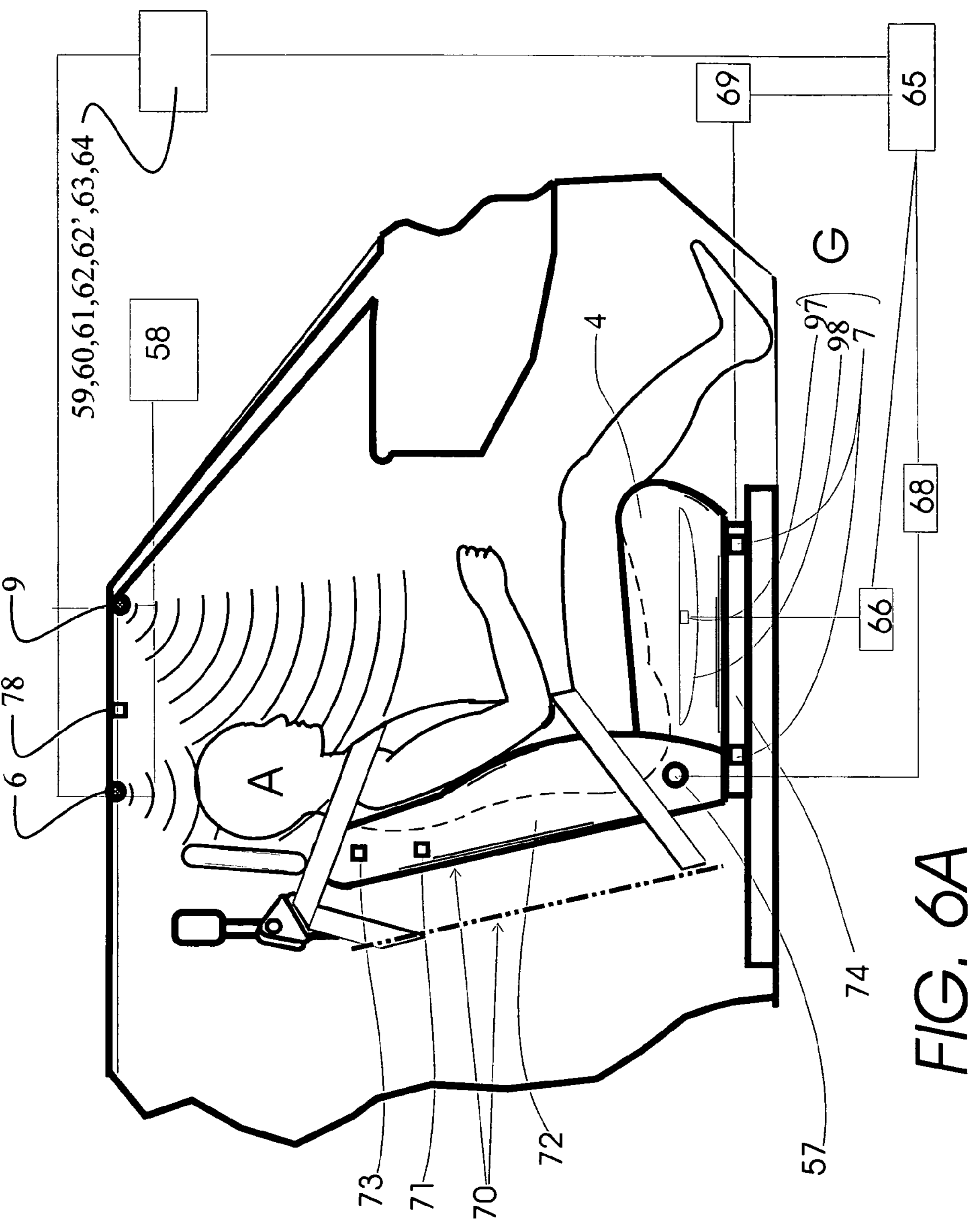
FIG. 6A is an illustration as in FIG. 6 with the replacement of a strain gage weight sensor within a cavity within the seat cushion for the bladder weight sensor of FIG. 6.

Referring again to FIG. 6, and to FIG. 6A which differs from FIG. 6 only in the use of a strain gage weight sensor mounted within the seat cushion, motion sensor 73 can be a discrete sensor that detects relative motion in the passenger compartment of the vehicle. Such sensors are frequently based on ultrasonics and can measure a change in the ultrasonic pattern that occurs over a short time period. Alternately, the subtracting of one position vector from a previous position vector to achieve a differential position vector can detect motion. For the purposes herein, a motion sensor will be used to mean either a particular device that is designed to detect motion for the creation of a special vector based on vector differences.

An ultrasonic, optical or other sensor or transducer system 9 can be mounted on the upper portion of the front pillar, i.e., the A-Pillar, of the vehicle and a similar sensor system 6 can be mounted on the upper portion of the intermediate pillar, i.e., the B-Pillar. Each sensor system 6, 9 may comprise a transducer. The outputs of the sensor systems 9 and 6 can be input to a band pass filter 60 through a multiplex circuit 59 which can be switched in synchronization with a timing signal from the ultrasonic sensor drive circuit 58, for example, and then is amplified by an amplifier 61. The band pass filter 60 removes a low frequency wave component from the output signal and also removes some of the noise. The envelope wave signal can be input to an analog/digital converter (ADC) 62 and digitized as measured data. The measured data can be input to a processing circuit 63, which is controlled by the timing signal which is in turn output from the sensor drive circuit 58. The above description applies primarily to systems based on ultrasonics and will differ somewhat for optical, electric field and other systems.

Neural network as used herein will generally mean a single neural network, a combination neural network, a cellular neural network, a support vector machine or any combinations thereof.

Each of the measured data is input to a normalization circuit 64 and normalized. The normalized measured data can be input to the combination neural network (circuit) 65, for example, as wave data.

The output of the weight sensor(s) 7, 76 or 97 (see FIG. 6A) can be amplified by an amplifier 66 coupled to the weight sensor(s) 76 and 7 and the amplified output is input to an analog/digital converter and then directed to the neural network 65, for example, of the processor means. Amplifier 66 is useful in some embodiments but it may be dispensed with by constructing the sensors 7, 76, 97 to provide a sufficiently strong output signal, and even possibly a digital signal. One manner to do this would be to construct the sensor systems with appropriate electronics.

The neural network 65 is directly connected to the ADCs 68 and 69, the ADC associated with amplifier 66 and the normalization circuit 64. As such, information from each of the sensors in the system (a stream of data) is passed directly to the neural network 65 for processing thereby. The streams of data from the sensors are not combined prior to the neural network 65 and the neural network is designed to accept the separate streams of data (e.g., at least a part of the data at each input node) and process them to provide an output indicative of the current occupancy state of the seat. The neural network 65 thus includes or incorporates a plurality of algorithms derived by training in the manners discussed above and below. Once the current occupancy state of the seat is determined, it is possible to control vehicular components or systems, such as the airbag system, in consideration of the current occupancy state of the seat.

Figure 28:
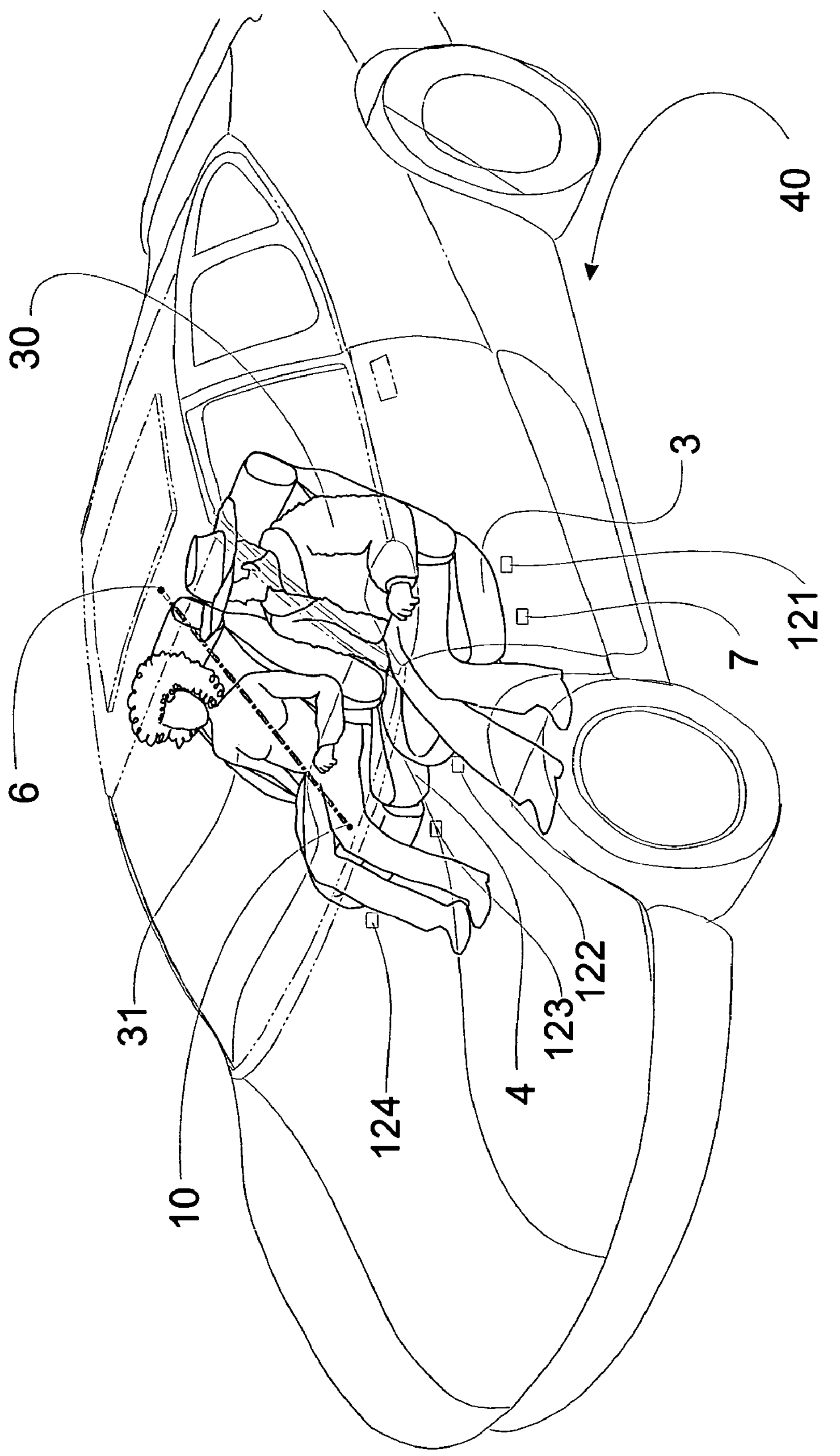
FIG. 28 is a perspective view of a vehicle containing two adult occupants on the front seat with the vehicle shown in phantom illustrating one preferred location of the transducers placed according to the methods taught in this invention.

A section of the passenger compartment of an automobile is shown generally as 40 in FIG. 28. A driver 30 of a vehicle sits on a seat 3 behind a steering wheel, not shown, and an adult passenger 31 sits on seat 4 on the passenger side. Two transmitter and/or receiver assemblies 6 and 10, also referred to herein as transducers, are positioned in the passenger compartment 40, one transducer 6 is arranged on the headliner adjacent or in proximity to the dome light and the other transducer 10 is arranged on the center of the top of the dashboard or instrument panel of the vehicle. The methodology leading to the placement of these transducers is important to this invention as explained in detail below. In this situation, the system developed in accordance with this invention will reliably detect that an occupant is sitting on seat 4 and deployment of the airbag is enabled in the event that the vehicle experiences a crash. Transducers 6, 10 are placed with their separation axis parallel to the separation axis of the head, shoulder and rear facing child seat volumes of occupants of an automotive passenger seat and in view of this specific positioning, are capable of distinguishing the different configurations. In addition to the transducers 6, 10, weight-measuring sensors 7, 121, 122, 123 and 124 are also present. These weight sensors may be of a variety of technologies including, as illustrated here, strain-measuring transducers attached to the vehicle seat support structure as described in more detail in U.S. Pat. No. 06,081,757. Naturally other weight systems can be utilized including systems that measure the deflection of, or pressure on, the seat cushion. The weight sensors described here are meant to be illustrative of the general class of weight sensors and not an exhaustive list of methods of measuring occupant weight.

Figure 21:
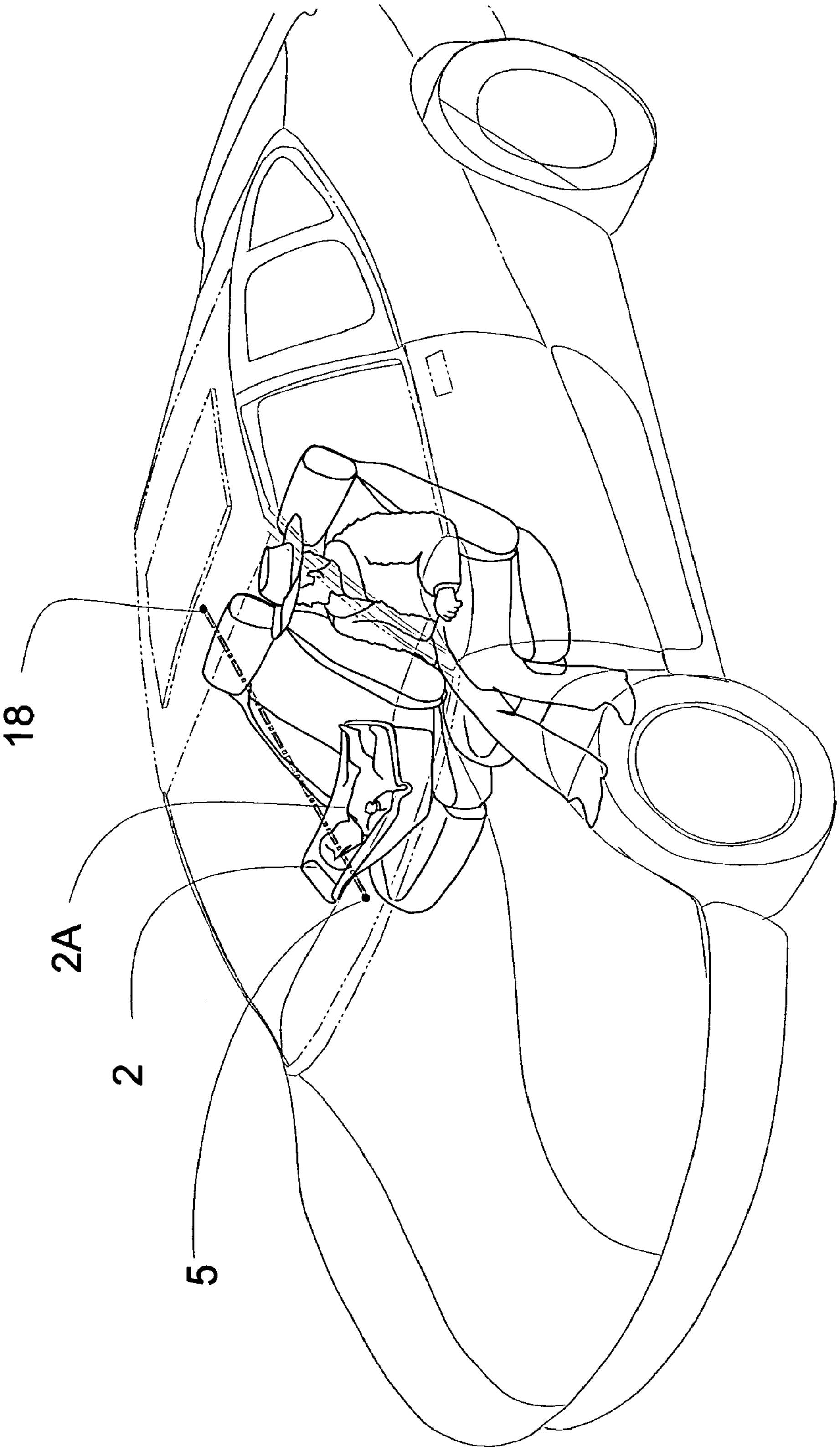
FIG. 21 is a perspective view of a vehicle containing an adult occupant and an occupied infant seat on the front seat with the vehicle shown in phantom illustrating one preferred location of the transducers placed according to the methods taught in this invention.
Figure 29:
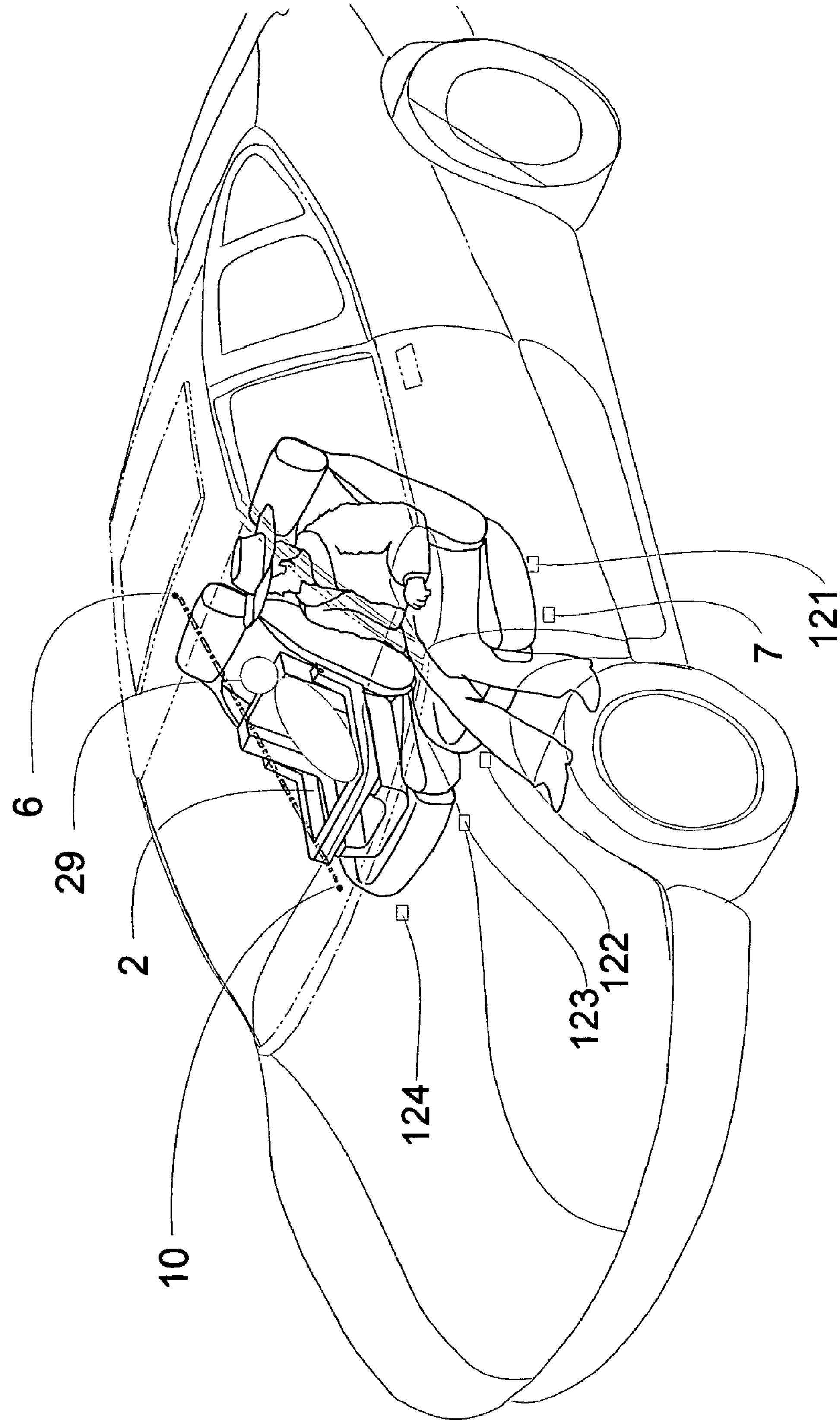
FIG. 29 is a view as in FIG. 28 with the passenger occupant replaced by a child in a forward facing child seat.
Figure 30:
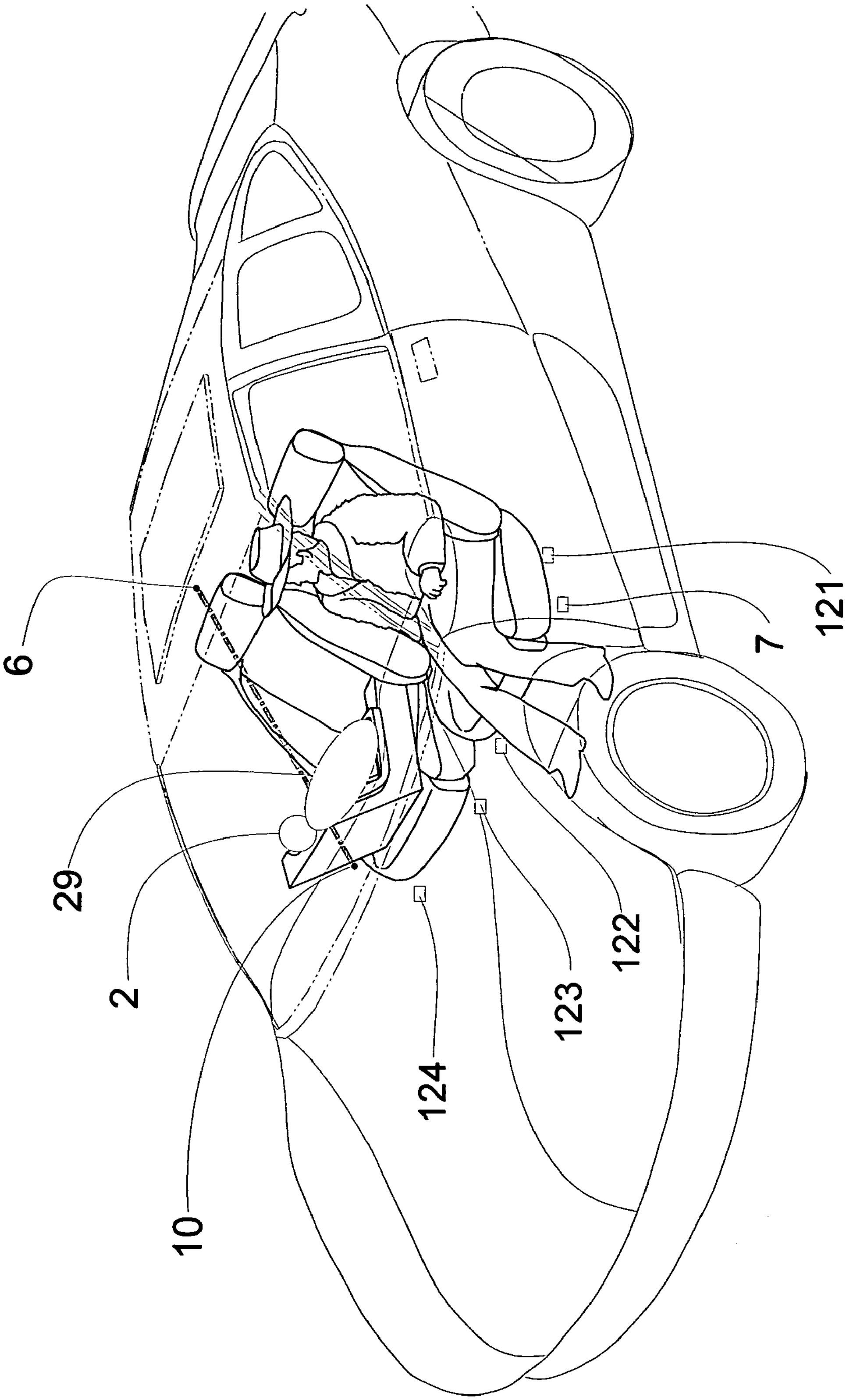
FIG. 30 is a view as in FIG. 28 with the passenger occupant replaced by a child in a rearward facing child seat.

In FIG. 29, a child seat 2 in the forward facing direction containing a child 29 replaces the adult passenger 31 as shown in FIG. 28. In this case, it is usually required that the airbag not be disabled, or enabled in the depowered mode, in the event of an accident. However, in the event that the same child seat is placed in the rearward facing position as shown in FIG. 30, then the airbag is usually required to be disabled since deployment of the airbag in a crash can seriously injure or even kill the child. Furthermore, as illustrated in FIG. 21, if an infant 29 in an infant carrier 2 is positioned in the rear facing position of the passenger seat, the airbag should be disabled for the reasons discussed above. Instead of disabling deployment of the airbag, the deployment could be controlled to provide protection for the child, e.g., to reduce the force of the deployment of the airbag. It should be noted that the disabling or enabling of the passenger airbag relative to the item on the passenger seat may be tailored to the specific application. For example, in some embodiments, with certain forward facing child seats, it may in fact be desirable to disable the airbag and in other cases to deploy a depowered airbag.

The selection of when to disable, depower or enable the airbag, as a function of the item in the passenger seat and its location, is made during the programming or training stage of the sensor system and, in most cases, the criteria set forth above will be applicable, i.e., enabling airbag deployment for a forward facing child seat and an adult in a proper seating position and disabling airbag deployment for a rearward facing child seat and infant and for any occupant who is out-of-position and in close proximity to the airbag module. The sensor system developed in accordance with the invention may however be programmed according to other criteria.

Several systems using other technologies have been devised to discriminate between the four cases illustrated above but none have shown a satisfactory accuracy or reliability of discrimination. Some of these systems appear to work as long as the child seat is properly placed on the seat and belted in. So called "tag systems", for example, whereby a device is placed on the child seat which is electromagnetically sensed by sensors placed within the seat can fail but can add information to the overall system. When used alone, they function well as long as the child seat is restrained by a seatbelt, but when this is not the case they have a high failure rate. Since the seatbelt usage of the population of the United States is now somewhat above 70%, it is quite likely that a significant percentage of child seats will not be properly belted onto the seat and thus children will be subjected to injury and death in the event of an accident.

This methodology will now be described as it relates primarily to wave type sensors such as those based on optics, ultrasonics or radar. A similar methodology applies to other transducer types and which will now be obvious to those skilled in the art after a review of the methodology described below.

The methodology of this invention was devised to solve this problem. To understand this methodology, consider two transmitters and receivers 6 and 10 (transducers) which are connected by an axis AB in FIG. 31. Each transmitter radiates a signal which is primarily confined to a cone angle, called the field angle, with its origin at the transmitter. For simplicity, assume that the transmitter and receiver are embodied in the same device although in some cases a separate device will be used for each function. When a transducer sends out a burst of waves, for example, to thereby irradiate the passenger compartment with radiation, and then receives a reflection or modified radiation from some object in the passenger compartment, the distance of the object from the transducer can be determined by the time delay between the transmission of the waves and the reception of the reflected or modified waves, by the phase angle or by a correlation process.

When looking at a single transducer, it may not be possible to determine the direction to the object which is reflecting or modifying the signal but it may be possible to know how far that object is from the transducer. That is, a single transducer may enable a distance measurement but not a directional measurement. In other words, the object may be at a point on the surface of a three-dimensional spherical segment having its origin at the transducer and a radius equal to the distance. This will generally be the case for an ultrasonic transducer or other broad beam single pixel device. Consider two transducers, such as 6 and 10 in FIG. 31, and both transducers receive a reflection from the same object, which is facilitated by proper placement of the transducers, the timing of the reflections depends on the distance from the object to each respective transducer. If it is assumed for the purposes of this analysis that the two transducers act independently, that is, they only listen to the reflections of waves which they themselves transmitted (which may be achieved by transmitting waves at different frequencies or at different times), then each transducer enables the determination of the distance to the reflecting object but not its direction. Assuming the transducer radiates in all directions within the field cone angle, each transducer enables the determination that the object is located on a spherical surface A', B' a respective known distance from the transducer, that is, each transducer enables the determination that the object is a specific distance from that transducer which may or may not be the same distance between the other transducer and the same object. Since now there are two transducers, and the distance of the reflecting object has been determined relative to each of the transducers, the actual location of the object resides on a circle which is the intersection of the two spherical surfaces A', and B'. This circle is labeled C in FIG. 31. At each point along circle C, the distance to the transducer 6 is the same and the distance to the transducer 10 is the same. This, of course, is strictly true only for ideal one-dimensional objects.

For many cases, the mere knowledge that the object lies on a particular circle is sufficient since it is possible to locate the circle such that the only time that an object lies on a particular circle that its location is known. That is, the circle which passes through the area of interest otherwise passes through a volume where no objects can occur. Thus, the mere calculation of the circle in this specific location, which indicates the presence of the object along that circle, provides valuable information concerning the object in the passenger compartment which may be used to control or affect another system in the vehicle such as the airbag system. This of course is based on the assumption that the reflections to the two transducers are in fact from the same object. Care must be taken in locating the transducers such that other objects do not cause reflections that could confuse the system.

Figure 32:
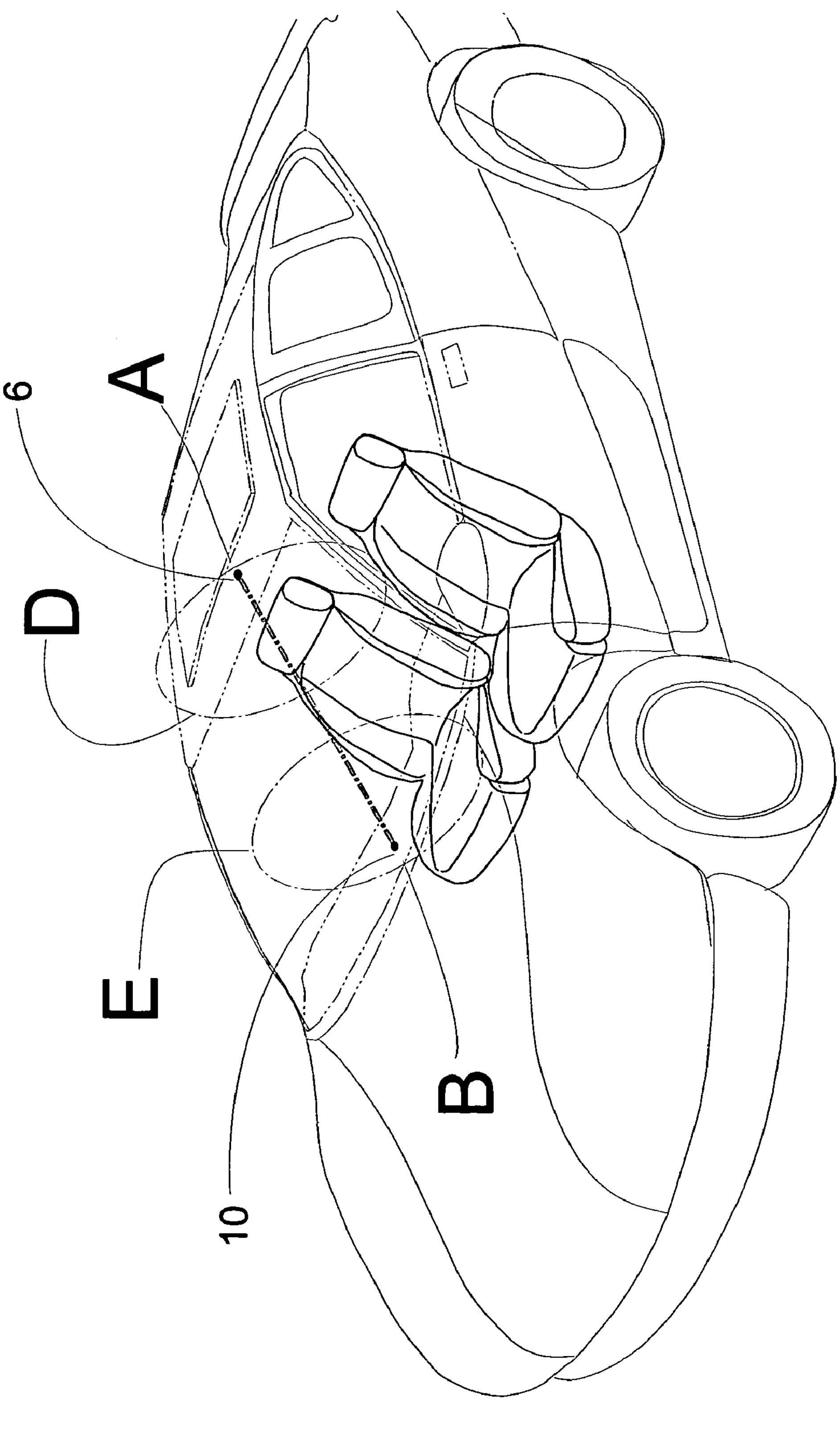
FIG. 32 is a view as in FIG. 28 with the occupants removed illustrating the location of two circles in space and how they intersect the volumes characteristic of a rear facing child seat and a larger occupant.

FIG. 32, for example, illustrates two circles D and E of interest which represent the volume which is usually occupied when the seat is occupied by a person not in a child seat or by a forward facing child seat and the volume normally occupied by a rear facing child seat, respectively. Thus, if the circle generated by the system, (i.e., by appropriate processor means which receives the distance determination from each transducer and creates the circle from the intersection of the spherical surfaces which represent the distance from the transducers to the object) is at a location which is only occupied by an adult passenger, the airbag would not be disabled since its deployment in a crash is desired. On the other hand, if a circle is at a location occupied only by a rear facing child seat, the airbag would be disabled.

The above discussion of course is simplistic in that it does not take into account the volume occupied by the object or the fact that reflections from more than one object surface will be involved. In reality, transducer B is likely to pick up the rear of the occupant's head and transducer A, the front. This makes the situation more difficult for an engineer looking at the data to analyze. It has been found that pattern recognition technologies are able to extract the information from these situations and through a proper application of these technologies, an algorithm can be developed, and when installed as part of the system for a particular vehicle, the system accurately and reliably differentiates between a forward facing and rear facing child seat, for example, or an in-position or out-of-position forward facing human being.

From the above discussion, a method of transducer location is disclosed which provides unique information to differentiate between (i) a forward facing child seat or a forward properly positioned occupant where airbag deployment is desired and (ii) a rearward facing child seat and an out-of-position occupant where airbag deployment is not desired. In actuality, the algorithm used to implement this theory does not directly calculate the surface of spheres or the circles of interaction of spheres. Instead, a pattern recognition system is used to differentiate airbag-deployment desired cases from those where the airbag should not be deployed. For the pattern recognition system to accurately perform its function, however, the patterns presented to the system must have the requisite information. That is, for example, a pattern of reflected waves from an occupying item in a passenger compartment to various transducers must be uniquely different for cases where airbag deployment is desired from cases where airbag deployment is not desired. The theory described herein teaches how to locate transducers within the vehicle passenger compartment so that the patterns of reflected waves, for example, will be easily distinguishable for cases where airbag deployment is desired from those where airbag deployment is not desired. In the case presented thus far, it has been shown that in some implementations, the use of only two transducers can result in the desired pattern differentiation when the vehicle geometry is such that two transducers can be placed such that the circles D (airbag enabled) and E (airbag disabled) fall outside of the transducer field cones except where they are in the critical regions where positive identification of the condition occurs. Thus, the aiming and field angles of the transducers are important factors to determine in adapting a system to a particular vehicle, especially for ultrasonic and radar sensors, for example.

Figure 33:
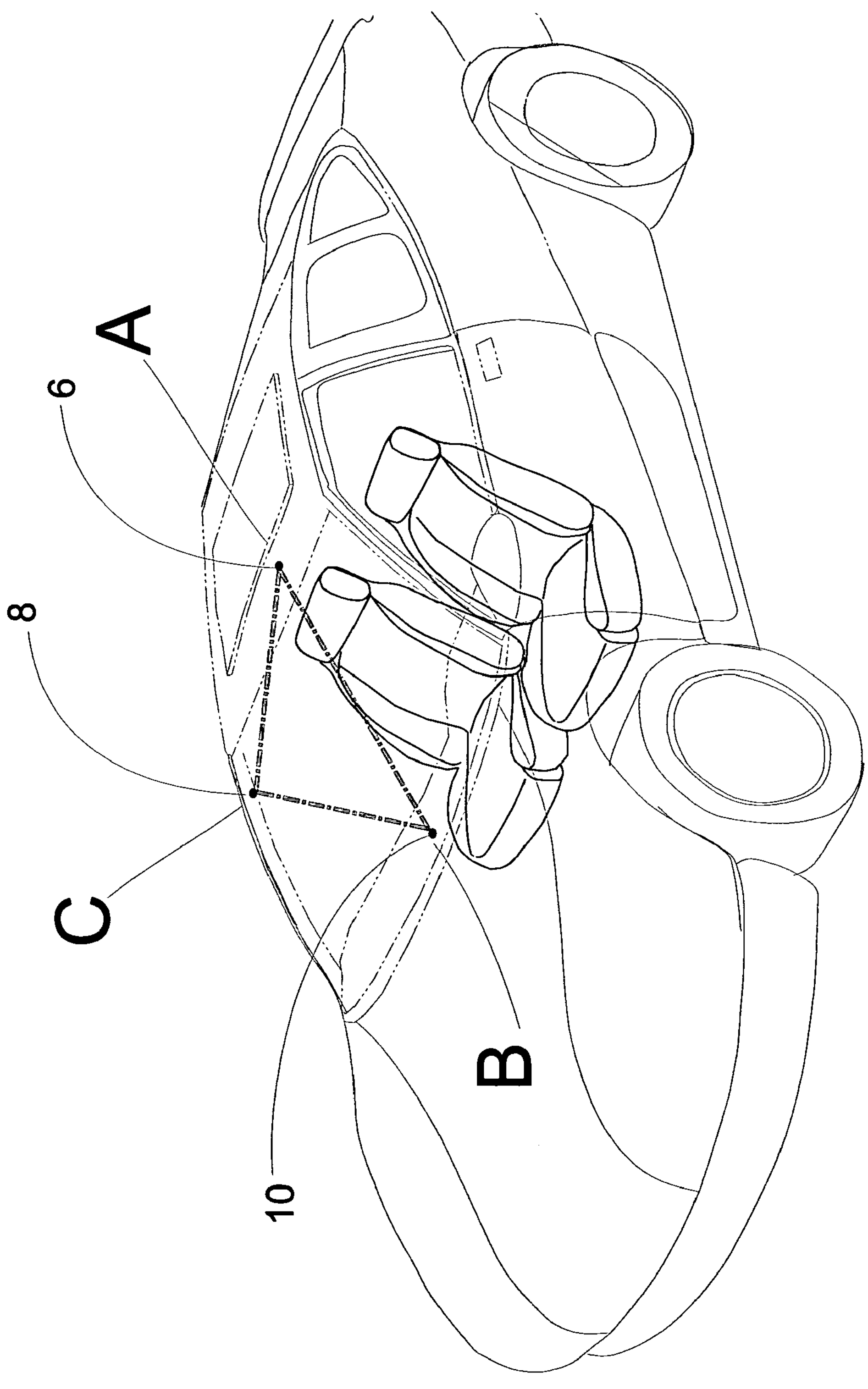
FIG. 33 illustrates a preferred mounting location of a three-transducer system.
Figure 34:
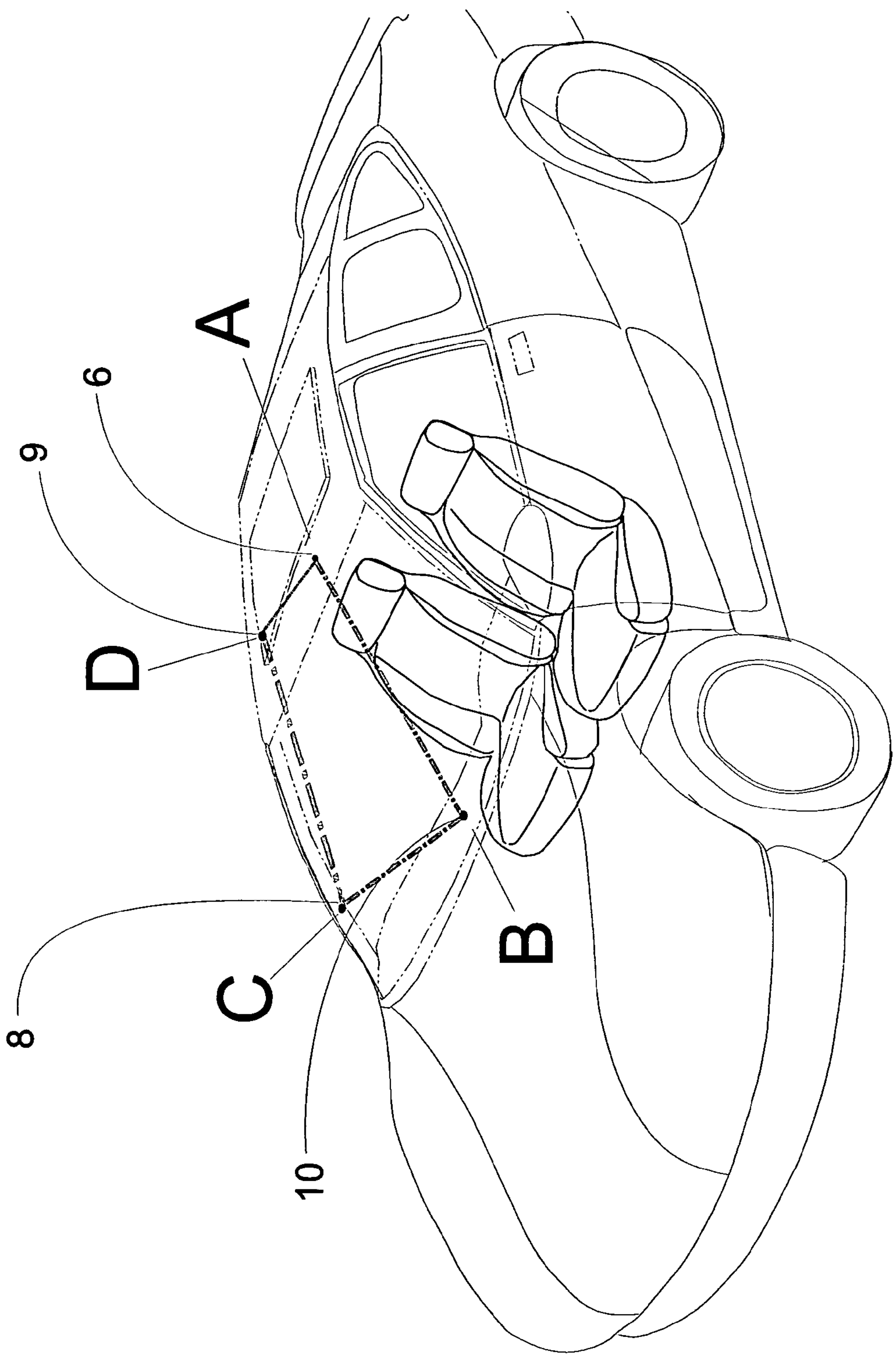
FIG. 34 illustrates a preferred mounting location of a four-transducer system.

The use of only two transducers in a system is typically not acceptable since one or both of the transducers can be rendered inoperable by being blocked, for example, by a newspaper. Thus, it is usually desirable to add a third transducer 8 as shown in FIG. 33, which now provides a third set of spherical surfaces relative to the third transducer. Transducer 8 is positioned on the passenger side of the A-pillar (which is a preferred placement if the system is designed to operate on the passenger side of the vehicle). Three spherical surfaces now intersect in only two points and in fact, usually at one point if the aiming angles and field angles are properly chosen. Once again, this discussion is only strictly true for a point object. For a real object, the reflections will come from different surfaces of the object, which usually are at similar distances from the object. Thus, the addition of a third transducer substantially improves system reliability. Finally, with the addition of a fourth transducer 9 as shown in FIG. 34, even greater accuracy and reliability is attained. Transducer 9 can be positioned on the ceiling of the vehicle close to the passenger side door. In FIG. 34, lines connecting the transducers C and D and the transducers A and B are substantially parallel permitting an accurate determination of asymmetry and thereby object rotation. Thus, for example, if the infant seat is placed on an angle as shown in FIG. 30, this condition can be determined and taken into account when the decision is made to disable the deployment of the airbag.

The discussion above has partially centered on locating transducers and designing a system for determining whether the two target volumes, that adjacent the airbag and that adjacent the upper portion of the vehicle seat, are occupied. Other systems have been described in the above referenced patents using a sensor mounted on or adjacent the airbag module and a sensor mounted high in the vehicle to monitor the space near the vehicle seat. Such systems use the sensors as independent devices and do not use the combination of the two sensors to determine where the object is located. In fact, the location of such sensors is usually poorly chosen so that it is easy to blind either or both with a newspaper for those transducers using high frequency electromagnetic waves or ultrasonic waves, for example. Furthermore, no system is known to have been disclosed, except in patents and patent applications assigned to the current assignee, which uses more than two transducers especially such that one or more can be blocked without causing serious deterioration of the system. Again, the examples here have been for the purpose of suppressing the deployment of the airbag when it is necessary to prevent injury. The sensor system disclosed can be used for many other purposes such as disclosed in the above-mentioned patent applications assigned to the current assignee. The ability to use the sensors for these other applications is generally lacking in the systems disclosed in the other referenced patents.

Figure 35:
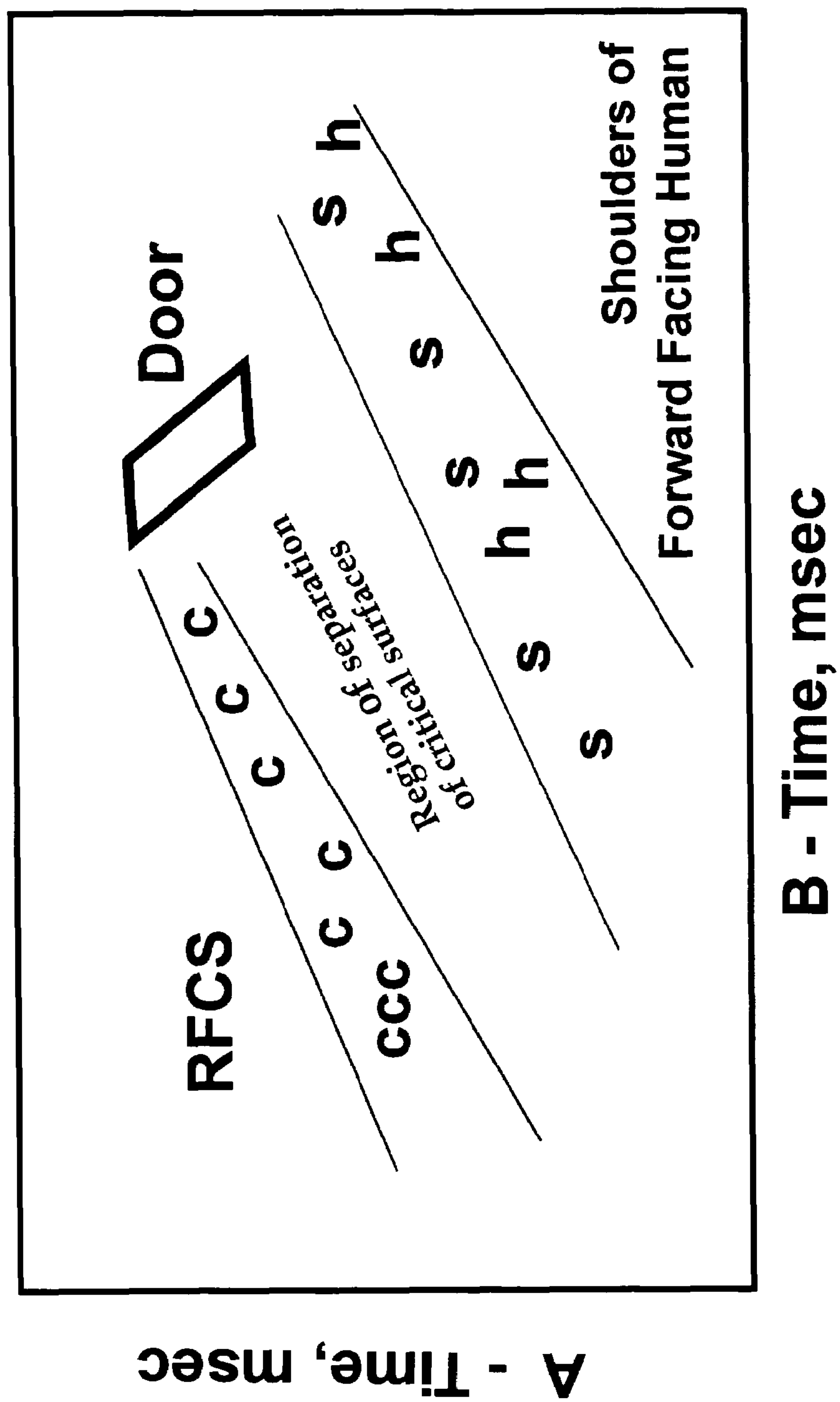
FIG. 35 is a plot showing the target volume discrimination for two transducers.
Figure 36:
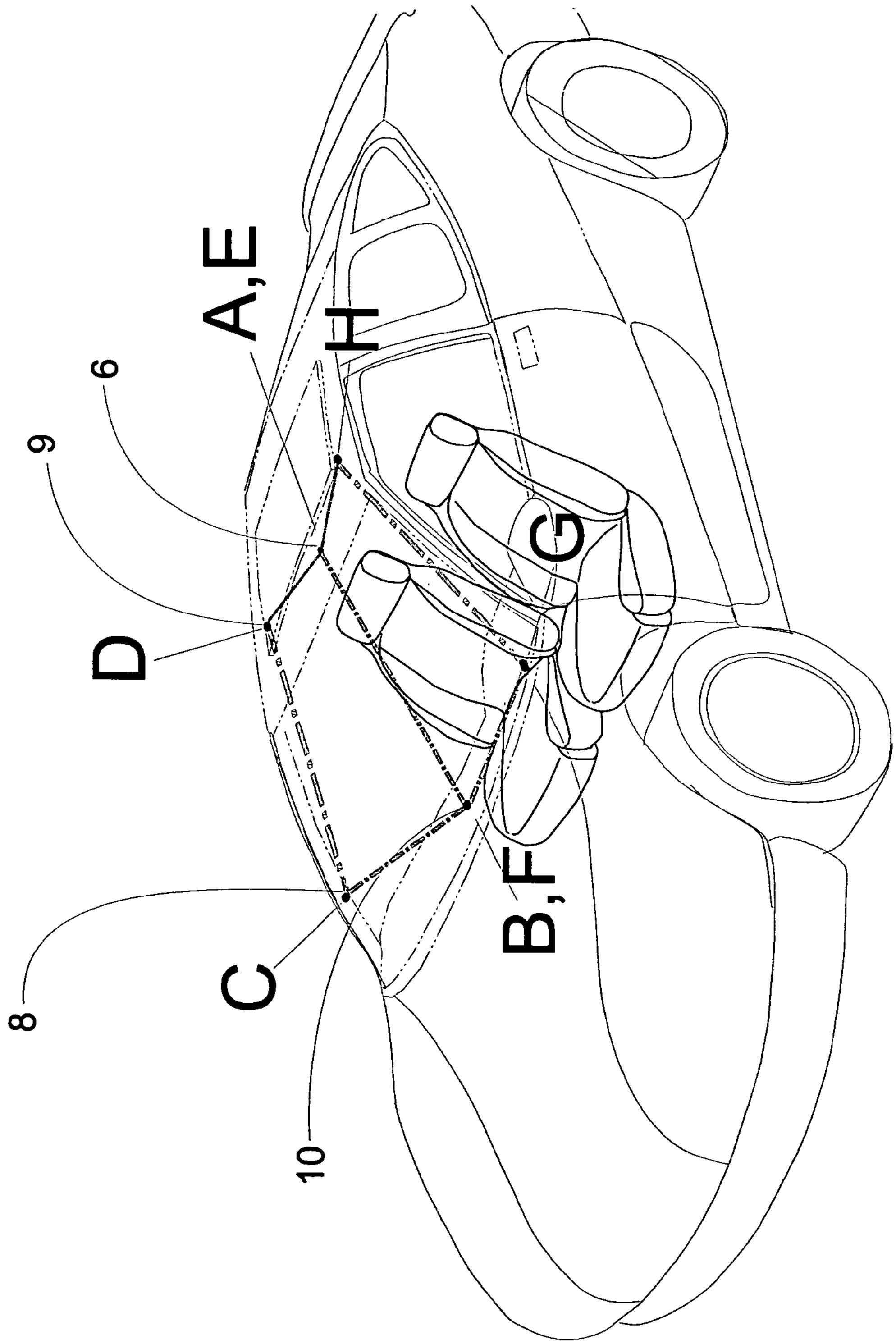
FIG. 36 illustrates a preferred mounting location of a eight-transducer system.

Considering once again the condition of these figures where two transducers are used, a plot can be made showing the reflection times of the objects which are located in the region of curve E and curve F of FIG. 36. This plot is shown on FIG. 35 where the c's represent reflections from rear facing child seats from various tests where the seats were placed in a variety of different positions and similarly the s's and h's represent shoulders and heads respectively of various forward facing human occupants. In these results from actual experiments using ultrasonic transducers, the effect of body thickness is present and yet the results still show that the basic principles of separation of key volumes are valid. Note that there is a region of separation between corridors that house the different object classes. It is this fact which is used in conjunction with neural networks, as described in the above referenced patents and patent applications, which permit the design of a system that provides an accurate discrimination of rear facing child seats from forward facing humans. Previously, before the techniques for locating the transducers to separate these two zones were discovered, the entire discrimination task was accomplished using neural networks. There was significant overlap between the reflections from the various objects and therefore separation was done based on patterns of the reflected waves. By using the technology described herein to carefully position and orient the transducers so as to create this region of separation of the critical surfaces, wherein all of the rear facing child seat data falls within a known corridor, the task remaining for the neural networks is substantially simplified with the result that the accuracy of identification is substantially improved.

Figure 31:
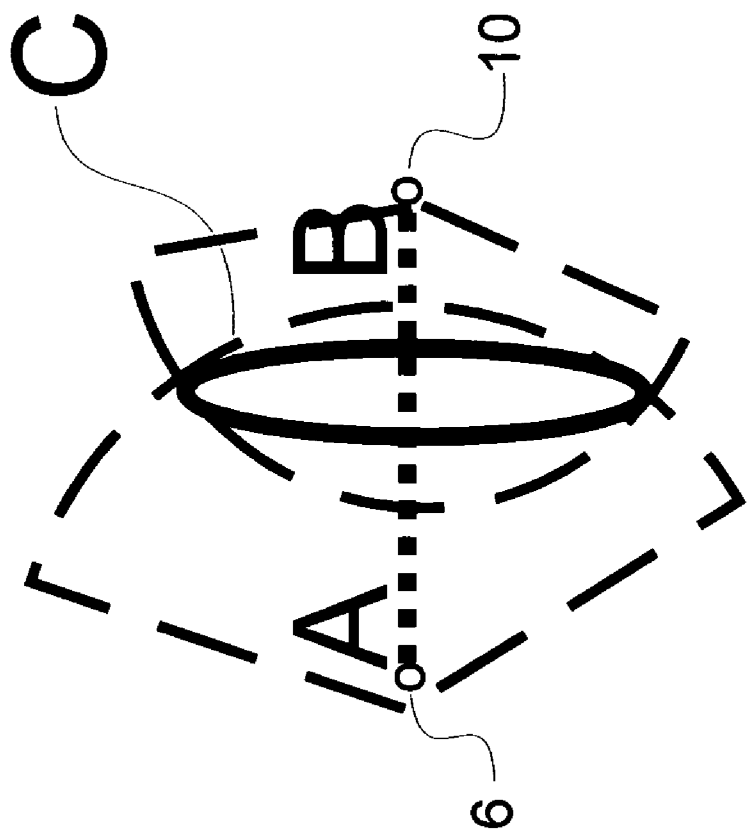
FIG. 31 is a diagram illustrating the interaction of two ultrasonic sensors and how this interaction is used to locate a circle is space.

Three general classes of child seats exist as well as several models which are unique. First, there is the infant only seat as shown in FIG. 31 which is for occupants weighing up to about 20 pounds. This is designed to be only placed in the rear facing position. The second which is illustrated in FIGS. 28 and 29 is for children from about 20 to about 40 pounds and can be used in both the forward and rear facing position and the third is for use only in the forward facing position and is for children weighing over about 40 pounds. All of these seats as well as the unique models are used in test setups according to this invention for adapting a system to a vehicle. For each child seat, there are several hundred unique orientations representing virtually every possible position of that seat within the vehicle. Tests are run, for example, with the seat tilted 22 degrees, rotated 17 degrees, placed on the front of the seat with the seat back fully up with the seat fully back and with the window open as well as all variations of there parameters. A large number of cases are also run, when practicing the teachings of this invention, with various accessories, such as clothing, toys, bottles, blankets etc., added to the child seat.

Similarly, wide variations are used for the occupants including size, clothing and activities such as reading maps or newspapers, leaning forward to adjust the radio, for example. Also included are cases where the occupant puts his/her feet on the dashboard or otherwise assumes a wide variety of unusual positions. When all of the above configurations are considered along with many others not mentioned, the total number of configurations which are used to train the pattern recognition system can exceed 500,000. The goal is to include in the configuration training set representations of all occupancy states that occur in actual use. Since the system is highly accurate in making the correct decision for cases which are similar to those in the training set, the total system accuracy increases as the size of the training set increases providing the cases are all distinct and not copies of other cases.

In addition to all of the variations in occupancy states, it is important to consider environmental effects during the data collection. Thermal gradients or thermal instabilities are particularly important for systems based on ultrasound since sound waves can be significantly diffracted by density changes in air. There are two aspects of the use of thermal gradients or instability in training. First, the fact that thermal instabilities exist and therefore data with thermal instabilities present should be part of database. For this case, a rather small amount of data collected with thermal instabilities would be used. A much more important use of thermal instability comes from the fact that they add variability to data. Thus, considerably more data is taken with thermal instability and in fact, in some cases a substantial percentage of the database is taken with time varying thermal gradients in order to provide variability to the data so that the neural network does not memorize but instead generalizes from the data. This is accomplished by taking the data with a cold vehicle with the heater operating and with a hot vehicle with the air conditioner operating. Additional data is also taken with a heat lamp in a closed vehicle to simulate a stable thermal gradient caused by sun loading.

To collect data for 500,000 vehicle configurations is not a formidable task. A trained technician crew can typically collect data on in excess on 2000 configurations or vectors per hour. The data is collected typically every 50 to 100 milliseconds. During this time, the occupant is continuously moving, assuming a continuously varying position and posture in the vehicle including moving from side to side, forward and back, twisting his/her head, reading newspapers and books, moving hands, arms, feet and legs, until the desired number of different seated state examples are obtained. In some cases, this process is practiced by confining the motion of an occupant into a particular zone. In some cases, for example, the occupant is trained to exercise these different seated state motions while remaining in a particular zone that may be the safe zone, the keep out zone, or an intermediate gray zone. In this manner, data is collected representing the airbag disable, depowered airbag enabled or full power airbag enabled states. In other cases, the actual position of the back of the head and/or the shoulders of the occupant are tracked using string pots, high frequency ultrasonic transducers, optically, by RF or other equivalent methods. In this manner, the position of the occupant can be measured and the decision as to whether this should be a disable or enable airbag case can be decided later. By continuously monitoring the occupant, an added advantage results in that the data can be collected to permit a comparison of the occupant from one seated state to another. This is particularly valuable in attempting to project the future location of an occupant based on a series of past locations as would be desirable for example to predict when an occupant would cross into the keep out zone during a panic braking situation prior to crash.

It is important to note that it is not necessary to tailor the system for every vehicle produced but rather to tailor it for each platform. However, a neural network, and especially a combination neural network, can be designed with some adaptability to compensate for vehicle to vehicle differences within a platform such as mounting tolerances, or to changes made by the owner or due to aging. A platform is an automobile manufacturer's designation of a group of vehicle models that are built on the same vehicle structure.

The methods above have been described in connection with the use of ultrasonic transducers. Many of the methods, however, are also applicable to optical, radar, capacitive, electric field and other sensing systems and where applicable, this invention is not limited to ultrasonic systems. In particular, an important feature of this invention is the proper placement of two or more separately located receivers such that the system still operates with high reliability if one of the receivers is blocked by some object such as a newspaper. This feature is also applicable to systems using electromagnetic radiation instead of ultrasonic, however the particular locations will differ based on the properties of the particular transducers. Optical sensors based on two-dimensional cameras or other image sensors, for example, are more appropriately placed on the sides of a rectangle surrounding the seat to be monitored rather than at the corners of such a rectangle as is the case with ultrasonic sensors. This is because ultrasonic sensors measure an axial distance from the sensor where the camera is most appropriate for measuring distances up and down and across its field view rather than distances to the object. With the use of electromagnetic radiation and the advances which have recently been made in the field of very low light level sensitivity, it is now possible, in some implementations, to eliminate the transmitters and use background light as the source of illumination along with using a technique such as auto-focusing or stereo vision to obtain the distance from the receiver to the object. Thus, only receivers would be required further reducing the complexity of the system.

Although implicit in the above discussion, an important feature of this invention which should be emphasized is the method of developing a system having distributed transducer mountings. Other systems which have attempted to solve the rear facing child seat (RFCS) and out-of-position problems have relied on a single transducer mounting location or at most, two transducer mounting locations. Such systems can be easily blinded by a newspaper or by the hand of an occupant, for example, which is imposed between the occupant and the transducers. This problem is almost completely eliminated through the use of three or more transducers which are mounted so that they have distinctly different views of the passenger compartment volume of interest. If the system is adapted using four transducers as illustrated in the distributed system of FIG. 34, for example, the system suffers only a slight reduction in accuracy even if two of the transducers are covered so as to make them inoperable. However, the automobile manufacturers may not wish to pay the cost of several different mounting locations and an alternate is to mount the sensors high where blockage is difficult and to diagnose whether a blockage state exists.

It is important in order to obtain the full advantages of the system when a transducer is blocked, that the training and independent databases contains many examples of blocked transducers. If the pattern recognition system, the neural network in this case, has not been trained on a substantial number of blocked transducer cases, it will not do a good job in recognizing such cases later. This is yet another instance where the makeup of the databases is crucial to the success of designing the system that will perform with high reliability in a vehicle and is an important aspect of the instant invention. When camera-based transducers are used, for example, an alternative strategy is to diagnose when a newspaper is blocking a camera, for example. In most cases, a short time blockage is of little consequence since earlier decisions provide the seat occupancy and the decision to enable deployment or suppress deployment of the occupant restraint will not change. For a prolonged blockage, the diagnostic system can provide a warning light indicating to the driver that the system is malfunctioning and the deployment decision is again either not changed or changed to the default decision, which is usually to enable deployment.

Let us now consider some specific issues:

1. Blocked transducers. It is sometimes desirable to positively identify a blocked transducer and when such a situation is found to use a different neural network which has only been trained on the subset of unblocked transducers. Such a network, since it has been trained specifically on three transducers, for example, will generally perform more accurately than a network which has been trained on four transducers with one of the transducers blocked some of the time. Once a blocked transducer has been identified the occupant can be notified if the condition persists for more than a reasonable time.

2. Transducer Geometry. Another technique, which is frequently used in designing a system for a particular vehicle, is to use a neural network to determine the optimum mounting locations, aiming or orientation directions and field angles of transducers. For particularly difficult vehicles, it is sometimes desirable to mount a large number of ultrasonic transducers, for example, and then use the neural network to eliminate those transducers which are least significant. This is similar to the technique described above where all kinds of transducers are combined initially and later pruned.

3. Data quantity. Since it is very easy to take large amounts data and yet large databases require considerably longer training time for a neural network, a test of the variability of the database can be made using a neural network. If, for example, after removing half of the data in the database, the performance of a trained neural network against the validation database does not decrease, then the system designer suspects that the training database contains a large amount of redundant data. Techniques such as similarity analysis can then be used to remove data that is virtually indistinguishable from other data. Since it is important to have a varied database, it is undesirable generally to have duplicate or essentially duplicate vectors in the database since the presence of such vectors can bias the system and drive the system more toward memorization and away from generalization.

4. Environmental factors. An evaluation can be made of the beneficial effects of using varying environmental influences, such as temperature or lighting, during data collection on the accuracy of the system using neural networks along with a technique such as design of experiments.

5. Database makeup. It is generally believed that the training database must be flat, meaning that all of the occupancy states that the neural network must recognize must be approximately equally represented in the training database. Typically, the independent database has approximately the same makeup as the training database. The validation database, on the other hand, typically is represented in a non-flat basis with representative cases from real world experience. Since there is no need for the validation database to be flat, it can include many of the extreme cases as well as being highly biased towards the most common cases. This is the theory that is currently being used to determine the makeup of the various databases. The success of this theory continues to be challenged by the addition of new cases to the validation database. When significant failures are discovered in the validation database, the training and independent databases are modified in an attempt to remove the failure.

6. Biasing. All seated state occupancy states are not equally important. The final system must be nearly 100% accurate for forward facing "in-position" humans, i.e., normally positioned humans. Since that will comprise the majority of the real world situations, even a small loss in accuracy here will cause the airbag to be disabled in a situation where it otherwise would be available to protect an occupant. A small decrease in accuracy will thus result in a large increase in deaths and injuries. On the other hand, there are no serious consequences if the airbag is deployed occasionally when the seat is empty. Various techniques are used to bias the data in the database to take this into account. One technique is to give a much higher value to the presence of a forward facing human during the supervised learning process than to an empty seat. Another technique is to include more data for forward facing humans than for empty seats. This, however, can be dangerous as an unbalanced network leads to a loss of generality.

7. Screening. It is important that the loop be closed on data acquisition. That is, the data must be checked at the time the data is acquired to the sure that it is good data. Bad data can happen, for example, because of electrical disturbances on the power line, sources of ultrasound such as nearby welding equipment, or due to human error. If the data remains in the training database, for example, then it will degrade the performance of the network. Several methods exist for eliminating bad data. The most successful method is to take an initial quantity of data, such as 30,000 to 50,000 vectors, and create an interim network. This is normally done anyway as an initial check on the system capabilities prior to engaging in an extensive data collection process. The network can be trained on this data and, as the real training data is acquired, the data can be tested against the neural network created on the initial data set. Any vectors that fail are examined for reasonableness.

8. Vector normalization method. Through extensive research, it has been found that the vector should be normalized based on all of the data in the vector, that is have all its data values range from 0 to 1. For particular cases, however, it has been found desirable to apply the normalization process selectively, eliminating or treating differently the data at the early part of the data from each transducer. This is especially the case when there is significant ringing on the transducer or cross talk when a separate send and receive transducer is used. There are times when other vector normalization techniques are required and the neural network system can be used to determine the best vector normalization technique for a particular application.

9. Feature extraction. The success of a neural network system can frequently be aided if additional data is inputted into the network. One example can be the number of 0 data points before the first peak is experienced. Alternately, the exact distance to the first peak can be determined prior to the sampling of the data. Other features can include the number of peaks, the distance between the peaks, the width of the largest peak, the normalization factor, the vector mean or standard deviation, etc. These normalization techniques are frequently used at the end of the adaptation process to slightly increase the accuracy of the system.

10. Noise. It has been frequently reported in the literature that adding noise to the data that is provided to a neural network can improve the neural network accuracy by leading to better generalization and away from memorization. However, the training of the network in the presence of thermal gradients has been shown to substantially eliminate the need to artificially add noise to the data. Nevertheless, in some cases, improvements have been observed when random arbitrary noise of a rather low level is superimposed on the training data.

11. Photographic recording of the setup. After all of the data has been collected and used to train a neural network, it is common to find a significant number of vectors which, when analyzed by the neural network, give a weak or wrong decision. These vectors must be carefully studied especially in comparison with adjacent vectors to see if there is an identifiable cause for the weak or wrong decision. Perhaps the occupant was on the borderline of the keep out zone and strayed into the keep out zone during a particular data collection event. For this reason, it is desirable to photograph each setup simultaneous with the collection of the data. This can be done using one or more cameras mounted in positions where they can have a good view of the seat occupancy. Sometimes several cameras are necessary to minimize the effects of blockage by a newspaper, for example. Having the photographic record of the data setup is also useful when similar results are obtained when the vehicle is subjected to road testing. During road testing, one or more cameras should also be present and the test engineer is required to initiate data collection whenever the system does not provide the correct response. The vector and the photograph of this real world test can later be compared to similar setups in the laboratory to see whether there is data that was missed in deriving the matrix of vehicle setups for training the vehicle.

12. Automation. When collecting data in the vehicle it is desirable to automate the motion of the vehicle seat, seatback, windows, visors etc. in this manner the positions of these items can be controlled and distributed as desired by the system designer. This minimizes the possibility of taking too much data at one configuration and thereby unbalancing the network.

13. Automatic setup parameter recording. To achieve an accurate data set, the key parameters of the setup should be recorded automatically. These include the temperatures at various positions inside the vehicle, the position of the vehicle seat, and seatback, the position of the headrest, visor and windows and, where possible, the position of the vehicle occupants. The automatic recordation of these parameters minimizes the effects of human errors.

14. Laser Pointers. During the initial data collection with full horns mounted on the surface of the passenger compartment, care must the exercised so that the transducers are not accidentally moved during the data collection process. In order to check for this possibility, a small laser diode is incorporated into each transducer holder. The laser is aimed so that it illuminates some other surface of the passenger compartment at a known location. Prior to each data taking session, each of the transducer aiming points is checked.

15. Multi-frequency transducer placement. When data is collected for dynamic out-of-position, each of the ultrasonic transducers must operate at a different frequency so that all transducers can transmit simultaneously. By this method, data can be collected every 10 milliseconds, which is sufficiently fast to approximately track the motion of an occupant during pre-crash braking prior to an impact. A problem arises in the spacing of the frequencies between the different transducers. If the spacing is too close, it becomes very difficult to separate the signals from different transducers and it also affects the sampling rate of the transducer data and thus the resolution of the transducers. If an ultrasonic transducer operates at a frequency much below about 35 kHz, it can be sensed by dogs and other animals. If the transducer operates at a frequency much above 70 kHz, it is very difficult to make the open type of ultrasonic transducer, which produces the highest sound pressure. If the multiple frequency system is used for both the driver and passenger-side, as many as eight separate frequencies are required. In order to find eight frequencies between 35 and 70 kHz, a frequency spacing of 5 kHz is required. In order to use conventional electronic filters and to provide sufficient spacing to permit the desired resolution at the keep out zone border, a 10 kHz spacing is desired. These incompatible requirements can be solved through a careful, judicious placement of the transducers such that transducers that are within 5 kHz of each other are placed such that there is no direct path between the transducers and any indirect path is sufficiently long so that it can be filtered temporally. An example of such an arrangement is shown in FIG. 36. For this example, the transducers operate at the following frequencies A 65 kHz, B 55 kHz, C 35 kHz, D 45 kHz, E 50 kHz, F 40 kHz, G 60 kHz, H 70 kHz. Actually, other arrangements adhering to the principle described above would also work.

16. Use of a PC in data collection. When collecting data for the training, independent, and validation databases, it is frequently desirable to test the data using various screening techniques and to display the data on a monitor. Thus, during data collection the process is usually monitored using a desktop PC for data taken in the laboratory and a laptop PC for data taken on the road.

17. Use of referencing markers and gages. In addition to and sometimes as a substitution for, the automatic recording of the positions of the seats, seatbacks, windows etc. as described above, a variety of visual markings and gages are frequently used. This includes markings to show the angular position of the seatback, the location of the seat on the seat track, the degree of openness of the window, etc. Also in those cases where automatic tracking of the occupant is not implemented, visual markings are placed such that a technician can observe that the test occupant remains within the required zone for the particular data taking exercise. Sometimes, a laser diode is used to create a visual line in the space that represents the boundary of the keep out zone or other desired zone boundary.

18. Subtracting out data that represents reflections from known seat parts or other vehicle components. This is particularly useful if the seat track and seatback recline positions are known.

19. Improved identification and tracking can sometimes be obtained if the object can be centered or otherwise located in a particular part of the neural network in a manner similar to the way the human eye centers an object to be examined in the center of its field of view.

20. Continuous tracking of the object in place of a zone-based system also improves the operation of the pattern recognition system since discontinuities are frequently difficult for the pattern recognition system such as a neural network to handle. In this case, the location of the occupant relative to the airbag cover, for example, would be determined and then a calculation as to what zone the object is located in can be determined and the airbag deployment decision made (suppression, depowered, delayed, deployment). This also permits a different suppression zone to be used for different sized occupants further improving the matching of the airbag deployment to the occupant.

It is important to realize that the adaptation process described herein applies to any combination of transducers that provide information about the vehicle occupancy. These include weight sensors, capacitive sensors; electric field sensors, inductive sensors, moisture sensors, chemical sensors, ultrasonic, optic, infrared, radar among others. The adaptation process begins with a selection of candidate transducers for a particular vehicle model. This selection is based on such considerations as cost, alternate uses of the system other than occupant sensing, vehicle interior passenger compartment geometry, desired accuracy and reliability, vehicle aesthetics, vehicle manufacturer preferences, and others. Once a candidate set of transducers has been chosen, these transducers are mounted in the test vehicle according to the teachings of this invention. The vehicle is then subjected to an extensive data collection process wherein various objects are placed in the vehicle at various locations as described below and an initial data set is collected. A pattern recognition system is then developed using the acquired data and an accuracy assessment is made. Further studies are made to determine which, if any, of the transducers can be eliminated from the design. In general, the design process begins with a surplus of sensors plus an objective as to how many sensors are to be in the final vehicle installation. The adaptation process can determine which of the transducers are most important and which are least important and the least important transducers can be eliminated to reduce system cost and complexity.

The process for adapting an ultrasonic system to a vehicle will now be described. A more detailed list of steps is provided in Appendix 2. Although the pure ultrasonic system is described here, a similar or analogous set of steps applies when other technologies such as weight and optical (scanning or imager) or other electromagnetic wave or electric field systems such as capacitance and field monitoring systems are used. This description is thus provided to be exemplary and not limiting:

1. Select transducer, horn and grill designs to fit the vehicle. At this stage, usually full horns are used which are mounted so that they project into the passenger compartment. No attempt is made at this time to achieve an esthetic matching of the transducers to the vehicle surfaces. An estimate of the desired transducer fields is made at this time either from measurements in the vehicle directly or from CAD drawings.

2. Make polar plots of the transducer sonic fields. Transducers and candidate horns and grills are assembled and tested to confirm that the desired field angles have been achieved. This frequently requires some adjustment of the transducers in the horn and of the grill. A properly designed grill for ultrasonic systems can perform a similar function as a lens for optical systems.

3. Check to see that the fields cover the required volumes of the vehicle passenger compartment and do not impinge on adjacent flat surfaces that may cause multipath effects. Redesign horns and grills if necessary.

4. Install transducers into vehicle.

5. Map transducer fields in the vehicle and check for multipath effects and proper coverage.

6. Adjust transducer aim and re-map fields if necessary.

7. Install daily calibration fixture and take standard setup data.

8. Acquire 50,000 to 100,000 vectors

9. Adjust vectors for volume considerations by removing some initial data points if cross talk or ringing is present and some final points to keep data in the desired passenger compartment volume.

10. Normalize vectors.

11. Run neural network algorithm generating software to create algorithm for vehicle installation.

12. Check the accuracy of the algorithm. If not sufficiently accurate collect more data where necessary and retrain. If still not sufficiently accurate, add additional transducers to cover holes.

13. When sufficient accuracy is attained, proceed to collect ~500,000 training vectors varying:

Occupancy (see Appendices 1 and 3):
Occupant size, position (zones), clothing etc
Child seat type, size, position etc.
Empty seat
Vehicle configuration:
Seat position
Window position
Visor and armrest position
Presence of other occupants in adjoining seat or rear seat
Temperature
Temperature gradient—stable
Temperature turbulence—heater and air conditioner
Wind turbulence—High speed travel with windows open, top down etc 14. Collect ~100,000 vectors of Independent data using other combinations of the above 15. Collect ~50,000 vectors of "real world data" to represent the acceptance criteria and more closely represent the actual seated state probabilities in the real world.

16. Train network and create an algorithm using the training vectors and the Independent data vectors.

17. Validate the algorithm using the real world vectors.

18. Install algorithm into the vehicle and test.

19. Decide on post processing methodology to remove final holes (areas of inaccuracy) in system 20. Implement post-processing methods into the algorithm 21. Final test. The process up until step 13 involves the use of transducers with full horns mounted on the surfaces of the interior passenger compartment. At some point, the actual transducers which are to be used in the final vehicle must be substituted for the trial transducers. This is either done prior to step 13 or at this step. This process involves designing transducer holders that blend with the visual surfaces of the passenger compartment so that they can be covered with a properly designed grill that helps control the field and also serves to retain the esthetic quality of the interior. This is usually a lengthy process and involves several consultations with the customer. Usually, therefore, the steps from 13 through 20 are repeated at this point after the final transducer and holder design has been selected. The initial data taken with full horns gives a measure of the best system that can be made to operate in the vehicle. Some degradation in performance is expected when the aesthetic horns and grills are substituted for the full horns. By conducting two complete data collection cycles, an accurate measure of this accuracy reduction can be obtained.

22. Up until this point, the best single neural network algorithm has been developed. The final step is to implement the principles of a combination neural network in order to remove some remaining error sources such as bad data and to further improve the accuracy of the system. It has been found that the implementation of combination neural networks can reduce the remaining errors by up to 50 percent. A combination neural network CAD optimization program provided by International Scientific Research Inc. can now be used to derive the neural network architecture. Briefly, the operator lays out a combination neural network involving many different neural networks arranged in parallel and in series and with appropriate feedbacks which the operator believes could be important. The software then optimizes each neural network and also provides an indication of the value of the network. The operator can then selectively eliminate those networks with little or no value and retrain the system. Through this combination of pruning, retraining and optimizing the final candidate combination neural network results.

23. Ship to customers to be used in production vehicles.

24. Collect additional real world validation data for continuous improvement.

Figure 37:
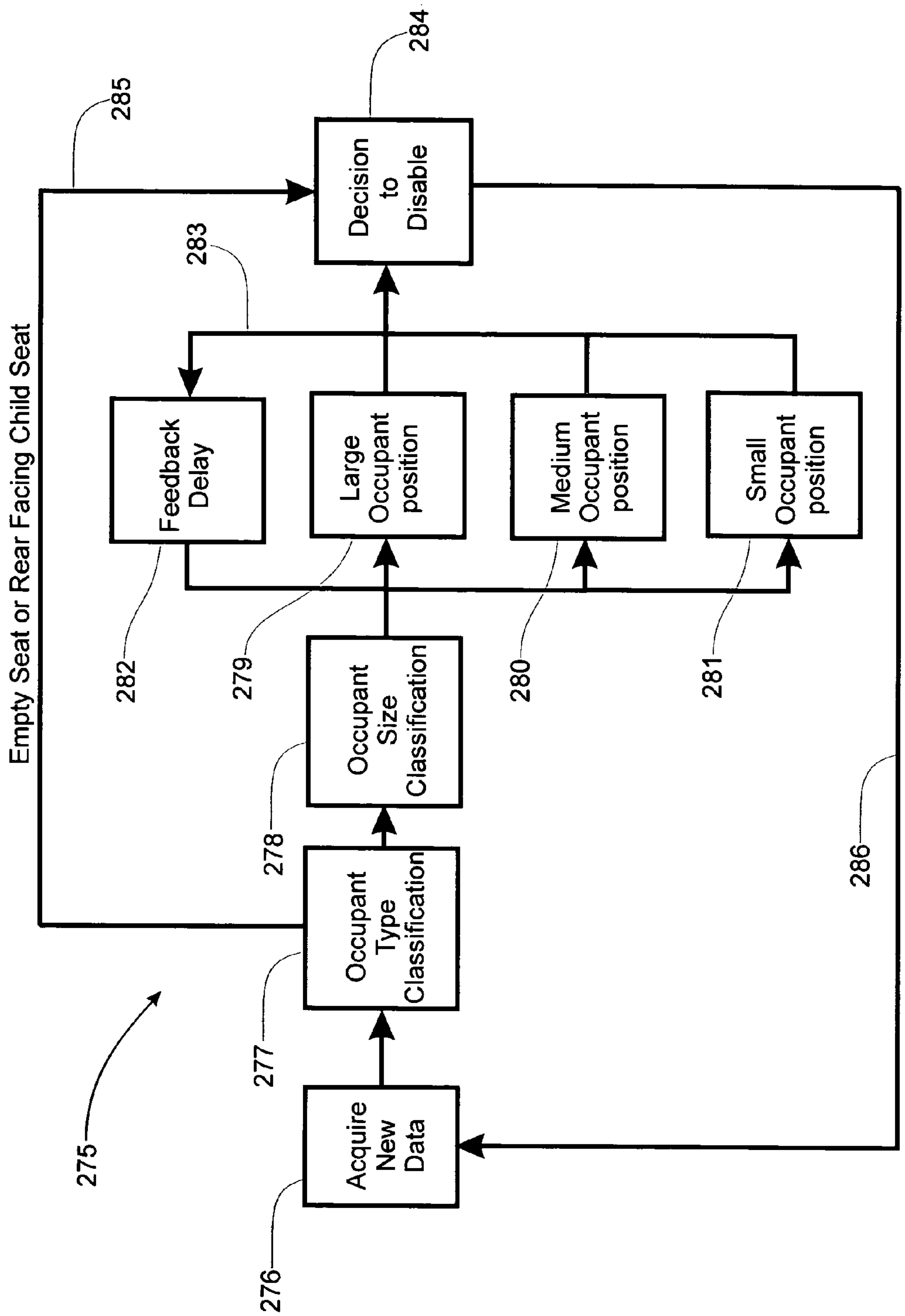
FIG. 37 is a schematic illustrating a combination neural network system.

More detail on the operation of the transducers and control circuitry as well as the neural network is provided in the above referenced patents and patent applications and is incorporated herein as if the entire text of the same were reproduced here. One particular example of a successful neural network for the two transducer case had 78 input nodes, 6 hidden nodes and one output node and for the four transducer case had 176 input nodes 20 hidden layer nodes on hidden layer one, 7 hidden layer nodes on hidden layer 2 and one output node. The weights of the network were determined by supervised training using the back propagation method as described in the above referenced patents and patent applications and in more detail in the references cited therein. Naturally other neural network architectures are possible including RCE, Logicon Projection, Stochastic, cellular, or support vector machine, etc. An example of a combination neural network system is shown in FIG. 37. Any of the network architectures mention here can be used for any of the boxes in FIG. 37.

Finally, the system is trained and tested with situations representative of the manufacturing and installation tolerances that occur during the production and delivery of the vehicle as well as usage and deterioration effects. Thus, for example, the system is tested with the transducer mounting positions shifted by up to one inch in any direction and rotated by up to 5 degrees, with a simulated accumulation of dirt and other variations. This tolerance to vehicle variation also sometimes permits the installation of the system onto a different but similar model vehicle with, in many cases, only minimal retraining of the system.

3. Mounting Locations for and Quantity of Transducers

Ultrasonic transducers are relatively good at measuring the distance along a radius to a reflective object. An optical array, to be discussed now, on the other hand, can get accurate measurements in two dimensions, the lateral and vertical dimensions relative to the transducer. Assuming the optical array has dimensions of 100 by 100 as compared to an ultrasonic sensor that has a single dimension of 100, an optical array can therefore provide 100 times more information than the ultrasonic sensor. Most importantly, this vastly greater amount of information does not cost significantly more to obtain than the information from the ultrasonic sensor.

As illustrated in FIGS. 8A-8D, the optical sensors are typically located at the positions where the desired information is available with the greatest resolution. These positions are typically in the center front and center rear of the occupancy seat and at the center on each side and top. This is in contrast to the optimum location for ultrasonic sensors, which are the corners of such a rectangle that outlines the seated volume. Naturally, styling and other constraints often prevent mounting of transducers at the optimum locations.

Figure 8B:
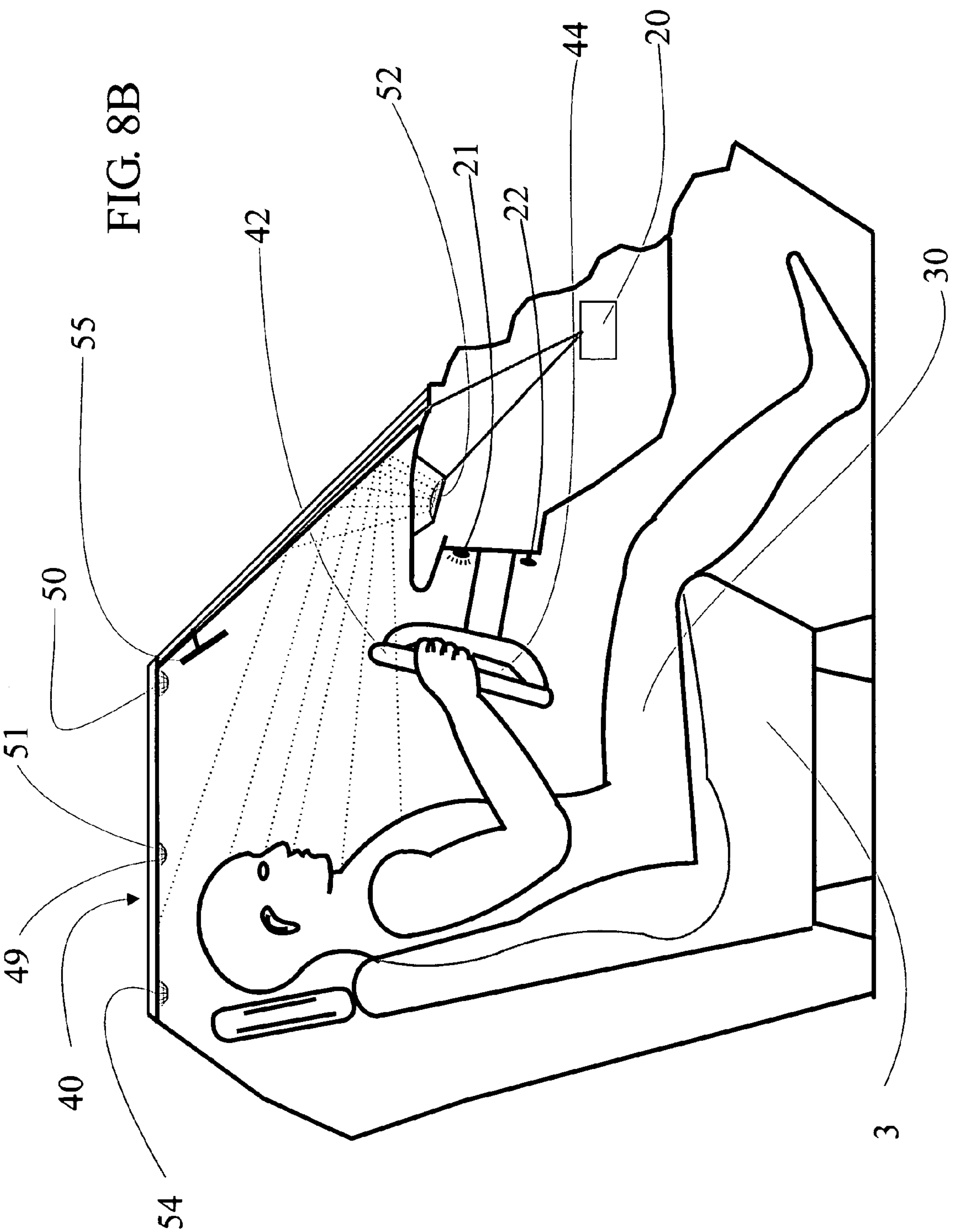
FIG. 8B is a view as in FIG. 8A illustrating the wave pattern from an optical system using an infrared light source and a CCD or CMOS array receiver using the windshield as a reflection surface and showing schematically the interface between the vehicle interior monitoring system of this invention and an instrument panel mounted inattentiveness warning light or buzzer and reset button.

An optical infrared transmitter and receiver assembly is shown generally at 52 in FIG. 8B and is mounted onto the instrument panel facing the windshield. Assembly 52 can either be recessed below the upper face of the instrument panel or mounted onto the upper face of the instrument panel. Assembly 52, shown enlarged, comprises a source of infrared radiation, or another form of electromagnetic radiation, and a CCD, CMOS or other appropriate arrays of typically 160 pixels by 160 pixels. In this embodiment, the windshield is used to reflect the illumination light provided by the infrared radiation toward the objects in the passenger compartment and also reflect the light being reflected back by the objects in the passenger compartment, in a manner similar to the "heads-up" display which is now being offered on several automobile models. The "heads-up" display, of course, is currently used only to display information to the driver and is not used to reflect light from the driver to a receiver. Once again, unless one of the distance measuring systems as described below is used, this system alone cannot be used to determine distances from the objects to the sensor. Its main purpose is object identification and monitoring. Depending on the application, separate systems can be used for the driver and for the passenger. In some cases, the cameras located in the instrument panel which receive light reflected off of the windshield can be co-located with multiple lenses whereby the respective lenses aimed at the driver and passenger seats respectively.

Assembly 52 is actually about two centimeters or less in diameter and is shown greatly enlarged in FIG. 8B. Also, the reflection area on the windshield is considerably smaller than illustrated and special provisions are made to assure that this area of the windshield is flat and reflective as is done generally when heads-up displays are used. For cases where there is some curvature in the windshield, it can be at least partially compensated for by the CCD optics.

Transducers 23-25 are illustrated mounted onto the A-pillar of the vehicle, however, since these transducers are quite small, typically less than 2 cm on a side, they could alternately be mounted onto the windshield itself, or other convenient location which provides a clear view of the portion of the passenger compartment being monitored. Other preferred mounting locations include the headliner above and also the side of the seat. Some imagers are now being made that are less than 1 cm on a side.

Figure 38:
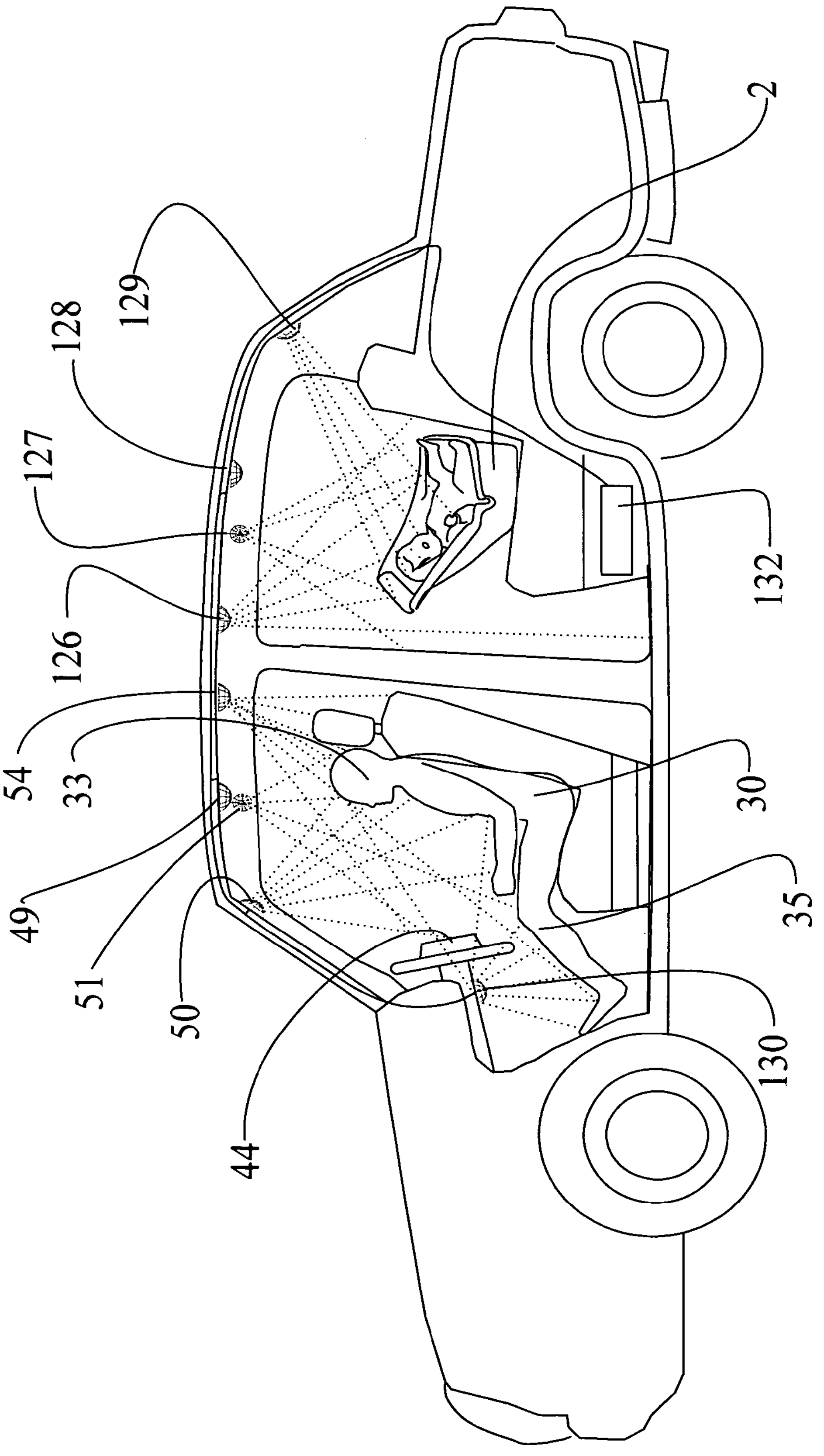
FIG. 38 is a side view, with certain portions removed or cut away, of a portion of the passenger compartment of a vehicle showing preferred mounting locations of optical interior vehicle monitoring sensors

FIG. 38 is a side view, with certain portions removed or cut away, of a portion of the passenger compartment of a vehicle showing preferred mounting locations of optical interior vehicle monitoring sensors (transmitter/receiver assemblies or transducers) 49,50,51,54,126, 127, 128, 129, and 130. Each of these sensors is illustrated as having a lens and is shown enlarged in size for clarity. In a typical actual device, the diameter of the lens is less than 2 cm and it protrudes from the mounting surface by less than 1 cm. Specially designed sensors can be considerably smaller. This small size renders these devices almost unnoticeable by vehicle occupants. Since these sensors are optical, it is important that the lens surface remains relatively clean. Control circuitry 132, which is coupled to each transducer, contains a self-diagnostic feature where the image returned by a transducer is compared with a stored image and the existence of certain key features is verified. If a receiver fails this test, a warning is displayed to the driver which indicates that cleaning of the lens surface is required.

The technology illustrated in FIG. 38 can be used for numerous purposes relating to monitoring of the space in the passenger compartment behind the driver including: (i) the determination of the presence and position of objects in the rear seat(s), (ii) the determination of the presence, position and orientation of child seats 2 in the rear seat, (iii) the monitoring of the rear of an occupant's head 33, (iv) the monitoring of the position of occupant 30, (v) the monitoring of the position of the occupant's knees 35, (vi) the monitoring of the occupant's position relative to the airbag 44, (vii) the measurement of the occupant's height, as well as other monitoring functions as described elsewhere herein.

Information relating to the space behind the driver can be obtained by processing the data obtained by the sensors 126,126,128 and 129, which data would be in the form of images if optical sensors are used as in the preferred embodiment. Such information can be the presence of a particular occupying item or occupant, e.g., a rear facing child seat 2 as shown in FIG. 38, as well as the location or position of occupying items. Additional information obtained by the optical sensors can include an identification of the occupying item. The information obtained by the control circuitry by processing the information from sensors 126,126,128 and 129 may be used to affect any other system or component in the vehicle in a similar manner as the information from the sensors which monitor the front seat is used as described herein, such as the airbag system. Processing of the images obtained by the sensors to determine the presence, position and/or identification of any occupants or occupying item can be effected using a pattern recognition algorithm in any of the ways discussed herein, e.g., a trained neural network. For example, such processing can result in affecting a component or system in the front seat such as a display that allows the operator to monitor what is happening in the rear seat without having to turn his or her head.

In the preferred implementation, as shown in FIGS. 8A-8E, four transducer assemblies are positioned around the seat to be monitored, each can comprise an LED with a diverging lens and a CMOS array. Although illustrated together, the illuminating source in many cases will not be co-located with the receiving array. The LED emits a controlled angle, 120° for example, diverging cone of infrared radiation that illuminates the occupant from both sides and from the front and rear. This angle is not to be confused with the field angle used in ultrasonic systems. With ultrasound, extreme care is required to control the field of the ultrasonic waves so that they will not create multipath effects and add noise to the system. With infrared, there is no reason, in the implementation now being described, other than to make the most efficient use of the infrared energy, why the entire vehicle cannot be flooded with infrared energy either from many small sources or from a few bright ones.

The image from each array is used to capture two dimensions of occupant position information, thus, the array of assembly 50 positioned on the windshield header, which is approximately 25% of the way laterally across the headliner in front of the driver, provides a both vertical and transverse information on the location of the driver. A similar view from the rear is obtained from the array of assembly 54 positioned behind the driver on the roof of the vehicle and above the seatback potion of the seat 72. As such, assembly 54 also provides both vertical and transverse information on the location of the driver. Finally, arrays of assemblies 51 and 49 provide both vertical and longitudinal driver location information. Another preferred location is the headliner centered directly above the seat of interest. The position of the assemblies 49-52, and 54 may differ from that shown in the drawings. In the invention, in order that the information from two or more of the assemblies 49-52, and 54 may provide a three-dimensional image of the occupant, or portion of the passenger compartment, the assemblies generally should not be arranged side-by-side. A side-by-side arrangement as used in several prior art references discussed above, will provide two essentially identical views with the difference being a lateral shift. This does not enable a complete three-dimensional view of the occupant.

One important point concerns the location and number of optical assemblies. It is possible to use fewer than four such assemblies with a possible resulting loss in accuracy. The number of four was chosen so that either a forward or rear assembly or either of the side assemblies can be blocked by a newspaper, for example, without seriously degrading the performance of the system. Since drivers rarely are reading newspapers while driving, fewer than four arrays are usually adequate for the driver side. In fact, one is frequently sufficient. One camera is also usually sufficient for the passenger side if the goal of the system is classification only or if camera blockage is tolerated for occupant tracking.

The particular locations of the optical assemblies were chosen to give the most accurate information as to the locations of the occupant. This is based on an understanding of what information can be best obtained from a visual image. There is a natural tendency on the part of humans to try to gauge distance from the optical sensors directly. This, as can be seen above, is at best complicated involving focusing systems, stereographic systems, multiple arrays and triangulation, time of flight measurement, etc. What is not intuitive to humans is to not try to obtain this distance directly from apparatus or techniques associated with the mounting location. Whereas ultrasound is quite good for measuring distances from the transducer (the z-axis), optical systems are better at measuring distances in the vertical and lateral directions (the x and y-axes). Since the precise locations of the optical transducers are known, that is, the geometry of the transducer locations is known relative to the vehicle, there is no need to try to determine the displacement of an object of interest from the transducer (the z-axis) directly. This can more easily done indirectly by another transducer. That is, the vehicle z-axis to one transducer is the camera x-axis to another.

Another preferred location of a transmitter/receiver for use with airbags is shown at 54 in FIG. 5. In this case, the device is attached to the steering wheel and gives an accurate determination of the distance of the driver's chest from the airbag module. This implementation would generally be used with another device such as 50 at another location.

Figure 13:
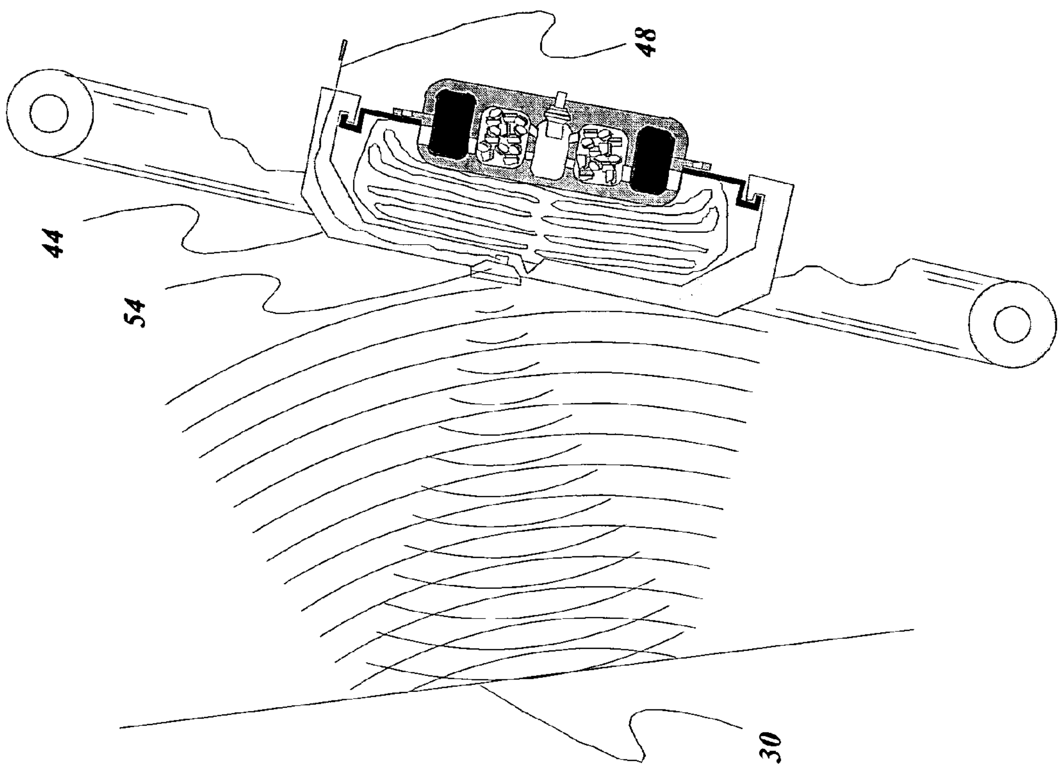
FIG. 13 is a cross section view of a steering wheel and airbag module assembly showing a preferred mounting location of an ultrasonic wave generator and receiver.
Figure 14:
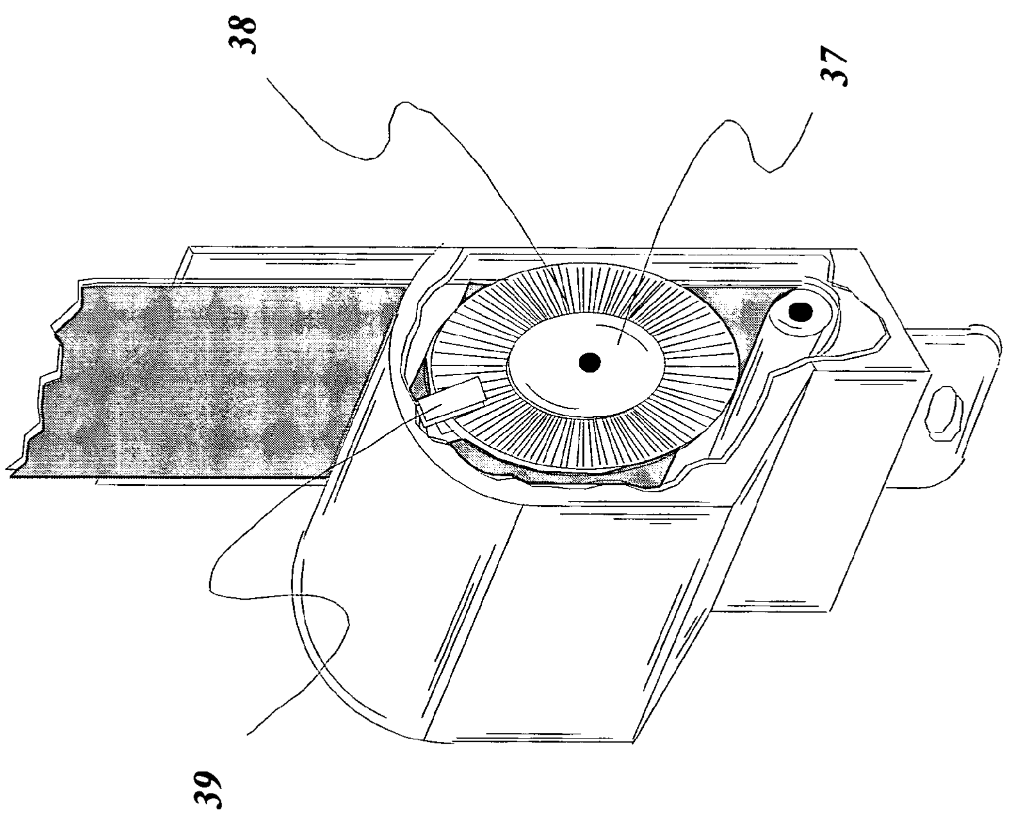
FIG. 14 is a partial cutaway view of a seatbelt retractor with a spool out sensor utilizing a shaft encoder.

A transmitter/receiver 54 shown mounted on the cover of the airbag module 44 is shown in FIG. 13. The transmitter/receiver 54 is attached to various electronic circuitry, not shown, by means of wire cable 48. When an airbag 44 deploys, the cover begins moving toward the driver. If the driver is in close proximity to this cover during the early stages of deployment, the driver can be seriously injured or even killed. It is important, therefore, to sense the proximity of the driver to the cover and if he or she gets too close, to disable deployment of the airbag 44. An accurate method of obtaining this information would be to place the distance-measuring device 54 onto the airbag cover as shown in FIG. 13. Appropriate electronic circuitry can be used to not only determine the actual distance of the driver from the cover but also his velocity as discussed above. In this manner, a determination can be made as to where the driver is likely to be at the time of deployment of the airbag 44. This information can be used most importantly to prevent deployment but also to modify the rate of airbag deployment. In FIG. 5, for one implementation, ultrasonic waves are transmitted by a transmitter/receiver 54 toward the chest of the driver 30. The reflected waves are then received by the same transmitter/receiver 54.

One problem of the system using a sensor 54 in FIG. 5 or sensor 54 as shown in FIG. 13 is that a driver may have inadvertently placed his hand over the transmitter/receiver 54, thus defeating the operation of the device. A second confirming transmitter/receiver 50 is therefore placed at some other convenient position such as on the roof or headliner of the passenger compartment as shown in FIG. 5. This transmitter/receiver operates in a manner similar to 54.

The applications described herein have been illustrated using the driver of the vehicle. Naturally the same systems of determining the position of the occupant relative to the airbag apply to the passenger, sometimes requiring minor modifications. It is likely that the sensor required triggering time based on the position of the occupant will be different for the driver than for the passenger. Current systems are based primarily on the driver with the result that the probability of injury to the passenger is necessarily increased either by deploying the airbag too late or by failing to deploy the airbag when the position of the driver would not warrant it but the passenger's position would. With the use of occupant position sensors for both the passenger and driver, the airbag system can be individually optimized for each occupant and result in further significant injury reduction. In particular, either the driver or passenger system can be disabled if either the driver or passenger is out of position.

There is almost always a driver present in vehicles that are involved in accidents where an airbag is needed. Only about 30% of these vehicles, however, have a passenger. If the passenger is not present, there is usually no need to deploy the passenger side airbag. The occupant position sensor, when used for the passenger side with proper pattern recognition circuitry, can also ascertain whether or not the seat is occupied, and if not, can disable the deployment of the passenger side airbag and thereby save the cost of its replacement. A sophisticated pattern recognition system could even distinguish between an occupant and a bag of groceries, for example. Finally, there has been much written about the out of position child who is standing or otherwise positioned adjacent to the airbag, perhaps due to pre-crash braking. Naturally, the occupant position sensor described herein can prevent the deployment of the airbag in this situation.

3.1 Single Camera, Dual Camera with Single Light Source

Many automobile companies are opting to satisfy the requirements of FMVSS-208 by using a weight only system such as the bladder or strain gage systems disclosed here. Such a system provides an elementary measure of the weight of the occupying object but does not give a reliable indication of its position. It can also be easily confused by any object that weighs 60 or more pounds and that is interpreted as an adult. Weight only systems are also static systems in that due to vehicle dynamics that frequently accompany a pre crash braking event they are unable to track the position of the occupant. The load from seatbelts can confuse the system and therefore a special additional sensor must be used to measure seatbelt tension. In some systems, the device must be calibrated for each vehicle and there is some concern as to whether this calibration will be proper for the life on the vehicle.

A single camera can frequently provide considerably more information than a weight only system without the disadvantages of weight sensors and do so at a similar cost. Such a single camera in its simplest installation can categorize the occupancy state of the vehicle and determine whether the airbag should be suppressed due to an empty seat or the presence of a child of a size that corresponds to one weighing less than 60 pounds. Of course a single camera can also easily do considerably more by providing a static out-of-position indication and, with the incorporation of a faster processor, dynamic out-of-position determination can also be provided. Thus, especially with the costs of microprocessors continuing to drop, a single camera system can easily provide considerably more functionality as a weight only system and yet stay in the same price range.

A principal drawback of a single camera system is that it can be blocked by the hand of an occupant or by a newspaper, for example. This is a rare event since the preferred mounting location for the camera is typically high in the vehicle such as on the headliner. Also, it is considerably less likely that the occupant will always be reading a newspaper, for example, and if he or she is not reading it when the system is first started up, or at any other time during the trip, the camera system will still get an opportunity to see the occupant when he or she is not being blocked and make the proper categorization. The ability of the system to track the occupant will be impaired but the system can assume that the occupant has not moved toward the airbag while reading the newspaper and thus the initial position of the occupant can be retained and used for suppression determination. Finally, the fact that the camera is blocked can be determined and the driver made aware of this fact in much the same manner that a seatbelt light notifies the driver that the passenger is not wearing his or her seatbelt.

The accuracy of a single camera system can be above 99% which significantly exceeds the accuracy of weight only systems. Nevertheless, some automobile manufacturers desire even greater accuracy and therefore opt for the addition of a second camera. Such a camera is usually placed on the opposite side of the occupant as the first camera. The first camera may be placed on or near the dome light, for example, and the second camera can be on the headliner above the side door. A dual camera system such as this can operate more accurately in bright daylight situations where the window area needs to be ignored in the view of the camera that is mounted near the dome.

Sometimes, in a dual camera system, only a single light source is used. This provides a known shadow pattern for the second camera and helps to accentuate the edges of the occupying item rendering classification easier. Any of the forms of structured light can also be used and through these and other techniques the corresponding points in the two images can more easily be determined thus providing a three dimensional model of the occupant.

As a result, the current assignee has developed a low cost single camera system. The occupant position sensor system uses a CMOS camera in conjunction with pattern recognition algorithms for the discrimination of out-of-position occupants and rear facing child safety seats. A single imager, located strategically within the occupant compartment, is coupled with an infrared LED that emits unfocused, wide-beam pulses toward the passenger volume. These pulses, which reflect off of objects in the passenger seat and are captured by the camera, contain information for classification and location determination in approximately 10 msec. The decision algorithm processes the returned information using a uniquely trained neural network. The logic of the neural network was developed through extensive in-vehicle training with thousands of realistic occupant size and position scenarios. Although the optical occupant position sensor can be used in conjunction with other technologies, (such as weight sensing, seat belt sensing, crash severity sensing, etc.) it is a stand-alone system meeting the requirements of FMVSS-208. This device will be discussed in detail below.

3.2 Location of the Transducers

Any of the transducers discussed herein such as an active pixel or other camera can be arranged in various locations in the vehicle including in a headliner, roof, ceiling, rear view mirror, an A-pillar, a B-pillar and a C-pillar. Images of the front seat area or the rear seat area can be obtained by proper placement and orientation of the transducers such as cameras. The rear view mirror can be a good location for a camera particularly if it is attached to the portion of the mirror support that does not move when the occupant is adjusting the mirror. Cameras at this location can get a good view of the driver, passenger as well as the environment surrounding the vehicle and particularly in the front of the vehicle. It is an ideal location for automatic dimming headlight cameras.

3.3 Color Cameras—Multispectral Imaging

All occupant sensing systems developed to date as reported in the patent and non-patent literature have been based on a single frequency. As discussed herein, the use of multiple frequencies with ultrasound makes it possible to change a static system into a dynamic system allowing the occupant to be tracked during pre crash braking, for example. Mutlispectral imaging can also provide advantages for camera or other optical based systems. The color of the skin or an occupant is a reliable measure of the presence of an occupant and also renders the segmentation of the image to be more easily accomplished. Thus the face can be more easily separated from the rest of the image simplifying the determination of the location of the eyes of the driver, for example. This is particularly true for various frequencies of passive and active infrared. Also, as discussed in more detail below, life forms react to radiation of different frequencies differently than non life forms again making the determination of the presence of a life form easier. Finally, there is just considerably more information in a color or multispectral image than in a monochromic image. This additional information improves the accuracy of the identification and tracking process and thus of the system. In many cases this accuracy improvement is so small that the added cost is not justified but as costs of electronics and cameras continue to drop this equation is changing and it is expected that multispectral imaging will prevail.

For nighttime illumination is frequently done using infrared. When multispectral imaging is used the designer has the choice of reverting to IR only for night time or using a multispectral LED and a very sensitive camera so that the flickering light does not annoy the driver. Alternately, a sensitive camera along with a continuous low lever of illumination can be used.

3.4 High Dynamic Range Cameras

An active pixel camera is a special camera which has the ability to adjust the sensitivity of each pixel of the camera similar to the manner in which an iris adjusts the sensitivity of a camera. Thus, the active pixel camera automatically adjusts to the incident light on a pixel-by-pixel basis. An active pixel camera differs from an active infrared sensor in that an active infrared sensor, such as of the type envisioned by Mattes et al. (discussed above), is generally a single pixel sensor that measures the reflection of infrared light from an object. In some cases, as in the HDRC camera, the output of each pixel is a logarithm of the incident light thus giving a high dynamic range to the camera. This is similar to the technique used to suppress the effects of thermal gradient distortion of ultrasonic signals as described in the above cross-referenced patents. Thus if the incident radiation changes in magnitude by 1,000,000, for example, the output of the pixel may change by a factor of only 6.

A dynamic pixel camera is a camera having a plurality of pixels and which provides the ability to pick and choose which pixels should be observed, as long as they are contiguous.

An HDRC camera is a type of active pixel camera where the dynamic range of each pixel is considerably broader. An active pixel camera manufactured by the Photobit Corporation has a dynamic range of 70 db while an IMS Chips camera, an HDRC camera manufactured by another manufacturer, has a dynamic range of 120 db. Thus, the HDRC camera has a 100,000 times greater range of light sensitivity than the Photobit camera.

The accuracy of the optical occupant sensor is dependent upon the accuracy of the camera. The dynamic range of light within a vehicle can exceed 120 decibels. When a car is driving at night, for example, very little light is available whereas when driving in a bright sunlight, especially in a convertible, the light intensity can overwhelm many cameras. Additionally, the camera must be able to adjust rapidly to changes in light caused by, for example, the emergence of the vehicle from tunnel, or passing by other obstructions such as trees, buildings, other vehicles, etc. which temporarily block the sun and cause a strobing effect at frequencies approaching 1 kHz.

Recently, improvements have been made to CMOS cameras that have significantly increased their dynamic range. New logarithmic high dynamic range technology such as developed by IMS Chips of Stuttgart, Germany, is now available in HDRC (High Dynamic Range CMOS) cameras. This technology provides a 120 dB dynamic intensity response at each pixel in a mono chromatic mode. The technology has a 1 million to one dynamic range at each pixel. This prevents blooming, saturation and flaring normally associated with CMOS and CCD camera technology. This solves a problem that will be encountered in an automobile when going from a dark tunnel into bright sunlight. Such a range would even exceed the 120 dB intensity.

There is also significant infrared radiation from bright sunlight and from incandescent lights within the vehicle. Such situations may even exceed the dynamic range of the HDRC camera and additional filtering may be required. Changing the bias on the receiver array, the use of a mechanical iris, or of electrochromic glass or liquid crystal can provide this filtering on a global basis but not at a pixel level. Filtering can also be used with CCD arrays, but the amount of filtering required is substantially greater than for the HDRC camera. A notch filter can be used to block significant radiation from the sun, for example. This notch filter can be made as a part of the lens through the placement of various coatings onto the lens surface.

Liquid crystals operate rapidly and give as much as a dynamic range of 10,000 to 1 but may create a pixel interference affect. Electrochromic glass operates more slowly but more uniformly thereby eliminating the pixel affect. The pixel effect arises whenever there is one pixel device in front of another. This results in various aliasing, Moire patterns and other ambiguities. One way of avoiding this is to blur the image. Another solution is to use a large number of pixels and combine groups of pixels to form one pixel of information and thereby to blur the edges to eliminate some of the problems with aliasing and Moire patterns. (add SPD)

One straightforward approach is the use of a mechanical iris. Standard cameras already have response times of several tens of milliseconds range. They will switch, for example, in a few frames on a typical video camera (1 frame=0.033 seconds). This is sufficiently fast for categorization but much too slow for dynamic out-of-position tracking.

An important feature of the IMS Chips HDRC camera is that the full dynamic range is available at each pixel. Thus, if there are significant variations in the intensity of light within the vehicle, and thereby from pixel to pixel, such as would happen when sunlight streams and through a window, the camera can automatically adjust and provide the optimum exposure on a pixel by pixel basis. The use of the camera having this characteristic is beneficial to the invention described herein and contributes significantly to system accuracy. CCDs have a rather limited dynamic range due to their inherent linear response and consequently cannot come close to matching the performance of human eyes. A key advantage of the IMS Chips HDRC camera is its logarithmic response which comes closest to matching that of the human eye.

Another approach, which is applicable in some vehicles, is to record an image without the infrared illumination and then a second image with the infrared illumination and to then subtract the first image from the second image. In this manner, illumination caused by natural sources such as sunlight or even from light bulbs within the vehicle can be subtracted out. Naturally, using the logarithmic pixel system of the IMS Chips camera care must be taken to include the logarithmic effect during the subtraction process. For some cases, natural illumination such as from the sun, light bulbs within the vehicle, or radiation emitted by the object itself can be used alone without the addition of a special source of infrared illumination as discussed below.

Other imaging systems such as CCD arrays can also of course be used with this invention. However, the techniques will be quite different since the camera is very likely to saturate when bright light is present and to require the full resolution capability when the light is dim. Generally when practicing this invention the interior of the passenger compartment will be illuminated with infrared radiation.

One novel solution is to form the image in memory by adding up a sequence of very short exposures. The number stored in memory would be the sum of the exposures on a pixel by pixel basis and the problem of saturation disappears since the memory location can be made as floating point numbers. This then permits the maximum dynamic range but requires that the information from all of the pixels by removed at high speed. In some cases each pixel would then be zeroed while in others the charge can be left on the pixel since when saturation occurs the relevant information will already have been obtained.

There are other bright sources of infrared that must be accounted for. These include the sun and any light bulbs that may be present inside the vehicle. This lack of a high dynamic range inherent with the CCD technology requires the use of an iris, fast electronic shutter, liquid crystal, or electrochromic glass filter to be placed between the camera and the scene. Even with these filters however, some saturation will take place with CCD cameras under bright sun or incandescent lamp exposure. This saturation reduces the accuracy of the image and therefore the accuracy of the system. In particular the training regimen that must be practiced with CCD cameras is more severe since all of the saturation cases must be considered since the camera is unable to appropriately adjust. Thus, although CCD cameras can be use, HDRC logarithmic cameras such as manufactured by IMS Chips are preferred. They not only provide a significantly more accurate image but also significantly reduce the amount of training effort and associated data collection that must be undertaken during the development of the neural network algorithm or other computational intelligence system. In some applications, it is possible to use other more deterministic image processing or pattern recognition systems than neural networks.

Another very important feature of the HDRC camera from IMS Chips is that the shutter time is constant at less than 100 ns irrespective of brightness of the scene. The pixel data arrives at constant rate synchronous with the internal imager clock. Random access to each pixel facilitates high-speed intelligent access to any sub-frame (block) size or sub-sampling ratio and a trade-off of frame speed and frame size therefore results. For example, a scene with 128 K pixels per frame can be taken at 120 frames per second, or about 8 milliseconds per frame, whereas a sub-frame can be taken in run at as high as 4000 frames per second with 4 K pixels per frame. This combination allows the maximum resolution for the identification and classification part of the occupant sensor problem while permitting a concentration on those particular pixels which track the head or chest, as described above, for dynamic out-of-position tracking. In fact the random access features of these cameras can be used to track multiple parts of the image simultaneously while ignoring the majority of the image, and do so at very high speed. For example, the head can be tracked simultaneously with the chest by defining two separate sub-frames that need not be connected. This random access pixel capability, therefore, is optimally suited or recognizing and tracking vehicle occupants. It is also suited for monitoring the environment outside of the vehicle for purposes of blind spot detection, collision avoidance and anticipatory sensing. Photobit Corporation of 135 North Los Robles Ave., Suite 700, Pasadena, Calif. 91101 manufactures are camera with some characteristics similar to the IMS Chips camera. Other competitive cameras can be expected to appear on the market.

Photobit refers to their Active Pixel Technology as APS. According to Photobit, in the APS, both the photodetector and readout amplifier are part of each pixel. This allows the integrated charge to be converted into a voltage in the pixel that can then be read out over X-Y wires instead of using a charge domain shift register as in CCDs. This column and row addressability (similar to common DRAM) allows for window of interest readout (windowing) which can be utilized for on chip electronic pan/tilt and zoom. Windowing provides added flexibility in applications, such as disclosed herein, needing image compression, motion detection or target tracking. The APS utilizes intra-pixel amplification in conjunction with both temporal and fixed pattern noise suppression circuitry (i.e. correlated double sampling), which produces exceptional imagery in terms of wide dynamic range (~75 dB) and low noise (~15 e-rms noise floor) with low fixed pattern noise (<0.15% sat). Unlike CCDs, the APS is not prone to column streaking due to blooming pixels. This is because CCDs rely on charge domain shift registers that can leak charge to adjacent pixels when the CCD registers overflows. Thus, bright lights "bloom" and cause unwanted streaks in the image. The active pixel can drive column busses at much greater rates than passive pixel sensors and CCDs. On-chip analog-to-digital conversion (ADC) facilitates driving high speed signals off chip. In addition, digital output is less sensitive to pickup and crosstalk, facilitating computer and digital controller interfacing while increasing system robustness. A high speed APS recently developed for a custom binary output application produced over 8,000 frames per second, at a resolution of 128×128 pixels. It is possible to extend this design to a 1024×1024 array size and achieve greater than 1000 frames per second for machine vision. All of these features are important to many applications of this invention.

These advanced cameras, as represented by the HDRC and the APS cameras, now make it possible to more accurately monitor the environment in the vicinity of the vehicle. Previously, the large dynamic range of environmental light has either blinded the cameras when exposed to bright light or else made them unable to record images when the light level was low. Even the HDRC camera with its 120 dB dynamic range may be marginally sufficient to handle the fluctuations in environmental light that occur. Thus, the addition of a electrochromic, liquid crystal, or other similar filter may be necessary. This is particularly true for cameras such as the Photobit APS camera with its 75 dB dynamic range.

At about 120 frames per second, these cameras are adequate for cases where the relative velocity between vehicles is low. There are many cases, however, where this is not the case and a much higher monitoring rate is required. This occurs for example, in collision avoidance and anticipatory sensor applications. The HDRC camera is optimally suited for handling these cases since the number of pixels that are being monitored can be controlled resulting in a frame rate as high as about 4000 frames per second with a smaller number of pixels.

Another key advantage of the HDRC camera is that it is quite sensitive to infrared radiation in the 0.8 to 1 micron wavelength range. This range is generally beyond visual range for humans permitting this camera to be used with illumination sources that are not visible to the human eye. Naturally, a notch filter is frequently used with the camera to eliminate unwanted wavelengths. These cameras are available from the Institute for Microelectronics (IMS Chips), Allamndring 30*a*, D-70569 Stuttgart, Germany with a variety of resolutions ranging from 512 by 256 to 720 by 576 pixels and can be custom fabricated for the resolution and response time required.

One problem with high dynamic range cameras, particularly those making use of a logarithmic compression is that the edges tend to wash out and the picture loses a lot of contrast. This causes problems for edge detecting algorithms and thus reduces the accuracy of the system. There are a number of other different methods of achieving a high dynamic range without sacrificing contrast. One system by Nayar, as discussed above, takes a picture using adjacent pixels with different radiation blocking filers. Four such pixel types are used allowing Nayar to essentially obtain 4 separate pictures with one snap of the shutter. Software then selects which of the four pixels to use for each part of the image so that the dark areas receive one exposure and somewhat brighter areas another exposure and so on. The brightest pixel receives all of the incident light, the next brightest filters half of the light, the next brightest half again and the dullest pixel half again. Naturally other ratios could be used as could more levels of pixels, e.g. 8 instead of 4. Experiments have shown that this is sufficient to permit a good picture to be taken when bright sunlight is streaming into a dark room. A key advantage of this system is that the full frame rate is available and the disadvantage is that only 25% of the pixels are in fact used to form the image.

Another system drains the charge off of the pixels as the picture is being taken and stored the integrated results in memory. TFA technology lends itself to this implementation. As long as the memory capacity is sufficient the pixel never saturates. An additional approach is to take multiple images at different iris or shutter settings and combine them in mush the same way as with the Nayar method. A still different approach is to take several pictures at a short shutter time or a small iris setting and combine the pictures in a processor or other appropriate device. In this manner, the effective dynamic range of the camera can be extended.

3.5 Fisheye Lens, Pan and Zoom

Figure 8C:
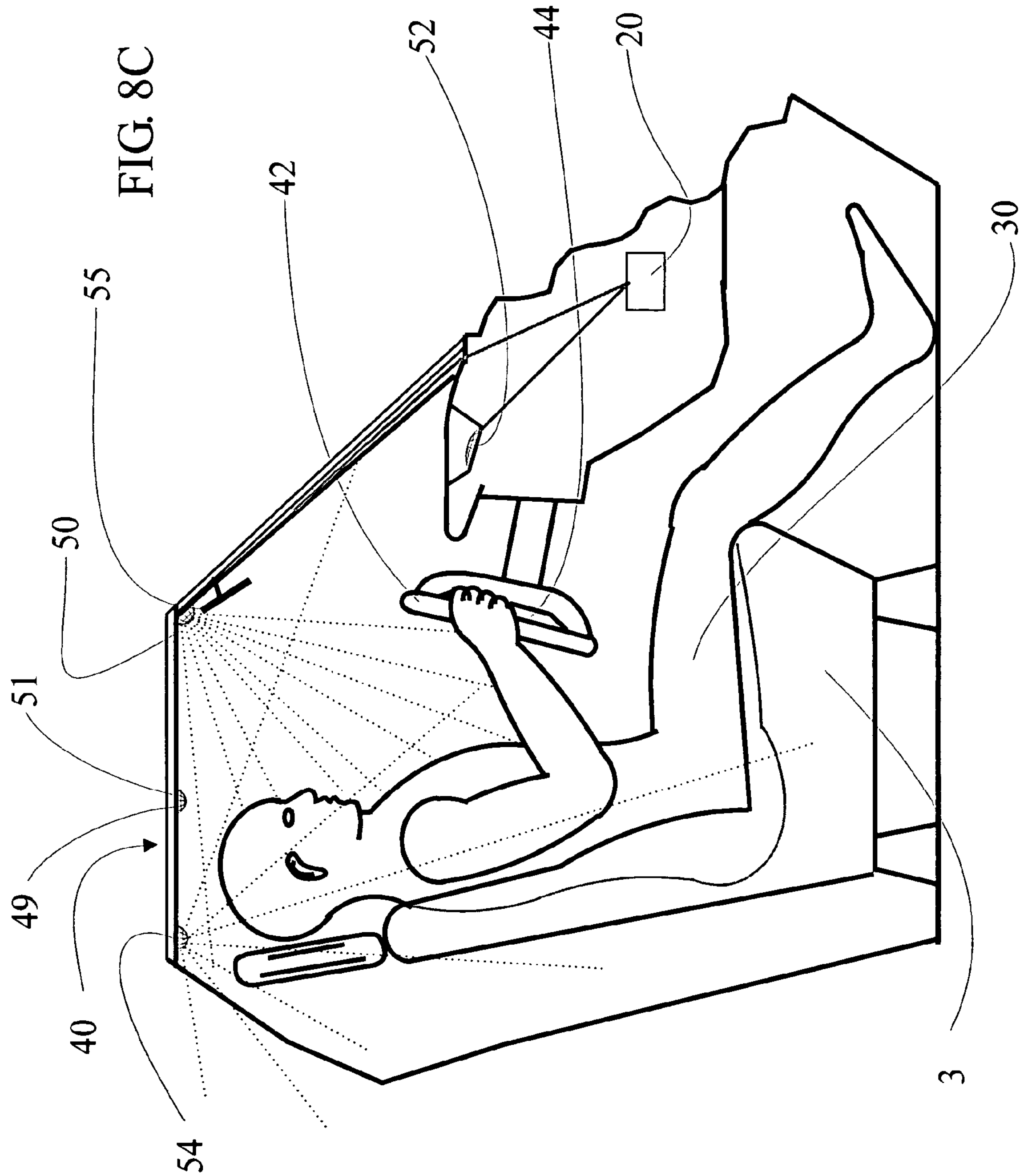
FIG. 8C is a view as in FIG. 8A illustrating the wave pattern from an optical system using an infrared light source and a CCD or CMOS array receiver where the CCD or CMOS array receiver is covered by a lens permitting a wide angle view of the contents of the passenger compartment.
Figure 8D:
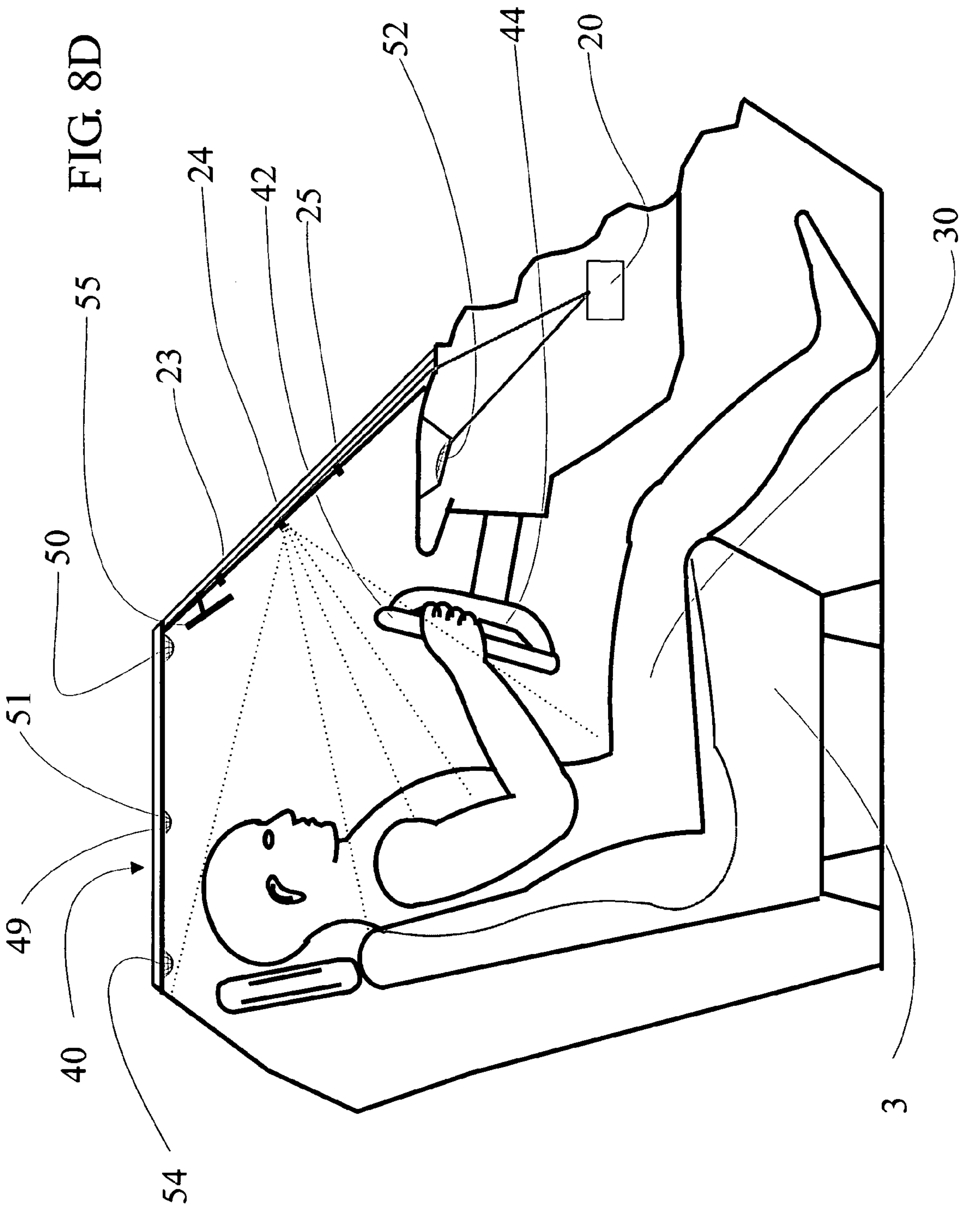
FIG. 8D is a view as in FIG. 8A illustrating the wave pattern from a pair of small CCD or CMOS array receivers and one infrared transmitter where the spacing of the CCD or CMOS arrays permits an accurate measurement of the distance to features on the occupant.
Figure 8E:
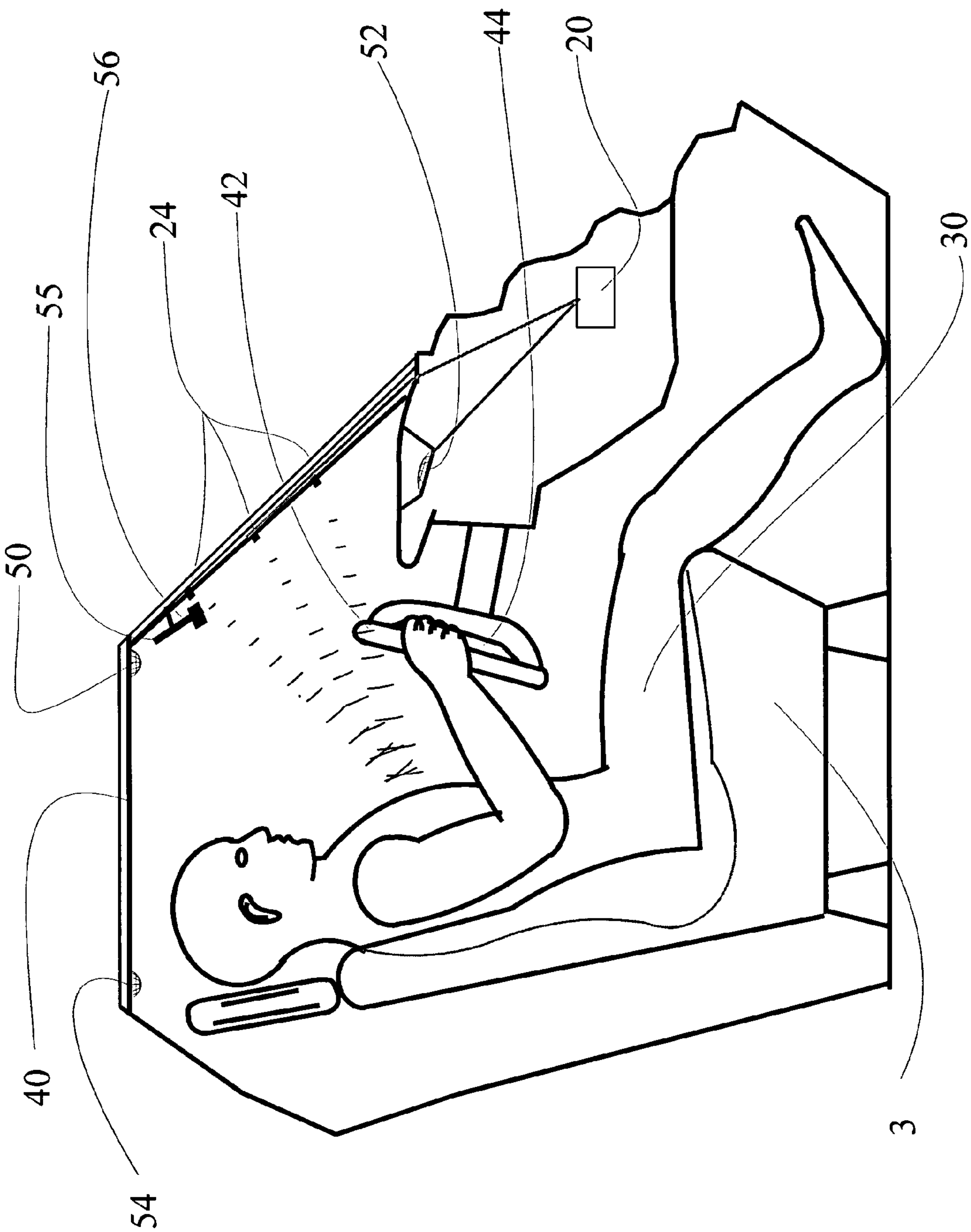
FIG. 8E is a view as in FIG. 8A illustrating the wave pattern from a set of ultrasonic transmitter/receivers where the spacing of the transducers and the phase of the signal permits an accurate focusing of the ultrasonic beam and thus the accurate measurement of a particular point on the surface of the driver.

Infrared waves are shown coming from the front and back transducer assemblies 54 and 55 in FIG. 8C. FIG. 8D illustrates two optical systems each having a source of infrared radiation and a CCD, CMOS, FPR, TFA or QWIP array receiver. The price of such arrays has dropped dramatically recently making them practical for interior and exterior vehicle monitoring. In this embodiment, transducers 54 and 55 are CMOS arrays having 160 pixels by 160 pixels covered by a lens. In some applications, this can create a "fisheye" effect whereby light from a wide variety of directions can be captured. One such transducer placed by the dome light or other central position in the vehicle headliner, such as the transducer designated 54, can monitor the entire vehicle interior with sufficient resolution to determine the occupancy of the vehicle, for example. Imagers such as those used herein are available from Marshall Electronics Inc. of Culver City, Calif. and others. A fisheye lens is " . . . a wide-angle photographic lens that covers an angle of about 180°, producing a circular image with exaggerated foreshortening in the center and increasing distortion toward the periphery". (*The American Heritage Dictionary of the English Language*, Third Edition, 1992 by Houghton Mifflin Company). This distortion of a fisheye lens can be substantially changed by modifying the shape of the lens to permit particular portions of the interior passenger compartment to be observed. Also, in many cases the full 180° is not desirable and a lens which captures a smaller angle may be used. Although primarily spherical lenses are illustrated herein, it is understood that the particular lens design will depend on the location in the vehicle and the purpose of the particular receiver.

A camera that provides for pan and zoom using a fisheye lens is described in U.S. Pat. No. 05,185,667 and is applicable to this invention. Here, however, it is usually not necessary to remove the distortion since the image will on general not be viewed by a human but will be analyzed by software. One exception is when the image is sent to emergency services via telematics. In that case, the distortion removal is probably best done at the EMS site.

Although a fisheye camera has primarily been discussed above, other types of distorting lenses or mirrors can be used to accomplished particular objectives. A distorting lens or mirror, for example, can have the effect of dividing the image into several sub-pictures so that the available pixels can cover more than one area of a vehicle interior or exterior. Alternately, the volume in close proximity to an airbag, for example, can be allocated a more dense array of pixels so that measurements of the location of an occupant relative to the airbag can be more accurately achieved. Numerous other objectives can now be envisioned which can now be accomplished with a reduction in the number of cameras or imagers through either distortion or segmenting of the optical field.

Another problem associated with lens is cleanliness. In general the optical systems of these inventions comprise methods to test for the visibility through the lens and issue a warning when that visibility begins to deteriorate. Many methods exist for accomplishing this feat including the taking of an image when the vehicle is empty and not moving and at night. Using neural networks, for example, or some other comparison technique, a comparison of the illumination reaching the imager can be compared with what is normal. QA network can be trained on empty seats, for example, in all possible positions and compared with the new image. Or, those pixels that correspond to any movable surface in the vehicle can be removed from the image and a brightness test on the remaining pixels used to determine lens cleanliness.

Once a lens has been determined to be un-clean then either a warning light can be set telling the operator to visit the dealer or a method If cleaning the lens automatically invoked. One such method for night vision systems is disclosed in WO0234572. Another which is one on the inventions herein is to cover the lens with a thin film. This film may be ultrasonically excited thereby greatly minimizing the tendency for it to get dirty and/or the film can be part of a role of film that is advanced when the diagnostic system detects a dirty lens thereby placing a new clean surface in front of the imager. The film role can be sized such that under normal operation the role would last some period such as 20 years.

4. 3D Cameras

Optical sensors can be used to obtain a three dimensional measurement of the object through a variety of methods that use time of flight, modulated light and phase measurement, quantity of light received within a gated window, structured light and triangulation etc. Some of these techniques are discussed in the current assignee's U.S. Pat. No. 06,393,133.

4.1 Stereo

One method of obtaining a three dimensional image is illustrated in FIG. 8D where transducer 24 is an infrared source having a wide transmission angle such that the entire contents of the front driver's seat is illuminated. Receiving imager transducers 23 and 25 are shown spaced apart so that a stereographic analysis can be made by the control circuitry 20. This circuitry 20 contains a microprocessor with appropriate pattern recognition algorithms along with other circuitry as described above. In this case, the desired feature to be located is first selected from one of the two returned images from either imaging transducer 23 or 25. The software then determines the location of the same feature, through correlation analysis or other methods, on the other image and thereby, through analysis familiar to those skilled in the art, determines the distance of the feature from the transducers by triangulation.

As the distance between the two or more imagers used in the stereo construction increases, a better and better model of the object being imaged can be obtained since more of the object is observable. On the other hand, it becomes more and more difficult to pair up points that occur in both images. Given sufficient computational resources this not a difficult problem but with limited resources and the requirement to track a moving occupant during a crash, for example, the problem becomes more difficult. One method to ease the problem is to project onto the occupant a structured light that permits a recognizable pattern to be observed and matched up in both images. The source of this projection should lie midway between the two imagers. By this method a rapid correspondence between the images can be obtained.

On the other hand, if a source of structured light is available at a different location than the imager, then a simpler three dimensional image can be obtained using a single imager. Furthermore, the model of the occupant really only needs to be made once during the classification phase of the process and there is usually sufficient time to accomplish that model with ordinary computational power. Once the model has been obtained then only a few points need be tracked by either one or both of the cameras.

Another method exists whereby the displacement between two images from two cameras is estimated using a correlator. Such a fast correlator has been developed by Professor Lukin of Kyiv, Ukraine in conjunction with his work on noise radar. This correlator is very fast and can probably determine the distance to an occupant at a rate sufficient for tracking purposes.

4.2 Distance by Focusing

In the above-described imaging systems, a lens within a receptor captures the reflected infrared light from the head or chest of the driver and displays it onto an imaging device (CCD, CMOS, TFA, QWIP or equivalent) array. For the discussion of FIGS. 5 and 13-17 at least, either CCD or the word imager will be used to include all devices which are capable of converting light frequencies, including infrared, into electrical signals. In one method of obtaining depth from focus, the CCD is scanned and the focal point of the lens is altered, under control of an appropriate circuit, until the sharpest image of the driver's head or chest results and the distance is then known from the focusing circuitry. This trial and error approach may require the taking of several images and thus may be time consuming and perhaps too slow for occupant tracking.

The time and precision of this measurement is enhanced if two receptors are used which can either project images onto a single CCD or on separate CCD's. In the first case, one of the lenses could be moved to bring the two images into coincidence while in the other case the displacement of the images needed for coincidence would be determined mathematically. Naturally, other systems could be used to keep track of the different images such as the use of filters creating different infrared frequencies for the different receptors and again using the same CCD array. In addition to greater precision in determining the location of the occupant, the separation of the two receptors can also be used to minimize the effects of hands, arms or other extremities which might be very close to the airbag. In this case, where the receptors are mounted high on the dashboard on either side of the steering wheel, an arm, for example, would show up as a thin object but much closer to the airbag than the larger body parts and, therefore, easily distinguished and eliminated, permitting the sensors to determine the distance to the occupant's chest. This is one example of the use of pattern recognition.

An alternate method is to use a lens with a short focal length. In this case, the lens is mechanically focused, e.g., automatically, directly or indirectly, by the control circuitry 20, to determine the clearest image and thereby obtain the distance to the object. This is similar to certain camera auto-focusing systems such as one manufactured by Fuji of Japan. Again this is a time consuming method. Naturally, other methods can be used as described in the patents and patent applications referenced above.

Instead of focusing the lens, the lens could be moved relative to the array to thereby adjust the image on the array. Instead of moving the lens, the array could be moved to achieve the proper focus. In addition, it is also conceivable that software could be used to focus the image without moving the lens or the array especially if at least two images are available.

An alternative is to use the focusing systems described in U.S. Pat. No. 05,193,124 and U.S. Pat. No. 05,003,166. These systems are quite efficient requiring only two images with different camera settings. Thus if there is sufficient time to acquire an image, change the camera settings and acquire a second image, this system is fine and can be used with the inventions disclosed herein. Once the position of the occupant has been determined for one point in time then the process may not have to be repeated as a measurement of the size of a part of an occupant can serve as a measure of its relative location compared to the previous image from which the range was obtained. Thus, other that the requirement of a somewhat more expensive imager, the system of the '124 and '166 patents is fine. The accuracy of the range is perhaps limited to a few centimeters depending on the quality of the imager used. Also if multiple ranges to multiple objects are required then the process becomes a bit more complicated.

4.3 Ranging

The scanning portion of a pulse laser radar device can be accomplished using rotating mirrors, vibrating motors, or preferably, a solid state system, for example one utilizing $TeO_2$ as an optical diffraction crystal with lithium niobate crystals driven by ultrasound (although other solid state systems not necessarily using $TeO_2$ and lithium niobate crystals could also be used). An alternate method is to use a micromachined mirror, which is supported at its center and caused to deflect by miniature coils. Such a device has been used to provide two-dimensional scanning to a laser. This has the advantage over the $TeO_2$-lithium niobate technology in that it is inherently smaller and lower cost and provides two-dimensional scanning capability in one small device. The maximum angular deflection that can be achieved with this process is on the order of about 10 degrees. Thus, a diverging lens or equivalent will be needed for the scanning system.

Another technique to multiply the scanning angle is to use multiple reflections off of angled mirror surfaces. A tubular structure can be constructed to permit multiple interior reflections and thus a multiplying effect on the scan angle.

An alternate method of obtaining three-dimensional information from a scanning laser system is to use multiple arrays to replace the single arrays used in FIG. 8A. In the case, the arrays are displaced from each other and, through triangulation, the location of the reflection from the illumination by a laser beam of a point on the object can be determined in a manner that is understood by those skilled in the art. Alternately a single array can be used with the scanner displaced from the array.

A new class of laser range finders has particular application here. This product, as manufactured by Power Spectra, Inc. of Sunnyvale, Calif., is a GaAs pulsed laser device which can measure up to 30 meters with an accuracy of <2 cm and a resolution of <1 cm. This system is implemented in combination with transducer 24 and one of the receiving transducers 23 or 25 may thereby be eliminated. Once a particular feature of an occupying item of the passenger compartment has been located, this device is used in conjunction with an appropriate aiming mechanism to direct the laser beam to that particular feature. The distance to that feature is then known to within 2 cm and with calibration even more accurately. In addition to measurements within the passenger compartment, this device has particular applicability in anticipatory sensing and blind spot monitoring applications exterior to the vehicle. An alternate technology using range gating to measure the time of flight of electromagnetic pulses with even better resolution can be developed based on the teaching of the McEwan patents listed above.

Figure 17:
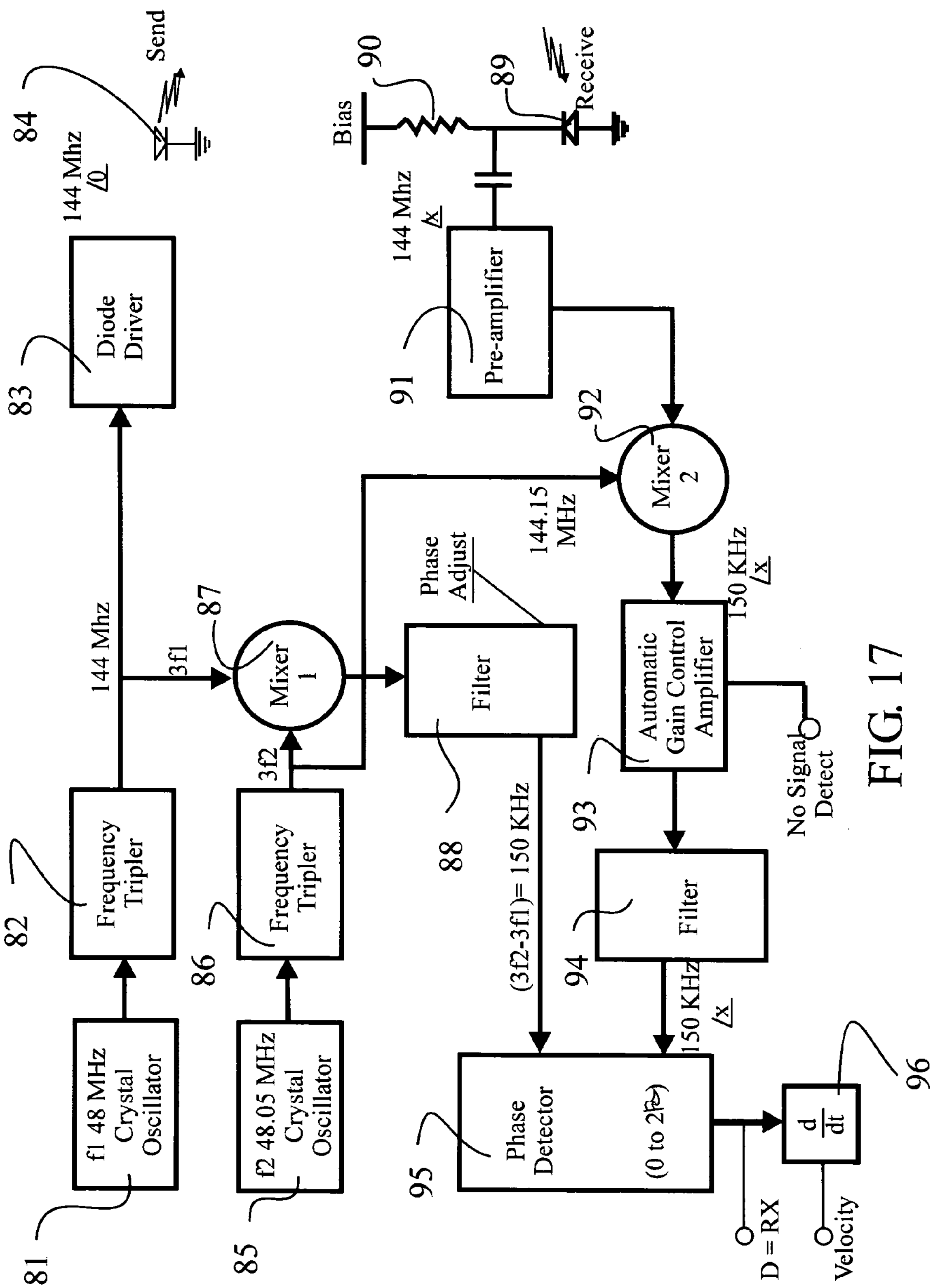
FIG. 17 is a schematic illustrating the circuit of an occupant position-sensing device using a modulated infrared signal, beat frequency and phase detector system.

A particular implementation of an occupant position sensor having a range of from 0 to 2 meters (corresponding to an occupant position of from 0 to 1 meter since the signal must travel both to and from the occupant) using infrared is illustrated in the block diagram schematic of FIG. 17. The operation is as follows. A 48 MHz signal, f1, is generated by a crystal oscillator 81 and fed into a frequency tripler 82 which produces an output signal at 144 MHz. The 144 MHz signal is then fed into an infrared diode driver 83 which drives the infrared diode 84 causing it to emit infrared light modulated at 144 MHz and a reference phase angle of zero degrees. The infrared diode 84 is directed at the vehicle occupant. A second signal f2 having a frequency of 48.05 MHz, which is slightly greater than f1, is similarly fed from a crystal oscillator 85 into a frequency tripler 86 to create a frequency of 144.15 MHz. This signal is then fed into a mixer 87 which combines it with the 144 MHz signal from frequency tripler 82. The combined signal from the mixer 87 is then fed to filter 88 which removes all signals except for the difference, or beat frequency, between 3 times f1 and 3 times f2, of 150 kHz. The infrared signal which is reflected from the occupant is received by receiver 89 and fed into pre-amplifier 91, a resistor 90 to bias being coupled to the connection between the receiver 89 and the pre-amplifier 91. This signal has the same modulation frequency, 144 MHz, as the transmitted signal but now is out of phase with the transmitted signal by an angle x due to the path that the signal took from the transmitter to the occupant and back to the receiver.

The output from pre-amplifier 91 is fed to a second mixer 92 along with the 144.15 MHz signal from the frequency tripler 86. The output from mixer 92 is then amplified by an automatic gain amplifier 93 and fed into filter 94. The filter 94 eliminates all frequencies except for the 150 kHz difference, or beat, frequency, in a similar manner as was done by filter 88. The resulting 150 kHz frequency, however, now has a phase angle x relative to the signal from filter 88. Both 150 kHz signals are now fed into a phase detector 95 which determines the magnitude of the phase angle x. It can be shown mathematically that, with the above values, the distance from the transmitting diode to the occupant is x/345.6 where x is measured in degrees and the distance in meters. The velocity can also be obtained using the distance measurement as represented by 96. An alternate method of obtaining distance information, as discussed above, is to use the teachings of the McEwan patents discussed above.

As reported above, cameras can be used for obtaining three dimensional images by modulation of the illumination as taught in U.S. Pat. No. 05,162,861. The use of a ranging device for occupant sensing is believed to have been was first disclosed by the current assignee in the above-referenced patents. More recent attempts include the PMD camera as disclosed in PCT application WO09810255 and similar concepts disclosed in U.S. Pat. No. 06,057,909 and U.S. Pat. No. 06,100,517.

Note that although the embodiment in FIG. 17 uses near infrared, it is possible to use other frequencies of energy without deviating from the scope of the invention. In particular, there are advantages in using the short wave (SWIR), medium wave (MWIR) and long wave (LWIR) portions of the infrared spectrum as the interact in different and interesting ways with living occupants as described elsewhere herein.

4.4 Pockel or Kerr Cell for Determining Range

Pockel and Kerr cells are well known in optical laboratories. They act as very fast shutters and as such can be used to range gate the reflections based on distance. Thus, through multiple exposures the range to all reflecting surfaces inside and outside of the vehicle can be determined to any appropriate degree of accuracy. The illumination is transmitted, the camera shutter opened and the cell allows only that reflected light to enter the camera that arrived at the cell a precise time range after the illumination was initiated.

These cells are part of a class of devices called spatial light modulators (SLM). One novel application of an SLM is reported in U.S. Pat. No. 05,162,861. In this case a SML is used to modulate the light returning from a transmitted laser pulse that is scattered from a target. By comparing the intensities of the modulated and unmodulated images the distance to the target can be ascertained. Using a SML in another manner, the light valve can be kept closed for all ranges except the ones of interest. Thus by changing the open time of the SLM only returns from certain distances are permitted to pass through to the imager. By selective changing the opened time the range to the target can be "range gated" and thereby accurately determined. Thus the outgoing light need not be modulated and a scanner is not necessary unless there is a need to overcome the power of the sun. This form of range gating can of course be used for either external or internal applications.

4.5 Thin Film on ASIC (TFA)

Since the concepts of using cameras for monitoring the passenger compartment of a vehicle and measuring distance to a vehicle occupant based on the time of flight were first disclosed in the commonly assigned above cross referenced patents, several improvements have been reported in the literature including the thin film on ASIC (TFA) (references 6-11) and photonic mixing device (PMD) (reference 12) camera technologies. All of these references are included herein by reference. Both of these technologies and combinations thereof are good examples of devices that can be used in practicing the instant invention and those in the cross-referenced patents and applications for monitoring both inside and exterior to a vehicle.

An improvement to these technologies is to use noise or pseudo noise modulation for a PMD like device to permit more accurate distance to object determination especially for exterior to the vehicle monitoring through correlation of the generated and reflected modulation sequences. This has the further advantage that systems from different vehicles will not interfere with each other.

The TFA is an example of a high dynamic range camera (HDRC) the use of which for interior monitoring was first disclosed in U.S. patent application Ser. No. 09/389,947 cross referenced above. Since there is direct connection between each pixel and an associated electronic circuit, the potential exists for range gating the sensor to isolate objects between certain limits thus simplifying the identification process by eliminating reflections from objects that are closer or further away than the object of interest. A further advantage of the TFA is that it can be doped to improve its sensitivity to infrared and it also can be fabricated as a three-color camera system.

Another novel HDRC camera is disclosed by Nayar (13) and involves varying the sensitivity of pixels in the imager. Each of four adjacent pixels has a different exposure sensitivity and an algorithm is presented that combines the four exposures in a manner that loses little resolution but provides a high dynamic range picture. This particularly simple system is a preferred approach to handling the dynamic range problem in automobile monitoring of this invention.

Figure 52:
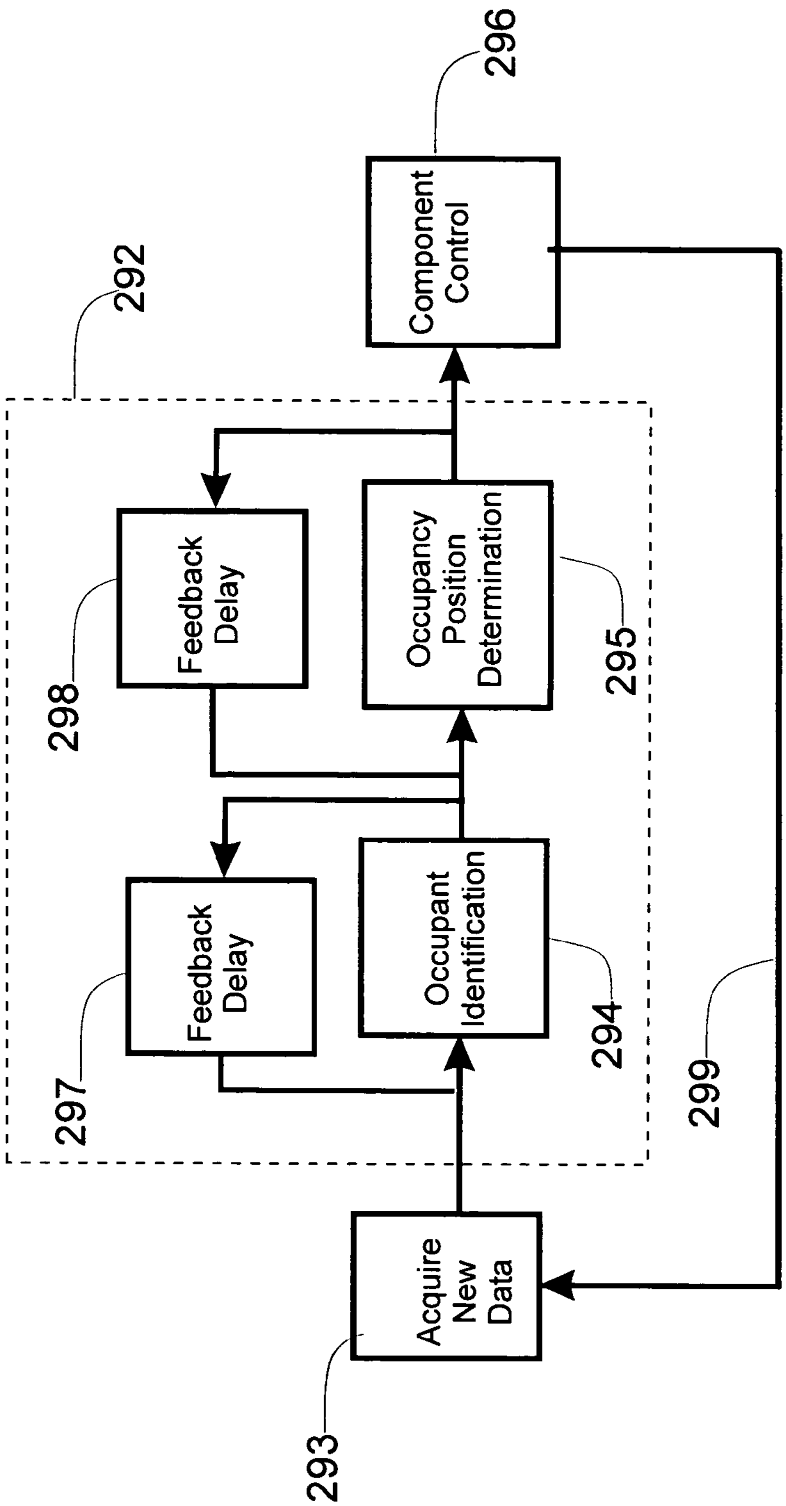
FIG. 52 is a schematic illustration of a method in which the identification and position of the occupant is determined using a combination neural network in accordance with the invention.
Figure 53:
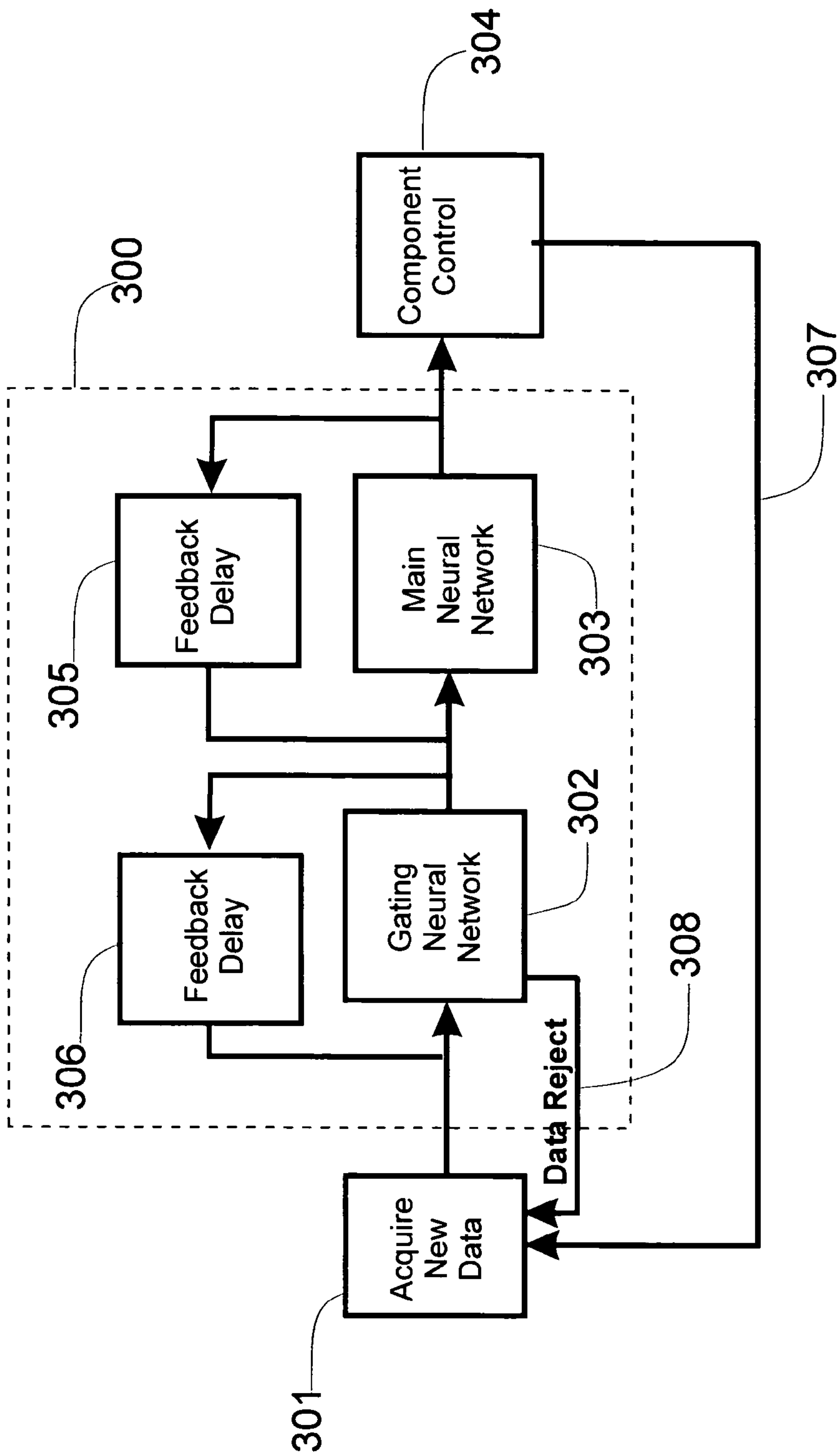
FIG. 53 is a schematic illustration of a method in which the occupancy state of a seat of a vehicle is determined using a combination neural network in accordance with the invention in which bad data is prevented from being used to determine the occupancy state of the vehicle.

A great deal of development effort has gone into automatic camera focusing systems such as described in the Scientific American Article "Working Knowledge: Focusing in a Flash" (14). The technology is now to the point that it can be taught to focus on a particular object, such as the head or chest of an occupant, and measure the distance to the object to within approximately 1 inch. If this technology is coupled with the Nayar camera, a very low cost semi 3D high dynamic range camera or imager results that is sufficiently accurate for locating an occupant in the passenger compartment. If this technology is coupled with an eye locator and the distance to the eyes of the occupant are determined than a single camera is all that is required for either the driver or passenger. Such a system would display a fault warning when it is unable to find the occupant's eyes. Such a system is illustrated in FIG. 52 and FIG. 53.

As discussed above, thin film on ASIC technology, as described in Lake, D. W. "TFA Technology: The Coming Revolution in Photography", Advanced Imaging Magazine, April, 2002 (WWW.ADVANCEDIMAGINGMAG.COM) shows promise of being the next generation of imager for automotive applications. The anticipated specifications for this technology, as reported in the Lake article, are:

| | |
|---|---|
| Dynamic Range | 120 db |
| Sensitivity | 0.01 lux |
| Anti-blooming | 1,000,000:1 |
| Pixel Density | 3,200,000 |
| Pixel Size | 3.5 um |
| Frame Rate | 30 fps |
| DC Voltage | 1.8 v |
| Compression | 500 to 1 |

All of these specifications, except for the frame rate, are attractive for occupant sensing. It is believed that the frame rate can be improved with subsequent generations of the technology. Some advantages of this technology for occupant sensing include the possibility of obtaining a three dimensional image by varying the pixel on time in relation to a modulated illumination in a simpler manner that proposed with the PMD imager or with a Pockel or Kerr cell. The ability to build the entire package on one chip will reduce the cost of this imager compared with two or more chips required by current technology. Other technical papers on TFA are referenced above.

TFA thus appears to be a major breakthrough when used in the interior and exterior imaging systems. Its use in these applications falls within the teachings of the inventions disclosed herein.

5. Glare Control

The headlights of oncoming vehicles frequently make it difficult for the driver of a vehicle to see the road and safely operate the vehicle. This is a significant cause of accidents and much discomfort. The problem is especially severe during bad weather where rain can cause multiple reflections. Opaque visors are now used to partially solve this problem but they do so by completely blocking the view through a large portion of the window and therefore cannot be used to cover the entire windshield. Similar problems happen when the sun is setting or rising and the driver is operating the vehicle in the direction of the sun. U.S. Pat. No. 04,874,938 attempts to solve this problem through the use of a motorized visor but although it can block some glare sources it also blocks a substantial portion of the field of view.

The vehicle interior monitoring system disclosed herein can contribute to the solution of this problem by determining the position of the driver's eyes. If separate sensors are used to sense the direction of the light from the on-coming vehicle or the sun, and through the use of electrochromic glass, a liquid crystal device, suspended particle device glass (SPD) or other appropriate technology, a portion of the windshield, or special visor, can be darkened to impose a filter between the eyes of the driver and the light source. Electrochromic glass is a material where the transparency of the glass can be changed through the application of an electric current. The term "liquid crystal" as used herein will be used to represent the class of all such materials where the optical transmissibility can be varied electrically or electronically. Electrochromic products are available from Gentex of Zeeland, Mich., and Donnelly of Holland, Mich.

By dividing the windshield into a controlled grid or matrix of contiguous areas and through feeding the current into the windshield from orthogonal directions, selective portions of the windshield can be darkened as desired. Other systems for selectively imposing a filter between the eyes of an occupant and the light source are currently under development. One example is to place a transparent sun visor type device between the windshield and the driver to selectively darken portions of the visor as described above for the windshield.

5.1 Windshield

Figures 39, 39A:
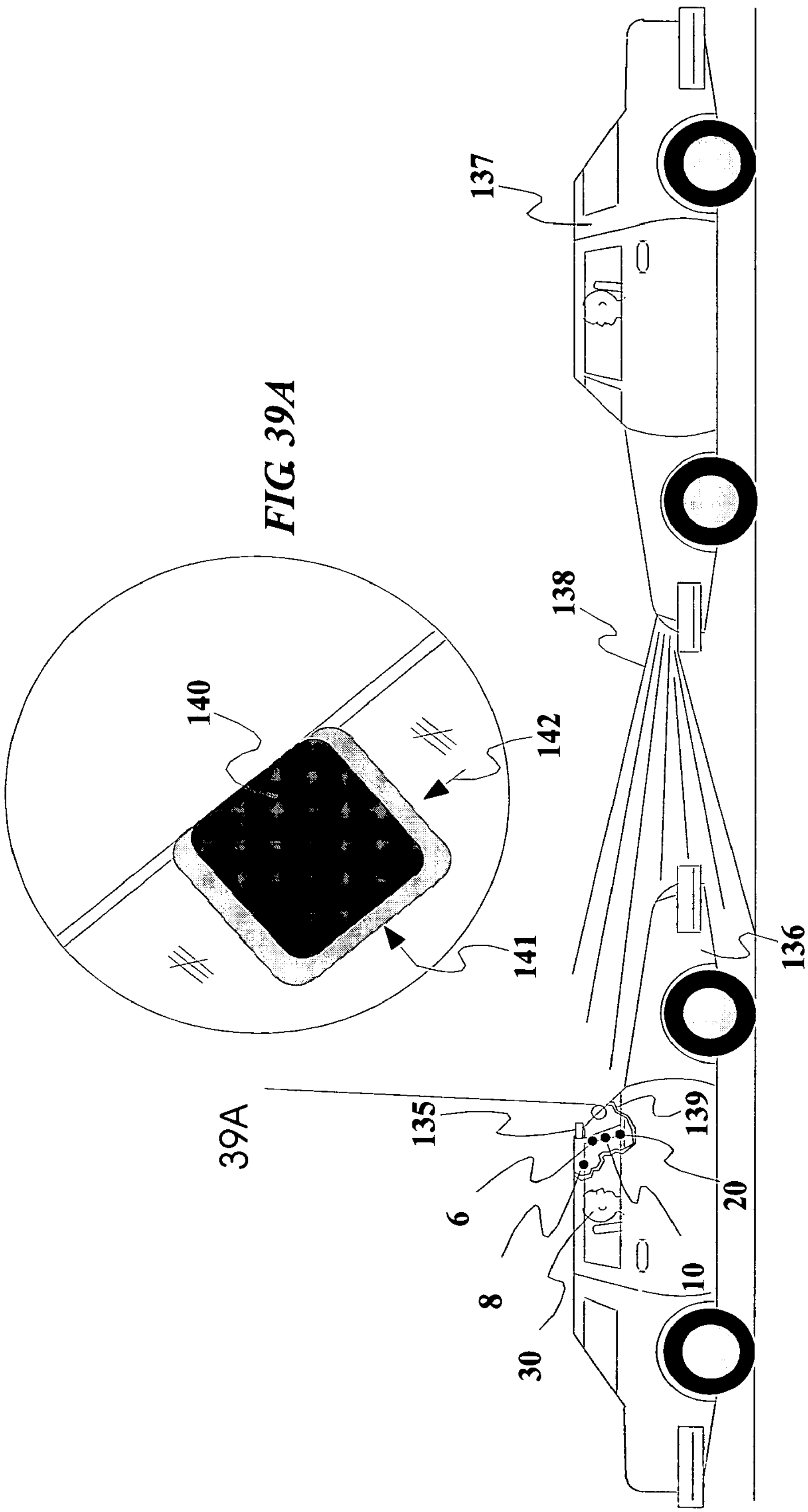
FIG. 39 is a side view with parts cutaway and removed of a subject vehicle and an oncoming vehicle, showing the headlights of the oncoming vehicle and the passenger compartment of the subject vehicle, containing detectors of the driver's eyes and detectors for the headlights of the oncoming vehicle and the selective filtering of the light of the approaching vehicle's headlights through the use of electrochromic glass, organic or metallic semiconductor polymers or electropheric particulates (SPD) in the windshield.
FIG. 39A is an enlarged view of the section 39A in FIG. 39.

FIG. 39 illustrates how such a system operates for the windshield. A sensor 135 located on vehicle 136 determines the direction of the light 138 from the headlights of oncoming vehicle 137. Sensor 135 is comprised of a lens and a charge-coupled device (CCD), CMOS or similar device, with appropriate software or electronic circuitry that determines which elements of the CCD are being most brightly illuminated. An algorithm stored in processor 20 then calculates the direction of the light from the oncoming headlights based on the information from the CCD, or CMOS device. Usually two systems 135 are required to fix the location of the offending light. Transducers 6, 8 and 10 determine the probable location of the eyes of the operator 30 of vehicle 136 in a manner such as described above and below. In this case, however, the determination of the probable locus of the driver's eyes is made with an accuracy of a diameter for each eye of about 3 inches (7.5 cm). This calculation sometimes will be in error especially for ultrasonic occupant sensing systems and provision is made for the driver to make an adjustment to correct for this error as described below.

The windshield 139 of vehicle 136 comprises electrochromic glass, a liquid crystal, SPD device or similar system, and is selectively darkened at area 140, FIG. 39A, due to the application of a current along perpendicular directions 141 and 142 of windshield 139. The particular portion of the windshield to be darkened is determined by processor 20. Once the direction of the light from the oncoming vehicle is known and the locations of the driver's eyes are known, it is a matter of simple trigonometry to determine which areas of the windshield matrix should be darkened to impose a filter between the headlights and the driver's eyes. This is accomplished by processor 20. A separate control system, not shown, located on the instrument panel, steering wheel or at some other convenient location, allows the driver to select the amount of darkening accomplished by the system from no darkening to maximum darkening. In this manner, the driver can select the amount of light that is filtered to suit his particular physiology. Alternately, this process can take place automatically. The sensor 135 can either be designed to respond to a single light source or to multiple light sources to be sensed and thus multiple portions of the vehicle windshield to be darkened. Naturally, unless the camera is located on the same axis at the eyes of the driver, two cameras would in general be required to determine the distance of the glare causing object from the eyes of the driver. Without this third dimension two glare sources that are on the same axis to the camera could be on different axes to the driver, for example.

As an alternative to locating the direction of the offending light source, a camera looking at the eyes of the driver can determine when they are being subjected to glare and then impose a filter. A trail and error process or through the use of structured light created by a pattern on the windshield, determines where to create the filter to block the glare.

More efficient systems are now becoming available to permit a substantial cost reduction as well as higher speed selective darkening of the windshield for glare control. These systems permit covering the entire windshield which is difficult to achieve with LCDs. For example, such systems are made from thin sheets of plastic film, sometimes with an entrapped liquid, and can usually be sandwiched between the two pieces of glass that make up a typical windshield. The development of conductive plastics permits the addressing and thus the manipulation of pixels of a transparent film that previously was not possible. These new technologies will now be discussed.

If the objective is for glare control then the Xerox Gyricon technology applied to windows can be appropriate. Previously this technology has only been used to make e-paper and a modification to the technology is necessary for it to work for glare control. Gyricon is a thin layer of transparent plastic full of millions of small black and white or red and white beads, like toner particles. The beads are contained in an oil-filled cavity. When voltage is applied, the beads rotate to present a colored side to the viewer. The advantages of Gyricon are: (1) it is electrically writeable and erasable; (2) it can be re-used thousands of times; (3) it does not require backlighting or refreshing; (4) it is brighter than today's reflective displays; and, (5) it operates on low power. The changes required are to cause the colored spheres to rotate 90 degrees rather than 180 degrees and to make half of each sphere transparent so that the display switches from opaque to 50% transparent.

Another technology, SPD light control technology from Research Frontiers Inc., has been used to darken entire windows but not as a system for darkening only a portion of the glass or sun visor to impose a selective filter to block the sun or headlights of an oncoming vehicle. Although it has been used as a display for laptop computers, it has not been used as a heads-up display (HUD) replacement technology for automobile or truck windshields.

Both SPD and Gyricon technologies require that the particles be immersed in a fluid so that the particles can move. Since the properties of the fluid will be temperature sensitive, these technologies will vary somewhat in performance over the automotive temperature range. The preferred technology, therefore, is plastic electronics although in many applications either Gyricon or SPD will also be used in combination with plastic electronics, at least until the technology matures. Currently plastic electronics can only emit light and not block it. However, research is ongoing to permit it to also control the transmission of light.

The calculations of the location of the driver's eyes using acoustic systems may be in error and therefore provision must be made to correct for this error. One such system permits the driver to adjust the center of the darkened portion of the windshield to correct for such errors through a knob, mouse pad, joy stick or other input device, on the instrument panel, steering wheel, door, armrest or other convenient location. Another solution permits the driver to make the adjustment by slightly moving his head. Once a calculation as to the location of the driver's eyes has been made, that calculation is not changed even though the driver moves his head slightly. It is assumed that the driver will only move his head in a very short time period to center the darkened portion of the windshield to optimally filter the light from the oncoming vehicle. The monitoring system will detect this initial head motion and make the correction automatically for future calculations. Additionally, a camera observing the driver or other occupant can monitor the reflections of the sun or the headlights of oncoming vehicles off of the occupant's head or eyes and automatically adjust the filter in the windshield or sun visor.

5.2 Glare in Rear View Mirrors

Electrochromic glass is currently used in rear view mirrors to darken the entire mirror in response to the amount of light striking an associated sensor. This substantially reduces the ability of the driver to see objects coming from behind his vehicle. If one rear-approaching vehicle, for example, has failed to dim his lights, the mirror will be darkened to respond to the light from that vehicle making it difficult for the driver to see other vehicles that are also approaching from the rear. If the rear view mirror is selectively darkened on only those portions that cover the lights from the offending vehicle, the driver is able to see all of the light coming from the rear whether the source is bright or dim. This permits the driver to see all of the approaching vehicles not just the one with bright lights.

Figure 40B:
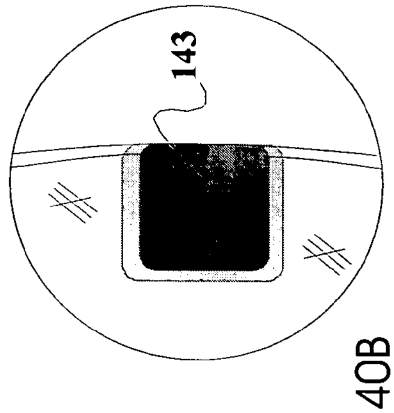
FIG. 40B is an enlarged view of the section designated 40A in FIG. 40.
Figure 40A:
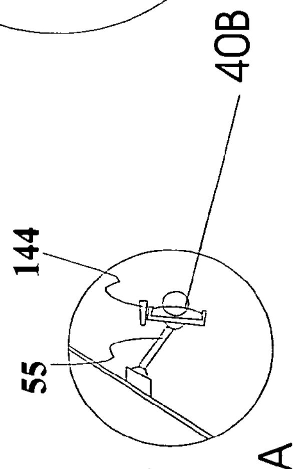
FIG. 40 is a side view with parts cutaway and removed of a vehicle and a following vehicle showing the headlights of the following vehicle and the passenger compartment of the leading vehicle containing a driver and a preferred mounting location for driver eyes and following vehicle headlight detectors and the selective filtering of the light of the following vehicle's headlights through the use of electrochromic glass, SPD glass or equivalent, in the rear view mirror.
Figure 40:
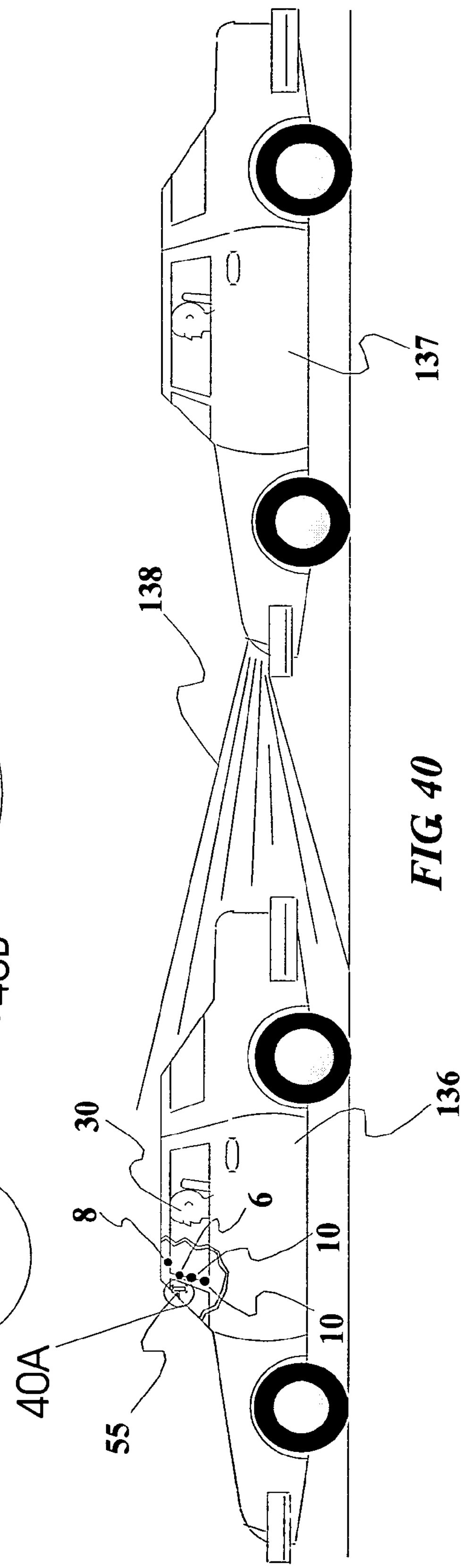

Such a system is illustrated in FIGS. 40, 40A and 40B where rear view mirror 55 is equipped with electrochromic glass, or comprises a liquid crystal or similar device, having the capability of being selectively darkened, e.g., at area 143. Associated with mirror 55 is a light sensor 144 that determines the direction of light 138 from the headlights of rear approaching vehicle 137. Again as with the windshield a stereo camera is used if the camera is not aligned with the eye view path. This is easier to accomplish with a mirror due to its much smaller size. In such a case the imager could be mounted on the movable part of the mirror and could even look through the mirror from behind. In the same manner as above, transducers 6, 8 and 10 determine the location of the eyes of the driver 30. The signals from both sensor systems, 6, 8 plus 10 and 144, are combined in processor 20, where a determination is made as to what portions of the mirror should be darkened, e.g., area 143. Appropriate currents are then sent to the mirror in a manner similar to the windshield system described above. Again, an alternative solution is to observe a glare reflection on the face of the driver and remove the glare with a filter.

Note, the rearview mirror is also an appropriate place to display icons of the contents of the blind spot or other areas surrounding the vehicle as disclosed in U.S. patent application Ser. No. 09/851,362 filed May 8, 2001.

In a similar manner, the forward looking camera(s) can also be used to control the lights of vehicle 136 when either the headlights or taillights of another vehicle are sensed. In this embodiment, the CCD array is designed to be sensitive to visible light and a separate source of illumination is not used. The key to this technology can be the use of trained pattern recognition algorithms and particularly the artificial neural network. Here, as in the other cases above and in the patents and patent applications referenced above, the pattern recognition system is trained to recognize the pattern of the headlights of an oncoming vehicle or the tail lights of a vehicle in front of vehicle 136 and to then dim the headlights when either of these conditions is sensed. It is also trained to not dim the lights for other reflections such as reflections off of a sign post or the roadway. One problem is to differentiate taillights where dimming is desired from distant headlights where dimming is not desired. Three techniques can be used: (i) measurement of the spacing of the light sources, (ii) determination of the location of the light sources relative to the vehicle, and (iii) use of a red filter where the brightness of the light source through the filter is compared with the brightness of the unfiltered light. In the case of the taillight, the brightness of the red filtered and unfiltered light is nearly the same while there is a significant difference for the headlight case. In this situation, either two CCD arrays are used, one with a filter, or a filter which can be removed either electrically, such as with a liquid crystal, or mechanically. Alternately a fast Fourier transform, or other spectral analysis technique, of the data can be taken to determine the relative red content.

5.2 Visor for Glare Control and HUD

Figure 41:
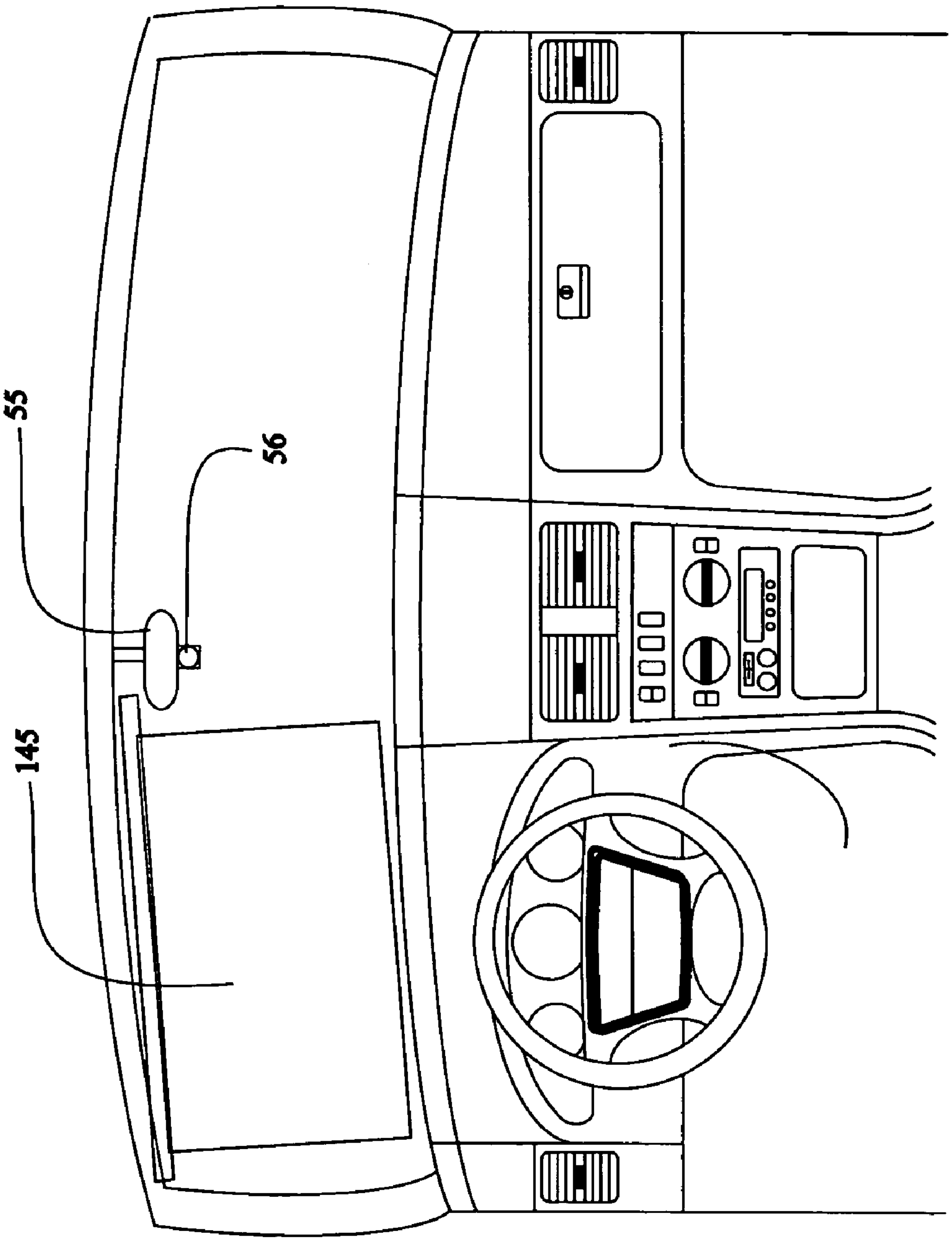
FIG. 41 illustrates the interior of a passenger compartment with a rear view mirror, a camera for viewing the eyes of the driver and a large generally transparent visor for glare filtering.

FIG. 41 illustrates the interior of a passenger compartment with a rear view mirror 55, a camera for viewing the eyes of the driver 56 and a large generally transparent visor 145. The sun visor 145 is normally largely transparent and is made from electrochromic glass, suspended particle glass, a liquid crystal device or equivalent. The camera 56 images the eyes of the driver and looks for a reflection indicating that glare is impinging on the driver's eyes. The camera system may have a source of infrared or other frequency illumination that would be momentarily activated to aid in locating the driver's eyes. Once the eyes have been located, the camera monitors the area around the eyes, or direct reflections from the eyes themselves, for an indication of glare. The camera system in this case would not know the direction from which the glare is originating; it would only know that the glare was present. The glare blocker system then can darken selected portions of the visor to attempt to block the source of glare and would use the observation of the glare from or around the eyes of the driver as feedback information. When the glare has been eliminated the system maintains the filter perhaps momentarily reducing it from time to time to see that the source of glare has not stopped.

If the filter is electrochromic glass, a significant time period is required to activate the glare filter and therefore a trial and error search for the ideal filter location could be too slow. In this case a non-recurring spatial pattern can be placed in the visor such that when light passes through the visor and illuminates the face of the driver the location where the filter should be placed can be easily determined. That is, the pattern reflection off of the face of the driver would indicate the location of the visor through which the light causing the glare was passing. Such a structured light system can also be used for the SPD and LCD filters but since they act significantly more rapidly it would serve only to simplify the search algorithm for filter placement.

A second photo sensor 135 can also be used pointing through the windshield to determine only that glare was present. In this manner when the source of the glare disappears, the filter can be turned off. Naturally, a more sophisticated system as described above for the windshield system whereby the direction of the light is determined using a camera type device can also be implemented.

The visor 145 is illustrated as substantially covering the front windshield in front of the driver. This is possible since it is transparent except where the filter is applied, which would in general be a small area. A second visor, not shown, can also be used to cover the windshield for the passenger side that would also be useful when the light-causing glare on the driver's eyes enters thought the windshield in front of the passenger or if a passenger system is also desired. In some cases it might even be advantageous to supply a similar visor to cover the side windows but in general standard opaque visors would serve for both the passenger side windshield area and the side windows since the driver really in general only needs to look through the windshield in front of him or her.

A smaller visor can also be used as long as it is provided with a positioning system or method. The visor really only needs to cover the eyes of the driver. This could either be done manually or by electric motors similar to the system that is disclosed in U.S. Pat. No. 04,874,938. If electric motors are used then the adjustment system would first have to move the visor so that it covered the driver's eyes and then provide the filter. This could be annoying if the vehicle is heading into the sun and turning and/or going up and down hills. In any case, the visor should be movable to cover any portion of the windshield where glare can get through, unlike conventional visors that only cover the top half of the windshield. The visor also does not need to be close to the windshield and the closer that it is to the driver the smaller and thus the less expensive it can be.

As with the windshield, the visor of this invention can also serve as a display using plastic electronics as described above either with or without the SPD or other filter material. Additionally, visor like displays can now be placed at many locations in the vehicle for the display of Internet web pages, movies, games etc. Occupants of the rear seat, for example, can pull down such displays from the ceiling, up from the front seatbacks or out from the B-pillars or other convenient locations.

A key advantage of the systems disclosed herein is the ability to handle multiple sources of glare in contract to the system of U.S. Pat. No. 04,874,938, which requires that the multiple sources must be close together.

6. Weight Measurement and Biometrics

One way to determine motion of the occupant(s) is to monitor the weight distribution of the occupant whereby changes in weight distribution after an accident would be highly suggestive of movement of the occupant.

A system for determining the weight distribution of the occupants can be integrated or otherwise arranged in the seats 3 and 4 of the vehicle and several patents and publications describe such systems.

More generally, any sensor that determines the presence and health state of an occupant can also be integrated into the vehicle interior monitoring system in accordance with the invention. For example, a sensitive motion sensor can determine whether an occupant is breathing and a chemical sensor, such as accomplished using SAW technology, can determine the amount of carbon dioxide, or the concentration of carbon dioxide, in the air in the vehicle, which can be correlated to the health state of the occupant(s). The motion sensor and chemical sensor can be designed to have a fixed operational field situated near the occupant. In the alternative, the motion sensor and chemical sensor can be adjustable and adapted to adjust their operational field in conjunction with a determination by an occupant position and location sensor that would determine the location of specific parts of the occupant's body such as his or her chest or mouth. Furthermore, an occupant position and location sensor can be used to determine the location of the occupant's eyes and determine whether the occupant is conscious, that is, whether his or her eyes are open or closed or moving.

Chemical sensors can also be used to detect whether there is blood present in the vehicle such as after an accident. Additionally, microphones can detect whether there is noise in the vehicle caused by groaning, yelling, etc., and transmit any such noise through the cellular or similar connection to a remote listening facility using a telematics communication system such as operated by OnStar™.

FIG. 2A shows a schematic diagram of an embodiment of the invention including a system for determining the presence and health state of any occupants of the vehicle and a telecommunications link. This embodiment includes means for determining the presence of any occupants 150, which may take the form of a heartbeat sensor, chemical sensor or motion sensor as described above and means for determining the health state of any occupants 151. The latter means may be integrated into the means for determining the presence of any occupants using the same or different component. The presence determining means 150 may encompass a dedicated presence determination device associated with each seating location in the vehicle, or at least sufficient presence determination devices having the ability to determine the presence of an occupant at each seating location in the vehicle. Further, means for determining the location, and optionally velocity, of the occupants or one or more parts thereof 152 are provided and may be any conventional occupant position sensor or preferably, one of the occupant position sensors as described herein such as those utilizing waves such as electromagnetic radiation or fields such as capacitance sensors or as described in the current assignee's patents and patent applications referenced above.

A processor 153 is coupled to the presence determining means 150, the health state determining means 151 and the location determining means 152. A communications unit 154 is coupled to the processor 153. The processor 153 and/or communications unit 154 can also be coupled to microphones 158 that can be distributed throughout the vehicle passenger compartment and include voice-processing circuitry to enable the occupant(s) to effect vocal control of the processor 153, communications unit 154 or any coupled component or oral communications via the communications unit 154. The processor 153 is also coupled to another vehicular system, component or subsystem 155 and can issue control commands to effect adjustment of the operating conditions of the system, component or subsystem. Such a system, component or subsystem can be the heating or air-conditioning system, the entertainment system, an occupant restraint device such as an airbag, a glare prevention system, etc. Also, a positioning system 156, such as a GPS or differential GPS system, could be coupled to the processor 153 and provides an indication of the absolute position of the vehicle.

Weight sensors 7, 76 and 97 are also included in the system shown in FIGS. 6 and 6A. Although strain gage type sensors are schematically illustrated mounted to the supporting structure of the seat portion 4, and a bladder pressure sensor mounted in the seat portion 4, any other type of weight sensor can be used including mat or butt spring sensors. Strain gage weight sensors are described in detail in U.S. Pat. No. 06,242,701 as well as herein. Weight can be used to confirm the occupancy of the seat, i.e., the presence or absence of an occupant as well as whether the seat is occupied by a light or heavy object. In the latter case, a measured weight of less than 60 pounds is often determinative of the presence of a child seat whereas a measured weight of greater than 60 pounds is often indicative of the absence of a child seat. The weight sensors 7 can also be used to determine the weight distribution of the occupant of the seat and thereby ascertain whether the occupant is moving and the position of the occupant. As such, the weight sensors 7 could be used to confirm the position and motion of the occupant. The measured weight or distribution thereof can also be used in combination with the data from the transmitter/receiver assemblies 49, 50, 51, 52 and 54 of FIG. 8C to provide an identification of the occupants in the seat.

As discussed below, weight can be measured both statically and dynamically. Static weight measurements require that the pressure or strain gage system be accurately calibrated and care must be taken to compensate for the effects of seatbelt load, aging, unwanted stresses in the mounting structures, temperature etc. Dynamic measurements, on the other hand, can be used to measure the mass of an object on the seat, the presence of a seatbelt load and can be made insensitive to unwanted static stresses in the supporting members and to aging of the seat and its structure. In the simplest implementation, the natural frequency of seat is determined due to the random vibrations or accelerations that are input to the seat from the vehicle suspension system. In more sophisticated embodiments, an accelerometer and/or seatbelt tension sensor is also used to more accurately determine the forces acting on the occupant. In another embodiment, a vibrator can be used in conjunction with the seat to excite the seat occupying item either on a total basis or on a local basis using PVDF film as an exciter and a determination of the contact pattern of the occupant with the seat determined by the local response to the PVDF film. This latter method using the PVDF film or equivalent is closer to a pattern determination rather than a true weight measurement.

Although many weight sensing systems are described herein, this invention is, among other things, directed to the use of weight in any manner to determine the occupancy of a vehicle. Prior art mat sensors determined the occupancy through the butt print of the occupying item rather than actually measuring its weight. In an even more general sense, this invention is the use of any biometric measurement to determine vehicle occupancy.

6.1 Strain Gage Weight Sensors

Figure 42:
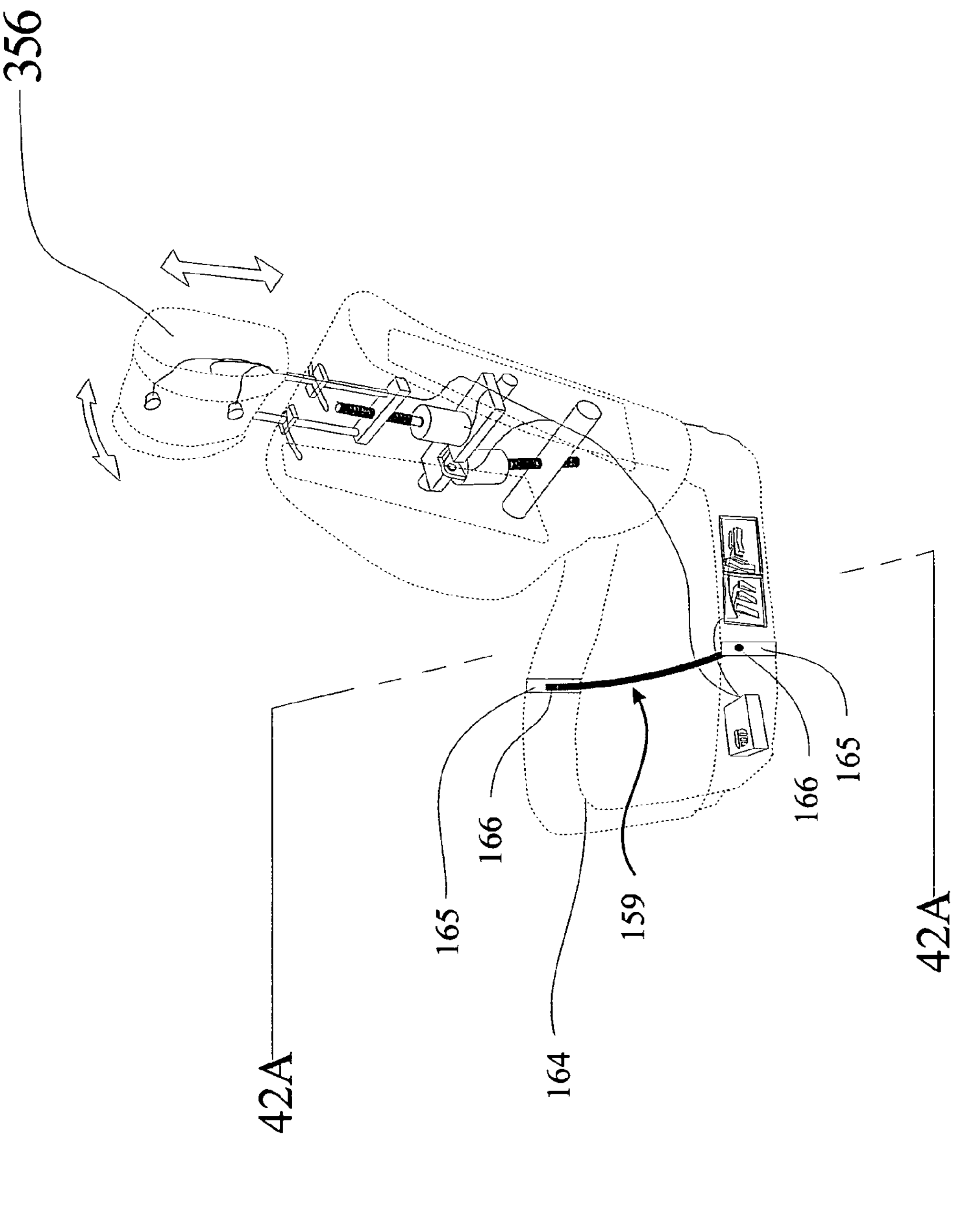
FIG. 42 is a perspective view of the seat shown in FIG. 48 with the addition of a weight sensor shown mounted onto the seat.
Figure 42A:
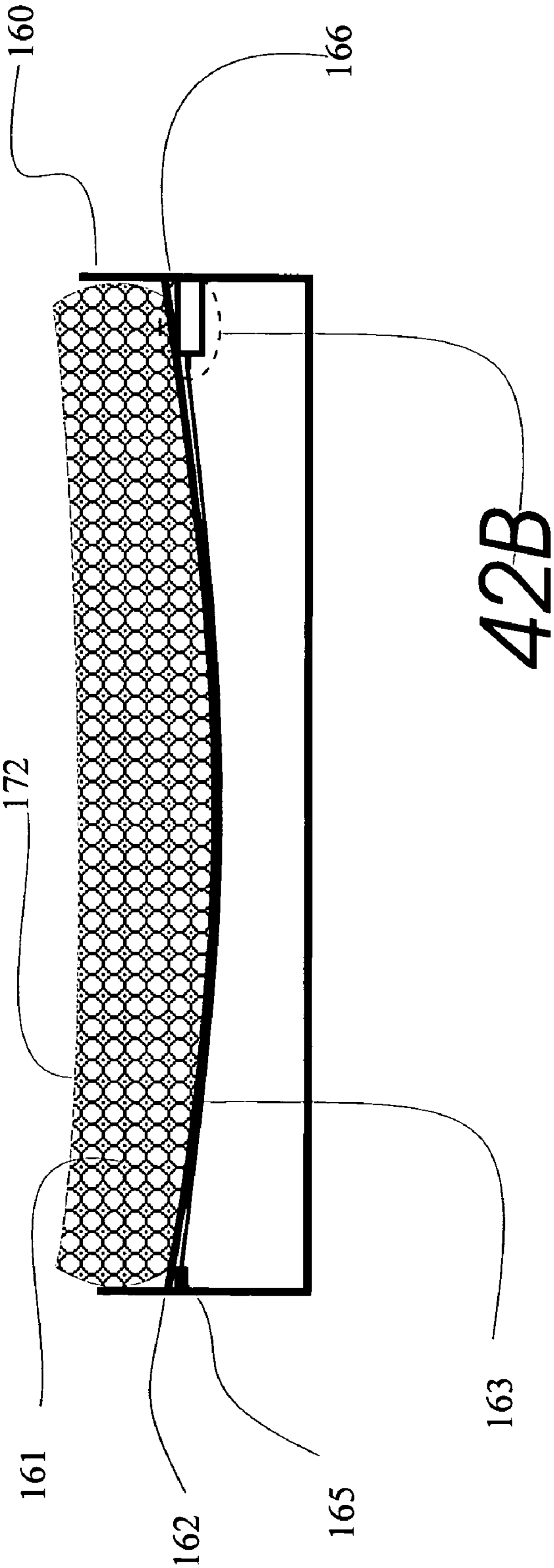
FIG. 42A is a view taken along line 42A-24A in FIG. 42.
Figure 42B:
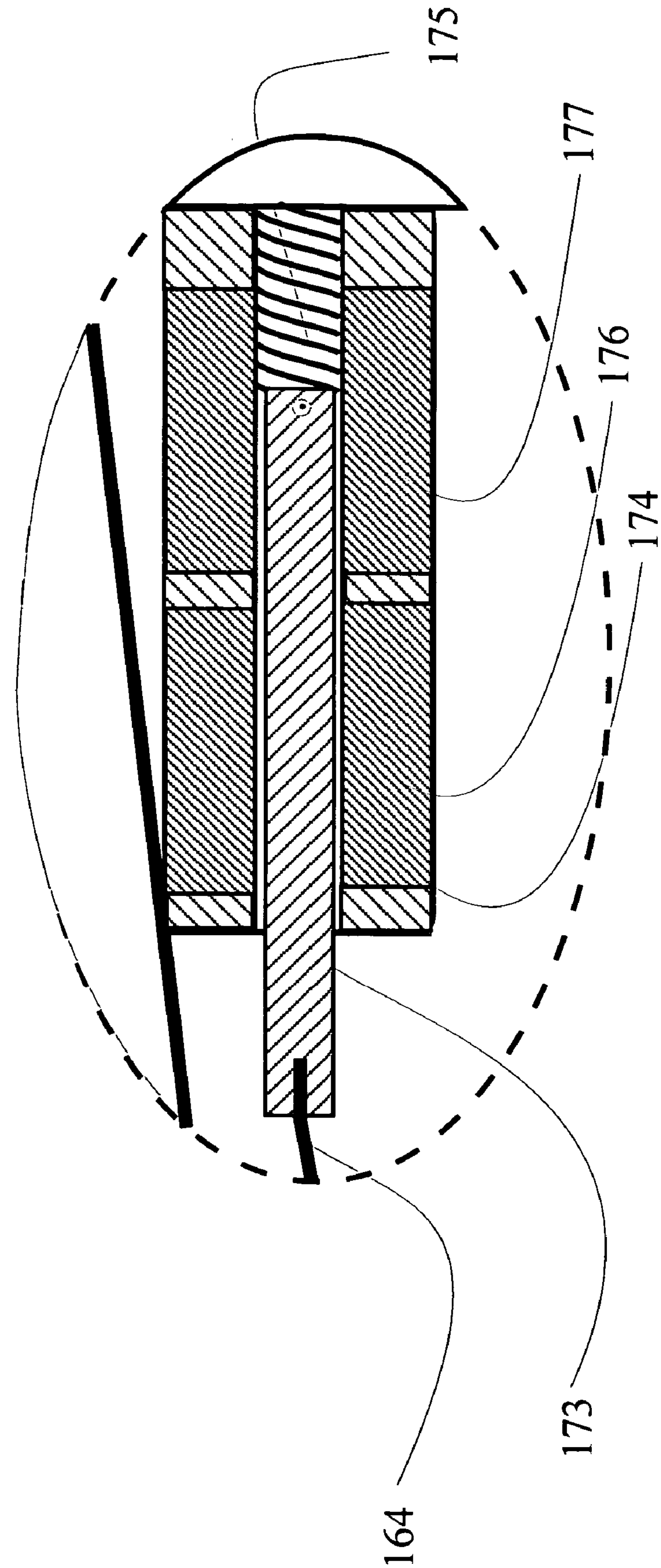
FIG. 42B is an enlarged view of the section designated 42B in FIG. 42.
Figure 42C:
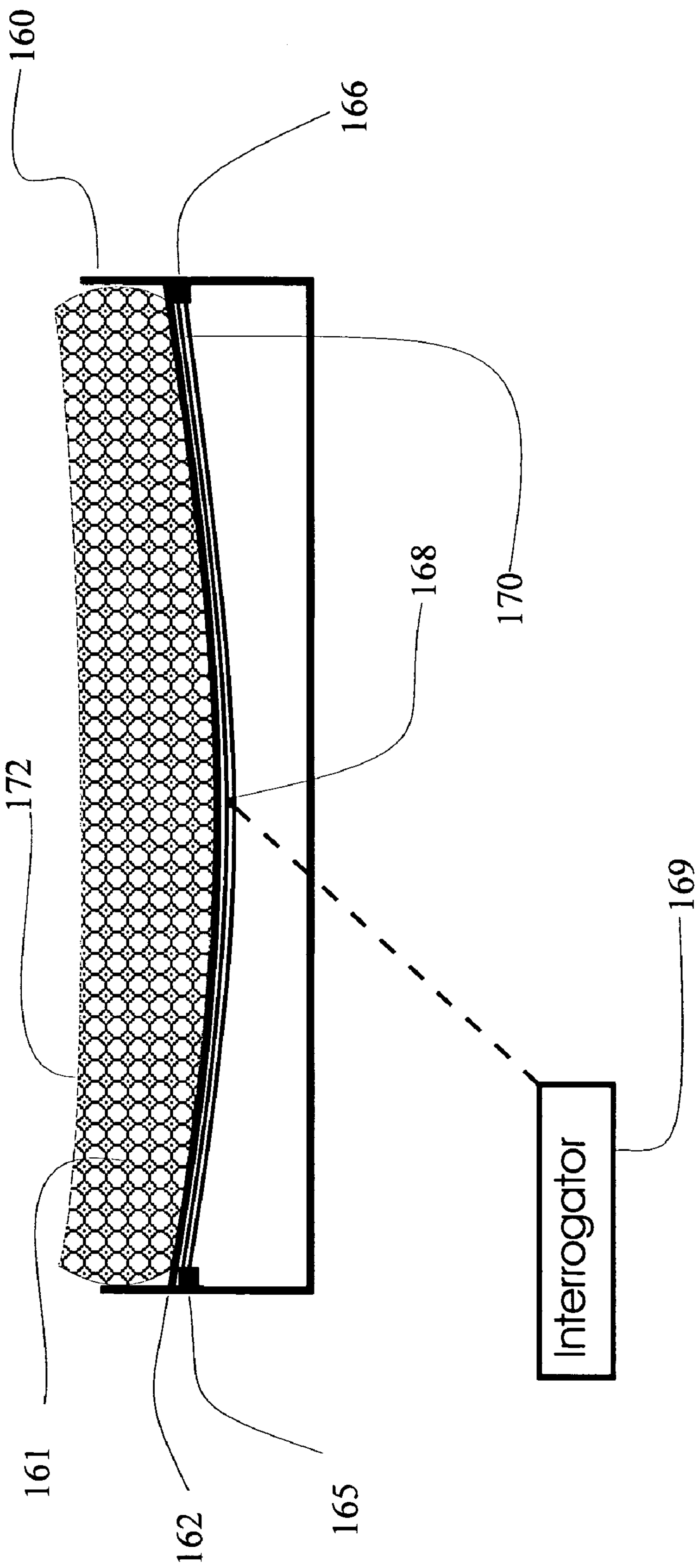
FIG. 42C is a view of another embodiment of a seat with a weight sensor similar to the view shown in FIG. 42A.

Referring now to FIG. 42A, which is a view of the apparatus of FIG. 42 taken along line 42A-42A, seat 160 is constructed from a cushion or foam layer 161 which is supported by a spring system 162 which is in contact and/or association with the displacement sensor 163. As shown, displacement sensor 163 is underneath the spring system 162 but this relative positioning is not a required feature of the invention. The displacement sensor 163 comprises an elongate cable 164 retained at one end by support 165 and a displacement sensor 166 situated at an opposite end. This displacement sensor 166 can be any of a variety of such devices including, but not limited to, a linear rheostat, a linear variable differential transformer (LVDT), a linear variable capacitor, or any other length measuring device. Alternately, as shown in FIG. 42C, the cable can be replaced with one or more springs 167 retained between supports 165 and the tension in the spring measured using a strain gage (conventional wire or foil or a SAW strain gage) or other force measuring device 168 or the strain in the seat support structure can be measured by appropriately placing strain gages on one or more of the seat supports as described in more detail below. The strain gage or other force measuring device could be arranged in association with the spring system 162 and could measure the deflection of the bottom surface of the cushion or foam layer 161.

When a SAW strain gage 168 is used as part of weight sensor 163, an interrogator 169 could be placed on the vehicle to enable wireless communication and/or power transfer to the SAW strain gage 168. As such, when it is desired to obtain the force being applied by the occupying item on the seat, the interrogator 169 sends a radio signal to the SAW strain gage causing it to transmit a return signal with the measured strain of the spring 170. Interrogator 169 is coupled to the processor used to determine the control of the vehicle component.

Figure 42D:
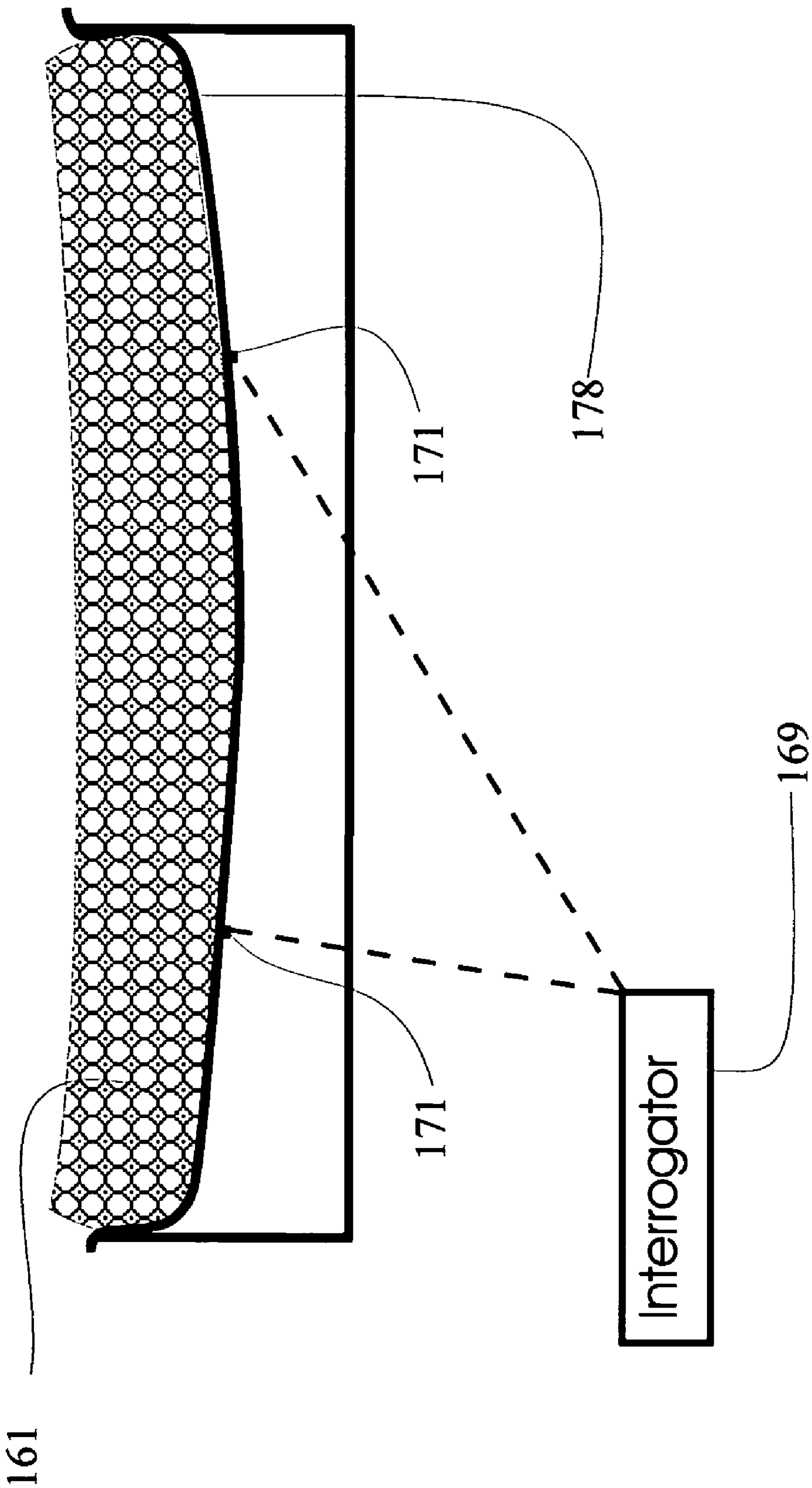
FIG. 42D is a view of another embodiment of a seat with a weight sensor in which a SAW strain gage is placed on the bottom surface of the cushion.

As shown in FIG. 42D, one or more SAW strain gages 171 could also be placed on the bottom surface or support pan 178 of the cushion or foam layer 161 in order to measure the deflection of the bottom surface which is representative of the weight of the occupying item to the seat. An interrogator 169 could also be used in this embodiment.

One seat design is illustrated in FIG. 42. Similar weight measurement systems can be designed for other seat designs. Also, some products are available which can approximately measure weight based on pressure measurements made at or near the upper seat surface 172. It should be noted that the weight measured here will not be the entire weight of the occupant since some of the occupant's weight will be supported by his or her feet which are resting on the floor or pedals. As noted above, the weight may also be measured by the weight sensor(s) 97, 76 and 7 described above in the seated-state detecting unit.

As weight is placed on the seat surface 172, it is supported by spring 162 which deflects downward causing cable 164 of the sensor 163 to begin to stretch axially. Using a LVDT as an example of length measuring device 166, the cable 164 pulls on rod 173 tending to remove rod 173 from cylinder 174 (FIG. 42B). The movement of rod 173 out of cylinder 174 is resisted by a spring 175 which returns the rod 173 into the cylinder 174 when the weight is removed from the seat surface 172. The amount which the rod 173 is removed from the cylinder 174 is measured by the amount of coupling between the windings 176 and 177 of the transformer as is well understood by those skilled in the art. LVDT's are commercially available devices. In this matter, the deflection of the seat can be measured which is a measurement of the weight on the seat. The exact relationship between weight and LVDT output is generally determined experimentally for this application.

SAW strain gages could also be used to determine the downward deflection of the spring 162 and the deflection of the cable 164.

By use of a combination of weight and height, the driver of the vehicle can in general be positively identified among the class of drivers who operate the vehicle. Thus, when a particular driver first uses the vehicle, the seat will be automatically adjusted to the proper position. If the driver changes that position within a prescribed time period, the new seat position can be stored in the second table for the particular driver's height and weight. When the driver reenters the vehicle and his or her height and weight are again measured, the seat will go to the location specified in the second table if one exists. Otherwise, the location specified in the first table will be used. Naturally other methods having similar end results can be used.

Figure 43:
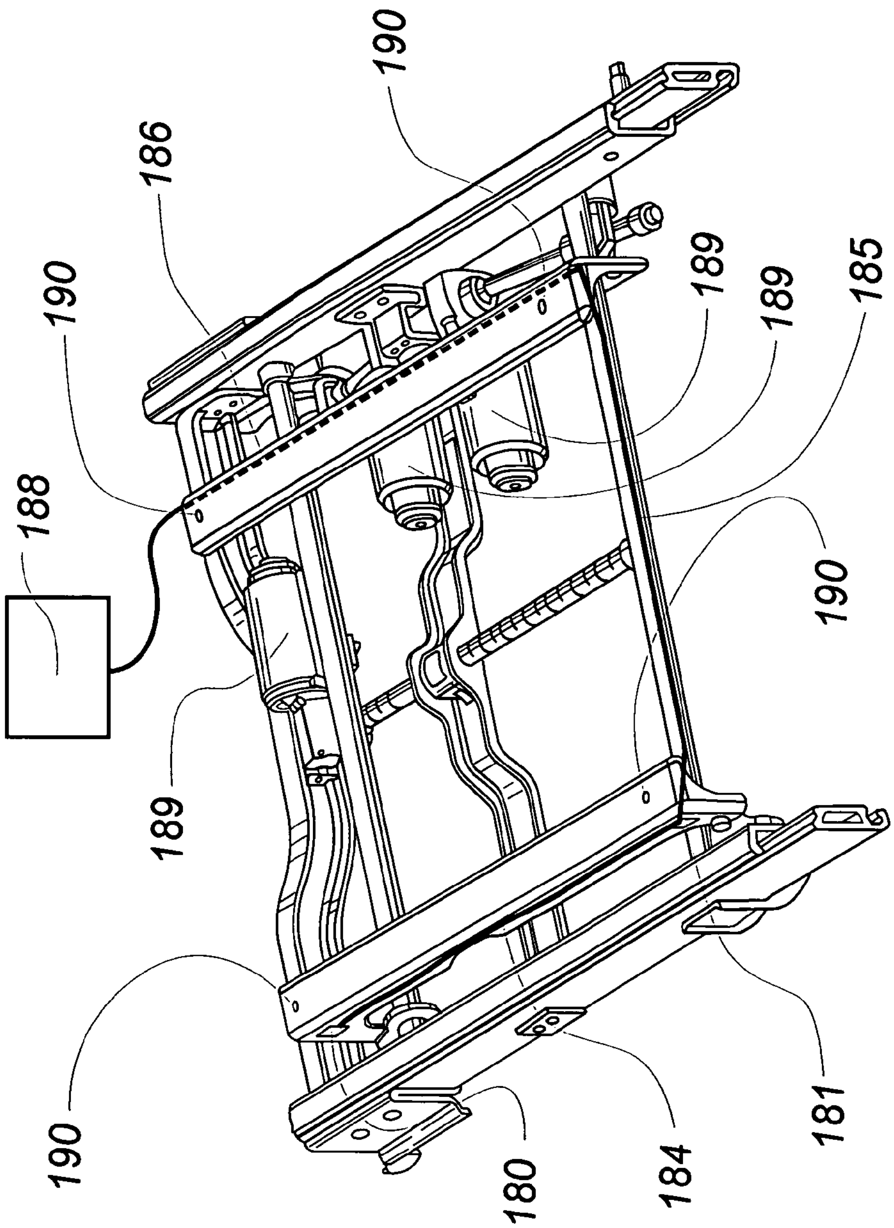
FIG. 43 is a perspective view of a one embodiment of an apparatus for measuring the weight of an occupying item of a seat illustrating weight sensing transducers mounted on a seat control mechanism portion which is attached directly to the seat.

In a first embodiment of a weight measuring apparatus shown in FIG. 43, four strain gage weight sensors or transducers are used, two being illustrated at 180 and 181 on one side of a bracket of the support structure of the seat and the other two being at the same locations on another bracket of the support (i.e., hidden on the corresponding locations on the other side of the support). The support structure of the seat supports the seat on a substrate such as a floor pan of the vehicle. Each of the strain gage transducers 180,181 also can contain electronic signal conditioning apparatus, e.g., amplifiers, analog to digital converters, filters etc., which is associated such that output from the transducers is a digital signal. Such signal conditioning apparatus can also eliminate residual stresses in the transducers that may be present from the manufacturing, assembly or mounting processes or due to seat motion or temperature. The electronic signal travels from transducer 180 to transducer 181 through a wire 184. Similarly, wire 185 transmits the output from transducers 180 and 181 to the next transducer in the sequence (one of the hidden transducers). Additionally, wire 186 carries the output from these three transducers toward the fourth transducer (the other hidden transducer) and wire 187 finally carries all four digital signals to an electronic control system or module 188. These signals from the transducers 180, 181 are time or frequency division multiplexed as is well known in the art. The seat position is controlled by motors 189 as described in detail in U.S. Pat. No. 05,179,576. Finally, the seat is bolted onto the support structure through bolts not shown which attach the seat through holes 190 in the brackets.

By placing the signal conditioning electronics, analog to digital converters, and other appropriate electronic circuitry adjacent the strain gage element, the four transducers can be daisy chained or otherwise attach together and only a single wire is required to connect all of the transducers to the control module 188 as well as provide the power to run the transducers and their associated electronics.

The control system 188, e.g., a microprocessor, is arranged to receive the digital signals from the transducers 180,181 and determine the weight of the occupying item of the seat based thereon. In other words, the signals from the transducers 180,181 are processed by the control system 188 to provide an indication of the weight of the occupying item of the seat, i.e., the force exerted by the occupying item on the seat support structure.

Figure 44:
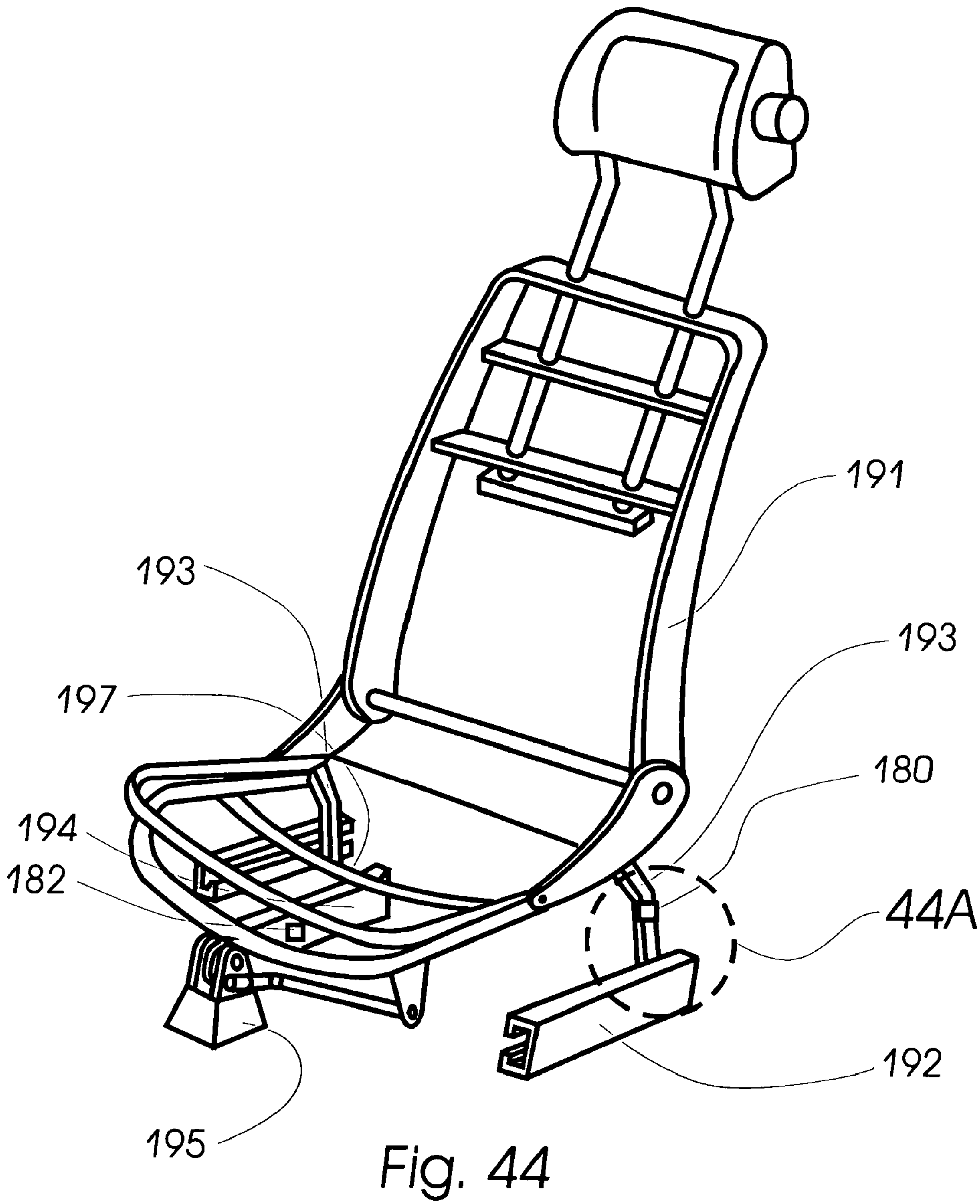
FIG. 44 illustrates a seat structure with the seat cushion and back cushion removed illustrating a three-slide attachment of the seat to the vehicle and preferred mounting locations on the seat structure for strain measuring weight sensors of an apparatus for measuring the weight of an occupying item of a seat in accordance with the invention.

A typical manually controlled seat structure is illustrated in FIG. 44 and described in greater detail in U.S. Pat. No. 04,285,545. The seat 191 (only the frame of which is shown) is attached to a pair of slide mechanisms 192 in the rear thereof through support members such as rectangular tubular structures 193 angled between the seat 191 and the slide mechanisms 192. The front of the seat 191 is attached to the vehicle (more particularly to the floor pan) through another support member such as a slide member 194, which is engaged with a housing 195. Slide mechanisms 192, support members 193, slide member 194 and housing 195 constitute the support structure for mounting the seat on a substrate, i.e., the floor pan. Strain gage transducers are located for this implementation at 180 and 182, strain gage transducer 180 being mounted on each tubular structure 193 (only one of such strain gage is shown) and strain gage transducer 182 being mounted on slide member 194. When an occupying item is situated on the seat cushion (not shown), each of the support members 193 and 194 are deformed or strained. This strain is measured by transducers 180 and 182, respectively, to enable a determination of the weight of the item occupying the seat, as can be understood by those skilled in the strain gage art. More specifically, a control system or module or other compatible processing unit (not shown) is coupled to the strain gage transducers 180,182, e.g., via electrical wires (not shown), to receive the measured strain and utilize the measured strain to determine the weight of the occupying item of the seat. The determined weight, or the raw measured strain, may be used to control a vehicular component such as the airbag.

Support members 193 are substantially vertically oriented and are preferably made of a sufficiently rigid, non-bending component.

Figure 44A:
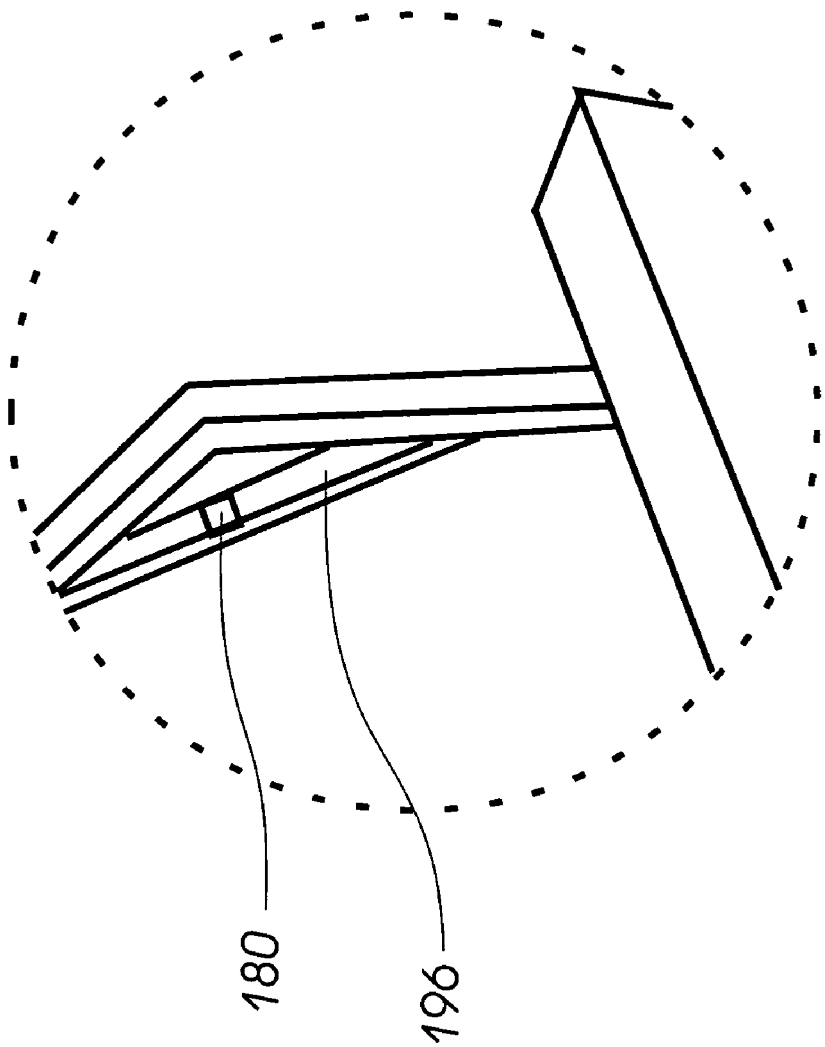
FIG. 44A illustrates an alternate view of the seat structure transducer mounting location taken in the circle 44A of FIG. 44 with the addition of a gusset and where the strain gage is mounted onto the gusset.

FIG. 44A illustrates an alternate arrangement for the seat support structures wherein a gusset 196 has been added to bridge the angle on the support member 193. Strain gage transducer 180 is placed on this gusset 196. Since the gusset 196 is not a supporting member, it can be made considerably thinner than the seat support member 193. As the seat is loaded by an occupying item, the seat support member 193 will bend. Since the gusset 196 is relatively weak, greater strain will occur in the gusset 196 than in the support member 193. The existence of this greater strain permits more efficient use of the strain gage dynamic range thus improving the accuracy of the weight measurement.

Figure 44B:
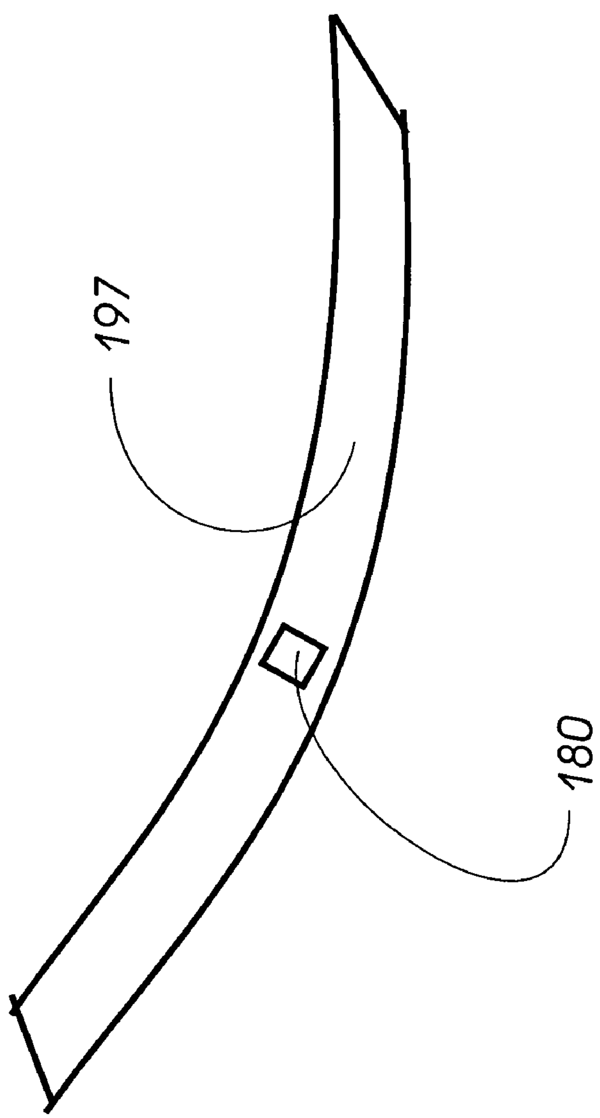
FIG. 44B illustrates a mounting location for a weight sensing transducer on a centralized transverse support member in an apparatus for measuring the weight of an occupying item of a seat in accordance with the invention.

FIG. 44B illustrates a seat transverse support member 197 of the seat shown in FIG. 44, which is situated below the base cushion and extends between opposed lateral sides of the seat. This support member 197 will be directly loaded by the vehicle seat and thus will provide an average measurement of the force exerted or weight of the occupying item. The deflection or strain in support member 197 is measured by a strain gage transducer 180 mounted on the support member 197 for this purpose. In some applications, the support member 197 will occupy the entire space fore and aft below the seat cushion. Here it is shown as a relatively narrow member. The strain gage transducer 180 is coupled, e.g., via an electrical wire (not shown), to a control module or other processing unit (not shown) which utilizes the measured strain to determine the weight of the occupying item of the seat.

Figures 45A, 45B, 45C:
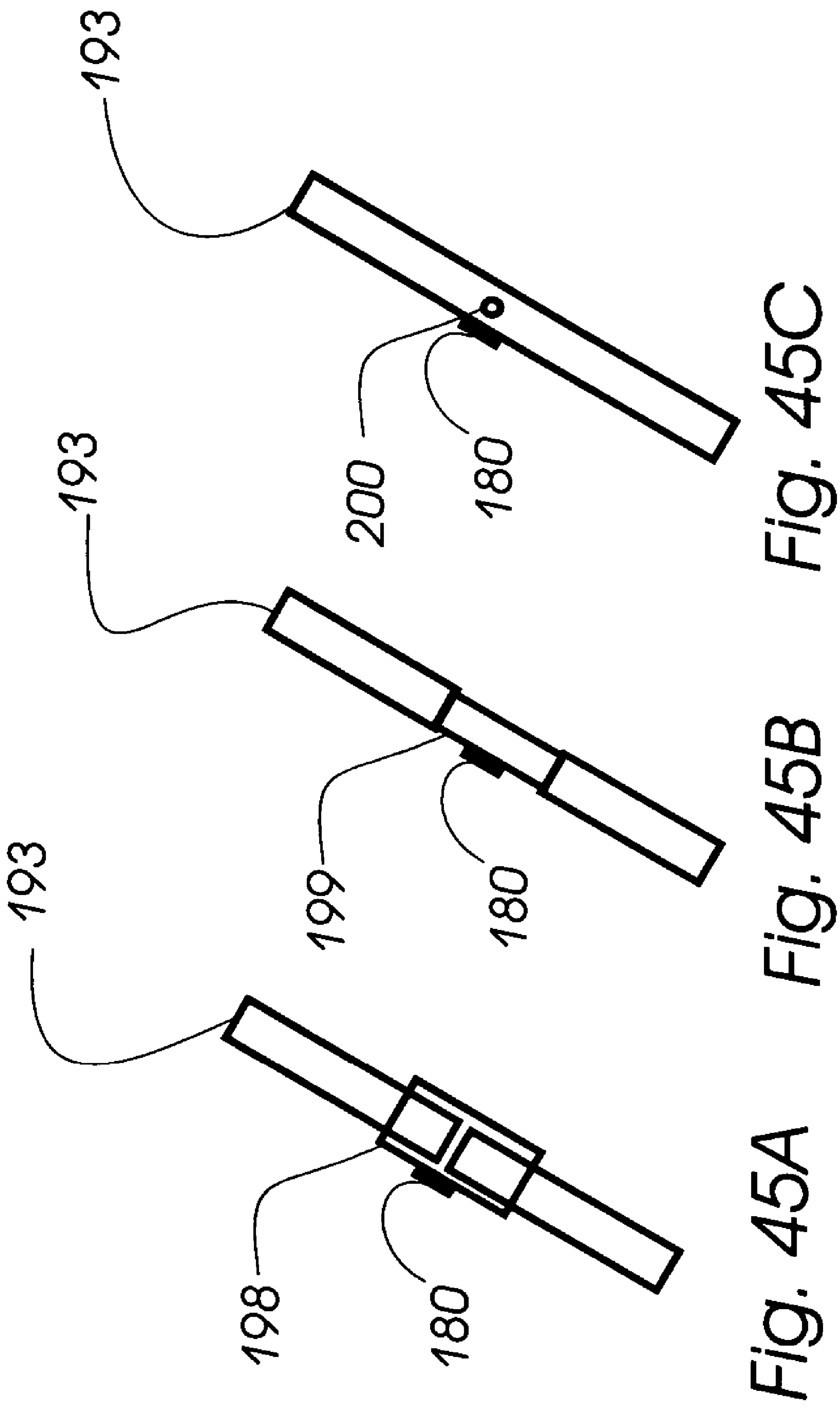
FIGS. 45A, 45B and 45C illustrate three alternate methods of mounting strain transducers of an apparatus for measuring the weight of an occupying item of a seat in accordance with the invention onto a tubular seat support structural member.

In FIG. 44, the support members 193 are shown as rectangular tubes having an end connected to the seat 191 and an opposite end connected to the slide mechanisms 192. In the constructions shown in FIGS. 45A-45C, the rectangular tubular structure has been replaced by a circular tube where only the lower portion of the support is illustrated. FIGS. 45A-45C show three alternate ways of improving the accuracy of the strain gage system, i.e., the accuracy of the measurements of strain by the strain gage transducers. Generally, a reduction in the stiffness of the support member to which the strain gage transducer is mounted will concentrate the force and thereby improve the strain measurement. There are several means disclosed below to reduce the stiffness of the support member. These means are not exclusive and other ways to reduce the stiffness of the support member are included in the invention and the interpretation of the claims.

In each illustrated embodiment, the transducer is represented by 180 and the substantially vertically oriented support member corresponding to support member 193 in FIG. 44 has been labeled 193A. In FIG. 45A, the tube support member 193A has been cut to thereby form two separate tubes having longitudinally opposed ends and an additional tube section 198 is connected, e.g., by welding, to end portions of the two tubes. In this manner, a more accurate tube section 198 can be used to permit a more accurate measurement of the strain by transducer 180, which is mounted on tube section 198.

In FIG. 45B, a small circumferential cut has been made in tube support member 193A so that a region having a smaller circumference than a remaining portion of the tube support member 193A is formed. This cut is used to control the diameter of the tube support member 193A at the location where strain gage transducer 180 is measuring the strain. In other words, the strain gage transducer 180 is placed at a portion wherein the diameter thereof is less than the diameter of remaining portions of the tube support member 193A. The purpose of this cut is to correct for manufacturing variations in the diameter of the tube support member 193A.

The magnitude of the cut is selected so as to not significantly weaken the structural member but instead to control the diameter tolerance on the tube so that the strain from one vehicle to another will be the same for a particular loading of the seat.

In FIG. 45C, a small hole 200 is made in the tube support member 193A adjacent the transducer 180 to compensate for manufacturing tolerances on the tube support member 193A.

From this discussion, it can be seen that all three techniques have as their primary purpose to provide increase the accuracy of the strain in the support member corresponding to weight on the vehicle seat. Naturally, the preferred approach would be to control the manufacturing tolerances on the support structure tubing so that the variation from vehicle to vehicle is minimized. For some applications where accurate measurements of weight are desired, the seat structure will be designed to optimize the ability to measure the strain in the support members and thereby to optimize the measurement of the weight of the occupying item. The inventions disclosed herein, therefore, are intended to cover the entire seat when the design of the seat is such as to be optimized for the purpose of strain gage weight sensing and alternately for the seat structure when it is so optimized.

Figure 46:
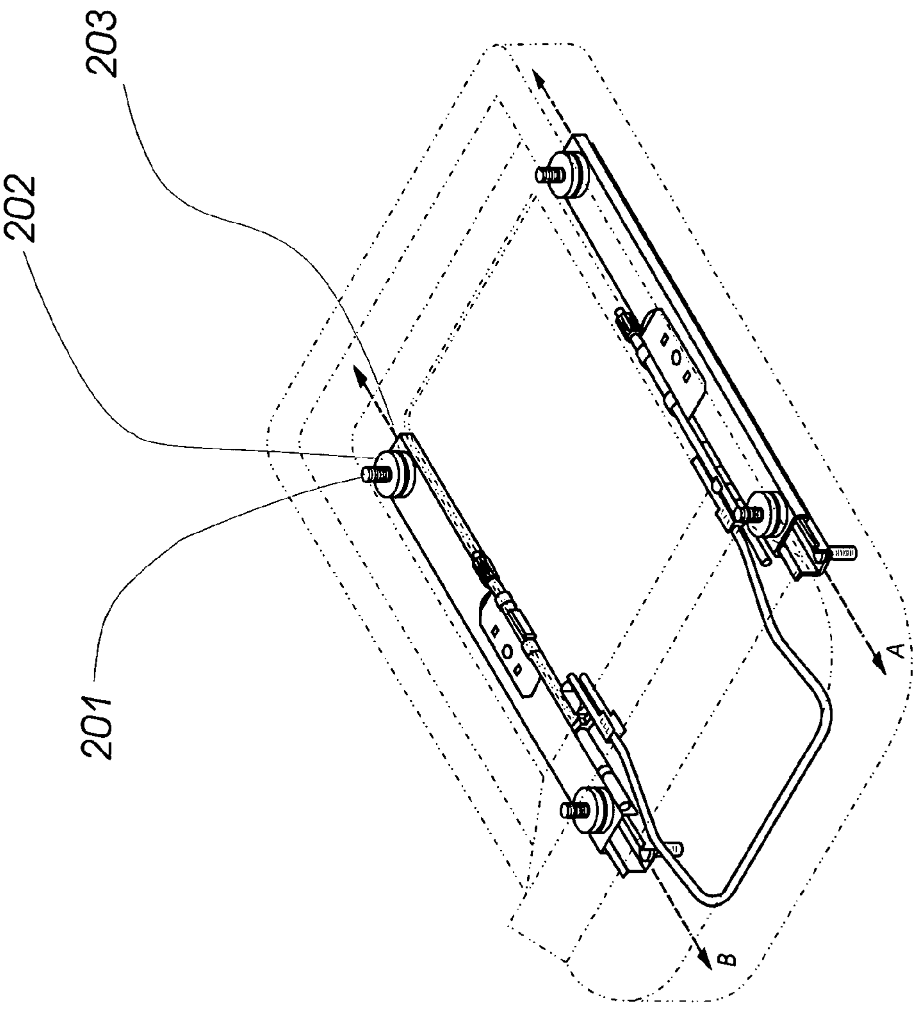
FIG. 46 illustrates an alternate weight sensing transducer utilizing pressure sensitive transducers.

Although strain measurement devices have been discussed above, pressure measurement systems can also be used in the seat support structure to measure the weight on the seat. Such a system is illustrated in FIG. 46. A general description of the operation of this apparatus is disclosed in U.S. Pat. No. 05,785,291. In that patent, the vehicle seat is attached to the slide mechanism by means of bolts 201. Between the seat and the slide mechanism, a shock-absorbing washer has been used for each bolt. In the present invention, this shock-absorbing washer has been replaced by a sandwich construction consisting of two washers of shock absorbing material 202 with a pressure sensitive material 203 sandwiched in between.

A variety of materials can be used for the pressure sensitive material 203, which generally work on either the capacitance or resistive change of the material as it is compressed. The wires from this material leading to the electronic control system are not shown in this view. The pressure sensitive material is coupled to the control system, e.g., a microprocessor, and provides the control system with an indication of the pressure applied by the seat on the slide mechanism which is related to the weight of the occupying item of the seat. Generally, material 203 is constructed with electrodes on the opposing faces such that as the material is compressed, the spacing between the electrodes is decreased. This spacing change thereby changes both the resistive and the capacitance of the sandwich which can be measured and which is a function of the compressive force on the material. Measurement of the change in capacitance of the sandwich, i.e., two spaced apart conductive members, is obtained by any method known to those skilled in the art, e.g., connecting the electrodes in a circuit with a source of alternating or direct current. The conductive members may be made of a metal. The use of such a pressure sensor is not limited to the illustrated embodiment wherein the shock absorbing material 202 and pressure sensitive material 203 are placed around bolt 201. It is also not limited to the use or incorporation of shock absorbing material in the implementation.

Figure 46A:
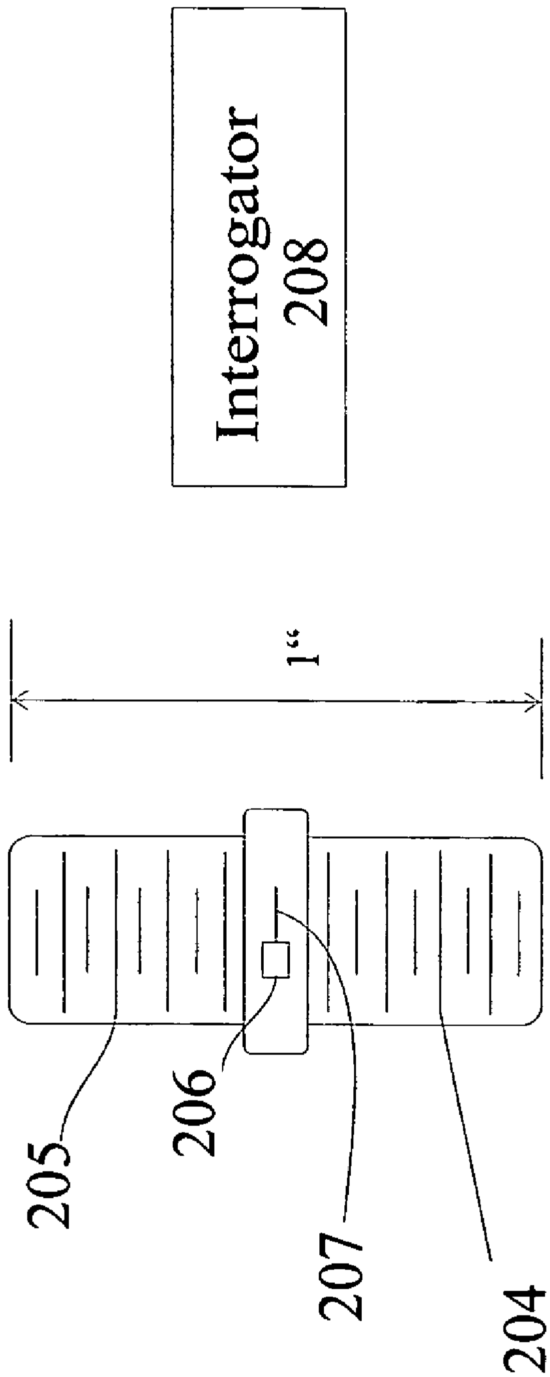
FIG. 46A illustrates a part of another alternate weight sensing system for a seat.

FIG. 46A shows a substitute construction for the bolt 201 in FIG. 46 and which construction is preferably arranged in connection with the seat and the adjustment slide mechanism. A bolt-like member, hereinafter referred to as a stud 204, is threaded 205 on both ends with a portion remaining unthreaded between the ends. A SAW strain measuring device including a SAW strain gage 206 and antenna 207 is arranged on the center unthreaded section of the stud 400 and the stud 400 is attached at its ends to the seat and the slide mechanism using appropriate threaded nuts. Based on the particular geometry of the SAW device used, the stud 400 can result in as little as a 3 mm upward displacement of the seat compared to a normal bolt mounting system. No wires are required to attach the SAW device to the stud 204. The total length of stud 204 may be as little as 1 inch.

In operation, an interrogator 208 transmits a radio frequency pulse at for example, 925 MHz which excites the antenna 207 associated with the SAW strain gage 206. After a delay caused by the time required for the wave to travel the length of the SAW device; a modified wave is re-transmitted to the interrogator 208 providing an indication of the strain and thus a representative value of the weight of an object occupying the seat. For a seat which is normally bolted to the slide mechanism with four bolts, at least four SAW strain measuring devices or sensors would be used. Each conventional bolt could thus be replaced by a stud as described above. Naturally, since the individual SAW devices are very small, multiple such SAW devices can be placed on the stud to provide multiple redundant measurements or to permit the stud to be arbitrarily located with at least one SAW device always within direct view of the interrogator antenna.

To avoid potential problems with electromagnetic interference, the stud 204 may be made of a non-metallic, possibly composite, material which would not likely cause or contribute to any possible electromagnetic wave interference. The stud 204 could also be modified for use as an antenna.

If the seat is unoccupied then the interrogation frequency can be substantially reduced in comparison to when the seat is occupied. For an occupied seat, information as to the identity and/or category and position of an occupying item of the seat can be obtained through the use of multiple weight sensors. For this reason, and due to the fact that during pre-crash event the position of an occupying item of the seat may be changing rapidly, interrogations as frequently as once every 10 milliseconds or even faster can be desirable. This would also enable a distribution of the weight being applied to the seat being obtained which provides an estimation of the position of the object occupying the seat. Using pattern recognition technology, e.g., a trained neural network, sensor fusion, fuzzy logic, etc., the identification of the object can be ascertained based on the determined weight and/or determined weight distribution.

Although each of the SAW devices can be interrogated and/or powered using wireless means, in some cases, it may be desirable to supply power to and or obtained information from such devices using wires.

Figure 47:
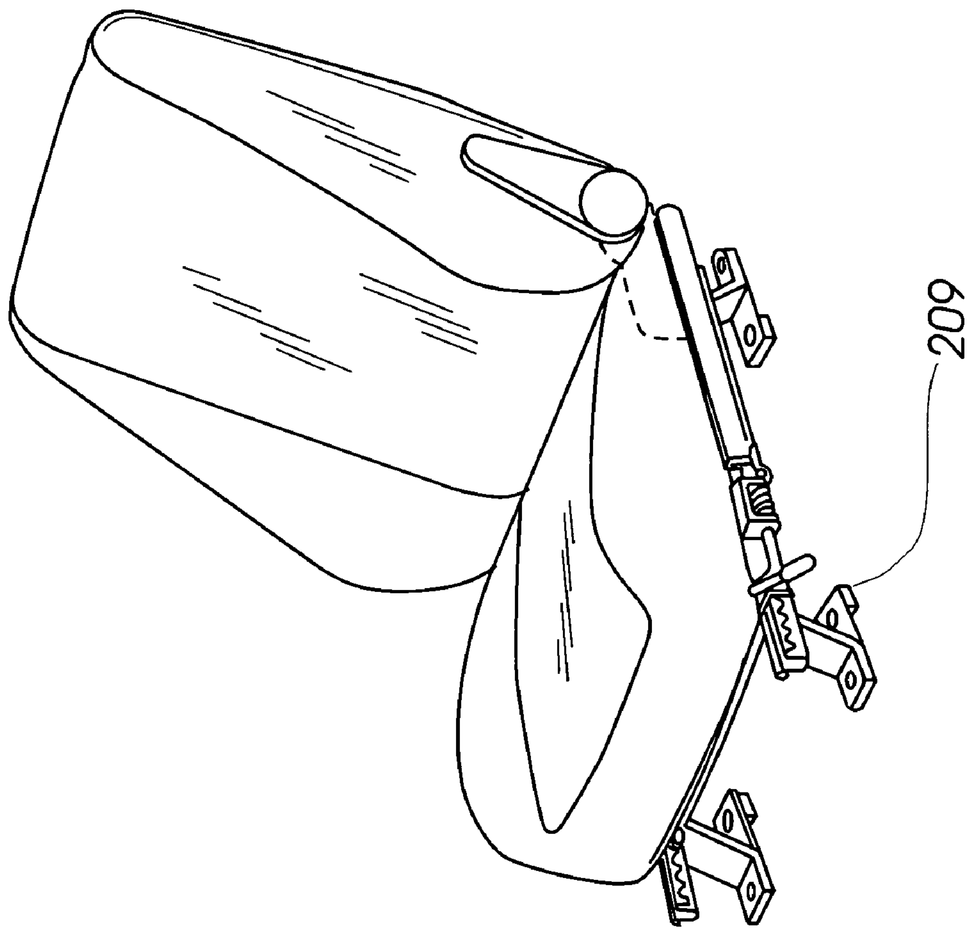
FIG. 47 illustrates an alternate seat structure assembly utilizing strain transducers.

In FIG. 47, which is a view of a seat attachment structure described in U.S. Pat. No. 05,531,503, where a more conventional strain gage load cell design designated 209 is utilized. One such load cell design 209 is illustrated in detail in FIG. 47A.

Figure 47A:
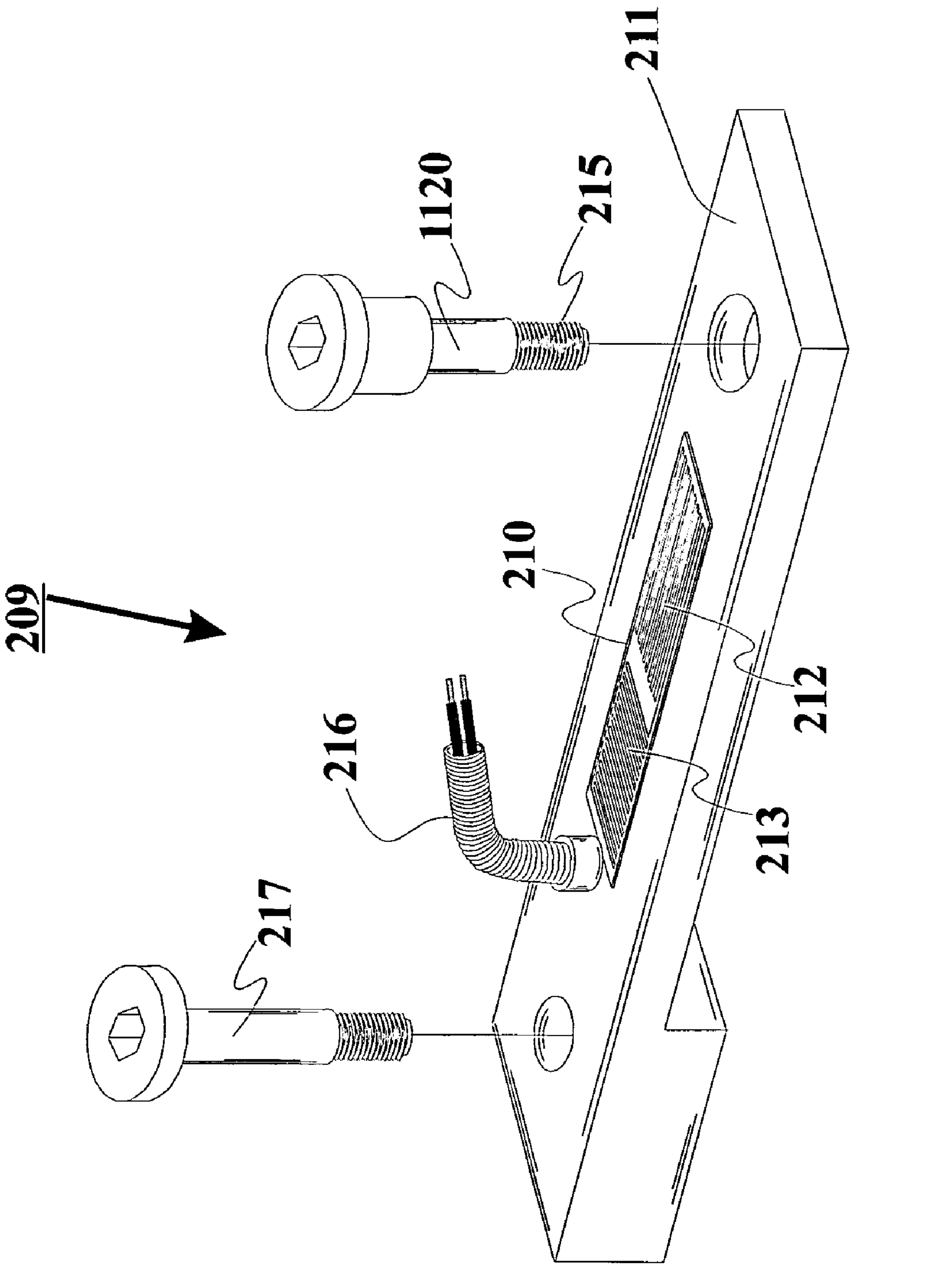
FIG. 47A is a perspective view of a cantilevered beam type load cell for use with the weight measurement system of this invention for mounting locations of FIG. 47, for example.

A cantilevered beam load cell design using a half bridge strain gage system 209 is shown in FIG. 47A. Fixed resistors mounted within the electronic package, which are not shown in this drawing, provide the remainder of the whetstone bridge system. The half bridge system is frequently used for economic reasons and where some sacrifice in accuracy is permissible. The load cell 209 includes a member 211 on which the strain gage 210 is situated. The strain gage assembly 209 includes strain-measuring elements 212 and 213 arranged on the load cell. The longitudinal element 212 measures the tensile strain in the beam when it is loaded by the seat and its contents, not shown, which is attached to end 215 of bolt 214. The load cell is mounted to the vehicle or other substrate using bolt 217. Temperature compensation is achieved in this system since the resistance change in strain elements 212 and 213 will vary the same amount with temperature and thus the voltage across the portions of the half bridge will remain the same. The strain gage 209 is coupled to a control system (e.g., a microprocessor-not shown) via wires 216 and receives the measured tensile strain and determines the weight of an occupying item of the seat based thereon.

One problem with using a cantilevered load cell is that it imparts a torque to the member on which it is mounted. One preferred mounting member on an automobile is the floor-pan which will support significant vertical loads but is poor at resisting torques since floor-pans are typically about 1 mm (0.04 inches) thick. This problem can be overcome through the use of a simply supported load cell design designated 220 as shown in FIG. 47B.

Figure 47B:
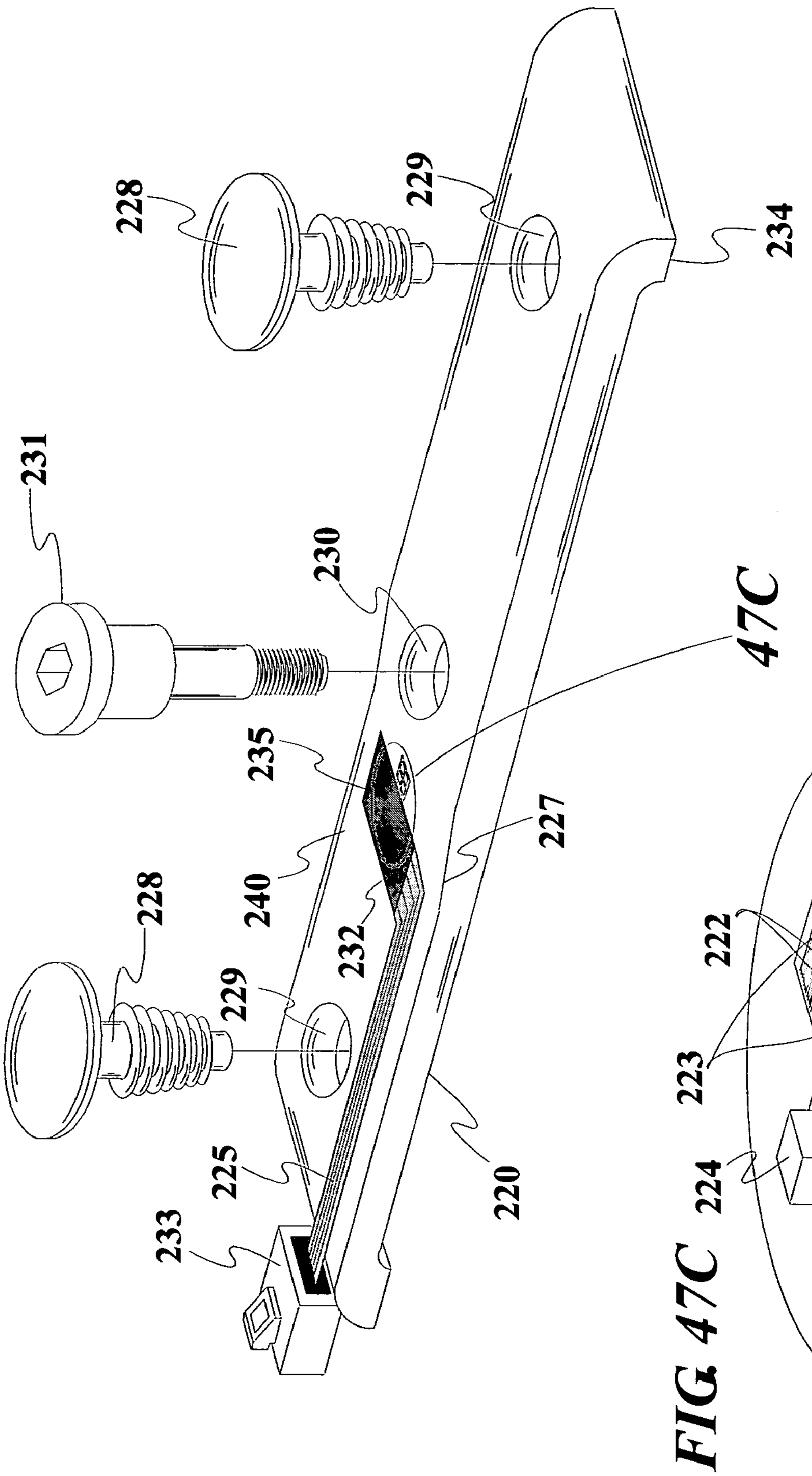
FIG. 47B is a perspective view of a simply supported beam type load cell for use with the weight measurement system of this invention as an alternate to the cantilevered load cell of FIG. 47A.
Figure 47C:
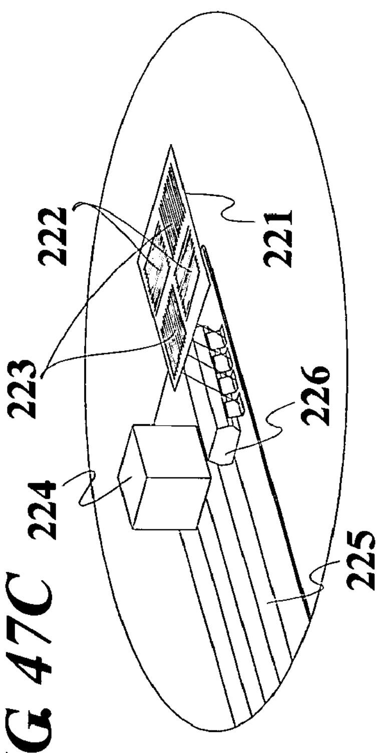
FIG. 47C is an enlarged view of the portion designated 47C in FIG. 47B.

In FIGS. 47B and 47C, a full bridge strain gage system 221 is used with all four elements 222, 223 mounted on the top of a beam 240. Elements 222 are mounted parallel to the beam 240 and elements 223 are mounted perpendicular to it. Since the maximum strain is in the middle of the beam 240, strain gage 221 is mounted close to that location. The load cell, shown generally as 220, is supported by the floor pan, not shown, at supports 234 that are formed by bending the beam 240 downward at its ends. Fasteners 228 fit through holes 229 in the beam 240 and serve to hold the load cell 220 to the floor pan without putting significant forces on the load cell 220. Holes are provided in the floor-pan for bolt 231 and for fasteners 228. Bolt 231 is attached to the load cell 220 through hole 230 of the beam 240 which serves to transfer the force from the seat to the load cell 220.

The electronics package is potted within hole 235 using urethane potting compound 232 and includes signal conditioning circuits, a microprocessor with integral ADCs 226 and a flex circuit 225 (FIG. 47C). The flex circuit 225 terminates at an electrical connector 233 for connection to other vehicle electronics, e.g., a control system. The beam 240 is slightly tapered at location 227 so that the strain is constant in the strain gage.

Figure 47D:
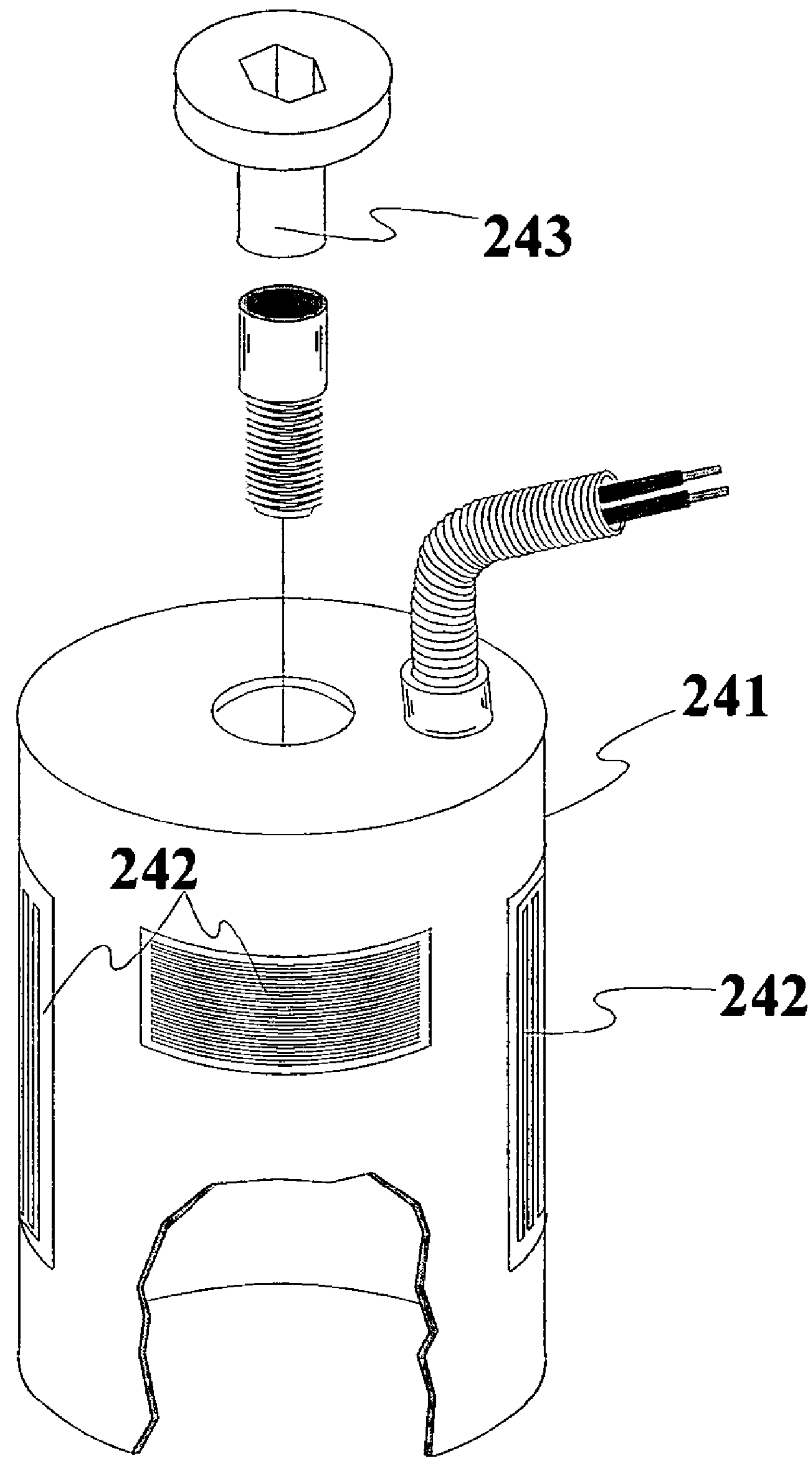
FIG. 47D is a perspective view of a tubular load cell for use with the weight measurement system of this invention as an alternate to the cantilevered load cell of FIG. 47A.

Although thus far only beam type load cells have been described, other geometries can also be used. One such geometry is a tubular type load cell. Such a tubular load cell is shown generally at 241 in FIG. 47D and instead of an elongate beam, it includes a tube. It also comprises a plurality of strain sensing elements 242 for measuring tensile and compressive strains in the tube as well as other elements, not shown, which are placed perpendicular to the elements 242 to provide for temperature compensation. Temperature compensation is achieved in this manner, as is well known to those skilled in the art of the use of strain gages in conjunction with a whetstone bridge circuit, since temperature changes will affect each of the strain gage elements identically and the total effect thus cancels out in the circuit. The same bolt 243 can be used in this case for mounting the load cell to the floor-pan and for attaching the seat to the load cell.

Figure 47E:
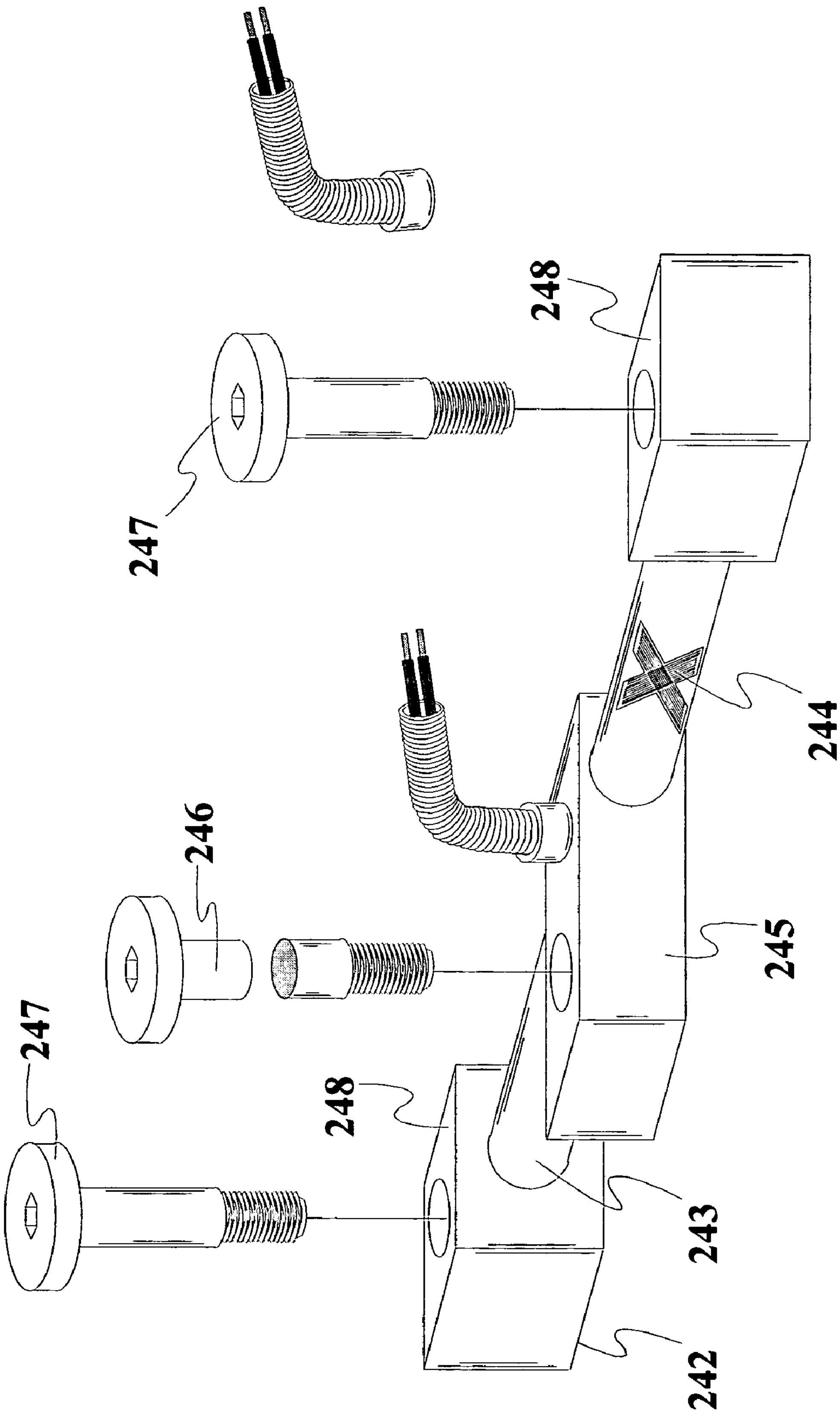
FIG. 47E is a perspective view of a torsional beam load cell for use with the weight measurement apparatus in accordance with the invention as an alternate to the cantilevered load cell of FIG. 47A.

Another alternate load cell design shown generally in FIG. 47E as 242 makes use of a torsion bar 243 and appropriately placed torsional strain sensing elements 244. A torque is imparted to the bar 243 by means of lever 245 and bolt 246 which attaches to the seat structure not shown. Bolts 247 attach the mounting blocks 248 at ends of the torsion bar 243 to the vehicle floor-pan.

The load cells illustrated above are all preferably of the foil strain gage type. Other types of strain gages exist which would work equally well which include wire strain gages and strain gages made from silicon. Silicon strain gages have the advantage of having a much larger gage factor and the disadvantage of greater temperature effects. For the high-volume implementation of this invention, silicon strain gages have an advantage in that the electronic circuitry (signal conditioning, ADCs, etc.) can be integrated with the strain gage for a low cost package.

Other strain gage materials and load cell designs may, of course, be incorporated within the teachings of this invention. In particular, a surface acoustical wave (SAW) strain gage can be used in place of conventional wire, foil or silicon strain gages and the strain measured either wirelessly or by a wire connection. For SAW strain gages, the electronic signal conditioning can be associated directly with the gage or remotely in an electronic control module as desired. For SAW strain gages, the problems discussed above with low signal levels requiring bridge structures and the methods for temperature compensation may not apply. Generally, SAW strain gages are more accurate that other technologies but may require a separate sensor to measure the temperature for temperature compensation depending on the material used. Materials that can be considered for SAW strain gages are quartz, lithium niobate, lead zirconate, lead titanate, zinc oxide, polyvinylidene fluoride and other piezoelectric materials.

Many seat designs have four attachment points for the seat structure to attach to the vehicle. Since the plane of attachment is determined by three points, the potential exists for a significant uncertainty or error to be introduced. This problem can be compounded by the method of attachment of the seat to the vehicle. Some attachment methods using bolts, for example, can introduce significant strain in the seat supporting structure. Some compliance therefore must be introduced into the seat structure to reduce these attachment induced stresses to a minimum. Too much compliance, on the other hand, can significantly weaken the seat structure and thereby potentially cause a safety issue. This problem can be solved by rendering the compliance section of the seat structure highly nonlinear or significantly limiting the range of the compliance. One of the support members, for example, can be attached to the top of the seat structure through the use of the pinned joint wherein the angular rotation of the joint is severely limited. Methods will now be obvious to those skilled in the art to eliminate the attachment induced stress and strain in the structure which can cause inaccuracies in the strain measuring system.

In the examples illustrated above, strain measuring elements have been shown at each of the support members. This of course is necessary if an accurate measurement of the weight of the occupying item of the seat is to be determined. For this case, typically a single value is inputted into the neural network representing weight. Experiments have shown, however, for the four strain gage transducer system, that most of the weight and thus most of the strain occurs in the strain elements mounted on the rear seat support structural members. In fact, about 85 percent of the load is typically carried by the rear supports. Little accuracy is lost therefore if the forward strain measuring elements are eliminated. Similarly, for most cases, the two rear mounted support strain elements measure approximately the same strain. Thus, the information represented by the strain in one rear seat support is sufficient to provide a reasonably accurate measurement of the weight of the occupying item of the seat. Thus, this invention can be implemented using one or more load cells or strain gages. As disclosed elsewhere herein, other sensors, such as occupant position sensors based on spatial monitoring technologies, can be used in conjunction with one or more load cells or other weight sensors to augment and improve the accuracy of the system. A simple position sensor mounted in the seat back or headrest, for example, as illustrated at 354-365 in FIGS. 42, 48, 49 and 126 can be used.

In many situations where the four strain measuring weight sensors are applied to the vehicle seat structure, the distribution of the weight among the four strain gage sensors, for example, well very significantly depending on the position of the seat in the vehicle and particularly the fore and aft and secondarily the seatback angle position. A significant improvement to the accuracy of the strain gage weight sensors, particularly if less than four such sensors are used, can result by using information from a seat track position and/or a seatback angle sensor. In many vehicles, such sensors already exist and therefore the incorporation of this information results in little additional cost to the system and results in significant improvements in the accuracy of the weight sensors.

There have been attempts to use seat weight sensors to determine the load distribution of the occupying item and thereby reach a conclusion about the state of seat occupancy. For example, if a forward facing human is out of position, the weight distribution on the seat will be different than if the occupant is in position. Similarly a rear facing child seat will have a different weight distribution than a forward facing child seat. This information is useful for determining the seated state of the occupying item under static or slowly changing conditions. For example, even when the vehicle is traveling on moderately rough roads, a long term averaging or filtering technique can be used to determine the total weight and weight distribution of the occupying item. Thus, this information can be useful in differentiating between a forward facing and rear facing child seat.

It is much less useful however for the case of a forward facing human or forward facing child seat that becomes out of position during a crash. Panic braking prior to a crash, particularly on a rough road surface, will cause dramatic fluctuations in the output of the strain sensing elements. Filtering algorithms, which require a significant time slice of data, will also not be particularly useful. A neural network or other pattern recognition system, however, can be trained to recognize such situations and provide useful information to improve system accuracy.

Other dynamical techniques can also provide useful information especially if combined with data from the vehicle crash accelerometer. By studying the average weight over a few cycles, as measured by each transducer independently, a determination can be made that the weight distribution is changing. Depending on the magnitude of the change a determination can be made as to whether the occupant is being restrained by a seatbelt. It a seatbelt restraint is not being used, the output from the crash accelerometer can be used to accurately project the position of the occupant during pre crash braking and eventually the impact itself providing his or her initial position is known.

In this manner, a weight sensor with provides weight distribution information can provide useful information to improve the accuracy of the occupant position sensing system for dynamic out of position determination. Naturally, even without the weight sensor information, the use of the vehicle crash sensor data in conjunction with any means of determining the belted state of the occupant will dramatically improve the dynamic determination of the position of a vehicle occupant. The use of the dynamics of the occupant to measure weight dynamically is disclosed in the current assignee's U.S. patent application Ser. No. 10/174,803 filed Jun. 19, 2002.

Strain gage weight sensors can also be mounted in other locations such as within a cavity within a seat cushion as shown as 97 in FIG. 6A and described above. The strain gage can be mounted on a flexible diaphragm that flexes and thereby strains the strain gage as the seat is loaded. In the example of FIG. 6A, a single chamber 98, diaphragm and strain gage 97 is illustrated. Naturally, a plurality of such chambers can be used to provide a distribution of the load on the occupying item onto the seat.

6.2 Bladder Weight Sensors

Figure 48:
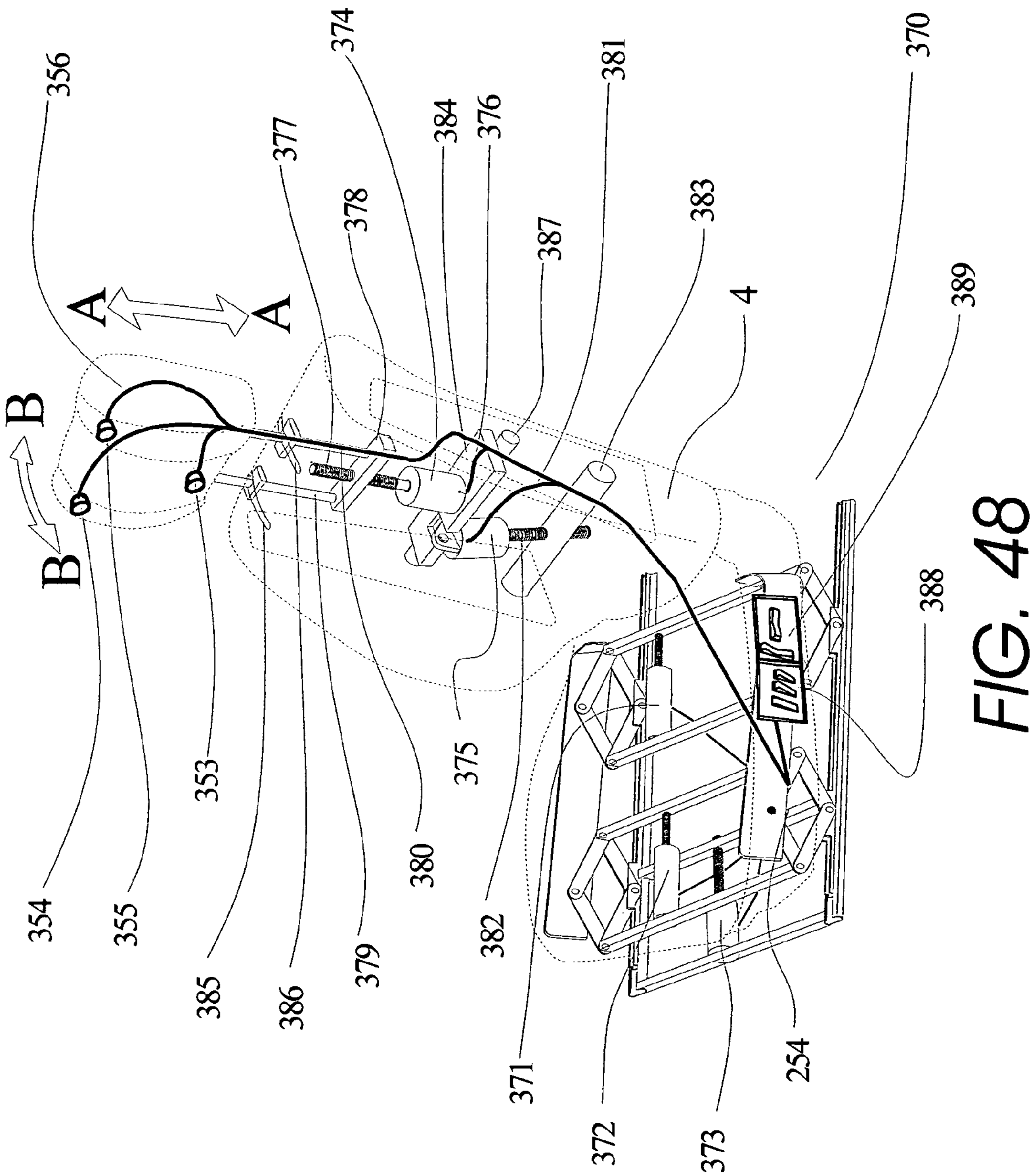
FIG. 48 is a perspective view of an automatic seat adjustment system, with the seat shown in phantom, with a movable headrest and sensors for measuring the height of the occupant from the vehicle seat showing motors for moving the seat and a control circuit connected to the sensors and motors.

With knowledge of the weight of an occupant, additional improvements can be made to automobile and truck seat designs. In particular, the stiffness of the seat can be adjusted so as to provide the same level of comfort for light and for heavy occupants. The damping of occupant motions, which previously has been largely neglected, can also be readily adjusted as shown on FIG. 49 which is a view of the seat of FIG. 48 showing one of several possible arrangements for changing the stiffness and the damping of the seat. In the seat bottom 250, there is a container 251, the conventional foam and spring design has been replaced by an inflated rectangular container very much like an air mattress which contains a cylindrical inner container 252 which is filled with an open cell urethane foam, for example. An adjustable orifice 253 connects the two containers both of which can be bladders 251, 252 so that air can flow in a controlled manner therebetween. The amount of opening of orifice 253 is controlled by control circuit 254. A small air compressor 255 controls the pressure in container 251 under control of the control circuit 254. A pressure transducer 256 monitors the pressure within container 251 and inputs this information into control circuit 254.

The operation of the system is as follows. When an occupant sits on the seat, pressure initially builds up in the seat container or bladder 251 which gives an accurate measurement of the weight of the occupant. Control circuit 254, using an algorithm and a microprocessor, then determines an appropriate stiffness for the seat and adds pressure to achieve that stiffness. The pressure equalizes between the two containers 251 and 252 through the flow of air through orifice 253. Control circuit 254 also determines an appropriate damping for the occupant and adjusts the orifice 253 to achieve that damping. As the vehicle travels down the road and the road roughness causes the seat to move up and down, the inertial force on the seat by the occupant causes the air pressure to rise and fall in container 252 and also, but, much less so, in container 251 since the occupant sits mainly above container 252 and container 251 is much larger than container 252. The major deflection in the seat takes place first in container 252 which pressurizes and transfers air to container 251 through orifice 253. The size of the orifice opening determines the flow rate between the two containers and therefore the damping of the motion of the occupant. Since this opening is controlled by control circuit 254, the amount of damping can thereby also be controlled. Thus, in this simple structure, both the stiffness and damping can be controlled to optimize the seat for a particular driver. Naturally, if the driver does not like the settings made by control circuit 254, he or she can change them to provide a stiffer or softer ride.

The stiffness of a seat is the change in force divided by the change in deflection. This is important for many reasons, one of which is that it controls the natural vibration frequency of the seat occupant combination. It is important that this be different from the frequency of vibrations which are transmitted to the seat from the vehicle in order to minimize the up and down motions of the occupant. The damping is a force which opposes the motion of the occupant and which is dependent on the velocity of relative motion between the occupant and the seat bottom. It thus removes energy and minimizes the oscillatory motion of the occupant. These factors are especially important in trucks where the vibratory motions of the driver's seat, and thus the driver, have caused many serious back injuries among truck drivers.

Figure 49:
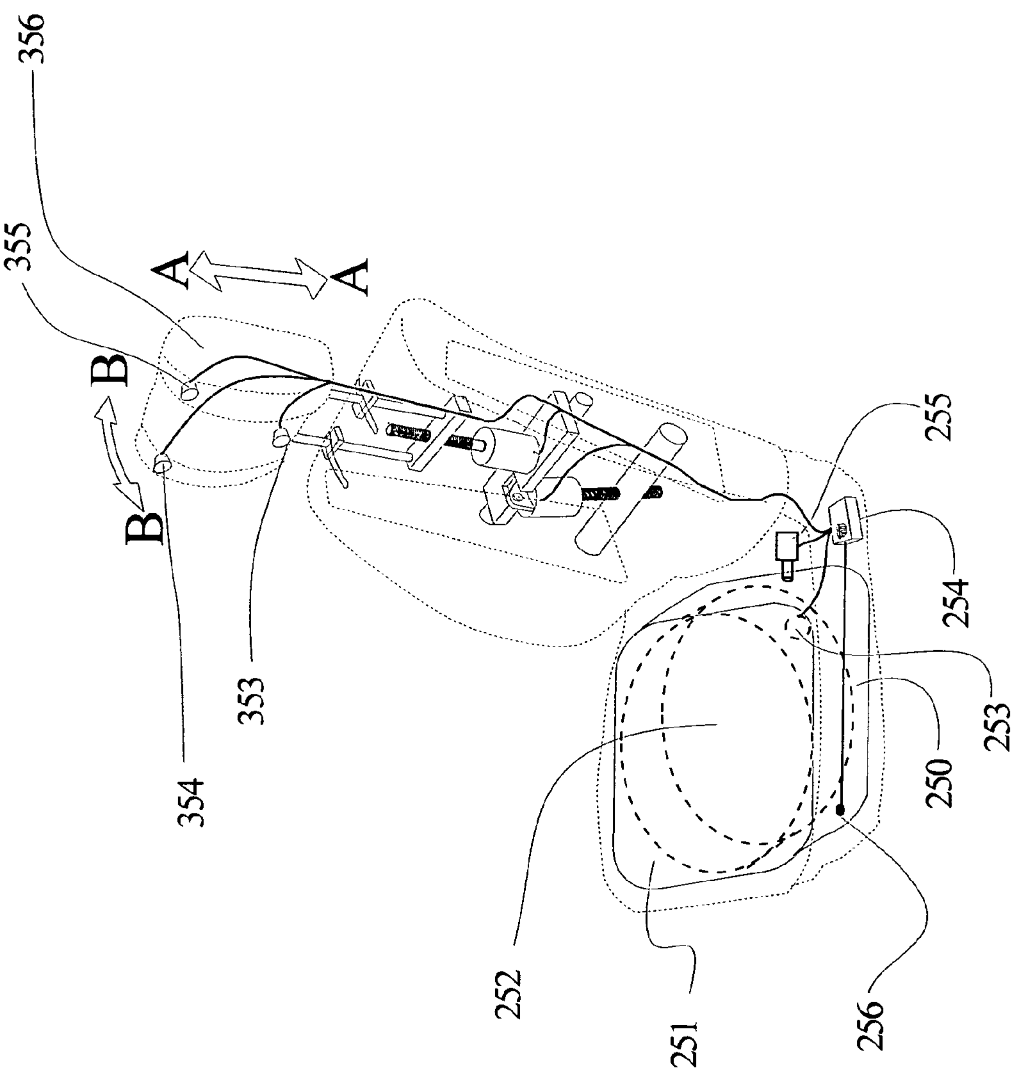
FIG. 49 is a view of the seat of FIG. 48 showing a system for changing the stiffness and the damping of the seat.
Figure 49A:
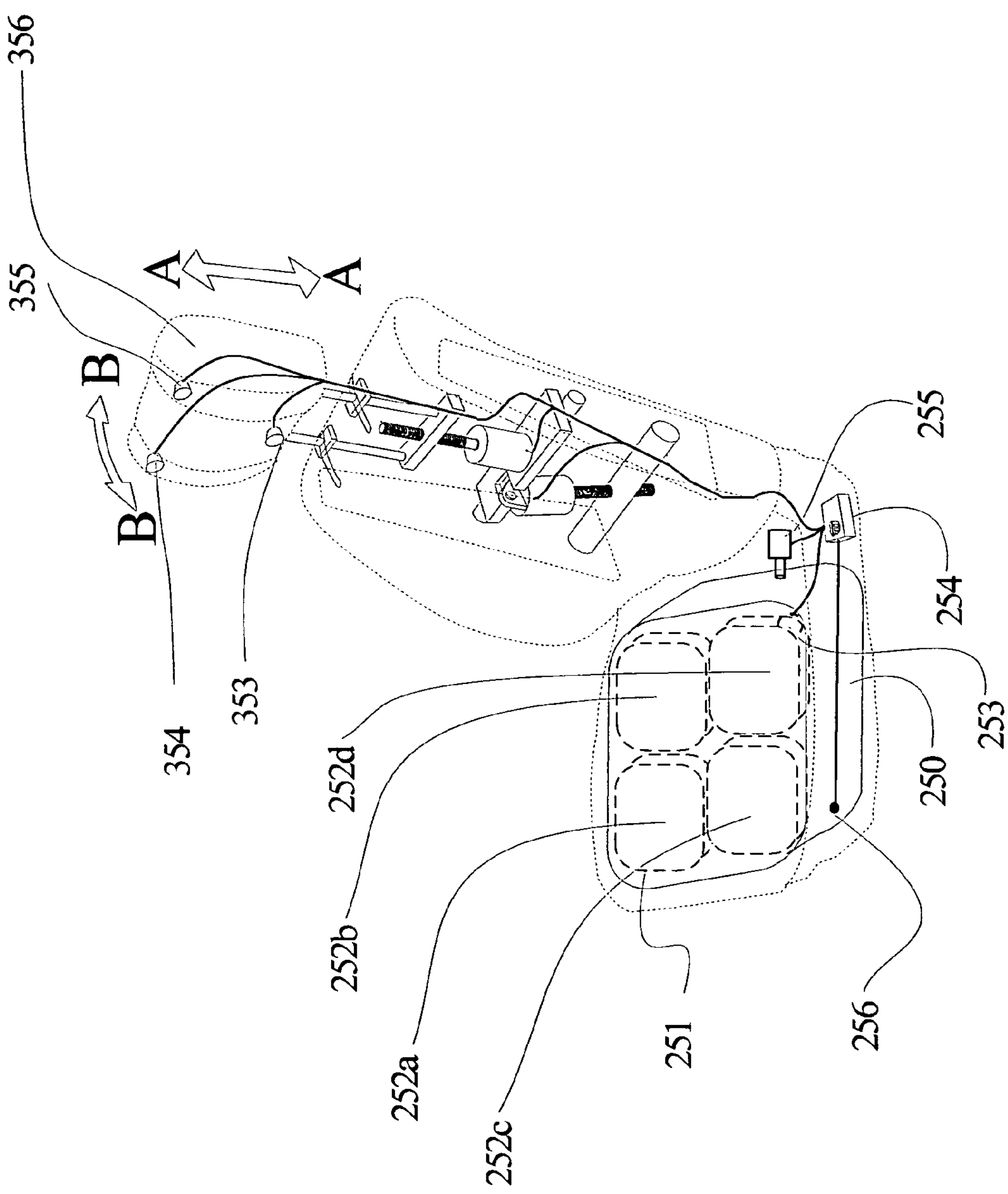
FIG. 49A is a view of the seat of FIG. 48 wherein the bladder contains a plurality of chambers.

In FIG. 49, the airbag or bladder 241 which interacts with the occupant is shown with a single chamber. Naturally, bladder 241 can be composed of multiple chambers 241*a*, 241*b*, 241*c*, and 241*d* as shown in FIG. 49A. The use of multiple chambers permits the weight distribution of the occupant to be determined if a separate pressure transducer is used in each cell of the bladder, or if a single gage is switched from chamber to chamber. Such a scheme gives the opportunity of determining to some extent the position of the occupant on the seat or at least the position of the center of gravity of the occupant. Naturally, more than four cells could be used.

Any one of a number of known pressure measuring sensors can be used with the bladder weight sensor disclosed herein. One particular technology that has been developed for measuring the pressure in a rotating tire uses surface acoustic wave (SAW) technology and has the advantage that the sensor is wireless and powerless. Thus the sensor does not need a battery nor is it required to run wires from the sensor to control circuitry. An interrogator is provided that transmits an RF signal to the sensor and receives a return signal that contains the temperature and pressure of the fluid within the bladder. The interrogator can be the same one that is used for tire pressure monitoring thus making this SAW system very inexpensive to implement and easily expandable to several seats within the vehicle. The switches that control the seat can also now be made wireless using SAW technology and thus they can be placed at any convenient location such as the vehicle door mounted armrest without requiring wires to connect the switch to the seat motors. Other uses of SAW technology are discussed in the current assignee's U.S. patent application Ser. No. 10/079,065 filed Feb. 19, 2002.

In the description above, the air was use as the fluid to fill the bladder 241. In some cases, especially where damping and natural frequency control is not needed, another fluid such as a liquid or jell could be used to fill the bladder. In addition to silicone, candidate liquids include ethylene glycol or other low freezing point liquids.

6.3 Combined Spatial and Weight

Although spatial sensors such as ultrasonic and optical occupant sensors can accurately identify and determine the location of an occupying item in the vehicle, a determination of the mass of the item is less accurate as it can be fooled by a thick but light winter coat, for example. Therefore it is desirable when the economics permit to provide a combined system that includes both weight and spatial sensors. Such a system permits a fine tuning of the deployment time and the amount of gas in the airbag to match the position and the mass of the occupant. If this is coupled with a smart crash severity sensor then a true smart airbag system can result as disclosed in the current assignee's patent U.S. Pat. No. 06,532,408.

As disclosed in several of the current assignee's patents, referenced herein and others, the combination of a reduced number of transducers including weight and spatial can result from a pruning process starting from a larger number of sensors. For example, such a process can begin with four load cells and four ultrasonic sensors and after a pruning process, a system containing two ultrasonic sensors and one load cell can result. This invention is therefore not limited to any particular number or combination of sensors and the optimum choice for a particular vehicle will depend on many factors including the specifications of the vehicle manufacturer, cost, accuracy desired, availability of mounting locations and the chosen technologies.

6.4 Face Recognition

A neural network, or other pattern recognition system, can be trained to recognize certain people as permitted operators of a vehicle. In this case, if a non-recognized person attempts to operate the vehicle, the system can disable the vehicle and/or sound an alarm. Since it is unlikely that an unauthorized operator will resemble the authorized operator, the neural network system can be quite tolerant of differences in appearance of the operator. The system defaults to where a key must be used in the case that the system doesn't recognize the driver or the owner wishes to allow another person to operate the vehicle. The transducers used to identify the driver can be any of the types described in detail above. The preferred method is to use optical imager based transducers perhaps in conjunction with a weight sensor. This is necessary due to the small size of the features that need to be recognized for high accuracy of recognition. An alternate system uses an infrared laser, to irradiate or illuminate the operator and a CCD or CMOS device to receive the reflected image. In this case, the recognition of the operator is accomplished using a pattern recognition system such as described in Popesco, V. and Vincent, J. M. "Location of Facial Features Using a Boltzmann Machine to Implement Geometric Constraints", Chapter 14 of Lisboa, P. J. G. and Taylor, M. J. Editors, *Techniques and Applications of Neural Networks*, Ellis Horwood Publishers, New York, 1993. In the present case a larger CCD element array containing 50,000 or more elements would typically be used instead of the 16 by 16 or 256 element CCD array used by Popesco and Vincent.

FIG. 22 shows a schematic illustration of a system for controlling operation of a vehicle based on recognition of an authorized individual in accordance with the invention. One or more images of the passenger compartment 260 are received at 261 and data derived therefrom at 262. Multiple image receivers may be provided at different locations. The data derivation may entail any one or more of numerous types of image processing techniques such as those described in the current assignee's U.S. Pat. No. 06,397,136 including those designed to improve the clarity of the image. A pattern recognition algorithm, e.g., a neural network, is trained in a training phase 263 to recognize authorized individuals. The training phase can be conducted upon purchase of the vehicle by the dealer or by the owner after performing certain procedures provided to the owner, e.g., entry of a security code or key. In the training phase for a theft prevention system, the authorized driver(s) would sit themselves in the passenger seat and optical images would be taken and processed to obtain the pattern recognition algorithm.

A processor 264 is embodied with the pattern recognition algorithm thus trained to identify whether a person is the individual by analysis of subsequently obtained data derived from optical images 262. The pattern recognition algorithm in processor 264 outputs an indication of whether the person in the image is an authorized individual for which the system is trained to identify. A security system 265 enable operations of the vehicle when the pattern recognition algorithm provides an indication that the person is an individual authorized to operate the vehicle and prevents operation of the vehicle when the pattern recognition algorithm does not provide an indication that the person is an individual authorized to operate the vehicle.

In some cases the recognition system can be substantially improved if different parts of the electromagnetic spectrum are used. As taught in the book *Alien Vision* referenced above, distinctive facial markings are evident when viewed under near UV or MWIR illumination that can be used to positively identify a person. Naturally other biometric measures can be used with a facial or iris image to further improve the recognition accuracy such as voice recognition (voice-print), finger or hand prints, weight, height, arm length, hand size etc.

Instead of a security system, another component in the vehicle can be affected or controlled based on the recognition of a particular individual. For example, the rear view mirror, seat, seat belt anchorage point, headrest, pedals, steering wheel, entertainment system, air-conditioning/ventilation system can be adjusted.

Figure 23:
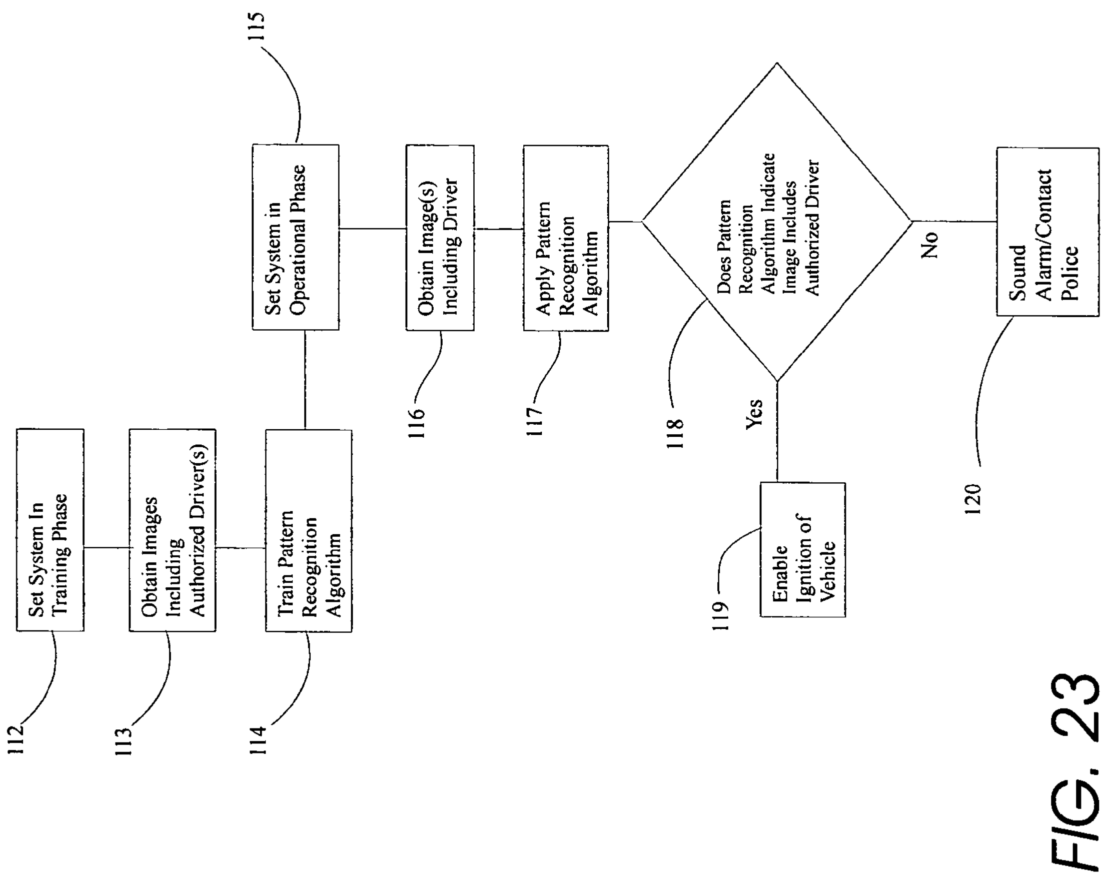
FIG. 23 is a schematic illustration of a method for controlling operation of a vehicle based on recognition of an individual.

FIG. 23 is a schematic illustration of a method for controlling operation of a vehicle based on recognition of a person as one of a set of authorized individuals. Although the method is described and shown for permitting or preventing ignition of the vehicle based on recognition of an authorized driver, it can be used to control for any vehicle component, system or subsystem based on recognition of an individual.

Initially, the system is set in a training phase 266 in which images, and other biometric measures, including the authorized individuals are obtained by means of at least one optical receiving unit 267 and a pattern recognition algorithm is trained based thereon 268, usually after application of one or more image processing techniques to the images. The authorized individual(s) occupy the passenger compartment and have their picture taken by the optical receiving unit to enable the formation of a database on which the pattern recognition algorithm is trained. Training can be performed by any known method in the art, although combination neural networks are preferred.

The system is then set in an operational phase 269 wherein an image is obtained 270, including the driver when the system is used for a security system. If the system is used for component adjustment, then the image would include any passengers or other occupying items in the vehicle. The obtained image, or images if multiple optical receiving units are used, plus other biometric information, are input into the pattern recognition algorithm 271, preferably after some image processing, and a determination is made whether the pattern recognition algorithm indicates that the image includes an authorized driver 272. If so, ignition of the vehicle is enabled 273, or the vehicle may actually be started automatically. If not, an alarm is sounded and/or the police may be contacted 274.

Once an optic based system is present in a vehicle, other options can be enabled such as eye-tracking as a data input device or to detect drowsiness, as discussed above, and even lip reading as an a data input device or to augment voice input. See for example, Eisenberg, Anne "Beyond Voice Recognition to a Computer That Reads Lips", New York Times, Sep. 11, 2003. Lip reading can be implemented in a vehicle through the use of IR illumination and training of a pattern recognition algorithm, such as a neural network or a combination network.

This is one example of where an adaptive neural or combination network can be employed that learns as it gains experience with a particular driver. The work "radio", for example, can be associated with lip motions when the vehicle is stopped or moving slowly and then at a later time when the vehicle is traveling at high speed with considerable wind noise, the voice might be difficult for the system to understand but when augmented with lip reading the word "radio" can be more accurately recognized. Thus, the combination of lip reading and voice recognition can work together to significantly improve accuracy.

Face recognition can of course be done in two or three dimensions and can involve the creation of a model of the person's head that can aid when illumination is poor, for example. Three dimensions are available if multiple two dimensional images are acquired as the occupant moves his or her head or through the use of a three-dimensional camera. A three-dimensional camera generally has two spaced-apart lenses plus software to combine the two views. Normally, the lenses are relatively close together but this may not need to be the case and significantly more information can be acquired if the lenses are spaced further apart and in some cases even such that one camera has a frontal view and the other a side view, for example. Naturally, the software is complicated for such cases but the system becomes more robust and less likely to be blocked by a newspaper, for example.

6.5 Heartbeat

In addition to the use of transducers to determine the presence and location of occupants in a vehicle, other sensors can also be used. For example, as discussed above, a heartbeat sensor, which determines the number and presence of heartbeats, can also be arranged in the vehicle. Heartbeat sensors can be adapted to differentiate between a heartbeat of an adult, a heartbeat of a child and a heartbeat of an animal. As its name implies, a heartbeat sensor detects a heartbeat, and the magnitude thereof, of a human occupant of the seat, if such a human occupant is present. The output of the heartbeat sensor is input to the processor of the interior monitoring system. One heartbeat sensor for use in the invention may be of the types as disclosed in McEwan in U.S. Pat. No. 05,573,012 and U.S. Pat. No. 05,766,208. The heartbeat sensor can be positioned at any convenient position relative to the seats where occupancy is being monitored. A preferred location is within the vehicle seatback.

This type of micropower impulse radar (MIR) sensor is not believed to have been used in an interior monitoring system in the past. It can be used to determine the motion of an occupant and thus can determine his or her heartbeat (as evidenced by motion of the chest), for example. Such an MIR sensor can also be arranged to detect motion in a particular area in which the occupant's chest would most likely be situated or could be coupled to an arrangement which determines the location of the occupant's chest and then adjusts the operational field of the MIR sensor based on the determined location of the occupant's chest. A motion sensor utilizing a micro-power impulse radar (MIR) system as disclosed, for example, in McEwan U.S. Pat. No. 05,361,070, as well as many other patents by the same inventor. Motion sensing is accomplished by monitoring a particular range from the sensor as disclosed in that patent. MIR is one form of radar that has applicability to occupant sensing and can be mounted at various locations in the vehicle. Other forms include, among others, ultra wideband (UWB) by the Time Domain Corporation and noise radar (NR) by Professor Konstantin Lukin of the National Academy of Sciences of Ukraine Institute of Radiophysics and Electronics. Radar has an advantage over ultrasonic sensors in that data can be acquired at a higher speed and thus the motion of an occupant can be more easily tracked. The ability to obtain returns over the entire occupancy range is somewhat more difficult than with ultrasound resulting in a more expensive system overall. MIR, UWB or NR have additional advantages in lack of sensitivity to temperature variation and has a comparable resolution to about 40 kHz ultrasound. Resolution comparable to higher frequency is of course possible using millimeter waves, for example. Additionally, multiple MIR, UWB or NR sensors can be used when high speed tracking of the motion of an occupant during a crash is required since they can be individually pulsed without interfering with each other through frequency, time or code division multiplexing or other multiplexing schemes.

Other methods have been reported for measuring heartbeat including vibrations introduced into a vehicle and variations in the electric field in the vicinity of where an occupant might reside. All such methods are considered encompassed by the teachings of this invention. The detection of a heartbeat regardless of how it is accomplished is indicative of the presence of a living being within the vehicle and such a detection as part of an occupant presence detection system is novel to this invention. Similarly, any motion of an object that is not induced by the motion of the vehicle itself is indicative of the presence of a living being and thus part of the teachings herein. The sensing of occupant motion regardless of how it is accomplished when used in a system to affect another vehicle system is contemplated herein.

7. Illumination 7.1 Infrared Light

Many forms illumination can of course be used as discussed herein. Infrared is a preferred source since it can be produced relatively inexpensively with LEDs and is not seen by vehicle occupants or others outside of the vehicle. The use of spatially modulated (as in structured light) and temporally modulated (as in amplitude, frequency, pulse, code, random or other such methods) permits additional information to be obtained such as a three dimensional image as first disclosed by the current assignee in earlier patents. Infrared is also interesting since the human body naturally emits IR and this fact can be used to positively identify that there is a human occupying a vehicle seat and to determine fairly accurately the size of the occupant. This technique only works when the ambient temperature is different from body temperature which is most of the time. In some climates, it is possible that the interior temperature of a vehicle can reach or exceed 100 degrees F., but it is unlikely to stay at that temperature for long as humans find such a temperature uncomfortable. However, it is even more unlikely that such a temperature will exist except when there is significant natural illumination in the visible part of the spectrum. Thus, a visual size determination is possible especially since it is very unlikely that such an occupant will be wearing heavy or thick clothing. Thus, passive infrared, used of course with an imaging system, is a viable technique for the identification of a human occupant if used in conjunction with an optical system for high temperature situations.

Passive IR is also a good method of finding the eyes and other features of the occupant since hair some hats and other obscuring items frequently do not interfere with the transmission of IR. When active IR illumination is used the eyes are particularly easy to find due to corneal reflection and the eyes will be dilated at night when finding the eyes is most important. Even in glare situations, where the glare is coming through the windshield, passive IR is particularly useful since glass blocks most IR with wavelengths beyond 1.1 microns and thus the glare will not interfere with the imaging of the face.

Particular frequencies of active IR are especially useful for external monitoring. Except for monitoring objects close to the vehicle, most radar systems have a significant divergence angle making imaging more that a few meters from the vehicle problematic. Thus there is typically not enough information form a scene say 100 meters away to permit the monitor to obtain an image that would permit classification of sensed objects. Thus using radar it is difficult to distinguish a car from a truck or a parked car at the side of the road from one on the same lane as the vehicle or from a advertising sign, for example. Normal visual imaging also will not work in bad weather situations however some frequencies of IR do penetrate fog, rain and snow sufficiently well as to permit the monitoring of the road at a significant distance and with enough resolution to permit imaging and thus classification even in the presence of rain, snow and fog.

As mentioned elsewhere herein, there are various methods of illuminating the object or occupant in the passenger compartment. A scanning point of IR can be used to overcome sunlight. A structured pattern can be used to help achieve a three dimensional representation of the vehicle contents. An image can be compared with illumination and without to attempt to eliminate the effects on natural and uncontrollable illumination. This generally doesn't work very well since the natural illumination can overpower the IR. Thus it is usually better to develop two pattern recognition algorithms, one for IR illumination and one for natural illumination. For the natural illumination case the entire visual and near visual spectrum can be used or some subset of it. For the case where a rolling shutter is used, the process can be speeded up substantially if one line of pixels is subtracted from the adjacent line where the illumination is turned on for every other row and off for the intervening rows. In addition to structured light there are many other methods of obtaining a 3D image as discussed above.

7.2 Structured Light

In the applications discussed and illustrated above, the source and receiver of the electromagnetic radiation have frequently been mounted in the same package. This is not necessary and in some implementations, the illumination source will be mounted elsewhere. For example, a laser beam can be used which is directed along an axis which bisects the angle between the center of the seat volume and two of the arrays. Such a beam may come from the A-Pillar, for example. The beam, which may be supplemental to the main illumination system, provides a point reflection from the occupying item that, in most cases, can be seen by two receivers, even if they are significantly separated from each other, making it easier to identify corresponding parts in the two images. Triangulation thereafter can precisely determination the location of the illuminated point. This point can be moved, or a pattern of points provided, to provide even more information. In another case where it is desired to track the head of the occupant, for example, several such beams can be directed at the occupant's head during pre-crash braking or even during a crash to provide the fastest information as to the location of the head of the occupant for the fastest tracking of the motion of the occupant's head. Since only a few pixels are involved, even the calculation time is minimized.

In most of the applications above the assumption has been made that either a uniform field of light or a scanning spot of light will be provided. This need not be the case. The light that is emitted or transmitted to illuminate the object can be structured light. Structured light can take many forms starting with, for example, a rectangular or other macroscopic pattern of light and dark that can be superimposed on the light by passing it through a filter. If a similar pattern is interposed between the reflections and the camera, a sort of pseudo-interference pattern can result sometimes known as Moire patterns. A similar effect can be achieved by polarizing transmitted light so that different parts of the object that is being illuminated are illuminated with light of different polarization. Once again by viewing the reflections through a similarly polarized array, information can be obtained as to where the source of light came from which is illuminating a particular object. Any of the transmitter/receiver assemblies or transducers in any of the embodiments above using optics can be designed to use structured light.

Usually the source of the structured light is displaced either laterally or axially from the imager but this need not necessarily be the case. One excellent example of the use of structured light to determine a 3D image where the source of the structured light and the imager are on the same axis is illustrated in U.S. Pat. No. 05,031,66. Here the third dimension is obtained by measuring the degree of blur of the pattern as reflected from the object. This can be done since the focal point of the structured light is different from the camera. This is accomplished by projecting it through its own lens system and then combining the two paths through the use of a beam splitter. The use of this or any other form of structured light is within the scope of this invention. There are so many methods that the details of all of them cannot be enumerated here.

One consideration when using structured light is that the source of structured light should not generally be exactly co-located with the array because in this case, the pattern projected will not change as a function of the distance between the array and the object and thus the distance between the array and the object cannot be determined. Thus, it is usually necessary to provide a displacement between the array and the light source. For example, the light source can surround the array, be on top of the array or on one side of the array. The light source can also have a different virtual source, i.e., it can appear to come from behind of the array or in front of the array.

For a laterally displaced source of structured light, the goal is to determine the direction that a particular ray of light had when it was transmitted from the source. Then by knowing which pixels were illuminated by the reflected light ray along with the geometry of the vehicle, the distance to the point of reflection off of the object can be determined. If a particular light ray, for example, illuminates an object surface which is near to the source then the reflection off of that surface will illuminate a pixel at a particular point on the imaging array. If the reflection of the same ray however occurs from a more distant surface, then a different pixel will be illuminated in the imaging array. In this manner, the distance from the surface of the object to the array can be determined by triangulation formulas. Similarly, if a given pixel is illuminated in the imager from a reflection of a particular ray of light from the transmitter, and knowing the direction that that ray of light was sent from the transmitter, then the distance to the object at the point of reflection can be determined. If each ray of light is individually recognizable and therefore can be correlated to the angle at which it was transmitted, a full three-dimensional image can be obtained of the object that simplifies the identification problem. This can be done with a single imager.

The coding of the light rays coming from the transmitter can be accomplished in many ways. One method is to polarize the light by passing the light through a filter whereby the polarization is a combination of the amount and angle of the polarization. This gives two dimensions that can therefore be used to fix the angle that the light was sent. Another method is to superimpose an analog or digital signal onto the light which could be done, for example, by using an addressable light valve, such as a liquid crystal filter, electrochromic filter, or, preferably, a garnet crystal array. Each pixel in this array would be coded such that it could be identified at the imager or other receiving device. Any of the modulation schemes could be applied such as frequency, phase, amplitude, pulse, random or code modulation.

The techniques described above can depend upon either changing the polarization or using the time, spatial or frequency domains to identify particular transmission angles with particular reflections. Spatial patterns can be imposed on the transmitted light which generally goes under the heading of structured light. The concept is that if a pattern is identifiable then either the direction of transmitted light can be determined or, if the transmission source is co-linear with the receiver, then the pattern differentially expands or contracts relative to the field of view as it travels toward the object and then, by determining the size or focus of the received pattern, the distance to the object can be determined. In some cases Moiré pattern techniques are utilized.

When the illumination source is not placed on the same axis as the receiving array, it is typically placed at an angle such as 45 degrees. At least two other techniques can be considered. One is to place the illumination source at 90 degrees to the imager array. In this case only those surface elements that are closer to the receiving array then previous surfaces are illuminated. Thus, significant information can be obtained as to the profile of the object. In fact, if no object is occupying the seat, then there will be no reflections except from the seat itself. This provides a very powerful technique for determining whether the seat is occupied and where the initial surfaces of the occupying item are located. A combination of the above techniques can be used with temporally or spatially varying illumination. Taking images with the same imager but with illumination from different directions can also greatly enhance the ability to obtain three-dimensional information.

The particular radiation field of the transmitting transducer can also be important to some implementations of this invention. In some techniques the object which is occupying the seat is the only part of the vehicle which is illuminated. Extreme care is exercised in shaping the field of light such that this is true. For example, the objects are illuminated in such a way that reflections from the door panel do not occur. Ideally if only the items which occupy the seat can be illuminated then the problem of separating the occupant from the interior vehicle passenger compartment surfaces can be more easily accomplished. Sending illumination from both sides of the vehicle across the vehicle can accomplish this.

7.3 Color and Natural Light

As discussed above, the use of multispectral imaging can be a significant aid in recognizing objects inside and outside of a vehicle. Two objects may not be separable under monochromic illumination yet be quite distinguishable when observed in color or with illumination from other parts of the electromagnetic spectrum. Also the identification of a particular individual is enhanced using near UV radiation, for example.

7.4 Radar

Particular mention should be made of the use of radar since novel inexpensive antennas and ultra wideband radars are now readily available. A scanning radar beam can be used in this implementation and the reflected signal is received by a phase array antenna to generate an image of the occupant for input into the appropriate pattern detection circuitry. Naturally the image is not very clear due to the longer wave lengths used and the difficulty in getting a small enough radar beam. The word circuitry as used herein includes, in addition to normal electronic circuits, a microprocessor and appropriate software.

Another preferred embodiment makes use of radio waves and a voltage-controlled oscillator (VCO). In this embodiment, the frequency of the oscillator is controlled through the use of a phase detector which adjusts the oscillator frequency so that exactly one half wave occupies the distance from the transmitter to the receiver via reflection off of the occupant. The adjusted frequency is thus inversely proportional to the distance from the transmitter to the occupant. Alternately, an FM phase discriminator can be used as known to those skilled in the art. These systems could be used in any of the locations illustrated in FIG. 5.

In FIG. 6, a motion sensor 73 is arranged to detect motion of an occupying item on the seat 4 and the output thereof is input to the neural network 65. Motion sensors can utilize a micro-power impulse radar (MIR) system as disclosed, for example, in McEwan U.S. Pat. No. 05,361,070, as well as many other patents by the same inventor. Motion sensing is accomplished by monitoring a particular range from the sensor as disclosed in that patent. MIR is one form of radar which has applicability to occupant sensing and can be mounted, for example, at locations such as 6 and 8-10 in FIG. 7. It has an advantage over ultrasonic sensors in that data can be acquired at a higher speed and thus the motion of an occupant can be more easily tracked. The ability to obtain returns over the entire occupancy range is somewhat more difficult than with ultrasound resulting in a more expensive system overall. MIR has additional advantages over ultrasound in lack of sensitivity to temperature variation and has a comparable resolution to about 40 kHz ultrasound. Resolution comparable to higher frequency is feasible but has not been demonstrated. Additionally, multiple MIR sensors can be used when high speed tracking of the motion of an occupant during a crash is required since they can be individually pulsed without interfering with each through time division multiplexing.

Sensors 126, 127, 128, 129 in FIG. 38 can also be microwave radar sensors which transmit and receive radar waves. As such, it is possible to determine the presence of an object in the rear seat and the distance between the object and the sensors. Using multiple radar sensors, it would be possible to determine the contour of an object in the rear seat and thus using pattern recognition techniques, the classification or identification of the object. Motion of objects in the rear seat can also be determined using radar sensors. For example, if the radar sensors are directed toward a particular area and/or are provided with the ability to detect motion in a predetermined frequency range, they can be used to determine the presence of children or pets left in the vehicle, i.e., by detecting heartbeats or other body motions such as movement of the chest cavity.

7.5 Frequency Considerations

The maximum acoustic frequency range that is practical to use for acoustic imaging in the acoustic systems herein is about 40 to 160 kilohertz (kHz). The wavelength of a 50 kHz acoustic wave is about 0.6 cm, which is too coarse to determine the fine features of a person's face, for example. It is well understood by those skilled in the art that features that are smaller than the wavelength of the irradiating radiation cannot be distinguished. Similarly, the wavelength of common radar systems varies from about 0.9 cm (for 33 GHz K band) to 133 cm (for 225 MHz P band), which is also too coarse for person identification systems. Millimeter wave and sub-millimeter wave radar can of course emit and receive waves considerably smaller. Millimeter wave radar and Micropower Impulse Radar (MIR) as discussed above is particularly useful for occupant detection and especially the motion of occupants such as motion caused by heartbeats and breathing, but still too course for feature identification. For security purposes, for example, MIR can be used to detect the presence of weapons on a person that might be approaching a vehicle such as a bus, truck or train and thus provide a warning of a potential terrorist threat. Passive IR is also useful for this purpose.

MIR is reflected by edges, joints and boundaries and through the technique of range gating, particular slices in space can be observed. Millimeter wave radar, particularly in the passive mode, can also be used to locate life forms because they naturally emit waves at particular frequencies such as 3 mm. A passive image of such a person will also show the presence of concealed weapons as they block this radiation. Similarly, active millimeter wave radar reflects off of metallic objects but is absorbed by the water in a life form. The absorption property can be used by placing a radar receiver or reflector behind the occupant and measuring the shadow caused by the absorption. The reflective property of weapons including plastics can be used as above to detect possible terrorist threats. Finally, the use of sub-millimeter waves again using a detector or reflector on the other side of the occupant can be used not only to determine the density of the occupant but also some measure of its chemical composition as the chemical properties alter the pulse shape. Such waves are more readily absorbed by water than by plastic. From the above discussion, it can be seen that there are advantages of using different frequencies of radar for different purposes and, in some cases, a combination of frequencies is most useful. This combination occurs naturally with noise radar (NR), ultra-wideband radar (UWB) and MIR and these technologies are most appropriate for occupant detection when using electromagnetic radiation at longer wavelengths than visible light and IR.

Another variant on the invention is to use no illumination source at all. In this case, the entire visible and infrared spectrum could be used. CMOS arrays are now available with very good night vision capabilities making it possible to see and image an occupant in very low light conditions. QWIP, as discussed above, may someday become available when on chip cooling systems using a dual stage Peltier system become cost effective or when the operating temperature of the device rises through technological innovation. For a comprehensive introduction to multispectral imaging see Richards, Austin *Alien Vision, Exploring the Electromagnetic Spectrum with Imaging Technology*, SPIE Press, 2001.

8. Field Sensors

A living object such as an animal or human has a fairly high electrical permittivity (Dielectric Constant) and relatively lossy dielectric properties (Loss Tangent) absorbs a lot of energy absorption when placed in an appropriate varying electric field. This effect varies with the frequency. If a human which is a lossy dielectric is present in the detection field then the dielectric absorption causes the value of the capacitance of the object to change with frequency. For a human (poor dielectric) with high dielectric losses (loss tangent), the decay with frequency will be more pronounced than objects that do not present this high loss tangency. Exploiting this phenomena it is possible to detect the presents of adult, child, baby or pet that is in the field of the detection circuit.

In FIG. 6, a capacitive sensor 78 is arranged to detect the presence of an occupying item on the seat 4 and the output thereof is input to the neural network 65. Naturally capacitive sensors can be located many other places in the passenger compartment. Capacitive sensors appropriate for this function are disclosed in Kithil U.S. Pat. No. 05,602,734, U.S. Pat. No. 05,802,479 and U.S. Pat. No. 05,844,486 and Jinno et al. Capacitive sensors can in general be mounted at locations 6 and 8-10 in FIG. 7 or as shown in FIG. 6 or in the vehicle seat and seat back, although by their nature they can occupy considerably more space than shown in the drawings.

In FIG. 4, Transducers 5, 11, 12, 13, 14 and 15 can be antennas placed in the seat and headrest such that the presence of an object, particularly a water containing object such as a human, disturbs the near field of the antenna.

This disturbance can be detected by various means such as with Micrel parts MICREF102 and MICREF104, which have a built in antenna auto-tune circuit. Note, these parts cannot be used as is and it is necessary to redesign the chips to allow the auto-tune information to be retrieved from the chip.

9. Telematics

The cellular phone system, or other telematics communication device, is shown schematically in FIG. 2 by box 34 and outputs to an antenna 32. The phone system or telematics communication device 34 can be coupled to the vehicle interior monitoring system in accordance with any of the embodiments disclosed herein and serves to establish a communications channel with one or more remote assistance facilities, such as an EMS facility or dispatch facility from which emergency response personnel are dispatched.

In the event of an accident, the electronic system associated with the telematics system interrogates the various interior monitoring system memories in processor 20 and can arrive at a count of the number of occupants in the vehicle, if each seat is monitored, and, in more sophisticated systems, even makes a determination as to whether each occupant was wearing a seatbelt and if he or she is moving after the accident, or the health state of one or more of the occupants as described above, for example. The telematics communication system then automatically notifies an EMS operator (such as 911, OnStar® or equivalent) and the information obtained from the interior monitoring systems is forwarded so that a determination can be made as to the number of ambulances and other equipment to send to the accident site. Vehicles having the capability of notifying EMS in the event one or more airbags deployed are now in service but are not believed to use any of the innovative interior monitoring systems described herein. Such vehicles will also have a system, such as the global positioning system, which permits the vehicle to determine its location and to forward this information to the EMS operator.

FIG. 2A shows a schematic diagram of an embodiment of the invention including a system for determining the presence and health state of any occupants of the vehicle and a telecommunications link. This embodiment includes means for determining the presence of any occupants 150 which may take the form of a heartbeat sensor, chemical sensor or motion sensor as described above and means for determining the health state of any occupants 151 as discussed above. The communications unit 154 performs the function of enabling establishment of a communications channel to a remote facility to receive information about the occupancy of the vehicle as determined by the presence determining means 150, occupant health state determining means 151 and/or occupant location determining means 152. The communications unit 154 thus can be designed to transmit over a sufficiently large range and at an established frequency monitored by the remote facility, which may be an EMS facility, sheriff department, or fire department.

Another vehicular telematics system, component or subsystem is a navigational aid, such as a route guidance display or map. In this case, the position of the vehicle as determined by the positioning system 156 is conveyed through processor 153 to the communications unit 154 to a remote facility and a map is transmitted from this facility to the vehicle to be displayed on the route display. If directions are needed, a request for such directions can be entered into an input unit 157 associated with the processor 153 and transmitted to the facility. Data for the display map and/or vocal instructions can then be transmitted from this facility to the vehicle.

Moreover, using this embodiment, it is possible to remotely monitor the health state of the occupants in the vehicle and most importantly, the driver. The health state determining means 151 may be used to detect whether the driver's breathing is erratic or indicative of a state in which the driver is dozing off. The health state determining means 151 can also include a breath-analyzer to determine whether the driver's breath contains alcohol. In this case, the health state of the driver is relayed through the processor 153 and the communications unit 154 to the remote facility and appropriate action can be taken. For example, it would be possible to transmit a command to the vehicle to activate an alarm or illuminate a warning light or if the vehicle is equipped with an automatic guidance system and ignition shut-off, to cause the vehicle to come to a stop on the shoulder of the roadway or elsewhere out of the traffic stream. The alarm, warning light, automatic guidance system and ignition shut-off are thus particular vehicular components or subsystems represented by 155.

In use after a crash, the presence determining means 150, health state determining means 151 and location determining means 152 obtain readings from the passenger compartment and direct such readings to the processor 153. The processor 153 analyzes the information and directs or controls the transmission of the information about the occupant(s) to a remote, manned facility. Such information could include the number and type of occupants, i.e., adults, children, infants, whether any of the occupants have stopped breathing or are breathing erratically, whether the occupants are conscious (as evidenced by, e.g., eye motion), whether blood is present (as detected by a chemical sensor) and whether the occupants are making sounds. The determination of the number of occupants is obtained from the presence determining mechanism 150, i.e., the number of occupants whose presence is detected is the number of occupants in the passenger compartment. The determination of the status of the occupants, i.e., whether they are moving is performed by the health state determining mechanism 151, such as the motion sensors, heartbeat sensors, chemical sensors, etc. Moreover, the communications link through the communications unit 154 can be activated immediately after the crash to enable personnel at the remote facility to initiate communications with the vehicle.

Although in most if not all of the embodiments described above, it has been assumed that the transmission of images or other data from the vehicle to the EMS or other off-vehicle (remote) site is initiated by the vehicle, this may not always be the case and in some embodiments, provision is made for the off-vehicle site to initiate the acquisition and/or transmission of data including images from the vehicle. Thus, for example, once an EMS operator knows that there has been an accident, he or she can send a command to the vehicle to control components in the vehicle to cause the components send images and other data so that the situation can be monitored by the operator or other person. The capability to receive and initiate such transmissions can also be provided in an emergency vehicle such as a police car or ambulance. In this manner, for a stolen vehicle situation, the police officer, for example, can continue to monitor the interior of the stolen vehicle.

Figure 50:
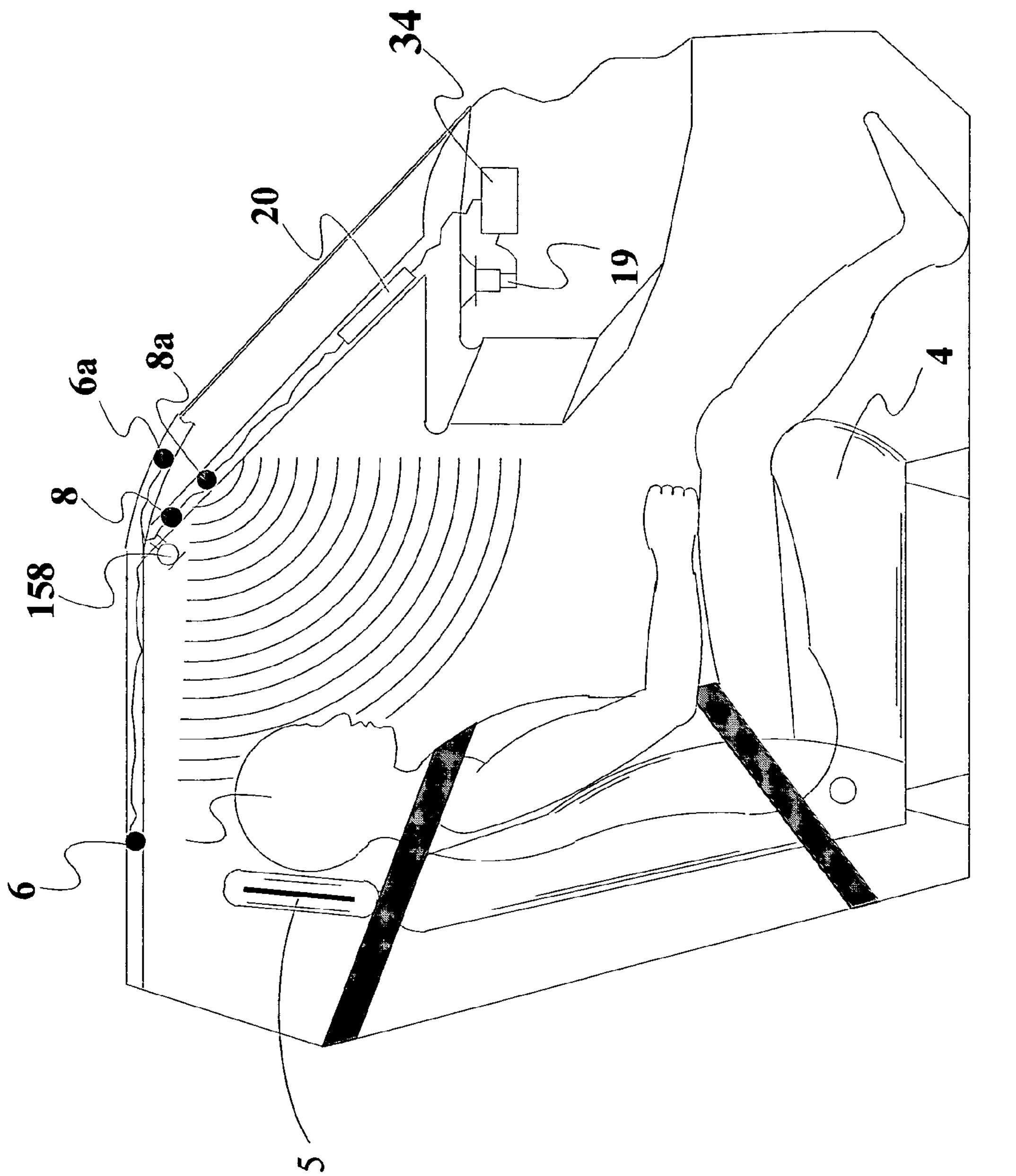
FIG. 50 is a side view with parts cutaway and removed of a vehicle showing the passenger compartment containing a front passenger and a preferred mounting location for an occupant head detector and a preferred mounting location of an adjustable microphone and speakers and including an antenna field sensor in the headrest for a rear of occupant's head locator for use with a headrest adjustment system to reduce whiplash injuries, in particular, in rear impact crashes.

When the driver of a vehicle is using a cellular phone, the phone microphone frequently picks up other noise in the vehicle making it difficult for the other party to hear what is being said. This noise can be reduced if a directional microphone is used and directed toward the mouth of the driver. This is difficult to do since the position of drivers' mouths varies significantly depending on such things as the size and seating position of the driver. By using the vehicle interior identification and monitoring system of this invention, and through appropriate pattern recognition techniques, the location of the driver's head can be determined with sufficient accuracy even with ultrasonics to permit a directional microphone assembly to be sensitized to the direction of the mouth of the driver resulting in a clear reception of his voice. The use of directional speakers in a similar manner also improves the telephone system performance. In the extreme case of directionality, the techniques of hypersonic sound can be used. Such a system can also be used to permit effortless conversations between occupants of the front and rear seats. Such a system is shown in FIG. 50, which is a system similar to that of FIG. 2 only using three ultrasonic transducers 6, 8 and 10 to determine the location of the driver's head and control the pointing direction of a microphone 158. Speaker 19 is shown connected schematically to the phone system 34 completing the system.

The transducer 8 can be placed high in the A-pillar, transducer 8 on the headliner and 10 on the IP. Naturally other locations are possible as discussed above. The three transducers are placed high in the vehicle passenger compartment so that the first returned signal is from the head. Temporal filtering is used to eliminate signals that are reflections from beyond the head and the determination of the head center location is then found by the approximate centroid of the head returned signal. That is, once the location of the return signal centroid is found from the three received signals from transducers 6, 8 and 10, the distance to that point is known for each of the transducers based on the time it takes the signal to travel from the head to each transducer. In this manner, by using the three transducers, all of which send and receive, plus an algorithm for finding the coordinates of the head center, using processor 20, and through the use of known relationships between the location of the mouth and the head center, an estimate of the mouth location, and the ear locations, can be determined within a circle having a diameter of about five inches (13 cm). This is sufficiently accurate for a directional microphone to cover the mouth while excluding the majority of unwanted noise.

Naturally camera based systems can be used to more accurately locate parts of the body such as the head.

The placement of multiple imagers in the vehicle, the use of a plastic electronics based display plus telematics permits the occupants of the vehicle to engage in a video conference if desired. Naturally, until autonomous vehicles appear, it would be best if the driver did not participate.

Once an occupying item has been located in a vehicle, or any object outside of the vehicle, the identification or categorization information along with an image, including an IR or multispectral image, or icon of the object can be sent via a telematics channel to a remote location. A passing vehicle, for example, can send a picture of an accident or a system in a vehicle that has had an accident can send an image of the occupants of the vehicle to aid is injury assessment by the EMS team.

The transmission of data obtained from imagers, or other transducers, to another location, requiring the processing of the information, using neural networks for example, to a remote location is an important feature of the inventions disclosed herein.

10. Display

A portion of the windshield, such as the lower left corner, can be used to display the vehicle and surrounding vehicles or other objects as seen from above, for example, as described in U.S. patent application Ser. No. 09/851,362 filed May 8, 2000. This display can use pictures or icons as appropriate. In another case, the condition of the road such as the presence, or likelihood of black ice can be displayed on the windshield where it would show on the road if the driver could see it. Naturally, this would require a source of information that such a condition exists, however, here the concern is that it can be displayed whatever the source of this or any other relevant information. When used in conjunction with a navigation system, directions including pointing arrows or a path outline perhaps in color can be displayed to direct the driver to his destination or to points of interest.

10.1 Heads-up Display

The use of a heads-up display has been discussed above. An occupant sensor of this invention permits the alignment of the object discovered by a night vision camera with the line of sight of the driver so that the object will be placed on the display where the driver would have seen it if he were able. Of course the same problem exists as with the glare control system in that to do this job precisely a stereo night vision camera is required. However, in most cases the error will be small if a single camera is used.

10.2 Adjust HUD Based on Driver Seating Position, Let Driver Align It Manually

Another option is to infer the location of the eyes of the driver and to adjust the HUD based on where the eyes of the driver are likely to be located. Then a manual fine tuning adjustment capability can be provided.

10.3 HUD on Rear Window

Previously, HUDs have only been considered for the windshield. This need not be so and the rear window can also be a location for a HUD display to aid the driver in seeing approaching vehicles, for example.

10.4 Plastic Electronics

SPD and Plastic electronics can be combined in the same visor or windshield. In this case the glare can be reduced and the visor or windshield used as a heads up display. The SPD technology is described in references (20), (22) and (23) and the plastic electronics in reference (21).

Another method of using the display capabilities of any heads-up display and in particular a plastic electronics display is to create an augmented reality situation such as described in a Scientific American article "Augmented Reality: A New Way of Seeing" (24) where the visor or windshield becomes the display instead of a head mounted display. Some applications include the display of the road edges and lane markers onto either the windshield or visor at the location that they would appear if the driver could see them through the windshield. The word windshield when used herein will mean any partially transparent or sometimes transparent display device or surface that is imposed between the eyes of a vehicle occupant and which can serve as a glare blocker and/or as a display device unless alternate devices are mentioned in the same sentence.

Other applications include the pointing out of features in the scene to draw attention to a road where the driver should go, the location of a business or service establishment, a point of interest, or any other such object. Along with such an indication, a voice system within the vehicle can provide directions, give a description of the business or service establishment, or give history or other information related to a pint of interest etc. The display can also provide additional visual information such as a created view of a building that is planned for a location, a view of a object of interest that used to be located at a particular point, the location of underground utilities etc. or anything that might appear on a GIS map database or other database relating to the location.

One particularly useful class of information relates to signage. Since a driver frequently misses seeing the speed limit sign, highway or road name sign etc., all such information can be displayed on the windshield in an inconspicuous manner along with the past five or so signs that the vehicle has passed and the forthcoming five or so signs alone with their distances. Naturally, these signs can be displayed in any convenient language and can even be spoken if desired by the vehicle operator.

The output from night vision camera systems can now also be displayed on the display where it would be located if the driver could see the object through the windshield. The problems of glare rendering such a display unreadable are solved by the glare control system described elsewhere herein. In some cases where the glare is particularly bad making it very difficult to see the roadway, the augmented reality roadway can be displayed over the glare blocking system providing the driver with a clear view of the road location. Naturally, a radar or other collision avoidance system would also be required to show the driver the location of all other vehicles or other objects in the vicinity. Sometimes the actual object can be displayed while in other cases an icon is all that is required and in fact provides a clearer representation of the object.

The augmented reality (AR) system can be controlled by a voice recognition system or by other mouse, joystick, switch or similar input device. Thus this AR system is displayed on a see through windshield and augments the information normally seen by the occupant. This system provides the right information to the occupant at the right time to aid in the safe operation of the vehicle and the pleasure and utility of the trip. The source of the information displayed may be resident within the vehicle or be retrieved from the Internet, a local transmitting station, a satellite, another vehicle, a cell phone tower or any other appropriate system.

Plastic electronics is now becoming feasible and will permit any surface in or on the vehicle to become a display surface. In particular, this technology is likely to be the basis of future HUDs.

Plastic electronics offer the possibility of turning any window into a display. This can be the windshield of an automobile or any window in a vehicle or house or other building, for that matter. A storefront can become a changeable advertising display, for example, and the windows of a house could be a display where emergency services warn people of a coming hurricane. For automotive and truck use, the windshield can now fulfill all of the functions that previously have required a heads-up display (HUD). These include displays of any information that a driver may want or need including the gages normally on the instrument panel, displaying the results of a night vision camera and, if an occupant sensor is present, an image of an object, or an icon representation, can be displayed on the windshield where the driver would see it if it were visible through the windshield as discussed in more detail elsewhere herein and in the commonly assigned cross referenced patents and patent applications listed above. In fact, plastic electronics have the ability to cover most or even the entire windshield area at low cost and without the necessity of an expensive and difficult to mount projection system. In contrast, most HUDs are very limited in windshield coverage. Plastic electronics also provide for a full color display, which is difficult to provide with a HUD since the combiner in the HUD is usually tuned to reflect only a single color.

In addition to safety uses, turning one or more windows of a house or vehicle into a display can have "infotainment" and other uses. For example, a teenager may wish to display a message on the side windows to a passing vehicle such as "hi, can I have your phone number?" The passing vehicle can then display the phone number if the occupant of that vehicle wishes. A vehicle or a vehicle operator that is experiencing problems can display "HELP" or some other appropriate message. The occupants of the back seat of a vehicle can use the side window displays to play games or search the Internet, for example. Similarly, a special visor like display based of plastic electronics can be rotated or pulled down from the ceiling for the same purposes. Thus, in a very cost effective manner, any or all of the windows or sun visors of the vehicle (or house or building) can now become computer or TV displays and thus make use of previously unused surfaces for information display.

Plastic electronics is in an early stage of development but will have an enormous impact on the windows, sunroofs and sun visors of vehicles. For example, researchers at Philips Research Laboratories have made a 64×64-pixel liquid crystal display (LCD) in which each pixel is controlled by a plastic transistor. Other researchers have used a polymer-dispersed liquid-crystal display (PDLCD) to demonstrate their polymeric transistor patterning. A PDLCD is a reflective display that, unlike most LCD technologies, is not based on polarization effects and so can be used to make a flexible display that could be pulled down like a shade, for example. In a PDLCD, light is either scattered by nonaligned molecules in liquid-crystal domains or the LC domains are transparent because an electrical field aligns the molecules.

Pentacene (5A) and sexithiophene (6T) are currently the two most widely used organic semiconductors. These are two conjugated molecules whose means of assembly in the solid state lead to highly orderly materials, including even the single crystal. The excellent transport properties of these molecules may be explained by the high degree of crystallinity of the thin films of these two semiconductor components.

The discovery of conducting polymers has become even more significant as this class of materials has proven to be of great technological promise. Conducting polymers have been put to use in such niche applications as electromagnetic shielding, antistatic coatings on photographic films, and windows with changeable optical properties. The undoped polymers, which are semiconducting and sometimes electroluminescent, have led to even more exciting possibilities, such as transistors, light-emitting diodes (LEDs), and photodetectors. The quantum efficiency (the ratio of photons out to electrons in) of the first polymer LEDs was about 0.01%, but subsequent work quickly raised it to about 1%. Polymer LEDs now have efficiencies of above about 10%, and they can emit a variety of colors. The upper limit of efficiency was once thought to be about 25% but this limitation has now been exceeded and improvements are expected to continue.

A screen based on PolyLEDs has advantages since it is lightweight and flexible. It can be rolled up or embedded into a windshield or other window. With plastic chips the electronics driving the screen are integrated into the screen itself. Some applications of the PolyLED are information screens of almost unlimited size, for example alongside motorways or at train stations. They now work continuously for about 50,000 hours, which is more that the life of an automobile. Used as a display, PolyLEDs are much thinner than an LCD screen with backlight.

The most important benefit of the PolyLED is the high contrast and the high brightness with the result that they can be easily read in both bright and dark environments, which is important for automotive applications. A PolyLED does not have the viewing angle problem associates with LCDs. The light is transmitted in all directions with the same intensity. Of particular importance is that PolyLEDs can be produced in large quantities at a low price. The efficiency of current plastic electronic devices depends somewhat on their electrical conductivity, which is currently considerably below metals. With improved ordering of the polymer chains, however, the conductivity is expected to eventually exceed that of the best metals.

Plastic electronics can be made using solution based processing methods, such as spin-coating, casting, and printing. This fact can potentially reduce the fabrication cost and lead to large area reel-to-reel production. In particular, printing methods (particularly screen printing) are especially desirable since the deposition and patterning steps can be combined in one single step. Screen printing has been widely used in commercial printed circuit boards and was recently adopted by several research groups to print electrodes as well as the active polymer layers for organic transistors and simple circuits. Inkjets and rubber stamps are alternative printing methods. A full-color polymer LED fabricated by ink-jet printing has been demonstrated using a solution of semiconducting polymer in a common solvent as the ink.

As reported in Science Observer, November-December, 1998 "Printing Plastic Transistors" plastic transistors can be made transparent, so that they could be used in display systems incorporated in an automobile's windshield. The plastic allows these circuits to be bent along the curvature of a windshield or around a package. For example, investigators at Philips Research in The Netherlands have developed a disposable identification tag that can be incorporated in the wrapping of a soft package.

11. Pattern Recognition

In basic embodiments of the invention, wave or energy-receiving transducers are arranged in the vehicle at appropriate locations, trained if necessary depending on the particular embodiment, and function to determine whether a life form is present in the vehicle and if so, how many life forms are present. A determination can also be made using the transducers as to whether the life forms are humans, or more specifically, adults, child in child seas, etc. As noted above and below, this is possible using pattern recognition techniques. Moreover, the processor or processors associated with the transducers can be trained to determine the location of the life forms, either periodically or continuously or possibly only immediately before, during and after a crash. The location of the life forms can be as general or as specific as necessary depending on the system requirements, i.e., a determination can be made that a human is situated on the driver's seat in a normal position (general) or a determination can be made that a human is situated on the driver's seat and is leaning forward and/or to the side at a specific angle as well as the position of his or her extremities and head and chest (specific). The degree of detail is limited by several factors, including, e.g., the number and position of transducers and training of the pattern recognition algorithm.

When different objects are placed on the front passenger seat, the two images (here "image" is used to represent any form of signal) from transducers 6, 8, 10 (FIG. 1) are different but there are also similarities between all images of rear facing child seats, for example, regardless of where on the vehicle seat it is placed and regardless of what company manufactured the child seat. Alternately, there will be similarities between all images of people sitting on the seat regardless of what they are wearing, their age or size. The problem is to find the set of "rules" or algorithm that differentiates the images of one type of object from the images of other types of objects, for example which differentiate the adult occupant images from the rear facing child seat images. The similarities of these images for various child seats are frequently not obvious to a person looking at plots of the time series from ultrasonic sensors and thus computer algorithms are developed to sort out the various patterns. For a more detailed discussion of pattern recognition see U.S. Pat. No. RE37260 to Varga et. Al.

The determination of these rules is important to the pattern recognition techniques used in this invention. In general, three approaches have been useful, artificial intelligence, fuzzy logic and artificial neural networks including modular or combination neural networks. Other types of pattern recognition techniques may also be used, such as sensor fusion as disclosed in Corrado U.S. Pat. No. 05,482,314, U.S. Pat. No. 05,890,085, and U.S. Pat. No. 06,249,729. In some implementations of this invention, such as the determination that there is an object in the path of a closing window using acoustics as described below, the rules are sufficiently obvious that a trained researcher can look at the returned acoustic signals and devise an algorithm to make the required determinations. In others, such as the determination of the presence of a rear facing child seat or of an occupant, artificial neural networks are used to determine the rules. Neural network software for determining the pattern recognition rules is available from various sources such as International Scientific Research, Inc., PO Box 8, Denville, N.J. 07834.

The human mind has little problem recognizing faces even when they are partially occluded such as with a hat, sunglasses or a scarf, for example. With the increase in low cost computing power, it is now possible to train a rather large neural network, perhaps a combination neural network, to recognize most of those cases where a human mind will also be successful.

Other techniques which may or may not be part of the process of designing a system for a particular application include the following:

1. Fuzzy logic. Neural networks frequently exhibit the property that when presented with a situation that is totally different from any previously encountered, an irrational decision can result. Frequently when the trained observer looks at input data, certain boundaries to the data become evident and cases that fall outside of those boundaries are indicative of either corrupted data or data from a totally unexpected situation. It is sometimes desirable for the system designer to add rules to handle these cases. These can be fuzzy logic based rules or rules based on human intelligence. One example would be that when certain parts of the data vector fall outside of expected bounds that the system defaults to an airbag enable state.

2. Genetic algorithms. When developing a neural network algorithm for a particular vehicle, there is no guarantee that the best of all possible algorithms has been selected. One method of improving the probability that the best algorithm has been selected is to incorporate some of the principles of genetic algorithms. In one application of this theory, the network architecture and/or the node weights are varied pseudo-randomly to attempt to find other combinations which have higher success rates. The discussion of such genetic algorithms systems appears in the book *Computational Intelligence* referenced above.

Although neural networks are preferred other classifiers such as Bayesian classifiers can be used as well as any other pattern recognition system. A key feature of most of the inventions disclosed herein is the recognition that the technology of pattern recognition rather than deterministic mathematics should be applied to solving the occupant sensing problem.

11.1 Neural Nets

The system used in a preferred implementation of this invention for the determination of the presence of a rear facing child seat, of an occupant or of an empty seat, for example, is the artificial neural network, which is also commonly referred to as a trained neural network. In one case, illustrated in FIG. 1, the network operates on the returned signals as sensed by transducers 6, 8, 9 and 10, for example. Through a training session, the system is taught to differentiate between the different cases. This is done by conducting a large number of experiments where a selection of the possible child seats is placed in a large number of possible orientations on the front passenger seat. Similarly, a sufficiently large number of experiments are run with human occupants and with boxes, bags of groceries and other objects (both inanimate and animate). For each experiment with different objects and the same object in different positions, the returned signals from the transducers 6, 8, 9 and 10, for example, are associated with the identification of the occupant in the seat or the empty seat and information about the occupant such as its orientation if it is a child seat and/or position. Data sets are formed from the returned signals and the identification and information about the occupant or the absence of an occupant. The data sets are input into a neural network-generating program that creates a trained neural network that can, upon receiving input of returned signals from the transducers 6, 8, 9 and 10, provide an output of the identification and information about the occupant most likely situated in the seat or ascertained the existence of an empty seat. Sometimes as many as 1,000,000 such experiments are run before the neural network is sufficiently trained and tested so that it can differentiate among the several cases and output the correct decision with a very high probability. The data from each trial is combined to form a one dimensional array of data called a vector. Of course, it must be realized that a neural network can also be trained to differentiate among additional cases, for example, a forward facing child seat.

Once the network is determined, it is possible to examine the result using tools supplied by ISR, for example, to determine the rules that were arrived at by the trial and error process. In that case, the rules can then be programmed into a microprocessor resulting in a rule-based system. Alternately, a neural computer can be used to implement the net directly. In either case, the implementation can be carried out by those skilled in the art of pattern recognition. If a microprocessor is used, an additional memory device may be required to store the data from the analog to digital converters that digitize the data from the receiving transducers. On the other hand, if a neural network computer is used, the analog signal can be fed directly from the transducers to the neural network input nodes and an intermediate memory is not required. Memory of some type is needed to store the computer programs in the case of the microprocessor system and if the neural computer is used for more than one task, a memory is needed to store the network specific values associated with each task.

For the vectors of data, adults and children each with different postures, states of windows etc. within the passenger compartment, and occupied and unoccupied child seats were selected. The selected adults include people with a variety of different physiques such as fat, lean, small, large, tall, short, and glasses wearing persons. The selected children ranged from an infant to a large child (for example, about 14 year old). In addition, the selected postures include, for example, a sitting state with legs crossed on a seat, a sitting state with legs on an instrument panel, a sitting state while reading a newspaper, a book, or a map, a sitting state while holding a cup of coffee, a cellular telephone or a dictation machine, and a slouching state with and without raised knees. Furthermore, the selected compartment states include variations in the seat track position, the window-opening amount, headrest position, and varying positions of a sun-visor. Moreover, a multitude of different models of child seats are used in the forward facing position and, where appropriate, in a rear facing position. The range of weights and the corresponding normalized values are as follows:

| Class | Weight Range | Normalized Value |
|---|---|---|
| Empty Seat | 0 to 2.2 lbs. | 0 to 0.01 |
| Rear Facing Child Seat | 2.2 to 60 lbs. | 0.01 to 0.27 |
| Forward Facing Child Seat | 2.2 to 60 lbs. | 0.01 to 0.27 |
| Normal Position Adult | 60 lbs and greater | 0.27 to 1 |

Obviously, other weight ranges may also be used in accordance with the invention and each weight range may be tailored to specific conditions, such as different vehicles. The output of the weight sensors may not correspond directly to be weight ranges in the above table. If for example strain measuring sensors are placed on each of the vehicle seat supports, such sensors will also respond to the weight of the seat itself. That weight must therefore the remove so that only the additional weight of an occupying item is measured. Similarly it may be desirable to place strain-sensing devices on only some of the vehicle seat support structures. In such cases the weight of the occupying item can be in inferred from the output of the strain sensing sensors. This will be described in greater detail below.

Considering now FIG. 9, the normalized data from the ultrasonic transducers 5, 6, 8, and 9, the seat track position detecting sensor 74, the reclining angle detecting sensor 57, from the weight sensor(s) 7, 76 and 97, from the heart beat sensor 71, the capacitive sensor 78 and the motion sensor 73 are input to the neural network 65, and the neural network 65 is then trained on this data. More specifically, the neural network 65 adds up the normalized data from the ultrasonic transducers, from the seat track position detecting sensor 74, from the reclining angle detecting sensor 57, from the weight sensor(s) 7, 76 and 97, from the heartbeat sensor 71, from the capacitive sensor 78 and from the motion sensor 73 with each data point multiplied by a associated weight according to the conventional neural network process to determine correlation function (step S6 in FIG. 18).

Figure 19B:
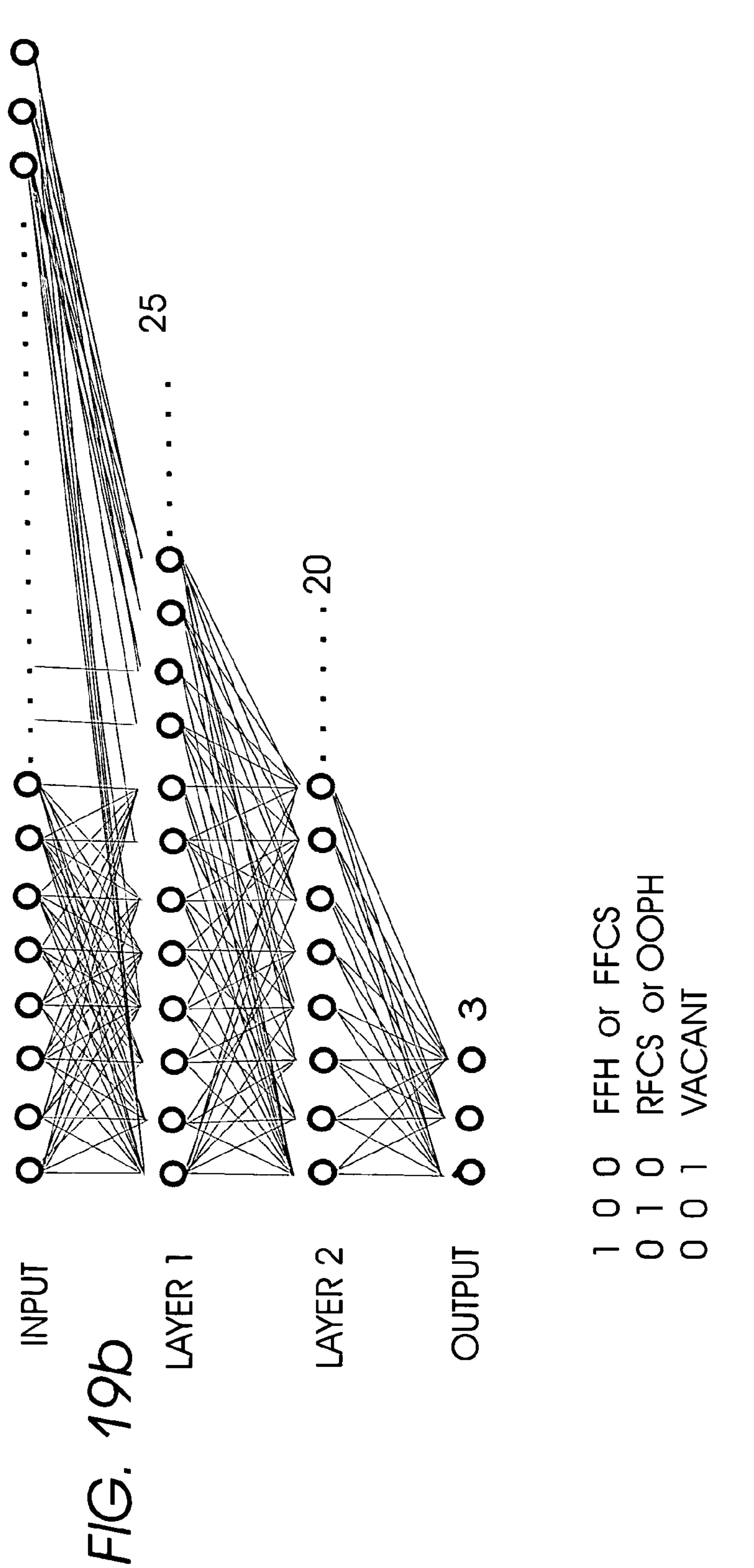

Looking now at FIG. 19B, in this embodiment, 144 data points are appropriately interconnected at 25 connecting points of layer 1, and each data point is mutually correlated through the neural network training and weight determination process. The 144 data points consist of 138 measured data points from the ultrasonic transducers, the data (139th) from the seat track position detecting sensor 10, the data (140th) from the reclining angle detecting sensor 9, the data (141st) from the weight sensor(s) 6, the data ($142^{nd}$) from the heartbeat sensor 31, the data ($143^{rd}$) from the capacitive sensor and the data ($144^{th}$) from the motion sensor (the last three inputs are not shown on FIG. 19B. Each of the connecting points of the layer 1 has an appropriate threshold value, and if the sum of measured data exceeds the threshold value, each of the connecting points will output a signal to the connecting points of layer 2. Although the weight sensor input is shown as a single input, in general there will be a separate input from each weight sensor used. For example, if the seat has four seat supports and a strained measuring element is used on each support, what will be four data inputs to neural network.

The connecting points of the layer 2 comprises 20 points, and the 25 connecting points of the layer 1 are appropriately interconnected as the connecting points of the layer 2. Similarly, each data is mutually correlated through the training process and weight determination as described above and in the above referenced neural network texts. Each of the 20 connecting points of the layer 2 has an appropriate threshold value, and if the sum of measured data exceeds the threshold value, each of the connecting points will output a signal to the connecting points of layer 3.

The connecting points of the layer 3 comprises 3 points, and the connecting points of the layer 2 are interconnected at the connecting points of the layer 3 so that each data is mutually correlated as described above. If the sum of the outputs of the connecting points of layer 2 exceeds a threshold value, the connecting points of the latter 3 will output Logic values (100), (010), and (001) respectively, for example.

The neural network 65 recognizes the seated-state of a passenger A by training as described in several books on Neural Networks referenced in the above referenced patents and patent applications. Then, after training the seated-state of the passenger A and developing the neural network weights, the system is tested. The training procedure and the test procedure of the neural network 65 will hereafter be described with a flowchart shown in FIG. 18.

The threshold value of each connecting point is determined by multiplying weight coefficients and summing up the results in sequence, and the aforementioned training process is to determine a weight coefficient Wj so that the threshold value (ai) is a previously determined output.

$$ai=\Sigma Wj\cdot Xj(j=1 \text{ to } N)$$

wherein Wj is the weight coefficient,

Xj is the data and

N is the number of samples.

Based on this result of the training, the neural network 65 generates the weights for the coefficients of the correlation function or the algorithm (step S7).

At the time the neural network 65 has learned a suitable number of patterns of the training data, the result of the training is tested by the test data. In the case where the rate of correct answers of the seated-state detecting unit based on this test data is unsatisfactory, the neural network is further trained and the test is repeated. In this embodiment, the test was performed based on about 600,000 test patterns. When the rate of correct test result answers was at about 98%, the training was ended.

The neural network 65 has outputs 65*a*, 65*b* and 65*c* (FIG. 9). Each of the outputs 65*a*, 65*b* and 65*c* outputs a signal of logic 0 or 1 to a gate circuit or algorithm 77. Based on the signals from the outputs 65*a*, 65*b* and 65*c*, any one of these combination (100), (010) and (001) is obtained. In another preferred embodiment, all data for the empty seat was removed from the training set and the empty seat case was determined based on the output of the weight sensor alone. This simplifies the neural network and improves its accuracy.

In this embodiment, the output (001) correspond to a vacant seat, a seat occupied by an inanimate object or a seat occupied by a pet (VACANT), the output (010) corresponds to a rear facing child seat (RFCS) or an abnormally seated passenger (ASP or OOPA), and the output (100) corresponds to a normally seated passenger (NSP or FFA) or a forward facing child seat (FFCS).

The gate circuit (seated-state evaluation circuit) 77 can be implemented by an electronic circuit or by a computer algorithm by those skilled in the art and the details will not be presented here. The function of the gate circuit 77 is to remove the ambiguity that sometimes results when ultrasonic sensors and seat position sensors alone are used. This ambiguity is that it is sometimes difficult to differentiate between a rear facing child seat (RFCS) and an abnormally seated passenger (ASP), or between a normally seated passenger (NSP) and a forward facing child seat (FFCS). By the addition of one or more weight sensors in the function of acting as a switch when the weight is above or below 60 lbs., it has been found that this ambiguity can be eliminated. The gate circuit therefore takes into account the output of the neural network and also the weight from the weight sensor(s) as being above or below 60 lbs. and thereby separates the two cases just described and results in five discrete outputs.

Thus, the gate circuit 77 fulfills a role of outputting five kinds of seated-state evaluation signals, based on a combination of three kinds of evaluation signals from the neural network 65 and superimposed information from the weight sensor(s). The five seated-state evaluation signals are input to an airbag deployment determining circuit that is part of the airbag system and will not be described here. Naturally, as disclosed in the above reference patents and patent applications, the output of this system can also be used to activate a variety of lights or alarms to indicate to the operator of the vehicle the seated state of the passenger. Naturally, the system that has been here described for the passenger side is also applicable for the most part for the driver side.

An alternate and preferred method of accomplishing the function performed by the gate circuit is to use a modular neural network. In this case, the first level neural network is trained on determining whether the seat is occupied or vacant. The input to this neural network consists of all of the data points described above. Since the only function of this neural network is to ascertain occupancy, the accuracy of this neural network is very high. If this neural network determines that the seat is not vacant, then the second level neural network determines the occupancy state of the seat.

In this embodiment, although the neural network 65 has been employed as an evaluation circuit, the mapping data of the coefficients of a correlation function may also be implemented or transferred to a microcomputer to constitute the valuation circuit (see Step S8 in FIG. 18).

According to the seated-state detecting unit of the present invention, the identification of a vacant seat (VACANT), a rear facing child seat (RFCS), a forward facing child seat (FFCS), a normally seated adult passenger (NSP), an abnormally seated adult passenger (ASP), can be reliably performed. Based on this identification, it is possible to control a component, system or subsystem in the vehicle. For example, a regulation valve which controls the inflation or deflation of an airbag may be controlled based on the evaluated identification of the occupant of the seat. This regulation valve may be of the digital or analog type. A digital regulation valve is one that is in either of two states, open or closed. The control of the flow is then accomplished by varying the time that the valve is open and closed, i.e., the duty cycle.

The neural network has been previously trained on a significant number of occupants of the passenger compartment. The number of such occupants depends strongly on whether the driver or the passenger seat is being analyzed. The variety of seating states or occupancies of the passenger seat is vastly greater than that of the driver seat. For the driver seat, a typical training set will consist of approximately 100 different vehicle occupancies. For the passenger seat, this number can exceed 1000. These numbers are used for illustration purposes only and will differ significantly from vehicle model to vehicle model. Of course many vectors of data will be taken for each occupancy as the occupant assumes different positions and postures.

The neural network is now used to determine which of the stored occupancies most closely corresponds to the measured data. The output of the neural network can be an index of the setup that was used during training that most closely matches the current measured state. This index can be used to locate stored information from the matched trained occupancy. Information that has been stored for the trained occupancy typically includes the locus of the centers of the chest and head of the driver, as well as the approximate radius of pixels which is associated with this center to define the head area, for example. For the case of FIG. 8A, it is now known from this exercise where the head, chest, and perhaps the eyes and ears, of the driver are most likely to be located and also which pixels should be tracked in order to know the precise position of the driver's head and chest. What has been described above is the identification process.

The use of trainable pattern recognition technologies such as neural networks is an important part of the instant invention, although other non-trained pattern recognition systems such as fuzzy logic, correlation, Kalman filters, and sensor fusion (a derivative of fuzzy logic) can also be used. These technologies are implemented using computer programs to analyze the patterns of examples to determine the differences between different categories of objects. These computer programs are derived using a set of representative data collected during the training phase, called the training set. After training, the computer programs output a computer algorithm containing the rules permitting classification of the objects of interest based on the data obtained after installation in the vehicle. These rules, in the form of an algorithm, are implemented in the system that is mounted onto the vehicle. The determination of these rules is important to the pattern recognition techniques used in this invention. Artificial neural networks using back propagation are thus far the most successful of the rule determination approaches, however, research is underway to develop systems with many of the advantages of back propagation neural networks, such as learning by training, without the disadvantages, such as the inability to understand the network and the possibility of not converging to the best solution. In particular, back propagation neural networks will frequently give an unreasonable response when presented with data than is not within the training data. It is well known that neural networks are good at interpolation but poor at extrapolation. A combined neural network fuzzy logic system, on the other hand, can substantially solve this problem. Additionally, there are many other neural network systems in addition to back propagation. In fact, one type of neural network may be optimum for identifying the contents of the passenger compartment and another for determining the location of the object dynamically.

In some implementations of this invention, such as the determination that there is an object in the path of a closing window as described below, the rules are sufficiently obvious that a trained researcher can look at the returned optical signals and devise an algorithm to make the required determinations. In others, such as the determination of the presence of a rear facing child seat or an occupant, artificial neural networks are frequently used to determine the rules. Numerous books and articles, including more that 500 U.S. patents, describe neural networks in great detail and thus the theory and application of this technology is well known and will not be repeated here. Except in a few isolated situations where neural networks have been used to solve particular problems limited to engine control, for example, they have not previously been applied to automobiles and trucks.

The system generally used in the instant invention, therefore, for the determination of the presence of a rear facing child seat, an occupant, or an empty seat is the artificial neural network or a neural-fuzzy system. In this case, the network operates on the returned signals from the CCD array as sensed by transducers 49, 50, 51 and 54 in FIG. 8D, for example. For the case of the front passenger seat, for example, through a training session, the system is taught to differentiate between the three cases. This is done by conducting a large number of experiments where available child seats are placed in numerous positions and orientations on the front passenger seat of the vehicle. Similarly, a sufficiently large number of experiments are run with human occupants and with boxes, bags of groceries and other objects. As many as 1,000,000 such experiments are run before the neural network is sufficiently trained so that it can differentiate among the three cases and output the correct decision with a very high probability.

Once the network is determined, it is possible to examine the result to determine, from the algorithm created by the neural network software, the rules that were finally arrived at by the trial and error training technique. In that case, the rules can then be programmed into a microprocessor. Alternately, a neural computer can be used to implement the net directly. In either case, the implementation can be carried out by those skilled in the art of pattern recognition using neural networks. If a microprocessor is used, a memory device is also required to store the data from the analog to digital converters which digitize the data from the receiving transducers. On the other hand, if a neural network computer is used, the analog signal can be fed directly from the transducers to the neural network input nodes and an intermediate memory is not required. Memory of some type is needed to store the computer programs in the case of the microprocessor system and if the neural computer is used for more than one task, a memory is needed to store the network specific values associated with each task.

A review of the literature on neural networks yields the conclusion that the use of such a large training set is unique in the neural network field. The rule of neural networks is that there must be at least three training cases for each network weight. Thus, for example, if a neural network has 156 input nodes, 10 first hidden layer nodes, 5 second hidden layer nodes, and one output node this results in a total of 1,622 weights. According to conventional theory 5000 training examples should be sufficient. It is highly unexpected, therefore, that greater accuracy would be achieved through 100 times that many cases. It is thus not obvious and cannot be deduced from the neural network literature that the accuracy of the system will improve substantially as the size of the training database increases even to tens of thousands of cases. It is also not obvious looking at the plots of the vectors obtained using ultrasonic transducers that increasing the number of tests or the database size will have such a significant effect on the system accuracy. Each of the vectors is typically a rather course plot with a few significant peaks and valleys. Since the spatial resolution of an ultrasonic system is typically about 2 to 4 inches, it is once again surprising that such a large database is required to achieve significant accuracy improvements.

The back propagation neural network is a very successful general-purpose network. However, for some applications, there are other neural network architectures that can perform better. If it has been found, for example, that a parallel network as described above results in a significant improvement in the system, then, it is likely that the particular neural network architecture chosen has not been successful in retrieving all of the information that is present in the data. In such a case, an RCE, Stochastic, Logicon Projection, cellular, support vector machine or one of the other approximately 30 types of neural network architectures can be tried to see if the results improve. This parallel network test, therefore, is a valuable tool for determining the degree to which the current neural network is capable of using efficiently the available data.

One of the salient features of neural networks is their ability of find patterns in data regardless of its source. Neural networks work well with data from ultrasonic sensors, optical imagers, strain gage and bladder weight sensors, temperature sensors, pressure sensors, electric field sensors, capacitance based sensors, any other wave sensors including the entire electromagnetic spectrum, etc. If data from any sensors can be digitized and fed into a neural network generating program and if there is information in the pattern of the data then neural networks can be a viable method of identifying those patterns and correlating them with a desired output function. Note that although the inventions disclosed herein preferably use neural networks and combination neural networks to be described next, these inventions are not limited to this form or method of pattern recognition. The major breakthrough in occupant sensing came with the recognition by the current assignee that ordinary analysis using mathematical equations where the researcher looks at the data and attempts, based on the principles of statistics, engineering or physics, to derive the relevant relationships between the data and the category and location of an occupying item is not the proper approach and that pattern recognition technologies should be used. This is the first use of such pattern recognition technologies in the automobile safety and monitoring fields with the exception that neural networks have been used by the current assignee and others as the basis of a crash sensor algorithm and by certain automobile manufacturers for engine control.

11.2 Combination Neural Nets

The technique that was described above for the determination of the location of an occupant during panic or braking pre-crash situations involved the use of a modular neural network. In that case, one neural network was used to determine the occupancy state of the vehicle and one or more neural networks were used to determine the location of the occupant within the vehicle. The method of designing a system utilizing multiple neural networks is a key teaching of the present invention. When this idea is generalized, many potential combinations of multiple neural network architectures become possible. Some of these will now be discussed.

One of the earliest attempts to use multiple neural networks was to combine different networks trained differently but on substantially the same data under the theory that the errors which affect the accuracy of one network would be independent of the errors which affect the accuracy of another network. For example, for a system containing four ultrasonic transducers, four neural networks could be trained each using a different subset of the four transducer data. Thus, if the transducers are arbitrarily labeled A, B, C and D the then the first neural network would be trained on data from A, B and C. The second neural network would be trained on data from B, C, and D etc. This technique has not met with a significant success since it is an attempt to mask errors in the data rather than to eliminate them. Nevertheless, such a system does perform marginally better in some situations compared to a single network using data from all four transducers. The penalty for using such a system is that the computational time is increased by approximately a factor of three. This significantly affects the cost of the system installed in a vehicle.

An alternate method of obtaining some of the advantages of the parallel neural network architecture described above, is to form a single neural network but where the nodes of one or more of the hidden layers are not all connected to all of the input nodes. Alternately, if the second hidden layer is chosen, all of the notes from the previous hidden layer are not connected to all of the nodes of the subsequent layer. The alternate groups of hidden layer nodes can then be fed to different output notes and the results of the output nodes combined, either through a neural network training process into a single decision or a voting process. This latter approach retains most of the advantages of the parallel neural network while substantially reducing the computational complexity.

The fundamental problem with parallel networks is that they focus on achieving reliability or accuracy by redundancy rather than by improving the neural network architecture itself or the quality of the data being used. They also increase the cost of the final vehicle installed systems. Alternately, modular neural networks improve the accuracy of the system by dividing up the tasks. For example, if a system is to be designed to determine the type of tree or the type of animal in a particular scene, the modular approach would be to first determine whether the object of interest is an animal or a tree and then use separate neural networks to determine type of tree and the type of animal. When a human looks at a tree he is not ask himself is that a tiger or a monkey. Modular neural network systems are efficient since once the categorization decision is made, the seat is occupied by forward facing human, for example, the location of that object can be determined more accurately and without requiring increased computational resources.

Another example where modular neural networks have proven valuable is to provide a means for separating "normal" from "special cases". It has been found that in some cases, the vast majority of the data falls into what might be termed "normal" cases that are easily identified with a neural network. The balance of the cases cause the neural network considerable difficulty, however, there are identifiable characteristics of the special cases that permits them to be separated from the normal cases and dealt with separately. Various types of human intelligence rules can be used, in addition to a neural network, to perform this separation including fuzzy logic, statistical filtering using the average class vector of normal cases, the vector standard deviation, and threshold where a fuzzy logic network is used to determine chance of a vector belonging to a certain class. If the chance is below a threshold, the standard neural network is used and if above the special one is used.

Mean-Variance calculations, Fuzzy Logic, Stochastic, and Genetic Algorithm networks, and combinations thereof such as Neuro-Fuzzy systems are other technologies considered in designing an appropriate system. During the process of designing a system to be adapted to a particular vehicle, many different neural network and other pattern recognition architectures are considered including those mentioned above. The particular choice of architecture is frequently determined on a trial and error basis by the system designer in many cases using the combination neural network CAD software from International Scientific Research Inc. (ISR). Although the parallel architecture system described above has not proven to be in general beneficial, one version of this architecture has shown some promise. It is known that when training a neural network, that as the training process proceeds the accuracy of the decision process improves for the training and independent databases. It is also known that the ability of the network to generalize suffers. That is, when the network is presented with a system which is similar to some case in the database but still with some significant differences, the network may make the proper decision in the early stages of training, but the wrong decisions after the network has become fully trained. This is sometimes called the young network vs. old network dilemma. In some cases, therefore, using an old network in parallel with a young network can retain some of the advantages of both networks, that is, the high accuracy of the old network coupled with the greater generality of the young network. Once again, the choice of any of these particular techniques is part of the process of designing a system to be adapted to a particular vehicle and is a prime subject of this invention. The particular combination of tools used depends on the particular application and the experience of the system designer.

It has been found that the accuracy of the neural network pattern recognition system can be substantially enhanced if the problem is broken up into several problems. Thus, for example, rather than deciding that the airbag should be deployed or not using a single neural network and inputting all of the available data, the accuracy is improved it is first decided whether the data is good, then whether the seat is empty or occupied and then whether it is occupied by an adult or a child. Finally, if the decisions say that there is a forward facing adult occupying the seat, then the final level of neural network determines the location of the adult. Once the location is determined, a non-neural network algorithm can determine whether to enable deployment of the restraint system. The process of using multiple layers of neural networks is called modular neural networks and when other features are added, it is called combination neural networks.

An example of a combination neural network is shown generally at 275 in FIG. 37. The process begins at 276 with the acquisition of new data. This could be from a variety of sources such as multiple cameras, ultrasonic sensors, capacitive sensors, other electromagnetic field monitoring sensors, and other electric and/or magnetic or acoustic-based wave sensors, etc. Additionally, the data can come from other sources such as weight or other morphological characteristic detecting sensors, occupant-presence detecting sensors, chemical sensors or seat position sensors. The data is preprocessed and fed into neural network at 277 where the type of occupying item is determined. If the network determines that the type of occupying item is either an empty seat or a rear facing child seat then control is passed to box 284 via line 285 and the decision is made to disable the airbag. It is envisioned though that instead of disabling deployment if a rear-facing child seat is present, a depowered deployment, a late deployment or a oriented deployment may be made if it is determined that such a deployment would more likely prevent injury to the child in the child seat than cause harm.

In the event that the occupant type classification neural network 277 has determined that the seat is occupied by something other than a rear-facing child seat, then control is transferred to neural network 278, occupant size classification, which has the task of determining whether the occupant is a small, medium or large occupant. It has been found that the accuracy of the position determination is usually improved if the occupant size is first classified and then a special occupant position neural network is used to monitor the position of the occupant relative to airbag module. Nevertheless, the order of applying the neural networks, e.g., the size classification prior to the position classification, is not critical to the practice of the invention.

Once the size of the occupant has been classified by a neural network at 278, control is then passed to neural networks 279, 280, or 281 depending on the output size determination from neural network 278. The chosen network then determines the position of the occupant and that position determination is fed to the feedback delay algorithm 282 via line 283 and to the decision to disable algorithm 284. The feedback delay 282 can be a function of occupant size as well as the rate at which data is acquired. The results of the feedback delay algorithm 282 are fed to the appropriate large, medium or small occupant position neural networks 279, 280 or 281. It has been found that if the previous position of the occupant is used as input to the neural network that a more accurate estimation of the present position results. In some cases, multiple previous position values are fed instead of only the most recent value. This is determined for a particular application and programmed as part as of the feedback delay algorithm 266. After the decision to disable has been made in algorithm 284, control is returned to algorithm 276 via line 286 to acquire new data.

FIG. 37 is a singular example of an infinite variety combination neural networks that can be employed. This case combines a modular neural network structure with serial and parallel architectures. Feedback has also been used in a similar manner as a cellular neural network. Other examples include situations where imprecise data requires the input data to be divided into subsets and fed to a series of neural networks operating in parallel. The output of these neural networks can then be combined in a voting or another analytical manner to determine the final decision, e.g., whether and how to deploy the occupant protection apparatus. In other cases, particular transducers are associated with particular neural networks and the data combined after initial process by those dedicated neural networks. In still other cases, as discussed above, an initial neural network is used to determine whether the data to be analyzed is part of the same universe of data that has been used to train the networks. Sometimes transducers provide erroneous data and sometimes the wiring in the vehicle can be a source of noise that can corrupt the data. Similarly, a neural network is sometimes used as part of the decision to disable activity to compare results over time to again attempt to eliminate spurious false decisions. Thus, an initial determination as to whether the data is consistent with data on which the neural network is trained is often an advisable step.

In each of the boxes in FIG. 37, with the exception of the decision to disable box 284 and the feedback delay box 282, it has been assumed that each box would be a neural network. In many cases, a deterministic algorithm can be used, and in other cases correlation analysis, fuzzy logic or neural fuzzy systems, a support vector machine, a cellular neural network or any other pattern recognition algorithm or system are appropriate. Therefore, a combination neural network can include non-neural network analytical tasks.

FIG. 37 illustrates the use of a combination neural network to determine whether and how to deploy or disable an airbag. It must be appreciated that the same architecture may be used to determine whether and how to deploy any type of occupant protection apparatus as defined above. More generally, the architecture shown in FIG. 37 may be used simply to determine the occupancy state of the vehicle, e.g., the type, size and position of the occupant. A determination of the occupancy state of the vehicle includes a determination of any or all of the occupant's type, identification, size, position, health state, etc. The occupancy state can then be used to in the control of any vehicular component, system or subsystem.

Figure 51:
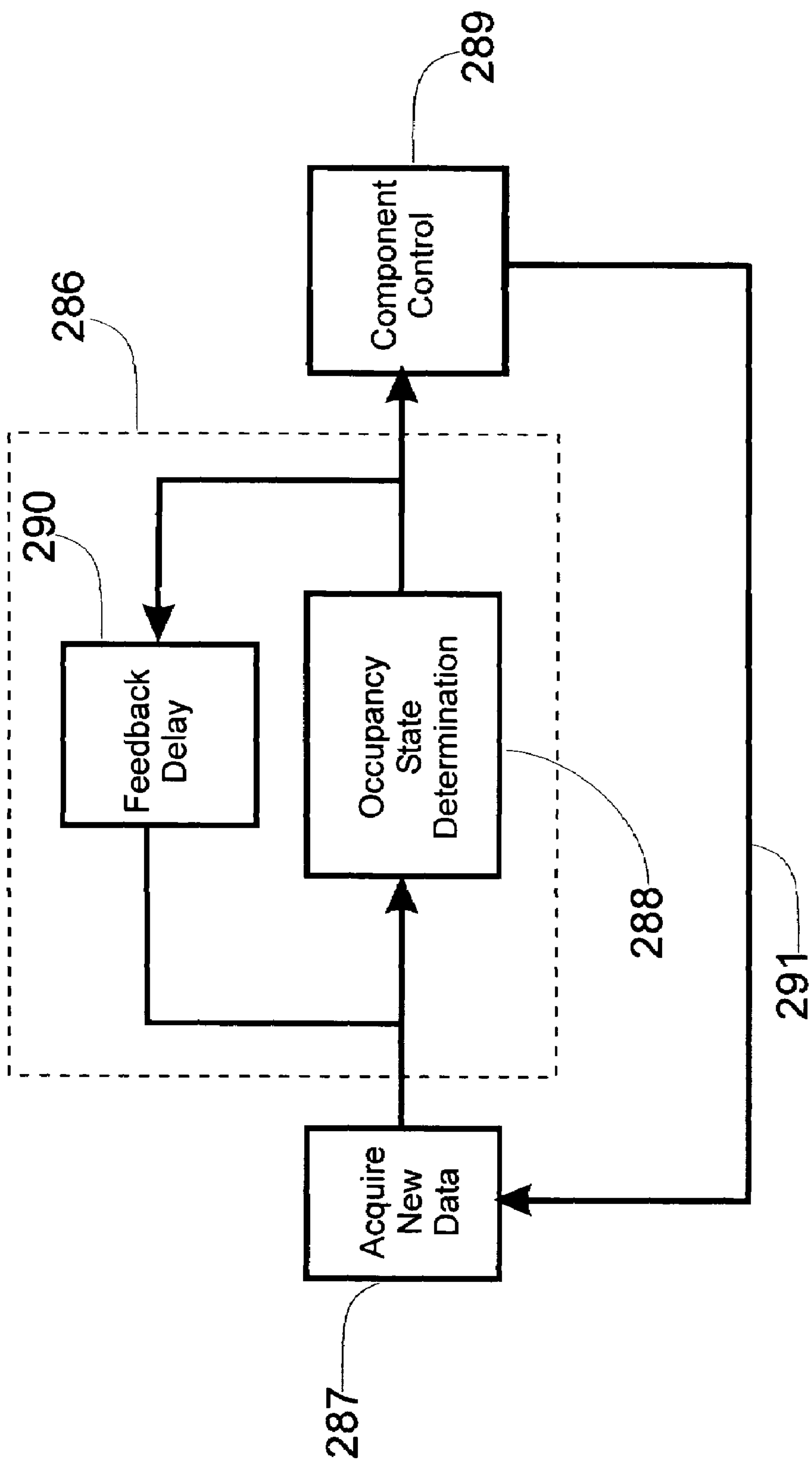
FIG. 51 is a schematic illustration of a method in which the occupancy state of a seat of a vehicle is determined using a combination neural network in accordance with the invention.

FIG. 51 shows a more general schematic illustration of the use of a combination neural network, or a combination pattern recognition network, designated 286 in accordance with the invention. Data is acquired at 287 and input into the occupancy state determination unit, i.e., the combination neural network, which provides an indication of the occupancy state of the seat. Once the occupancy state is determined at 288, it is provided to the component control unit 289 to effect control of the component. A feedback delay 290 is provided to enable the determination of the occupancy state from one instance to be used by the combination neural network at a subsequent instance. After the component control 289 is affected, the process begins anew by acquiring new data via line 291.

FIG. 52 shows a schematic illustration of the use of a combination neural network in accordance with the invention designated 292 in which the occupancy state determination entails an identification of the occupying item by one neural network and a determination of the position of the occupying item by one or more other neural network. Data is acquired at 293 and input into the identification neural network 294 which is trained to provide the identification of the occupying item of the seat based on at least some of the data, i.e., data from one or more transducers might have been deemed of nominal relevance for the identification determination and thus the identification neural network 294 was not trained on such data. Once the identification of the occupying item is determined at 294, it is provided to one of the position neural networks 295 which is trained to provide an indication of the position of the occupying item, e.g., relative to the occupant protection apparatus, based on at least some of the data. That is, data from one or more transducers, although possibly useful for the identification neural network 294, might have been deemed of nominal relevance for the position neural network 295 and thus the position neural network was not trained on such data. Once the identification and position of the occupying item are determined, they are provided to the component control unit 296 to effect control of the component based on one of these determinations or both. A feedback delay 297 is provided for the identification neural network 294 to enable the determination of the occupying item's identification from one instance to be used by the identification neural network 294 at a subsequent instance. A feedback delay 298 is provided for the position neural network 295 to enable the determination of the occupying item's position from one instance to be used by the position neural network 295 at a subsequent instance. After the component control 296 is effected, the process begins anew by acquiring new data via line 299. The identification neural network 294, the position determination neural network 295 and feedback delays 297 and 298 combine to constitute the combination neural network 292 in this embodiment (shown in dotted lines).

The data used by the identification neural network 294 to determine the identification of the occupying item may be different than the data used by the position determination neural network 295 to determine the position of the occupying item. That is, data from a different set of transducers may be applied by the identification neural network 294 than by the position determination neural network. Instead of a single position determination neural network as schematically shown in FIG. 52, a plurality of position determination neural networks may be used depending on the identification of the occupying item. Also, a size determination neural network may be incorporated into the combination neural network after the identification neural network 294 and then optionally, a plurality of the position determination neural networks as shown in the embodiment of FIG. 37.

Using the feedback delays 297 and 298, it is possible to use the position determination from position neural network 295 as input into the identification neural network 294. Note that any or all of the neural networks may have associated pre and post processors. For example, in some cases the input data to a particular neural network can be pruned to eliminate data points that are not relevant to the decision making of a particular neural network.

FIG. 53 shows a schematic illustration of the use of a combination neural network in accordance with the invention designated 300 in which the occupancy state determination entails an initial determination as to the quality of the data obtained by the transducers and intended for input into a main occupancy state determination neural network. Data from the transducers is acquired at 301 and input into a gating neural network 302 which is trained to allow only data which agrees with or is similar to data on which a main neural network 303 is trained. If the data provided by transducers has been corrupted and thus deviates from data on which the main neural network 303 has been trained, the gating neural network 302 will reject it and request new data via line 301 from the transducers. Thus, gating neural network 302 serves as a gate to prevent data which might cause an incorrect occupancy state determination from entering as input to the main neural network 303. If the gating neural network 302 determines that the data is reasonable, it allows the data to pass as input to the main neural network 303 which is trained to determine the occupancy state. Once the occupancy state is determined, it is provided to the component control unit 304 to effect control of the component. A feedback delay 306 is provided for the gating neural network 302 to enable the indication of unreasonable data from one instance to be used by the gating neural network 302 at a subsequent instance. A feedback delay 305 is provided for the main neural network 303 to enable the determination of the occupancy state from one instance to be used by the main neural network 303 at a subsequent instance. After the component control 304 is effected, the process begins anew by acquiring new data via line 307. The gating neural network 302, the main neural network 303 and optional feedback delays 305 and 306 combine to constitute the combination neural network 300 in this embodiment (shown in dotted lines).

Instead of a single occupancy state neural network as schematically shown in FIG. 53, the various combinations of neural networks disclosed herein for occupancy state determination may be used. Similarly, the use of a gating neural network, or a fuzzy logic algorithm or other algorithm, may be incorporated into any of the combination neural networks disclosed herein to prevent unreasonable data from entering into any of the neural networks in any of the combination neural networks.

Figure 54:
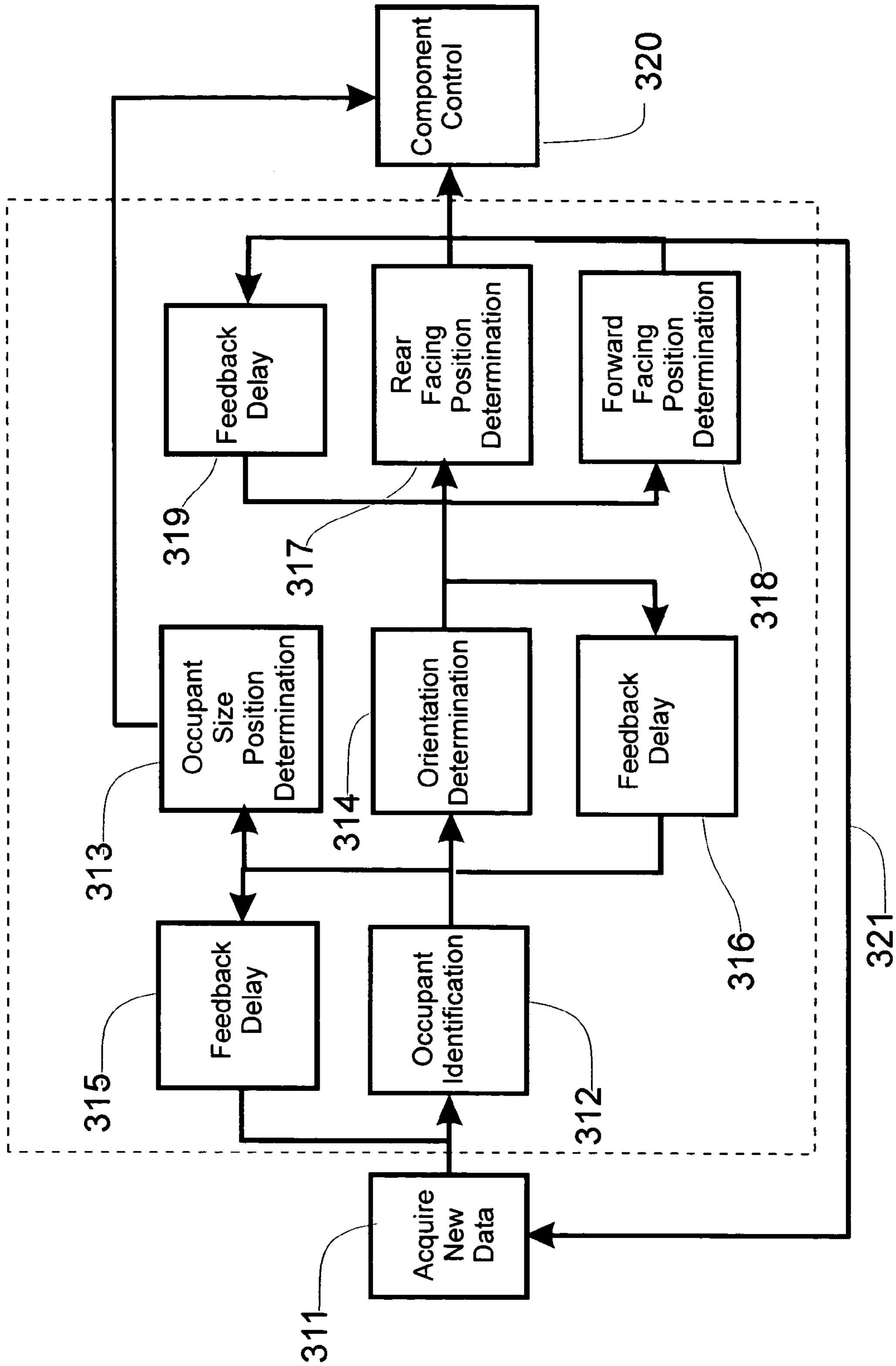
FIG. 54 is a schematic illustration of another method in which the occupancy state of a seat of a vehicle is determined, in particular, for the case when a child seat is present, using a combination neural network in accordance with the invention.

FIG. 54 shows a schematic illustration of the use of a combination neural network in accordance with the invention designated 310 with a particular emphasis on determining the orientation and position of a child seat. Data is acquired at 311 and input into the identification neural network 312 which is trained to provide the identification of the occupying item of the seat based on at least some of the data. If the occupying item is other than a child seat, the process is directed to size/position determination neural network 313 which is trained to determine the size and position of the occupying item and pass this determination to the component control 320 to enable control of the component to be effected based on the identification, size and/or position of the occupying item. Note that the size/position determination neural network may itself be a combination neural network.

When the occupying item is identified as a child seat, the process passes to orientation determination neural network 314 which is trained to provide an indication of the orientation of the child seat, i.e., whether it is rear-facing or forward-facing, based on at least some of the data. That is, data from one or more transducers, although possibly useful for the identification neural network 312, might have been deemed of nominal relevance for the orientation determination neural network 314 and thus the orientation neural network was not trained on such data. Once the orientation of the child seat is determined, control is then passed to position determination neural networks 317 and 318 depending on the orientation determination from neural network 314. The chosen network then determines the position of the child seat and that position determination is passed to component control 320 to effect control of the component.

A feedback delay 315 can be provided for the identification neural network 312 to enable the determination of the occupying item's identification from one instance to be used by the identification neural network 312 at a subsequent instance. A feedback delay 316 is provided for the orientation determination neural network 314 to enable the determination of the child seat's orientation from one instance to be used by the orientation determination neural network 314 at a subsequent instance. A feedback delay 319 can be provided for the position determination neural networks 317 and 318 to enable the position of the child seat from one instance to be used by the respective position determination neural networks 317 and 318 at a subsequent instance. After the component control 320 is effected, the process begins anew by acquiring new data via line 321. The identification neural network 312, the position/size determination neural network 313, the child seat orientation determination neural network 314, the position determination neural networks 317 and 318 and the feedback delays 315, 316 and 319 combine to constitute the combination neural network 310 in this embodiment (shown in dotted lines).

The data used by the identification neural network 312 to determine the identification of the occupying item, the data used by the position/size determination neural network 313 to determine the position of the occupying item, the data used by the orientation determination neural network 314, the data used by the position determination neural networks 317 and 318 may all be different from one another. For example, data from a different set of transducers may be applied by the identification neural network 312 than by the position/size determination neural network 313. As mentioned above, instead of a single position/size determination neural network as schematically shown in FIG. 52, a plurality of position determination neural networks may be used depending on the identification of the occupying item.

Using feedback delays 315, 316 and 319, it is possible to provide either upstream or downstream feedback from any of the neural networks to any of the other neural networks.

Figure 55:
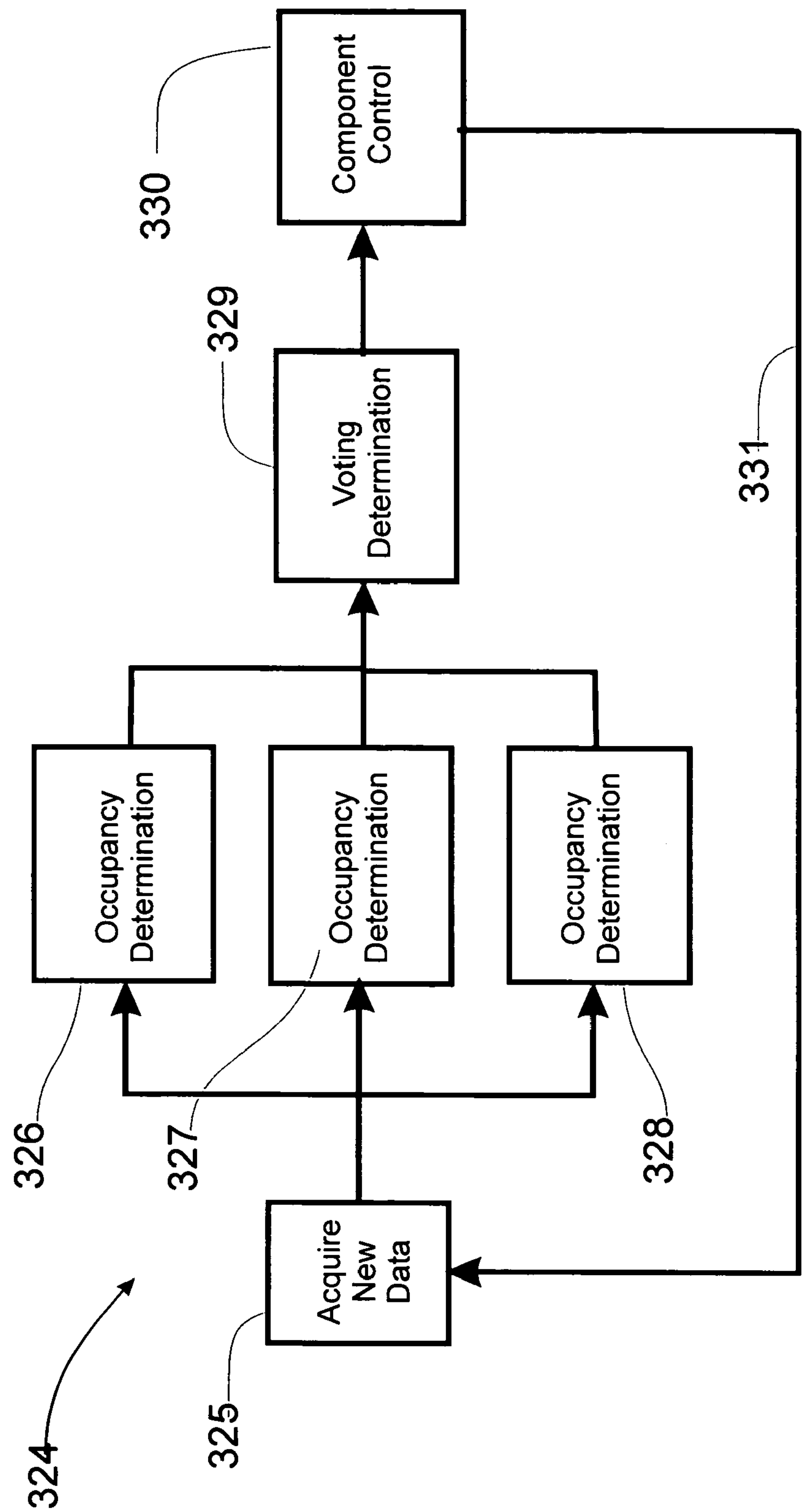
FIG. 55 is a schematic illustration of a method in which the occupancy state of a seat of a vehicle is determined using a combination neural network in accordance with the invention, in particular, an ensemble arrangement of neural networks.

FIG. 55 shows a schematic illustration of the use of an ensemble type of combination neural network in accordance with the invention designated 324. Data from the transducers is acquired at 325 and three streams of data are created. Each stream of data contains data from a different subset of transducers. Each stream of data is input into a respective occupancy determination neural network 326, 327 and 328, each of which is trained to determine the occupancy state based on the data from the respective subset of transducers. Once the occupancy state is determined by each neural network 326, 327 and 328, it is provided to a voting determination system 329 to consider the determination of the occupancy states from the occupancy determination neural networks 326, 327 and 328 and determine the most reasonable occupancy state which is passed to the component control unit 330 to effect control of the component. Ideally, the occupancy state determined by each neural network 326, 327 and 328 will be the same and such would be passed to the component control. However, in the event they differ, the voting determination system 329 weighs the occupancy states determined by each neural network 326, 327 and 328 and "votes" for one. For example, if two neural networks 326 and 327 provided the same occupancy state while neural network 328 provides a different occupancy state, the voting determination system 329 could be designed to accept the occupancy state from the majority of neural networks, in this case, that of neural networks 326 and 327. A feedback delay may be provided for each neural network 326, 327 and 328 as well as from the voting determination system 329 to each neural network 326, 327 and 328. The voting determination system 329 may itself be a neural network. After the component control 330 is effected, the process begins anew by acquiring new data via line 331.

Instead of the single occupancy state neural networks 326, 327 and 328 as schematically shown in FIG. 55, the various combinations of neural networks disclosed herein for occupancy state determination may be used.

The discussion above is primarily meant to illustrate the tremendous power and flexibility that combined neural networks provide. To apply this technology the researcher usually begins with a simple network of neural networks and determines the accuracy of the system based on the real world database. Normally even a simple structure providing sufficient transducers or sensors are chosen will yield accuracies above 98% and frequently above 99%. The networks then have to be biased so that virtually 100% accuracy is achieved for a normally seated forward seated adult since that is the most common seated state and any degradation for that condition could cause the airbag to be suppressed and result in more injuries rather than less. In biasing the results for that case the results of other cases are usually reduced at a multiple. Thus to go from 99.9% for the normally facing adult to 100% might cause the rear facing child seat accuracy to go from 99% to 98.6%. Thus for each 0.1% gain for the normally seated adult, a 0.4% loss resulted for the rear facing child seat. Through trial and error and using optimization software from ISR the combination network now begins to become more complicated as the last few tenths of a percent accuracy is obtained for the remaining seated states. Note that no other system known to the current assignees achieves accuracies in the 98% to 99% range and many are below 95%.

11.3 Interpretation of Other Occupant States—Inattention, Sleep

Once a vehicle interior monitoring system employing a sophisticated pattern recognition system, such as a neural network or modular neural network, is in place, it is possible to monitor the motions of the driver over time and determine if he is falling asleep or has otherwise become incapacitated. In such an event, the vehicle can be caused to respond in a number of different ways. One such system is illustrated in FIG. 6 and consists of a monitoring system having transducers 8 and 9 plus microprocessor 20 programmed to compare the motions of the driver over time and trained to recognize changes in behavior representative of becoming incapacitated e.g., the eyes blinking erratically and remaining closed for ever longer periods of time. If the system determines that there is a reasonable probability that the driver has fallen asleep, for example, then it can turn on a warning light shown here as 41 or send a warning sound. If the driver fails to respond to the warning by pushing a button 43, for example, then the horn and lights can be operated in a manner to warn other vehicles and the vehicle brought to a stop. One novel approach, not shown, would be to use the horn as the button 43. For a momentary depression of the horn, for this case, the horn would not sound. Other responses can also be programmed and other tests of driver attentiveness can be used, without resorting to attempting to monitor the motions of the driver's eyes that would signify that the occupant was alert. These other responses can include an input to the steering wheel, motion of the head, blinking or other motion of the eyes etc. In fact by testing a large representative sample of the population of drivers, the range of alert responses to the warning light and/or sound can be compared to the lack of response of an asleep driver and thereby the state of attentiveness determined.

An even more sophisticated system of monitoring the behavior of the driver is to track his eye motions using such techniques as are described in: Freidman et al., U.S. Pat. No. 04,648,052 "Eye Tracker Communication System"; Heyner et al., U.S. Pat. No. 04,720,189 "Eye Position Sensor"; Hutchinson, U.S. Pat. No. 04,836,670 "Eye Movement Detector"; and Hutchinson, U.S. Pat. No. 04,950,069 "Eye Movement Detector With Improved Calibration and Speed" as well as U.S. Pat. No. 05,008,946 and U.S. Pat. No. 05,305,012 referenced above. The detection of the impaired driver in particular can be best determined by these techniques. These systems use pattern recognition techniques plus, in many cases, the transmitter and CCD receivers must be appropriately located so that the reflection off of the cornea of the driver's eyes can be detected as discussed in the above referenced patents. The size of the CCD arrays used herein permits their location, sometimes in conjunction with a reflective windshield, where this corneal reflection can be detected with some difficulty. Sunglasses or other items can interfere with this process.

In a similar manner as described in these patents, the motion of the driver's eyes can be used to control various systems in the vehicle permitting hands off control of the entertainment system, heating and air conditioning system or all of the other systems described above. Although some of these systems have been described in the afore-mentioned patents, none have made use of neural networks for interpreting the eye movements. The use of particular IR wavelengths permits the monitoring of the Driver's eyes without the driver knowing that this is occurring. IR with a wave length above about 1.1 microns, however, is blocked by glass glasses and thus other invisible frequencies may be required.

The use of the windshield as a reflector is particularly useful when monitoring the eyes of the driver by means of a camera mounted on the rear view mirror. The reflections from the cornea are highly directional as every driver knows whose lights have reflected off the eyes of an animal on the roadway. For this to be effective, the eyes of the driver must be looking at the radiation source. Since the driver is presumably looking through the windshield, the source of the radiation must also come from the windshield and the reflections from the driver's eyes must also be in the direction of the windshield. Using this technique, the time that the driver spends looking through the windshield can be monitored and if that time drops below some threshold value it can be presumed that the driver is not attentive and may be sleeping or otherwise incapacitated.

The location of the eyes of the driver, for this application, is greatly facilitated by the teachings of this invention as described above. Although others have suggested the use of eye motions and corneal reflections for drowsiness determination, up until now there has not been a practical method for locating the driver's eyes with sufficient precision and reliability as to render this technique practical. Also, although sunglasses might defeat such a system, most drowsiness caused accidents happen at night where it is less likely that sunglasses are worn.

11.4 Combining Occupant Monitoring and Car Monitoring

There is an inertial measurement unit (IMU) under development by the current assignee that will have the equivalent accuracy as an expensive military IMU but will sell for under $500. This IMU will contain 3 accelerometers and 3 gyroscopes and permit a very accurate tracking of the motion of the vehicle in three dimensions. The main purposes of this device will be replace all non-crush zone crash and rollover sensors, chassis control gyros etc. with a single device that will be 100 times more accurate. Another key application will be in vehicle guidance systems and it will eventually form the basis of a system that will know exactly where the vehicle is on the face of the earth within a few centimeters.

An additional use will be to monitor the motion of the vehicle in comparison with that of an occupant. Form this several facts can be gained. First, if the occupant moves in such a manner that is not caused by the motion of the vehicle, then the occupant must be alive. Conversely, if the driver motion is only caused by the vehicle than perhaps he or she is asleep or otherwise incapacitated. A given driver will usually have a characteristic manner of operating the steering wheel to compensate for drift on the road. If this manner changes then again the occupant may be falling asleep. If the motion of the occupant seems to be restrained relative to what a free body would do then there would be an indication that the seatbelt is in use, and if not that the seatbelt is not in use or that it is too slack and needs to be retracted somewhat.

11.5 Continuous Tracking

Previously, the output of the pattern recognition system, the neural network or combined neural network, has been the zone that the occupant is occupying. This is a somewhat difficult task for the neural network since it calls for a discontinuous output for a continuous input. If the occupant is in the safe seating zone than the output may be 0, for example and 1 if he moves into the at-risk zone. Thus for a small motion there is a big change in output. On the other hand as long as the occupant remains in the safe seating zone, he or she can move substantially with no change in output. A better method is to have as the output the position of the occupant from the airbag, for example, which is a continuous function and easier for the neural network to handle. This also provides for a meaningful output that permits, for example, the projection of the occupant forward in time and thus a prediction as to when he or she will enter another zone. This training of a neural network using a continuous position function is an important teaching of this invention.

To do continuous tracking, however, the neural network must be trained on data that states the occupant location rather than the zone that he or she is occupying. This requires that this data be measured by a different system than is being used to monitor the occupant. Various electromagnetic systems have been tried but they tend to get foiled by the presence of metal in the interior passenger compartment. Ultrasonic systems have provided such information as have various optical systems. Tracking with a stereo camera arrangement using black light for illumination, for example is one technique. The occupant can even be illuminated with a UV point of light to make displacement easier to measure.

In addition, when multiple cameras are used in the final system, a separate tracking system may not be required. The normalization process conducted above, for example, created a displacement value for each of the CCD or CMOS arrays in the assemblies 49, 50, 52, 52, and 54, (FIG. 8A) or a subset there of, which can now be used in reverse to find the precise location of the driver's head or chest, for example, relative to the known location of the airbag. From the vehicle geometry, and the head and chest location information, a choice can now be made as to whether to track the head or chest for dynamic out-of-position.

Tracking of the motion of the occupant's head or chest can be done using a variety of techniques. One preferred technique is to use differential motion, that is, by subtracting the current image from the previous image to determine which pixels have changed in value and by looking at the leading edge of the changed pixels and the width of the changed pixel field, a measurement of the movement of the pixels of interest, and thus the driver, can be readily accomplished. Alternately, a correlation function can be derived which correlates the pixels in the known initial position of the head, for example, with pixels that were derived from the latest image. The displacement of the center of the correlation pixels would represent the motion of the head of the occupant. Naturally, a wide variety of other techniques will be now obvious to those skilled in the art.

In a method disclosed above for tracking motion of a vehicular occupant's head or chest in accordance with the invention, electromagnetic waves are transmitted toward the occupant from at least one location, a first image of the interior of the passenger compartment is obtained from each location, the first image being represented by a matrix of pixels, and electromagnetic waves are transmitted toward the occupant from the same location(s) at a subsequent time and an additional image of the interior of the passenger compartment is obtained from each location, the additional image being represented by a matrix of pixels. The additional image is subtracted from the first image to determine which pixels have changed in value. A leading edge of the changed pixels and a width of a field of the changed pixels is determined to thereby determine movement of the occupant from the time between which the first and additional images were taken. The first image is replaced by the additional image and the steps of obtaining an additional image and subtracting the additional image from the first image are repeated such that progressive motion of the occupant is attained.

Other methods of continuous tracking include placing an ultrasonic transducer in the seatback and also on the airbag each giving a measure of the displacement of the occupant. Knowledge of vehicle geometry is required here such as the position of the seat. The thickness of the occupant can then be calculated and two measures of position are available. Other ranging systems such as optical range meters and stereo or distance by focusing cameras could be used in place of the ultrasonic sensors. Another system involves the placement on the occupant of a resonator or reflector such as a radar reflector, resonating antenna, or an RFID or SAW tag. In several of these cases, two receivers and triangulation based on the time of arrival of the returned pulses may be required.

Tracking can also be done during data collection using the same or a different system comprising structured light. If a separate tracking system is used, the structured light can be projected onto the object at time intervals in-between the taking of data with the main system. This way the tracking system would not interfere with the image being recorded by the primary system. All of the methods of obtaining three-dimensional information described above can be implemented in a separate tracking system.

11.7 Preprocessing

Only rarely is unprocessed or raw data that is received from the A to D converters fed directly into the pattern recognition system. Instead, it is preprocessed to extract features, normalize, eliminate bad data, remove noise and elements that have no informational value etc.

For example, for military target recognition is common to use the Fourier transform of the data rather than the data itself. This can be especially valuable for categorization as opposed to location of the occupant and the vehicle. When used with a modular network, for example, the Fourier transform of the data may be used for the categorization neural network and the non-transformed data used for the position determination neural network. Recently wavelet transforms have also been considered as a preprocessor.

Above, under the subject of dynamic out-of-position, it was discussed that the position of the occupant can be used as a preprocessing filter to determine the quality of the data in a particular vector. This technique can also be used in general as a method to improve the quality of a vector of data based on the previous positions of the occupant. This technique can also be expanded to help differentiate live objects in the vehicle from inanimate objects. For example, a forward facing human will change his position frequently during the travel of the vehicle whereas a box will tend to show considerably less motion. This is also useful, for example, in differentiating a small human from an empty seat. The motion of a seat containing a small human will be significantly different from that of an empty seat even though the particular vector may not show significant differences. That is, a vector formed from the differences from two successive vectors is indicative of motion and thus of a live occupant.

Preprocessing can also be used to prune input data points. If each receiving array of assemblies, 49, 50, 51, and 54 for example (FIG. 8A), contains a matrix of 100 by 100 pixels, then 40,000 (4×100×100) pixels or data elements of information will be created each time the system interrogates the driver seat, for example. There are many pixels of each image that can be eliminated as containing no useful information. This typically includes the corner pixels, back of the seat and other areas where an occupant cannot reside. This pixel pruning can typically reduce the number of pixels by up to 50 percent resulting in approximately 20,000 remaining pixels. The output from each array is then compared with a series of stored arrays representing different unoccupied positions of the seat, seatback, steering wheel etc. For each array, each of the stored arrays is subtracted from the acquired array and the results analyzed to determine which subtraction resulted in the best match. The best match is determined by such things as the total number of pixels reduced below the threshold level, or the minimum number of remaining detached pixels, etc. Once this operation is completed for all four images, the position of the movable elements within the passenger compartment has been determined. This includes the steering wheel angle, telescoping position, seatback angle, headrest position, and seat position. This information can be used elsewhere by other vehicle systems to eliminate sensors that are currently being used to sense such positions of these complements. Alternately, the sensors that are currently on the vehicle for sensing these complement positions can be used to simplify processes described above. Each receiving array may also be a 256×256 CMOS pixel array as described in the paper by C. Sodini et al. referenced above greatly increasing the need for an efficient pruning process.

An alternate technique of differentiating between the occupant and the vehicle is to use motion. If the images of the passenger seat are compared over time, reflections from fixed objects will remain static whereas reflections from vehicle occupants will move. This movement can be used to differentiate the occupant from the background.

Following the subtraction process described above, each image now consists of typically as many as 50 percent fewer pixels leaving a total of approximately 10,000 pixels remaining, for the 4 array 100×100 pixel case. The resolution of the images in each array can now be reduced by combining adjacent pixels and averaging the pixel values. This results in a reduction to a total pixel count of approximately 1000. The matrices of information that contains the pixel values is now normalized to place the information in a location in the matrix which is independent of the seat position. The resulting normalized matrix of 1000 pixel values can now be used as input into an artificial neural network and represents the occupancy of the seat independent of the position of the occupant. This is a brut force method and better methods based on edge detection and feature extraction can greatly simplify this process as discussed below.

There are many mathematical techniques that can be applied to simplify the above process. One technique used in military pattern recognition, as mentioned above, uses the Fourier transform of particular areas in an image to match with known Fourier transforms of known images. In this manner, the identification and location can be determined simultaneously. There is even a technique used for target identification whereby the Fourier transforms are compared optically as mentioned elsewhere herein. Other techniques utilize thresholding to limit the pixels that will be analyzed by any of these processes. Other techniques search for particular features and extract those features and concentrate merely on the location of certain of these features. (See for example the Kage et al. artificial retina publication referenced above.)

Generally, however as mentioned, the pixel values are not directly fed into a pattern recognition system but rather the image is preprocessed through a variety of feature extraction techniques such as an edge detection algorithm. Once the edges are determined, a vector is created containing the location of the edges and their orientation and that vector is fed into the neural network, for example, which performs the pattern recognition.

Another preprocessing technique that improves accuracy is to remove the fixed parts of the image, such as the seatback, leaving only the occupying object. This can be done many ways such as by subtracting one mage form another after the occupant has moved, as discussed above. Another is to eliminate pixels related to fixed parts of the image through knowledge of what pixels to removed based on seat position and previous empty seat analysis. Other techniques are also possible. Once the occupant has been isolated then those pixels remaining are placed in a particular position in the neural network vector. This is akin to the fact that a human, for example, will always move his or her eyes so as to place the object under observation into the center of the field of view, which is a small percent of the total field of view. In this manner the same limited number in pixels always observe the image of the occupying item thereby removing a significant variable and greatly improving system accuracy. The position of the occupant than can be determined by the displacement required to put the image into the appropriate part of the vector.

11.8 Post Processing

Post processing can use a comparison of the results at each time interval along with a test of reasonableness to remove erroneous results. Also averaging through a variety of techniques can improve the stability of the output results. Thus the output of a combination neural network is not necessarily the final decision of the system.

One principal used in a preferred implementation of the invention is to use images of different views of the occupant to correlate with known images that were used to train a neural network for vehicle occupancy. Then carefully measured positions of the known images are used to locate particular parts of the occupant such as his or her head, chest, eyes, ears, mouth, etc. An alternate approach is to make a three-dimensional map of the occupant and to precisely locate these features using neural networks, sensor fusion, fuzzy logic or other pattern recognition techniques. One method of obtaining a three-dimensional map is to utilize a scanning laser radar system where the laser is operated in a pulse mode and the distance from the object being illuminated is determined using range gating in a manner similar to that described in various patents on micropower impulse radar to McEwan. (See, for example, U.S. Pat. No. 05,457,394 and U.S. Pat. No. 05,521,600) Naturally, many other methods of obtaining a 3D representation can be used as discussed in detail above. This post processing step allows the determination of occupant parts from the image once the object is classified as an occupant.

Many other post processing techniques are available as discussed elsewhere herein.

11.9 An Example of Image Processing

As an example of the above concepts, a description of a single imager optical occupant classification system will now be presented.

11.9.1 Image Preprocessing

A number of image preprocessing filters have been implemented, including noise reduction, contrast enhancement, edge detection, image down sampling and cropping, etc. and some of them will now be discussed.

The Gaussian filter, for example, is very effective in reducing noise in an image. The Laplacian filter can be used to detect edges in an image. The result from a Laplacian filter plus the original image produces an edge-enhanced image. Both the Gaussian filter and the Laplacian filter can be implemented efficiently when the image is scanned twice. The original Kirsch filter consists of 8 filters that detect edges of 8 different orientations. The max Kirsch filter, however, uses a single filter that detects (but does not distinguish) edges of all 8 different orientations.

The histogram-based contrast enhancement filter improves image contrast by stretching pixel grayscale values until a desired percentage of pixels are suppressed and/or saturated. The wavelet-based enhancement filter modifies an image by performing multilevel wavelet decomposition and then applies a nonlinear transfer function to the detail coefficients. This filter reduces noise if the nonlinear transfer function suppresses the detail coefficients, and enhances the image if the nonlinear transfer function retains and increases the significant detail coefficients. A total of 54 wavelet functions from 7 families, for example, have been implemented.

Mathematical morphology has been proven to be a powerful tool for image processing (especially texture analysis). For example, the grayscale morphological filter that has been implemented by the current assignee includes the following operators: dilation, erosion, close, open, white tophat, black tophat, h-dome, and noise removal. The structure element is totally customizable. The implementation uses fast algorithms such as van Herk/Gil-Wernan's dilation/erosion algorithm, and Luc Vincent's grayscale reconstruction algorithm.

Sometimes using binary images instead of grayscale images increases the system robustness. The binarization filter provides 3 different ways to convert a grayscale image into a binary image: 1) using a constant threshold; 2) specifying a white pixel percentage; 3) Otsu's minimum deviation method. The image down-size filter performs image down-sampling and image cropping. This filter is useful for removing unwanted background (but limited to preserving a rectangular region). Image down-sampling is also useful because our experiments show that, given the current accuracy requirement, using a lower resolution image for occupant position detection does not degrade the system performance, and is more computationally efficient.

Three other filters that were implemented provide maximum flexibility, but require more processing time. The generic in-frame filter implements almost all known and to be developed window-based image filters. It allows the user to specify a rectangular spatial window, and define a mathematical function of all the pixels within the window. This covers almost all well-known filters such as averaging, median, Gaussian, Laplacian, Prewit, Sobel, and Kirsch filters. The generic cross-frame filter implements almost all known and to be developed time-based filters for video streams. It allows the user to specify a temporal window, and define a mathematical function of all the frames within the window. The pixel transfer filter provides a flexible way to transform an image. A pixel value in the resulting image is a customizable function of the pixel coordinates and the original pixel value. The pixel transfer filter is useful in removing unwanted regions with irregular shapes.

FIG. 99 shows some examples of the preprocessing filters that have been implemented. FIG. 99(1) shows the original image. FIG. 99(2) shows the result from a histogram-based contrast enhancement filter. FIG. 99(3) shows the fading effect generated using a pixel transfer filter where the transfer function is defined as $$\frac{1}{14} z^{1.5} e^{-0.0001\left[(x-60)^2+(y-96)^2\right]}.$$

FIG. 99(4) shows the result from a morphological filter followed by a histogram-based contrast enhancement filter. The h-dome operator was used with the dome height=128. One can see that the h-dome operator preserves bright regions and regions that contain significant changes, and suppresses dark and flat regions. FIG. 99(5) shows the edges detected using a Laplacian filter. FIG. 99(6) shows the result from a Gaussian filter followed by a max Kirsch filter, a binarization filter that uses Otsu's method, and a morphological erosion that uses a 3×3 flat structure element.

11.9.2 Feature Extraction Algorithm

The image size in the current classification system is 320×240, i.e. 76,800 pixels, which is too large for the neural network to handle. In order to reduce the amount of the data while retaining most of the important information, a good feature extraction algorithm is needed. One of the algorithm that was developed includes three steps:

1) Divide the whole into small rectangular blocks.

2) Calculate a few feature values from each block.

3) Line up the feature values calculated from individual blocks and then apply normalization.

By dividing the image into blocks, the amount of the data is effectively reduced while most of the spatial information is preserved.

Figure 100:
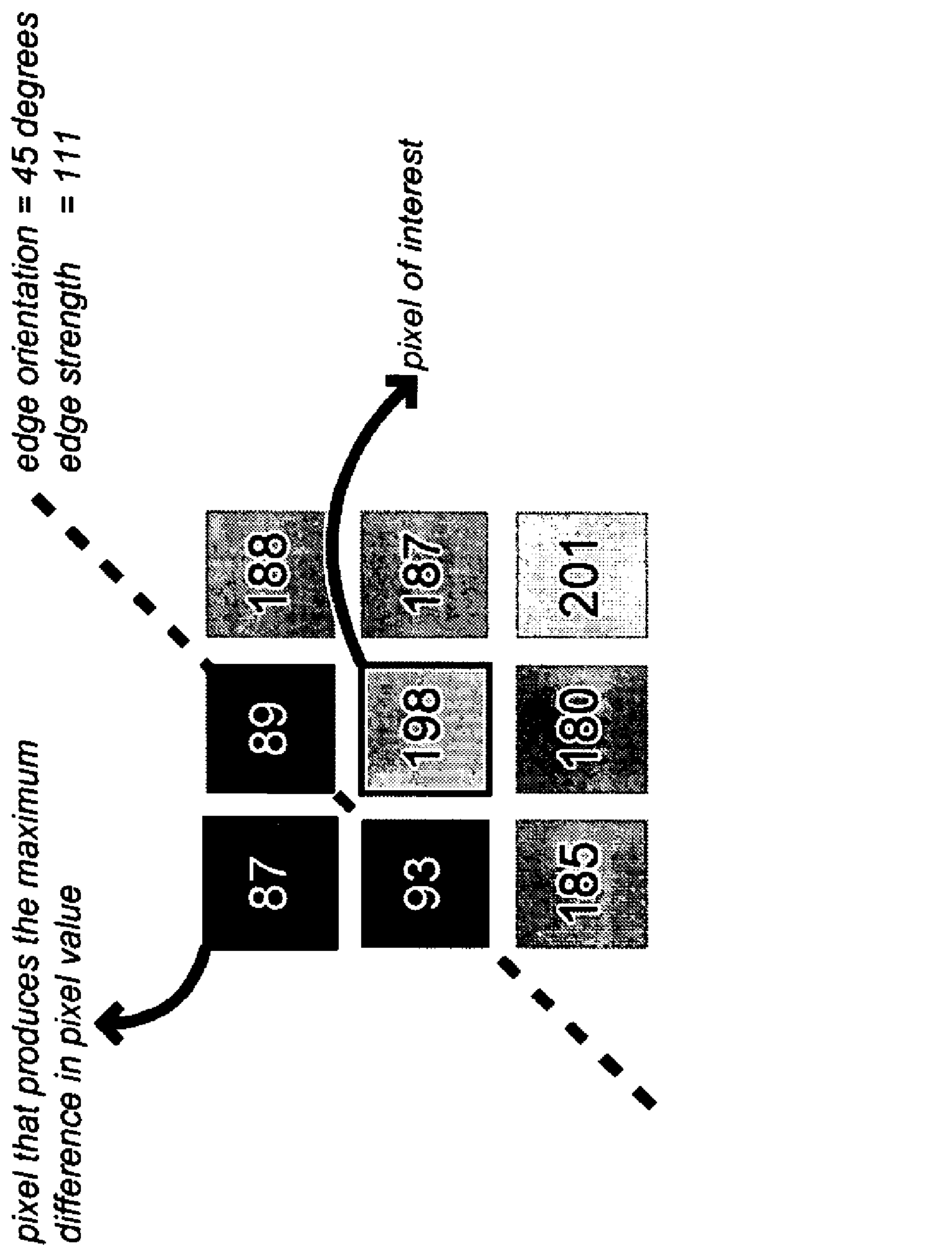

This algorithm was derived from a well-known algorithm that has been used in applications such as handwriting recognition. For most of the document related applications, binary images are usually used. Studies have shown that the numbers of the edges of different orientations in a block are very effective feature values for handwriting recognition. For our application where grayscale images are used, the count of the edges can be replaced by the sum of the edge strengths that are defined as the largest differences between the neighboring pixels. The orientation of an edge is determined by the neighboring pixel that produces the largest difference between itself and the pixel of interest (see FIG. 100).

FIG. 101 and FIG. 102 show the edges of 8 different orientations that are detected using Kirsch filters. The feature values that are calculated from these edges are also shown. Besides Kirsch filters, other edge detection methods such as Prewit and Sobel filters were also implemented.

Besides the edges, other information can also be used as the feature values. FIG. 103 shows the feature values calculated from the block-average intensities and deviations. Our studies show that the deviation feature is less effective than the edge and the intensity features.

The edge detection techniques are usually very effective for finding sharp (or abrupt) edges. But for blunt (or rounded) edges, most of the techniques are not effective at all. These kinds of edges also contain useful information for classification. In order to utilize such information, a multi-scale feature extraction technique was developed. In other words, after the feature extraction algorithm was applied to the image of the original size, a 50% down-sampling was done and the same feature extraction algorithm (with the same block size) was applied to the image of reduced size. If it is desired to find even blunter edges, this technique can be applied again to the down-sampled image.

11.9.3 Modular Neural Network Architecture

The camera based optical occupant classification system described here was designed to be a standalone system whose only input is the image from the camera. Once an image is converted into a feature vector, the classification decision can be made using any pattern recognition technique. A vast amount of evidence in literature shows that a neural network technique is particularly effective in image based pattern recognition applications.

In this application the patterns of the feature vectors are extremely complex. FIG. 104 shows a list of things that may affect the image data and therefore the feature vector. Considering all the combinations, there could be an infinite number of patterns. For a complex system like this, it would be almost impossible to train a single neural network to handle all the possible scenarios. Our studies have shown that by dividing a large task into many small subtasks, a modular approach is extremely effective with such complex systems.

As a first step the problem can be divided into an ambient light (or daytime) condition and a low-light (or nighttime) condition, each of which can be handled by a subsystem (see FIG. 105). Under low-light condition, the center of the view is illuminated by near infrared LEDs. The background (including the floor, the backseats, and the scene outside the window) is virtually invisible, which makes classification somewhat easier. Classification is more difficult under the ambient light condition because the background is illuminated by sunlight, and sometimes the bright sunlight projects sharp shadows onto the seat, which creates patterns in the feature vectors.

Based on the classification requirement, each subsystem can be implemented using a modular neural network architecture that consists of multiple neural networks. FIG. 8 shows two modular architectures that both consist of three neural networks. In FIG. 106(1), the three neural networks are connected in a cascade fashion. This architecture was based on the following facts that were observed:

1) Separating empty-seat (ES) patterns from all other patterns is much easier than isolating any other patterns;

2) After removing ES patterns, isolating the patterns of infant carriers and rearward-facing child seats (RFCS) is relatively easier than isolating the patterns of adult passengers.

In this architecture, the "empty-seat" neural network identifies ES from all classes, and it has to be trained with all data; the "infant" neural network identifies infant carrier and rearward-facing child seat, and it is trained with all data except the ES data; and the "adult" neural network is trained with the adult data against the data of child, booster seat, and forward-facing child seat (FFCS). Since isolating the patterns of adult passengers is the most difficult task here, training the "adult" neural network with fewer patterns improves the success rate.

The architecture in FIG. 106(2) is similar to FIG. 106(1) except that the "infant" neural network and the "adult" neural network run in parallel. As a result, the output from this architecture has an extra "undetermined" state. The advantage of this architecture is that a misclassification between adult and infant/RFCS happens only if both the "infant" and "adult" neural networks fail at the same time. The disadvantage is that the success rates of individual classes (except ES) are slightly lower. In this architecture, both the "infant" and "adult" neural networks must be trained with the similar data patterns.

Figure 107:
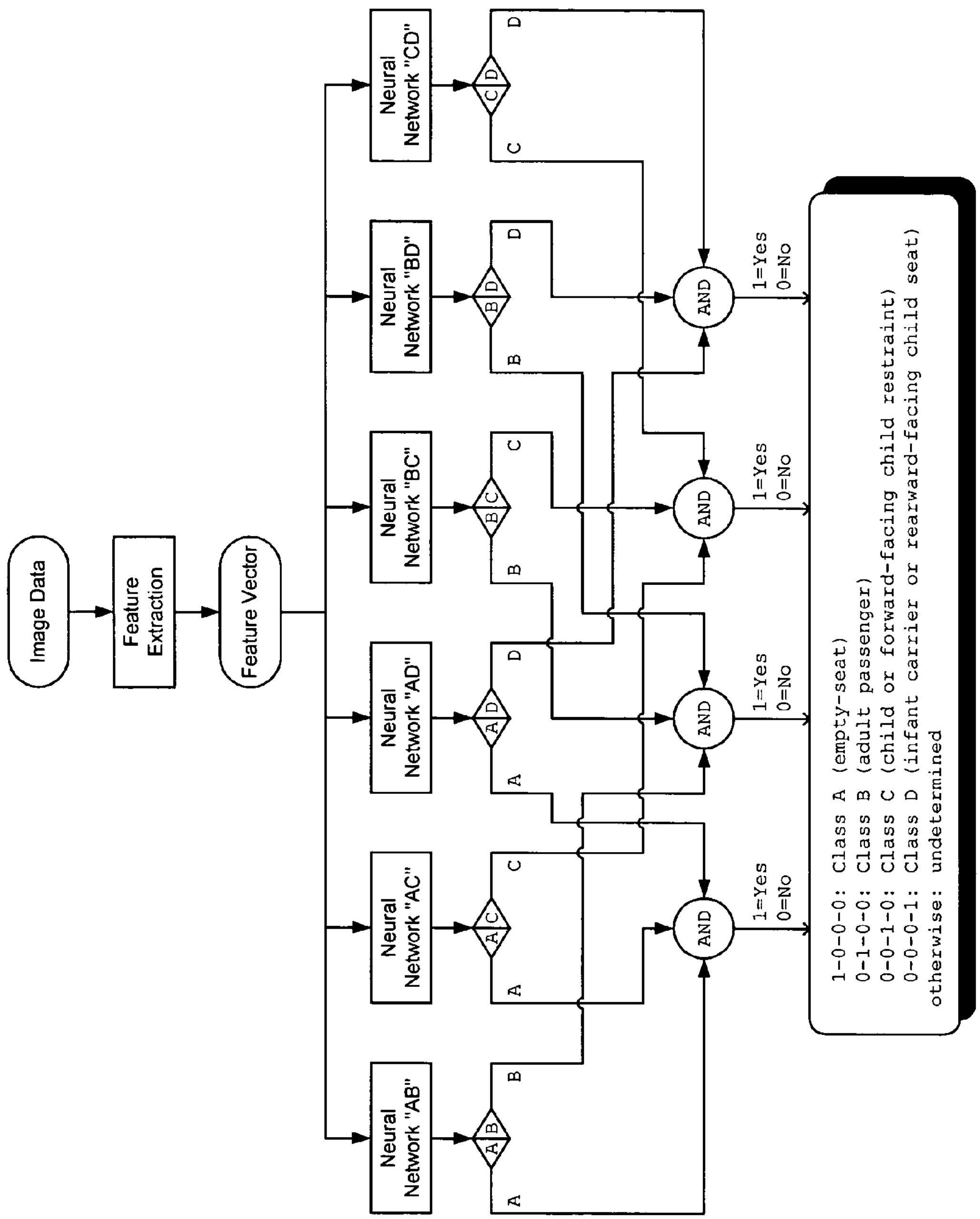

The architecture in FIG. 107 is more symmetrical. Although it is designed for classification among four different classes, it can be generalized to classify more classes. This architecture consists of six neural networks. Each neural network is trained to separate two classes, and it is trained with the data from these two classes only. Therefore high success rates can be expected from all six neural networks. This architecture has two unique characteristics:

1) Since the outputs of all the six neural networks can be considered as binary, there are 64 possible output combinations, but only 32 of them are valid. For an untrained data pattern, it is very likely that the output combination is invalid. This is very important. Given an input data pattern, most of the neural network systems are able to tell you "what I think it is", but they are not able to tell you "I haven't seen it before and I don't know what it is". With this architecture, most of the "never seen" data can be easily identified and processed accordingly.

2) From FIG. 107, it can be seen that, for a class A data pattern to be misclassified as class B, the trained neural network "AB", and the untrained neural networks "BC" and "BD"—all three of them—have to vote for class B. Given a fairly good training data set, the chance for that to happen should be very small. The chance for a misclassification can be made even smaller by using tighter thresholds. Assume that the neural network "AB" uses sigmoid transfer function, so its output is always between 0 and 1. Usually, an input data pattern is classified as class A if the output is below 0.5, and as class B otherwise. "Using tighter thresholds" means that an input data pattern is allowed to be classified as class A only if the output is below 0.4, as class B only if the output is above 0.6, and as undetermined if the output is between 0.4 and 0.6.

11.9.4 Post Neural Network Processing 11.9.4.1 Post-Processing Filters

Figures 108, 109:
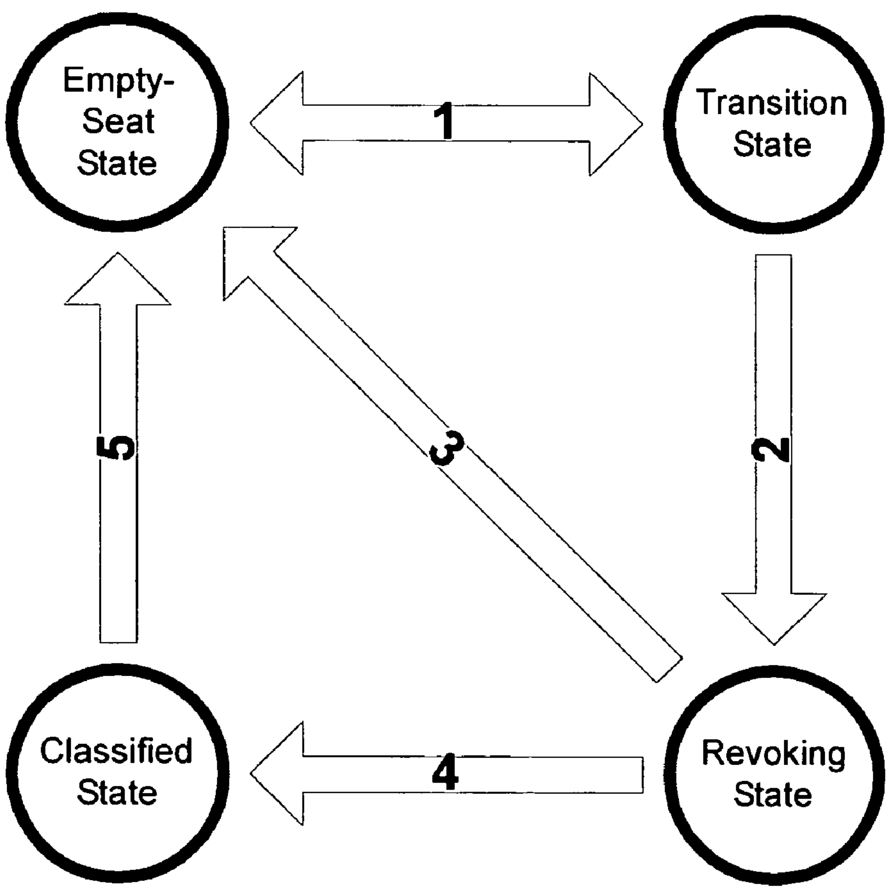

The simplest way to utilize the temporal information is to use the fact that the data pattern always changes continuously. Since the input to the neural networks is continuous, the output from the neural networks should also be continuous. Based on this idea, post-processing filters can be used to eliminate the random fluctuations in the neural network output. FIG. 108 shows a list of four of the many post-processing filters that have been implemented so far.

The generic digital filter covers almost all window-based FIR and IIR filters, which include averaging, exponential, Butterworth, Chebyshev, Elliptic, Kaiser window, and all other windowing functions such as Barlett, Hanning, Hamming, and Blackman. The output from a generic digital filter can be written as, $$y(n) = \frac{B_0x(n) + B_1x(n-1) + \cdots + B_Mx(n-M)}{A_1y(n-1) + A_2y(n-2) + \cdots + A_Ny(n-N)}$$

where x(n) and y(n) are current input and output respectively, and x(n−i) and y(n−j) are the previous input and output respectively. The characteristics of the filter are determined by the coefficients $B_i$ and $A_j$.

The Kalman filter algorithm can be summarized by the following group of equations:

$$\begin{cases} x_{k+1}^- = \Phi_{k+1}x_k & \text{(state extrapolation)} \\ P_{k+1}^- = \Phi_{k+1}P_k\Phi_{k+1}^T + Q_k & \text{(covarianve extrapolation)} \\ K_{k+1} = P_{k+1}^-H_{k+1}^T(H_{k+1}P_{k+1}^-H_{k+1}^T + R_{k+1})^{-1} & \text{(Kalman gain computation)} \\ x_{k+1} = x_{k+1}^- + K_{k+1}(z_{k+1} - H_{k+1}x_{k+1}^-) & \text{(state update)} \\ P_{k+1} = P_{k+1}^- - K_{k+1}H_{k+1}P_{k+1}^- & \text{(covarianve update)} \end{cases}$$

where x is the state vector, Φ is the state transition matrix, P is the filter error covariance matrix, Q is the process noise covariance matrix, R is the measurement noise covarianve matrix, H is the observation matrix, z is the observation vector, and $x^-$, $P^-$ and K are intermediate variables. The subscript k indicates that a variable is at time k. Given the initial conditions ($x_0$ and $P_0$), the Kalman filter gives the optimal estimate of the state vector as each new observation becomes available. The Kalman filter implemented here is a simplified version, where a linear AR(p) time series model is used. All the noise covariance matrices (Q and R) are assumed to be identity matrices multiplied by constants. The observation matrix H=(1 0 . . . 0). The state transition matrix $$\Phi = \begin{pmatrix} \phi_1 & \phi_2 & \phi_3 & \cdots & \phi_{p-1} & \phi_p \\ 1 & 0 & 0 & \cdots & 0 & 0 \\ 0 & 1 & 0 & \cdots & 0 & 0 \\ 0 & 0 & 1 & \cdots & 0 & 0 \\ \cdots & \cdots & \cdots & \cdots & \cdots & \cdots \\ 0 & 0 & 0 & \cdots & 1 & 0 \end{pmatrix},$$

where $\phi_i$ are parameters of the system.

The Median filter is a simple window-based filter that uses the median value within the window as the current output. ATI's post-decision filter is also a window-based filter. Basically it performs a weighted averaging, but the weight of a previous input depends on its "age" and its "locality" in the internal buffer.

Besides filtering, additional knowledge can be used to remove some of the undesired changes in the neural network output. For example, it is impossible to change from an adult passenger to a child restraint without going through an empty-seat state or key-off, and vice versa. Based on this idea, a decision-locking mechanism for eliminating undesired decision changes was implemented by introducing four internal system states (see FIG. 109). The definitions of the internal states are shown in FIG. 10, and the paths between the internal states are explained in FIG. 111. As can be seen, once the system stabilizes (i.e. enters classified state), any direct change between two non-empty-seat classes is prohibited.

The decision locking mechanism can operate in a variety of ways to minimize unintended changes in the occupancy decision. In one method, the occupancy decision is cleared when there is an event such as the opening of a door, the turning on the ignition, the motion of the vehicle indicative of the vehicle being driven, or some similar event. Once the decision is cleared, a default occupancy decision, usually meaning enable the airbag at least in the depowered state, is used until there is a significant over time stable decision at which time the new decision is locked until either the decision is again cleared or there is an overwhelming sequence of data that indicates that the occupancy has changed. Fore example, the decision could move off of the default decision if 100 decisions in a row indicated that a rear facing infant seat was present. At 10 milliseconds per decision this would mean about 1 second of data. Once this occurred then the count of consecutive rear facing infant seat decisions could be kept and in order for the decision to change that number of consecutive changed decisions would have to occur. Thus, until the decision function was reset, it would be difficult, but not impossible, to change the decision. This is a simplistic example of such a decision function but serves to illustrate the concept. Naturally an infinite number of similar functions can now be implemented by those skilled in the art. The use of any such decision function that locks the decision to prevent toggling, or for any other similar purpose is within the scope of this invention. One further comment, the motion of the vehicle indicating that the locking process should commence can be accomplished by an accelerometer or other motion sensor or by a magnetic flux sensor thereby making it unnecessary to connect to other vehicle systems that may not have sufficient reliability.

The decision-locking mechanism is the first use of such a mechanism in the vehicle monitoring art. In U.S. patent publication No. 2003/0168895 referenced-above, the time that a vehicle seat is in a given weight state alone with a door switch and seatbelt switch is used in a somewhat similar manner except that once the decision is made, it remains until the door is opened or the seatbelt in unfastened, as best as can be discerned from the description. This is quite different from the general use of the time that a seat is in a given state to lock the decision until there is a significant time period where the state has changed, as disclosed herein.

11.9.5 Data Collection and Neural Network Training 11.9.5.1 Nighttime Subsystem

The data collection on the night subsystem was done inside a building where the illumination from outside the vehicle can be filtered out using a near-infrared filter. The initial data set consisted of 364,000 images. After evaluating the subsystem trained with the initial data set, an additional data set (all from child restraints) consisting of 58,000 images was collected. Later a third data set (for boosting adult and dummy) was collected consisting of 150,750 images. Combining the three data sets together, the data distribution is shown in FIG. 112.

The night subsystem used the 3-network architecture shown in FIG. 106(2). The performance of the latest neural networks is shown in FIG. 113. Only a small portion of the data was used in training these three neural networks: for "infant" network and "adult" network, less than 44% of the data was used; for "empty-seat" network, only about 16% of the data was used. According to our experiences, given a complex data set like this one, a balanced training becomes very difficult to achieve once the data entries used in the training exceed 250,000. The success rates in Table 6, however, were obtained by testing these neural networks against the entire data set. The performance of the whole modular subsystem is shown in FIG. 114. A Gaussian filter was used for image preprocessing, the selected image features included pixel intensity and the edges detected using Sobel filters, and the features were calculated using 40×40 blocks.

11.9.5.2 Daytime Subsystem

The data collection on the daytime subsystem consisted of 195,000 images, and the data distribution is shown in FIG. 115. This is the very first daytime subsystem that ATI has been working on, and the data set collected was far from complete. All images in this data set were collected under sunny condition with the same vehicle orientation.

The data collection on daytime subsystem should be more complex because different sunlight conditions have to be considered. The matrix covers both sunny conditions and overcast conditions. For sunny condition, a timely schedule was created to cover all sunlight conditions corresponding to different time of the day. The vehicle configuration (including seat track, seat recline, passenger window, sun visor, center console, and vehicle orientation) is set randomly in order to provide a flat distribution.

The day subsystem used a neural network architecture simpler than the ones shown in FIG. 106. This architecture includes two neural networks: the "empty-seat" network and the "adult" network. This subsystem did not separate infant carrier and rearward-facing child seat from child and forward-facing child restraint. The performance of the neural networks is shown in FIG. 116, and the performance of the whole modular subsystem is shown in FIG. 117.

For this daytime subsystem, a Gaussian filter was used for image preprocessing, and the selected image feature included only the edges detected using Prewit filters, and the features were calculated using 30×30 blocks.

For this daytime subsystem, the back seat was clearly visible since the background was illuminated by the sunlight. The initial training results showed that the classification of child restraints was mistakenly associated with the presence of the operator in the back seat because the operator was moving the child restraint from the back seat during data collection. The classification of child restraints failed when the back seat was empty. This problem was solved by removing that particular region (about 80 pixel wide) from the image.

The accuracies reported in the above tables are based on single images and when the post processing steps are included the overall system accuracy approaches 100% and is a substantial improvement over previous systems.

11.9.6 Conclusions and Discussions

In this paper, the single camera optical occupant classification system was described in detail. During the development of this system, new image preprocessing techniques were implemented, the feature extraction algorithm was improved, new neural network architectures and new post-processing techniques were explored, data collection techniques were improved, new modular neural networks were trained and evaluated, many software tools were created or improved, and also Lessons Learned in data collection and hardware installation were identified. Besides the work described in this report, the algorithms for camera blockage detection and camera position calibration were developed, and test matrices were developed for better evaluating in-vehicle system performance.

The symmetrical neural network architecture shown in FIG. 107 was actually developed after the system reported here. The results prove that this architecture gives better performance than the other architectures. With this architecture, it is possible to reduce misclassifications by replacing the weak classifications with "undetermined" states. More importantly, this architecture provides a way to identify "unseen" patterns.

The development of an optical occupant sensing system requires many software tools whose functionalities include: communication with hardware, assisting data collection, analyzing and converting data, training modular neural networks, evaluating and demonstrating system performance, and evaluating new algorithms. The major software components are shown in FIG. 118 where the components in red boxes are developed by ATI.

It is important to note that the classification accuracies reported here are based on single images and when the post processing steps are included the overall system accuracy approaches 100%. This is a substantial improvement over previous systems even thought it is based on a single camera. Although this system is capable of dynamic tracking, some additional improvement can be obtained through the addition of a second camera. Nevertheless, the system as described herein is cost competitive with a weight only system and substantially more accurate. This system is now ready for commercialization where the prototype system described herein is made ready for high volume serial production.

12. Optical Correlators

A great deal of effort has been ongoing to develop fast optical pattern recognition systems to allow military vehicles such as helicopters to locate all of the enemy vehicles in a field of view. Some of the systems that have been developed are called optical correlation systems and have the property that the identification and categorization of various objects in the field of view happens very rapidly. A helicopter, for example coming onto a scene with multiple tanks and personnel carriers in a wide variety of poses and somewhat camouflaged can locate, identify and count all such vehicles in a fraction of a second. The cost of these systems has been prohibitively expensive for their use in automobiles for occupant tracking or for collision avoidance but this is changing.

Theoretically system performance is quite simple. The advantage of optical correlation approach is that correlation function is calculated almost instantly, much faster that with microprocessors and neural networks, for example. In simplest case one looks for correlation of an input image with reference samples. Sample which has the largest correlation peak is assumed as a match. In practice, the system is based on a training set of reference samples. Special filters are constructed for correlation with input image. Filters are used in order to reduce number of correlations to calculate. The output of the filters, the result of the correlation, is frequently a set of features. Finally the features are fed into some kind of classifier for decision making. This classifier can use Neural Networks.

The main bottleneck of optical correlators is large number of filters, or reference image samples, that are required. For example, if it is requirement to detect 10 different types of objects at different orientation, scale and illumination conditions, every modification factor enlarges number of filters for feature selection or correlation by factor of approximately 10. So, in a real system one may have to input 10,000 filters or reference images. Most correlators are able to find correlation of an input image with about of 5-20 filters during single correlation cycle. In other words the reference image contains 5-20 filters. Therefore during decision making cycle you need to feed into correlator and find correlation with approximately 1000 filters.

If the problem is broken down, as was done with modular neural networks, then the classification stage may take on the order of a second while the tracking stage can be done perhaps in a millisecond.

U.S. Pat. No. 05,473,466 and U.S. Pat. No. 05,051,738 describe a miniature high resolution display system for use with heads up displays for installation into the helmets of fighter pilots. This system, which is based on a thin garnet crystal, requires very little power and maintains a particular display until display is changed. Thus, for example, if there is a loss of power the display will retain the image that was last displayed. This technology has the capability of producing a very small heads up display unit as will be described more detail below. This technology has also been used as a spatial light monitor for pattern recognition based on optical correlation. Although this technology has been applied to military helicopters, it has previously not been used for occupant sensing, collision avoidance, anticipatory sensing, blind spot monitoring or any other ground vehicle application.

Although the invention described herein is not limited to a particular spatial light monitor (SLM) technology, the preferred or best mode technology is to use the garnet crystal system described U.S. Pat. No. 05,473,466. Although the system has never been applied to automobiles, it has significant advantages over other systems particularly in the resolution and optical intensity areas. The resolution of the garnet crystals as manufactured by Revtek is approximately 600 by 600 pixels. The size of the crystal is typically 1 cm square.

Basically, the optical correlation pattern recognition system works as follows. Stored in a computer are many Fourier transforms of images of objects that the system should identify. For collision avoidance, these include cars, trucks, deer or other animals, pedestrians, motorcycles, bicycles, or any other objects that could occur on a roadway. For an interior monitoring, these objects could include faces (particularly ones that are authorized to operate the vehicle), eyes, ears, child seats, children, adults of all sizes etc. The image from the scene that is captured by the lens is fed through a diffraction grating that optically creates the Fourier transform of the scene and projects it through SLM such as the garnet crystal of the '466 patent. The SLM is simultaneously fed and displays the Fourier stored transforms and a camera looks at the light that comes through the SLM. If there is a match then the camera sees a spike that locates the matching objects in the scene, there can be many such objects, all are found. The main advantage of this system over neural network pattern recognition systems is speed since it is all done optically and in parallel.

For collision avoidance, for example, many vehicles can be easily classified and tracked. For occupant sensing, the occupant's eyes can be tracked even if he is rapidly moving his head and the occupant herself can be tracked during a crash.

13. Other Inputs

Information can be provided as to the location of the driver, or other vehicle occupant, relative to the airbag, to appropriate circuitry which will process this information and make a decision as to whether to prevent deployment of the airbag in a situation where it would otherwise be deployed, or otherwise affect the time of deployment. One method of determining the position of the driver as discussed above is to actually measure his or her position either using electric fields, radar, optics or acoustics. An alternate approach, which is preferably used to confirm the measurements made by the systems described above, is to use information about the position of the seat and the seatbelt spool out to determine the likely location of the driver relative to the airbag. To accomplish this, the length of belt material which has been pulled out of the seatbelt retractor can be measured using conventional shaft encoder technology using either magnetic or optical systems. An example of an optical encoder is illustrated generally as 37 in FIG. 14. It consists of an encoder disk 38 and a receptor 39 which sends a signal to appropriate circuitry every time a line on the encoder disk passes by the receptor.

Figure 15:
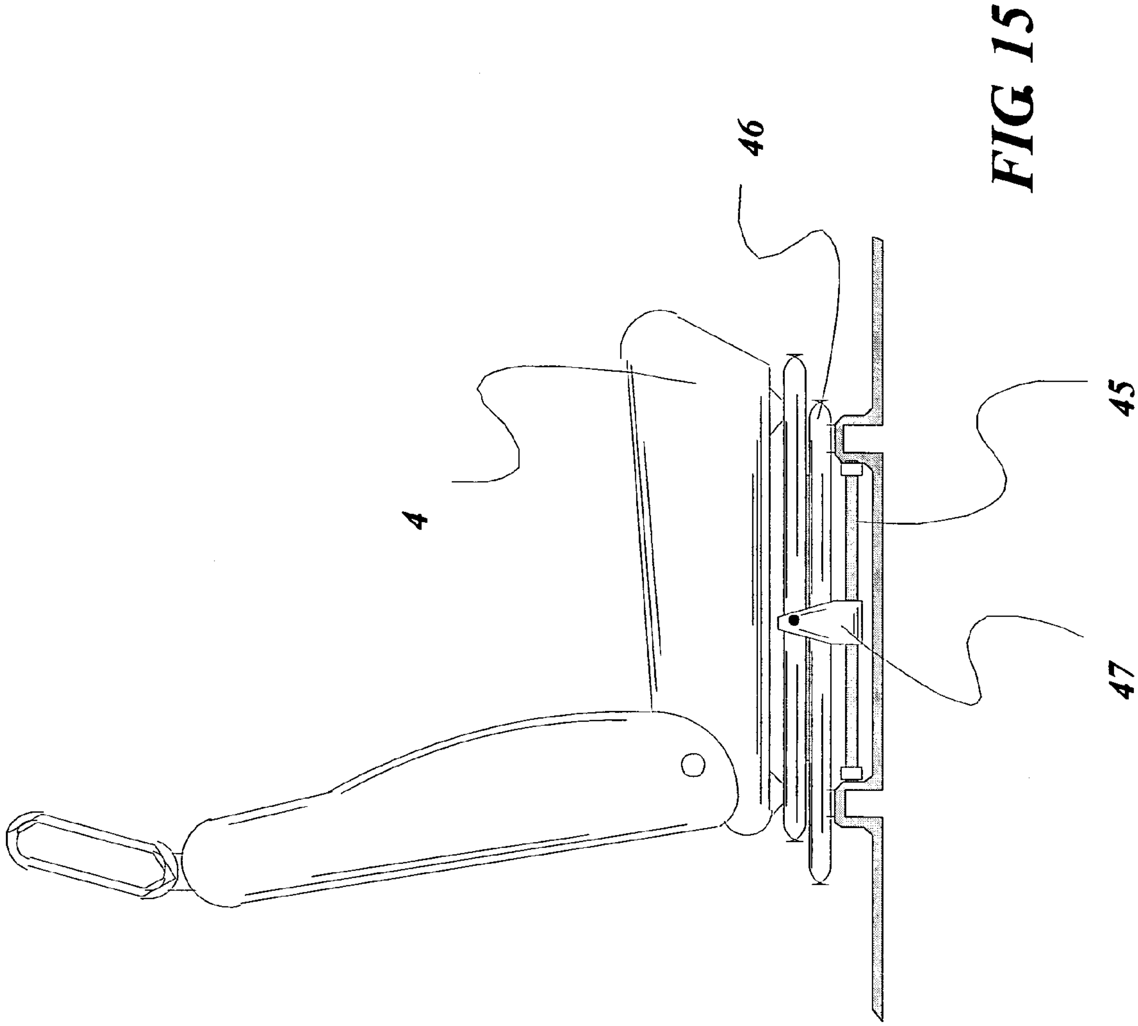
FIG. 15 is a side view of a portion of a seat and seat rail showing a seat position sensor utilizing a potentiometer.
Figure 16:
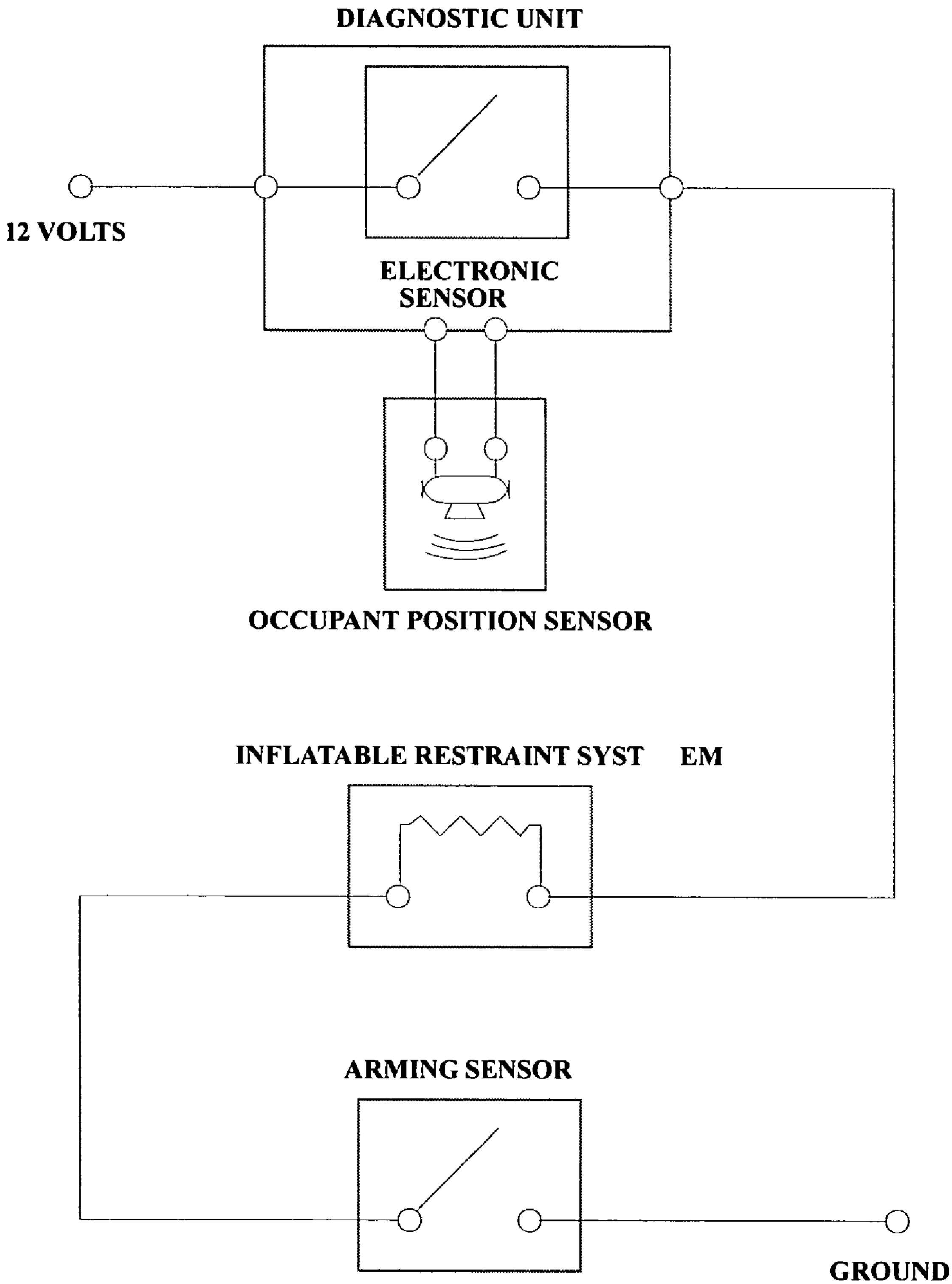
FIG. 16 is a circuit schematic illustrating the use of the occupant position sensor in conjunction with the remainder of the inflatable restraint system.

In a similar manner, the position of the seat can be determined through either a linear encoder or a potentiometer as illustrated in FIG. 15. In this case, a potentiometer 45 is positioned along the seat track 46 and a sliding brush assembly 47 can be used with appropriate circuitry to determine the fore and aft location of the seat 4. For those seats which permit the seat back angle to be adjusted, a similar measuring system would be used to determine the angle of the seat back. In this manner, the position of the seat relative to the airbag module can be determined. This information can be used in conjunction with the seatbelt spool out sensor to confirm the approximate position of the chest of the driver relative to the airbag. Of course, there are many other ways of measuring the angles and positions of the seat and its component parts.

For most cases, the seatbelt spool out sensor would be sufficient to give a good confirming indication of the position of the occupant's chest regardless of the position of the seat and seat back. This is because the seatbelt is usually attached to the vehicle at least at one end. In some cases, especially where the seat back angle can be adjusted, separate retractors can be used for the lap and shoulder portions of the seatbelt and the belt would not be permitted to slip through the "D-ring". The length of belt spooled out from the shoulder belt retractor then becomes a very good confirming measure of the position of the occupant's chest.

14. Other Products, Outputs, Features

Once the occupancy state of the seat (or seats) in the vehicle is known, this information can be used to control or affect the operation of a significant number of vehicular systems, components and devices. That is, the systems, components and devices in the vehicle can be controlled and perhaps their operation optimized in consideration of the occupancy of the seat(s) in the vehicle. Thus, the vehicle includes control means coupled to the processor means for controlling a component or device in the vehicle in consideration of the output indicative of the current occupancy state of the seat obtained from the processor means. The component or device can be an airbag system including at least one deployable airbag whereby the deployment of the airbag is suppressed, for example, if the seat is occupied by a rear-facing child seat, or otherwise the parameters of the deployment are controlled. Thus, the seated-state detecting unit described above may be used in a component adjustment system and method described below when the presence of a human being occupying the seat is detected.

The component adjustment system and methods in accordance with the invention can automatically and passively adjust the component based on the morphology of the occupant of the seat. As noted above, the adjustment system may include the seated-state detecting unit described above so that it will be activated if the seated-state detecting unit detects that an adult or child occupant is seated on the seat, that is, the adjustment system will not operate if the seat is occupied by a child seat, pet or inanimate objects. Obviously, the same system can be used for any seat in the vehicle including the driver seat and the passenger seat(s).

This adjustment system may incorporated the same components as the seated-state detecting unit described above, that is, the same components may constitute a part of both the seated-state detecting unit and the adjustment system, for example, the weight measuring means.

The adjustment system described herein, although improved over the prior art, will at best be approximate since two people, even if they are identical in all other respects, may have a different preferred driving position or other preferred adjusted component location or orientation. A system that automatically adjusts the component, therefore, should learn from its errors. Thus, when a new occupant sits in the vehicle, for example, the system automatically estimates the best location of the component for that occupant and moves the component to that location, assuming it is not already at the best location. If the occupant changes the location, the system should remember that change and incorporate it into the adjustment the next time that person enters the vehicle and is seated in the same seat. Therefore, the system need not make a perfect selection the first time but it should remember the person and the position the component was in for that person. The system, therefore, makes one, two or three measurements of morphological characteristics of the occupant and then adjusts the component based on an algorithm. The occupant will correct the adjustment and the next time that the system measures the same measurements for those measurement characteristics, it will set the component to the corrected position. As such, preferred components for which the system in accordance with the invention is most useful are those which affect a driver of the vehicle and relate to the sensory abilities of the driver, i.e., the mirrors, the seat, the steering wheel and steering column and accelerator, clutch and brake pedals.

Thus, although the above description mentions that the airbag system can be controlled by the control circuitry 20 (FIG. 1), any vehicular system, component or subsystem can be controlled based on the information or data obtained by transmitter and/or receiver assemblies 6, 8, 9 and 10. Control circuitry 20 can be programmed or trained, if for example a neural network is used, to control heating an air-conditioning systems based on the presence of occupants in certain positions so as to optimize the climate control in the vehicle. The entertainment system can also be controlled to provide sound only to locations at which occupants are situated. There is no limit to the number and type of vehicular systems, components and subsystems that can be controlled using the analysis techniques described herein.

Furthermore, if multiple vehicular systems are to be controlled by control circuitry 20, then these systems can be controlled by the control circuitry 20 based on the status of particular components of the vehicle. For example, an indication of whether a key is in the ignition can be used to direct the control circuitry 20 to either control an airbag system (when the key is present in the ignition) or an antitheft system (when the key is not present in the ignition). Control circuitry 20 would thus be responsive to the status of the ignition of the motor vehicle to perform one of a plurality of different functions. More particularly, the pattern recognition algorithm, such as the neural network described herein, could itself be designed to perform in a different way depending on the status of a vehicular component such as the detected presence of a key in the ignition. It could provide one output to control an antitheft system when a key is not present and another output when a key is present using the same inputs from the transmitter and/or receiver assemblies 6, 8, 9 and 10.

The algorithm in control circuitry 20 can also be designed to determine the location of the occupant's eyes either directly or indirectly through a determination of the location of the occupant and an estimation of the position of the eyes therefrom. As such, the position of the rear view mirror 55 can be adjusted to optimize the driver's use thereof.

Once a characteristic of the object is obtained, it can be used for numerous purposes. For example, the processor can be programmed to control a reactive component, system or subsystem 103 in FIG. 24 based on the determined characteristic of the object. When the reactive component is an airbag assembly including one or more airbags, the processor can control one or more deployment parameters of the airbag(s).

Figure 56:
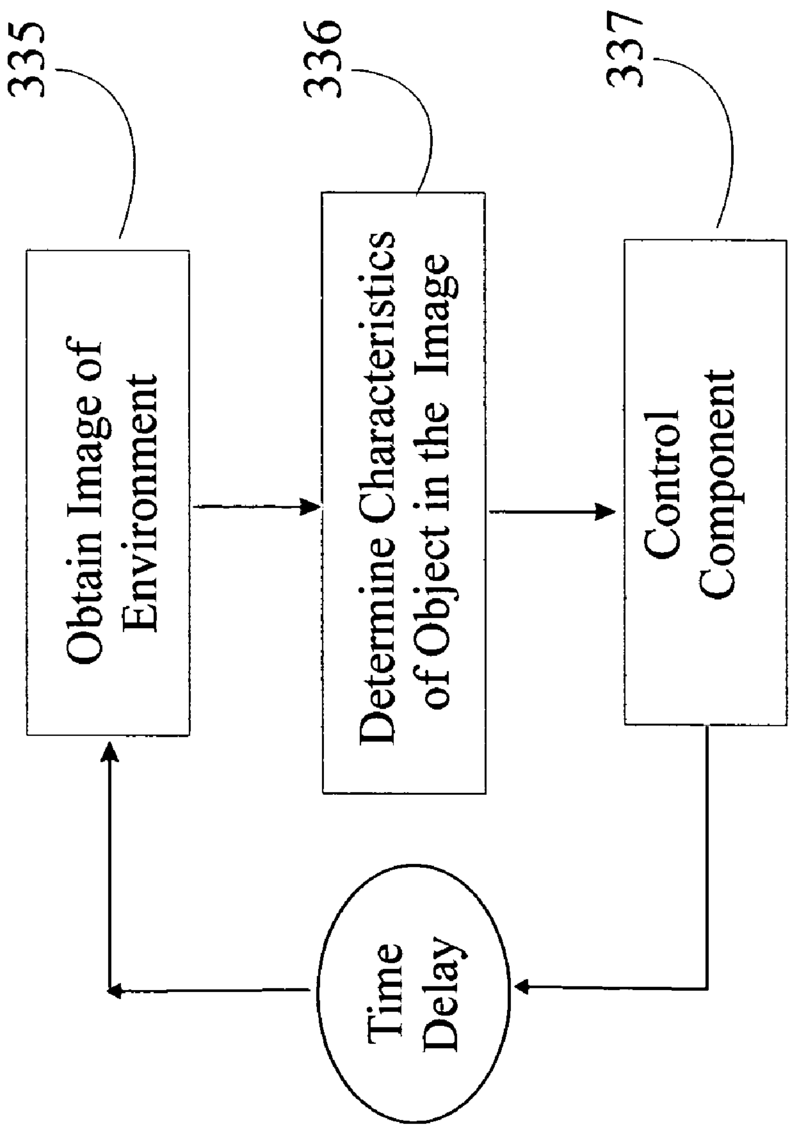
FIG. 56 is a flow chart of the environment monitoring in accordance with the invention.

The apparatus can operate in a manner as illustrated in FIG. 56 wherein as a first step 335, one or more images of the environment are obtained. One or more characteristics of objects in the images are determined at 336, using, for example, pattern recognition techniques, and then one or more components are controlled at 337 based on the determined characteristics. The process of obtaining and processing the images, or the processing of data derived from the images or data representative of the images, is periodically continued at least throughout the operation of the vehicle.

14.1 Control of Passive Restraints

The use of the vehicle interior monitoring system to control the deployment of an airbag is discussed in detail in U.S. Pat. No. 05,653,462 referenced above. In that case, the control is based on the use of a pattern recognition system, such as a neural network, to differentiate between the occupant and his extremities in order to provide an accurate determination of the position of the occupant relative to the airbag. If the occupant is sufficiently close to the airbag module that he is more likely to be injured by the deployment itself than by the accident, the deployment of the airbag is suppressed. This process is carried further by the interior monitoring system described herein in that the nature or identity of the object occupying the vehicle seat is used to contribute to the airbag deployment decision. FIG. 4 shows a side view illustrating schematically the interface between the vehicle interior monitoring system of this invention and the vehicle airbag system 44. A similar system can be provided for the passenger as described in U.S. patent application Ser. No. 10/151,615 filed May 20, 2002.

In this embodiment, ultrasonic transducers 8 and 9 transmit bursts of ultrasonic waves that travel to the occupant where they are reflected back to transducers or receptors/receivers 8 and 9. The time period required for the waves to travel from the generator and return is used to determine the distance from the occupant to the airbag as described in the aforementioned U.S. Pat. No. 05,653,462, i.e., and thus may also be used to determine the position or location of the occupant. An optical imager based system would also be appropriate. In the invention, however, the portion of the return signal that represents the occupants' head or chest, has been determined based on pattern recognition techniques such as a neural network. The relative velocity of the occupant toward the airbag can then be determined, by Doppler principles or from successive position measurements, which permits a sufficiently accurate prediction of the time when the occupant would become proximate to the airbag. By comparing the occupant relative velocity to the integral of the crash deceleration pulse, a determination as to whether the occupant is being restrained by a seatbelt can also be made which then can affect the airbag deployment initiation decision. Alternately, the mere knowledge that the occupant has moved a distance that would not be possible if he were wearing a seatbelt gives information that he is not wearing one.

A more detailed discussion of this process and of the advantages of the various technologies, such as acoustic or electromagnetic, can be found in SAE paper 940527, "Vehicle Occupant Position Sensing" by Breed et al,. In this paper, it is demonstrated that the time delay required for acoustic waves to travel to the occupant and return does not prevent the use of acoustics for position measurement of occupants during the crash event. For position measurement and for many pattern recognition applications, ultrasonics is the preferred technology due to the lack of adverse health effects and the low cost of ultrasonic systems compared with either camera, laser or radar based systems. This situation is changing, however, as the cost of imagers is rapidly coming down. The main limiting feature of ultrasonics is the wavelength, which places a limitation on the size of features that can be discerned. Optical systems, for example, are required when the identification of particular individuals is desired.

Figure 57:
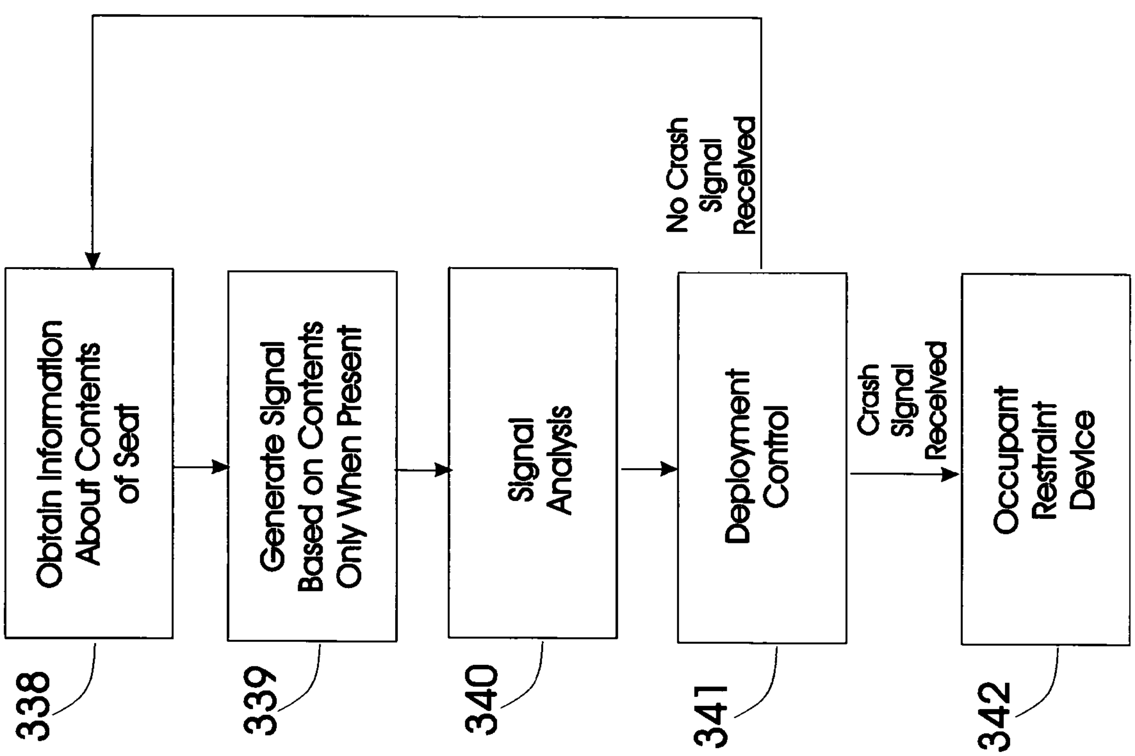
FIG. 57 is a schematic drawing of one embodiment of an occupant restraint device control system in accordance with the invention.

FIG. 57 is a schematic drawing of one embodiment of an occupant restraint device control system in accordance with the invention. The first step is to obtain information about the contents of the seat at step 338, when such contents are present on the seat. To this end, a presence sensor can be employed to activate the system only when the presence of an object, or living being, is detected. Next, at step 339, a signal is generated based on the contents of the seat, with different signals being generated for different contents of the seat. Thus, while a signal for a dog will be different than the signal for a child set, the signals for different child seats will be not that different. Next, at step 340, the signal is analyzed to determine whether a child seat is present, whether a child seat in a particular orientation is present and/or whether a child seat in a particular position is present. Deployment control 341 provides a deployment control signal or command based on the analysis of the signal generated based on the contents of the seat. This signal or command is directed to the occupant protection or restraint device 342 to provide for deployment for that particular content of the seat. The system continually obtains information about the contents of the seat until such time as a deployment signal is received from, e.g., a crash sensor, to initiate deployment of the occupant restraint device.

Figure 58:
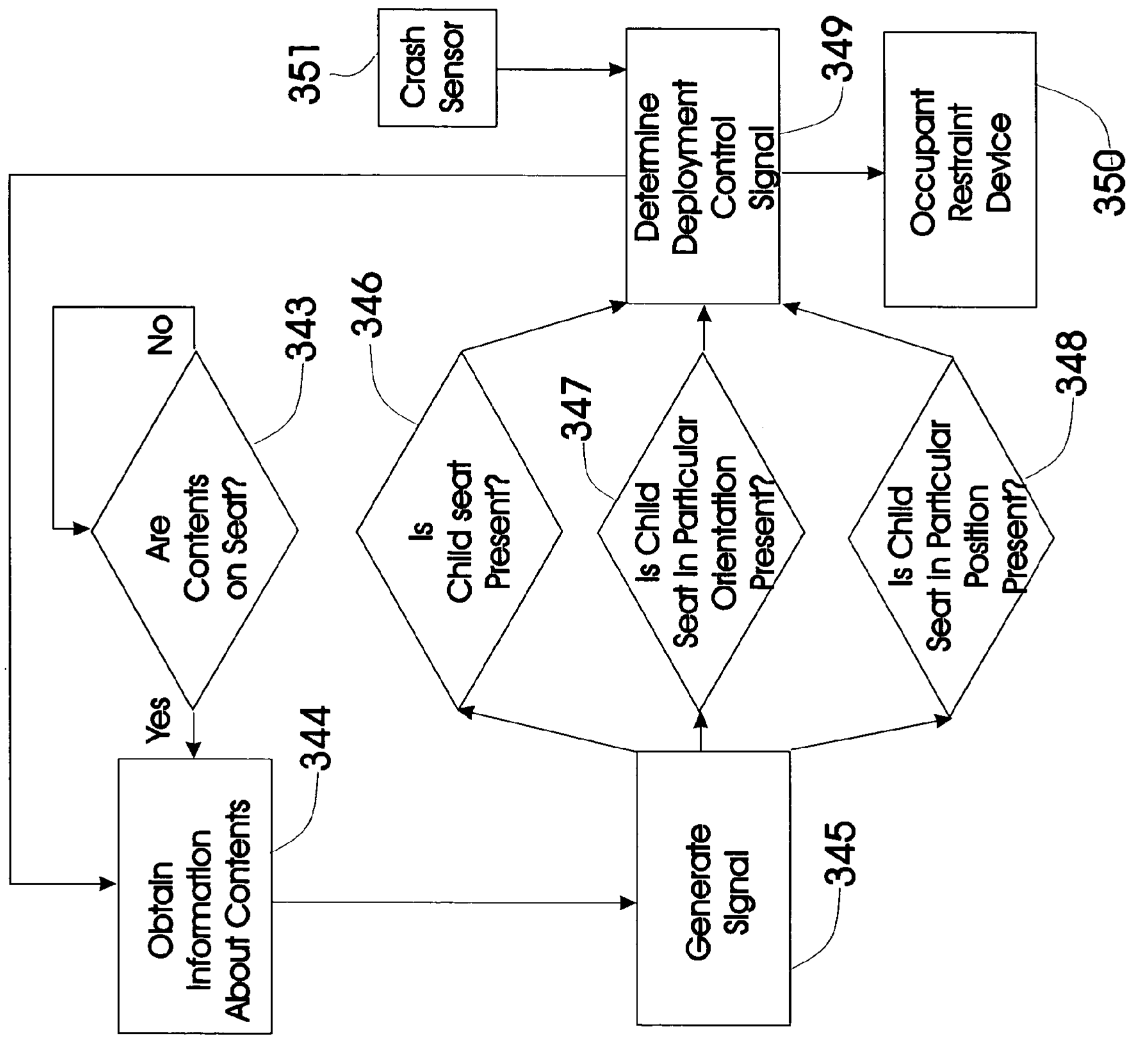
FIG. 58 is a flow chart of the operation of one embodiment of an occupant restraint device control method in accordance with the invention.

FIG. 58 is a flow chart of the operation of one embodiment of an occupant restraint device control method in accordance with the invention. The first step is to determine whether contents are present on the seat at step 910. If so, information is obtained about the contents of the seat at step 344. At step 345, a signal is generated based on the contents of the seat, with different signals being generated for different contents of the seat. The signal is analyzed to determine whether a child seat is present at step 346, whether a child seat in a particular orientation is present at step 347 and/or whether a child seat in a particular position is present at step 348. Deployment control 349 provides a deployment control signal or command based on the analysis of the signal generated based on the contents of the seat. This signal or command is directed to the occupant protection or restraint device 350 to provide for deployment for those particular contents of the seat. The system continually obtains information about the contents of the seat until such time as a deployment signal is received from, e.g., a crash sensor 351, to initiate deployment of the occupant restraint device.

In another implementation, the sensor algorithm may determine the rate that gas is generated to affect the rate that the airbag is inflated. In all of these cases, the position of the occupant is used to affect the deployment of the airbag either as to whether or not it should be deployed at all, the time of deployment and/or the rate of inflation.

Such a system can also be used to positively identify or confirm the presence of a rear facing child seat in the vehicle, if the child seat is equipped with a resonator. In this case, a resonator 18 is placed on the forward most portion of the child seat, or in some other convenient position, as shown in FIG. 1. The resonator 18, or other type of signal generating device, such as an RFID tag, which generates a signal upon excitation, e.g., by a transmitted energy signal, can be used not only to determine the orientation of the child seat but also to determine the position of the child seat (in essentially the same manner as described above with respect to determining the position of the seat and the position of the seatbelt).

The determination of the presence of a child seat can be used to affect another system in the vehicle. Most importantly, deployment of an occupant restraint device can be controlled depending on whether a child seat is present. Control of the occupant restraint device may entail suppression of deployment of the device. If the occupant restraint device is an airbag, e.g., a frontal airbag or a side airbag, control of the airbag deployment may entail not only suppression of the deployment but also depowered deployment, adjustment of the orientation of the airbag, adjustment of the inflation rate or inflation time and/or adjustment of the deflation rate or time.

Figure 59:
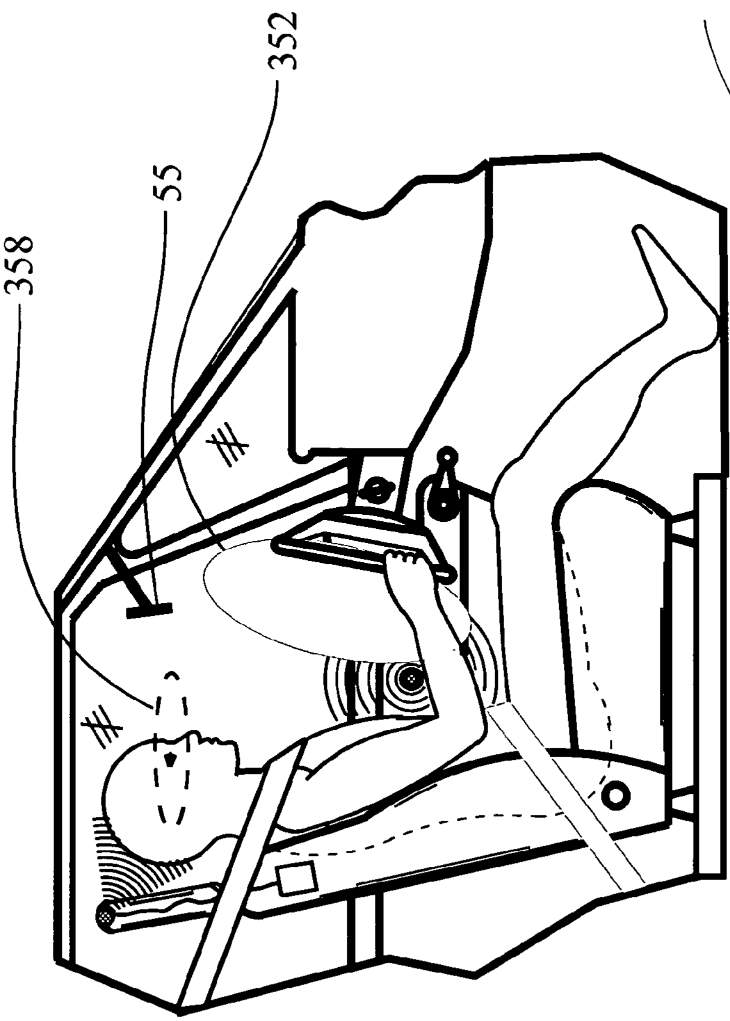
FIG. 59 is a view similar to FIG. 48 showing an inflated airbag and an arrangement for controlling both the flow of gas into and the flow of gas out of the airbag during the crash where the determination is made based on a height sensor located in the headrest and a weight sensor in the seat.

Several systems are in development for determining the location of an occupant and modifying the deployment of the airbag based of his or her position. These systems are called "smart airbags". The passive seat control system in accordance with this invention can also be used for this purpose as illustrated in FIG. 59. This figure shows an inflated airbag 352 and an arrangement for controlling both the flow of gas into and out of the airbag during a crash. The determination is made based on height sensors 353, 354 and 355 (FIG. 49) located in the headrest, a weight sensor 252 in the seat and the location of the seat which is known by control circuit 254. Other smart airbags systems rely only on the position of the occupant determined from various position sensors using ultrasonics or optical sensors, or equivalent.

The weight sensor coupled with the height sensor and the occupant's velocity relative to the vehicle, as determined by the occupant position sensors, provides information as to the amount of energy that the airbag will need to absorb during the impact of the occupant with the airbag. This, along with the location of the occupant relative to the airbag, is then used to determine the amount of gas that is to be injected into the airbag during deployment and the size of the exit orifices that control the rate of energy dissipation as the occupant is interacting with the airbag during the crash. For example, if an occupant is particularly heavy then it is desirable to increase the amount of gas, and thus the initial pressure, in the airbag to accommodate the larger force which will be required to arrest the relative motion of the occupant. Also, the size of the exit orifices should be reduced, since there will be a larger pressure tending to force the gas out of the orifices, in order to prevent the bag from bottoming out before the occupant's relative velocity is arrested. Similarly, for a small occupant the initial pressure would be reduced and the size of the exit orifices increased. If, on the other hand, the occupant is already close to the airbag then the amount of gas injected into the airbag will need to be reduced.

There are many ways of varying the amount of gas injected into the airbag some of which are covered in the patent literature and include, for example, inflators where the amount of gas generated and the rate of generation is controllable. For example, in a particular hybrid inflator once manufactured by the Allied Signal Corporation, two pyrotechnic charges are available to heat the stored gas in the inflator. Either or both of the pyrotechnic charges can be ignited and the timing between the ignitions can be controlled to significantly vary the rate of gas flow to the airbag.

Figure 59A:
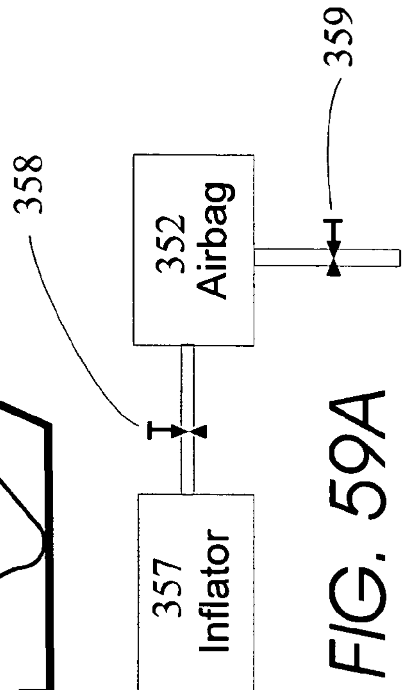
FIG. 59A illustrates the valving system of FIG. 59.

The flow of gas out of the airbag is traditionally done through fixed diameter orifices placed in the bag fabric. Some attempts have been made to provide a measure of control through such measures as blowout patches applied to the exterior of the airbag. Other systems were disclosed in U.S. patent application Ser. No. 07/541,464 filed Feb. 9, 1989, now abandoned. FIG. 59A illustrates schematically an inflator 357 generating gas to fill airbag 352 through control valve 358. If the control valve 358 is closed while a pyrotechnic generator is operating, provision must be made to store or dump the gas being generated so to prevent the inflator from failing from excess pressure. The flow of gas out of airbag 352 is controlled by exit control valve 359. The exit valve 359 can be implemented in many different ways including, for example, a motor operated valve located adjacent the inflator and in fluid communication with the airbag or a digital flow control valve as discussed above. When control circuit 254 (FIG. 49) determines the size and weight of the occupant, the seat position and the relative velocity of the occupant, it then determines the appropriate opening for the exit valve 359, which is coupled to the control circuit 254. A signal is then sent from control circuit 254 to the motor controlling this valve which provides the proper opening.

Consider, for example, the case of a vehicle that impacts with a pole or brush in front of a barrier. The crash sensor system may deduce that this is a low velocity crash and only initiate the first inflator charge. Then as the occupant is moving close to the airbag the barrier is struck but it may now be too late to get the benefit of the second charge. For this case, a better solution might be to always generate the maximum amount of gas but to store the excess in a supplemental chamber until it is needed.

In a like manner, other parameters can also be adjusted, such as the direction of the airbag, by properly positioning the angle and location of the steering wheel relative to the driver. If seatbelt pretensioners are used, the amount of tension in the seatbelt or the force at which the seatbelt spools out, for the case of force limiters, could also be adjusted based on the occupant morphological characteristics determined by the system of this invention. The force measured on the seatbelt, if the vehicle deceleration is known, gives a confirmation of the mass of the occupant. This force measurement can also be used to control the chest acceleration given to the occupant to minimize injuries caused by the seatbelt.

In the embodiment shown in FIG. 8A, transmitter/receiver assemblies 49, 50, 51 and 54 emit infrared waves that reflect off of the head and chest of the driver and return thereto. Periodically, the device, as commanded by control circuitry 20, transmits a pulse of infrared waves and the reflected signal is detected by the same or a different device. The transmitters can either transmit simultaneously or sequentially. An associated electronic circuit and algorithm in control circuitry 20 processes the returned signals as discussed above and determines the location of the occupant in the passenger compartment. This information is then sent to the crash sensor and diagnostic circuitry, which may also be resident in control circuitry 20 (programmed within a control module), which determines if the occupant is close enough to the airbag that a deployment might, by itself, cause injury which exceeds that which might be caused by the accident itself. In such a case, the circuit disables the airbag system and thereby prevents its deployment.

In an alternate case, the sensor algorithm assesses the probability that a crash requiring an airbag is in process and waits until that probability exceeds an amount that is dependent on the position of the occupant. Thus, for example, the sensor might decide to deploy the airbag based on a need probability assessment of 50%, if the decision must be made immediately for an occupant approaching the airbag, but might wait until the probability rises above 95% for a more distant occupant. In the alternative, the crash sensor and diagnostic circuitry optionally resident in control circuitry 20 may tailor the parameters of the deployment (time to initiation of deployment, rate of inflation, rate of deflation, deployment time, etc.) based on the current position and possibly velocity of the occupant, for example a depowered deployment.

In another implementation, the sensor algorithm may determine the rate that gas is generated to affect the rate that the airbag is inflated. One method of controlling the gas generation rate is to control the pressure in the inflator combustion chamber. The higher the internal pressure the faster gas is generated. Once a method of controlling the gas combustion pressure is implemented, the capability exists to significantly reduce the variation in inflator properties with temperature. At lower temperatures the pressure control system would increase the pressure in the combustion chamber and at higher ambient temperatures it would reduce the pressure. In all of these cases, the position of the occupant can be used to affect the deployment of the airbag as to whether or not it should be deployed at all, the time of deployment and/or the rate of inflation.

The applications described herein have been illustrated using the driver and sometimes the passenger of the vehicle. The same systems of determining the position of the occupant relative to the airbag apply to a driver, front and rear seated passengers, sometimes requiring minor modifications. It is likely that the sensor required triggering time based on the position of the occupant will be different for the driver than for the passenger. Current systems are based primarily on the driver with the result that the probability of injury to the passenger is necessarily increased either by deploying the airbag too late or by failing to deploy the airbag when the position of the driver would not warrant it but the passenger's position would. With the use of occupant position sensors for the passenger and driver, the airbag system can be individually optimized for each occupant and result in further significant injury reduction. In particular, either the driver or passenger system can be disabled if either the driver or passenger is out-of-position or if the passenger seat is unoccupied.

There is almost always a driver present in vehicles that are involved in accidents where an airbag is needed. Only about 30% of these vehicles, however, have a passenger. If the passenger is not present, there is usually no need to deploy the passenger side airbag. The occupant monitoring system, when used for the passenger side with proper pattern recognition circuitry, can also ascertain whether or not the seat is occupied, and if not, can disable the deployment of the passenger side airbag and thereby save the cost of its replacement. The same strategy applies also for monitoring the rear seat of the vehicle. Also, a trainable pattern recognition system, as used herein, can distinguish between an occupant and a bag of groceries, for example. Finally, there has been much written about the out-of-position child who is standing or otherwise positioned adjacent to the airbag, perhaps due to pre-crash braking. The occupant position sensor described herein can prevent the deployment of the airbag in this situation as well as in the situation of a rear facing child seat as described above.

Naturally as discussed elsewhere herein, occupant sensors can also be used for monitoring the rear seats of the vehicle for the purpose, among others, of controlling airbag or other restraint deployment.

14.2 Seat, Seatbelt Adjustment and Resonators

Acoustic or electromagnetic resonators are devices that resonate at a preset frequency when excited at that frequency. If such a device, which has been tuned to 40 kHz for example, or some other appropriate frequency, is subjected to radiation at 40 kHz it will return a signal that can be stronger than the reflected radiation. Tuned radar antennas, RFID tags and SAW resonators can also be used for this function.

If such a device is placed at a particular point in the passenger compartment of a vehicle, and irradiated with a signal that contains the resonant frequency, the returned signal can usually be identified as a high magnitude narrow signal at a particular point in time that is proportional to the distance from the resonator to the receiver. Since this device can be identified, it provides a particularly effective method of determining the distance to a particular point in the vehicle passenger compartment (i.e., the distance between the location of the resonator and the detector). If several such resonators are used they can be tuned to slightly different frequencies and therefore separated and identified by the circuitry. If, for example, an ultrasonic signal is transmitted that is slightly off of the resonator frequency then a resonance can still be excited in the resonator and the return signal positively identified by its frequency. Ultrasonic resonators are rare but electromagnetic resonators are common. The distance to a resonator can be more easily determined using ultrasonics, however, due to its lower propagation velocity.

Figure 60:
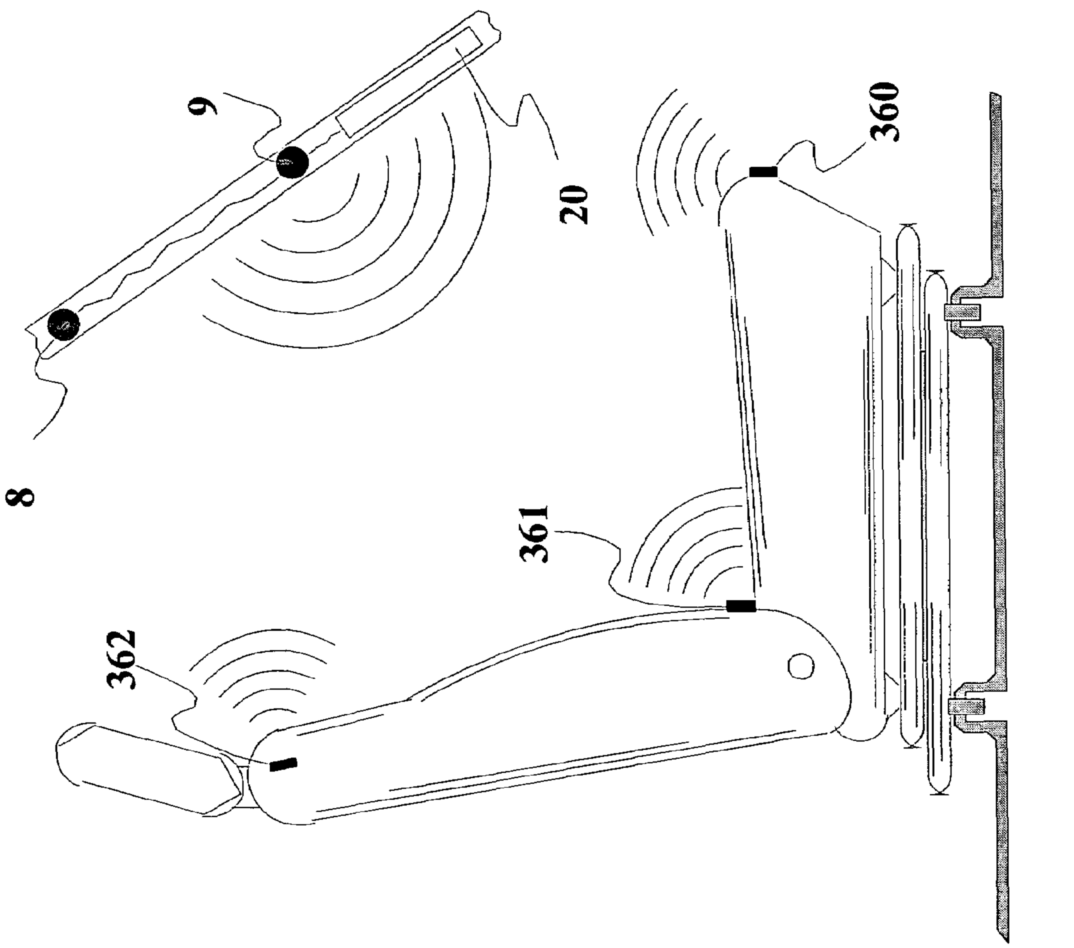
FIG. 60 is a side view with parts cutaway and removed of a seat in the passenger compartment of a vehicle showing the use of resonators or reflectors to determine the position of the seat.

Using such resonators, the positions of various objects in the vehicle can be determined. In FIG. 60, for example, three such resonators are placed on the vehicle seat and used to determine the location of the front and back of the seat and the top of the seat back. In this case, transducers 8 and 9, mounted in the A-pillar, are used in conjunction with resonators 360, 361 and 362 to determine the position of the seat. Transducers 8 and 9 constitute both transmitter means for transmitting energy signals at the excitation frequencies of the resonators 360, 361 and 362 and detector means for detecting the return energy signals from the excited resonators. Processor 20 is coupled to the transducers 8 and 9 to analyze the energy signals received by the detectors and provide information about the object with which the resonators are associated, i.e., the position of the seat in this embodiment. This information is then fed to the seat memory and adjustment system, not shown, eliminating the currently used sensors that are placed typically beneath the seat adjacent the seat adjustment motors. In the conventional system, the seat sensors must be wired into the seat adjustment system and are prone to being damaged. By using the vehicle interior monitoring system alone with inexpensive passive resonators, the conventional seat sensors can be eliminated resulting in a cost saving to the vehicle manufacturer. An efficient reflector, such as a parabolic shaped reflector, or in some cases a corner cube reflector (which can be a multiple cube pattern array), can be used in a similar manner as the resonator. Similarly, a surface acoustic wave (SAW) device, RFID, variable resistor, inductor or capacitor device and radio frequency radiation can be used as a resonator or a delay line returning a signal to the interrogator permitting the presence and location of an object to be obtained as described in detail in U.S. patent application Ser. No. 10/079,065.

Resonators or reflectors, of the type described above can be used for making a variety of position measurements in the vehicle. They can be placed on an object such as a child seat 2 (FIG. 1) to permit the direct detection of its presence and, in some cases, its orientation. These resonators are made to resonate at a particular frequency. If the number of resonators increases beyond a reasonable number, dual frequency resonators can be used, or alternately, resonators that return an identification number such as can be done with an RFID or SAW device. For the dual frequency case, a pair of frequencies is then used to identify a particular location. Alternately, resonators tuned to a particular frequency can be used in combination with special transmitters, which transmit at the tuned frequency, which are designed to work with a particular resonator or group of resonators. The cost of the transducers is sufficiently low to permit special transducers to be used for special purposes. The use of resonators that resonate at different frequencies requires that they be irradiated by radiation containing those frequencies. This can be done with a chirp circuit.

An alternate approach is to make use of secondary emission where the frequency emitted form the device is at a different frequency that the interrogator. Phosphors, for example, convert ultraviolet to visible and devices exist that convert electromagnetic waves to ultrasonic waves. Other devices can return a frequency that is a sub-harmonic of the interrogation frequency. Additionally, an RFID tag can use the incident RF energy to charge up a capacitor and then radiate energy at a different frequency.

Another application for a resonator of the type described is to determine the location of the seatbelt and therefore determine whether it is in use. If it is known that the occupants are wearing seatbelts, the airbag deployment parameters can be controlled or adjusted based on the knowledge of seatbelt use, e.g., the deployment threshold can be increased since the airbag is not needed in low velocity accidents if the occupants are already restrained by seatbelts. Deployment of other occupant restraint devices could also be effected based on the knowledge of seatbelt use. This will reduce the number of deployments for cases where the airbag provides little or no improvement in safety over the seatbelt. FIG. 2, for example, shows the placement of a resonator 26 on the front surface of the seatbelt where it can be sensed by the transducer 8. Such a system can also be used to positively identify the presence of a rear facing child seat in the vehicle. In this case, a resonator 18 is placed on the forward most portion of the child seat, or in some other convenient position, as shown in FIG. 1. As illustrated and discussed in U.S. patent application Ser. No. 10/079,065, there are various methods of obtaining distance from a resonator, reflector, RFID or SAW device which include measuring the time of flight, using phase measurements, correlation analysis and triangulation.

Figure 61:
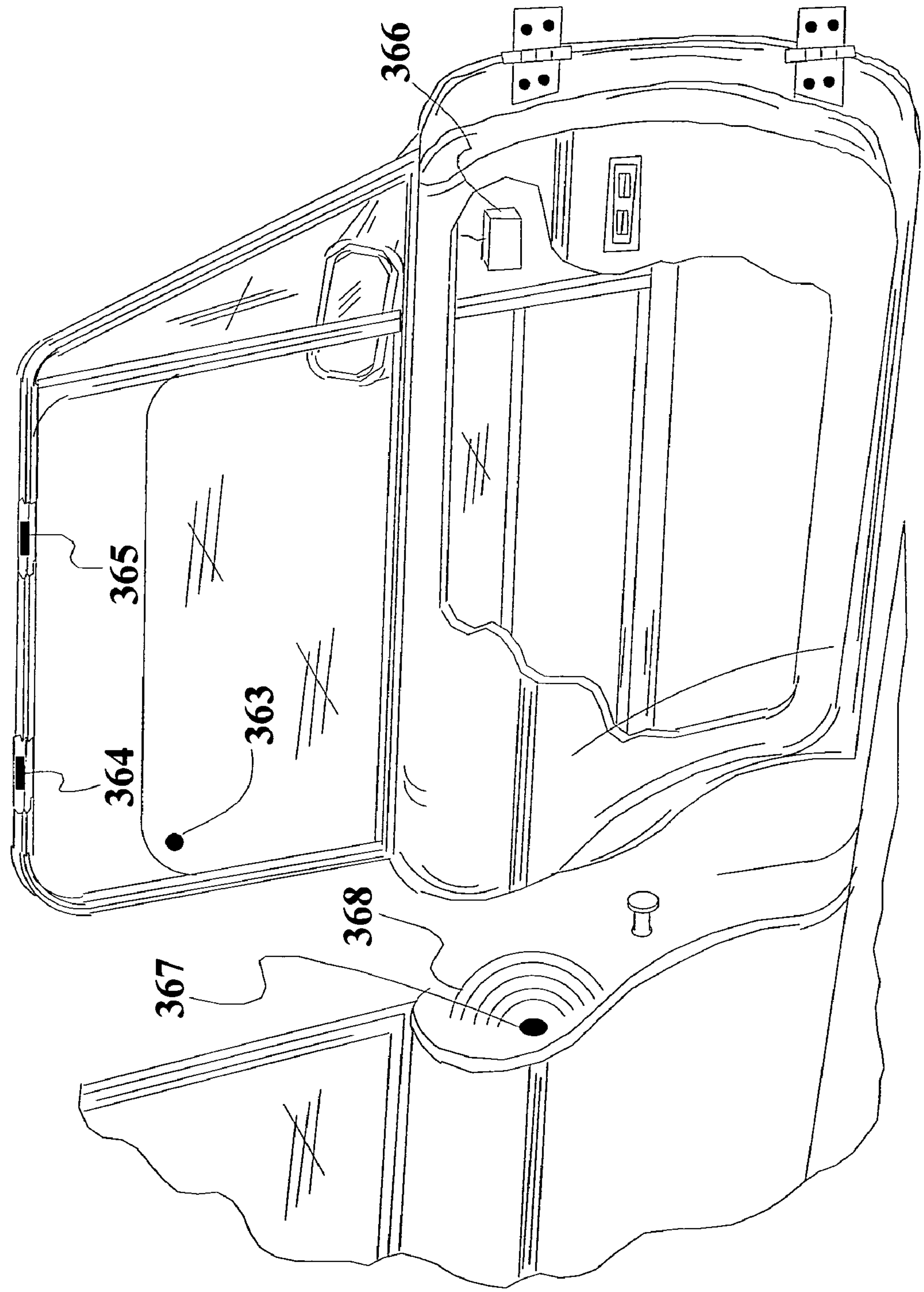
FIG. 61 is a side view with parts cutaway and removed of the door system of a passenger compartment of a vehicle showing the use of a resonator or reflector to determine the extent of opening of the driver window and of a system for determining the presence of an object, such as the hand of an occupant, in the window opening and showing the use of a resonator or reflector to determine the extent of opening of the driver window and of another system for determining the presence of an object, such as the hand of an occupant, in the window opening, and also showing the use of a resonator or reflector to determine the extent of opening position of the driver side door.

Other uses for such resonators include placing them on doors and windows in order to determine whether either is open or closed. In FIG. 61, for example, such a resonator 363 is placed on the top of the window and is sensed by transducers 364 and 365. In this case, transducers 364 and 365 also monitor the space between the edge of the window glass and the top of the window opening. Many vehicles now have systems that permit the rapid opening of the window, called "express open", by a momentary push of a button. For example, when a vehicle approaches a tollbooth, the driver needs only touch the window control button and the window opens rapidly. Some automobile manufacturers do not wish to use such systems for closing the window, called "express close", because of the fear that the hand of the driver, or of a child leaning forward from the rear seat, or some other object, could get caught between the window and window frame. If the space between the edge of the window and the window frame were monitored with an interior monitoring system, this problem can be solved. The presence of the resonator or reflector 363 on the top of the window glass also gives a positive indication of where the top surface is and reflections from below that point can be ignored.

Various design variations of the window monitoring system are possible and the particular choice will depend on the requirements of the vehicle manufacturer and the characteristics of the vehicle. Two systems will be briefly described here.

A recording of the output of transducers 364 and 365 is made of the open window without an object in the space between the window edge and the top of the window frame. When in operation, the transducers 364 and 365 receive the return signal from the space it is monitoring and compares that signal with the stored signal referenced above. This is done by processor 366. If the difference between the test signal and the stored signal indicates that there is a reflecting object in the monitored space, the window is prevented from closing in the express close mode. If the window is part way up, a reflection will be received from the edge of the window glass that, in most cases, is easily identifiable from the reflection of a hand for example. A simple algorithm based on the intensity, or timing, of the reflection in most cases is sufficient to determine that an object rather than the window edge is in the monitored space. In other cases, the algorithm is used to identify the window edge and ignore that reflection and all other reflections that are lower (i.e., later in time) than the window edge. In all cases, the system will default in not permitting the express close if there is any doubt. The operator can still close the window by holding the switch in the window closing position and the window will then close slowly as it now does in vehicles without the express close feature.

Alternately, the system can use pattern recognition using the two transducers 364 and 365 as shown in FIG. 61 and the processor 366 which comprises a neural network. In this example the system is trained for all cases where the window is down and at intermediate locations. In operation, the transducers monitor the window space and feed the received signals to processor 366. As long as the signals are similar to one of the signals for which the network was trained, the express close system is enabled. As before, the default is to suppress the express close.

If there are sufficient imagers placed at appropriate locations, a likely condition as the cost of imagers and processors continues to drop, the presence of an obstruction in an open window, door, sunroof, trunk opening, hatchback etc., can be sensed by such an imager and the closing of the opening stopped. This likely outcome will simplify interior monitoring by permitting one device to carry out multiple functions.

The use of a resonator, RFID or SAW tag, or reflector, to determine whether the vehicle door is properly shut is also illustrated in FIG. 61. In this case, the resonator 367 is placed in the B-pillar in such a manner that it is shielded by the door, or by a cover or other inhibiting mechanism (not shown) engaged by the door, and blocked or prevented from resonating when the door is closed. Resonator 367 provides waves 368. If transducers such as 8 and 10 in FIG. 1 are used in this system, the closed-door condition would be determined by the absence of a return signal from the B-pillar resonator 367. This system permits the substitution of an inexpensive resonator for a more expensive and less reliable electrical switch plus wires.

The use of a resonator has been described above. For those cases where an infrared laser system is used, an optical mirror, reflector or even a bar code or equivalent would replace the mechanical resonator used with the acoustic system. In the acoustic system, the resonator can be any of a variety of tuned resonating systems including an acoustic cavity or a vibrating mechanical element. As discussed above, a properly designed antenna, corner reflector, or a SAW or RFID device fulfills this function for radio frequency waves.

For the purposes herein, the word resonator will frequently be used to include any device that returns a signal when excited by a signal sent by another device through the air. Thus, resonator would include a resonating antenna, a reflector, a surface acoustic wave (SAW) device, an RFID tag, an acoustic resonator, or any other device that performs substantially the same function such as a bar or other coded tag.

In most of the applications described above, single frequency energy was used to irradiate various occupying items of the passenger compartment. This was for illustrative purposes only and this invention is not limited to single frequency irradiation. In many applications, it is useful to use several discrete frequencies or a band of frequencies. In this manner, considerably greater information is received from the reflected irradiation permitting greater discrimination between different classes of objects. In general each object will have a different reflectivity, absorbtivity and transmissivity at each frequency. Also, the different resonators placed at different positions in the passenger compartment can now be tuned to different frequencies making it easier to isolate one resonator from another.

Let us now consider the adjustment of a seat to adapt to an occupant. First some measurements of the morphological properties of the occupant are necessary. The first characteristic considered is a measurement of the height of the occupant from the vehicle seat. This can be done by a sensor in the ceiling of the vehicle but this becomes difficult since, even for the same seat location, the head of the occupant will not be at the same angle with respect to the seat and therefore the angle to a ceiling-mounted sensor is in general unknown at least as long as only one ceiling mounted sensor is used. This problem can be solved if two or three sensors are used as described in more detail below. The simplest implementation is to place the sensor in the seat. In U.S. Pat. No. 05,694,320, a rear impact occupant protection apparatus is disclosed which uses sensors mounted within the headrest. This same system can also be used to measure the height of the occupant from the seat and thus, for no additional cost assuming the rear impact occupant protection system described in the '320 patent is provided, the first measure of the occupant's morphology can be achieved. See also FIGS. 48 and 49. For some applications, this may be sufficient since it is unlikely that two operators will use the vehicle that both have the same height. For other implementations, one or more additional measurements are used.

Referring now to FIG. 48, an automatic adjustment system for adjusting a seat (which is being used only as an example of a vehicle component) is shown generally at 371 with a movable headrest 356 and ultrasonic sensors 353, 354 and 355 for measuring the height of the occupant of the seat. Power means such as motors 371, 372, and 373 connected to the seat for moving the base of the seat, control means such as a control circuit, system or module 254 connected to the motors and a headrest actuation mechanism using servomotors 374 and 375, which may be servomotors, are also illustrated. The seat 4 and headrest 356 are shown in phantom. Vertical motion of the headrest 356 is accomplished when a signal is sent from control module 254 to servomotor 374 through a wire 376. Servomotor 374 rotates lead screw 377 which engages with a threaded hole in member 378 causing it to move up or down depending on the direction of rotation of the lead screw 377. Headrest support rods 379 and 380 are attached to member 378 and cause the headrest 356 to translate up or down with member 378. In this manner, the vertical position of the headrest can be controlled as depicted by arrow A-A. Ultrasonic transmitters and receivers 353, 354, 355 may be replaced by other appropriate wave-generating and receiving devices, such as electromagnetic, active infrared transmitters and receivers.

Wire 381 leads from control module 254 to servomotor 375 which rotates lead screw 382. Lead screw 382 engages with a threaded hole in shaft 383 which is attached to supporting structures within the seat shown in phantom. The rotation of lead screw 382 rotates servo motor support 384, upon which servomotor 374 is situated, which in turn rotates headrest support rods 379 and 380 in slots 385 and 386 in the seat 4. Rotation of the servomotor support 384 is facilitated by a rod 387 upon which the servo motor support 384 is positioned. In this manner, the headrest 356 is caused to move in the fore and aft direction as depicted by arrow B-B. Naturally there are other designs which accomplish the same effect in moving the headrest up and down and fore and aft.

The operation of the system is as follows. When an adult or child occupant is seated on a seat containing the headrest and control system described above as determined by the neural network 65, the ultrasonic transmitters 353, 354 and 355 emit ultrasonic energy which reflects off of the head of the occupant and is received by the same transducers. An electronic circuit in control module 254 contains a microprocessor which determines the distance from the head of the occupant based on the time between the transmission and reception of the ultrasonic pulses. Control module 254 may be within the same microprocessor as neural network 65 or separate therefrom. The headrest 356 moves up and down until it finds the top of the head and then the vertical position closest to the head of the occupant and then remains at that position. Based on the time delay between transmission and reception of an ultrasonic pulse, the system can also determine the longitudinal distance from the headrest to the occupant's head. Since the head may not be located precisely in line with the ultrasonic sensors, or the occupant may be wearing a hat, coat with a high collar, or may have a large hairdo, there may be some error in this longitudinal measurement.

When an occupant sits on seat 4, the headrest 356 moves to find the top of the occupant's head as discussed above. This is accomplished using an algorithm and a microprocessor which is part of control circuit 254. The headrest 356 then moves to the optimum location for rear impact protection as described in the above referenced '320 patent. Once the height of the occupant has been measured, another algorithm in the microprocessor in control circuit 254 compares the occupant's measured height with a table representing the population as a whole and from this table, the appropriate positions for the seat corresponding to the occupant's height is selected. For example, if the occupant measured 33 inches from the top of the seat bottom, this might correspond to an 85% human, depending on the particular seat and statistical table of human measurements.

Careful study of each particular vehicle model provides the data for the table of the location of the seat to properly position the eyes of the occupant within the "eye-ellipse", the steering wheel within a comfortable reach of the occupant's hands and the pedals within a comfortable reach of the occupant's feet, based on his or her size, etc.

Once the proper position has been determined by control circuit 254, signals are sent to motors 371, 372, and 373 to move the seat to that position, if such movement is necessary. That is, it is possible that the seat will be in the proper position so that movement of the seat is not required. As such, the position of the motors 371,372,373 and/or the position of the seat prior to occupancy by the occupant may be stored in memory so that after occupancy by the occupant and determination of the desired position of the seat, a comparison is made to determine whether the desired position of the seat deviates from the current position of the seat. If not, movement of the seat is not required. Otherwise, the signals are sent by the control circuit 254 to the motors. In this case, control circuit 254 would encompass a seat controller.

Instead of adjusting the seat to position the driver in an optimum driving position, or for use when adjusting the seat of a passenger, it is possible to perform the adjustment with a view toward optimizing the actuation or deployment of an occupant protection or restraint device. For example, after obtaining one or more morphological characteristics of the occupant, the processor can analyze them and determine one or more preferred positions of the seat, with the position of the seat being related to the position of the occupant, so that if the occupant protection device is deployed, the occupant will be in an advantageous position to be protected against injury by such deployment. In this case then, the seat is adjusted based on the morphology of the occupant view a view toward optimizing deployment of the occupant protection device. The processor is provided in a training or programming stage with the preferred seat positions for different morphologies of occupants.

Movement of the seat can take place either immediately upon the occupant sitting in the seat or immediately prior to a crash requiring deployment of the occupant protection device. In the latter case, if an anticipatory sensing arrangement is used, the seat can be positioned immediately prior to the impact, much in a similar manner as the headrest is adjusted for a rear impact as disclosed in the '320 patent referenced above.

If during some set time period after the seat has been positioned, the operator changes these adjustments, the new positions of the seat are stored in association with an occupant height class in a second table within control circuit 254. When the occupant again occupies the seat and his or her height has once again been determined, the control circuit 254 will find an entry in the second table which takes precedence over the basic, original table and the seat returns to the adjusted position. When the occupant leaves the vehicle, or even when the engine is shut off and the door opened, the seat can be returned to a neutral position which provides for easy entry and exit from the vehicle.

Figure 62A:
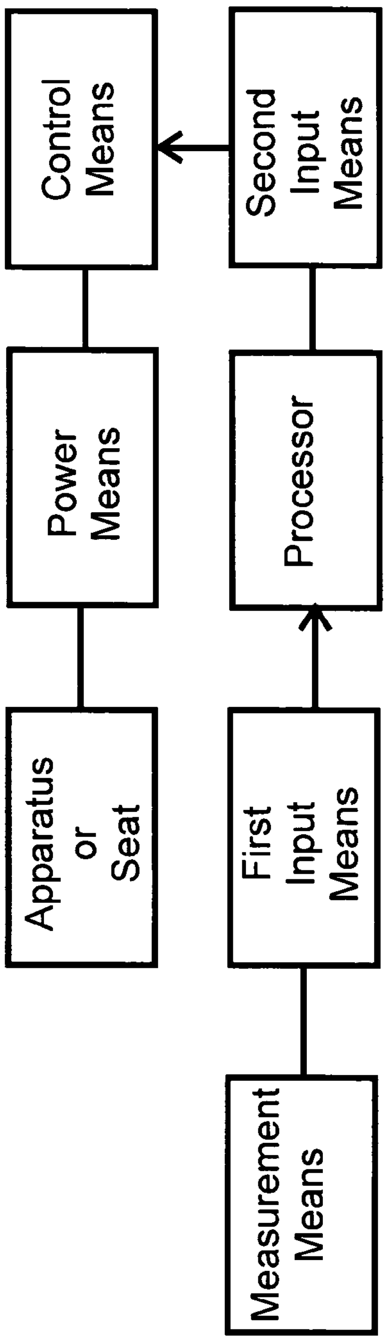
FIG. 62A is a schematic drawing of the basic embodiment of the adjustment system in accordance with the invention.
Figure 62B:
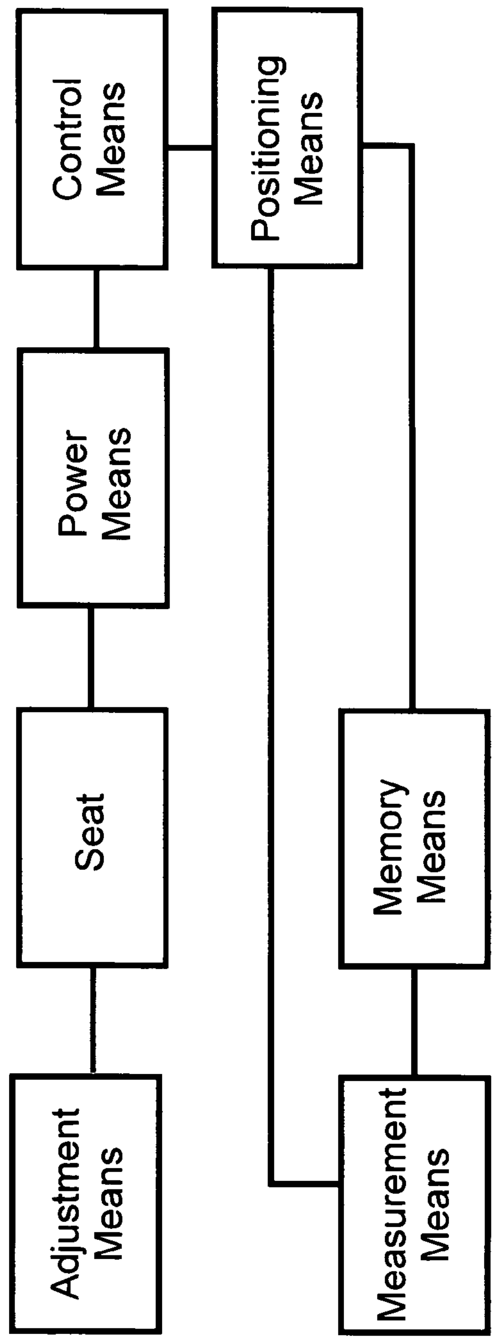
FIG. 62B is a schematic drawing of another basic embodiment of the adjustment system in accordance with the invention.

The seat 4 also contains two control switch assemblies 388 and 389 for manually controlling the position of the seat 4 and headrest 356. The seat control switches 388 permits the occupant to adjust the position of the seat if he or she is dissatisfied with the position selected by the algorithm. The headrest control switches 389 permit the occupant to adjust the position of the headrest in the event that the calculated position is uncomfortably close to or far from the occupant's head. A woman with a large hairdo might find that the headrest automatically adjusts so as to contact her hairdo. This adjustment she might find annoying and could then position the headrest further from her head. For those vehicles which have a seat memory system for associating the seat position with a particular occupant, which has been assumed above, the position of the headrest relative to the occupant's head could also be recorded. Later, when the occupant enters the vehicle, and the seat automatically adjusts to the recorded preference, the headrest will similarly automatically adjust as diagrammed in FIGS. 62A and 62B.

The height of the occupant, although probably the best initial morphological characteristic, may not be sufficient especially for distinguishing one driver from another when they are approximately the same height. A second characteristic, the occupant's weight, can also be readily determined from sensors mounted within the seat in a variety of ways as shown in FIG. 42 which is a perspective view of the seat shown in FIG. 48 with a displacement or weight sensor 159 shown mounted onto the seat. Displacement sensor 159 is supported from supports 165. In general, displacement sensor 164, or another non-displacement sensor, measures a physical state of a component affected by the occupancy of the seat. An occupying item of the seat will cause a force to be exerted downward and the magnitude of this force is representative of the weight of the occupying item. Thus, by measuring this force, information about the weight of the occupying item can be obtained. A physical state may be any force changed by the occupancy of the seat and which is reflected in the component, e.g., strain of a component, compression of a component, tension of a component. Naturally other weight measuring systems as described herein and elsewhere including bladders and strain gages can be used.

The system described above is based on the assumption that the occupant will be satisfied with one seat position throughout an extended driving trip. Studies have shown that for extended travel periods that the comfort of the driver can be improved through variations in the seat position. This variability can be handled in several ways. For example, the amount and type of variation preferred by an occupant of the particular morphology can be determined through case studies and focus groups. If it is found, for example, that the 50 percentile male driver prefers the seat back angle to vary by 5 degrees sinusodially with a one-hour period, this can be programmed to the system. Since the system knows the morphology of the driver it can decide from a lookup table what is the best variability for the average driver of that morphology. The driver then can select from several preferred possibilities if, for example, he or she wishes to have the seat back not move at all or follow an excursion of 10 degrees over two hours.

This system provides an identification of the driver based on two morphological characteristics which is adequate for most cases. As additional features of the vehicle interior identification and monitoring system described in the above referenced patent applications are implemented, it will be possible to obtain additional morphological measurements of the driver which will provide even greater accuracy in driver identification. Such additional measurements include iris scans, voice prints, face recognition, fingerprints, hand or palm prints etc. Two characteristics may not be sufficient to rely on for theft and security purposes, however, many other driver preferences can still be added to seat position with this level of occupant recognition accuracy. These include the automatic selection of a preferred radio station, vehicle temperature, steering wheel and steering column position, etc.

One advantage of using only the height and weight is that it avoids the necessity of the seat manufacturer from having to interact with the headliner manufacturer, or other component suppliers, since all of the measuring transducers are in the seat. This two characteristic system is generally sufficient to distinguish drivers that normally drive a particular vehicle. This system costs little more than the memory systems now in use and is passive, i.e., it does not require action on the part of the occupant after his initial adjustment has been made.

Instead of measuring the height and weight of the occupant, it is also possible to measure a combination of any two morphological characteristics and during a training phase, derive a relationship between the occupancy of the seat, e.g., adult occupant, child occupant, etc., and the data of the two morphological characteristic. This relationship may be embodied within a neural network so that during use, by measuring the two morphological characteristics, the occupancy of the seat can be determined.

Naturally, there are other methods of measuring the height of the driver such as placing the transducers at other locations in the vehicle. Some alternatives are shown in other figures herein and include partial side images of the occupant and ultrasonic transducers positioned on or near the vehicle headliner. These transducers may already be present because of other implementations of the vehicle interior identification and monitoring system described in the above referenced patent applications. The use of several transducers provides a more accurate determination of location of the head of the driver. When using a headliner mounted sensor alone, the exact position of the head is ambiguous since the transducer measures the distance to the head regardless of what direction the head is. By knowing the distance from the head to another headliner mounted transducer the ambiguity is substantially reduced. This argument is of course dependent on the use of ultrasonic transducers. Optical transducers using CCD, CMOS or equivalent arrays are now becoming price competitive and, as pointed out in the above referenced patent applications, will be the technology of choice for interior vehicle monitoring. A single CMOS array of 160 by 160 pixels, for example, coupled with the appropriate pattern recognition software, can be used to form an image of the head of an occupant and accurately locate the head for the purposes of this invention.

Figure 64:
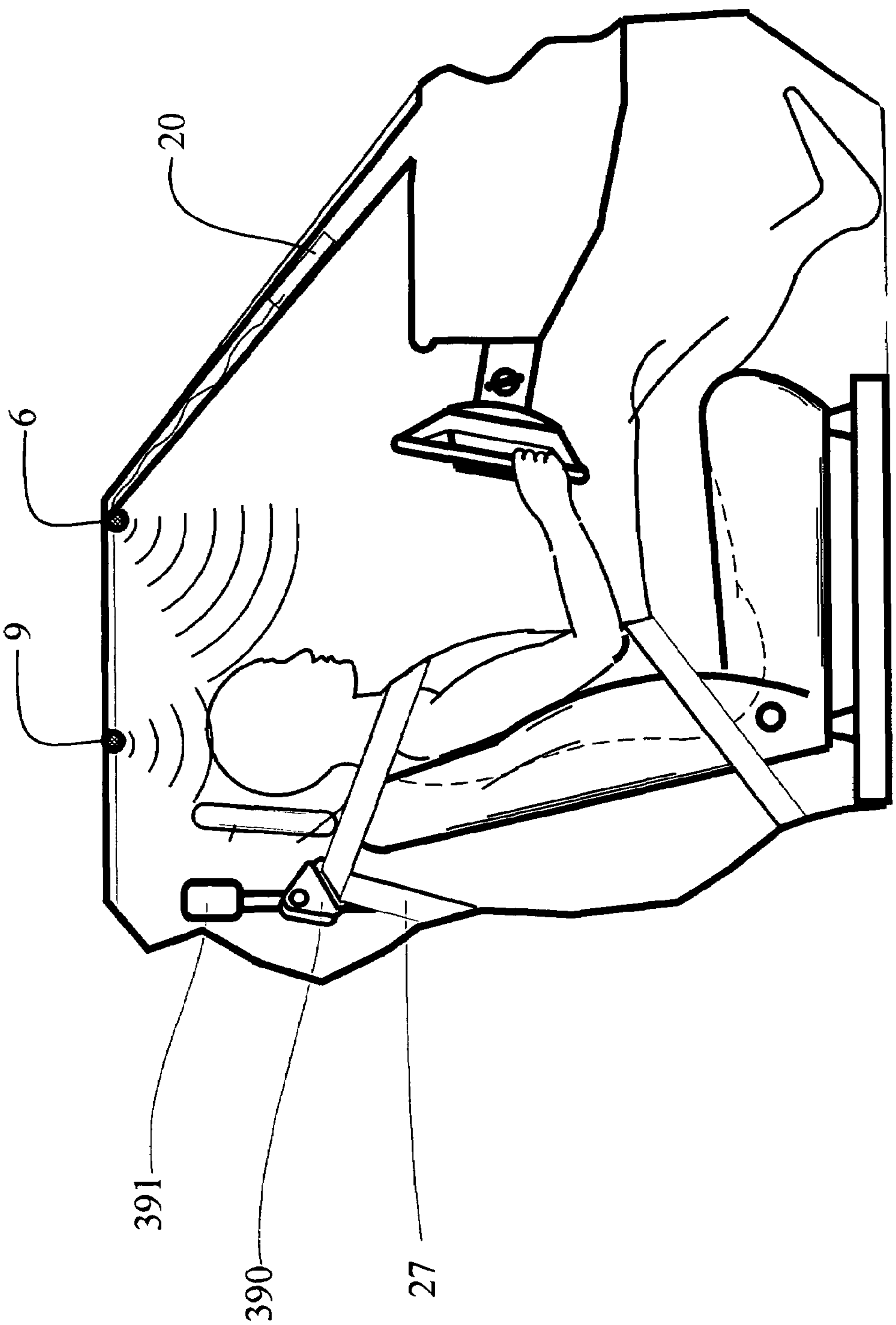
FIG. 64 is a side plan view of the interior of an automobile, with portions cut away and removed, with two occupant height measuring sensors, one mounted into the headliner above the occupant's head and the other mounted onto the A-pillar and also showing a seatbelt associated with the seat wherein the seatbelt has an adjustable upper anchorage point which is automatically adjusted based on the height of the occupant.

FIG. 64 also illustrates a system where the seatbelt 27 has an adjustable upper anchorage point 390 which is automatically adjusted by a motor 391 to a location optimized based on the height of the occupant. In this system, infrared transmitter and CCD array receivers 6 and 9 are positioned in a convenient location proximate the occupant's shoulder, such as in connection with the headliner, above and usually to the outside of the occupant's shoulder. An appropriate pattern recognition system, as may be resident in control circuitry 20 to which the receivers 6 and 9 are coupled, as described above is then used to determine the location and position of the shoulder. This information is provided by control circuitry 20 to the seatbelt anchorage height adjustment system 391 (through a conventional coupling arrangement), shown schematically, which moves the attachment point 390 of the seatbelt 27 to the optimum vertical location for the proper placement of the seatbelt 27.

The calculations for this feature and the appropriate control circuitry can also be located in control module 20 or elsewhere if appropriate. Seatbelts are most effective when the upper attachment point to the vehicle is positioned vertically close to the shoulder of the occupant being restrained. If the attachment point is too low, the occupant experiences discomfort from the rubbing of the belt on his or her shoulder. If it is too high, the occupant may experience discomfort due to the rubbing of the belt against his or her neck and the occupant will move forward by a greater amount during a crash which may result in his or her head striking the steering wheel. For these reasons, it is desirable to have the upper seatbelt attachment point located slightly above the occupant's shoulder. To accomplish this for various sized occupants, the location of the occupant's shoulder must be known, which can be accomplished by the vehicle interior monitoring system described herein.

Figure 65:
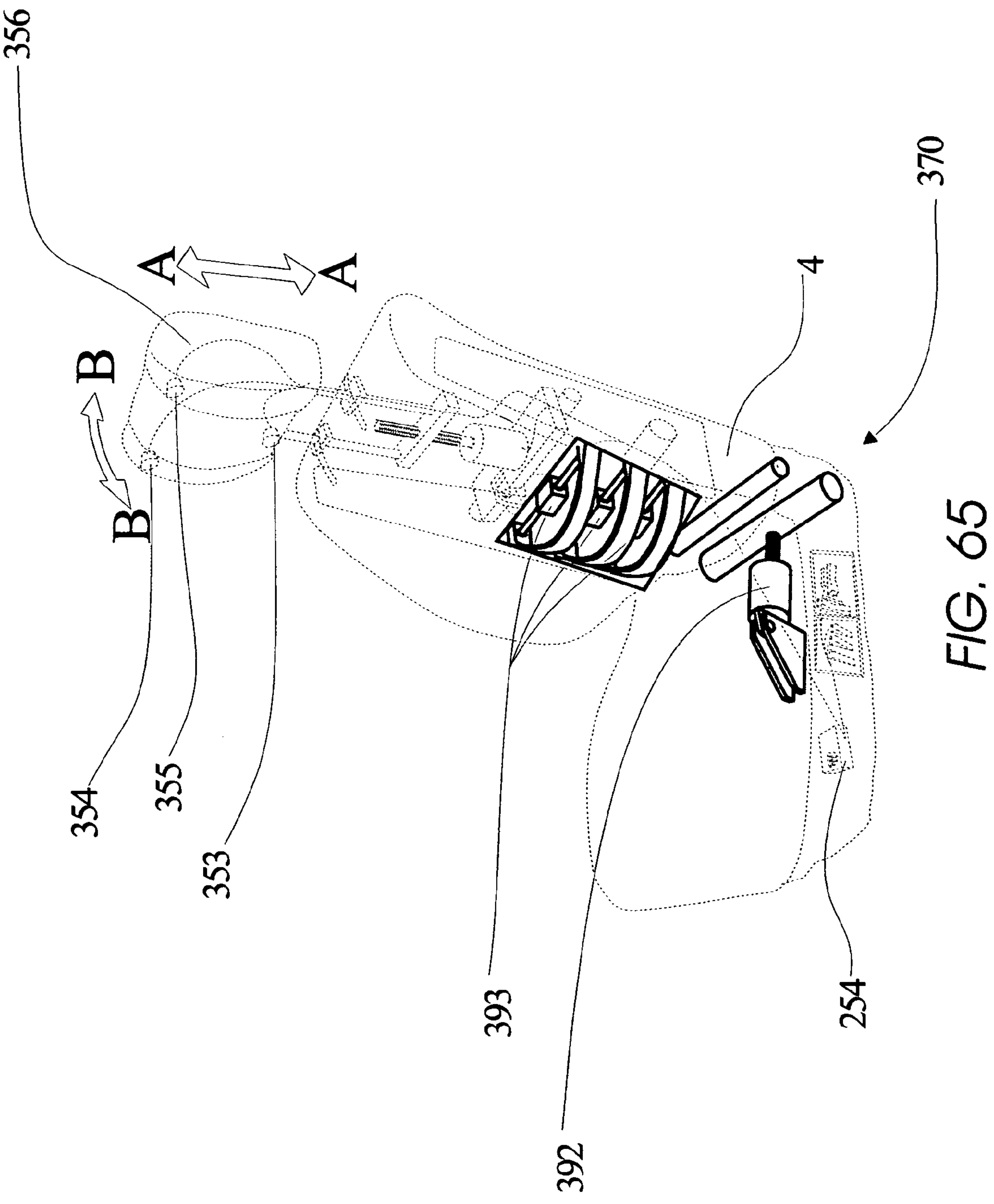
FIG. 65 is a view of the seat of FIG. 48 showing motors for changing the tilt of seat back and the lumbar support.

Many luxury automobiles today have the ability to control the angle of the seat back as well as a lumbar support. These additional motions of the seat can also be controlled by the seat adjustment system in accordance with the invention. FIG. 65 is a view of the seat of FIG. 48 showing motors 392 and 393 for changing the tilt of the seat back and the lumbar support. Three motors 393 are used to adjust the lumbar support in this implementation. The same procedure is used for these additional motions as described for FIG. 48 above.

An initial table is provided based on the optimum positions for various segments of the population. For example, for some applications the table may contain a setting value for each five percentile of the population for each of the 6 possible seat motions, fore and aft, up and down, total seat tilt, seat back angle, lumbar position, and headrest position for a total of 120 table entries. The second table similarly would contain the personal preference modified values of the 6 positions desired by a particular driver.

The angular resolution of a transducer is proportional to the ratio of the wavelength to the diameter of the transmitter. Once three transmitters and receivers are used, the approximate equivalent single transmitter and receiver is one which has a diameter approximately equal to the shortest distance between any pair of transducers. In this case, the equivalent diameter is equal to the distance between transmitter 354 or 355 and 353. This provides far greater resolution and, by controlling the phase between signals sent by the transmitters, the direction of the equivalent ultrasonic beam can be controlled. Thus, the head of the driver can be scanned with great accuracy and a map made of the occupant's head. Using this technology plus an appropriate pattern recognition algorithm, such as a neural network, an accurate location of the driver's head can be found even when the driver's head is partially obscured by a hat, coat, or hairdo. This also provides at least one other identification morphological characteristic which can be used to further identify the occupant, namely the diameter of the driver's head.

Figure 66:
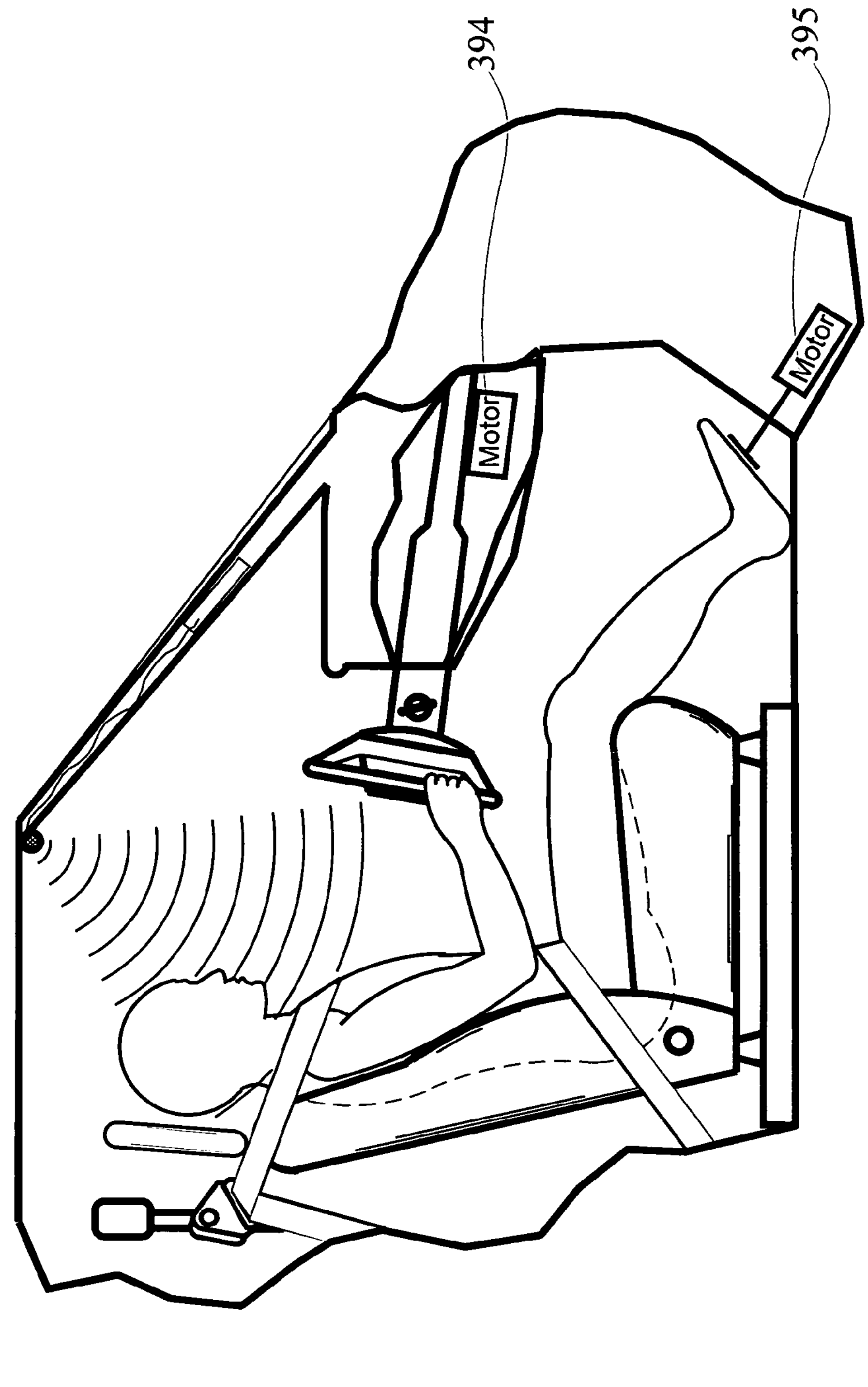
FIG. 66 is a view as in FIG. 64 showing a driver and driver seat with an automatically adjustable steering column and pedal system which is adjusted based on the morphology of the driver.

In an automobile, there is an approximately fixed vertical distance between the optimum location of the occupant's eyes and the location of the pedals. The distant from a driver's eyes to his or her feet, on the other hand, is not the same for all people. An individual driver now compensates for this discrepancy by moving the seat and by changing the angle between his or hers legs and body. For both small and large drivers, this discrepancy cannot be fully compensated for and as a result, their eyes are not appropriately placed. A similar problem exists with the steering wheel. To help correct these problems, the pedals and steering column should be movable as illustrated in FIG. 66 which is a plan view similar to that of FIG. 64 showing a driver and driver seat with an automatically adjustable steering column and pedal system which is adjusted based on the morphology of the driver. In FIG. 66, a motor 394 is connected to and controls the position of the steering column and another motor 395 is connected to and controls the position of the pedals. Both motors 394 and 395 are coupled to and controlled by control circuit 254 wherein now the basic table of settings includes values for both the pedals and steering column locations.

Figure 67:
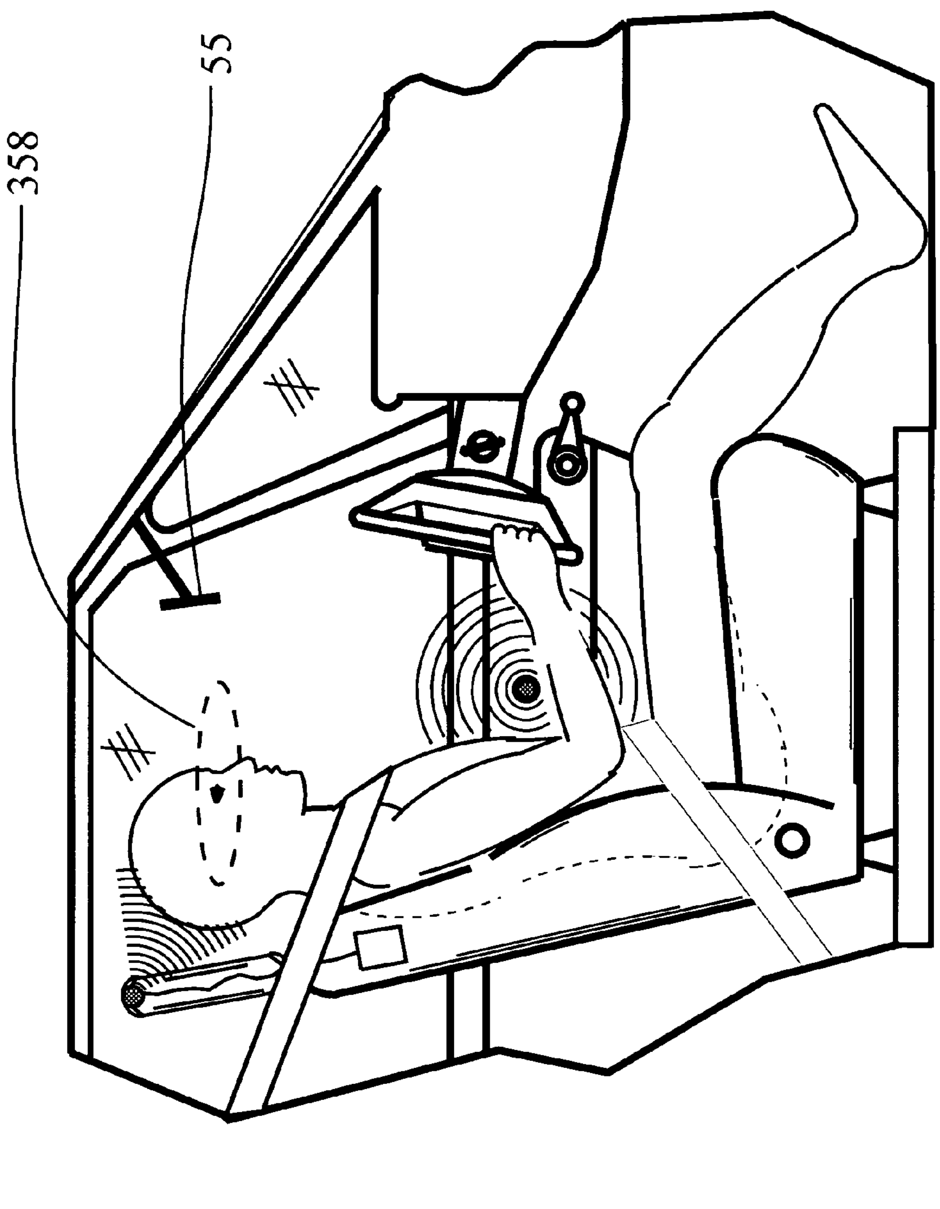
FIG. 67 is a view similar to FIG. 48 showing the occupant's eyes and the seat adjusted to place the eyes at a particular vertical position for proper viewing through the windshield and rear view mirror.

The eye ellipse discussed above is illustrated at 358 in FIG. 67, which is a view showing the occupant's eyes and the seat adjusted to place the eyes at a particular vertical position for proper viewing through the windshield and rear view mirror. Many systems are now under development to improve vehicle safety and driving ease. For example, night vision systems are being tested which project an enhanced image of the road ahead of the vehicle onto the windshield in a "heads-up display". The main problem with the systems now being tested is that the projected image does not precisely overlap the image as seen through the windshield. This parallax causes confusion in the driver and can only be corrected if the location of the driver's eyes is accurately known. One method of solving this problem is to use the passive seat adjustment system described herein to place the occupant's eyes at the optimum location as described above. Once this has been accomplished, in addition to solving the parallax problem, the eyes are properly located with respect to the rear view mirror 55 and little if any adjustment is required in order for the driver to have the proper view of what is behind the vehicle.

Although it has been described herein that the seat can be automatically adjusted to place the driver's eyes in the "eye-ellipse", there are many manual methods that can be implemented with feedback to the driver telling him or her when his or her eyes are properly position. This invention is not limited by the use of automatic methods.

Once the morphology of the driver and the seat position is known, many other objects in the vehicle can be automatically adjusted to conform to the occupant. An automatically adjustable seat armrest, a cup holder, the cellular phone, or any other objects with which the driver interacts can be now moved to accommodate the driver. This is in addition to the personal preference items such as the radio station, temperature, etc. discussed above.

Once the system of this invention is implemented, additional features become possible such as a seat which automatically makes slight adjustments to help alleviate fatigue or to account for a change of position of the driver in the seat, or a seat which automatically changes position slightly based on the time of day. Many people prefer to sit more upright when driving at night, for example. Other similar improvements based on knowledge of the occupant morphology will now become obvious to those skilled in the art.

Figure 63:
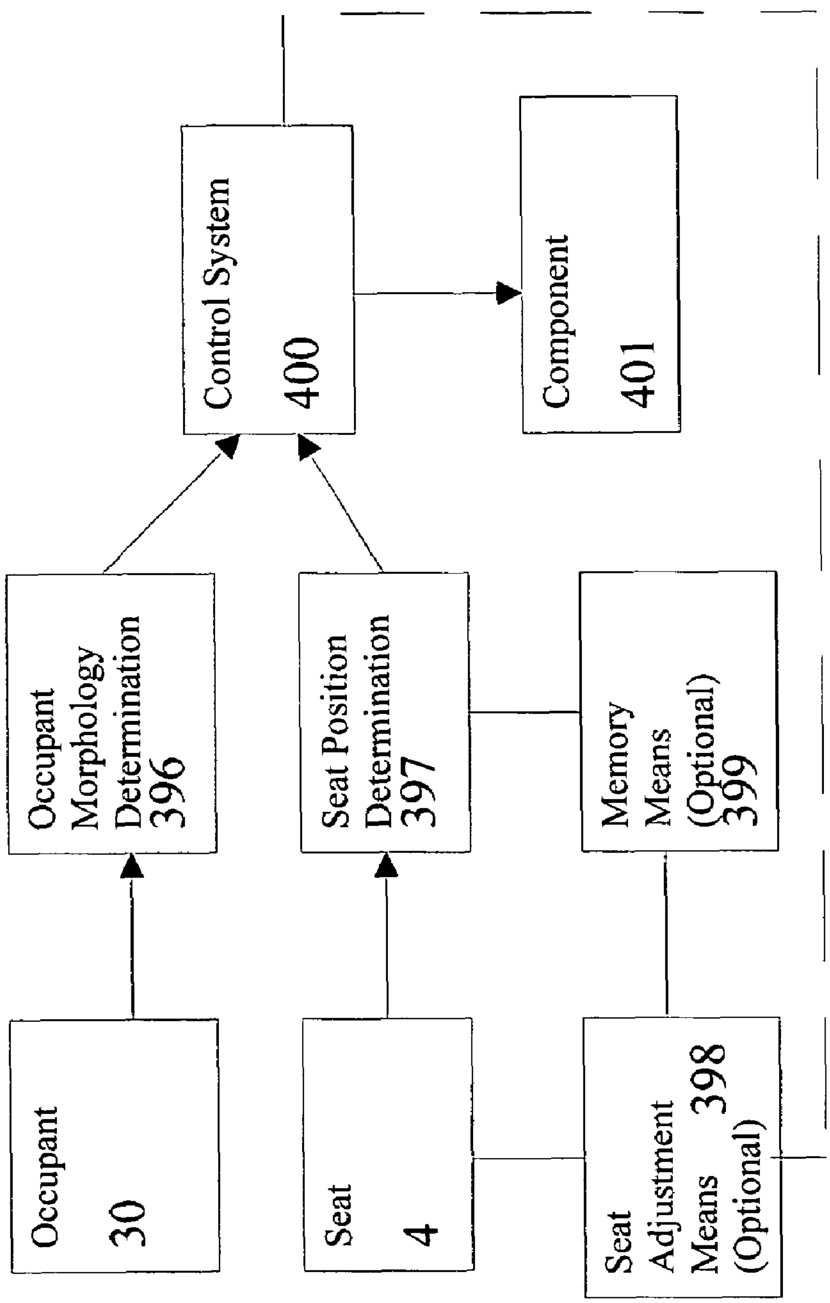
FIG. 63 is a flow chart of an arrangement for controlling a component in accordance with the invention.

FIG. 63 shows a flow chart of one manner in the arrangement and method for controlling a vehicle component in accordance with the invention functions. A measurement of the morphology of the occupant 30 is performed at 396, i.e., one or more morphological characteristics are measured in any of the ways described above. The position of the seat portion 4 is obtained at 397 and both the measured morphological characteristic of the occupant 30 and the position of the seat portion 4 are forwarded to the control system 400. The control system considers these parameters and determines the manner in which the component 401 should be controlled or adjusted, and even whether any adjustment is necessary.

Preferably, seat adjustment means 398 are provided to enable automatic adjustment of the seat portion 4. If so, the current position of the seat portion 4 is stored in memory means 399 (which may be a previously adjusted position) and additional seat adjustment, if any, is determined by the control system 400 to direct the seat adjustment means 398 to move the seat. The seat portion 4 may be moved alone, i.e., considered as the component, or adjusted together with another component, i.e., considered separate from the component (represented by way of the dotted line in FIG. 63).

Although several preferred embodiments are illustrated and described above, there are other possible combinations using different sensors which measure either the same or different morphological characteristics, such as knee position, of an occupant to accomplish the same or similar goals as those described herein.

It should be mentioned that the adjustment system may be used in conjunction with each vehicle seat. In this case, if a seat is determined to be unoccupied, then the processor means may be designed to adjust the seat for the benefit of other occupants, i.e., if a front passenger side seat is unoccupied but the rear passenger side seat is occupied, then adjustment system could adjust the front seat for the benefit of the rear-seated passenger, e.g., move the seat base forward.

In additional embodiments, the present invention involves the measurement of one or more morphological characteristics of a vehicle occupant and the use of these measurements to classify the occupant as to size and weight, and then to use this classification to position a vehicle component, such as the seat, to a near optimum position for that class of occupant. Additional information concerning occupant preferences can also be associated with the occupant class so that when a person belonging to that particular class occupies the vehicle, the preferences associated with that class are implemented. These preferences and associated component adjustments include the seat location after it has been manually adjusted away from the position chosen initially by the system, the mirror location, temperature, radio station, steering wheel and steering column positions, etc. The preferred morphological characteristics used are the occupant height from the vehicle seat and weight of the occupant. The height is determined by sensors, usually ultrasonic or electromagnetic, located in the headrest or another convenient location. The weight is determined by one of a variety of technologies that measure either pressure on or displacement of the vehicle seat or the force or strain in the seat supporting structure.

The eye tracker systems discussed above are facilitated by this invention since one of the main purposes of determining the location of the driver's eyes either by directly locating them with trained pattern recognition technology or by inferring their location from the location of the driver's head, is so that the seat can be automatically positioned to place the driver's eyes into the "eye-ellipse". The eye-ellipse is the proper location for the driver's eyes to permit optimal operation of the vehicle and for the location of the mirrors etc. Thus, if the location of the driver's eyes are known, then the driver can be positioned so that his or her eyes are precisely situated in the eye ellipse and the reflection off of the eye can be monitored with a small eye tracker system. Also, by ascertaining the location of the driver's eyes, a rear view mirror positioning device can be controlled to adjust the mirror 55 to an optimal position.

Eye tracking as disclosed by Jacob, "Eye Tracking in Advanced Interface Design", Robert J. K. Jacob, Human-Computer Interaction Lab, Naval Research Laboratory, Washington, D.C, can be used by vehicle operator to control various vehicle complements such as the turn signal, lights, radio, air conditioning, telephone, Internet interactive commands, etc. much as described in U.S. patent application Ser. No. 09/645,709 which is included herein by reference. The display used for the eye tracker can be a heads-up display reflected from the windshield or it can be a plastic electronics display located either in the visor or the windshield.

The eye tracker works most effectively in dim light where the driver's eyes are sufficiently open that the cornea and retina are clearly distinguishable. The direction of operator's gaze is determined by calculation of the center of pupil and the center of the iris that are found by illuminating the eye with infrared radiation. FIG. 8E illustrates a suitable arrangement for illuminating eye along the same axis as the pupil camera. The location of occupant's eyes must be first determined as described elsewhere herein before eye tracking can be implemented. In FIG. 8E, imager system 52, 24, or 56 are candidate locations for eye tracker hardware.

The technique is to shine a collimated beam of infrared light on to be operator's eyeball producing a bright corneal reflection can be bright pupil reflection. Imaging software analyzes the image to identify the large bright circle that is the pupil and a still brighter dot which is the corneal reflection and computes the center of each of these objects. The line of the gaze is determined by connecting the centers of these two reflections.

It is usually necessary only to track a single eye as both eyes tend to look at the same object. In fact by checking that both eyes are in fact looking at the same object, many errors caused by the occupant looking through the display onto the road or surrounding environment can be eliminated Object selection with a mouse or mouse pad, as disclosed in the '709 application cross-referenced above is accomplished by pointing at the object and depressing a button. Using eye tracking an additional technique is available based on the length of time the operator gases at the object. In the implementations herein, both techniques are available. In the simulated mouse case, the operator gazes at an object, such as the air conditioning control, and depresses a button on the steering wheel, for example, to select object. Alternately, the operator merely gazes at the object for perhaps one-half second and the object is automatically selected. Both techniques can be implemented simultaneously allowing operator to freely choose between them. The dwell time can be selectable by the operator as an additional option. Typically, the dwell times will range from about 0.1 seconds to about 1 second.

The problem of finding the eyes and tracking the head of the driver, for example, is handled in Smeraldi, F., Carmona, J. B., "Saccadic search with Garbor features applied to eye detection and real-time head tracking", Image and Vision Computing 18 (2000) 323-329, Elsevier Science B.V., which is included herein by reference. The Saccadic system described is a very efficient method of locating the most distinctive part of a persons face, the eyes, and in addition to finding the eyes a modification of the system can be used to recognize the driver. The system makes use of the motion of the subject's head to locate the head prior to doing a search for the eyes using a modified Garbor decomposition method. By comparing two consecutive frames the head can usually be located if it is in the field of view of the camera. Although this is the preferred method, other eye location and tracking methods can also be used as reported in the literature and familiar to those skilled in the art.

Other papers on finding the eyes of a subject are: Wang, Y., Yuan, B., "Human Eye Location Using Wavelet and Neural Network", Proceedings of the IEEE Internal Conference on Signal Processing 2000, p 1233-1236, and Sirohey, S. A., Rosenfeld, A., "Eye detection in a face using linear and nonlinear filters", Pattern Recognition 34 (2001) p 1367-1391, Elsevier Science Ltd., which, along with their references, are included herein by reference. The Sirohey et al. article in particular, in addition to a review of the prior art, provides an excellent methodology for eye location determination. The technique makes use of face color to aid in face and eye location.

In all of the above references, natural or visible illumination is used. In a vehicle infrared illumination will be used so as to not distract the occupant. The eyes of a person are particularly noticeable under infrared illumination as discussed in Richards, A., *Alien Vision*, p. 6-9, 2001, SPIE Press, Bellingham, Wash., which is included herein by reference. The use of infrared radiation to aid in location of the occupant's eyes either by itself of along with natural or artificial radiation is a preferred implementation of the teachings of this invention. This is illustrated in FIG. 53. In Aguilar, M., Fay, D. A., Ross, W. D., Waxman, M., Ireland, D. B., and Racamato, J. P., "Real-time fusion of low-light CCD and uncooled IR imagery for color night vision" SPIE Conference on Enhanced and Synthetic Vision 1998, Orlando, Fla. SPIE Vol. 3364 p. 124-133, the authors illustrate how to fuse images from different imagers together to form an enhanced image. They use thermal IR and enhanced visual to display a night vision image. The teachings of this reference, as well as those cross-references therein all of which are included herein by reference, can also be applied to improve the ability of a neural network or other pattern recognition system to locate the eyes and head, as well as other parts, of a vehicle occupant. In this case there is no need to superimpose the two images as the neural network can accept separate inputs from each type imager. Thus, thermal IR imagers and enhanced visual imagers can be used in practicing this invention as well as the other technologies mentioned above. In this manner, the eyes or other parts of the occupant can be found at night without additional sources of illumination.

14.3 Side Impacts

Figure 68:
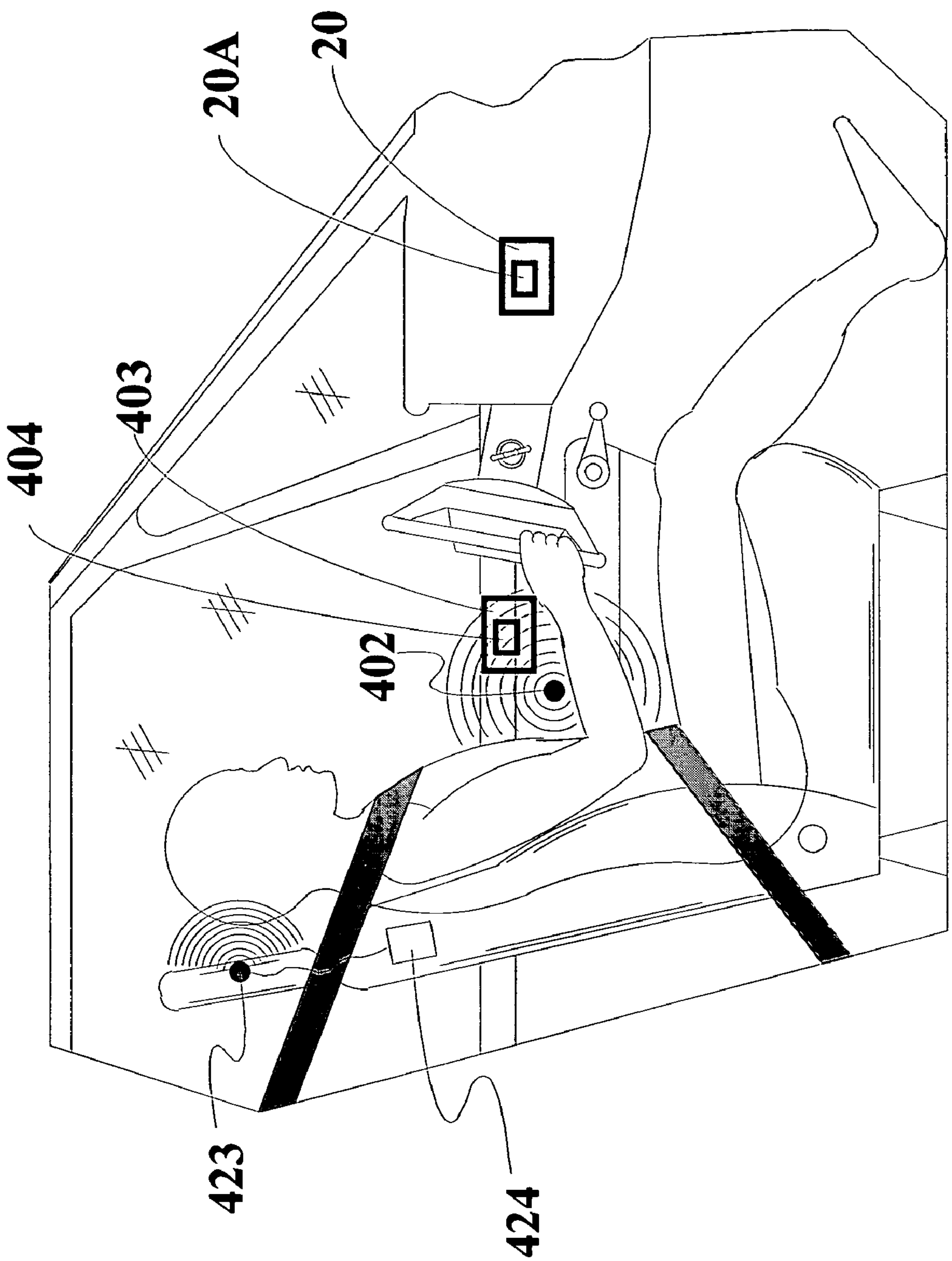
FIG. 68 is a side view with parts cutaway and removed of a vehicle showing the passenger compartment containing a driver and a preferred mounting location for an occupant position sensor for use in side impacts and also of a rear of occupant's head locator for use with a headrest adjustment system to reduce whiplash injuries in rear impact crashes.

Side impact airbags are now used on some vehicles. Some are quite small compared to driver or passenger airbags used for frontal impact protection. Nevertheless, a small child could be injured if he is sleeping with his head against the airbag module when the airbag deploys and a vehicle interior monitoring system is needed to prevent such a deployment. In FIG. 68, a single ultrasonic transducer 420 is shown mounted in a door adjacent airbag system 403 which houses an airbag 404. This sensor has the particular task of monitoring the space adjacent to the door-mounted airbag. Sensor 402 may also be coupled to control circuitry 20 which can process and use the information provided by sensor 402 in the determination of the location or identity of the occupant or location of a part of the occupant.

Similar to the embodiment in FIG. 4 with reference to U.S. Pat. No. 05,653,462, the airbag system 403 and components of the interior monitoring system, e.g., transducer 402, can also be coupled to a processor 20 including a control circuit 20A for controlling deployment of the airbag 404 based on information obtained by the transducer 402. This device does not have to be used to identify the object that is adjacent the airbag but it can be used to merely measure the position of the object. It can also be used to determine the presence of the object, i.e., the received waves are indicative of the presence or absence of an occupant as well as the position of the occupant or a part thereof. Instead of an ultrasonic transducer, another wave-receiving transducer may be used as described in any of the other embodiments herein, either solely for performing a wave-receiving function or for performing both a wave-receiving function and a wave-transmitting function.

Figure 69:
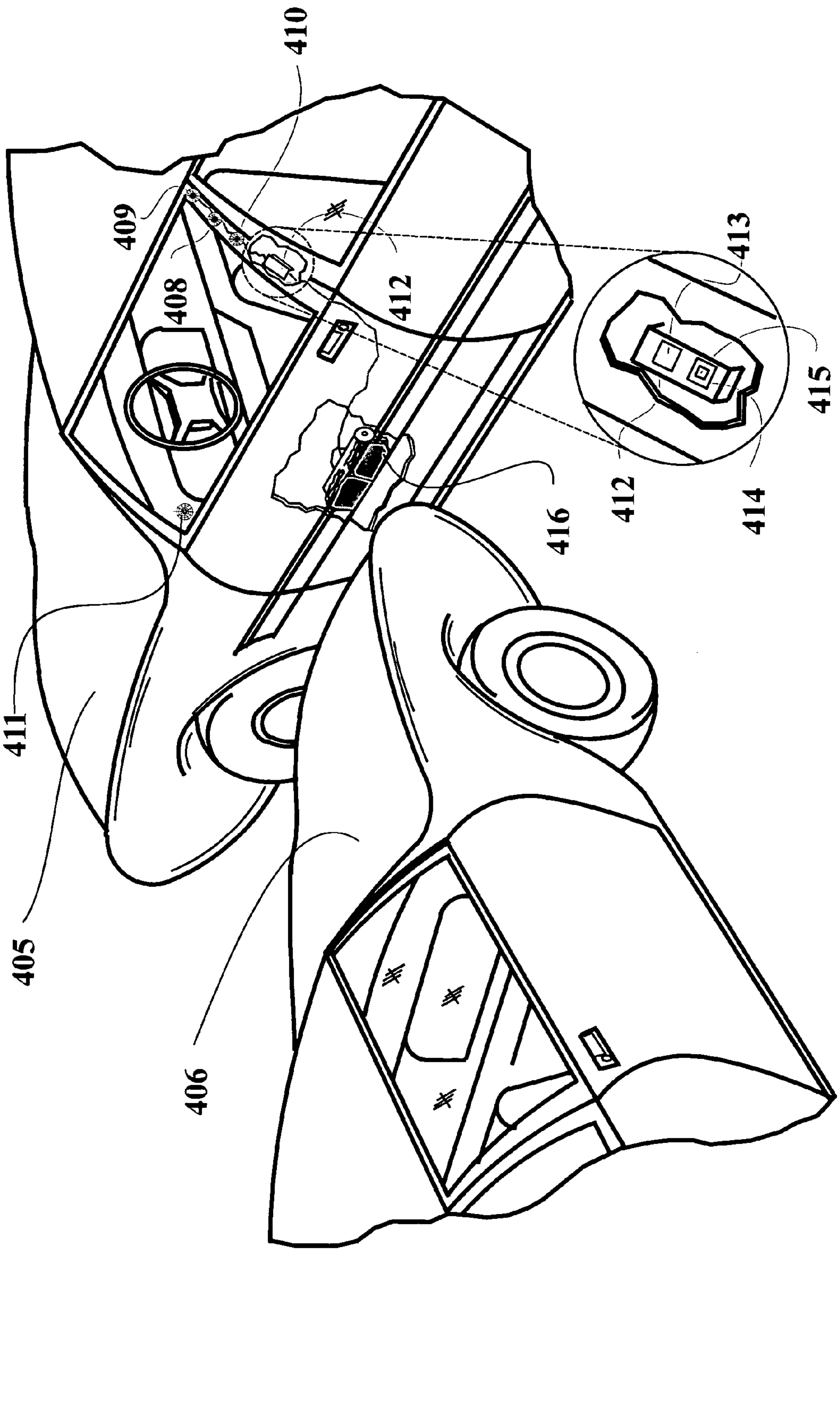
FIG. 69 is a perspective view of a vehicle about to impact the side of another vehicle showing the location of the various parts of the anticipatory sensor system of this invention.

FIG. 69 is an angular perspective overhead view of a vehicle 405 about to be impacted in the side by an approaching vehicle 406, where vehicle 405 is equipped with an anticipatory sensor system showing a transmitter 408 transmitting electromagnetic, such as infrared, waves toward vehicle 406. This is one example of many of the uses of the instant invention for exterior monitoring. The transmitter 408 is connected to an electronic module 412. Module 412 contains circuitry 413 to drive transmitter 408 and circuitry 414 to process the returned signals from receivers 409 and 410 which are also coupled to module 412. Circuitry 414 contains a processor such as a neural computer 415, which performs the pattern recognition determination based on signals from receivers 409 and 410. Receivers 409 and 410 are mounted onto the B-Pillar of the vehicle and are covered with a protective transparent cover. An alternate mounting location is shown as 411 which is in the door window trim panel where the rear view mirror (not shown) is frequently attached. One additional advantage of this system is the ability of infrared to penetrate fog and snow better than visible light which makes this technology particularly applicable for blind spot detection and anticipatory sensing applications. Although it is well known that infrared can be significantly attenuated by both fog and snow, it is less so than visual light depending on the frequency chosen. (See for example L. A. Klein, *Millimeter-Wave and Infrared Multisensor Design and Signal Processing*, Artech House, Inc, Boston 1997, ISBN 0-89006-764-3 which is incorporated herein by reference).

14.4 Children and Animals Left Alone

The various occupant sensing systems described herein can be used to determine if a child or animal has been left alone in a vehicle and the temperature is increasing or decreasing to where the child's health is at risk. When such a condition is discovered, the owner or an authority can be summoned for help or, alternately, the vehicle engine can be started and the vehicle warmed or cooled as needed.

14.5 Vehicle Theft

If a vehicle is stolen then several options are available when the occupant sensing system is installed. Upon command by the owner over a telematics system, a picture of the vehicles interior can be taken and transmitted to the owner. Alternately a continuous flow of pictures can be sent over the telematics system along with the location of the vehicle to help the owner or authorities determine where the vehicle is.

14.6 Security, Intruder Protection

If the owner has parked the vehicle and is returning, and it an intruder has entered and is hiding, that fact can be made known to the owner before he or she opens the vehicle door. This can be accomplished thought a wireless transmission to any of a number of devices that have been programmed for that function.

14.7 Entertainment System Control

It is well known among acoustics engineers that the quality of sound coming from an entertainment system can be substantially affected by the characteristics and contents of the space in which it operates and the surfaces surrounding that space. When an engineer is designing a system for an automobile he or she has a great deal of knowledge about that space and of the vehicle surfaces surrounding it. He or she has little knowledge of how many occupants are likely to be in the vehicle on a particular day, however, and therefore the system is a compromise. If the system knew the number and position of the vehicle occupants, and maybe even their size, then adjustments could be made in the system output and the sound quality improved. FIG. 8A, therefore, illustrates schematically the interface between the vehicle interior monitoring system of this invention, i.e., transducers 49-52 and 54 and processor 20 which operate as set forth above, and the vehicle entertainment system 99. The particular design of the entertainment system that uses the information provided by the monitoring system can be determined by those skilled in the appropriate art. Perhaps in combination with this system, the quality of the sound system can be measured by the audio system itself either by using the speakers as receiving units also or through the use of special microphones. The quality of the sound can then be adjusted according to the vehicle occupancy and the reflectivity, or absorbtivity, of the vehicle occupants. If, for example, certain frequencies are being reflected, or absorbed, more that others, the audio amplifier can be adjusted to amplify those frequencies to a lesser, or greater, amount than others.

Recent developments in the field of directing sound using hyper-sound (also referred to as hypersonic sound) now make it possible to accurately direct sound to the vicinity of the ears of an occupant so that only that occupant can hear the sound. The system of this invention can thus be used to find the proximate direction of the ears of the occupant for this purpose.

Hypersonic sound is described in detail in U.S. Pat. No. 05,885,129 (Norris), U.S. Pat. No. 05,889,870 (Norris) and U.S. Pat. No. 06,016,351 (Raida et al.) and International Publication No. WO 00/18031. By practicing the techniques described in these patents and the publication, in some cases coupled with a mechanical or acoustical steering mechanism, sound can be directed to the location of the ears of a particular vehicle occupant in such a manner that the other occupants can barely hear the sound, if at all. This is particularly the case when the vehicle is operating at high speeds on the highway and a high level of "white" noise is present. In this manner, one occupant can be listening to the news while another is listening to an opera, for example. Naturally, white noise can also be added to the vehicle and generated by the hypersonic sound system if necessary when the vehicle is stopped or traveling in heavy traffic. Thus, several occupants of a vehicle can listen to different programming without the other occupants hearing that programming. This can be accomplished using hypersonic sound without requiring earphones.

In principle, hypersonic sound utilizes the emission of inaudible ultrasonic frequencies that mix in air and result in the generation of new audio frequencies. A hypersonic sound system is a highly efficient converter of electrical energy to acoustical energy. Sound is created in air at any desired point that provides flexibility and allows manipulation of the perceived location of the source of the sound. Speaker enclosures are thus rendered dispensable. The dispersion of the mixing area of the ultrasonic frequencies and thus the area in which the new audio frequencies are audible can be controlled to provide a very narrow or wide area as desired.

The audio mixing area generated by each set of two ultrasonic frequency generators in accordance with the invention could thus be directly in front of the ultrasonic frequency generators in which case the audio frequencies would travel from the mixing area in a narrow straight beam or cone to the occupant. Also, the mixing area can include only a single ear of an occupant (another mixing area being formed by ultrasonic frequencies generated by a set of two other ultrasonic frequency generators at the location of the other ear of the occupant with presumably but not definitely the same new audio frequencies) or be large enough to encompass the head and both ears of the occupant. If so desired, the mixing area could even be controlled to encompass the determined location of the ears of multiple occupants, e.g., occupants seated one behind the other or one next to another.

Vehicle entertainment system 99 may include means for generating and transmitting sound waves at the ears of the occupants, the position of which are detected by transducers 49-52 and 54 and processor 20, as well as means for detecting the presence and direction of unwanted noise. In this manner, appropriate sound waves can be generated and transmitted to the occupant to cancel the unwanted noise and thereby optimize the comfort of the occupant, i.e., the reception of the desired sound from the entertainment system 99.

More particularly, the entertainment system 99 includes sound generating components such as speakers, the output of which can be controlled to enable particular occupants to each listen to a specific musical selection. As such, each occupant can listen to different music, or multiple occupants can listen to the same music while other occupant(s) listen to different music. Control of the speakers to direct sound waves at a particular occupant, i.e., at the ears of the particular occupant located in any of the ways discussed herein, can be enabled by any known manner in the art, for example, speakers having an adjustable position and/or orientation or speakers producing directable sound waves. In this manner, once the occupants are located, the speakers are controlled to direct the sound waves at the occupant, or even more specifically, at the head or ears of the occupants.

Figure 70:
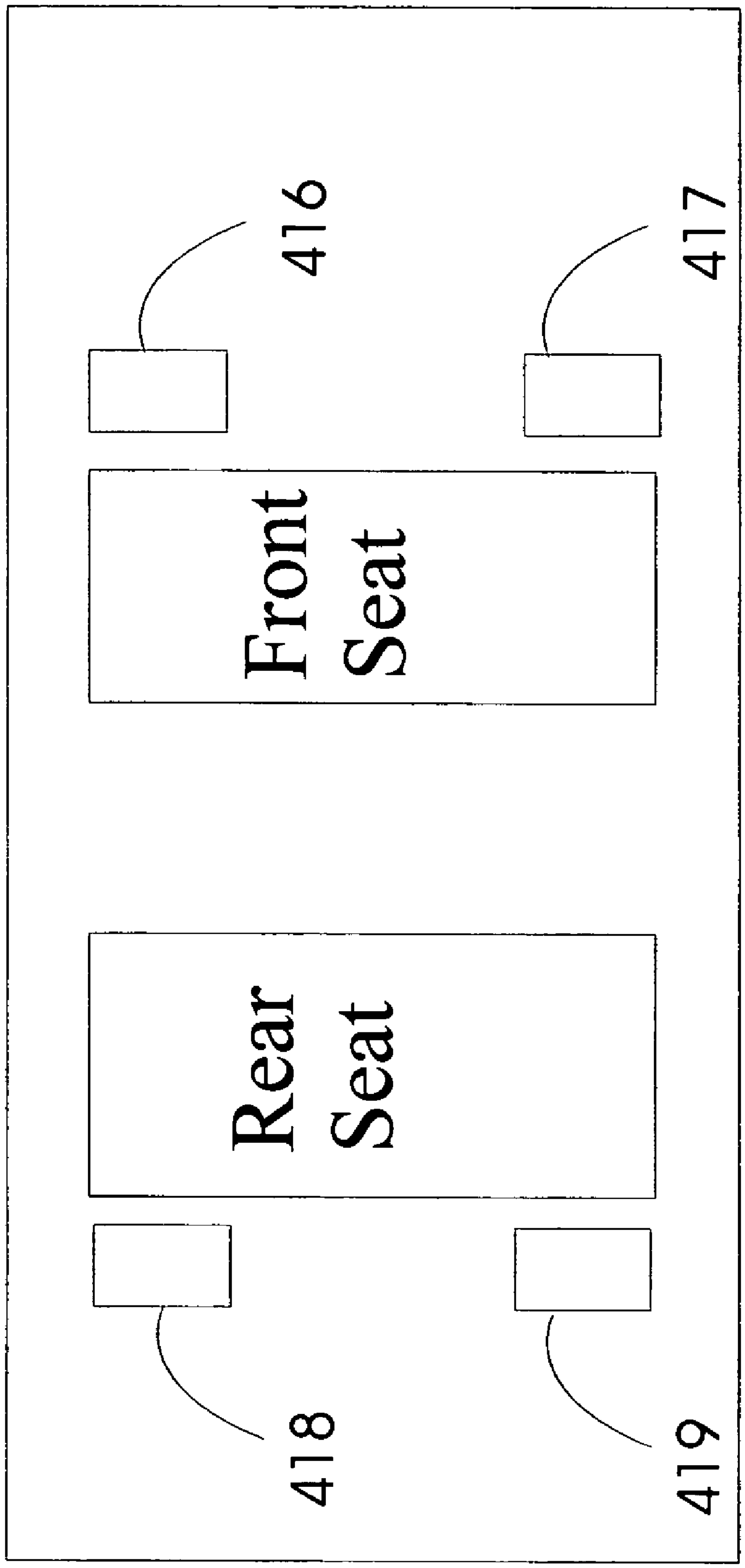
FIG. 70 is a side view with parts cutaway and removed showing schematically the interface between the vehicle interior monitoring system of this invention and the vehicle entertainment system.

FIG. 70 shows a schematic of a vehicle with four sound generating units 416-420 forming part of the entertainment system 99 of the vehicle which is coupled to the processor 20. Sound generating unit 416 is located to provide sound to the driver. Sound generating unit 417 is located to provide sound for the front-seated passenger. Sound generating unit 418 is located to provide sound for the passenger in the rear seat behind the driver and sound generating unit 419 is located to provide sound for the passenger in the rear seat behind the front-seated passenger. A single sound generating unit could be used to provide sound for multiple locations or multiple sound generating units could be used to provide sound for a single location. Naturally, as in the cases above, each of the sound generating units 416-420, in addition to being sending transducers can be receivers also. In this case, microphones can be used, as discussed above, to permit communication from any seat to any other seat in a manner similar to recently issued patent U.S. Pat. No. 06,363,156.

Sound generating units 416-420 operate independently and are activated independently so that, for example when the rear seat is empty, sound generating units 418-419 may not be not operated. This constitutes control of the entertainment system based on, for example, the presence, number and position of the occupants. Further, each sound generating unit 416-419 can generate different sounds so as to customize the audio reception for each occupant.

Each of the sound generating units 416-419 may be constructed to utilize hypersonic sound to enable specific, desired sounds to be directed to each occupant independent of sound directed to another occupant. The construction of sound generating units utilizing hypersonic sound is described in, for example, U.S. Pat. No. 05,885,129, U.S. Pat. No. 05,889,870 and U.S. Pat. No. 06,016,351 mentioned above. In general, in hypersonic sound, ultrasonic waves are generated by a pair of ultrasonic frequency generators and mix after generation to create new audio frequencies. By appropriate positioning, orientation and/or control of the ultrasonic frequency generators, the new audio frequencies will be created in an area encompassing the head of the occupant intended to receive the new audio frequencies. Control of the sound generating units 416-419 is accomplished automatically upon a determination by the monitoring system of at least the position of any occupants.

Furthermore, multiple sound generating units or speakers, and microphones, can be provided for each sitting position and these sound generating units or speakers independently activated so that only those sound generating units or speakers which provide sound waves at the determined position of the ears of the occupant will be activated. In this case, there could be four speakers associated with each seat and only two speakers would be activated for, e.g., a small person whose ears are determined to be below the upper edge of the seat, whereas the other two would be activated for a large person whose ears are determined to be above the upper edge of the seat. All four could be activated for a medium size person. This type of control, i.e., control over which of a plurality of speakers are activated, would likely be most advantageous when the output direction of the speakers is fixed in position and provide sound waves only for a predetermined region of the passenger compartment.

When the entertainment system comprises speakers which generate actual audio frequencies, the speakers can be controlled to provide different outputs for the speakers based on the occupancy of the seats. For example, using the identification methods disclosed herein, the identity of the occupants can be determined in association with each seating position and, by enabling such occupants to store music preferences, for example a radio station, the speakers associated with each seating position can be controlled to provide music from the respective radio station. The speakers could also be automatically directed or orientable so that at least one speaker directs sound toward each occupant present in the vehicle. Speakers that cannot direct sound to an occupant would not be activated.

Thus, one of the more remarkable advantages of the improved audio reception system and method disclosed herein is that by monitoring the position of the occupants, the entertainment system can be controlled without manual input to optimize audio reception by the occupants. Noise cancellation is now possible for each occupant independently More particularly, the entertainment system 99 includes sound generating components such as speakers, and receiving components such as microphones, the output of which can be controlled to enable particular occupants to each listen to a specific musical selection. As such, each occupant can listen to different music, or multiple occupants can listen to the same music while other occupant(s) listen to different music. Control of the speakers to direct sound waves at a particular occupant, i.e., at the ears of the particular occupant located in any of the ways discussed herein, can be enabled by any known manner in the art, for example, speakers having an adjustable position and/or orientation or speakers producing directable sound waves. In this manner, once the occupants are located, the speakers are controlled to direct the sound waves at the occupant, or even more specifically, at the head or ears of the occupants.

Many automobile accidents are now being caused by driver's holding onto and talking into cellular phones. Vehicle noise significantly deteriorates the quality of the sound heard by the driver from speakers. This problem can be solved through the use of hypersound and by knowing the location of the ears of the driver. Hypersound permits the precise focusing of sound waves along a line from the speaker with little divergence of the sound field. Thus, if the locations of the ears of the driver are known, the sound can be projected to them directly thereby overcoming much of the vehicle noise. In addition to the use of hypersound, directional microphones are known in the microphone art which are very sensitive to sound coming from a particular direction. If the driver has been positioned so that his eyes are in the eye ellipse, then the location of the driver's mouth is also accurately known and a fixed position directional microphone can be used to selectively sense sound emanating from the mouth of the driver. In many cases, the sensitivity of the microphone can be designed to include a large enough area such that most motions of the driver's head can be tolerated. Alternately the direction of the microphone can be adjusted using motors or the like. Systems of noise cancellation now also become possible if the ear locations are precisely known and noise canceling microphones as described in U.S. patent application Ser. No. 09/645,709, which is incorporated herein by reference, if the location of the driver's mouth is known. Although the driver is specifically mentioned here, the same principles can apply to the other seating positions in the vehicle.

Most vehicle occupants have noticed from time to time that the passenger compartment is particularly sensitive to certain frequencies and they appear to be unreasonably loud. In one aspect of the inventions disclosed herein, this problem can be eliminated by determining the acoustic spectral characteristics of the interior of a passenger compartment for a particular occupancy This can be done by broadcasting into the compartment a series of notes or tones (perhaps the whole scale) and measuring the response and doing this periodically since the acoustic characteristics of the compartment will change with occupancy. Once the response is known, perhaps on a speaker by speaker basis, then the notes emitted by the speaker can be adjusted in volume so that all sounds have uniform response. This can be further improved since, for example, as the ambient noise level increases, the soft notes are lost. They could then be selectively amplified allowing a listener to hear an entire opera, for example, although at reduces dynamic range.

A flow chart showing describing this method could include the following steps:

1. broadcasting into the compartment a series of notes (perhaps the whole scale)
2. measuring the response
3. modify the notes emitted by the speaker so that all sounds have uniform response.

14.8 HVAC

Considering again FIG. 2A. In normal use (other than after a crash), the system determines whether any human occupants are present, i.e., adults or children, and the location determining means 152 determines the occupant's location. The processor 152 receives signals representative of the presence of occupants and their location and determines whether the vehicular system, component or subsystem 155 can be modified to optimize its operation for the specific arrangement of occupants. For example, if the processor 153 determines that only the front seats in the vehicle are occupied, it could control the heating system to provide heat only through vents situated to provide heat for the front-seated occupants.

Thus, the control of the heating, ventilating, and air conditioning (HVAC) system can also be a part of the monitoring system although alone it would probably not justify the implementation of an interior monitoring system at least until the time comes when electronic heating and cooling systems replace the conventional systems now used. Nevertheless, if the monitoring system is present, it can be used to control the HVAC for a small increment in cost. The advantage of such a system is that since most vehicles contain only a single occupant, there is no need to direct heat or air conditioning to unoccupied seats. This permits the most rapid heating or cooling for the driver when the vehicle is first started and he or she is alone without heating or cooling unoccupied seats. Since the HVAC system does consume energy, an energy saving also results by only heating and cooling the driver when he or she is alone, which is about 70% of the time.

Figure 71:
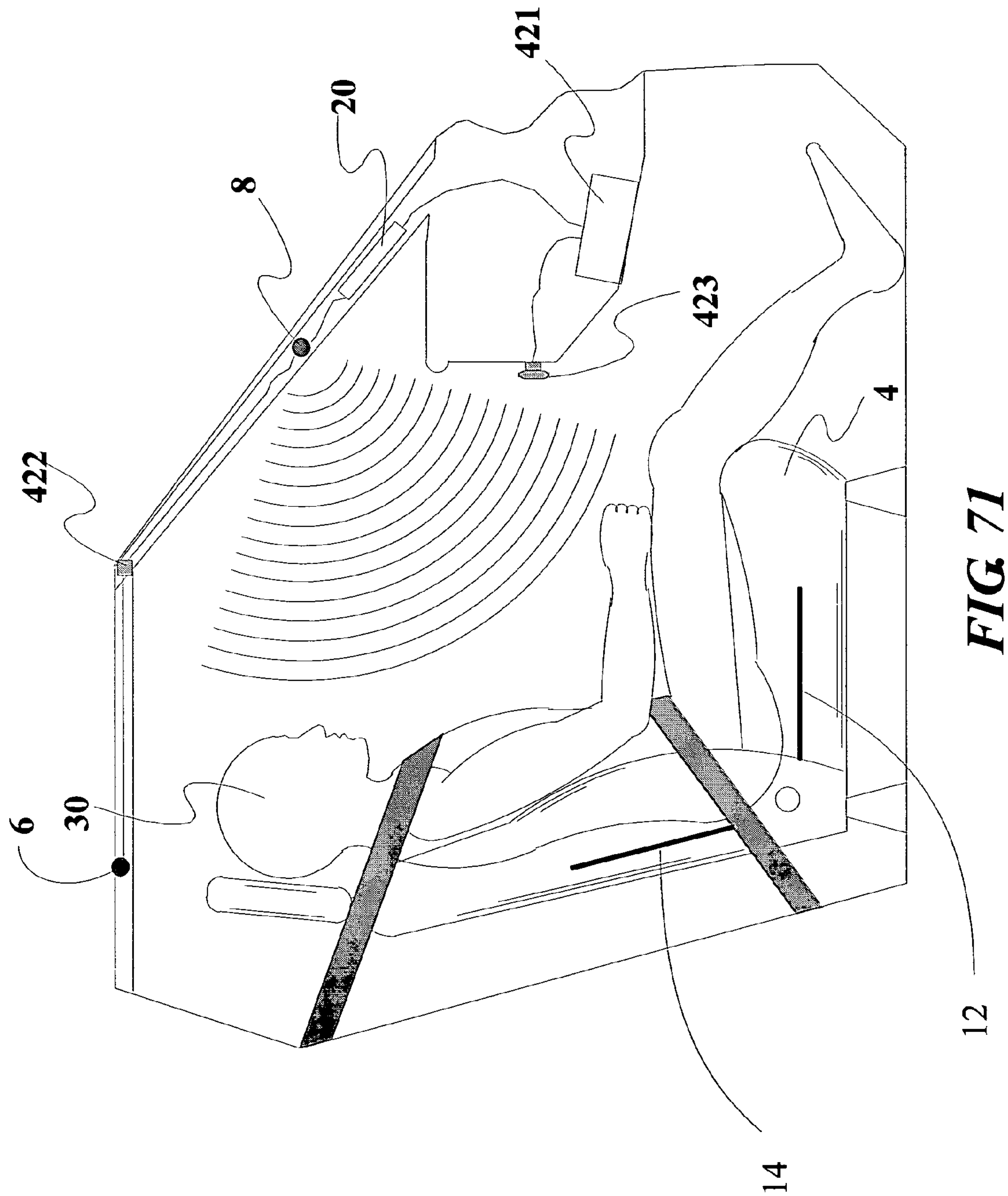
FIG. 71 is a side view with parts cutaway and removed showing schematically the interface between the vehicle interior monitoring system of this invention and the vehicle heating and air conditioning system and including an antenna field sensor.

FIG. 71 shows a side view of a vehicle passenger compartment showing schematically an interface 421 between the vehicle interior monitoring system of this invention and the vehicle heating and air conditioning system. In addition to the transducers 6 and 8, which at least in this embodiment are preferably acoustic transducers, an infrared sensor 422 is also shown mounted in the A-pillar and is constructed and operated to monitor the temperature of the occupant. The output from each of the transducers is fed into processor 20 that is in turn connected to interface 421. In this manner, the HVAC control is based on the occupant's temperature rather than that of the ambient air in the vehicle, as well as the determined presence of the occupant via transducers 6 and 8 as described above. This also permits each vehicle occupant to be independently monitored and the HVAC system to be adjusted for each occupant either based on a set temperature for all occupants or, alternately, each occupant could be permitted to set his or her own preferred temperature through adjusting a control knob shown schematically as 423 in FIG. 71. Since the monitoring system is already installed in the vehicle with its associated electronics including processor 20, the infrared sensor can be added with little additional cost and can share the processing unit.

14.9 Obstruction Sensing

To the extent that occupant monitoring transducers can locate and track parts of an occupant, this system can also be used to prevent arms, hands, fingers or heads to become trapped in a closing window or door. Although specific designs have been presented above for window and door anti-trap solutions, if there are several imagers in the vehicle these same imagers can monitor the various vehicle openings such as the windows, sunroof, doors, trunk lid, hatchback door etc. In some cases the system can be aided through the use of special lighting designs that either cover only the opening or comprise structured light so that the distance to a reflecting surface in or near to an opening can be determined.

14.10 Rear Impacts

Rear impact protection is also discussed at length elsewhere herein. A rear-of-head detector 423 is illustrated in FIG. 68. This detector 423, which can be one of the types described above, is used to determine the distance from the headrest to the rearmost position of the occupant's head and to therefore control the position of the headrest so that it is properly positioned behind the occupant's head to offer optimum support during a rear impact. Although the headrest of most vehicles is adjustable, it is rare for an occupant to position it properly if at all. Each year there are in excess of 400,000 whiplash injuries in vehicle impacts approximately 90,000 of which are from rear impacts (source: National Highway Traffic Safety Admin.). A properly positioned headrest could substantially reduce the frequency of such injuries, which can be accomplished by the head detector of this invention. The head detector 423 is shown connected schematically to the headrest control mechanism and circuitry 424. This mechanism is capable of moving the headrest up and down and, in some cases, rotating it fore and aft.

Referring now to FIGS. 119-129B wherein like reference characters refer to the same or similar elements, FIG. 119 is perspective view with portions cut away of a motor vehicle, shown generally at 1, having two movable headrests 356 and 359 and an occupant 30 sitting on the seat with the headrest 356 adjacent a head 33 of the occupant to provide protection in rear impacts.

In FIG. 120, a perspective view of the rear portion of the vehicle shown in FIG. 119 is shown with a rear impact crash anticipatory sensor, comprising a transmitter 440 and two receivers 441 and 442, connected by appropriate electrical connections, e.g., wire 443, to an electronic circuit or control module 444 for controlling the position of the headrest in the event of a crash. In commonly owned U.S. Pat. No. 06,343, 810 an anticipatory sensor system for side impacts is disclosed. This sensor system uses sophisticated pattern recognition technology to differentiate different categories of impacting vehicles. A side impact with a large truck at 20 mph is more severe than an impact with a motorcycle at 40 mph, and, since in that proposed airbag system the driver would no longer be able to control the vehicle, the airbag must not be deployed except in life threatening situations. Therefore, it is critical in order to predict the severity of a side impact, to know the type of impacting vehicle.

To improve the assessment of the impending crash, the crash sensor will optimally determine the position and velocity of an approaching object. The crash sensor can be designed to use differences between the transmitted and reflected waves to determine the distance between the vehicle and the approaching object and from successive distance measurements, the velocity of the approaching object. In this regard, the difference between the transmitted and received waves or pulses may be reflected in the time of flight of the pulse, a change in the phase of the pulse and/or a Doppler radar pulse, or by range gating an ultrasonic pulse, an optical pulse or a radar pulse. As such, the crash sensor can comprise a radar sensor, a noise radar sensor, a camera, a scanning laser radar and/or a passive infrared sensor.

The situation is quite different in the case of rear impacts and the headrest system described herein. The movement of the headrest to the proximity of an occupant's head is not likely to affect his or her ability to control the automobile. Also, it is unlikely that anything but another car or truck will be approaching the rear of the vehicle at a velocity relative to the vehicle of greater than 8 mph, for example. The one exception is a motorcycle and it would not be serious if the headrest adjusted in that situation. Thus, a simple ranging sensor is all that is necessary. There are, of course, advantages in using a more sophisticated pattern recognition system as will be discussed below.

FIG. 120, therefore, illustrates a simple ranging sensor using a transmitter 440 and two receivers 441 and 442. Transmitter 440 may be any wave-generating device such as an ultrasonic transmitter while the receivers 441,442 are compatible wave-receiving devices such as ultrasonic receivers. The ultrasonic transmitter 440 transmits ultrasonic waves. These transducers are connected to the electronic control module (ECM) 444 by means of wire 443, although other possible connecting means (wired or wireless) may also be used in accordance with the invention. Naturally, other configurations of the transmitter 440, receivers 441, 442 and ECM 444 might be equally or more advantageous. The sensors determine the distance of the approaching object and determine its velocity by differentiating the distance measurements or by use of the Doppler effect or other appropriate method. Although an ultrasonic system is illustrated herein, radar, electromagnetic, e.g., optical, or other systems could also be used as well as any appropriate number of transmitters and receivers.

Although a system based on ultrasonics is generally illustrated and described above and represents one of the best mode of practicing this invention, it will be appreciated by those skilled in the art that other technologies employing electromagnetic energy such as optical, infrared, radar, capacitance etc. could also be used. Also, although the use of reflected energy is disclosed, any modification of the energy by an object behind the vehicle is contemplated including absorption, phase change, transmission and reemission or even the emission or reflection of natural radiation. Such modification can be used to determine the presence of an object behind the vehicle and the distance to the object.

Thus, the system for determining the location of the head of the occupant can comprise an electric field sensor, a capacitance sensor, a radar sensor, an optical sensor, a camera, a three-dimensional camera, a passive infrared sensor, an ultrasound sensor, a stereo sensor, a focusing sensor and a scanning system. One skilled in the art would be able to apply these systems in the invention in view of the disclosure herein and the knowledge of the operation of such systems attributed to one skilled in the art.

Although pattern recognition systems, such as neural nets, might not be required, such a system would be desirable. With pattern recognition, other opportunities become available such as the determination of the nature of objects behind the vehicle. This could be of aid in locating and recognizing objects, such as children, when vehicles are backing up and for other purposes. Although some degree of pattern recognition can be accomplished with the system illustrated in FIG. 120, especially if an optical system is used instead of the ultrasonic system illustrated, additional transducers significantly improve the accuracy of the pattern recognition systems if either ultrasonics or radar systems are used.

The wire 443 shown in FIG. 120 leads to the electronic control module 444 which is also shown in FIG. 121. FIG. 121 is a perspective view of a headrest actuation mechanism, mounted in a vehicle seat 4, and transducers 353,354 plus a head contact sensor 334. Transducer 353 may be an ultrasonic transmitter and transducer 354 may be an ultrasonic receiver. The transducers 353,354 may be based on any type of propagating phenomenon such as electromagnetics (for example capacitive systems), and are not limited to use with ultrasonics. The seat 4 and headrest 356 are shown in phantom. Vertical motion of the headrest 356 is accomplished when a signal is sent from control module 444 to servomotor 374 through wire 376. Servomotor 364 rotates lead screw 377 which mates with a threaded hole in elongate member 378 causing it to move up or down depending on the direction of rotation of the lead screw 377. Headrest support rods 379 and 380 are attached to member 378 and cause the headrest 356 to translate up or down with member 378. In this manner, the vertical position of the headrest 356 can be controlled as depicted by arrow A-A.

Wire 381 leads from the control module 444 to servomotor 375 which rotates lead screw 382. Lead screw 382 mates with a threaded hole in elongate, substantially cylindrical shaft 383 which is attached to supporting structures within the seat shown in phantom. The rotation of lead screw 382 rotates servo motor support 384 which in turn rotates headrest support rods 379 and 380 in slots 385 and 386 in the seat 4. In this manner, the headrest 356 is caused to move in the fore and aft direction as depicted by arrow B-B. Naturally there are other designs which accomplish the same effect of moving the headrest to where it is proximate to the occupant's head The operation of the system is as follows. When an occupant is seated on a seat containing the headrest and control system described above, the transducer 353 emits ultrasonic energy which reflects off of the back of the head of the occupant and is received by transducer 354. An electronic circuit containing a microprocessor determines the distance from the head of the occupant based on the time period between the transmission and reception of an ultrasonic pulse. The headrest 356 moves up and/or down until it finds the vertical position at which it is closest to the head of the occupant. The headrest remains at that position. Based on the time delay between transmission and reception of an ultrasonic pulse, the system can also determine the longitudinal distance from the headrest to the occupant's head. Since the head may not be located precisely in line with the ultrasonic sensors, or the occupant may be wearing a hat, coat with a high collar, or may have a large hairdo, there may be some error in the longitudinal measurement. This problem is solved in an accident through the use of a contact switch 334 on the surface of the headrest. When the headrest contacts a hard object, such as the rear of an occupant's head, the contact switch 334 closes and the motion of the headrest stops.

Although a system based on ultrasonics is generally illustrated and described above and represents the best mode of practicing this invention, it will be appreciated by those skilled in the art that other technologies employing electromagnetic energy such as optical, infrared, radar, capacitance etc. could also be used. Also, although the use of reflected energy is disclosed, any modification of the energy by the occupant's head is contemplated including absorption, capacitance change, phase change, transmission and reemission. Such modification can be used to determine the presence of the occupant's head adjacent the headrest and/or the distance between the occupant's head and the headrest.

When a vehicle approaches the target vehicle, the target vehicle containing the headrest and control system of this invention, the time period between transmission and reception of ultrasonic waves, for example, shortens indicating that an object is approaching the target vehicle. By monitoring the distance between the target vehicle and the approaching vehicle, the approach velocity of the approaching vehicle can the calculated and a decision made by the circuitry in control module 444 that an impact above a threshold velocity is about to occur. The control module 444 then sends signals to servo motors 375 and 374 to move the headrest to where it contacts the occupant in time to support the occupant's head and neck and reduce or eliminate a potential whiplash injury as explained in more detailed below.

The seat also contains two switch assemblies 388 and 389 for controlling the position of the seat 4 and headrest 356. The headrest control switches 389 permit the occupant to adjust the position of the headrest in the event that the calculated position is uncomfortably close to or far from the occupant's head. A woman with a large hairdo might find that the headrest automatically adjusts so as to contact her hairdo. This might be annoying to the woman who could then position the headrest further from her head. For those vehicles which have a seat memory system for associating the seat position with a particular occupant, the position of the headrest relative to the occupant's head can also be recorded. Later, when the occupant enters the vehicle, and the seat automatically adjusts to the occupant's recorded in memory preference, the headrest will similarly automatically adjust. In U.S. Pat. No. 05,822,437, a method of passively recognizing a particular occupant is disclosed.

Thus, an automatic adjustment results which moves the headrest to each specific occupant's desired and memorized headrest position. The identification of the specific individual occupant for which memory look-up or the like would occur can be by height sensors, weight sensors (for example placed in a seat), or by pattern recognition means, or a combination of these and other means, as disclosed herein and in the above-referenced patent applications and granted patents.

One advantage of this system is that it moves the headrest toward the occupant's head until it senses a resistance characteristic of the occupant's head. Thus, the system will not be fooled by a high coat collar 445 or hat 446, as illustrated in FIG. 123, or other article of clothing or by a large hairdo 447 as illustrated in FIG. 122. The headrest continues to be moved until it contacts something relatively rigid as determined by the contact switch 334.

A key advantage of this system is that there is no permanent damage to the system when it deploys during an accident. After the event it will reset without an expensive repair. In fact, it can be designed to reset automatically.

An ultrasonic sensor in the headrest has previously been proposed in a U.S. patent to locate the occupant for the out-of-position occupant problem. In that system, no mention is made as to how to find the head. In the headrest location system described herein, the headrest can be moved up and down in response to the instant control systems to find the location of the back of the occupant's head. Once it has been found the same sensor is used to monitor the location of the person's head. Naturally, other methods of finding the location of the head of an occupant are possible including in particular an electromagnetic based system such as a camera, capacitance sensor or electric field sensor.

An improvement to the system described above results when pattern recognition technology is added. FIG. 124 is view similar to FIG. 121 showing an alternate design of a head sensor using three transducers 353, 354 and 355 which can be used with a pattern recognition system. Transducer 353 can perform both as a transmitter and receiver while transducers 354,355 can perform only as receivers. Transducers 354,355 can be placed on either side of and above transducer 353. Using this system and an artificial neural network, or other pattern recognition system, as part of the electronic control module 444, or elsewhere, an accurate determination of the location of an occupant's head can, in most cases, be accomplished even when the occupant has a large hairdo or hat. In this case, the system can be trained for a wide variety of different cases prior to installation into the vehicle. This training is accomplished by placing a large variety of different occupants onto the driver's seat in a variety of different positions and recording digitized data from transducers 353, 354 and 355 along with data representing the actual location of the occupant's head. The different occupants include examples of large and small people, men and women, with many hair, hat, and clothing styles. Since each of these occupants is placed at a variety of different positions on the seat, the total data set, called the "training set", can consist of at least one thousand, and typically more than 100,000, cases. This training set is then used to train the neural network, or other similar trainable pattern recognition technology, so that the resulting network can locate the occupant's head in the presence of the types of obstructions discussed above whatever an occupant occupies the driver's seat.

FIG. 125 is a schematic view of an artificial neural network of the type used to recognize an occupant's head and is similar to that presented in FIG. 19B above. The theory of neural networks including many examples can be found in several books on the subject including: *Techniques And Application Of Neural Networks*, edited by Taylor, M. and Lisboa, P., Ellis Horwood, West Sussex, England, 1993; *Naturally Intelligent Systems*, by Caudill, M. and Butler, C., MIT Press, Cambridge Mass., 1990; and, *Digital Neural Networks*, by Kung, S. Y., PTR Prentice Hall, Englewood Cliffs, N.J., 1993. the neural network is presented here as an example of a pattern recognition technology. Other pattern recognition algorithms, such as neural-fuzzy systems, are being developed which, in some cases, have superior performance to pure neural networks.

The process of locating the head of an occupant can be programmed to begin when an event occurs such as the closing of a vehicle door or the shifting of the transmission out of the PARK position. The ultrasonic transmitting/receiving transducer 353, for example, transmits a train of ultrasonic waves toward the head of the occupant. Waves reflected from the occupant's head are received by transducers 353, 354 and 355. An electronic circuit containing an analog to digital converter converts the received analog signal to a digital signal which is fed into the input nodes numbered 1, 2, 3 . . . n, shown on FIG. 125. The neural network algorithm compares the pattern of values on nodes 1 through N with patterns for which it has been trained, as discussed above. Each of the input nodes is connected to each of the second layer nodes, called the hidden layer, either electrically as in the case of a neural computer or through mathematical functions containing multiplying coefficients called weights, described in more detail below. The weights are determined during the training phase while creating the neural network as described in detail in the above text references. At each hidden layer node a summation occurs of the values from each of the input layer nodes, which have been operated on by functions containing the weights, to create a node value. Although an example using ultrasound has been described, the substitution of other sensors such as optical, radar or capacitors will now be obvious to those skilled in the art.

The hidden layer nodes are in like manner connected to the output layer nodes, which in this example is only a single node representing the longitudinal distance to the back of the occupant's head. During the training phase, the distance to the occupant's head for a large variety of patterns is taught to the system. These patterns include cases where the occupant is wearing a hat, has a high collar, or a large hairdo, as discussed above, where a measurement of the distance to the back of the occupant's head cannot be directly measured. When the neural network recognizes a pattern similar to one for which it has been trained, it then knows the distance to the occupant's head. The details of this process are described in the above listed referenced texts and will not be presented in detail here. The neural network pattern recognition system described herein is one of a variety of pattern recognition technologies which are based on training. The neural network is presented herein as one example of the class of technologies referred to as pattern recognition technologies. Ultrasonics is one of many technologies including optical, infrared, capacitive, radar, electric field or other electromagnetic based technologies. Although the reflection of waves was illustrated, any modification of the waves by the head of the occupant is anticipated including absorption, capacitance change, phase change, transmission and reemission. Additionally, the radiation emitted from the occupant's head can be used directly without the use of transmitted radiation. Naturally, combinations of the above technologies can be used.

A time step, such as one tenth of a millisecond, is chosen as the period at which the analog to digital converter (ADC) averages the output from the ultrasonic receivers and feeds data to the input nodes. For one preferred embodiment of this invention, a total of one hundred input nodes is typically used representing ten milliseconds of received data. The input to each input node is a preprocessed combination of the data from the three receivers. In another implementation, separate input nodes would be used for each transducer. Alternately, the input data to the nodes can be the result of a preprocessing algorithm which combines the data taking into account the phase relationships of the three return signals to obtain a map or image of the surface of the head using the principles of phased array radar. Although a system using one transmitter and three receivers is discussed herein, where one transducer functions as both a transmitter and receiver, even greater resolution can be obtained if all three receivers also act as transmitters.

In the example above, one hundred input nodes, twelve hidden layer nodes and one output layer node are typically used. In this example received data from only three receivers were considered. If data from additional receivers is also available the number of input layer nodes could increase depending on the preprocessing algorithm used. If the same neural network is to be used for sensing rear impacts, one or more additional output nodes might be used, one for each decision. The theory for determining the complexity of a neural network for a particular application has been the subject of many technical papers as well as in the texts referenced above and will not be presented in detail here. Determining the requisite complexity for the example presented here can be accomplished by those skilled in the art of neural network design and is discussed briefly below.

The pattern recognition system described above defines a method of determining the probable location of the rear of the head of an occupant and, will therefore determine, if used in conjunction with the anticipatory rear impact sensor, where to position a deployable occupant protection device in a rear collision, and comprises the steps of:

(a) obtaining an ultrasonic, analog signal from transducers mounted in the headrest;

(b) converting the analog signal into a digital time series;

(c) entering the digital time series data into a pattern recognition system such as a neural network;

(d) performing a mathematical operation on the time series data to determine if the pattern as represented by the time series data is nearly the same as one for which the system has been trained; and (e) calculating the probable location of the occupant's head if the pattern is recognizable.

The particular neural network described and illustrated above contains a single series of hidden layer nodes. In some network designs, more than one hidden layer is used although only rarely will more than two such layers appear. There are of course many other variations of the neural network architecture illustrated above, as well as other pattern recognition systems, which appear in the literature. For the purposes herein, therefore, "neural network" can be defined as a system wherein the data to be processed is separated into discrete values which are then operated on and combined in at least a two stage process and where the operation performed on the data at each stage is in general different for each of the discrete values and where the operation performed is at least determined through a training process. The operation performed is typically a multiplication by a particular coefficient or weight and by different operation, therefore is meant in this example, that a different weight is used for each discrete value.

The implementation of neural networks can take at least two forms, an algorithm programmed on a digital microprocessor or in a neural computer. Neural computer chips are now available.

In the particular implementation described above, the neural network is typically trained using data from 1000 or more than 100,000 different combinations of people, clothes, wigs etc. There are, of course, other situations which have not been tested. As these are discovered, additional training will improve the performance of the pattern recognition head locator.

Once a pattern recognition system is implemented in a vehicle, the same system can be used for many other pattern recognition functions as described herein and in the above referenced patents and patent applications. For example, in the current assignee's U.S. Pat. No. 05,829,782 referenced above, the use of neural networks as a preferred pattern recognition technology is disclosed for use in identifying a rear facing child seat located on the front passenger seat of an automobile. This same patent application also discloses many other applications of pattern recognition technologies for use in conjunction with monitoring the interior of an automobile passenger compartment.

As described in the above referenced patents to Dellanno and Dellanno et al., whiplash injuries typically occur when there is either no head support or when only the head of the occupant is supported during a rear impact. To minimize these injuries, both the head and neck should be supported. In Dellanno, the head and neck are supported through a pivoting headrest which first contacts the head of the occupant and then rotates to simultaneously support both the head and the neck. The force exerted by the head and neck onto the pivoting headrest is distributed based on the relative masses of the head and neck. Dellanno assumes that the ratio of these masses is substantially the same for all occupants and that the distances between centers of mass of the head and neck is approximately also proportional for all occupants. To the extent that this is not true, a torque will be applied to the headrest and cause a corresponding torque to be applied to the head and neck of the occupant. Ideally, the head and neck would be supported with just the required force to counteract the inertial force of each item. Obviously this can only approximately be accomplished with the Dellanno pivoting headrest especially when one considers that no attempt has been made to locate the headrest relative to the occupant and the proper headrest position will vary from occupant to occupant. Dellanno also assumes that the head and neck will impact and in fact bounce off of the headrest. This in fact can increase the whiplash injuries since the change in velocity of the occupant's head will be greater that if the headrest absorbed the kinetic energy and the head did not rebound. A far more significant improvement to eliminating whiplash injuries can be accomplished by eliminating this head impact and the resulting rebound as is accomplished in the present invention.

Automobile engineers attempt to design vehicle structures so that in an impact the vehicle is accelerated at an approximately constant acceleration. It can be shown that this results in the most efficient use of the vehicle structure in absorbing the crash energy. It also minimizes the damage to the vehicle in a crash and thus the cost of repair. Let us assume, therefore, that in a particular rear impact that the vehicle accelerates at a constant 15 g acceleration. Let us also assume that the vehicle seat back is rigidly attached to the vehicle structure at least during the early part of the crash, so that up until shortly after the occupant's head has impacted the headrest the seat back also is accelerating at a constant 15 g's. Finally let us assume that the occupant's head is initially displaced 4 inches from the headrest and that during impact the head compresses the headrest 1 inch. When the occupant's head impacts the headrest it must now make up for the difference in velocity between the headrest and the head during the period that it is compressing the headrest 1 inch. It can be demonstrated that this requires an acceleration of approximately 75 g's or five times the acceleration which the head would experience if it were in contact with the headrest at the time that the rear impact occurs.

The Dellanno headrest, as shown for example in FIG. 3 of U.S. Pat. No. 05,290,091, is a worthwhile addition to solving the whiplash problem after the headrest has been positioned against the head and neck of the occupant. The added value of the Dellanno design over simpler designs, especially considering the inertial effects of having to rapidly rotate the headrest while the crash is taking place, is probably not justified. FIG. 126 illustrates a headrest design which accomplishes the objectives of the Dellanno headrest in a far simpler structure and at less potential injury to the occupant.

In FIG. 126, a seat with a movable headrest similar to the one illustrated in FIG. 121 is shown with a headrest designated 450 designed to provide support to both the head and neck which eliminates the shortcomings of the Dellanno headrest. The ultrasonic transducer 353, which includes both a transmitter and receiver, has been moved to an upper portion of the seat back, not the headrest, to facilitate the operation of the support system as described below. The construction of the headrest is illustrated in a cutaway view shown in FIG. 126A which is an enlarged view of the headrest of FIG. 126.

In FIG. 126A, the headrest is constructed of a support or frame 452 which is attached to rods 379 and 380 and extends along the sides and across the back of the headrest. Support 452 may be made of a somewhat rigid material. This support 452 helps control the motion of a pre-inflated bag 453 as it deforms under the force from the head of the occupant to where it contacts and provides support to the occupant's neck. Relatively low density open cell foam 454 surrounds the support 452 giving shape to the remainder of the headrest. As shown in FIG. 126A, the open call foam 454 can also have channels or openings 455 extending in a direction generally from a top of the headrest 450 to a bottom of the headrest 450, although such channels are not required. The direction of the channels or openings 455 facilitates the desired movement of the fluid in the bag 453 and constrains the fluid flow upon impact of the occupant's head against the headrest 450, i.e., a generally vertical movement in the case of the illustrated headrest 450. The open call foam 454 is covered by a thin membrane, possibly made from plastic, or the bag 453 (also referred to as an airbag herein which is appropriate when the fluid in the bag 453 is air-although the fluid within bag 453 may be other than air), and by a decorative cover 456 made of any suitable, acceptable material. The bag 453 is sealed surrounding the support 452 and plastic or rubber foam 454 such that any flow of fluid such as air into or out of the bag 453 is through a hole in the bag 453 adjacent to a vent hole 451 in the supporting structure, i.e., the cover 456. Elastic stretch seams 457 can be placed in the sides, bottom and/or across the front of the headrest cover to permit the headrest surface to deform to the contour of, and to properly support, the occupant's head and neck. A contact switch 334 is placed just inside cover 456 and functions as described above.

Instead of channels, the properties of the foam can be selected to provide the desired flow of gas, e.g., the design, shape, positioning and construction of the foam can be controlled and determined during manufacture to obtain the desired flow properties.

FIG. 127A and FIG. 127B illustrate the operation of the headrest 450. In anticipation of a rear impact (or any other type of impact), as determined by the proximity sensors described above or any other anticipatory crash sensor system, headrest 450 is moved from its position as shown in FIG. 127A to its position as shown in FIG. 127B. This movement is enabled by control of the displacement mechanism, such as those described above with reference to FIG. 121, as effected through the control module 444. The forward movement of the headrest 450 should continue until the headrest 450 contacts or impacts with the occupant's head as determined by a contact switch 334. When headrest 450 contacts or impacts the head 33 of the occupant 30, it exerts sufficient pressure against head 33 to cause air (the fluid in the bag 453 for the purposes of this explanation) to flow from the upper portion 458 to the lower portion 459 of headrest 450, which causes this lower portion to expand as the upper portion contracts. This initial flow of air takes place as the foam 454 compresses under the force of contact between the head and upper portion 458 of headrest 450. The initial shape of headrest 450 is created by the shape of the foam 454; however once the occupants head 33 begins to exert pressure on the upper portion 458 the air is compressed and begins to flow to the lower portion 459 causing it to expand until it contacts the neck 460 of the occupant 30. (If the occupant's head were to exert pressure on the lower portion 459 or once the pressure on the upper portion 458 were removed, air would flow from the lower portion 459 to the upper portion 458.) In this manner, by the flow of air, the pressure is equalized on the head and neck of the occupant 30 thereby preventing the whiplash type motions described in the Dellanno patents, as well as numerous technical papers on the subject. The headrest of this invention acts very much like a pre-inflated airbag providing force where force is needed to counteract the accelerations of the occupant. It accomplishes this force balancing without the need to rotate a heavy object such as the headrest in the Dellanno patent which by itself could introduce injuries to the occupant.

In addition to use as a headrest, the structure described above can be used in other applications for cushioning an occupant of a vehicle, i.e., for cushioning another part of the occupant's body in an impact. The cushioning arrangement would thus comprise a frame or support coupled to the vehicle and a fluid-containing bag attached to the frame or other support. A deformable cover would also be preferred. The bag, including the cell foam and vent hole as described above, would allow movement of the fluid within the bag to thereby alter the shape of the bag, upon contact with the part of the occupant's body, and enable the bag to conform to the part of the occupant's body. This would effectively cushion the occupant's body during an impact. Further, the cushioning arrangement could be coupled to the anticipatory crash sensor through a control unit (i.e., control module 444) and displacement mechanism in a similar manner as headrest 450, to thereby enable movement of the cushioning arrangement against the part of the occupant's body just prior to or coincident with the crash.

A headrest using a pre-inflated airbag type structure composed of many small airbags is disclosed in FIG. 9 of U.S. Pat. No. 05,098,124 to Breed et al. The headrest disclosed here differs primarily through the use of a single pre-inflated fluid-containing bag, fluid-filled bag or airbag which when impacted by the head of the occupant, deforms by displacing the surface of the headrest outwardly to capture and support the neck of the occupant. The use of an airbag to prevent whiplash injuries is common for accidents involving frontal impacts and driver and passenger side airbags. Whiplash injuries have not become an issue in frontal impacts involving airbags, therefore, the ability of airbags to prevent whiplash injuries in frontal impacts is proven. The use of airbags to prevent whiplash injuries in rear impacts is therefore appropriate and, if a pre-inflated airbag as described herein is used, results in a simple low-cost and effective headrest design. Naturally, other airbag designs are possible although the pre-inflated design as described herein is preferred.

This pre-inflated airbag headrest has another feature which further improves its performance. The vent hole 451 is provided to permit some of the air in the headrest to escape in a controlled manner thereby dampening the motion of the head and neck much in the same way that a driver side airbag has vent holes to dissipate the energy of the impacting driver during a crash. An appropriate regulation device may also be associated with the vent hole 451 of the headrest 450 to regulate the escaping air. Without the vent hole, there is risk that the occupant's head and neck will rebound off of the headrest, as is also a problem in the Dellanno patents. This can happen especially when, due to pre-crash braking or an initial frontal impact such as occurs in a multiple car accident, the occupant is sufficiently out of position that the headrest cannot reach his or her head before the rear impact. Without this feature the acceleration on the head will necessarily be greater and therefore the opportunity for injury to the neck is increased. The size of this hole is determined experimentally or by mathematical analysis and computer simulation. If it is too large, too much air will escape and the headrest will bottom out on the support. If it is too small, the head will rebound off of the headrest thereby increasing the chance of whiplash injury. Naturally, a region of controlled porosity could be substituted for hole 451.

Finally, a side benefit of this invention is that it can be used to determine the presence of an occupant on the front passenger seat. This information can then be used to suppress deployment of an airbag if the seat is unoccupied.

FIG. 128A is a side view of an occupant seated in the driver seat of an automobile having an integral seat and headrest and an inflatable pressure controlled bladder with the bladder in the normal, uninflated condition. FIG. 128B is a view as in FIG. 128A with the bladder expanded in the head contact position as would happen in anticipation of, e.g., a rear crash.

The seat containing the bladder system of this embodiment of the invention is shown generally at 465. The seat 465 contains an integral bladder 466 arranged within the cover of the seat 465, a fluid-containing chamber 467 connected to the bladder 466 and a small igniter assembly 468, which contains a small amount, such as about 5 grams, of a propellant such as boron potassium nitrate. Upon receiving a signal that a crash is imminent, igniter assembly 468 is ignited and supplies a small quantity of hot propellant gas into chamber 467. The gas (the fluid in a preferred embodiment) in chamber 467 then expands due to the introduction of the high temperature gas and causes the bladder 466 to expand to the condition shown in FIG. 128B. Bladder 466 expands in such a manner (through its design, construction and/or positioning and/or through the design and construction of the seat 465) as to conform to the shape of the occupant's head 33 and neck 460. As soon as the expanding headrest portion 469 of the seat 465 contacts the head 33 and neck 460 of the occupant (as may be determined by a contact sensor in the seat 465), pressure begins to increase in the bladder 466 causing a control valve 470 to open and release gas into the passenger compartment to thereby prevent the occupant from being displaced toward the front of the vehicle.

Control valve 470 is situated in a flow line between the bladder 466 and an opening in the rear of the seat 465 in the illustrated embodiment, but may be directly connected to the bladder 466. The flow line may be directed to another location, e.g., the exterior of the vehicle, through appropriate conduits. Control valve 470 can be controlled by an appropriate control device, such as the central diagnostic module, and the amount of gas released coordinated with or based on the severity of the crash or any other parameter of the crash or deployment of the airbag.

In the examples of FIGS. 128A and 128B, a small pyrotechnic element is utilized as the igniter assembly 468; however, the system itself is automatically resetable. Thus, after the impact, the system returns to its pre-inflated position and the only part that needs to be replaced is the igniter assembly 468. The cost of restoring the system after an accident is therefore small. The igniter assembly 468 may be positioned so that it can be readily accessed from the rear of the seat, e.g., by removing a panel in the rear of the seat. The igniter assembly 468 may be coupled directly or indirectly to a crash sensor, possibly through a central diagnostic module of the vehicle. The crash sensor is preferably an anticipatory crash sensor arranged so as to detect rear impacts because whiplash injuries are mostly caused during rear impacts.

In operation, the crash sensor, such as the anticipatory crash sensor of FIG. 120, detects the impending crash into the rear of the vehicle and generates a signal or causes a signal to be generated indicative of the fact that the igniter assembly 468 should be activated to inflate the bladder 466. The igniter assembly 468 is then activated generating heated gas which is directed into chamber 467. The gas in chamber 467 expands and passes through one or more conduits into the bladder 466 causing the bladder 466 to expand to the condition shown in FIG. 128B. The expanding bladder 466 will fill in the space between the occupant and the headrest and seat as shown in FIG. 128B. The bladder 466 may be designed to have more expansion capability in the head and neck areas as those surfaces will initially be further from the body of the driver. The inflated bladder 466 will thus reduce the risk of whiplash injuries to the driver.

The control valve 470 is designed or controlled to ensure that the bladder 466 expands sufficiently to provide whiplash protection without exerting a forward force of the driver. For example, the pressure in the bladder 466 may be measured during inflation and once it reaches an optimum level, the control (or pressure release) valve 470 may be activated. In the alternative, during the design phase, the time it takes for the bladder 466 to inflate to the optimum level may be computed and then the control valve 470 designed to activated after this predetermined time.

Instead of a control valve, it is also possible to use a variable outflow port or vent as described in the current assignee's U.S. Pat. No. 05,748,473, incorporated by reference herein.

After inflation and the crash, the igniter assembly 468 can be removed and replaced with compatible igniter assembly so that the vehicle is ready for subsequent use.

As shown in FIGS. 128A and 128B, the bladder 466 is integral with the seat 465 and the headrest of the seat is formed with the backrest as a combined seat back portion. If the headrest is formed separate from the backrest, then the bladder 466 can be formed integral with the headrest and if necessary, integral with the backrest to achieve the whiplash protection sought by the invention.

FIG. 129A is a side view of an occupant seated in the driver seat of an automobile having an integral seat and a pivotable or rotatable headrest and bladder with the headrest in the normal position. FIG. 129B is a view as in FIG. 129A with the headrest pivoted in the head contact position as would happen in anticipation of, e.g., a rear crash. In contrast to the embodiment of FIGS. 128A and 128B, this embodiment is purely passive in that no pyrotechnics are used.

In this embodiment, upon receiving a signal that a crash is imminent, electronic circuitry, not shown, activates solenoid 471 causing headrest portion 474 to rotate about pivot 473 (an axis, pin, etc) toward the occupant. The system is shown generally at 475 and comprises a seat back portion 472 and headrest portion 474. In FIG. 129B, the headrest portion 474 has rotated until it contacts the occupant and then a bladder or airbag 476 within headrest portion 464 changes shape or deforms to conform to the head 33 and neck 460 of the occupant thereby supporting both the head and neck and preventing a whiplash injury. The control of the rotation of the headrest portion 474 can be accomplished either by a contact switch or force measurement using a switch or force sensor in the headrest or a force or torque sensor at the solenoid 471 or, alternately, by measuring the pressure within the airbag 476. Solenoid 471 can be replaced by another linear actuator such as an air cylinder with an appropriate source of air pressure.

The electronic circuitry, not shown, may be controlled by the central diagnostic module or upon receiving a signal from the crash sensor. Airbag 476 is shown arranged within the headrest portion 464, i.e., it is within the periphery of the surface layer of the headrest portion 474 and seat 475.

In operation, the crash sensor detects the impending crash, e.g., into the rear of the vehicle, and generates a signal or causes a signal to be generated resulting in pivotal movement of the headrest portion 474. The headrest portion 474 is moved (pivoted) preferably until a point at which the front of the headrest portion 474 touches the back of the driver's head. This can all occur prior to the actual crash. Thereafter, upon the crash, the driver will be forced backwards against the pivoted headrest portion 474. Gas will flow from the upper part of the headrest portion 474 and the seat back and thereby distribute the load between the head, neck and body.

As shown in FIGS. 129A and 129B, the headrest portion of the seat is formed with the backrest as a combined seat back portion. If the headrest is formed separate from the backrest, then the airbag 476 can be formed integral with the headrest and if necessary, integral with the backrest to achieve the whiplash protection sought by the invention. In this case, the pivot 473 might be formed in the backrest or between the backrest and headrest.

Although shown for use with a driver, the same systems could be used for passengers in the vehicle as well, i.e., it could be used for the front-seat passenger(s) and any rear-seated passengers. Also, although whiplash injuries are most problematic in rear impacts, the same system could be used for side impacts as well as front impacts and rollovers with varying degrees of usefulness.

Thus, disclosed herein is a seat for a vehicle for protecting an occupant of the seat in a crash which comprises a headrest portion, an expandable bladder arranged at least partially in the headrest portion, the bladder being arranged to conform to the shape of a neck and head of the occupant upon expansion, and an igniter for causing expansion of the bladder upon receiving a signal that protection for the occupant is desired. The bladder may also be arranged in least partially in the backrest portion of the seat. A fluid-containing chamber is coupled to the igniter and in flow communication with the bladder whereby the igniter causes fluid in the chamber to expand and flow into the bladder to expand the bladder. A control valve is associated with the bladder for enabling the release of fluid from the bladder. The bladder is preferably arranged in an interior of the headrest portion, i.e., such that its expansion is wholly within the outer surface layer of the headrest portion of the seat. A vehicle including this system can also include a crash sensor system for determining that a crash requiring protection for the occupant is desired. The crash sensor system generates a signal and directing the signal to the igniter. The crash sensor system may be arranged to detect a rear impact.

Another seat for a vehicle for protecting an occupant of the seat in a crash disclosed above comprises a backrest including a backrest portion and a headrest portion and an airbag arranged at least partially in the headrest portion. The headrest portion is pivotable with respect to the backrest portion toward the occupant. To this end, a pivot structure is provided for enabling pivotal movement of the headrest portion relative to the backrest portion. The pivot structure may be a solenoid arranged to move an arm about a pivot axis, which arm is coupled to the headrest portion. The airbag is arranged in an interior of the headrest portion of the backrest. A vehicle including this system can also include a crash sensor system for determining that a crash requiring protection for the occupant is desired. The headrest portion is pivoted into contact with the occupant upon a determination by the crash sensor system that a crash requiring protection for the occupant is desired. The crash sensor system may be arranged to detect a rear impact.

Thus there is disclosed and illustrated herein a passive rear impact protection system which requires no action by the occupant and yet protects the occupant from whiplash injuries caused by rear impacts. Although several preferred embodiments are illustrated and described above there are possible combinations using other geometry, material, and different dimensions of the components that can perform the same function. Therefore, this invention is not limited to the above embodiments and should be determine by the following claims. In particular, although the particular rear impact occupant protection system described in detail above requires all of the improvements described herein to meet the goals and objectives of this invention, some of these improvements may not be used in some applications.

Also disclosed herein is a headrest for a seat which comprises a frame attachable to the seat and a fluid-containing bag attached to the frame. The bag is structured and arranged to allow movement of the fluid within the bag to thereby alter the shape of the bag and enable the bag to conform to the head and neck of an occupant. A deformable cover may substantially surround the bag such that the bag is within the seat, i.e., an outer surface of the bag is not exposed to the atmosphere. The cover is elastically deformable in response to changes in pressure in the bag. The frame may be made of a rigid material. The bag can contain cell foam having openings (open cell foam), which in a static state, determines the shape of the bag. The fluid in the bag may be air, i.e., an airbag. To provide the elastic deformation of the cover, the cover may include stretch seams at one or more locations. Preferably, the stretch seams should be placed on the side(s) of the headrest which will contour to the shape of the occupant's head and neck upon impact. The bag may include a constraining mechanism for constraining flow of fluid from an upper portion of the headrest to a lower portion of the headrest. The constraining mechanism may comprise open cell foam possibly with channels extending in a direction from a top of the headrest to a bottom of the headrest. In the alternative, the properties of the foam may be controlled to get the desired flow rate and possibly flow direction. The constraining mechanism is structured and arranged such that when the upper portion contracts, the lower portion expands. Also, the constraining mechanism may be designed so that when the upper portion expands, the lower portion contracts. The cover and bag are structured and arranged such that when an occupant impacts the headrest, fluid within the bag flows substantially within the bag to change the shape of the bag so as to approximately conform to the head and neck of the occupant thereby providing a force on the head and neck of the occupant to substantially accelerate both the head and neck at substantially the same acceleration in order to minimize whiplash injuries. The bag preferably includes a flow restriction which permits a controlled flow of fluid out of the bag upon impact of an object with the headrest to thereby dampen the impact of the object with the headrest.

An inventive seat comprises a seat frame, a bottom cushion, a back cushion cooperating to support an occupant and a headrest attached to the seat frame. The headrest is as in any of the embodiments described immediately above.

An inventive cushioning arrangement for protecting an occupant in a crash comprises a frame coupled to the vehicle and a fluid-containing bag attached to the frame. The bag is structured and arranged to allow movement of the fluid within the bag to thereby alter the shape of the bag and enable the bag to conform to a portion of the occupant engaging the cushioning arrangement. The cushioning arrangement should be arranged relative to the occupant such that the bag impacts the occupant during the crash. As used here (and often elsewhere in this application), "impact" does not necessarily imply direct contact between the occupant and the bag but rather may be considered the exertion of pressure against the bag caused by contact of the occupant with the outer surface of the cushioning arrangement which is transmitted to the bag. The cushioning arrangement can also include a deformable cover substantially surrounding the bag. The cover is elastically deformable in response to changes in pressure in the bag. The frame may be coupled to a seat of the vehicle and extends upward from a top of the seat such that the cushioning arrangement constitutes a headrest. In the alternative, the cushioning arrangement can be used anywhere in a vehicle in a position in which the occupant will potentially impact it during the crash. The bag and headrest may be as in any of the embodiments described above.

An inventive protection system for protecting an occupant in a crash comprises an anticipatory crash sensor for determining that a crash involving the vehicle is about to occur, and a movable cushioning arrangement coupled to the anticipatory crash sensor. The cushioning arrangement is movable toward a likely position of the occupant, preferably in actual contact with the occupant, upon a determination by the anticipatory crash sensor that a crash involving the vehicle is about to occur. The cushioning arrangement comprises a frame coupled to the vehicle, and a fluid-containing bag attached to the frame. The bag is structured and arranged to allow movement of the fluid within the bag to thereby alter the shape of the bag and enable the bag to conform to the occupant. The cushioning arrangement and its parts may be as described in any of the embodiments above. The anticipatory crash sensor may be arranged to determine that the crash involving the vehicle is a rear impact. In this case, it could comprise a transmitter/receiver arrangement mounted at the rear of the vehicle. To provide for movement of the cushioning arrangement, a displacement mechanism is provided, e.g., a system of servo-motors, screws and support rods, and a control unit is coupled to the anticipatory crash sensor and the displacement mechanism. The control unit controls the displacement mechanism to move the cushioning arrangement based on the determination by the anticipatory crash sensor that a crash involving the vehicle is about to occur.

One disclosed method for protecting an occupant in an impact comprises the steps of determining that a crash involving the vehicle is about to occur, and moving a cushioning arrangement into contact with the occupant upon a determination that a crash involving the vehicle is about to occur. The cushioning arrangement comprises a frame coupled to the vehicle and a fluid-containing bag attached directly or indirectly to the frame. The bag is structured and arranged to allow movement of the fluid within the bag to thereby alter the shape of the bag and enable the bag to conform to the occupant. The cushioning arrangement may be as in any of the embodiments described above. The step of moving the cushioning arrangement into contact with the occupant may comprise the steps of moving the cushioning arrangement toward the occupant, detecting when the cushioning arrangement comes into contact with the occupant and then ceasing movement of the cushioning arrangement. The step of detecting when the cushioning arrangement comes into contact with the occupant may comprise the step of arranging a contact switch in connection with the cushioning arrangement.

Also disclosed herein is a headrest and headrest positioning system which reduce whiplash injuries from rear impacts by properly positioning the headrest behind the occupant's head either continuously, or just prior to and in anticipation of, the vehicle impact and then properly supports both the head and neck. Sensors determine the location of the occupant's head and motors move the headrest both up and down and forward and back as needed. In one implementation, the headrest is continuously adjusted to maintain a proper orientation of the headrest to the rear of the occupant's head. In another implementation, an anticipatory crash sensor, such as described in commonly owned U.S. Pat. No. 06,343,810, is used to predict that a rear impact is about to occur, in which event, the headrest is moved proximate to the occupant.

Also disclosed herein is an apparatus for determining the location of the head of the occupant in the presence of objects which obscure the head. Such an apparatus comprises a transmitter for illuminating a selective portion of the occupant and the head-obscuring objects in the vicinity of the head, a sensor system for receiving illumination reflected from or modified by the occupant and the head-obscuring objects and generating a signal representative of the distance from the sensor system to the illuminated portion of the occupant and the head-obscuring objects, a selective portion changing system for changing the illuminated portion of the occupant and the head-obscuring objects which is illuminated by the transmitter and a processor. The processor is designed to sequentially operate the selective portion changing system so as to illuminate different portions of the occupant and the head-obscuring objects, and a pattern recognition system for determining the location of the head from the signals representative of the distance from the sensor system to the different selective portions of the occupant and the head-obscuring objects. The pattern recognition system may comprise a neural network. In some embodiments of the invention, the head-obscuring objects comprise items from the class containing clothing and hair. The pattern recognition system may be arranged to determine the location of the approximate longitudinal location of the head from the headrest. If one or more airbags is mounted within the vehicle, the head location system may be designed to determine the location of the head relative to the airbag. The transmitter may comprise an ultrasonic transmitter arranged in the headrest and the sensor system may also be arranged in the headrest, possibly vertically spaced from the transmitter. In the alternative, the transmitter and sensor system may comprise a single transducer. The selective portion changing system may comprise a control module coupled to the transmitter and the sensor system and servomotors for adjusting the position of the headrest.

Illumination as used herein is any form of radiation which is introduced into a volume of which contains the head of an occupant and includes, but it is not limited to, electromagnetic radiation from below one kHz to above ultraviolet optical radiation (10$^{16}$ Hz) and ultrasonic radiation. Thus, any system, such as a capacitive system, which uses a varying electromagnetic field, or equivalently electromagnetic waves, is meant to be included by the term illumination as used herein. By reflected radiation, it is meant the radiation that is sensed by the device that comes from the volume occupied by the head, or other part, of an occupant and indicates the presence of that part of the occupant. Examples of such systems are ultrasonic transmitters and receivers placed in the headrest of the vehicle seat, capacitive sensors placed in the headrest or other appropriate location (or a combination of locations such as one plate of the capacitor being placed in the vehicle seat and the other in the headliner), radar, far or near frequency infrared, visible light, ultraviolet, etc.

14.11 Combined with SDM and Other Systems

Figure 72:
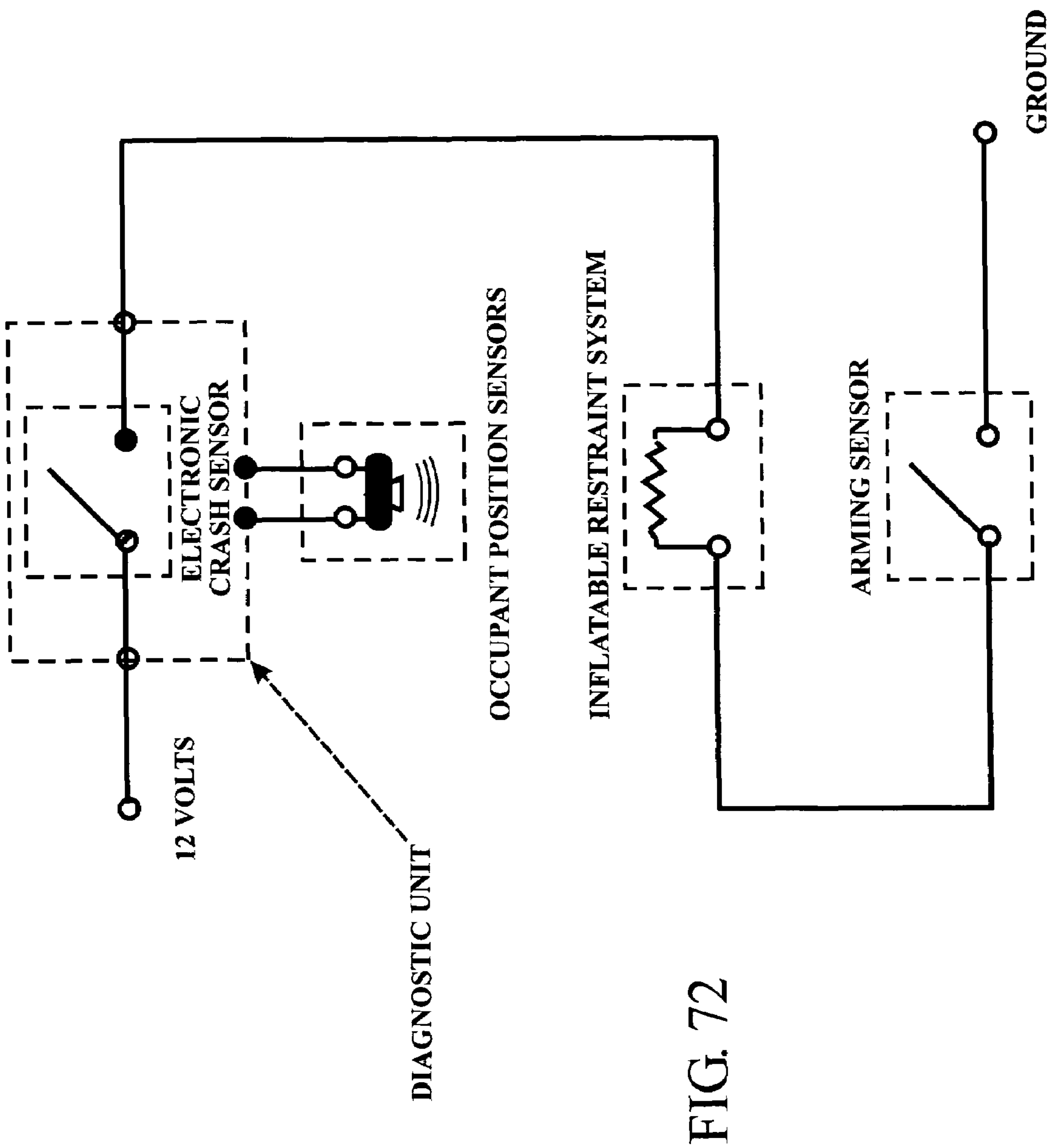
FIG. 72 is a circuit schematic illustrating the use of the vehicle interior monitoring sensor used as an occupant position sensor in conjunction with the remainder of the inflatable restraint system.

The occupant position sensor in any of its various forms is integrated into the airbag system circuitry as shown schematically in FIG. 72. In this example, the occupant position sensors are used as an input to a smart electronic sensor and diagnostic system. The electronic sensor determines whether one or more of the airbags should be deployed based on the vehicle acceleration crash pulse, or crush zone mounted crash sensors, or a combination thereof, and the occupant position sensor determines whether the occupant is too close to any of the airbags and therefore that the deployment should not take place. In FIG. 72, the electronic crash sensor located within the sensor and diagnostic unit determines whether the crash is of such severity as to require deployment of one or more of the airbags. The occupant position sensors determine the location of the vehicle occupants relative to the airbags and provide this information to the sensor and diagnostic unit that then determines whether it is safe to deploy each airbag and/or whether the deployment parameters should be adjusted. The arming sensor, if one is present, also determines whether there is a vehicle crash occurring. In such a case, if the sensor and diagnostic unit and the arming sensor both determine that the vehicle is undergoing a crash requiring one or more airbags and the position sensors determine that the occupants are safely away from the airbag(s), the airbag(s), or inflatable restraint system, is deployed.

The above applications illustrate the wide range of opportunities, which become available if the identity and location of various objects and occupants, and some of their parts, within the vehicle were known. Once the system of this invention is operational, integration with the airbag electronic sensor and diagnostics system (SDM) is likely since an interface with the SDM is necessary. This sharing of resources will result in a significant cost saving to the auto manufacturer. For the same reasons, the VIMS can include the side impact sensor and diagnostic system.

14.12 Exterior Monitoring

Figure 73:
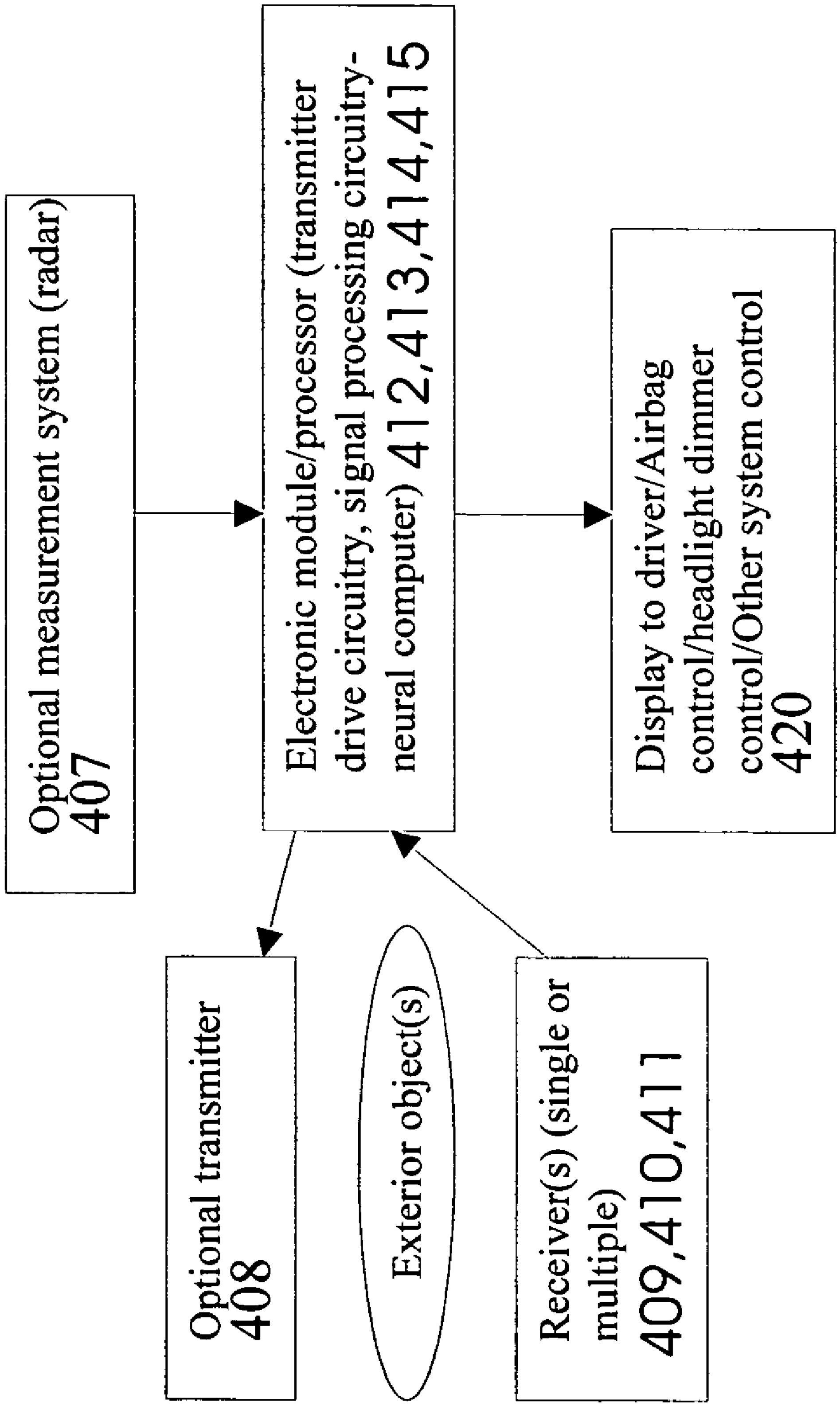
FIG. 73 is a schematic illustration of the exterior monitoring system in accordance with the invention.

Referring now to FIGS. 69 and 73, the same system can also be used for the detection of objects in the blind spots and other areas surrounding the vehicle and the image displayed for the operator to see or a warning system activated, if the operator attempts to change lanes, for example. In this case, the mounting location must be chosen to provide a good view along the side of the vehicle in order to pick up vehicles which are about to pass the subject vehicle 710. Each of the locations 408, 409 and 410 provide sufficient field of view for this application although the space immediately adjacent to the vehicle could be missed. Alternate locations include mounting onto the outside rear view mirror or the addition of a unit in the rear window or C-Pillar, in which case, the contents of areas other than the side of the vehicle would be monitored. Using several receivers in various locations as disclosed above would provide for a monitoring system which monitors all of the areas around the vehicle. The mirror location, however, does leave the device vulnerable to being covered with ice, snow and dirt.

In many cases, neural networks are used to identify objects exterior of the vehicle and then an icon can be displayed on a heads-up display, for example, which provides control over the brightness of the image and permits the driver to more easily recognize the object.

In both cases of the anticipatory sensor and blind spot detector, the infrared transmitter and imager array system provides mainly image information to permit recognition of the object in the vicinity of vehicle 710, whether the object is alongside the vehicle, in a blind spot of the driver, in front of the vehicle or behind the vehicle, the position of the object being detected being dependent on the position and orientation of the receiver(s). To complete the process, distance information is also require as well as velocity information, which can in general be obtained by differentiating the position data or by Doppler analysis. This can be accomplished by any one of the several methods discussed above, such as with a pulsed laser radar system, stereo cameras, focusing system, structured light as well as with a radar system.

Radar systems, which may not be acceptable for use in the interior of the vehicle, are now commonly used in sensing applications exterior to the vehicle, police radar being one well-known example. Miniature radar systems are now available which are inexpensive and fit within the available space. Such systems are disclosed in the McEwan patents described above. Another advantage of radar in this application is that it is easy to get a transmitter with a desirable divergence angle so that the device does not have to be aimed. One particularly advantageous mode of practicing the invention for these cases, therefore, is to use radar and a second advantageous mode is the pulsed laser radar system, along with an imager array, although the use of two such arrays or the acoustical systems are also good choices. The acoustical system has the disadvantage of being slower than the laser radar device and must be mounted outside of the vehicle where it may be affected by the accumulation of deposits onto the active surface. If a radar scanner is not available it is difficult to get an image of objects approaching the vehicle so that the can be identified. Note that the ultimate solution to monitoring of the exterior of the vehicle may lay with SWIR, MWIR and LWIR if the proper frequencies are chosen that are not heavily attenuated by fog, snow and other atmospheric systems. The QWIP system discussed above or equivalent would be a candidate if the cooling requirement can be eliminated or the cost of cooling the imaging chip reduced.

Another innovation involves the use of multiple frequencies for interrogating the environment surrounding a vehicle and in particular the space in front of the vehicle. Different frequencies interact differently with different materials. An example given by some to show that all such systems have failure modes is the case of a box that in one case contains a refrigerator while in another case a box of the same size that is empty. It is difficult to imagine how such boxes can reside on a roadway in front of a traveling vehicle but perhaps it fell off of a truck. Using optics it would be difficult if not impossible to make the distinction, however, some frequencies will penetrate a cardboard box exposing the refrigerator. One might ask, what happens if the box is made of metal? So there will always be rare cases where a distinction cannot be made. Nevertheless, a calculation can be made of the cost and benefits to be derived by fielding such a system that might occasionally make a mistake or, better, defaults to no system when it is in doubt.

In a preferred implementation, transmitter 408 is an infrared transmitter and receivers 409, 410 and 411 are CMOS transducers that receive the reflected infrared waves from vehicle 406. In the implementation shown in FIG. 69, an exterior airbag 416 is shown which deploys in the event that a side impact is about to occur as described in U.S. Pat. No. 06,343,810.

Referring now to FIG. 73, a schematic of the use of one or more receivers 409, 410, 411 to affect another system in the vehicle is shown. The general exterior monitoring system, or blind spot monitoring system if the environment exterior of the vehicle is not viewable by the driver in the normal course of driving the vehicle, includes one or more receivers 409, 410, 411 positioned at various locations on the vehicle for the purpose of receiving waves from the exterior environment. Instead of waves, and to the extent different than waves, the receivers 409, 410, 411 could be designed to receiver energy or radiation.

The waves received by receivers 409, 410, 411 contain information about the exterior objects in the environment, such waves either having been generated by or emanating from the exterior objects or reflected from the exterior objects such as is the case when the optional transmitter 408 is used. The electronic module/processor 412 contains the necessary circuitry 413,414 and a trained pattern recognition system (e.g., neural computer 415) to drive the transmitter 408 when present and process the received waves to provide a classification, identification and/or location of the exterior object. The classification, identification and/or location is then used to show an image on a display 420 viewable to the driver. Also, the classification, identification or location of the objects could be used for airbag control, i.e., control of the deployment of the exterior airbag 416 (or any other airbags for that matter), for the control of the headlight dimmers (as discussed elsewhere herein with reference to 74 or in general, for any other system whose operation might be changed based on the presence of exterior objects.

Figure 75:
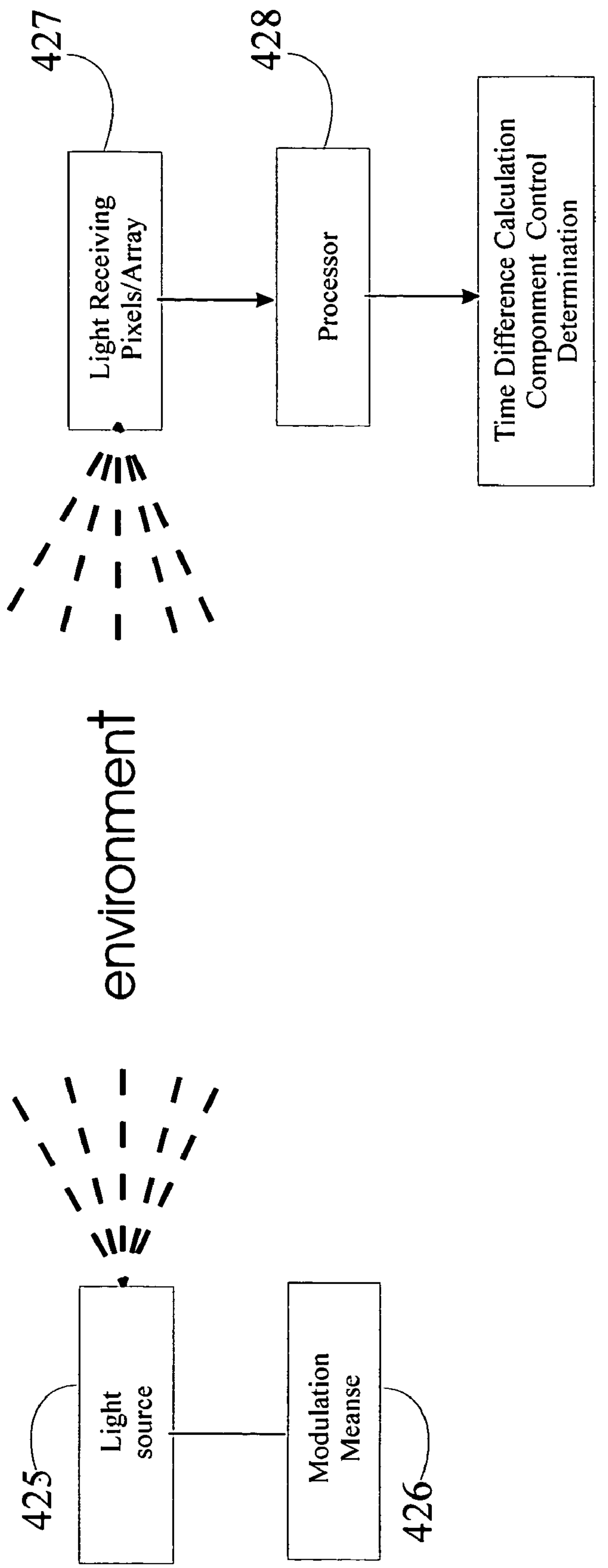
FIG. 75 is a schematic illustration of the position measuring in accordance with the invention.

FIG. 75 shows the components for measuring the position of an object in an environment of or about the vehicle. A light source 425 directs modulated light into the environment and at least one light-receiving pixel or an array of pixels 427 receives the modulated light after reflection by any objects in the environment. A processor 428 determines the distance between any objects from which the modulated light is reflected and the light source based on the reception of the modulated light by the pixel(s) 427. To provide the modulated light, a device or component for modulating a frequency of the light 426 are provided. Also, a device for providing a correlation pattern in a form of code division modulation of the light can be used. The pixel may be a photo diode such as a PfN or avalanche diode.

The processor 428 includes appropriate circuitry to determine the distance between any objects from which any pulse of light is reflected and the light source 425. For example, the processor 428 can determine this distance based on a difference in time between the emission of a pulse of light by the light source 425 and the reception of light by the pixel 427.

Figure 74:
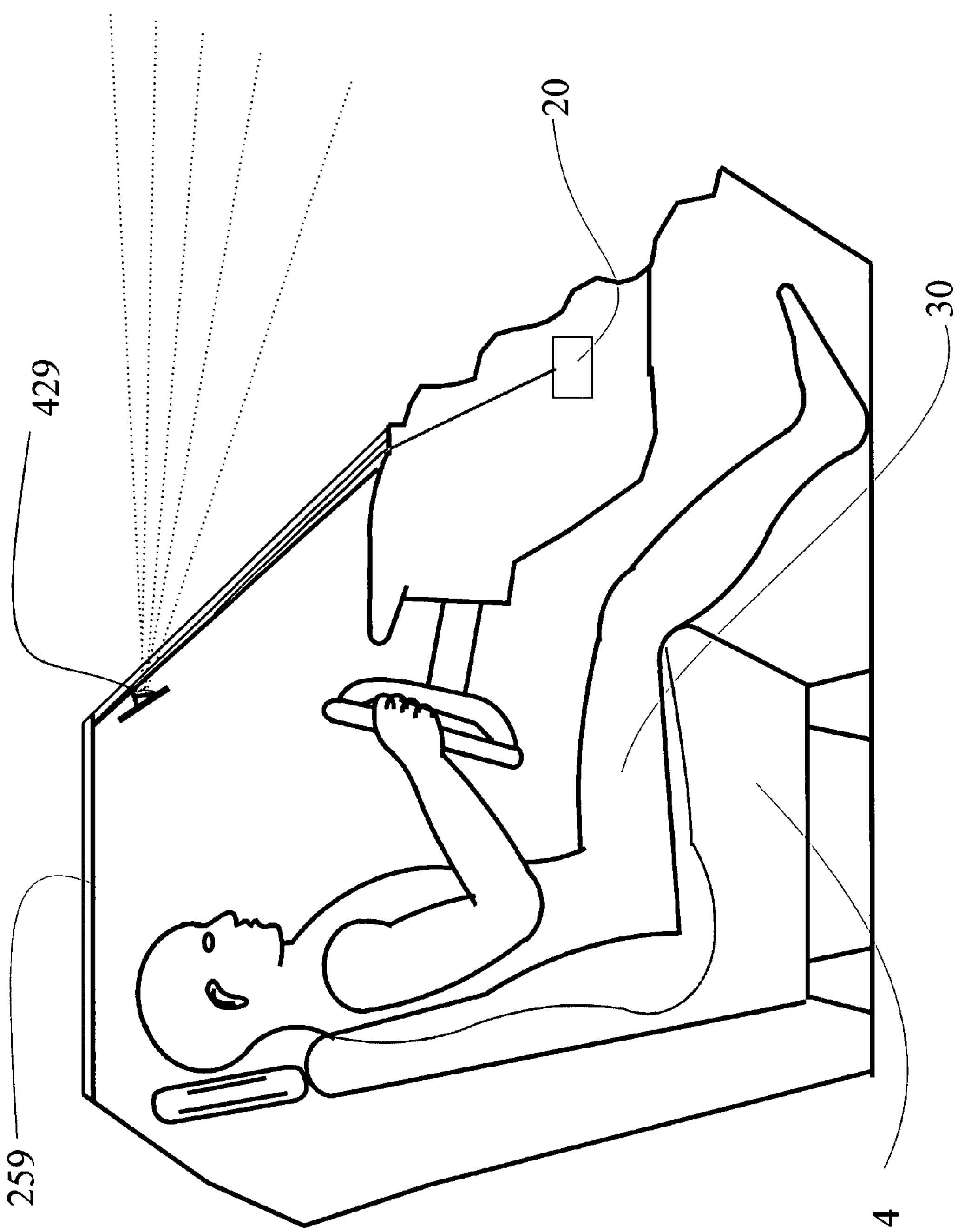
FIG. 74 is a side planar view, with certain portions removed or cut away, of a portion of the passenger compartment illustrating a sensor for sensing the headlights of an oncoming vehicle and/or the taillights of a leading vehicle used in conjunction with an automatic headlight dimming system.

FIG. 74 illustrates the exterior monitoring system for use in detecting the headlights of an oncoming vehicle or the taillights of a vehicle in front of vehicle 259. In this embodiment, the imager array 429 is designed to be sensitive to visible light and a separate source of illumination is not used. Once again for some applications, the key to this technology is the use of trained pattern recognition algorithms and particularly the artificial neural network. Here, as in the other cases above and in the patents and patent applications referenced above, the pattern recognition system is trained to recognize the pattern of the headlights of an oncoming vehicle or the tail lights of a vehicle in front of vehicle 259 and to then dim the headlights when either of these conditions is sensed. It is also trained to not dim the lights for other reflections such as reflections off of a sign post or the roadway. One problem is to differentiate taillights where dimming is desired from distant headlights where dimming is not desired. Three techniques are used: (i) measurement of the spacing of the light sources, (ii) determination of the location of the light sources relative to the vehicle, and (iii) use of a red filter where the brightness of the light source through the filter is compared with the brightness of the unfiltered light. In the case of the taillight, the brightness of the red filtered and unfiltered light is nearly the same while there is a significant difference for the headlight case. In this situation, either two CCD arrays are used, one with a filter, or a filter which can be removed either electrically, such as with a liquid crystal, or mechanically.

The environment surrounding the vehicle can be determined using an interior mounted camera that looks out of the vehicle. The status of the sun (day or night), the presence of rain, fog, snow, etc can thus be determined.

15. Summary 15.1 Classification, Location and Identification

One embodiment of the interior monitoring system in accordance with the invention comprises a device for irradiating at least a portion of the passenger compartment in which an occupying item is situated, a receiver system for receiving radiation from the occupying item, e.g., a plurality of receivers, each arranged at a discrete location, a processor coupled to the receivers for processing the received radiation from each receiver in order to create a respective electronic signal characteristic of the occupying item based on the received radiation, each signal containing a pattern representative of the occupying item, a categorization unit coupled to the processor for categorizing the signals, and an output device coupled to the categorization unit for affecting another system within the vehicle based on the categorization of the signals characteristic of the occupying item. The categorization unit may use a pattern recognition technique for recognizing and thus identifying the class of the occupying item by processing the signals into a categorization thereof based on data corresponding to patterns of received radiation and associated with possible classes of occupying items of the vehicle. Each signal may comprise a plurality of data, all of which is compared to the data corresponding to patterns of received radiation and associated with possible classes of contents of the vehicle. In one specific embodiment, the system includes a location determining unit coupled to the processor for determining the location of the occupying item, e.g., based on the received radiation such that the output device coupled to the location determining unit, in addition to affecting the other system based on the categorization of the signals characteristic of the occupying item, affects the system based on the determined location of the occupying item. In another embodiment to determine the presence or absence of an occupant, the categorization unit comprises a pattern recognition system for recognizing the presence or absence of an occupying item in the passenger compartment by processing each signal into a categorization thereof signal based on data corresponding to patterns of received radiation and associated with possible occupying items of the vehicle and the absence of such occupying items.

In a disclosed method for determining the occupancy of a seat in a passenger compartment of a vehicle in accordance with the invention, waves such as ultrasonic or electromagnetic waves are transmitted into the passenger compartment toward the seat, reflected waves from the passenger compartment are received by a component which then generates an output representative thereof, the weight applied onto the seat is measured and an output is generated representative thereof and then the seated-state of the seat is evaluated based on the outputs from the sensors and the weight measuring unit. The evaluation the seated-state of the seat may be accomplished by generating a function correlating the outputs representative of the received reflected waves and the measured weight and the seated-state of the seat, and incorporating the correlation function into a microcomputer. In the alternative, it is possible to generate a function correlating the outputs representative of the received reflected waves and the measured weight and the seated-state of the seat in a neural network, and execute the function using the outputs representative of the received reflected waves and the measured weight as input into the neural network. To enhance the seated-state determination, the position of a seat track of the seat is measured and an output representative thereof is generated, and then the seated-state of the seat is evaluated based on the outputs representative of the received reflected waves, the measured weight and the measured seat track position. In addition to or instead of measuring the seat track position, it is possible to measure the reclining angle of the seat, i.e., the angle between the seat portion and the back portion of the seat, and generate an output representative thereof, and then evaluate the seated-state of the seat based on the outputs representative of the received reflected waves, the measured weight and the measured reclining angle of the seat (and seat track position, if measured). Furthermore, the output representative of the measured weight may be compared with a reference value, and the occupying object of the seat identified, e.g., as an adult or a child, based on the comparison of the measured weight with the reference value.

In another method disclosed above for determining the identification and position of objects in a passenger compartment of a vehicle in accordance with the invention, electromagnetic waves are transmitted into the passenger compartment from one or more locations, a plurality of images of the interior of the passenger compartment are obtained, each from a respective location, a three-dimensional map of the interior of the passenger compartment is created from the images, and a pattern recognition technique is applied to the map in order to determine the identification and position of the objects in the passenger compartment. The pattern recognition technique may be a neural network, fuzzy logic or an optical correlator or combinations thereof. The map may be obtained by utilizing a scanning laser radar system where the laser is operated in a pulse mode and determining the distance from the object being illuminated using range gating. (See, for example, H. Kage, W. Freemen, Y Miyke, E. Funstsu, K. Tanaka, K. Kyuma "Artificial retina chips as on-chip image processors and gesture-oriented interfaces", Optical Engineering, December, 1999, Vol. 38, Number 12, ISSN 0091-3286)

Also, disclosed above is a system to identify, locate and monitor occupants, including their parts, and other objects in the passenger compartment and objects outside of a motor vehicle, such as an automobile or truck, by illuminating the contents of the vehicle and/or objects outside of the vehicle with electromagnetic radiation, and specifically infrared radiation, using natural illumination such as from the sun, or using radiation naturally emanating from the object, and using one or more lenses to focus images of the contents onto one or more arrays of charge coupled devices (CCD's), CMOS or equivalent arrays. Outputs from the arrays are analyzed by appropriate computational devices employing trained pattern recognition technologies, to classify, identify or locate the contents and/or external objects. In general, the information obtained by the identification and monitoring system may be used to affect the operation of at least one other system in the vehicle.

In some implementations of the invention, several CCD, CMOS or equivalent arrays are placed in such a manner that the distance from, and the motion of the occupant toward, the airbag can be monitored as a transverse motion across the field of the array. In this manner, the need to measure the distance from the array to the object is obviated. In other implementations, the source of infrared light is a pulse modulated laser which permits an accurate measurement of the distance to the point of reflection through the technique of range gating to measure the time of flight of the radiation pulse.

In some applications, a trained pattern recognition system, such as a neural network, sensor fusion or neural-fuzzy system is used to identify the occupancy of the vehicle or an object exterior to the vehicle. In some of these cases, the pattern recognition system determines which of a library of images most closely matches the seated state of a particular vehicle seat and thereby the location of certain parts of an occupant can be accurately estimated from dated stored relating to the matched images, thus removing the requirement for the pattern recognition system to locate the head of an occupant, for example.

In yet another embodiment of the invention, the system for determining the occupancy state of a seat in a vehicle includes a plurality of transducers including at least two wave-receiving or electric field transducers arranged in the vehicle, each providing data relating to the occupancy state of the seat. One wave-receiving or electric field transducer is arranged on or adjacent to a ceiling of the vehicle and a second wave-receiving or electric field transducer is arranged at a different location in the vehicle such that an axis connecting these transducers is substantially parallel to a longitudinal axis of the vehicle, substantially parallel to a transverse axis of the vehicle or passes through a volume above the seat. A processor is coupled to the transducers for receiving data from the transducers and processing the data to obtain an output indicative of the current occupancy state of the seat. The processor comprises an algorithm which produces the output indicative of the current occupancy state of the seat upon inputting a data set representing the current occupancy state of the seat and being formed from data from the transducers.

Another measuring position arrangement comprises a light source capable of directing individual pulses of light into the environment, at least one array of light-receiving pixels arranged to receive light after reflection by any objects in the environment and a processor for determining the distance between any objects from which any pulse of light is reflected and the light source based on a difference in time between the emission of a pulse of light by the light source and the reception of light by the array. The light source can be arranged at various locations in the vehicle as described above to direct light into external and/or internal environments, relative to the vehicle.

The portion of the apparatus which includes the ultrasonic, optical or electromagnetic sensors, weight measuring unit and processor which evaluate the occupancy of the seat based on the measured weight of the seat and its contents and the returned waves from the ultrasonic, optical or electromagnetic sensors may be considered to constitute a seated-state detecting unit. The seated-state detecting unit may further comprise a seat track position-detecting sensor. This sensor determines the position of the seat on the seat track in the forward and aft direction. In this case, the evaluation circuit evaluates the seated-state, based on a correlation function obtain from outputs of the ultrasonic sensors, an output of the one or more weight sensors, and an output of the seat track position detecting sensor. With this structure, there is the advantage that the identification between the flat configuration of a detected surface in a state where a passenger is not sitting in the seat and the flat configuration of a detected surface which is detected when a seat is slid backwards by the amount of the thickness of a passenger, that is, of identification of whether a passenger seat is vacant or occupied by a passenger, can be reliably performed. Furthermore, the seated-state detecting unit may also comprise a reclining angle detecting sensor, and the evaluation circuit may also evaluate the seated-state based on a correlation function obtained from outputs of the ultrasonic, optical or electromagnetic sensors, an output of the weight sensor(s), and an output of the reclining angle detecting sensor. In this case, if the tilted angle information of the back portion of the seat is added as evaluation information for the seated-state, identification can be clearly performed between the flat configuration of a surface detected when a passenger is in a slightly slouching state and the configuration of a surface detected when the back portion of a seat is slightly tilted forward and similar difficult-to-discriminate cases. This embodiment may even be combined with the output from a seat track position-detecting sensor to further enhance the evaluation circuit. Moreover, the seated-state detecting unit may further comprise a comparison circuit for comparing the output of the weight sensor(s) with a reference value. In this case, the evaluation circuit identifies an adult and a child based on the reference value. Preferably, the seated-state detecting unit comprises: a plurality of ultrasonic, optical or electromagnetic sensors for transmitting ultrasonic or electromagnetic waves toward a seat and receiving reflected waves from the seat; one or more weight sensors for detecting weight of a passenger in the seat; a seat track position detecting sensor; a reclining angle detecting sensor; and a neural network to which outputs of the ultrasonic or electromagnetic sensors and the weight sensor(s), an output of the seat track position detecting sensor, and an output of the reclining angle detecting sensor are inputted and which evaluates several kinds of seated-states, based on a correlation function obtained from the outputs. The kinds of seated-states that can be evaluated and categorized by the neural network include the following categories, among others, (i) a normally seated passenger and a forward facing child seat, (ii) an abnormally seated passenger and a rear-facing child seat, and (iii) a vacant seat. The seated-state detecting unit may further comprise a comparison circuit for comparing the output of the weight sensor(s) with a reference value and a gate circuit to which the evaluation signal and a comparison signal from the comparison circuit are input. This gate circuit, which may be implemented in software or hardware, outputs signals which evaluates several kinds of seated-states. These kinds of seated-states can include a (i) normally seated passenger, (ii) a forward facing child seat, (iii) an abnormally seated passenger, (iv) a rear facing child seat, and (v) a vacant seat. With this arrangement, the identification between a normally seated passenger and a forward facing child seat, the identification between an abnormally seated passenger and a rear facing child seat, and the identification of a vacant seat can be more reliably performed. The outputs of the plurality of ultrasonic or electromagnetic sensors, the output of the weight sensor(s), the outputs of the seat track position detecting sensor, and the outputs of the reclining angle detecting sensor are inputted to the neural network or other pattern recognition circuit, and the neural network determines the correlation function, based on training thereof during a training phase. The correlation function is then typically implemented in or incorporated into a microcomputer. For the purposes herein, neural network will be used to include both a single neural network, a plurality of neural networks, and other similar pattern recognition circuits or algorithms and combinations thereof including the combination of neural networks and fuzzy logic systems such as neural-fuzzy systems. To provide the input from the ultrasonic or electromagnetic sensors to the neural network, it is preferable that an initial reflected wave portion and a last reflected wave portion are removed from each of the reflected waves of the ultrasonic or electromagnetic sensors and then the output data is processed. This is a form of range gating. With this arrangement, the portions of the reflected ultrasonic or electromagnetic wave that do not contain useful information are removed from the analysis and the presence and recognition of an object on the passenger seat can be more accurately performed. The neural network determines the correlation function by performing a weighting process, based on output data from the plurality of ultrasonic or electromagnetic sensors, output data from the weight sensor(s), output data from the seat track position detecting sensor if present, and/or on output data from the reclining angle detecting sensor if present. Additionally, in advanced systems, outputs from the heartbeat and occupant motion sensors may be included.

One method described above for determining the identification and position of objects in a passenger compartment of a vehicle in accordance with the invention comprises the steps of transmitting electromagnetic waves (optical or non-optical) into the passenger compartment from one or more locations, obtaining a plurality of images of the interior of the passenger compartment from several locations, and comparing the images of the interior of the passenger compartment with stored images representing different arrangements of objects in the passenger compartment, such as by using a neural network, to determine which of the stored images match most closely to the images of the interior of the passenger compartment such that the identification of the objects and their position is obtained based on data associated with the stored images. The electromagnetic waves may be transmitted from transmitter/receiver assemblies positioned at different locations around a seat such that each assembly is situated near a middle of a side of the ceiling surrounding the seat or near the middle of the headliner directly above the seat. The method would thus be operative to determine the identification and/or position of the occupants of that seat. Each assembly may comprise an optical transmitter (such as an infrared LED, an infrared LED with a diverging lens, a laser with a diverging lens and a scanning laser assembly) and an optical array (such as a CCD array and a CMOS array). The optical array is thus arranged to obtain the images of the interior of the passenger compartment represented by a matrix of pixels.

To enhance the method, prior to the comparison of the images, each obtained image or output from each array may be compared with a series of stored images or arrays representing different unoccupied states of the passenger compartment, such as different positions of the seat when unoccupied, and each stored image or array is subtracted from the obtained image or acquired array. Another way to determine which stored image matches most closely to the images of the interior of the passenger compartment is to analyze the total number of pixels of the image reduced below a threshold level, and analyze the minimum number of remaining detached pixels. Preferably, a library of stored images is generated by positioning an object on the seat, transmitting electromagnetic waves into the passenger compartment from one or more locations, obtaining images of the interior of the passenger compartment, each from a respective location, associating the images with the identification and position of the object, and repeating the positioning step, transmitting step, image obtaining step and associating step for the same object in different positions and for different objects in different positions. If the objects include a steering wheel, a seat and a headrest, the angle of the steering wheel, the telescoping position of the steering wheel, the angle of the back of the seat, the position of the headrest and the position of the seat may be obtained by the image comparison.

One advantage of this implementation is that after the identification and position of the objects are obtained, one or more systems in the vehicle, such as an occupant restraint device or system, a mirror adjustment system, a seat adjustment system, a steering wheel adjustment system, a pedal adjustment system, a headrest positioning system, a directional microphone, an air-conditioning/heating system, an entertainment system, may be affected based on the obtained identification and position of at least one of the objects.

The image comparison may entail inputting the images or a form thereof into a neural network which provides for each image of the interior of the passenger compartment, an index of a stored image that most closely matches the image of the interior of the passenger compartment. The index is thus utilized to locate stored information from the matched image including, inter alia, a locus of a point representative of the position of the chest of the person, a locus of a point representative of the position of the head of the person, one or both ears of the person, one or both eyes of the person and the mouth of the person. Moreover, the position of the person relative to at least one airbag or other occupant restraint system of the vehicle may be determined so that deployment of the airbag(s) or occupant restraint system is controlled based on the determined position of the person. It is also possible to obtain information about the location of the eyes of the person from the image comparison and adjust the position of one or more of the rear view mirrors based on the location of the eyes of the person. Also, the location of the eyes of the person may be obtained such that an external light source may be filtered by darkening the windshield of the vehicle at selective locations based on the location of the eyes of the person. Further, the location of the ears of the person may be obtained such that a noise cancellation system in the vehicle is operated based on the location the ears of the person. The location of the mouth of the person may be used to direct a directional microphone in the vehicle. In addition, the location of the locus of a point representative of the position of the chest or head (e.g., the probable center of the chest or head) over time may be monitored by the image comparison and one or more systems in the vehicle controlled based on changes in the location of the locus of the center of the chest or head over time. This monitoring may entail subtracting a most recently obtained image from an immediately preceding image and analyzing a leading edge of changes in the images or deriving a correlation function which correlates the images with the chest or head in an initial position with the most recently obtained images. In one particularly advantageous embodiment, the weight applied onto the seat is measured and one or more systems in the vehicle are affected (controlled) based on the measured weight applied onto the seat and the identification and position of the objects in the passenger compartment.

Also disclosed above is an arrangement for determining vehicle occupant position relative to a fixed structure within the vehicle which comprises an array structured and arranged to receive an image of a portion of the passenger compartment of the vehicle in which the occupant is likely to be situated, a lens arranged between the array and the portion of the passenger compartment, an adjustment unit for changing the image received by the array, and a processor coupled to the array and the adjustment unit. The processor determines, upon changing by the adjustment unit of the image received by the array, when the image is clearest whereby a distance between the occupant and the fixed structure is obtainable based on the determination by the processor when the image is clearest. The image may be changed by adjusting the lens, e.g., adjusting the focal length of the lens and/or the position of the lens relative to the array, by adjusting the array, e.g., the position of the array relative to the lens, and/or by using software to perform a focusing process. The array may be arranged in several advantageous locations on the vehicle, e.g., on an A-pillar of the vehicle, above a top surface of an instrument panel of the vehicle and on an instrument panel of the vehicle and oriented to receive an image reflected by a windshield of the vehicle. The array may be a CCD array with an optional liquid crystal or electrochromic glass filter coupled to the array for filtering the image of the portion of the passenger compartment. The array could also be a CMOS array. In a preferred embodiment, the processor is coupled to an occupant protection device and controls the occupant protection device based on the distance between the occupant and the fixed structure. For example, the occupant protection device could be an airbag whereby deployment of the airbag is controlled by the processor. The processor may be any type of data processing unit such as a microprocessor. This arrangement could be adapted for determining distance between the vehicle and exterior objects, in particular, objects in a blind spot of the driver. In this case, such an arrangement would comprise an array structured and arranged to receive an image of an exterior environment surrounding the vehicle containing at least one object, a lens arranged between the array and the exterior environment, an adjustment unit for changing the image received by the array, and a processor coupled to the array and the adjustment unit. The processor determines, upon changing by the adjustment unit of the image received by the array, when the image is clearest whereby a distance between the object and the vehicle is obtainable based on the determination by the processor when the image is clearest. As before, the image may be changed by adjusting the lens, e.g., adjusting the focal length of the lens and/or the position of the lens relative to the array, by adjusting the array, e.g., the position of the array relative to the lens, and/or by using software to perform a focusing process. The array may be a CCD array with an optional liquid crystal or electrochromic glass filter coupled to the array for filtering the image of the portion of the passenger compartment. The array could also be a CMOS array. In a preferred embodiment, the processor is coupled to an occupant protection device and control the occupant protection device based on the distance between the occupant and the fixed structure. For example, the occupant protection device could be an airbag whereby deployment of the airbag is controlled by the processor. The processor may be any type of data processing unit such as a microprocessor.

At least one of the above-listed objects is achieved by an arrangement for determining vehicle occupant presence, type and/or position relative to a fixed structure within the vehicle, the vehicle having a front seat and an A-pillar. The arrangement comprises a first array mounted on the A-pillar of the vehicle and arranged to receive an image of a portion of the passenger compartment in which the occupant is likely to be situated, and a processor coupled to the first array for determining the presence, type and/or position of the vehicle occupant based on the image of the portion of the passenger compartment received by the first array. The processor preferably is arranged to utilize a pattern recognition technique, e.g., a trained neural network, sensor fusion, fuzzy logic. The processor can determine the vehicle occupant presence, type and/or position based on the image of the portion of the passenger compartment received by the first array. In some embodiments, a second array is arranged to receive an image of at least a part of the same portion of the passenger compartment as the first array. The processor is coupled to the second array and determine the vehicle occupant presence, type and/or position based on the images of the portion of the passenger compartment received by the first and second arrays. The second array may be arranged at a central portion of a headliner of the vehicle between sides of the vehicle. The determination of the occupant presence, type and/or position can be used in conjunction with a reactive component, system or subsystem so that the processor controls the reactive component, system or subsystem based on the determination of the occupant presence, type and/or position. For example, if the reactive component, system or subsystem is an airbag assembly including at least one airbag, the processor controls one or more deployment parameters of the airbag(s). The arrays may be CCD arrays with an optional liquid crystal or electrochromic glass filter coupled to the array for filtering the image of the portion of the passenger compartment. The arrays could also be CMOS arrays, active pixel cameras and HDRC cameras.

Another embodiment disclosed above is an arrangement for obtaining information about a vehicle occupant within the vehicle which comprises a transmission unit for transmitting a structured pattern of light, e.g., polarized light, a geometric pattern of dots, lines etc., into a portion of the passenger compartment in which the occupant is likely to be situated, an array arranged to receive an image of the portion of the passenger compartment, and a processor coupled to the array for analyzing the image of the portion of the passenger compartment to obtain information about the occupant. The transmission unit and array are proximate but not co-located one another and the information obtained about the occupant is a distance from the location of the transmission unit and the array. The processor obtains the information about the occupant utilizing a pattern recognition technique. The information about of the occupant can be used in conjunction with a reactive component, system or subsystem so that the processor controls the reactive component, system or subsystem based on the determination of the occupant presence, type and/or position. For example, if the reactive component, system or subsystem is an airbag assembly including at least one airbag, the processor controls one or more deployment parameters of the airbag(s).

In another method disclosed above for determining the identification and position of objects in a passenger compartment of a vehicle, a plurality of images of the interior of the passenger compartment, each from a respective location and of radiation emanating from the objects in the passenger compartment, and the images of the radiation emanating from the objects in the passenger compartment are compared with data representative of stored images of radiation emanating from different arrangements of objects in the passenger compartment to determine which of the stored images match most closely to the images of the interior of the passenger compartment such that the identification of the objects and their position is obtained based on data associated with the stored images. In this embodiment, there is no illumination of the passenger compartment with electromagnetic waves. Nevertheless, the same processes described above may be applied in conjunction with this method, e.g., affecting another system based on the position and identification of the objects, a library of stored images generated, external light source filtering, noise filtering, occupant restraint system deployment control and the possible utilization of weight for occupant restraint system control.

Also disclosed above is a system for determining occupancy of a vehicle which comprises a radar system for emitting radio waves into an interior of the vehicle in which objects might be situated and receiving radio waves and a processor coupled to the radar system for determining the presence of any repetitive motions indicative of a living occupant in the vehicle based on the radio waves received by the radar system such that the presence of living occupants in the vehicle is ascertainable upon the determination of the presence of repetitive motions indicative of a living occupant. Repetitive motions indicative of a living occupant may be a heartbeat or breathing as reflected by movement of the chest. Thus, for example, the processor may be programmed to analyze the frequency of the repetitive motions based on the radio waves received by the radar system whereby a frequency in a predetermined range is indicative of a heartbeat or breathing. The processor could also be designed to analyze motion only at particular locations in the vehicle in which a chest of any occupants would be located whereby motion at the particular locations is indicative of a heartbeat or breathing. Enhancements of the invention include the provision of a unit for determining locations of the chest of any occupants whereby the radar system is adjusted based on the determined location of the chest of any occupants. The radar system may be a micropower impulse radar system which monitors motion at a set distance from the radar system, i.e., utilize range-gating techniques. The radar system can be positioned to emit radio waves into a passenger compartment or trunk of the vehicle and/or toward a seat of the vehicle such that the processor determines whether the seats are occupied by living beings. Another enhancement would be to couple a reactive system to the processor for reacting to the determination by the processor of the presence of any repetitive motions. Such a reactive system might be an air connection device for providing or enabling air flow between the interior of the vehicle and the surrounding environment, if the presence of living beings is detected in a closed interior space. The reactive system could also be a security system for providing a warning. In one particularly useful embodiment, the radar system emits radio waves into a trunk of the vehicle and the reactive system is a trunk release for opening the trunk. The reactive system could also be airbag system which is controlled based on the determined presence of repetitive motions in the vehicle and a window opening system for opening a window associated with the passenger compartment.

A method for determining occupancy of the vehicle disclosed above comprises the steps of emitting radio waves into an interior of the vehicle in which objects might be situated, receiving radio waves after interaction with any objects and determining the presence of any repetitive motions indicative of a living occupant in the vehicle based on the received radio waves such that the presence of living occupants in the vehicle is ascertainable upon the determination of the presence of repetitive motions indicative of a living occupant. Determining the presence of any repetitive motions can entail analyzing the frequency of the repetitive motions based on the received radio waves whereby a frequency in a predetermined range is indicative of a heartbeat or breathing and/or analyzing motion only at particular locations in the vehicle in which a chest of any occupants would be located whereby motion at the particular locations is indicative of a heartbeat or breathing. If the locations of the chest of any occupants are determined, the emission of radio waves can be adjusted based thereon. A radio wave emitter and receiver can be arranged to emit radio waves into a passenger compartment of the vehicle. Upon a determination of the presence of any occupants in the vehicle, air flow between the interior of the vehicle and the surrounding environment can be enabled or provided. A warning can also be provided upon a determination of the presence of any occupants in the vehicle. If the radio wave emitter and receiver emit radio waves into a trunk of the vehicle, the trunk can be designed to automatically open upon a determination of the presence of any occupants in the trunk to thereby prevent children or pets from suffocating if inadvertently left in the trunk. In a similar manner, if the radio wave emitter and receiver emits radio waves into a passenger compartment of the vehicle, a window associated with the passenger compartment can be automatically opened upon a determination of the presence of any occupants in the passenger compartment to thereby prevent people or pets from suffocating if the temperature of the air in the passenger compartment rises to an dangerous level.

Also disclosed above is a vehicle including a monitoring arrangement for monitoring an environment of the vehicle which comprises at least one active pixel camera for obtaining images of the environment of the vehicle and a processor coupled to the active pixel camera(s) for determining at least one characteristic of an object in the environment based on the images obtained by the active pixel camera(s). The active pixel camera can be arranged in a headliner, roof or ceiling of the vehicle to obtain images of an interior environment of the vehicle, in an A-pillar or B-pillar of the vehicle to obtain images of an interior environment of the vehicle, or in a roof, ceiling, B-pillar or C-pillar of the vehicle to obtain images of an interior environment of the vehicle behind a front seat of the vehicle. These mounting locations are exemplary only and not limiting.

The determined characteristic can be used to enable optimal control of a reactive component, system or subsystem coupled to the processor. When the reactive component is an airbag assembly including at least one airbag, the processor can be designed to control at least one deployment parameter of the airbag(s).

15.2 Control of Passive Restraints

When the vehicle interior monitoring system in accordance with some embodiments of this invention is installed in the passenger compartment of an automotive vehicle equipped with a passenger protective device, such as an inflatable airbag, and the vehicle is subjected to a crash of sufficient severity that the crash sensor has determined that the protective device is to be deployed, the system determines the position of the vehicle occupant relative to the airbag and disables deployment of the airbag if the occupant is positioned so that he/she is likely to be injured by the deployment of the airbag. In the alternative, the parameters of the deployment of the airbag can be tailored to the position of the occupant relative to the airbag, e.g., a depowered deployment.

One method for controlling deployment of an airbag from an airbag module comprising the steps of determining the position of the occupant or a part thereof, and controlling deployment of the airbag based on the determined position of the occupant or part thereof. The position of the occupant or part thereof is determined as in the arrangement described above.

Another method for controlling deployment of an airbag comprises the steps of determining whether an occupant is present in the seat, and controlling deployment of the airbag based on the presence or absence of an occupant in the seat. The presence of the occupant, and optionally position of the occupant or a part thereof, are determined as in the arrangement described above.

Other embodiments disclosed above are directed to methods and arrangements for controlling deployment of an airbag. One exemplifying embodiment of an arrangement for controlling deployment of an airbag from an airbag module to protect an occupant in a seat of a vehicle in a crash comprises a determining unit for determining the position of the occupant or a part thereof, and a control unit coupled to the determining unit for controlling deployment of the airbag based on the determined position of the occupant or part thereof. The determining unit may comprise a receiver system, e.g., a wave-receiving transducer such as an electromagnetic wave receiver (such as a CCD, CMOS, capacitor plate or antenna) or an ultrasonic transducer, for receiving waves from a space above a seat portion of the seat and a processor coupled to the receiver system for generating a signal representative of the position of the occupant or part thereof based on the waves received by the receiver system. The determining unit can include a transmitter for transmitting waves into the space above the seat portion of the seat which are receivable by the receiver system. The receiver system may be mounted in various positions in the vehicle, including in a door of the vehicle, in which case, the distance between the occupant and the door would be determined, i.e., to determine whether the occupant is leaning against the door, and possibly adjacent the airbag module if it is situated in the door, or elsewhere in the vehicle. The control unit is designed to suppress deployment of the airbag, control the time at which deployment of the airbag starts, control the rate of gas flow into the airbag, control the rate of gas flow out of the airbag and/or control the rate of deployment of the airbag.

Another arrangement for controlling deployment of an airbag comprises a determining unit for determining whether an occupant is present in the seat, and a control unit coupled to the determining unit for controlling deployment of the airbag based on whether an occupant is present in the seat, e.g., to suppress deployment if the seat is unoccupied. The determining unit may comprise a receiver system, e.g., a wave-receiving transducer such as an ultrasonic transducer, CCD, CMOS, capacitor plate, capacitance sensor or antenna, for receiving waves from a space above a seat portion of the seat and a processor coupled to the receiver system for generating a signal representative of the presence or absence of an occupant in the seat based on the waves received by the receiver system. The determining unit may optionally include a transmitter for transmitting waves into the space above the seat portion of the seat which are receivable by the receiver system. Further, the determining unit may be designed to determine the position of the occupant or a part thereof when an occupant is in the seat in which case, the control unit is arranged to control deployment of side airbag based on the determined position of the occupant or part thereof.

A method disclosed above for controlling deployment of an occupant restraint system in a vehicle comprises the steps of transmitting electromagnetic waves toward an occupant seated in a passenger compartment of the vehicle from one or more locations, obtaining a plurality of images of the interior of the passenger compartment, each from a respective location, analyzing the images to determine the distance between the occupant and the occupant restraint system, and controlling deployment of the occupant restraint system based on the determined distance between the occupant and the occupant restraint system. The images may be analyzed by comparing data from the images of the interior of the passenger compartment with data from stored images representing different arrangements of objects in the passenger compartment to determine which of the stored images match most closely to the images of the interior of the passenger compartment, each stored image having associated data relating to the distance between the occupant in the image and the occupant restraint system. The image comparison step may entail inputting the images or a form thereof into a neural network which provides for each image of the interior of the passenger compartment, an index of a stored image that most closely matches the image of the interior of the passenger compartment. In a particularly advantageous embodiment, the weight of the occupant on a seat is measured and deployment of the occupant restraint system is controlled based on the determined distance between the occupant and the occupant restraint system and the measured weight of the occupant.

Other embodiments disclosed above are directed to methods and arrangements for controlling deployment of an airbag. One exemplifying embodiment of an arrangement for controlling deployment of an airbag from an airbag module to protect an occupant in a seat of a vehicle in a crash comprises a determining unit for determining the position of the occupant or a part thereof, and control means coupled to the determining unit for controlling deployment of the airbag based on the determined position of the occupant or part thereof. The determining unit may comprise a receiver system, e.g., a wave-receiving transducer such as an electromagnetic wave receiver (such as a SAW, CCD, CMOS, capacitor plate or antenna) or an ultrasonic transducer, for receiving waves from a space above a seat portion of the seat and a processor coupled to the receiver system for generating a signal representative of the position of the occupant or part thereof based on the waves received by the receiver system. The determining unit can include a transmitter for transmitting waves into the space above the seat portion of the seat which are receivable by the receiver system. The receiver system may be mounted in various positions in the vehicle, including in a door of the vehicle, in which case, the distance between the occupant and the door would be determined, i.e., to determine whether the occupant is leaning against the door, and possibly adjacent the airbag module if it is situated in the door, or elsewhere in the vehicle. The control unit is designed to suppress deployment of the airbag, control the time at which deployment of the airbag starts, control the rate of gas flow into the airbag, control the rate of gas flow out of the airbag and/or control the rate of deployment of the airbag.

Furthermore, disclosed above are methods for controlling a system in the vehicle based on an occupying item in which at least a portion of the passenger compartment in which the occupying item is situated is irradiated, radiation from the occupying item are received, e.g., by a plurality of sensors or transducers each arranged at a discrete location, the received radiation is processed by a processor in order to create one or more electronic signals characteristic of the occupying item based on the received radiation, each signal containing a pattern representative and/or characteristic of the occupying item and each signal is then categorized by utilizing pattern recognition techniques for recognizing and thus identifying the class of the occupying item. In the pattern recognition process, each signal is processed into a categorization thereof based on data corresponding to patterns of received radiation stored within the pattern recognition system and associated with possible classes of occupying items of the vehicle. Once the signal(s) is/are categorized, the operation of the system in the vehicle may be affected based on the categorization of the signal(s), and thus based on the occupying item. If the system in the vehicle is a vehicle communication system, then an output representative of the number of occupants and/or their health or injury state in the vehicle may be produced based on the categorization of the signal(s) and the vehicle communication system thus controlled based on such output. Similarly, if the system in the vehicle is a vehicle entertainment system or heating and air conditioning system, then an output representative of specific seat occupancy may be produced based on the categorization of the signal(s) and the vehicle entertainment system or heating and air conditioning system thus controlled based on such output. In one embodiment designed to ensure safe operation of the vehicle, the attentiveness of the occupying item is determined from the signal(s) if the occupying item is an occupant, and in addition to affecting the system in the vehicle based on the categorization of the signal, the system in the vehicle is affected based on the determined attentiveness of the occupant.

Also in accordance with the invention, an occupant protection device control system comprises a vehicle seat provided for a vehicle occupant and movable relative to a chassis of the vehicle, at least one motor for moving the seat, a processor for controlling the motor(s) to move the seat, a memory unit for retaining an occupant pre-defined seat locations, a memory actuation unit for causing the processor to direct the motor(s) to move the seat to the occupant pre-defined seat location retained in the memory unit, measuring apparatus for measuring at least one morphological characteristic of the occupant, an automatic adjustment system coupled to the processor for positioning the seat based on the morphological characteristic(s) measured by the measuring apparatus (if and when a change in positioning is required), a manual adjustment system coupled to the processor manually operable for permitting movement of the seat and an actuatable occupant protection device for protecting the occupant. The processor is arranged to control actuation of the occupant protection device based on the position of the seat wherein location of the occupant relative to the occupant protection device is related to the position of the seat. This relationship can be determined by approximation and analysis, e.g., obtained during a training and programming stage. More particularly, the processor can be designed to suppress actuation of the occupant protection device when the position of the seat indicates that the occupant is more likely than not to be out-of-position for the actuation of the occupant protection device. Other factors can be considered by the processor when determining actuation of the occupant protection device. When the occupant protection device is an airbag system including airbag and enabling a variable inflation and/or deflation of the airbag, the processor can be designed to determine the inflation and/or deflation of the airbag based on the location of the occupant in view of the relationship between the location of the occupant and the position of the seat, e.g., varying an amount of gas flowing into the airbag during inflation or providing an exit orifice or valve arranged in the airbag and varying the size of the exit orifice or valve. The airbag may have an adjustable deployment direction, in which case, the processor can be designed to determine the deployment direction of the airbag based on the location of the occupant in view of the relationship between the location of the occupant and the position of the seat.

Accordingly, a method for controlling an occupant protection device in a vehicle comprises the steps of acquiring data from at least one sensor relating to an occupant in a seat to be protected by the occupant protection device, classifying the type of occupant based on the acquired data, when the occupant is classified as an empty seat or a rear-facing child seat, disabling or adjusting deployment of the occupant protection device, otherwise classifying the size of the occupant based on the acquired data, determining the position of the occupant by means of one of a plurality of algorithms selected based on the classified size of the occupant using the acquired data, each of the algorithms being applicable for a specific size of occupant, and disabling or adjusting deployment of the occupant protection device when the determined position of the occupant is more likely to result in injury to the occupant if the occupant protection device were to deploy. The algorithms may be pattern recognition algorithms such as neural networks.

Acquisition of data may be from a plurality of sensors arranged in the vehicle, each providing data relating to the occupancy state of the seat. Possible sensors include a camera, an ultrasonic sensor, a capacitive sensor or other electromagnetic field monitoring sensor, a weight or other morphological characteristic detecting sensor and a seat position sensor. Further sensors include an electromagnetic wave sensor, an electric field sensor, a seat belt buckle sensor, a seatbelt payout sensor, an infrared sensor, an inductive sensor, a radar sensor, a weight distribution sensor, a reclining angle detecting sensor for detecting a tilt angle of the seat between a back portion of the seat and a seat portion of the seat, and a heartbeat sensor for sensing a heartbeat of the occupant.

Classification of the type of occupant and the size of the occupant may be performed by a combination neural network created from a plurality of data sets, each data set representing a different occupancy state of the seat and being formed from data from the at least one sensor while the seat is in that occupancy state.

A feedback loop may be used in which a previous determination of the position of the occupant is provided to the algorithm for determining a current position of the occupant.

Adjustment of deployment of the occupant protection device when the occupant is classified as an empty seat or a rear-facing child seat may entail a depowered deployment, an oriented deployment and/or a late deployment.

A gating function may be incorporated into the method whereby it is determined whether the acquired data is compatible with data for classification of the type or size of the occupant and when the acquired data is not compatible with the data for classification of the type or size of the occupant, the acquired data is rejected and new data is acquired.

Another method for controlling a component in a vehicle entails acquiring data from at least one sensor relating to an occupant of a seat interacting with or using the component, determining an occupancy state of the seat based on the acquired data, periodically acquiring new data from the at least one sensor, for each time new data is acquired, determining the occupancy state of the seat based on the acquired new data and the determined occupancy state from a preceding time and controlling the component based on the determined occupancy state of the seat. This thus involves use of a feedback loop.

The determination of the occupancy state of the seat is performed using at least one pattern recognition algorithm such as a combination neural network.

15.3 Adapting the System to a Vehicle Model

Disclosed above is a system for determining the occupancy state of a seat which comprises a plurality of transducers arranged in the vehicle, each transducer providing data relating to the occupancy state of the seat, and a processor or a processing unit (e.g., a microprocessor) coupled to the transducers for receiving the data from the transducers and processing the data to obtain an output indicative of the current occupancy state of the seat. The processor comprises a combination neural network algorithm created from a plurality of data sets, each representing a different occupancy state of the seat and being formed from data from the transducers while the seat is in that occupancy state. The combination neural network algorithm discussed above produces the output indicative of the current occupancy state of the seat upon inputting a data set representing the current occupancy state of the seat and being formed from data from the transducers. The algorithm may be a pattern recognition algorithm or neural network algorithm generated by a combination neural network algorithm-generating program.

The processor may be arranged to accept only a separate stream of data from each transducer such that the stream of data from each transducer is passed to the processor without combining with another stream of data. Further, the processor may be arranged to process each separate stream of data independent of the processing of the other streams of data.

The transducers may be selected from a wide variety of different sensors, all of which are affected by the occupancy state of the seat. That is, different combinations of known sensors can be utilized in the many variations of the invention. For example, the sensors used in the invention may include a weight sensor arranged in the seat, a reclining angle detecting sensor for detecting a tilt angle of the seat between a back portion of the seat and a seat portion of the seat, a seat position sensor for detecting the position of the seat relative to a fixed reference point in the vehicle, a heartbeat sensor for sensing a heartbeat of an occupying item of the seat, a capacitive sensor, an electric field sensor, a seat belt buckle sensor, a seatbelt payout sensor, an infrared sensor, an inductive sensor, a motion sensor, a chemical sensor such as a carbon dioxide sensor and a radar sensor. The same type of sensor could also be used, preferably situated in a different location, but possibly in the same location for redundancy purposes. For example, the system may include a plurality of weight sensors, each measuring the weight applied onto the seat at a different location. Such weight sensors may include a weight sensor, such as a strain gage or bladder, arranged to measure displacement of a surface of a seat portion of the seat and/or a strain, force or pressure gage arranged to measure displacement of the entire seat. In the latter case, the seat includes a support structure for supporting the seat above a floor of a passenger compartment of the vehicle whereby the strain gage can be attached to the support structure.

In some embodiments, the transducers include a plurality of electromagnetic wave sensors capable of receiving waves at least from a space above the seat, each electromagnetic wave sensor being arranged at a different location. Other wave or field sensors such as capacitive or electric field sensors can also be used.

In other embodiments, the transducers include at least two ultrasonic sensors capable of receiving waves at least from a space above the seat bottom, each ultrasonic sensor being arranged at a different location. For example, one sensor is arranged on a ceiling of the vehicle and the other is arranged at a different location in the vehicle, preferably so that an axis connecting the sensors is substantially parallel to a second axis traversing a volume in the vehicle above the seat. The second sensor may be arranged on a dashboard or instrument panel of the vehicle. A third ultrasonic sensor can be arranged on an interior side surface of the passenger compartment while a fourth can be arranged on or adjacent an interior side surface of the passenger compartment. The ultrasonic sensors are capable of transmitting waves at least into the space above the seat. Further, the ultrasonic sensors are preferably aimed such that the ultrasonic fields generated thereby cover a substantial portion of the volume surrounding the seat. Horns or grills may be provided for adjusting the transducer field angles of the ultrasonic sensors to reduce reflections off of fixed surfaces within the vehicle or otherwise control the shape of the ultrasonic field. Other types of sensors can of course be placed at the same or other locations.

The actual location or choice of the sensors can be determined by placing a significant number of sensors in the vehicle and removing those sensors which prove analytically to add little to system accuracy.

The ultrasonic sensors can have different transmitting and receiving frequencies and be arranged in the vehicle such that sensors having adjacent transmitting and receiving frequencies are not within a direct ultrasonic field of each other.

Another the system for determining the occupancy state of a seat in a vehicle includes a plurality of transducers arranged in the vehicle, each providing data relating to the occupancy state of the seat, and a processor coupled to the transducers for receiving only a separate stream of data from each transducer (such that the stream of data from each transducer is passed to the processor without combining with another stream of data) and processing the streams of data to obtain an output indicative of the current occupancy state of the seat. The processor comprises an algorithm created from a plurality of data sets, each representing a different occupancy state of the seat and being formed from separate streams of data, each only from one transducer, while the seat is in that occupancy state. The algorithm produces the output indicative of the current occupancy state of the seat upon inputting a data set representing the current occupancy state of the seat and being formed from separate streams of data, each only from one transducer. The processor preferably processes each separate stream of data independent of the processing of the other streams of data.

In still another embodiment of the invention, the system includes a plurality of transducers arranged in the vehicle, each providing data relating to the occupancy state of the seat, and which include wave-receiving transducers and/or non-wave-receiving transducers. The system also includes a processor coupled to the transducers for receiving the data from the transducers and processing the data to obtain an output indicative of the current occupancy state of the seat. The processor comprises an algorithm created from a plurality of data sets, each representing a different occupancy state of the seat and being formed from data from the transducers while the seat is in that occupancy state. The algorithm produces the output indicative of the current occupancy state of the seat upon inputting a data set representing the current occupancy state of the seat and being formed from data from the transducers.

In some of the embodiments of the invention described above, a combination or combinational neural network is used. The particular combination neural network can be determined by a process in which a number of neural network modules are combined in a parallel and a serial manner and an optimization program can be utilized to determine the best combination of such neural networks to achieve the highest accuracy. Alternately, the optimization process can be undertaken manually in a trial and error manner. In this manner, the optimum combination of neural networks is selected to solve the particular pattern recognition and categorization objective desired.

15.4 Component Adjustment

An arrangement for controlling deployment of a component in a vehicle in combination with the vehicle in accordance with the invention comprises measurement apparatus for measuring at least one morphological characteristic of an occupant, a processor coupled to the measurement apparatus for determining a new seat position based on the morphological characteristic(s) of the occupant, an adjustment system for adjusting the seat to the new seat position and a control unit coupled to the measurement apparatus and processor for controlling the component based on the measured morphological characteristic(s) of the occupant and the new seat position. The component could be a deployable occupant restraint device whereby the deployment of the occupant restraint device is controlled by the control unit. The processor may comprise a control circuit or module and can be arranged to determine a new position of a bottom portion and/or back portion of the seat. The adjustment system may comprise one or more motors for moving the seat or a portion thereof.

A method for controlling a component in a vehicle comprises the steps of measuring at least one morphological characteristic of an occupant, obtaining a current position of at least a part of a seat on which the occupant is situated, for example the bottom portion and/or the back portion, and controlling the component based on the measured morphological characteristic(s) of the occupant and the current position of the seat. The morphological characteristic could be the height of the occupant (measured from the top surface of the seat bottom), the weight of the occupant, etc.

One preferred embodiment of an adjustment system in accordance with the invention includes a plurality of wave-receiving sensors for receiving waves from the seat and its contents, if any, and one or more weight sensors for detecting weight of an occupant in the seat or an absence of weight applied onto the seat indicative of a vacant seat. The weight sensing apparatus may include strain sensors mounted on or associated with the seat structure such that the strain measuring elements respond to the magnitude of the weight of the occupying item. The apparatus also includes a processor for receiving the output of the wave-receiving sensors and the weight sensor(s) and for processing the outputs to evaluate a seated-state based on the outputs. The processor then adjusts a part of the component or the component in its entirety based at least on the evaluation of the seated-state of the seat. The wave-receiving sensors may be ultrasonic sensors, optical sensors or electromagnetic sensors. If the wave-receiving sensors are ultrasonic or optical sensors, then they may also include a transmitter for transmitting ultrasonic or optical waves toward the seat. If the component is a seat, the system includes a power unit for moving at least one portion of the seat relative to the passenger compartment and a control unit connected to the power unit for controlling the power unit to move the portion(s) of the seat. In this case, the processor may direct the control unit to affect the power unit based at least in part on the evaluation of the seated-state of the seat. With respect to the direction or regulation of the control unit by the processor, this may take the form of a regulation signal to the control unit that no seat adjustment is needed, e.g., if the seat is occupied by a bag of groceries or a child seat in a rear or forward-facing position as determined by the evaluation of the output from the ultrasonic or optical and weight sensors. On the other hand, if the processor determines that the seat is occupied by an adult or child for which adjustment of the seat is beneficial or desired, then the processor may direct the control unit to affect the power unit accordingly. For example, if a child is detected on the seat, the processor may be designed to lower the headrest. In certain embodiments, the apparatus may include one or more sensors each of which measures a morphological characteristic of the occupying item of the seat, e.g., the height or weight of the occupying item, and the processor is arranged to obtain the input from these sensors and adjust the component accordingly. Thus, once the processor evaluates the occupancy of the seat and determines that the occupancy is by an adult or child, then the processor may additionally use either the obtained weight measurement or conduct additional measurements of morphological characteristics of the adult or child occupant and adjust the component accordingly. The processor may be a single microprocessor for performing all of the functions described above. In the alternative, one microprocessor may be used for evaluating the occupancy of the seat and another for adjusting the component. The processor may comprise an evaluation circuit implemented in hardware as an electronic circuit or in software as a computer program. In certain embodiments, a correlation function or state between the output of the various sensors and the desired result (i.e., seat occupancy identification and categorization) is determined, e.g., by a neural network that may be implemented in hardware as a neural computer or in software as a computer program. The correlation function or state that is determined by employing this neural network may also be contained in a microcomputer. In this case, the microcomputer can be employed as an evaluation circuit. The word circuit herein will be used to mean both an electronic circuit and the functional equivalent implemented on a microcomputer using software. In enhanced embodiments, a heart beat sensor may be provided for detecting the heart beat of the occupant and generating an output representative thereof. The processor additionally receives this output and evaluates the seated-state of the seat based in part thereon. In addition to or instead of such a heart beat sensor, a capacitive sensor and/or a motion sensor may be provided. The capacitive sensor detects the presence of the occupant and generates an output representative of the presence of the occupant. The motion sensor detects movement of the occupant and generates an output representative thereof. These outputs are provided to the processor for possible use in the evaluation of the seated-state of the seat.

Also disclosed above is an arrangement for controlling a component in a vehicle in combination with the vehicle which comprises measurement apparatus for measuring at least one morphological characteristic of an occupant, a determination circuit or system for obtaining a current position of at least a part of a seat on which the occupant is situated, and a control unit coupled to the measurement apparatus and the determination system for controlling the component based on the measured morphological characteristic(s) of the occupant and the current position of the seat. The component may be an occupant restraint device such as an airbag whereby the control unit could control inflation and/or deflation of the airbag, e.g., the flow of gas into and/or out of the airbag, and/or the direction of deployment of the airbag. The component could also be a brake pedal, an acceleration pedal, a rear-view mirror, a side mirror and a steering wheel. The measurement apparatus might measure a plurality of morphological characteristics of the occupant, possibly including the height of the occupant by means of a height sensor arranged in the seat, and the weight of the occupant.

A seat adjustment system can be provided, e.g., motors or actuators connected to various portions of the seat, and a memory unit in which the current position of the seat is stored. The adjustment system is coupled to the memory unit such that an adjusted position of the seat is stored in the memory unit. A processor is coupled to the measurement apparatus for determining an adjusted position of the seat for the occupant based on the measured morphological characteristic(s). The adjustment system is coupled to the processor such that the processor directs the adjustment system to move the seat to the determined adjusted position of the seat. The determination system may comprise a circuit, assembly or system for determining a current position of a bottom portion of the seat and/or a current position of a back portion of the seat.

In addition to a security system, the individual recognition system can be used to control vehicular components, such as the mirrors, the seat, the anchorage point of the seatbelt, the airbag deployment parameters including inflation rate and pressure, inflation direction, deflation rate, time of inflation, the headrest, the steering wheel, the pedals, the entertainment system and the air-conditioning/ventilation system. In this case, the system includes a control unit coupled to the component for affecting the component based on the indication from the pattern recognition algorithm whether the person is the individual.

In order to achieve these objects, a vehicle including a system for obtaining information about an object in the vehicle, comprises at least one resonator or reflector arranged in association with the object, each resonator emitting an energy signal upon receipt of a signal at an excitation frequency, a transmitter device for transmitting signals at least at the excitation frequency of each resonator, an energy signal detector for detecting the energy signal emitted by each resonator upon receipt of the signal at the excitation frequency, and a processor coupled to the detector for obtaining information about the object upon analysis of the energy signal detected by the detector.

The information obtained about the object may be a distance between each resonator and the detector, which positional information is useful for controlling components in the vehicle such as the occupant restraint or protection device.

If the object is a seat, the information obtained about the seat may be an indication of the position of the seat, the position of the back cushion of the seat, the position of the bottom cushion of the seat, the angular orientation of the seat, and other seat parameters.

The resonator(s) may be arranged within the object and may be a SAW device, antenna and/or RFID tag. When several resonators are used, each may be designed to emit an energy signal upon receipt of a signal at a different excitation frequency. The resonators may be tuned resonators including an acoustic cavity or a vibrating mechanical element.

In another embodiment, the vehicle comprises at least one reflector arranged in association with the object and arranged to reflect an energy signal, a transmitter for transmitting energy signals in a direction of each of reflector, an energy signal detector for detecting energy signals reflected by the reflector(s), and a processor coupled to the detector for obtaining information about the object upon analysis of the energy signal detected by the detector. The reflector may be a parabolic-shaped reflector, a corner cube reflector, a cube array reflector, an antenna reflector and other types of reflector or reflective devices. The transmitter may be an infrared laser system in which case, the reflector comprises an optical mirror.

The information obtained about the object may be a distance between each reflector and the detector, which positional information is useful for controlling components in the vehicle such as the occupant restraint or protection device. If the object is a seat, the information obtained about the seat may be an indication of the position of the seat, the position of the back cushion of the seat, the position of the bottom cushion of the seat, the angular orientation of the seat, and other seat parameters. If the object is a seatbelt, the information obtained about the seatbelt may be an indication of whether the seatbelt is in use and/or the position of the seatbelt. If the object is a child seat, the information obtained about the child seat may be whether the child seat is present and whether the child seat is rear-facing, front-facing, etc. If the object is a window of the vehicle, the information obtained about the window may be an indication of whether the window is open or closed, or the state of openness. If the object is a door, a reflector may be arranged in a surface facing the door such that closure of the door prevents reflection of the energy signal from the reflector, whereby the information obtained about the door is an indication of whether the door is open or closed.

Another embodiment of a motor vehicle detection system to achieve some of the above-listed objects comprises at least one transmitter for transmitting energy signals toward a target in a passenger compartment of the vehicle, at least one reflector arranged in association with the target, and at least one detector for detecting energy signals reflected by the reflector(s). A processor is optionally coupled to the detector(s) for obtaining information about the target upon analysis of the energy signal detected by the detector(s).

In order to achieve objects of the invention, a control system for controlling an occupant restraint device effective for protection of an occupant of the seat comprises a receiving device arranged in the vehicle for obtaining information about contents of the seat and generating a signal based on any contents of the seat, a different signal being generated for different contents of the seat when such contents are present on the seat, an analysis unit such as a microprocessor coupled to the receiving device for analyzing the signal in order to determine whether the contents of the seat include a child seat, whether the contents of the seat include a child seat in a particular orientation and/or whether the contents of the seat include a child seat in a particular position, and a deployment unit coupled to the analysis unit for controlling deployment of the occupant restraint device based on the determination by the analysis unit.

The analysis unit can be programmed to determine whether the contents of the seat include a child seat in a rear-facing position, in a forward-facing position, a rear-facing child seat in an improper orientation, a forward-facing child seat in an improper orientation, and the position of the child seat relative to one or more of the occupant restraint devices.

The receiving device can include a wave transmitter for transmitting waves toward the seat, a wave receiver arranged relative to the wave transmitter for receiving waves reflected from the seat and a processor coupled to the wave receiver for generating the different signal for the different contents of the seat based on the received waves reflected from the seat. The wave receiver can comprise multiple wave receivers spaced apart from one another with the processor being programmed to process the reflected waves from each receiver in order to create respective signals characteristic of the contents of the seat based on the reflected waves. In this case, the analysis unit preferably categorizes the signals using for example a pattern recognition algorithm for recognizing and thus identifying the contents of the seat by processing the signals based on the reflected waves from the contents of the seat into a categorization of the signals characteristic of the contents of the seat.

A system for obtaining information about an object in the vehicle comprises at least one resonator arranged in association with the object and which emits an energy signal upon receipt of a signal at an excitation frequency, a transmitter for transmitting signals at least at the excitation frequency of each resonator, an energy signal detector device for detecting the energy signal emitted by the resonator(s) upon receipt of the signal at the excitation frequency and a processor coupled to the detector device for obtaining information about the object upon analysis of the energy signal detected by the detector device. The information obtained about the object may be a distance between each resonator and the detector device or an indication of the position of the seat.

The resonator may comprise a tuned resonator including an acoustic cavity or a vibrating mechanical element. When multiple resonators are used, each resonator is preferably designed to emit an energy signal upon receipt of a signal at a different excitation frequency.

If the object is a seatbelt, the information obtained about the seatbelt may be an indication of whether the seatbelt is in use and/or an indication of the position of the seatbelt.

If the object is a child seat, the information obtained about the child seat may be an indication of the orientation of the child seat and/or an indication of the position of the child seat.

If the object is a window of the vehicle, the information obtained about the window may be an indication of whether the window is open or closed.

If the object is a door, the resonator is arranged in a surface facing the door such that closure of the door prevents emission of the energy signal therefrom, in which case, the information obtained about the door is an indication of whether the door is open or closed.

Accordingly, in order to achieve one or more of the objects above, an arrangement for controlling a component in a vehicle based on contents of a passenger compartment of the vehicle comprises at least one wave-receiving sensor arranged to receive waves from the passenger compartment, a processing circuit coupled to the wave-receiving sensor(s) and arranged to remove at least one portion of each wave received by the sensor(s) in a discrete period of time to thereby form a shortened returned wave, and a processor coupled to the processing circuit and arranged to receive data derived from the shortened returned waves formed by the processing circuit. The processor generates a control signal to control the component based on the data derived from the shortened returned waves formed by the processing circuit.

The portion of the wave which is removed may be an initial wave portion starting from the beginning of the time period and/or an end wave portion at the end of the time period.

When multiple sensors are provided, a sensor driver circuit may be coupled to the sensors for driving the wave-receiving sensors and a multiplex circuit coupled to the sensors for processing the waves received by the wave-receiving sensors. The multiplex circuit is switched in synchronization with a timing signal from the driver circuit.

A band pass filter may be interposed between the sensor and the processing circuit for filtering waves at particular frequencies and noise from the waves received by the at least one wave-receiving sensor. An amplifier may be coupled to the band pass filter to amplify the waves provided by the band pass filter and an analog to digital converter (ADC) may be interposed between the amplifier and the processing circuit for removing a high frequency carrier wave component and generating an envelope wave signal.

Another arrangement for controlling a component in a vehicle based on contents of a passenger compartment of the vehicle comprises a generating device for generating a succession of time windows, a receiving device for receiving waves from the passenger compartment during the time windows, a processing circuit coupled to the receiving device and arranged to remove at least one portion of each wave received by the receiving device in each time window to thereby form a shortened wave, and a processor coupled to the processing circuit and arranged to receive data derived from the shortened waves formed by the processing circuit. The processor generates a control signal to control the component based on the data derived from the shortened waves formed by the processing circuit. The same variations of the above-described arrangement may be used for this arrangement as well.

A method for controlling a component in a vehicle based on contents of a passenger compartment of the vehicle in accordance with the invention comprises the steps of receiving waves from the passenger compartment, removing at least one portion of each received wave in a discrete period of time to thereby form a shortened wave, deriving data from the shortened waves, and generating a control signal to control the component based on the data derived from the shortened waves. The variations of the above-described arrangement may be used for this method as well.

Another method for controlling a component in a vehicle based on contents of a passenger compartment of the vehicle comprises the steps of generating a succession of time windows, receiving waves from the passenger compartment during the time windows, removing at least one portion of each received wave in each time window to thereby form a shortened wave, deriving data from the shortened waves, and generating a control signal to control the component based on the data derived from the shortened waves. The variations of the above-described arrangement may be used for this method as well.

A method for generating an algorithm capable of determining occupancy of a seat in accordance with the invention comprises the steps of mounting a plurality of wave-receiving sensors in the vehicle, obtaining data from the sensors while the seat has a particular occupancy, forming a vector from the data from the sensors obtained while the seat has a particular occupancy, repeatedly changing the occupancy of the seat and for each occupancy, repeating the steps of obtaining data from the sensors and forming a vector from the data, modifying the vectors by removing at least one portion of the wave received by each sensor during a discrete period of time, and generating the algorithm based on the modified vectors such that upon input from the sensors, the algorithm is capable of outputting a likely occupancy of the seat. The modified vectors may be normalized prior to generation of the algorithm.

The modified vectors may be input into a compression circuit that reduces the magnitude of reflected signals from high reflectivity targets compared to those of low reflectivity. Further, a time gain circuit may be applied to the modified vectors to compensate for the difference in sonic strength received by the sensors based on the distance of the reflecting object from the sensor.

Modification of the vectors may entail removing an initial portion of the wave during the time period and/or removing an end portion of the wave during the time period.

The data may be obtained from sensors other than wave-receiving sensors including weight sensors, weight distribution sensors, seat buckle sensors, etc.

Another method for controlling a component in a vehicle comprises the steps of acquiring data from at least one sensor relating to an occupant of a seat interacting with or using the component, identifying the occupant based on the acquired data, determining the position of the occupant based on the acquired data, controlling the component based on at least one of the identification of the occupant and the determined position of the occupant, periodically acquiring new data from the at least one sensor, and for each time new data is acquired, identifying the occupant based on the acquired new data and an identification from a preceding time and determining the position of the occupant based on the acquired new data and then controlling the component based on at least one of the identification of the occupant and the determined position of the occupant. This also involves use of a feedback loop.

Determination of the position of the occupant based on the acquired new data may entail considering a determination of the position of the occupant from the preceding time.

Identification of the occupant based on the acquired data may entail using data from a first subset of the plurality of sensors whereas the determination of the position of the occupant based on the acquired data may entail using data from a second subset of the plurality of sensors different than the first subset.

Identification of the occupant based on the acquired data and the determination of the position of the occupant based on the acquired data may be performed using pattern recognition algorithms such as a combination neural network.

Another method for controlling a component in a vehicle may comprise the steps of acquiring data from at least one sensor relating to an occupant of a seat interacting with or using the component, identifying an occupant based on the acquired data, determining the position of the occupant based on the acquired data, controlling the component based on at least one of the identification of the occupant and the determined position of the occupant, periodically acquiring new data from the at least one sensor, and for each time new data is acquired, identifying an occupant based on the acquired new data and determining the position of the occupant based on the acquired new data and a determination of the position of the occupant from a preceding time and then controlling the component based on at least one of the identification of the occupant and the determined position of the occupant.

Another method for controlling a component in a vehicle comprises the steps of acquiring data from at least one sensor relating to an occupant of a seat interacting with or using the component, identifying the occupant based on the acquired data, when the occupant is identified as a child seat, determining the orientation of the child seat based on the acquired data, determining the position of the child seat by means of one of a plurality of algorithms selected based on the determined orientation of the child seat, each of the algorithms being applicable for a specific orientation of a child seat, and controlling the component based on the determined position of the child seat. When the occupant is identified as other than a child seat, the method entails determining at least one of the size and position of the occupant and controlling the component based on the at least one of the size and position of the occupant.

15.5 Weight, Biometrics

The weight sensor arrangement can comprise a spring system arranged underneath a seat cushion and a sensor arranged in association with the spring system for generating a signal based on downward movement of the cushion caused by occupancy of the seat which is indicative of the weight of the occupying item. The sensor may be a displacement sensor structured and arranged to measure displacement of the spring system caused by occupancy of the seat. Such a sensor can comprise a spring retained at both ends and which is tensioned upon downward movement of the spring system and a measuring unit for measuring a force in the spring indicative of weight of the occupying item. The measuring unit can comprise a strain gage for measuring strain of the spring or a force-measuring device.

The sensor may also comprise a support, a cable retained at one end by the support and a length-measuring device arranged at an opposite end of the cable for measuring elongation of the cable indicative of weight of the occupying item. The sensor can also comprises one or more SAW strain gages and/or structured and arranged to measure a physical state of the spring system.

Furthermore, disclosed herein is, a vehicle seat comprises a cushion defining a surface adapted to support an occupying item, a spring system arranged underneath the cushion and a sensor arranged in association with the spring system for generating a signal based on downward movement of the cushion and/or spring system caused by occupancy of the seat which is indicative of the weight of the occupying item. The spring system may be in contact with the sensor. The sensor may be a displacement sensor structured and arranged to measure displacement of the spring system caused by occupancy of the seat. In the alternative, the sensor may be designed to measure deflection of a bottom of the cushion, e.g., placed on the bottom of the cushion. Instead of a displacement sensor, the sensor can comprise a spring retained at both ends and which is tensioned upon downward movement of the spring system and a measuring unit for measuring a force in the spring indicative of weight of the occupying item. Non-limiting constructions of the measuring unit include a strain gage for measuring strain of the spring or the measuring unit can comprise a force measuring device. The sensor can also comprises a support, a cable retained at one end by the support and a length-measuring device arranged at an opposite end of the cable for measuring elongation of the cable indicative of weight of the occupying item. In this case, the length measuring device may comprises a cylinder, a rod arranged in the cylinder and connected to the opposite end of the cable, a spring arranged in the cylinder and connected to the rod to resist elongation of the cable and windings arranged in the cylinder. The amount of coupling between the windings provides an indication of the extent of elongation of the cable. A strain gage can also be used to measure the change in length of the cable. In one particular embodiment, the sensor comprises one or more strain gages structured and arranged to measure a physical state of the spring system or the seat. Electrical connections such as wires connect the strain gage(s) to the control system. Each strain gage transducer may incorporate signal conditioning circuitry and an analog to digital converter such that the measured strain is output as a digital signal. Alternately, a surface acoustical wave (SAW) strain gage can be used in place of conventional wire, foil or silicon strain gages and the strain measured either wirelessly or by a wire connection. For SAW strain gages, the electronic signal conditioning can be associated directly with the gage or remotely in an electronic control module as desired.

In a method for measuring weight of an occupying item on a seat cushion of a vehicle, a spring system is arranged underneath the cushion and a sensor is arranged in association with the cushion for generating a signal based on downward movement of the cushion and/or spring system caused by the occupying item which is indicative of the weight of the occupying item. The particular constructions of the spring system and sensor discussed above can be implemented in the method.

Another embodiment of a weight sensor system comprises a spring system adapted to be arranged underneath the cushion and extend between the supports and a sensor arranged in association with the spring system for generating a signal indicative of the weight applied to the cushion based on downward movement of the cushion and/or spring system caused by the weight applied to the seat. The particular constructions of the spring system and sensor discussed above can be implemented in this embodiment.

An embodiment of a vehicle including an arrangement for controlling a component based on an occupying item of the vehicle comprises a cushion defining a surface adapted to support the occupying item, a spring system arranged underneath the cushion, a sensor arranged in association with the spring system for generating a signal indicative of the weight of the occupying item based on downward movement of the cushion and/or spring system caused by occupancy of the seat and a processor coupled to the sensor for receiving the signal indicative of the weight of the occupying item and generating a control signal for controlling the component. The particular constructions of the spring system and sensor discussed above can be implemented in this embodiment. The component may be an airbag module or several airbag modules, or any other type of occupant protection or restraint device.

A method for controlling a component in a vehicle based on an occupying item comprises the steps of arranging a spring system arranged underneath a cushion on which the occupying item may rest, arranging a sensor in association with the cushion for generating a signal based on downward movement of the cushion and/or spring system caused by the occupying item which is indicative of the weight of the occupying item, and controlling the component based on the signal indicative of the weight of the occupying item. The particular constructions of the spring system and sensor discussed above can be implemented in this method.

In one weight measuring method in accordance with the invention disclosed above, at least one strain gage transducer is mounted at a respective location on the support structure and provides a measurement of the strain of the support structure at that location, and the weight of the occupying item of the seat is determined based on the strain of the support structure measured by the strain gage transducer(s). In another method, the seat includes the slide mechanisms for mounting the seat to a substrate and bolts for mounting the seat to the slide mechanisms, the pressure exerted on the seat is measured by at least one pressure sensor arranged between one of the slide mechanisms and the seat. Each pressure sensor typically comprises first and second layers of shock absorbing material spaced from one another and a pressure sensitive material interposed between the first and second layers of shock absorbing material. The weight of the occupying item of the seat is determined based on the pressure measured by the at least one pressure sensor. In still another method for measuring the weight of an occupying item of a seat, a load cell is mounted between the seat and a substrate on which the seat is supported. The load cell includes a member and a strain gage arranged thereon to measure tensile strain therein caused by weight of an occupying item of the seat. The weight of the occupying item of the seat is determined based on the strain in the member measured by the strain gage. Naturally, the load cell can be incorporated at other locations in the seat support structure and need not be between the seat and substrate. In such a case, however, the seat would need to be especially designed for that particular mounting location. The seat would then become the weight measuring device.

Disclosed above are apparatus for measuring the weight of an occupying item of a seat including at least one strain gage transducer, each mounted at a respective location on a support structure of the seat and arranged to provide a measurement of the strain of the support structure thereat. A control system is coupled to the strain gage transducer(s) for determining the weight of the occupying item of the seat based on the strain of the support structure measured by the strain gage transducer(s). The support structure of the seat is mounted to a substrate such as a floor pan of a motor vehicle. Electrical connection such as wires connect the strain gage transducer(s) to the control system. Each strain gage transducer may incorporate signal conditioning circuitry and an analog to digital converter such that the measured strain is output as a digital signal. The positioning of the strain gage transducer(s) depends in large part on the actual construction of the support structure of the seat. Thus, when the support structure comprises two elongate slide mechanisms adapted to be mounted on the substrate and support members for coupling the seat to the slide mechanisms, several strain gage transducers may be used, each arranged on a respective support member. If the support structure further includes a slide member, another strain gage transducer may be mounted thereon. It is advantageous to increase the accuracy of the strain gage transducers and/or concentrating the strain caused by occupancy of the seat and this may be accomplished, for example, by forming a support member from first and second tubes having longitudinally opposed ends and a third tube overlying the opposed ends of the first and second tubes and connected to the first and second tubes whereby a strain gage transducer is arranged on the third tube. Naturally, other structural shapes may be used in place of one or more of the tubes.

Another disclosed embodiment of an apparatus for measuring the weight of an occupying item of a seat includes a load cell adapted to be mounted to the seat and to a substrate on which the seat is supported. The load cell includes a member and a strain gage arranged thereon to measure tensile (or compression) strain in the member caused by weight of an occupying item of the seat. A control system is coupled to the strain gage for determining the weight of an occupying item of the seat based on the strain in the member measured by the strain gage. If the member is a beam and the strain gage includes two strain sensing elements, then one strain-sensing element is arranged in a longitudinal direction of the beam and the other is arranged in a transverse direction of the beam. If four strain sensing elements are present, a first pair is arranged in a longitudinal direction of the beam and a second pair is arranged in a transverse direction of the beam. The member may be a tube in which case, a strain-sensing element is arranged on the tube to measure compressive strain in the tube and another strain sensing element is arranged on the tube to measure tensile strain in the tube. The member may also be an elongate torsion bar mounted at its ends to the substrate. In this case, the load cell includes a lever arranged between the ends of the torsion bar and connected to the seat such that a torque is imparted to the torsion bar upon weight being exerted on the seat. The strain gage thus includes a torsional strain-sensing element.

In a method for measuring weight of an occupying item in a vehicle seat disclosed above, support members are interposed between the seat and slide mechanisms which enable movement of the seat and such that at least a portion of the weight of the occupying item passes through the support members, at least one of the support members is provided with a region having a lower stiffness than a remaining region, at least one strain gage transducer is arranged in the lower stiffness region of the support member to measure strain thereof and an indication of the weight of the occupying item is obtained based at least in part on the strain of the lower stiffness region of the support member measured by the strain gage transducer(s). The support member(s) may be formed by providing an elongate member and cutting around the circumference of the elongate member to thereby obtain the lower stiffness region or by other means.

A vehicular arrangement for controlling a component based on an occupying item of the vehicle disclosed herein comprises a seat defining a surface adapted to contact the occupying item, slide mechanisms coupled to the seat for enabling movement of the seat, support members for supporting the seat on the slide mechanisms such that at least a portion of the weight of the occupying item passes through the support members. At least one of the support members has a region with a lower stiffness than a remaining region of the support member. A strain gage measurement system generates a signal indicative of the weight of the occupying item, and a processor coupled to the strain gage measurement system receives the signal indicative of the weight of the occupying item and generates a control signal for controlling the component. The strain gage measurement system includes at least one strain gage transducer arranged in the lower stiffness region of the support member to measure strain thereof. The component can be any vehicular component, system or subsystem which can utilize the weight of the occupying item of the seat for control, e.g., an airbag system.

Another method for controlling a component in a vehicle based on an occupying item disclosed herein comprises the steps of interposing support members between a seat on which the occupying item may rest and slide mechanisms which enable movement of the seat and such that at least a portion of the weight of the occupying item passes through the support members, providing at least one of the support members with a region having a lower stiffness than a remaining region, arranging at least one strain gage transducer in the lower stiffness region of the support member to measure strain thereof, and controlling the component based at least in part on the strain of the lower stiffness region of the support member measured by the strain gage transducer(s). If the component is an airbag, the step of controlling the component can entail controlling the rate of deployment of the airbag, the start time of deployment, the inflation rate of the airbag, the rate of gas removal from the airbag and/or the maximum pressure in the airbag.

In another weight measuring system, one or more of the connecting members which connect the seat to the slide mechanisms comprises an elongate stud having first and second threaded end regions and an unthreaded intermediate region between the first and second threaded end regions, the first threaded end region engaging the seat and the second threaded end region engaging one of the slide mechanisms, and a strain gage measurement system arranged on the unthreaded intermediate region for measuring strain in the connecting member at the unthreaded intermediate region which is indicative of weight being applied by an occupying item in the seat. The strain gage measurement system may comprises a SAW strain gage and associated circuitry and electric components capable of receiving a wave and transmitting a wave modified by virtue of the strain in the connecting member, e.g., an antenna. The connecting member can be made of a non-metallic, composite material to avoid problems with the electromagnetic wave propagation. An interrogator may be provided for communicating wirelessly with the SAW strain gage measurement system.

Further, disclosed above is a vehicle seat structure which comprises a seat or cushion defining a surface adapted to contact an occupying item, slide mechanisms coupled to the seat for enabling movement of the seat, support members for supporting the seat on the slide mechanisms such that at least a portion of the weight of the occupying item passes through the support members. At least one of the support members has a region with a lower stiffness than a remaining region of the support member. The remaining regions of the support member are not necessarily the entire remaining portions of the support member and they may be multiple regions with a lower stiffness than other regions. A strain gage measurement system generates a signal indicative of the weight of the occupying item. The strain gage measurement system includes at least one strain gage transducer arranged in a lower stiffness region of the support member to measure strain thereof. The support member(s) may be tubular whereby the lower stiffness region has a smaller diameter than a diameter of the remaining region. If the support member is not tubular, the lower stiffness region may have a smaller circumference than a circumference of a remaining region of the support member. Each support member may have a first end connected to one of the slide mechanisms and a second end connected to the seat. Electrical connections, such as wires or electromagnetic waves which transfer power wirelessly, connect the strain gage transducer(s) to the control system. Each strain gage transducer may incorporate signal conditioning circuitry and an analog to digital converter such that the measured strain is output as a digital signal. Alternately, a surface acoustical wave (SAW) strain gage can be used in place of conventional wire, foil or silicon strain gages and the strain transmitted either wirelessly or by a wire connection. For SAW strain gages, the electronic signal conditioning can be associated directly with the gage or remotely in an electronic control module as desired. The strain gage measurement system preferably includes at least one additional strain gage transducer arranged on another support member and a control system coupled to the strain gage transducers for receiving the strain measured by the strain gage transducers and providing the signal indicative of the weight of the occupying item.

Disclosed above is a vehicle seat structure comprising a seat defining a surface adapted to contact an occupying item and a weight sensor arrangement arranged in connection with the seat for providing an indication of the weight applied by the occupying item to the surface of the seat. The weight sensor arrangement includes conductive members spaced apart from one another such that a capacitance develops between opposed ones of the conductive members upon incorporation of the conductive members in an electrical circuit. The capacitance is based on the space between the conductive members which varies in relation to the weight applied by the occupying item to the surface of the seat. The weight sensor arrangement may include a pair of non-metallic substrates and a layer of material situated between the non-metallic substrates, possibly a compressible material. The conductive members may comprise a first electrode arranged on a first side of the material layer and a second electrode arranged on a second side of the material layer. The weight sensor arrangement may be arranged in connection with slide mechanisms adapted to support the seat on a substrate of the vehicle while enabling movement of the seat, possibly between the slide mechanisms and the seat. If bolts attach the seat to the slide mechanisms, the conductive members may be annular and placed on the bolts.

Another embodiment of a seat structure comprises a seat defining a surface adapted to contact an occupying item, slide mechanisms adapted to support the seat on a substrate of the vehicle while enabling movement of the seat and a weight sensor arrangement interposed between the seat and the slide mechanisms for measuring displacement of the seat which provides an indication of the weight applied by the occupying item to the seat. The weight sensor arrangement can include a capacitance sensor which measures a capacitance which varies in relation to the displacement of the seat. The capacitance sensor can include conductive members spaced apart from one another such that a capacitance develops between opposed ones of the conductive members upon incorporation of the members in an electrical circuit, the capacitance being based on the space between the members which varies in relation to the weight applied by the occupying item to the seat.

Another disclosed embodiment of an apparatus for measuring the weight of an occupying item of a seat includes slide mechanisms for mounting the seat to a substrate and bolts for mounting the seat to the slide mechanisms, the apparatus comprises at least one pressure sensor arranged between one of the slide mechanisms and the seat for measuring pressure exerted on the seat. Each pressure sensor may comprise first and second layers of shock absorbing material spaced from one another and a pressure sensitive material interposed between the first and second layers of shock absorbing material. A control system is coupled to the pressure sensitive material for determining the weight of the occupying item of the seat based on the pressure measured by the at least one pressure sensor. The pressure sensitive material may include an electrode on upper and lower faces thereof.

One embodiment of an apparatus in accordance with invention includes a first measuring system for measuring a first morphological characteristic of the occupying item of the seat and a second measuring system for measuring a second morphological characteristic of the occupying item. Morphological characteristics include the weight of the occupying item, the height of the occupying item from the bottom portion of the seat and if the occupying item is a human, the arm length, head diameter and leg length. The apparatus also includes a processor for receiving the output of the first and second measuring systems and for processing the outputs to evaluate a seated-state based on the outputs. The measuring systems described herein, as well as any other conventional measuring systems, may be used in the invention to measure the morphological characteristics of the occupying item.

In basic embodiments of the invention, wave or energy-receiving transducers are arranged in the vehicle at appropriate locations, trained if necessary depending on the particular embodiment (as described above), and function to determine whether a life form is present in the vehicle and if so, how many life forms are present, where they are located and their approximate sizes and perhaps some vital signs to indicate their health or injury state (breathing, pulse rate etc.). A determination can also be made using the transducers as to whether the life forms are humans, or more specifically, adults, child in child seats, etc. As noted above and below, this is possible using pattern recognition techniques. Moreover, the processor or processors associated with the transducers can be trained to determine the location of the life forms, either periodically or continuously or possibly only immediately before, during and after a crash. The location of the life forms can be as general or as specific as necessary depending on the system requirements. For example, a determination can be made that a human is situated on the driver's seat in a normal position (general) or a determination can be made that a human is situated on the driver's seat and is leaning forward and/or to the side at a specific angle as well as the position of his or her extremities and head and chest (specific). The degree of detail is limited by several factors, including among others the number and position of transducers and training of the pattern recognition algorithm.

The weight measuring apparatus described above may be used in apparatus and methods for adjusting a vehicle component, although other weight measuring apparatus may also be used in the vehicle component adjusting systems and methods described immediately below.

Furthermore, although the weight measuring system and apparatus described above are described for particular use in a vehicle, it is of course possible to apply the same constructions to measure the weight of an occupying item on other seats in non-vehicular applications, if a weight measurement is desired for some purpose.

Briefly, the claimed inventions include methods and arrangements for detecting motion of objects in a vehicle and specifically motion of an occupant indicative of a heartbeat. Detection of the heartbeat of occupants is useful to provide an indication that a seat is occupied and can also prevent infant suffocation by automatically opening a vent or window when an infant's heartbeat is detected anywhere in the vehicle, e.g., either in the passenger compartment or the trunk, and the temperature in the vehicle is rising. Further, detection of motion or a heartbeat in the passenger compartment of the vehicle can be used to warn a driver that someone is hiding in the vehicle.

The determination of the presence of human beings or other life forms in the vehicle can also used in various methods and arrangements for, e.g., controlling deployment of occupant restraint devices in the event of a vehicle crash, controlling heating and air-conditioning systems to optimize the comfort for any occupants, controlling an entertainment system as desired by the occupants, controlling a glare prevention device for the occupants, preventing accidents by a driver who is unable to safely drive the vehicle and enabling an effective and optimal response in the event of a crash (either oral directions to be communicated to the occupants or the dispatch of personnel to aid the occupants). Thus, one objective of the invention is to obtain information about occupancy of a vehicle and convey this information to remotely situated assistance personnel to optimize their response to a crash involving the vehicle and/or enable proper assistance to be rendered to the occupants after the crash.

In order to achieve at least some of these objects, a vehicle including a system for analyzing motion of occupants of the vehicle in accordance with the invention comprises a wave-receiving system for receiving waves from spaces above seats of the vehicle in which the occupants would normally be situated and a processor coupled to the wave-receiving system for determining movement of any occupants based on the waves received by the wave-receiving system. The wave-receiving system may be arranged on a rear view mirror of the vehicle, in a headliner, roof, ceiling or windshield header of the vehicle, in an A-Pillar or B-Pillar of the vehicle, above a top surface of an instrument panel of the vehicle, and in connection with a steering wheel of the vehicle or an airbag module of the vehicle. The wave-receiving system may comprise a single axis antenna for receiving waves from spaces above a plurality of the seats in the vehicle or means for generating a scanning radar beam.

The processor can be programmed to determine the location of at least one of the head, chest and torso of any occupants. If it determines the location of the head of any occupants, it could monitor the position of the head of any occupants to determine whether the occupant is falling asleep or becoming incapacitated. If it determines a position of any occupants at several time intervals, it could enable a determination of movement of any occupants to be obtained based on differences between the position of any occupants over time.

A vehicle including a system for operating the vehicle by a driver in accordance with the invention comprises a wave-receiving system for receiving waves from a space above a seat in which the driver is situated, a processor coupled to the wave-receiving system for determining movement of the driver based on the waves received by the wave-receiving system and ascertaining whether the driver has become unable to operate the vehicle and a reactive system coupled to the processor for taking action to effect a change in the operation of the vehicle upon a determination that the driver has become unable to operate the vehicle. The wave-receiving system may be arranged on a rear view mirror of the vehicle, in a headliner, roof, ceiling or windshield header of the vehicle, in an A-Pillar or B-Pillar of the vehicle, above a top surface of an instrument panel of the vehicle, and in connection with a steering wheel of the vehicle or an airbag module of the vehicle.

A method for regulating operation of the vehicle by a driver in accordance with invention comprises the steps of receiving waves from a space above a seat in which the driver is situated, determining movement of the driver based on the received waves, ascertaining whether the driver has become unable to operate the vehicle based on any movement of the driver or a part of the driver, and taking action to effect a change in the operation of the vehicle upon a determination that the driver has become unable to operate the vehicle. Such action can be the activation of an alarm, a warning device, a steering wheel correction device and/or a steering wheel friction increasing device which would make it harder to turn the steering wheel.

15.6 Telematics

Among the inventions disclosed above is an arrangement for obtaining and conveying information about occupancy of a passenger compartment of a vehicle which comprises at least one occupant sensor, a generating system coupled to the occupant sensor for generating information about the occupancy of the passenger compartment based on the occupant sensor(s) and a communications device coupled to the generating system for transmitting the information about the occupancy of the passenger compartment. As such, response personnel can receive the information about the occupancy of the passenger compartment and respond appropriately, if necessary. There may be several occupant sensors and they may be, e.g., ultrasonic wave-receiving sensors, electromagnetic wave-receiving sensors, electric field sensors, antenna near field modification sensing sensors, energy absorption sensors, capacitance sensors, or combinations thereof. The information about the occupancy of the passenger compartment can include the number of occupants in the passenger compartment, as well as whether each occupant is moving non-reflexively and breathing. A transmitter may be provided for transmitting waves into the passenger compartment such that each wave-receiving sensor receives waves transmitted from the transmitter and modified by passing into and at least partially through the passenger compartment. Waves may also be from natural sources such as the sun, from lights on a vehicle or roadway, or radiation naturally emitted from the occupant or other object in the vehicle.

One or more memory units may be coupled to the generating system for storing the information about the occupancy of the passenger compartment and to the communications device. The communications device then can interrogate the memory unit(s) upon a crash of the vehicle to thereby obtain the information about the occupancy of the passenger compartment. In one particularly useful embodiment, a system for determining the health state of at least one occupant is provided, e.g., a heartbeat sensor, a motion sensor such as a micropower impulse radar sensor for detecting motion of the at least one occupant and motion sensor for determining whether the occupant(s) is/are breathing, and coupled to the communications device. The communications device can interrogate the health state determining system upon a crash of the vehicle, or some other event or even continuously, to thereby obtain and transmit the health state of the occupant(s). The health state determining system can also comprise a chemical sensor for analyzing the amount of carbon dioxide in the passenger compartment or around the at least one occupant or for detecting the presence of blood in the passenger compartment. Movement of the occupant can be determined by monitoring the weight distribution of the occupant(s), or an analysis of waves from the space occupied by the occupant(s). Each wave-receiving sensor generates a signal representative of the waves received thereby and the generating system may comprise a processor for receiving and analyzing the signal from the wave-receiving sensor in order to generate the information about the occupancy of the passenger compartment. The processor can comprise a pattern recognition system for classifying an occupant of the seat so that the information about the occupancy of the passenger compartment includes the classification of the occupant. The wave-receiving sensor may be a micropower impulse radar sensor adapted to detect motion of an occupant whereby the motion of the occupant or absence of motion of the occupant is indicative of whether the occupant is breathing. As such, the information about the occupancy of the passenger compartment generated by the generating system is an indication of whether the occupant is breathing. Also, the wave-receiving sensor may generate a signal representative of the waves received thereby and the generating system receive this signal over time and determine whether any occupants in the passenger compartment are moving. As such, the information about the occupancy of the passenger compartment generated by the generating system includes the number of moving and non-moving occupants in the passenger compartment.

A related method for obtaining and conveying information about occupancy of a passenger compartment of a vehicle comprises the steps of receiving waves from the passenger compartment, generating information about the occupancy of the passenger compartment based on the received waves, and transmitting the information about the occupancy of the passenger compartment whereby response personnel can receive the information about the occupancy of the passenger compartment. Waves may be transmitted into the passenger compartment whereby the transmitted waves are modified by passing into and at least partially through the passenger compartment and then received. The information about the occupancy of the passenger compartment may be stored in at least one memory unit which is subsequently interrogated upon a crash of the vehicle to thereby obtain the information about the occupancy of the passenger compartment and thereafter the information with or without pictures of the passenger compartment before, during and/or after a crash or other event can be sent to a remote location such as an emergency services personnel station. A signal representative of the received waves can be generated by sensors and analyzed in order to generate the information about the state of health of at least one occupant of the passenger compartment and/or to generate the information about the occupancy of the passenger compartment (i.e., determine non-reflexive movement and/or breathing indicating life). Pattern recognition techniques, e.g., a trained neural network, can be applied to analyze the signal and thereby recognize and identify any occupants of the passenger compartment. In this case, the identification of the occupants of the passenger compartment can be included into the information about the occupancy of the passenger compartment.

15.7 Entertainment

Disclosed above is also an arrangement for controlling audio reception by at least one occupant of a passenger compartment of the vehicle which comprises a monitoring system for determining the position of the occupant(s) and a sound generating system coupled to the monitoring system for generating specific sounds. The sound generating system is automatically adjustable based on the determined position of the occupant(s) such that the specific sounds are audible to the occupant(s). The sound generating system may utilize hypersonic sound, e.g., comprise one or more pairs of ultrasonic frequency generators for generating ultrasonic waves whereby for each pair, the ultrasonic frequency generators generate ultrasonic waves which mix to thereby create new audio frequencies. Each pair of ultrasonic frequency generators is controlled independently of the others so that each of the occupants is able to have different new audio frequencies created.

For noise cancellation purposes, the vehicle can include a system for detecting the presence and direction of unwanted noise whereby the sound generating system is coupled to the unwanted noise presence and detection system and direct sound to prevent reception of the unwanted noise by the occupant(s).

If the sound generating system comprises speakers, the speakers may be controllable based on the determined positions of the occupants such that at least one speaker directs sounds toward each occupant.

The monitoring system may be any type of system which is capable of determining the location of the occupant, or more specifically, the location of the head or ears of the occupants. For example, the monitoring system may comprise at least one wave-receiving sensor for receiving waves from the passenger compartment, and a processor coupled to the wave-receiving sensor(s) for determining the position of the occupant(s) based on the waves received by the wave-receiving sensor(s). The monitoring system can also determine the position of objects other than the occupants and control the sound generating system in consideration of the determined position of the objects.

A method for controlling audio reception by occupants in a vehicle comprises the steps of determining the position of at least one occupant of the vehicle, providing a sound generator for generating specific sounds and automatically adjusting the sound generator based on the determined position of the occupant(s) such that the specific sounds are audible to the occupant(s). The features of the arrangement described above may be used in the method.

Another arrangement for controlling audio reception by occupants of a passenger compartment of the vehicle comprises a monitoring system for determining the presence of any occupants and a sound generating system coupled to the monitoring system for generating specific sounds. The sound generating system is automatically adjustable based on the determined presence of any occupants such that the specific sounds are audible to any occupants present in the passenger compartment. The monitoring system and sound generating system may be as in the arrangement described above. However, in this case, the sound generating system is controlled based on the determined presence of the occupants. All of the above-described methods and apparatus may be used in conjunction with one another and in combination with the methods and apparatus for optimizing the driving conditions for the occupants of the vehicle described herein.

15.8 Vehicle Operation

Another invention disclosed above is a system for controlling operation of a vehicle based on recognition of an authorized individual comprises a processor embodying a pattern recognition algorithm, as defined above, trained to identify whether a person is the individual by analyzing data derived from images and one or more optical receiving units for receiving an optical image including the person and deriving data from the image. Each optical receiving unit is coupled to the processor to provide the data to the pattern recognition algorithm to thereby obtain an indication from the pattern recognition algorithm whether the person is the individual. A security system is arranged to enable operation of the vehicle when the pattern recognition algorithm provides an indication that the person is an individual authorized to operate the vehicle and prevent operation of the vehicle when the pattern recognition algorithm does not provide an indication that the person is an individual authorized to operate the vehicle. An optional optical transmitting unit is provided in the vehicle for transmitting electromagnetic energy and is arranged relative to the optical receiving unit(s) such that electromagnetic energy transmitted by the optical transmitting unit is reflected by the person and received by at least one of the optical receiving units. The optical receiving units may be selected from a group consisting of a CCD array, a CMOS array, a QWIP array, an active pixel camera and an HDRC camera. Other types of two or three-dimensional cameras can also be used.

A method for controlling operation of a vehicle based on recognition of a person as one of a set of authorized individuals comprises the steps of obtaining images including the authorized individuals by means of one or more optical receiving unit, deriving data from the images, training a pattern recognition algorithm on the data derived from the images which is capable of identifying a person as one of the individuals, then subsequently obtaining images by means of the optical receiving unit(s), inputting data derived from the images subsequently obtained by the optical receiving unit(s) into the pattern recognition algorithm to obtain an indication whether the person is one of the set of authorized individuals, and providing a security system which enables operation of the vehicle when the pattern recognition algorithm provides an indication that the person is one of the set of individuals authorized to operate the vehicle and prevents operation of the vehicle when the pattern recognition algorithm does not provide an indication that the person is one of the set of individuals authorized to operate the vehicle. The data derivation from the images may entail any number of image processing techniques including eliminating pixels from the images which are present in multiple images and comparing the images with stored arrays of pixels and eliminating pixels from the images which are present in the stored arrays of pixels. The method can also be used to control a vehicular component based on recognition of a person as one of a predetermined set of particular individuals. This method includes the step of affecting the component based on the indication from the pattern recognition algorithm whether the person is one of the set of individuals. The components may be one or more of the following: the mirrors, the seat, the anchorage point of the seatbelt, the airbag deployment parameters including inflation rate and pressure, inflation direction, deflation rate, time of inflation, the headrest, the steering wheel, the pedals, the entertainment system and the air-conditioning/ventilation system.

15.9 Exterior Monitoring

Another monitoring arrangement comprises an imaging device for obtaining three-dimensional images of the environment (internal and/or external) and a processor embodying a pattern recognition technique for processing the three-dimensional images to determine at least one characteristic of an object in the environment based on the three-dimensional images obtained by the imaging device. The imaging device can be arranged at locations throughout the vehicle as described above. Control of a reactive component is enabled by the determination of the characteristic of the object.

Another arrangement for monitoring objects in or about a vehicle comprises a generating device for generating a first signal having a first frequency in a specific radio frequency range, a wave transmitter arranged to receive the signal and transmit waves toward the objects, a wave-receiver arranged relative to the wave transmitter for receiving waves transmitted by the wave transmitter after the waves have interacted with an object, the wave receiver being arranged to generate a second signal based on the received waves at the same frequency as the first signal but shifted in phase, and a detector for detecting a phase difference between the first and second signals, whereby the phase difference is a measure of a property of the object. The phase difference is a measure of the distance between the object and the wave receiver and the wave transmitter. The wave transmitter may comprise an infrared driver and the receiver comprises an infrared diode.

A vehicle including an arrangement for measuring position of an object in an environment of or about the vehicle comprises a light source capable of directing modulated light into the environment, at least one light-receiving pixel arranged to receive the modulated light after reflection by any objects in the environment and a processor for determining the distance between any objects from which the modulated light is reflected and the light source based on the reception of the modulated light by the pixel(s). The pixels can constitute an array. Components for modulating a frequency of the light being directed by the light source into the environment and for providing a correlation pattern in a form of code division modulation of the light being directed by the light source into the environment can be provided. The pixel can also be a photo diode such as a PIN or avalanche diode.

All of the above-described methods and apparatus may be used in conjunction with one another and in combination with the methods and apparatus for optimizing the driving conditions for the occupants of the vehicle described herein. Although several preferred embodiments are illustrated and described above, there are possible combinations using other geometries, sensors, materials and different dimensions for the components that perform the same functions. This invention is not limited to the above embodiments and should be determined by the following claims. There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

Appendix 1

Analysis of Neural Network Training and Data Preprocessing Methods—An Example

1. Introduction

The Artificial Neural Network that forms the "brains" of the Occupant Spatial Sensor needs to be trained to recognize airbag enable and disable patterns. The most important part of this training is the data that is collected in the vehicle, which provides the patterns corresponding to these respective configurations. Manipulation of this data (such as filtering) is appropriate if this enhances the information contained in the data. Important too, are the basic network architecture and training methods applied, as these two determine the learning and generalization capabilities of the neural network. The ultimate test for all methods and filters is their effect on the network performance against real world situations.

The Occupant Spatial Sensor (OSS) uses an artificial neural network (ANN) to recognize patterns that it has been trained to identify as either airbag enable or airbag disable conditions. The pattern is obtained from four ultrasonic transducers that cover the front passenger seating area. This pattern consists of the ultrasonic echoes from the objects in the passenger seat area. The signal from each of the four transducers consists of the electrical image of the return echoes, which is processed by the electronics. The electronic processing comprises amplification (logarithmic compression), rectification, and demodulation (band pass filtering), followed by discretization (sampling) and digitization of the signal. The only software processing required, before this signal can be fed into the artificial neural network, is normalization (i.e. mapping the input to numbers between 0 and 1). Although this is a fair amount of processing, the resulting signal is still considered "raw", because all information is treated equally.

It is possible to apply one or more software preprocessing filters to the raw signal before it is fed into the artificial neural network. The purpose of such filters is to enhance the useful information going into the ANN, in order to increase the system performance. This document describes several preprocessing filters that were applied to the ANN training of a particular vehicle.

2. Data Description

The performance of the artificial neural network is dependent on the data that is used to train the network. The amount of data and the distribution of the data within the realm of possibilities are known to have a large effect on the ability of the network to recognize patterns and to generalize. Data for the OSS is made up of vectors. Each vector is a combination of the useful parts of the signals collected from four ultrasonic transducers. A typical vector could comprise on the order of 100 data points, each representing the (time displaced) echo level as recorded by the ultrasonic transducers.

Three different sets of data are collected. The first set, the training data, contains the patterns that the ANN is being trained on to recognize as either an airbag deploy or non-deploy scenario. The second set is the independent test data. This set is used during the network training to direct the optimization of the network weights. The third set is the validation (or real world) data. This set is used to quantify the success rate (or performance) of the finalized artificial neural network.

FIG. 84 shows the main characteristics of these three data sets, as collected for the vehicle. Three numbers characterize the sets. The number of configurations characterizes how many different subjects and objects were used. The number of setups is the product of the number of configurations and the number of vehicle interior variations (seat position and recline, roof and window state, etc.) performed for each configuration. The total number of vectors is then made up of the product of the number of setups and the number of patterns collected while the subject or object moves within the passenger volume.

1.1 Training Data Set Characteristics

The training data set can be split up in various ways into subsets that show the distribution of the data. FIG. 85 shows the distribution of the training set amongst three classes of passenger seat occupancy: Empty Seat, Human Occupant, and Child Seat. All human occupants were adults of various sizes. No children were part of the training data set other then those seated in Forward Facing Child Seats. FIG. 86 shows a further breakup of the Child Seats into Forward Facing Child Seats, Rearward Facing Child Seats, Rearward Facing Infant Seats, and out-of-position Forward Facing Child Seats. FIG. 87 shows a different type of distribution; one based on the environmental conditions inside the vehicle.

1.2 Independent Test Data Characteristics

The independent test data is created using the same configurations, subjects, objects, and conditions as used for the training data set. Its makeup and distributions are therefore the same as those of the training data set.

1.3 Validation Data Characteristics

The distribution of the validation data set into its main subsets is shown in FIG. 88. This distribution is close to that of the training data set. However, the human occupants comprised both children (12% of total) as well as adults (27% of total). FIG. 89 shows the distribution of human subjects. Contrary to the training and independent test data sets, data was collected on children ages 3 and 6 that were not seated in a child restraint of any kind. FIG. 90 shows the distribution of the child seats used. On the other hand, no data was collected on Forward Facing Child Seats that were out-of-position. The child and infant seats used in this data set are different from those used in the training and independent test data sets. The validation data was collected with varying environmental conditions as shown in FIG. 91.

3. Network Training

The baseline network consisted of a four layer back-propagation network with ==117 input layer nodes, 20 and 7 nodes respectively in the two hidden layers, and 1 output layer node. The input layer is made up of inputs from four ultrasonic transducers. These were located in the vehicle on the rear quarter panel (A), the A-pillar (B), and the over-head console (C, H). FIG. 92 shows the number of points, taken from each of these channels that make up one vector.

The artificial neural network is implemented using the ISR Software. The method used for training the decision mathematical model was back-propagation with Extended Delta-Bar-Delta learning rule and sigmoid transfer function. The Extended DBD paradigm uses past values of the gradient to infer the local curvature of the error surface. This leads to a learning rule in which every connection has a different learning rate and a different momentum term, both of which are automatically calculated.

The network was trained using the above-described training and independent test data sets. An optimum (against the independent test set) was found after 3,675,000 training cycles. Each training cycle uses 30 vectors (known as the epoch), randomly chosen from the 650,000 available training set vectors. FIG. 93 shows the performance of the baseline network.

The network performance has been further analyzed by investigating the success rates against subsets of the independent test set. The success rate against the airbag enable conditions at 94.6% is virtually equal to that against the airbag disable conditions at 94.4%. FIG. 94 shows the success rates for the various occupancy subsets. FIG. 95 shows the success rates for the environmental conditions subsets. Although the distribution of this data was not entirely balanced throughout the matrix, it can be concluded that the system performance is not significantly degraded by heat sources.

3.1 Normalization

Normalization is used to scale the real world data range into a range acceptable for the network training. The NeuralWorks software requires the use of a scaling factor to bring the input data into a range of 0 to 1, inclusive. Several normalization methods have been explored for their effect on the system performance.

Figure 96:
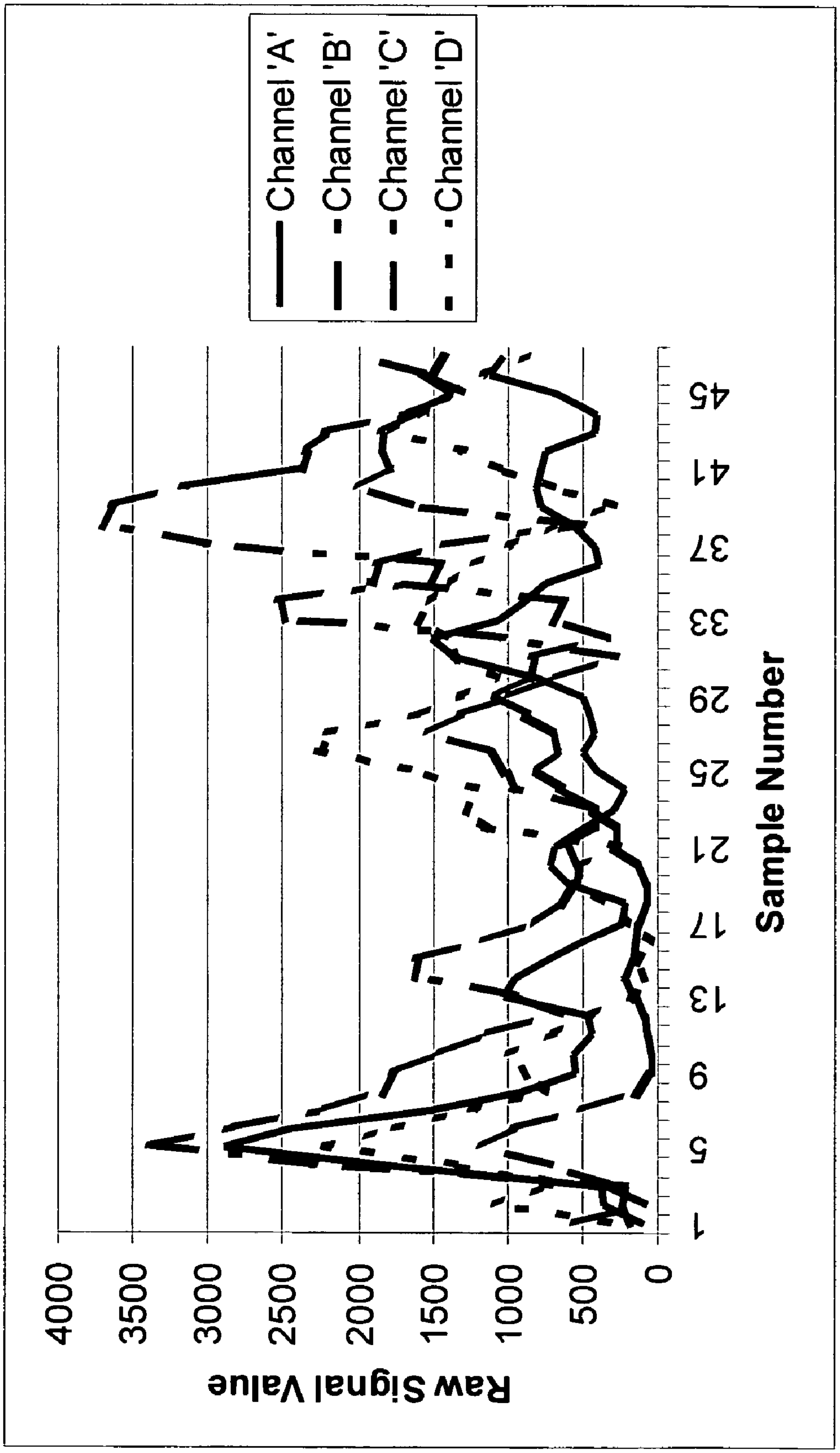
FIG. 96 is a chart of four typical raw signals which are combined to constitute a vector.

The real world data consists of 12 bit, digitized signals with values between 0 and 4095. FIG. 96 shows a typical raw signal. A raw vector consists of combined sections of four signals.

Three methods of normalization of the individual vectors have been investigated:

a. Normalization using the highest and lowest value of the entire vector (baseline).

b. Normalization of the transducer channels that make up the vector, individually. This method uses the highest and lowest values of each channel.

c. Normalization with a fixed range ([0,4095]).

The results of the normalization study are summarized in FIG. 97.

A higher performance results from normalizing across the entire vector versus normalizing per channel. This can be explained from the fact that the baseline method retains the information contained in the relative strength of the signal from one transducer compared to another. This information is lost when using the second method.

Normalization using a fixed range retains the information contained in the relative strength of one vector compared to the next. From this it could be expected that the performance of the network trained with fixed range normalization would increase over that of the baseline method. However, without normalization, the input range is, as a rule, not from zero to the maximum value (see FIG. 97). The absolute value of the data at the input layer affects the network weight adjustment (see equations [1] and [2]). During network training, vectors with a smaller input range will affect the weights calculated for each processing element (neuron) differently than vectors that do span the full range.

$$\Delta w_{ij}^{[s]}=\text{lcoef}\cdot e_j^{[s]}.x_l^{[s-1]} \quad [1]$$

$$e_j^{[s]}=x_j^{[s]}.(1.0-x_j^{[s]}).\Delta_k(e_k^{[s+1]}.w_{kj}^{[s+1]}) \quad [2]$$

$\Delta w_{ij}^{[s]}$ is the change in the network weights; lcoef is the learning coefficient; $e_j^{[s]}$ is the local error at neuron j in layer s; $x_l^{[s]}$ is the current output state of neuron j in layer s.

Variations in the highest and lowest values in the input layer, therefore, have a negative effect on the training of the network. This is reflected in a lower performance against the validation data set.

A secondary effect of normalization is that it increases the resolution of the signal by stretching it out over the full range of 0 to 1, inclusive. As the network predominantly learns from higher peaks in the signal, this results in better generalization capabilities and therefore in a higher performance.

It must be concluded that the effects of the fixed range of input values and the increased resolution resulting from the baseline normalization method have a stronger effect on the network training than retaining the information contained in the relative vector strength.

3.2 Low Threshold Filters

Not all information contained in the raw signals can be considered useful for network training. Low amplitude echoes are received back from objects on the outskirts of the ultrasonic field that should not be included in the training data. Moreover, low amplitude noise, from various sources, is contained within the signal. This noise shows up strongest where the signal is weak. By using a low threshold filter, the signal to noise ratio of the vectors can be improved before they are used for network training.

Three cutoff levels were used: 5%, 10%, and 20% of the signal maximum value (4095). The method used, brings the values below the threshold up to the threshold level. Subsequent vector normalization (baseline method) stretches the signal to the full range of [0,1].

The results of the low threshold filter study are summarized in FIG. 98.

The performance of the networks trained with 5% and 10% threshold filter is similar to that of the baseline network. A small performance degradation is observed for the network trained with a 20% threshold filter. From this it is concluded that the noise level is sufficiently low to not affect the network training. At the same time it can be concluded that the lower 10% of the signal can be discarded without affecting the network performance. This allows the definition of demarcation lines on the outskirts of the ultrasonic field where the signal is equal to 10% of the maximum field strength 4. Network Types The baseline network is a back-propagation type network. Back-propagation is a general-purpose network paradigm that has been successfully used for prediction, classification, system modeling, and filtering as well as many other general types of problems. Back propagation learns by calculating an error between desired and actual output and propagating this error information back to each node in the network. This back-propagated error is used to drive the learning at each node. Some of the advantages of a back-propagation network are that it attempts to minimize the global error and that it can provide a very compact distributed representation of complex data sets. Some of the disadvantages are its slow learning and the irregular boundaries and unexpected classification regions due to the distributed nature of the network and the use of a transfer functions that is unbounded. Some of these disadvantages can be overcome by using a modified back-propagation method such as the Extended Delta-Bar-Delta paradigm. The EDBD algorithm automatically calculates the learning rate and momentum for each connection in the network, which facilitates optimization of the network training.

Many other network architectures exist that have different characteristics than the baseline network. One of these is the Logicon Projection Network. This type of network combines the advantages of closed boundary networks with those of open boundary networks (to which the back-propagation network belongs). Closed boundary networks are fast learning because they can immediately place prototypes at the input data points and match all input data to these prototypes. Open boundary networks, on the other hand, have the capability to minimize the output error through gradient decent.

5. Conclusions

The baseline artificial neural network trained to a success rate of 92.7% against the validation data set. This network has a four-layer back-propagation architecture and uses the Extended Delta-Bar-Delta learning rule and sigmoid transfer function. Pre-processing comprised vector normalization while post-processing comprised a “five consistent decision” filter.

The objects and subjects used for the independent test data were the same as those used for the training data. This may have negatively affected the network’s classification generalization abilities.

The spatial distribution of the independent test data was as wide as that of the training data. This has resulted in a network that can generalize across a large spatial volume. A higher performance across a smaller volume, located immediately around the peak of the normal distribution, combined with a lower performance on the outskirts of the distribution curve, might be preferable.

To achieve this, the distribution of the independent test set needs to be a reflection of the normal distribution for the system (a.k.a. native population).

Modifying the pre-processing method or applying additional pre-processing methods did not show a significant improvement of the performance over that of the baseline network. The baseline normalization method gave the best results as it improves the learning by keeping the input values in a fixed range and increases the signal resolution. The lower threshold study showed that the network learns from the larger peaks in the echo pattern. Pre-processing techniques should be aimed at increasing the signal resolution to bring out these peaks.

A further study could be performed to investigate combining a lower threshold with fixed range normalization, using a range less than full scale. This would force each vector to include at least one point at the lower threshold value and one value in saturation, effectively forcing each vector into a fixed range that can be mapped between 0 and 1, inclusive. This would have the positive effects associated with the baseline normalization, while retaining the information contained in the relative vector strength. Raw vectors points that, as a result of the scaling, would fall outside the range of 0 to 1 would then be mapped to 0 and 1 respectively.

Post-processing should be used to enhance the network recognition ability with a memory function. The possibilities for such are currently frustrated by the necessity of one network performing both object classification as well as spatial locating functions. Performing the spatial locating function requires flexibility to rapidly update the system status. Object classification, on the other hand, benefits from decision rigidity to nullify the effect of an occasional pattern that is incorrectly classified by the network.

Appendix 2

Process for Training an OPS System DOOP Network for a Specific Vehicle

1. Define customer requirements and deliverables
1.1. Number of zones
1.2. Number of outputs
1.3. At risk zone definition
1.4. Decision definition i.e. empty seat at risk, safe seating, or not critical and undetermined
1.5. Determine speed of DOOP decision
2. Develop PERT chart for the program
3. Determine viable locations for the transducer mounts
3.1. Manufacturability
3.2. Repeatability
3.3. Exposure (not able to damage during vehicle life)
4. Evaluate location of mount logistics
4.1. Field dimensions
4.2. Multipath reflections
4.3. Transducer Aim
4.4. Obstructions/Unwanted data
4.5. Objective of view
4.6. Primary DOOP transducers requirements
5. Develop documentation logs for the program (vehicle books)
6. Determine vehicle training variables
6.1. Seat track stops
6.2. Steering wheel stops
6.3. Seat back angles
6.4. DOOP transducer blockage during crash
6.5. Etc . . .
7. Determine and mark at risk zone in vehicle
8. Evaluate location physical impediments
8.1. Room to mount/hide transducers
8.2. Sufficient hard mounting surfaces
8.3. Obstructions
9. Develop matrix for training, independent, validation, and DOOP data sets
10. Determine necessary equipment needed for data collection
10.1. Child/booster/infant seats
10.2. Maps/razors/makeup
10.3. Etc . . .
11. Schedule sled tests for initial and final DOOP networks
12. Design test buck for DOOP
13. Design test dummy for DOOP testing
14. Purchase any necessary variables
14.1. Child/booster/infant seats
14.2. Maps/razors/makeup
14.3. Etc . . .
15. Develop automated controls of vehicle accessories
15.1. Automatic seat control for variable empty seat
15.2. Automatic seat back angle control for variable empty seat
15.3. Automatic window control for variable empty seat
15.4. Etc . . .
16. Acquire equipment to build automated controls
17. Build & install automated controls of vehicle variables
18. Install data collection aides
18.1. Thermometers
18.2. Seat track gauge
18.3. Seat angle gauge
18.4. Etc . . .
19. Install switched and fused wiring for:
19.1. Transducer pairs
19.2. Lasers
19.3. Decision Indicator Lights
19.4. System box
19.5. Monitor
19.6. Power automated control items
19.7. Thermometers, potentiometers
19.8. DOOP occupant ranging device
19.9. DOOP ranging indicator
19.10. Etc . . .
20. Write DOOP operating software for OPS system box
21. Validate DOOP operating software for OPS
22. Build OPS system control box for the vehicle with special DOOP operating software
23. Validate & document system control box
24. Write vehicle specific DOOP data collection software (pollbin)
25. Write vehicle specific DOOP data evaluation program (picgraph)
26. Evaluate DOOP data collection software
27. Evaluate DOOP data evaluation software
28. Load DOOP data collection software on OPS system box and validate
29. Load DOOP data evaluation software on OPS system box and validate
30. Train technicians on DOOP data collection techniques and use of data collection software
31. Design prototype mounts based on known transducer variables
32. Prototype mounts
33. Pre-build mounts
33.1. Install transducers in mounts
33.2. Optimize to eliminate crosstalk
33.3. Obtain desired field
33.4. Validate performance of DOOP requirements for mounts
34. Document mounts
34.1. Polar plots of fields
34.2. Drawings with all mount dimensions
34.3. Drawings of transducer location in the mount
35. Install mounts in the vehicle
36. Map fields in the vehicle using ATI designed apparatus and specification
37. Map performance in the vehicle of the DOOP transducer assembly
38. Determine sensor volume
39. Document vehicle mounted transducers and fields
39.1. Mapping per ATI specification
39.2. Photographs of all fields
39.3. Drawing and dimensions of installed mounts
39.4. Document sensor volume
39.5. Drawing and dimensions of aim & field
40. Using data collection software and OPS system box collect initial 16 sheets of training, independent, and validation data
41. Determine initial conditions for training the ANN
41.1. Normalization method
41.2. Training via back propagation or ?
41.3. Weights
41.4. Etc . . .
42. Pre-process data
43. Train an ANN on above data
44. Develop post processing strategy if necessary
45. Develop post processing software
46. Evaluate ANN with validation data and in vehicle analysis 47. Perform sled tests to confirm initial DOOP results
48. Document DOOP testing results and performance
49. Rework mounts and repeat steps 31 through 48 if necessary
50. Meet with customer and review program
51. Develop strategy for customer directed outputs
51.1. Develop strategy for final ANN multiple decision networks if necessary
51.2. Develop strategy for final ANN multiple layer networks if necessary
51.3. Develop strategy for DOOP layer/network
52. Design daily calibration jig
53. Build daily calibration jig
54. Develop daily calibration test
55. Document daily calibration test procedure & jig
56. Collect daily calibration tests
57. Document daily calibration test results
58. Rework vehicle data collection markings for customer directed outputs
58.1. Multiple zone identifiers for data collection
59. Schedule subjects for all data sets
60. Train subjects for data collection procedures
61. Using DOOP data collection software and OPS system box collect initial 16 sheets of training, independent, and validation data
62. Collect total amount of vectors deemed necessary by program directives, amount will vary as outputs and complexity of ANN varies
63. Determine initial conditions for training the ANN
63.1. Normalization method
63.2. Training via back propagation or ?
63.3. Weights
63.4. Etc . . .
64. Pre-process data
65. Train an ANN on above data
66. Develop post processing strategy
66.1. Weighting
66.2. Averaging
66.3. Etc . . .
67. Develop post processing software
68. Evaluate ANN with validation data
69. Perform in vehicle hole searching and analysis
70. Perform in vehicle non sled mounted DOOP tests
71. Determines need for further training or processing
72. Repeat steps 58 through 71 if necessary
73. Perform sled tests to confirm initial DOOP results
74. Document DOOP testing results and performance
75. Repeat steps 58 through 74 if necessary
76. Write summary performance report
77. Presentation of vehicle to the customer
78. Delivered an OPS equipped vehicle to the customer

We claim:

1. An apparatus for sensing pressure applied to a seat by an occupant of the seat and for controlling deployment of an airbag, comprising:

a bladder defining a chamber, said bladder being adapted to be arranged in a seat portion of the seat;

a control module arranged to control deployment of the airbag; and a pressure sensor for measuring a pressure in said chamber, said pressure sensor generating a signal based on the measured pressure in said chamber and providing said signal to said control module.

2. A method for controlling an occupant restraint device arranged to protect an occupant in a vehicle in a crash involving the vehicle, comprising the steps of:

arranging a bladder defining a chamber in a seat portion of a seat in the vehicle;

measuring a pressure in the chamber;

providing a signal based on the measured pressure in the chamber to a control module; and controlling deployment of the occupant restraint device by means of the control module.

3. The method of claim 2, wherein the occupant restraint device is an airbag.

4. A vehicle including a system for protecting art occupant in the vehicle in a crash involving the vehicle, comprising:

an occupant restraint device arranged in the vehicle to protect the occupant of the vehicle;

a seat having a seat portion;

a bladder having a chamber, said bladder being arranged in said seat portion;

a control module arranged to control deployment of said occupant restraint device; and a pressure sensor for measuring a pressure in said chamber, said pressure sensor generating a signal based on the measured pressure in said chamber and providing said signal to said control module.

5. The vehicle of claim 4, wherein said occupant restraint device is an airbag.

6. The method of claim 2, further comprising the step of controlling at least one other vehicular system, subsystem or component by means of the control module.

7. The method of claim 6, wherein the at least one other system, subsystem or Component is a pressure control device which controls pressure in the chamber.

* * * * *

UNITED STATES PATENT AND TRADEMARK OFFICE

CERTIFICATE OF CORRECTION

PATENT NO. : 7,243,945 B2
APPLICATION NO. : 10/733957
DATED : July 17, 2007
INVENTOR(S) : David S. Breed et al.

It is certified that error appears in the above-identified patent and that said Letters Patent is hereby corrected as shown below:

Col. 294, line 27, replace “art” with --an--.

Col. 294, line 46, replace “Component” with --component--.

Signed and Sealed this

Eleventh Day of September, 2007

JON W. DUDAS
*Director of the United States Patent and Trademark Office*